US007681357B2

(12) United States Patent
Dyas

(10) Patent No.: US 7,681,357 B2
(45) Date of Patent: Mar. 23, 2010

(54) APPARATUSES AND SYSTEMS FOR GROWING NURSERY STOCK

(76) Inventor: Drew C. Dyas, 27 Signal Hill Rd., Spanish Fort, AL (US) 36527

( * ) Notice: Subject to any disclaimer, the term of this patent is extended or adjusted under 35 U.S.C. 154(b) by 1060 days.

(21) Appl. No.: 11/339,732

(22) Filed: Jan. 25, 2006

(65) Prior Publication Data

US 2006/0218862 A1 Oct. 5, 2006

Related U.S. Application Data

(60) Provisional application No. 60/646,846, filed on Jan. 25, 2005.

(51) Int. Cl.
*A47G 7/02* (2006.01)

(52) U.S. Cl. ........................................................ 47/66.5

(58) Field of Classification Search ..................... 47/39, 47/75, 66.5, 84, 86, 87; 211/74, 85.23; D3/313
See application file for complete search history.

(56) References Cited

U.S. PATENT DOCUMENTS

| | | | | |
|---|---|---|---|---|
| 1,533,342 | A | 4/1925 | Schein | |
| 1,643,735 | A * | 9/1927 | Baker | 211/85.4 |
| 1,665,124 | A | 4/1928 | Wright | |
| 3,542,210 | A * | 11/1970 | Sorensen | 211/74 |
| 3,825,126 | A * | 7/1974 | Pohl et al. | 211/85.23 |
| 4,027,429 | A | 6/1977 | Georgi | |
| 4,106,235 | A | 8/1978 | Smith | |
| 4,232,482 | A | 11/1980 | Watt et al. | |
| 4,495,725 | A * | 1/1985 | Talbott | 47/85 |
| 4,763,443 | A * | 8/1988 | Williames | 47/86 |
| 5,007,135 | A | 4/1991 | Rigsby | |
| 5,099,609 | A | 3/1992 | Yamauchi | |
| 5,215,427 | A * | 6/1993 | Olsthoorn et al. | 414/664 |
| 5,279,070 | A | 1/1994 | Shreckhise et al. | |
| 5,309,846 | A * | 5/1994 | Peterson | 108/53.3 |
| 5,446,995 | A * | 9/1995 | Huber | 47/86 |
| 5,515,783 | A | 5/1996 | Hesse et al. | |
| 6,038,813 | A | 3/2000 | Moore et al. | |
| 6,266,921 | B1 * | 7/2001 | Keskilohko | 47/86 |
| 6,415,549 | B1 * | 7/2002 | Beeson et al. | 47/84 |
| 6,536,361 | B1 * | 3/2003 | Wu | 111/114 |
| D491,802 | S * | 6/2004 | Griffith et al. | D9/759 |
| 7,020,997 | B1 * | 4/2006 | Thomas | 47/39 |
| 2002/0033003 | A1 * | 3/2002 | Weder et al. | 53/447 |
| 2002/0182016 | A1 | 12/2002 | Adam et al. | |

* cited by examiner

*Primary Examiner*—Francis T Palo
(74) *Attorney, Agent, or Firm*—Sutherland Asbill & Brennan LLP

(57) ABSTRACT

The present invention is directed to, a container, multiple arrangements of container and flat/tray pallets, corresponding container/flat/tray/pallet assemblies, an automated pallet assembly/disassembly system, autonomous pallet assembly transfer units, an autonomous pallet assembly transport train, and an integrated automated production system, for use in a horticultural nursery environment for: substantially reducing labor needed to produce; stabilizing of; collecting and shedding broadcast applications to; reflecting desired sunlight to foliage of; reducing root tip heating of; reducing water consumption in growing; reducing wetting of foliage of; controlling excess root growth of; and, reducing weed growth proximal to; spaced potted plants.

19 Claims, 174 Drawing Sheets

APPARATUSES AND SYSTEMS FOR GROWING NURSERY STOCK

RELATED APPLICATION

This application claims the benefit of priority to U.S. provisional patent application Ser. No. 60/646,846, entitled "Apparatuses and Systems For Crowing Nursery Stock," which was filed in the United States Patent and Trademark Office on Jan. 25, 2005, and is incorporated by reference herein.

FIELD OF THE INVENTION

The present invention relates generally to a system, a container, a container mounting structure, and a container mounting assembly. More particularly, the invention is directed to an automated production system, a container, a container pallet, and a container pallet assembly for use in a horticultural nursery environment for: reducing labor needed to produce; stabilizing, collecting and shedding broadcast applications to; reflecting desired sunlight to foliage of; reducing root tip heating of; reducing water consumption in growing; reduced wetting of foliage of; controlling excess root growth of; and, reducing weed growth proximal to; spaced potted plants.

BACKGROUND OF THE INVENTION

The nursery industry supplies ornamental crops to the consumer by way of large nurseries, which grow the crop for the landscaping and garden centers where consumers and landscapers acquire their plants for planting in consumer's yards.

The nursery industry is a multi-billion dollar industry in the US, with more than 20,000 nurseries nationwide. Evidence suggests that his industry, like many, also conforms to the 80/20-rule, in that 80% of all ornamentals are grown by 20% of all growers nationwide. Plants can be segregated into shrubs and trees, the former of which is almost exclusively grown in plastic containers, and the latter grown both in containers and in the ground (known as ball-and-burlap or B&B nurseries). Container nurseries represent about 60% of the nursery industry, while the B&B portion accounts for the remainder.

Plants grown in containers can be shipped directly to the market without the need for transplanting. Container grown plants produce numerous advantages to the nursery by reducing labor cost, as well as handling, packaging and other operating costs. In addition, growing plants in containers provides comparatively simplified weed control and enables controlled irrigation and fertilization.

Container nurseries range in size from a few acres to a few thousand acres, where the larger nurseries typically comprise operations at multiple sites. Some nurseries specialize in certain varieties while others grow many varieties of plants. Many nurseries clone their own varieties, propagating them, prior to planting them in containers and growing them in the field. Once plant material has sufficiently matured, it is sold to other nurseries, distributors, landscape contractors, and/or retail stores. Some nurseries specialize exclusively in propagation, while others only grow containers—nurseries might even specialize in growing certain ornamental varieties for a short period of time, before reselling them to other nurseries for further maturing before they are resold to the general public.

Container nurseries are located in different growing regions across the US, largely where climate benefits the type plant material grown. Plants are grown in greenhouses and in the field, as needed to provide a productive growing environment for the plant material. In order to maximize the usage of acreage, nurseries in the regions with frost and snow utilize greenhouses in which plants are grown over the winter.

Growing plants in containers does, however, have several disadvantages. While production labor content is, indeed, reduced through containerization of the plant material, substantial production labor is still necessary.

Virtually all container nurseries utilize seasonal immigrant labor, typically from Mexico, in order to meet their production needs throughout the growing seasons. Such labor is getting more difficult to obtain, requiring continued lobbying-effort in Washington, D.C. to guarantee exemptions from the Immigration & Naturalization Service (INS), involves costly recruiting south of the border, transportation to and from their hometowns and their accommodations once in the US and working on site. In addition, the allure for workers to perform tiring and backbreaking work outdoors is fading when the same labor pool is being sought for other better paying and lower exertion jobs in the US economy such as assembly, custodial and other such job categories. Recently, the State of California has actually banned hand weeding of most crops due to worker back injury issues.

A large portion of labor-intensive tasks in container nurseries involves handling of containers. Containers are typically repotted before every growing season, requiring them to be picked up in the field, placed on trailers, brought to a potting shed where they are taken out of their containers and repotted in a larger container with additional soil (so called up-shifting), placed on trailers, driven out to the designated bed (usually an outdoor field area), where they are then placed back on the ground in a variety of different tight/staggered/spaced patterns to allow the plants to grow during the season. The plants are also fertilized and continually watered when in the field. Growers in frigid regions also need to take plants out of greenhouses and perform the up-shifting and spacing operations. All these operations are extremely labor intensive and need to be performed in as compressed a time as possible. Competing for time (typically mostly in early spring) is shipping of finished plant material, which generates the revenue for the nursery. This involves selecting plants, transporting them to the shipping dock and loading trucks. In the case of nurseries in the 'snow belt', containers that were placed in the field need to be moved into greenhouses, requiring another intensive labor effort to pick them from the field, transport them via trailer to the greenhouses, and tightly pack them inside the structures to survive the winter months.

The degree to which growers and laborers perform their jobs efficiently has a large impact on the nursery's profit margin and its ability to optimize plant growth and health. Since production labor is the prevalent cost in growing ornamentals (up to 20% to 35% of sales according to large growers), the potential for increasing the competitiveness of the industry through automation in order to reduce manpower requirements, or even smooth out the peak labor requirements, is potentially very large.

Schempf in U.S. Patent Application No. 20020182016 presents results of a survey taken of growers, which provides us a distribution of nursery production labor over various production-related tasks, as follows (where no. 1 rank implies the highest number of laborers required):

1. Moving containerized plants to the canning shed from the growing beds and from the growing beds to the potting shed.
2. Moving containerized plants from the growing beds to the staging (shipping) area.

3. Spacing the containerized plants in the growing beds.
4. Moving containerized plants into and out of the over-wintering houses.
5. Moving containerized plants for pruning plants.
6. Moving excess containerized plants during spacing operations.
7. Other miscellaneous tasks (including potting, weeding, spraying, and fertilizing).

One need for production labor that challenges growers due to its unpredictable nature is that associated with returning overturned containerized plant material to its normal upright condition following windstorms. Particulate fertilizer applied to the surface of the soil in the plant containers is spilled on overturning of plant containers. Such spilled fertilizer, which is often a substantial amount in total across the nursery, is often washed away by rain, rendering it an unrecoverable loss and adding substantially to nursery pollutant runoff. Even if the spilled fertilizer remains on the ground adjoining the overturned plants, labor to recover it and return it to the plant containers is substantial.

Uncontrolled overturning of containers also can damage the associated plant material and create the potential for spread of disease.

Other disadvantages of growing free-standing containerized plant material involve irrigation and other broadcast application of chemicals (fertilizer, pesticide, herbicide, etc), whether liquid or solid particulate in nature. The soil mixture used for container grown plants usually has poor water retention so that irrigation must be regularly carried out to prevent the roots from becoming too dry. Such irrigation is typically accomplished by broadcast sprinkling, which results in the majority of applied water missing spaced plant containers. In most cases, spilled irrigation water flows to a retention pond where it can be reclaimed and reused. However, costs of electrical or other energy to run the one or more pumps that typically supply the spilled irrigation water is not recovered. Costs associated with wear of the irrigation system delivering the spilled water are also not recovered. Further, water losses still occur due to evaporation and percolation of at least part of the spilled irrigation water as it runs downhill along its drain paths to the retention pond, particularly in dry locales of relatively low humidity, where the water is needed most and is, thus, typically relatively expensive. Further still, reclaimed water, potentially originating from many areas within a nursery, has the potential to spread disease.

Disadvantages similar to those of broadcast irrigation apply also to broadcast application of chemicals. Spillage of such materials further potentially contributes adversely to pollution in nursery site runoff, particularly following rain sufficient to cause overflow of the nursery's one or more retention ponds.

Beeson, Haman, Knox, Smajstrla, and Yeager in U.S. Pat. No. 6,415,549 present a plant container and container attachment yielding a funnel-shaped container upper opening for collecting otherwise spilled irrigation water and for attachment to adjoining like containers for increasing container orientation stability. The container attachment, while relatively effective at collecting otherwise spilled irrigation water, contemplates substantial additional labor for implementation, which quickly negates water savings.

In addition, above ground containers of containerized plants are often in direct sunlight and wind, which contribute to rapid water evaporation. Most containers used by wholesale nurseries have thin walls and are constructed of plastic containing carbon black, an ingredient that promotes high container longevity, but makes the containers black in color and, thus, highly absorbent of impinging sunlight's radiant energy. The thin side wall(s) of the container thus become hot in direct sunlight and can scorch root tips approaching the container side wall(s) on the inside, adversely affecting the plant growth potential. Above ground containerized plants in more northern regions are also subject to freezing temperatures that combine with high winds to cause convective heat losses by the containers sufficient to freeze roots of containerized plants, potentially killing the plants.

To minimize these disadvantages associated with container grown plants, many nurseries anchor or bury the containers in the ground. This reduces the risk of the roots freezing and the plant from blowing over in high winds. A significant disadvantage of buried containers is the difficulty of removing the container from the ground before the plants can be shipped. Moreover, the roots from the plant grow outward through the drain holes in the container into the surrounding soil. This increases the amount of effort required to remove the container from the ground and usually results in root damage to the plant. An example of this type of growing system is shown in U.S. Pat. No. 5,007,135. This growing system provides a sufficiently large opening in the container to encourage the roots to grow outwardly into the surrounding soil. A shovel or other tool cuts the roots enabling removal of the container from the ground, inherently resulting in damage to the root system.

In recent years, many nurseries have used a below ground system where an empty container is buried in the ground and a growing container containing the plant is placed in the buried container. This system is often referred to in the industry as a pot-in-pot system. The system has several advantages over other growing systems. In particular, the pot-in-pot type system provides protection for the roots to resist freezing and from drying out in the sun. In addition, the buried container anchors the plant container and reduces the risk of the plants from overturning in high winds.

As in other below ground growing systems, the roots from the growing container often grow outward from the drain holes into the below ground container. The below ground container is required to have drain holes to prevent excess water from remaining in the container which will otherwise cause the roots to rot, potentially killing the plant. Often times the roots from the growing container will grow outward through the drain holes of the below ground container and into the surrounding soil. When this occurs, it is difficult to remove the growing container from the below ground container since the containers are now tangled with the root system. In extreme like situations the growing container cannot be separated from the below ground container without removing both containers from the ground and cutting the roots. This disadvantage increases the labor costs and damages the root system of the plant.

Another disadvantage of in-ground pot-in-pot systems is a lack of means of collecting and funneling broadcast applications to the containerized plants, resulting in costs of broadcast application spillage or of increased labor for direct application to the containerized plants. Low-flow drip irrigation systems are often used on larger such containers, but necessitate substantial labor for setup.

Another disadvantage of in-ground pot-in-pot systems is the potential for the ground in which said systems are mounted to have poor percolation, resulting in significant retention of rainwater in said pot-in-pot system and associated resulting rot of roots of incorporated containerized plants, reducing yield.

Another disadvantage of in-ground pot-in-pot systems, particularly in growing smaller plant material, is the lowering of potted plant foliage to a point nearer the ground, where it either must compete with proximal weeds for sunlight or may be damaged by weed eradication equipment, wherein such weeds tend to grow in soil exposed through breeches in or in the absence of typical plastic weed prevention sheeting material by the socket pots, increasing labor and weed control chemicals.

Another disadvantage of in-ground pot-in-pot systems, particularly in growing smaller plant material, is the relatively close spacing of open socket pots needed to maximize bed space utilization, such spacing resulting in awkward and potentially hazardous manual interaction with bed due to the plurality of essentially open holes in the bed.

Another disadvantage of in-ground pot-in-pot systems is the tendency for socket pots to become at least partially filled with clippings and other debris following crop harvest, resulting in additional labor to clear such debris for proper nesting and drainage of subsequently incorporated containerized plants.

Schempf in U.S. Patent Application No. 20020182016 offers an example of a machine for semi-automatically transferring containerized plants between a bed and trailer in the interest of reducing nursery production labor. However, significant labor is still required for a portion of the proposed container handling operation and to address machine mishandling of containers, which Schempf, in related reports, indicates affect between 0.4% and 2.3% of containers handled, i.e., typically at least one container out of every 250.

Examples of various plant growing containers are disclosed in U.S. Pat. No. 6,038,813 to Moore et al, U.S. Pat. No. 4,106,235 to Smith, U.S. Pat. No. 5,279,070 to Shreckhise et al, U.S. Pat. No. 5,099,609 to Yamauchi and U.S. Pat. No. 1,665,124 to Wright and Italian Patent No. 681968 and French Patent No. 427,391. These patents disclose plant container systems having a plant container and a receptacle container for receiving the plant container and holding water for supplying water to the plant. U.S. Pat. No. 5,515,783 to Peng, U.S. Pat. No. 4,232,482 to Watt et al, U.S. Pat. No. 4,027,429 to Georgi and U.S. Pat. No. 1,533,342 to Schein disclose growing containers having a tray or other container below the plant container for collecting water. These containers do not provide a system for preventing the roots of the plant from becoming entangled with the other container.

Accordingly, there is a continuing need in the industry for improved containerized plant growing system that overcomes the above disadvantages.

SUMMARY OF THE INVENTION

The present invention is directed to an automated system, a container, a structure, and a method, for improving the effectiveness of growing multiple containerized plants and, particularly, a simple free standing structure for supporting in upright orientations multiple containerized plants in planar arrays on a generally horizontal surface, as well as automated machinery for transporting, handling, assembling, and disassembling such structure assemblies.

Said pallet comprises a generally horizontal upper wall portion having a two-dimensional array of downwardly extending receptacles each substantially matching the shape of a container for receipt by each said receptacle, said container for holding soil and a live plant. The center of bottom wall of receptacle further opens to a hollow protrusion extending downward from said receptacle bottom wall, to a closed bottom wall that contacts the surface on which pallet rests, said protrusion forming a column, which with other like columns, collectively support pallet and contents. Said columns provide for effective spacing of bottom of supported container a short distance above pallet installation surface, providing for air pruning of roots growing from container drain holes, improved drainage of containers mounted in pallets sitting on a low, ill-draining mounting surface, and for lifting of pallets from beneath bottoms of containers mounted in pallets.

Said container has at least one side wall coupled to a bottom wall, and at least one drain opening through said at least one side wall and/or through said bottom wall. Said container which may be cylindrical or frustal in shape may further have an annular groove in its bottom wall, concentric with the container vertical centerline, for engagement with a complementary lifting device, facilitating container handling stability during pallet assembly and disassembly processes. Such a groove also provides for improved container water retention when combined with strategic placement of container drain holes.

Unitization of containerized plant material yields a pallet assembly having low height relative to its plan area or footprint, thus achieving significant increase in stability relative to like containerized plant material standing free. Such a unitized pallet assembly significantly resists movement in the face of wind forces as well as transport undulations. Thus, the probability is much greater that a unitized pallet assembly will remain standing in the same location and orientation for a significant period of time, relative to free-standing plant material. Such stability, without the need for ground-penetrating anchors or receptacles, makes flexible, automated handling and processing of palletized plant material economically feasible.

Said upper wall portion further substantially blocks direct sunlight impingement on side of each said container, reducing sunlight heating of wall of said container and consequent adverse heating of proximal roots in said container. Said reduced sunlight heating of container sides also reduces the rate at which soil in the container dries and, thus, reduces variation in moisture from the center of the container to its side wall(s), and, thus, reducing the characteristic differences between soil in the container and soil in the ground. This presents a more natural growing environment for the containerized plant. Said upper wall portion further substantially blocks sunlight needed for weed growth around said containers, reducing the need for herbicide or weed-pulling labor and the associated costs. Said upper wall portion is further contoured as multiple, contiguous funnels concentric with and terminating in said container receptacles, for collecting and shedding broadcast applications to upper surfaces of soil of said containerized plants in said containers, significantly reducing spillage of said broadcast applications. Contouring of said upper wall portion along with proper color and finish of its upper surface further promotes reflection of desired sunlight onto foliage of said containerized plants, enhancing photosynthesis and associated growth of said containerized plants.

Bottom wall of container receptacle is also elevated to reduce ground contacting area of said structure, substantially reducing adverse forces on structure assemblies resulting from impact of proximal moving accumulated rainwater against lower portion of said structure. Incorporation of elevated container platforms also reduces the potential for uncontrolled root rot otherwise resulting from containers sitting on intermittent low ground where pools of water may persist well beyond occurrences of rain showers.

Further, tapered geometry of said structure ensures it nests closely, quickly and easily in a stack of said structures and denests quickly and easily from a stack of said structures. Further, said structure provides physical guidance features for quick, simple, consistent installation and removal of said containerized plants, and for mechanized operations involving said structure.

Thermoforming/trimming is the preferred construction method given the thin-wall nature of the structures and the value added from incorporation of two-layer sheet material. Thermoforming process may further incorporate integral compression molding, providing close control and thinning of selected walls of structure, e.g. for producing integral spring-loaded hinges at funnel spout portion inlets needed for ingress and egress of mounted containers in one style of structure. Structures could also be injection molded of a single color material, with a potential subsequent coating operation applying a second color achieving a result similar to thermoforming of two-layer material. Construction could also be of formed sheet metal with separately attached—either plastic over-molded or equivalently sprung hinged spouts in one style of structure. Preferred plastic would be tough and relatively rigid, typical of polyethylene terephthalate (PET), and may be of post-consumer or post-industrial waste to keep costs low. Carbon black will preferably be incorporated to the primary, structural, layer to improve resistance to ultraviolet light. A light-colored upper layer is incorporated to achieve the desired light reflectivity. Stamped, sheet metal construction is of corrosion-resistant composition or has a corrosion-resistant coating.

This invention further contemplates pallet manipulation/handling, assembly and disassembly by automatic machinery comprising; a central pallet assembly/disassembly system, a pallet assembly transport train, and one or more pallet assembly field and/or greenhouse transfer units. A first embodiment of a central pallet assembly/disassembly system further comprises two pallet stacking/destacking units, two containerized plant/pallet assembly/disassembly units (PAU's), a pallet assembly transport train central transfer unit, a pallet/grid washing unit, a pallet/grid accumulation unit, interconnecting pallet conveyors, and two container indexing/spacing conveyor lines, and, optionally, a pallet assembly semi-automatic weeding conveyor line. The central pallet assembly/disassembly system is arranged in a loop, enabling pallet assemblies of a first type to be removed from a pallet assembly transport train, associated plant material removed from said pallets of a first type and loaded into pallets of a second type, and pallet assemblies of the second type returned to same pallet assembly transport train. Additional processes, e.g., automated or semi-automated potting, automated pruning/shaping, and/or automated, semi-automated, or automated weeding, may be incorporated into containerized plant conveyor loop handling plant material between points of plant material removal from said first and installation into said second pallet types. Most system components further operate bi-directionally, giving rise to a plurality of combinations of operating modes best suited to nursery seasonal production needs.

Such a system comprises servo-driven components with programmable motion and logic controls—including sensors and transducers for detecting and measuring, machine component and product positions—to achieve a high degree of flexibility. Variations in processed product combinations are accommodated by stored recipes of machine motion sequences, which, preferably are selected automatically by a central, enterprise-wide, inventory control/master scheduling computer/software system. Such a master control system directs the assembly/disassembly system and all other autonomous field machinery through radio digital command/feedback links. Real-time kinematic global positioning system (RTK GPS) technology, which provides positioning accuracy to one centimeter horizontally and 2 centimeters vertically through radio signals from satellites and a base station, provides primary machine position and attitude measurements required by autonomous machinery operating in the field. For autonomous machine operation in areas not having requisite GPS satellite line-of-sight, e.g. in covered central pallet assembly/disassembly area, conventional buried magnet or wire, or laser beacon techniques fill in gaps in GPS position information. Integrated physical limit-, infrared-, radar-, and/or ultrasonic-based sensors provide for personnel detection around said autonomous machines for safe machine operation.

List of Acronyms

CAIDOC—containerized plant assembly input/disassembly output conveyor (part of PAU)
CGAA—container gripping adapter assembly (part of PAU
CGU—container gripping unit (part of PAU)
CLAA—container lifting adapter assembly (part of PAU
CLU—container lifting unit (part of PAU)
CPC—containerized plant conveyor
CPSC—containerized plant spacing conveyor
CSC—containerized plant spacing conveyor
FMSRT—feature mapping system, remote, trailer-mounted
FMUH—feature mapping unit, hand-held
GPS—global positioning system
HMI—human-machine interface
PA—pallet assembly
PC—pallet (/grid/pallet assembly/pallet stack/grid stack) conveyor
PACTU—pallet assembly central transfer unit
PAFTU—pallet assembly field transfer unit
PAGTU—pallet assembly greenhouse transfer unit
PAIDOC—pallet assembly input/disassembly output conveyor (part of PAU)
PAODIC—pallet assembly output/disassembly input conveyor (part of PAU)
PAS—pallet assembly/disassembly system
PATT—pallet assembly transport train
PAU—pallet assembly/disassembly unit
PE—pallet stack elevator (part of PGSA)
PGRU—pallet & grid rotating unit
PGSA—pallet & grid stack accumulator
PGSC—pallet & grid stack conveyor
PGSU—pallet & grid stacking/unstacking unit
PGWU—pallet & grid washing unit
PET—polyethylene terephthalate
PXC—pallet crossover conveyor
RTK GPS—real-time kinematic global positioning system
SCADA—supervisory control and data acquisition

DESCRIPTION OF THE DRAWINGS

Referring to the drawings which form part of this disclosure:

FIG. 3B is a perspective exploded view of a split elevation section of one-quarter of one receptacle of a pallet assembly in accordance with a first embodiment of the invention, said split section occurring at two perpendicular vertical planes intersecting one another along vertical centerline of the pallet assembly receptacle.

MACHINERY

PAS

Figure 49:
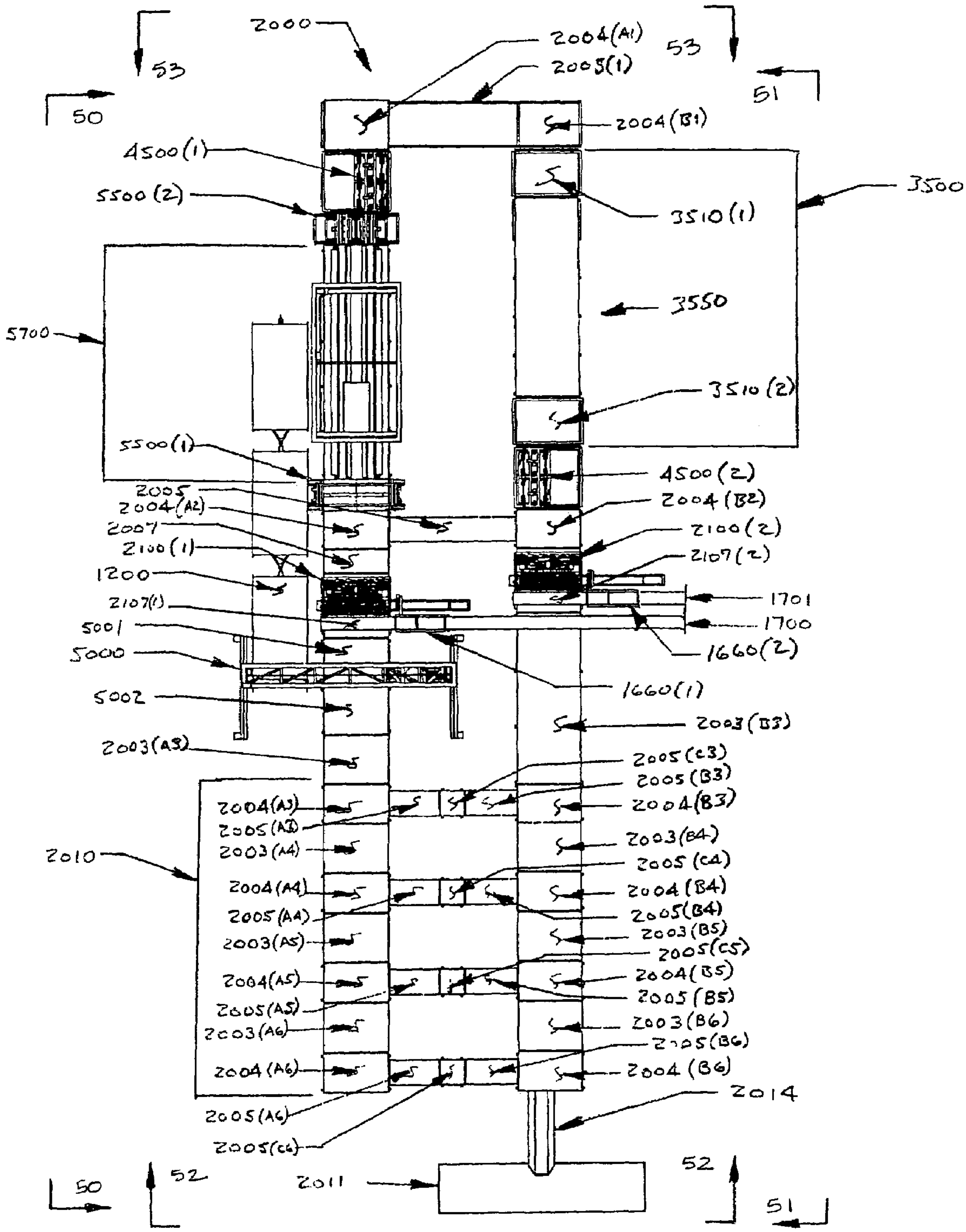

FIG. 49 is a plan view of a first embodiment of a pallet assembly/disassembly system with an autonomously guided a pallet assembly transport train.

Figure 50:
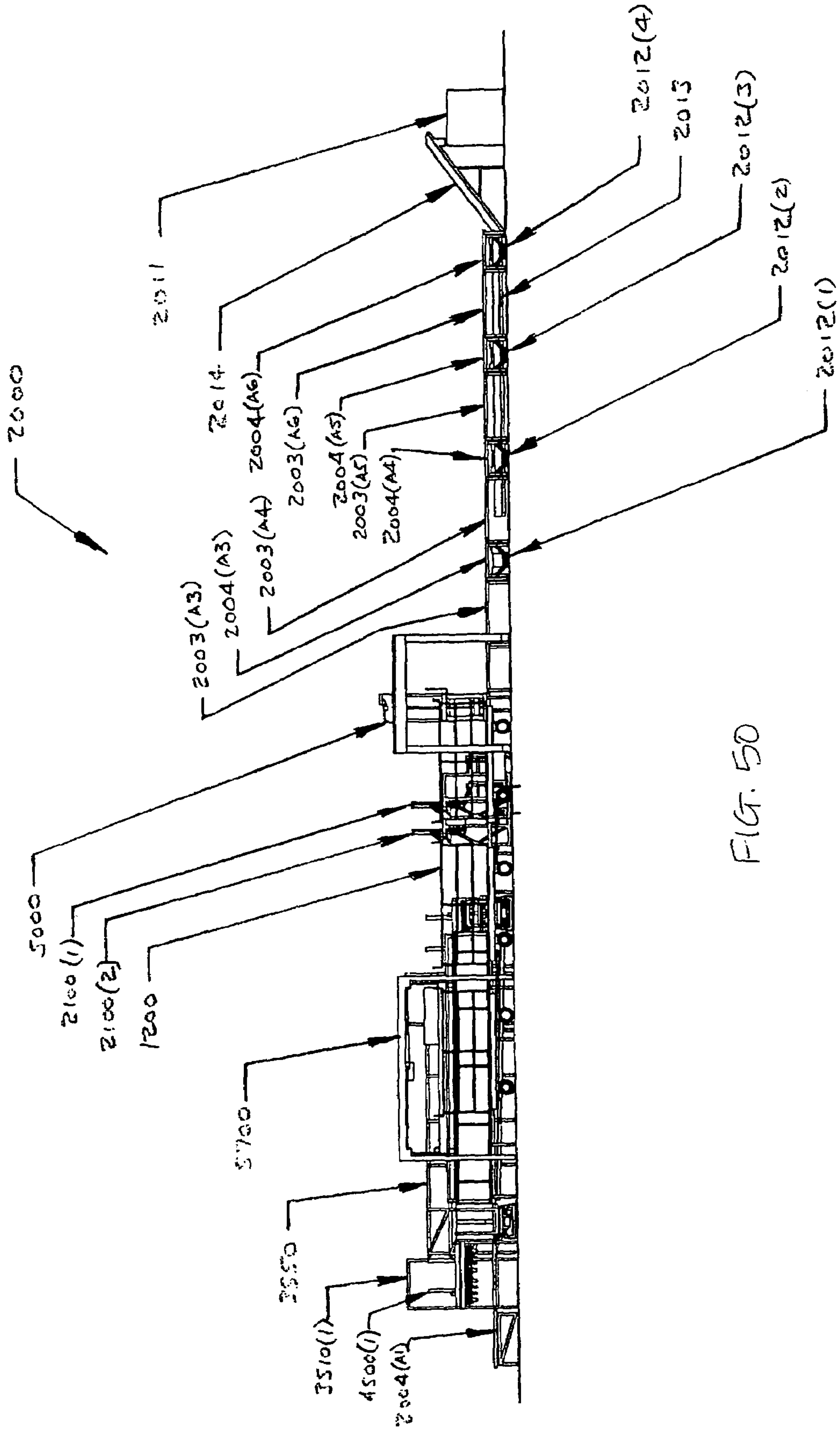

FIG. 50 is a first side elevation view of the system of FIG. 49, looking in direction 50-50 of FIG. 49.

Figure 51:
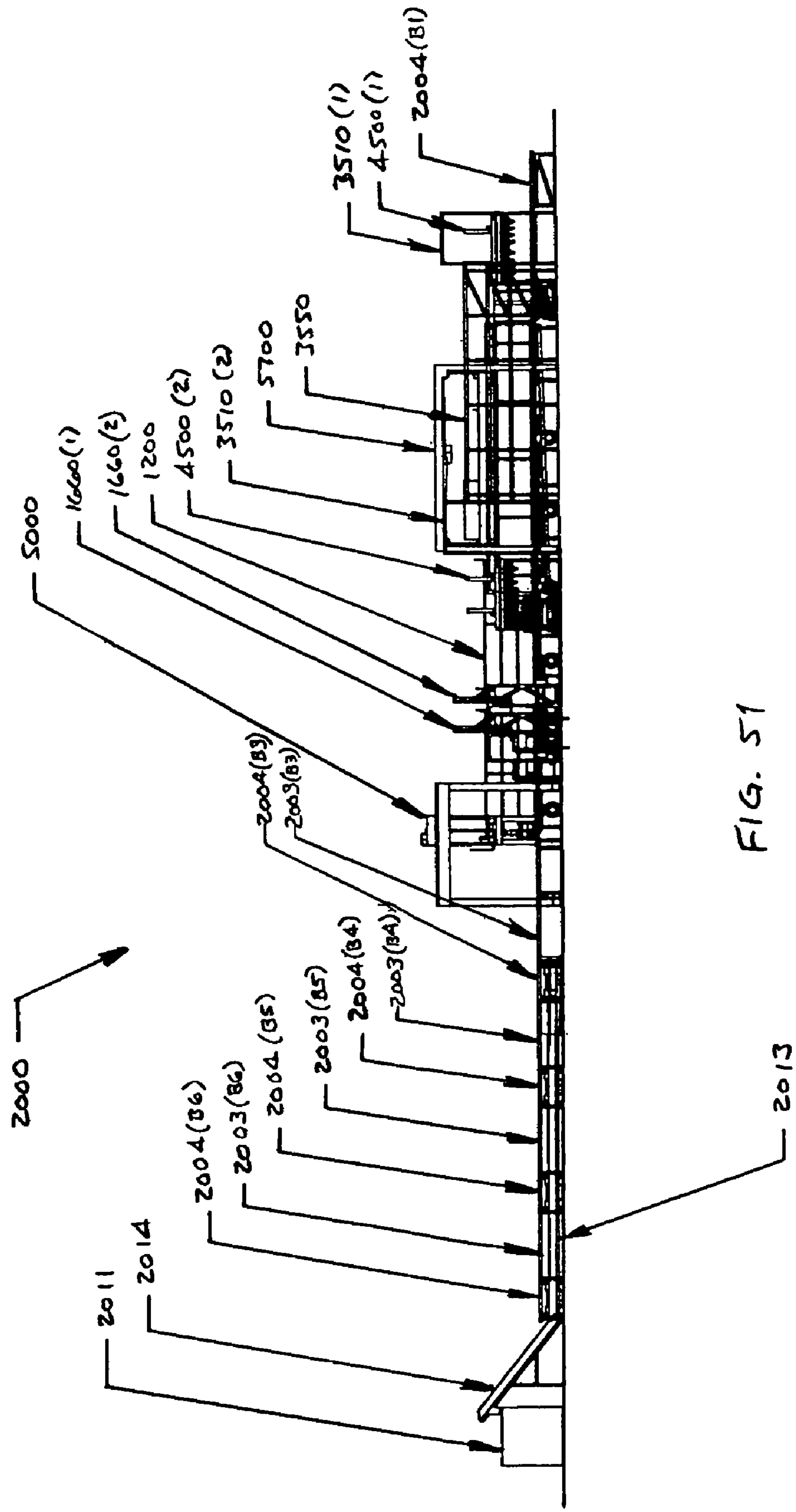

FIG. 51 is a second side elevation view of the system of FIG. 49, looking in direction 51-51 of FIG. 49.

Figure 52:
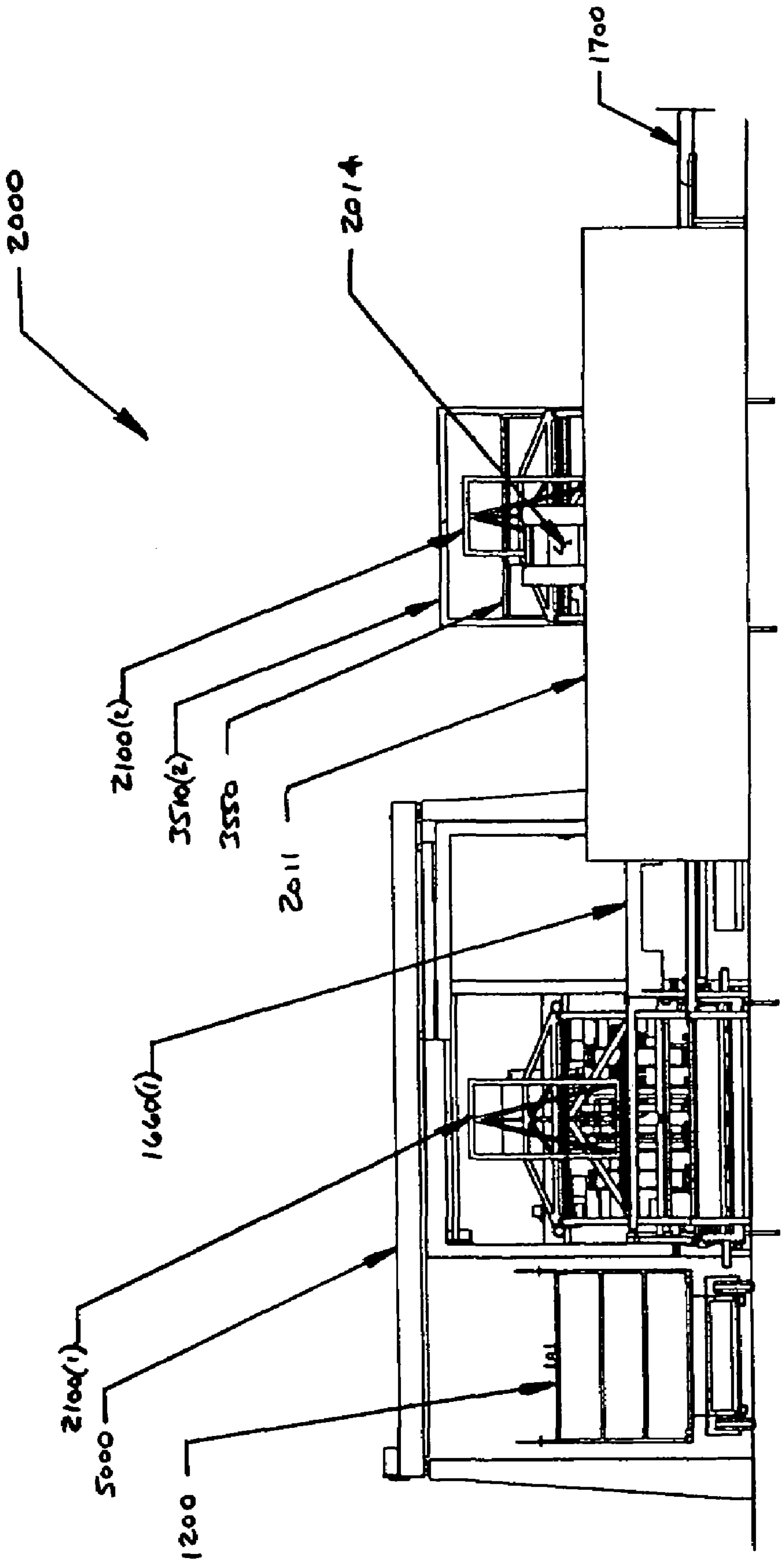

FIG. 52 is a third side elevation view of the system of FIG. 49, looking in direction 52-52 of FIG. 49.

Figure 53:
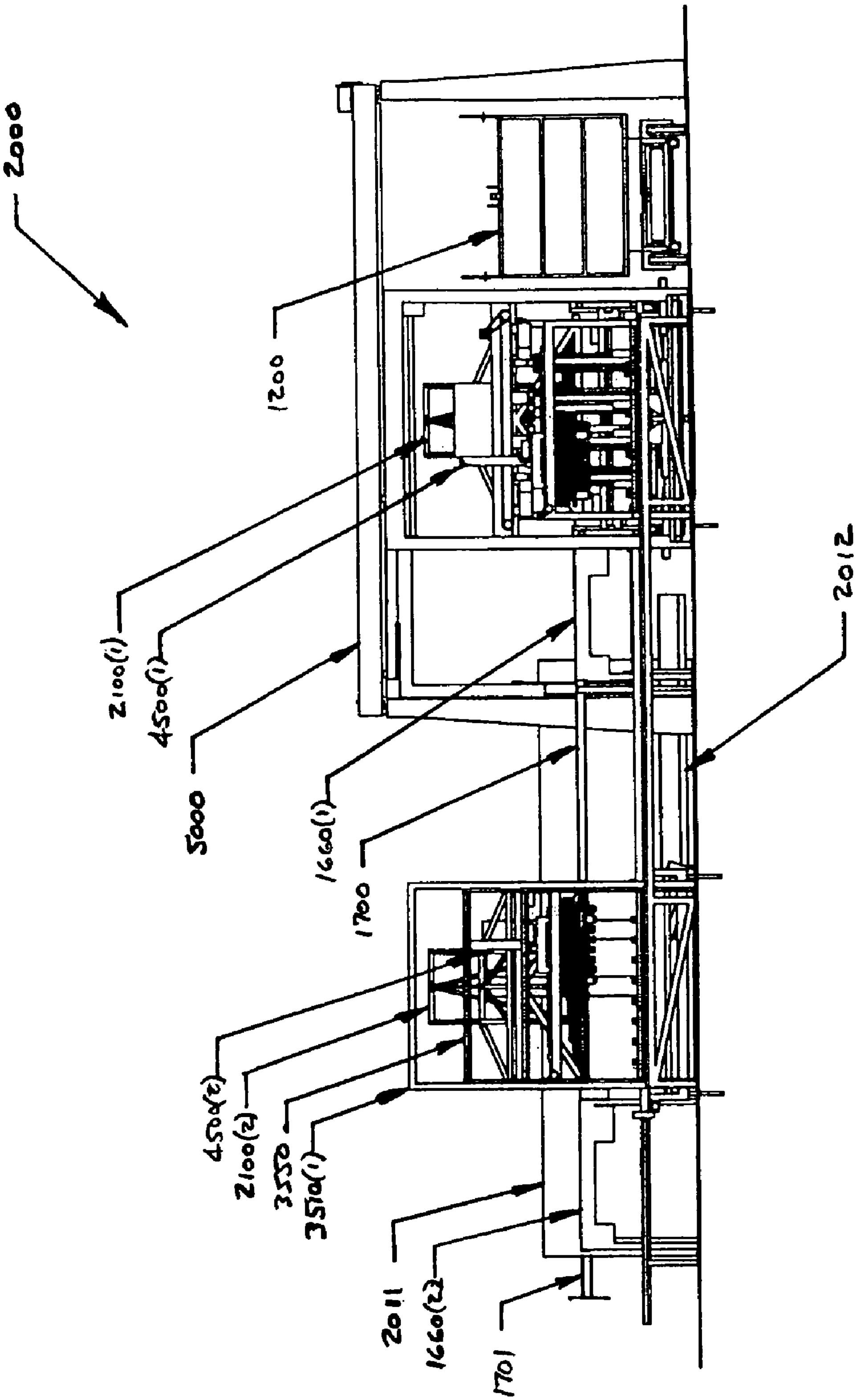

FIG. 53 is a fourth side elevation view of the system of FIG. 49, looking in direction 53-53 of FIG. 49.

Figure 54:
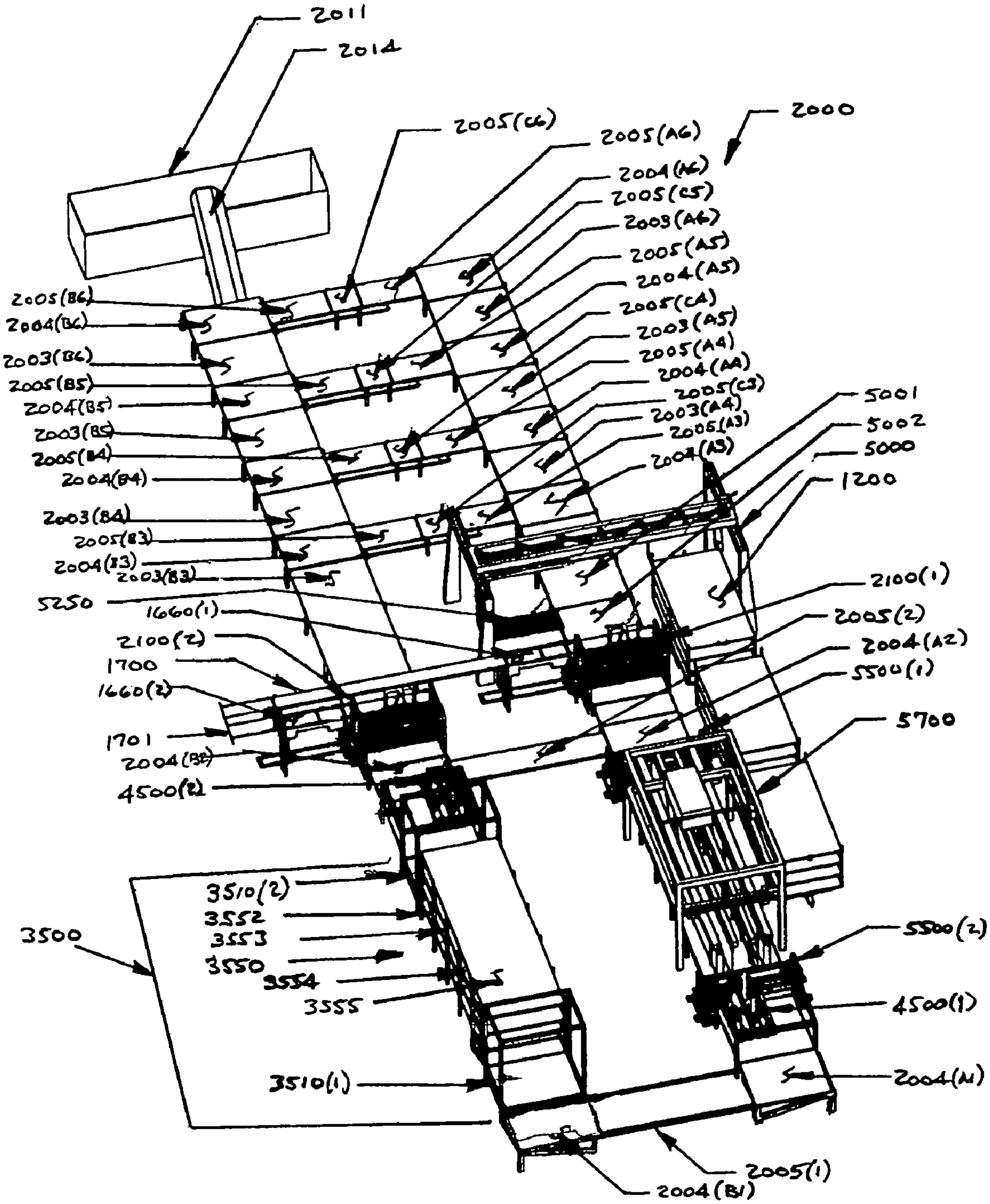

FIG. 54 is a perspective overhead view of the system of FIG. 49.

PATT

Figure 55:
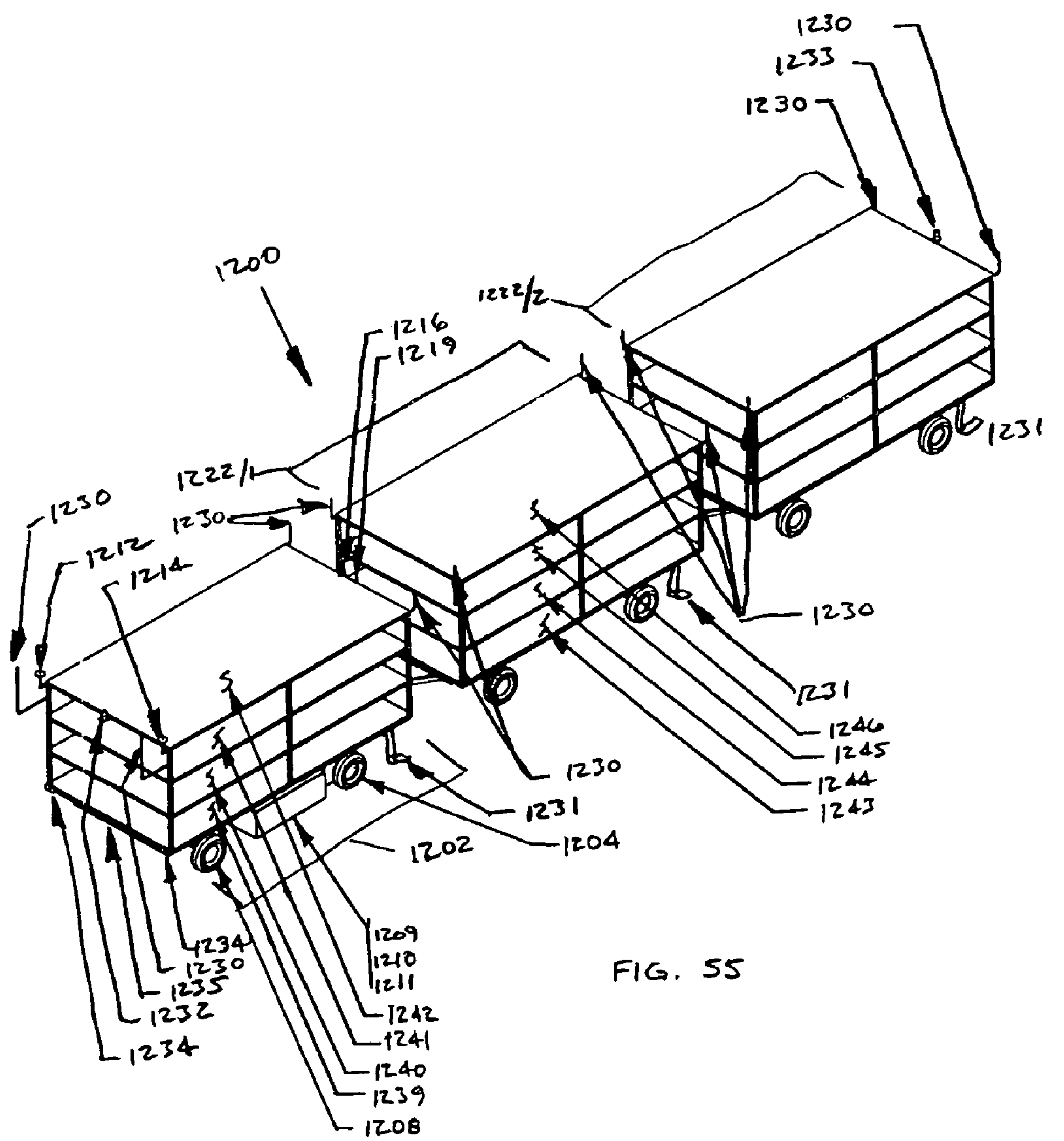

FIG. 55 is a perspective view of an autonomously-guided pallet assembly transport train of a first embodiment, comprising a multi-deck drive unit and two multi-deck trailers.

Figure 56:
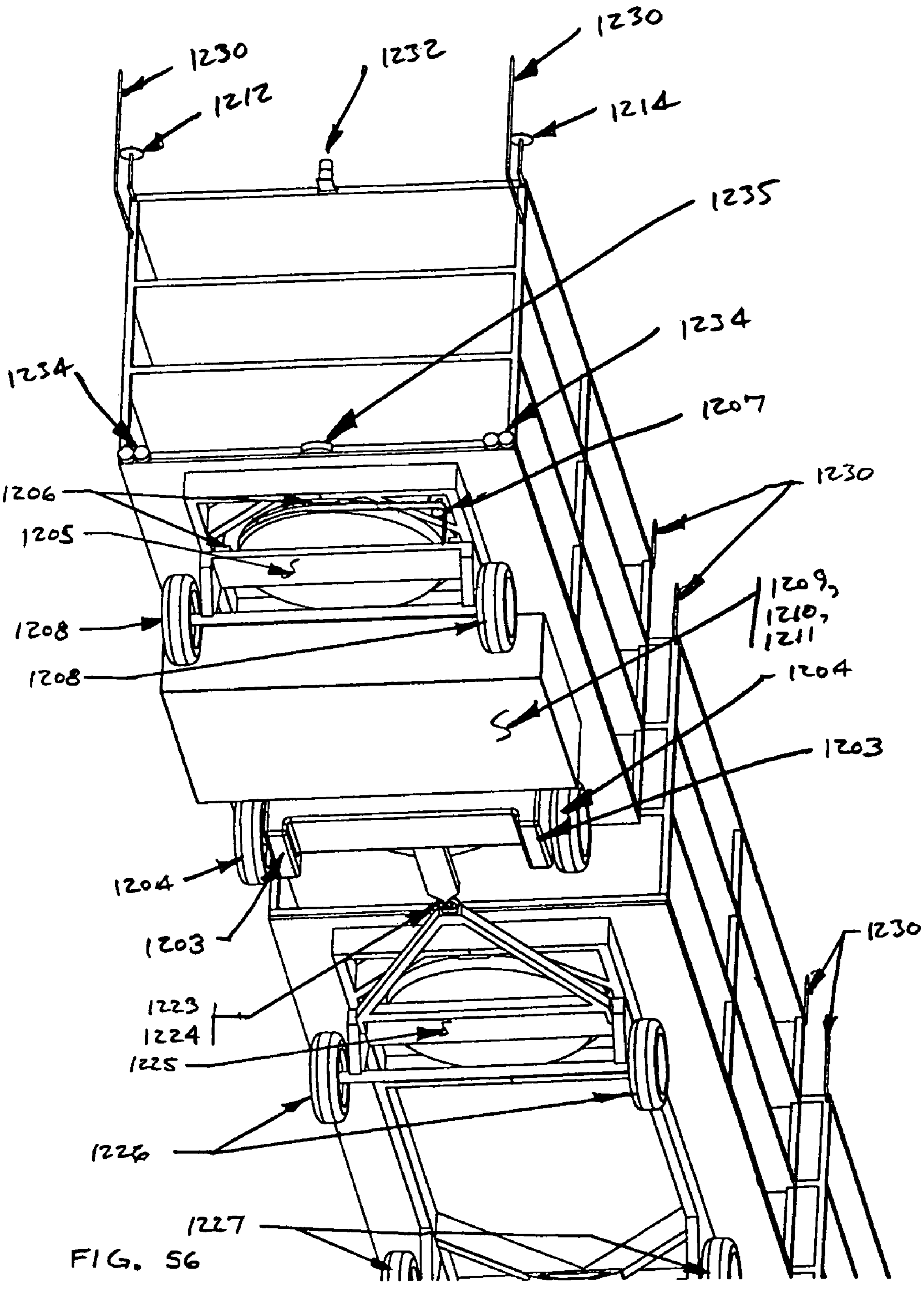

FIG. 56 is a perspective view of the underside of the pallet assembly transport train of FIG. 55.

PACTU

Figure 57:
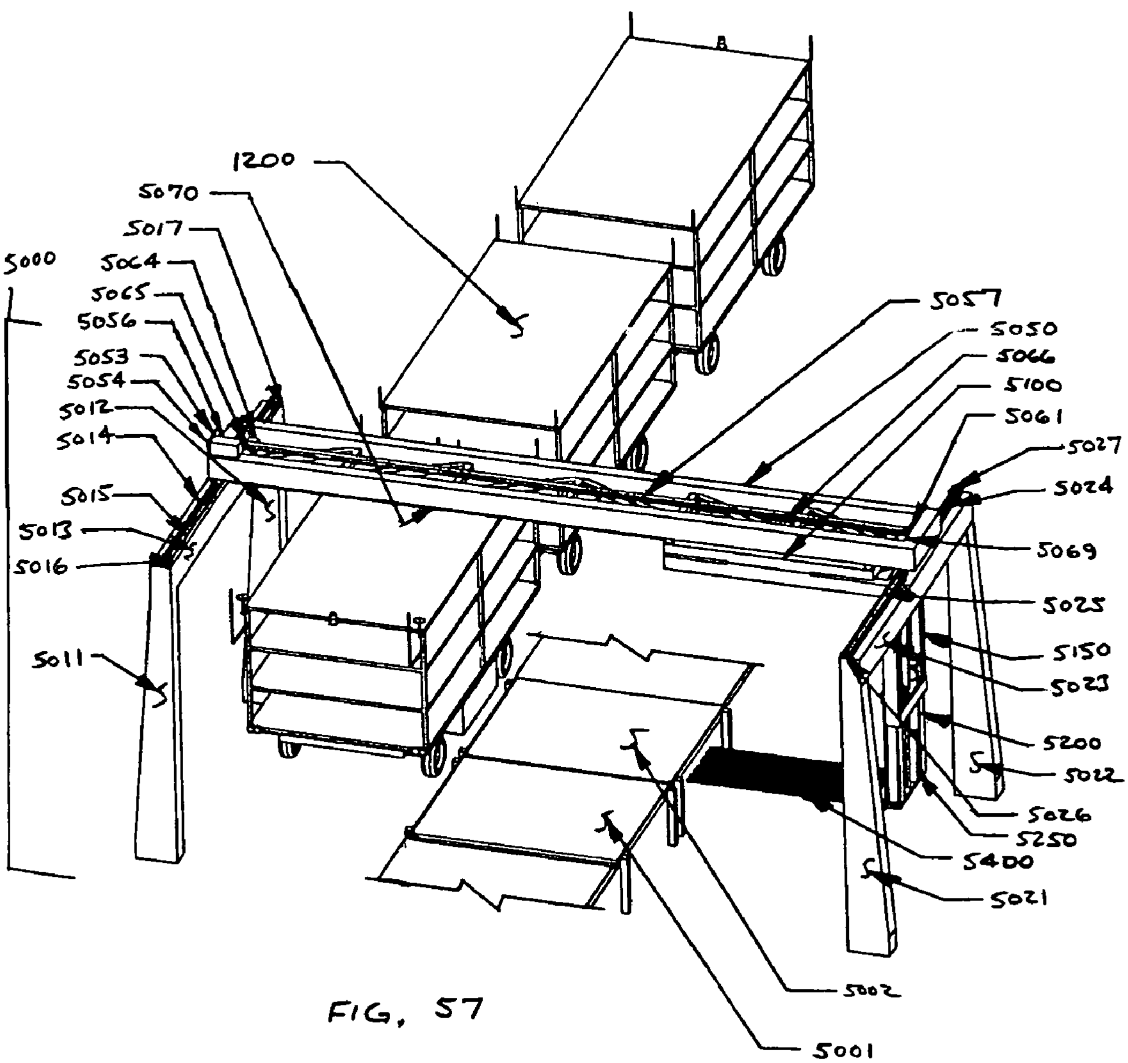

FIG. 57 is an overhead perspective view of a pallet assembly central transfer unit forming part of the pallet assembly/disassembly system of FIG. 49, configured to transfer pallet assemblies between pallet assembly transport train and an adjoining system conveyor.

Figure 58A:
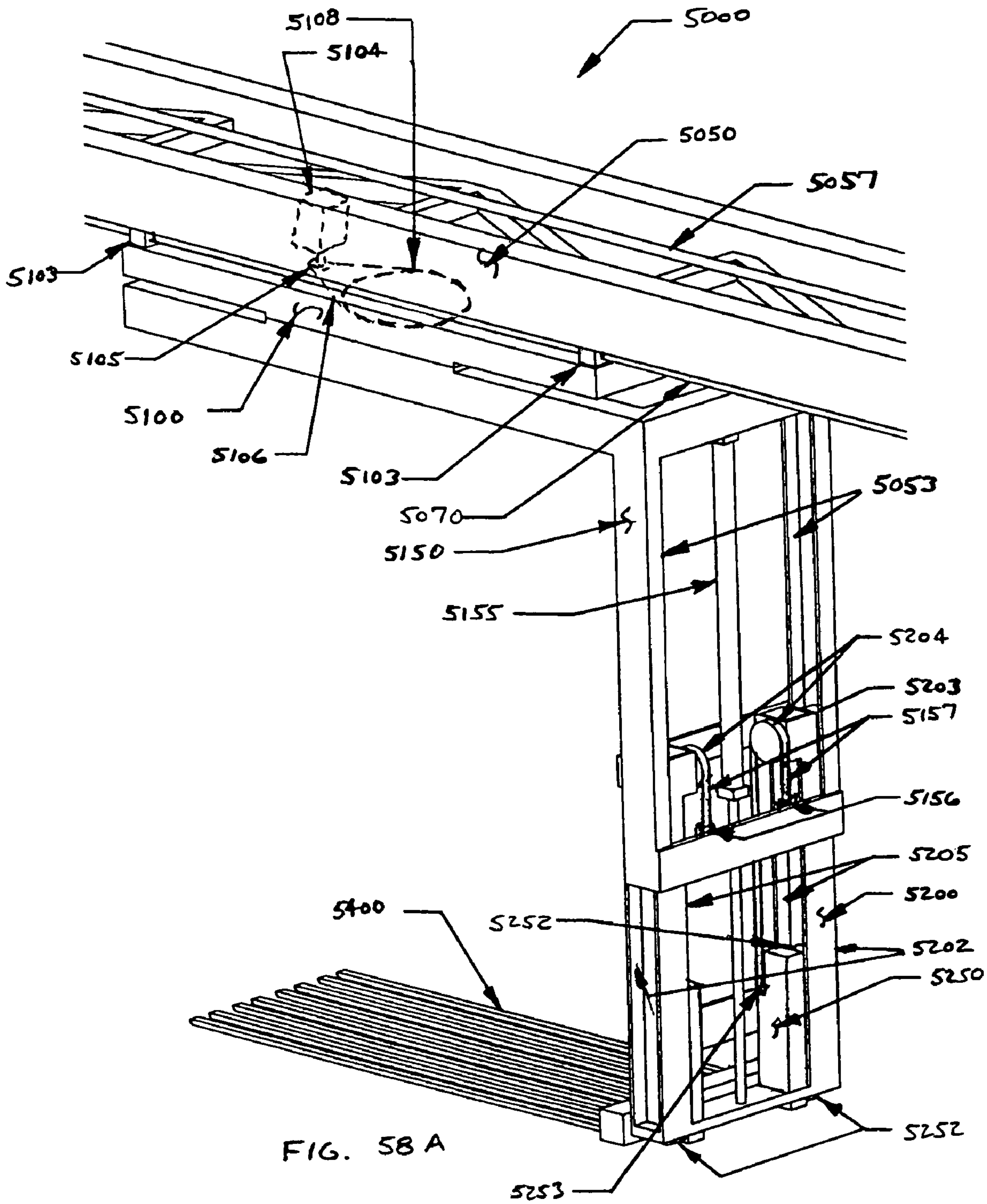

FIG. 58A is a close-up overhead perspective view of the fork and fork elevator portion of a pallet assembly central transfer unit forming part of the pallet assembly/disassembly system of FIG. 49.

Figure 58B:
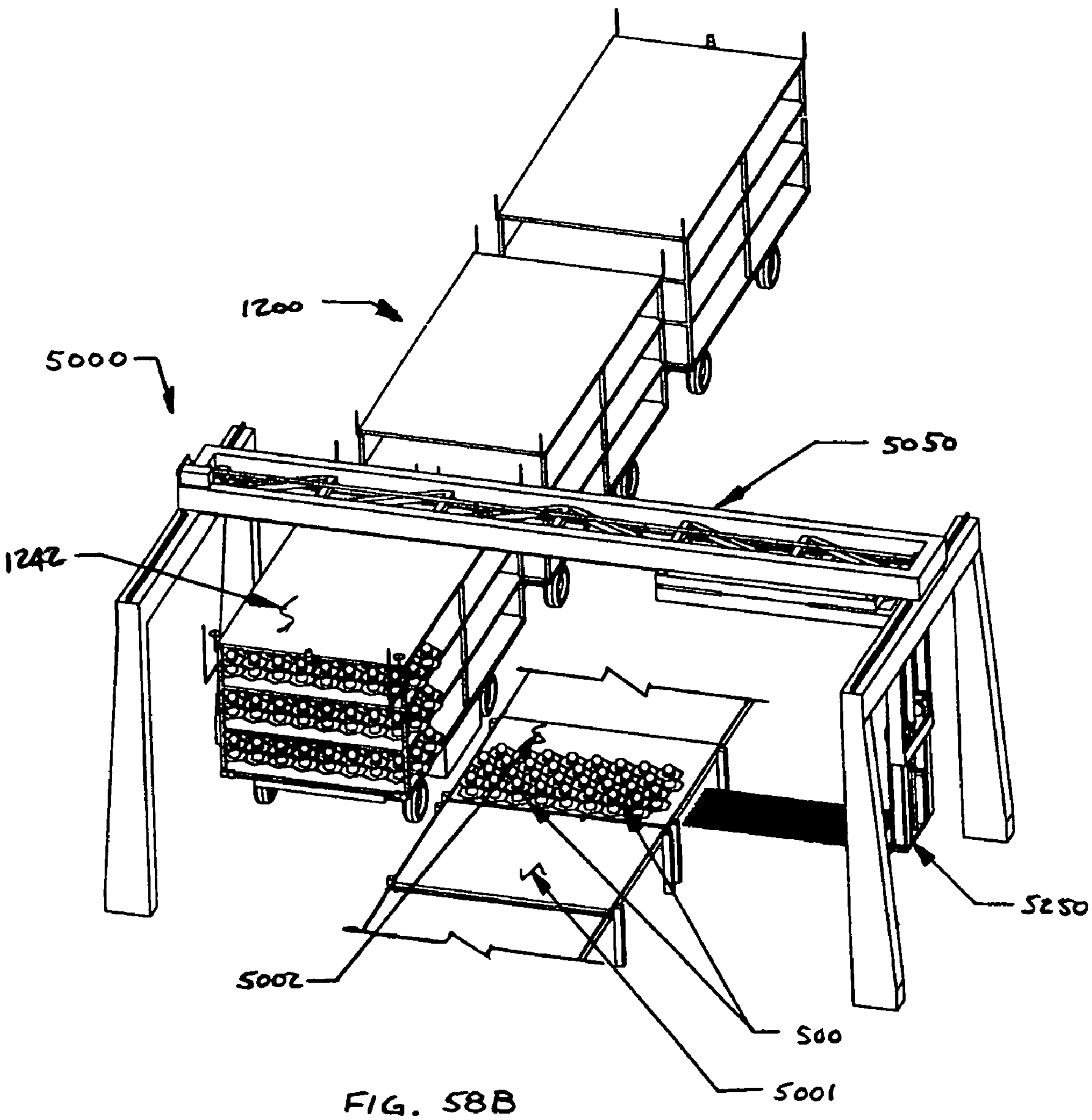

FIG. 58B is an overhead perspective view of a pallet assembly central transfer unit forming part of the pallet assembly/disassembly system of FIG. 49, preparing to transfer pallet assemblies to pallet assembly transport train from an adjoining system conveyor.

Figure 58C:
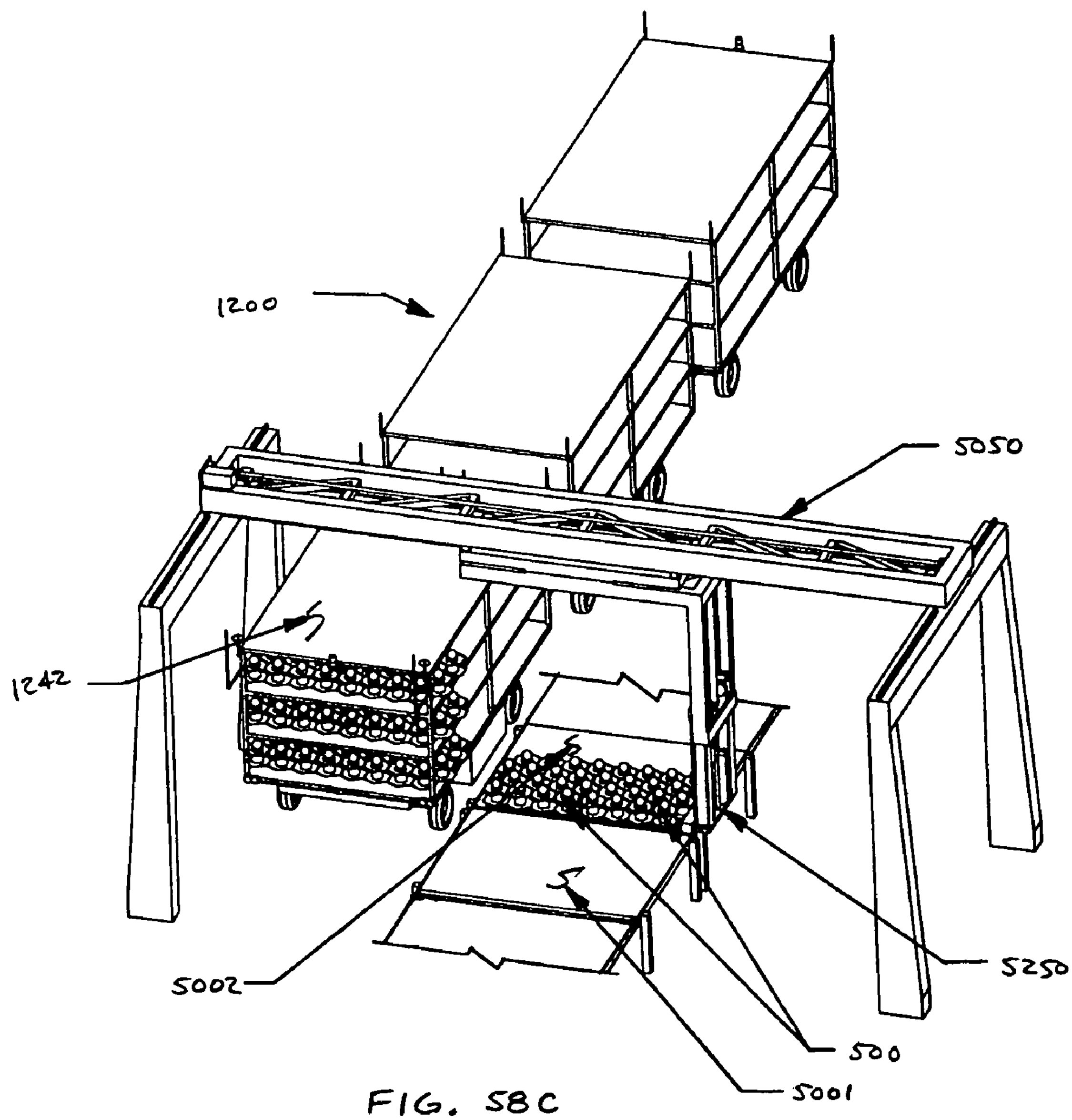

FIG. 58C is an overhead perspective view of a pallet assembly central transfer unit forming part of the pallet assembly/disassembly system of FIG. 49, engaging a pair of pallet assemblies in process of transferring such pallet assemblies to pallet assembly transport train from an adjoining system conveyor.

Figure 58D:
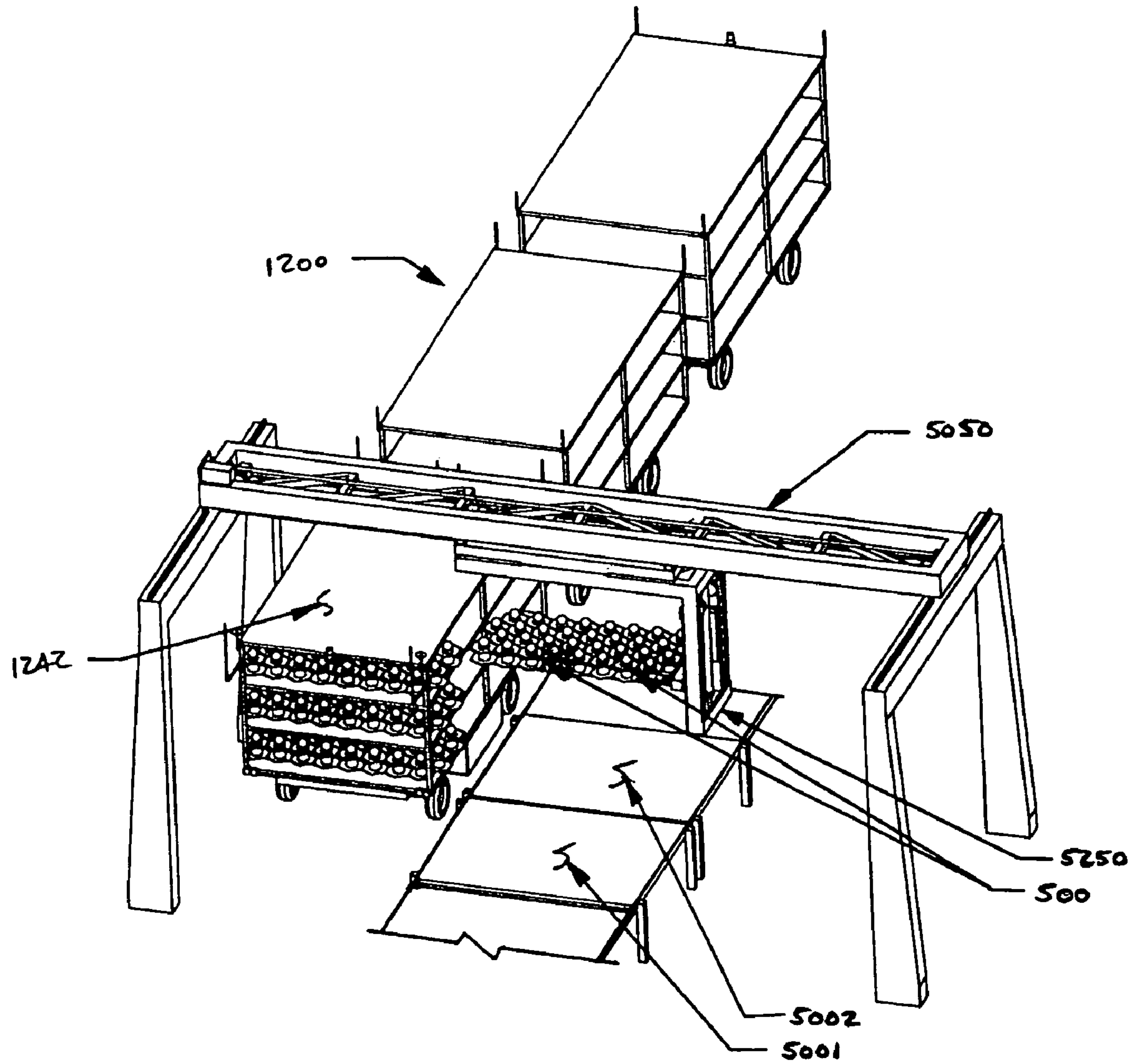

FIG. 58D is an overhead perspective view of a pallet assembly central transfer unit forming part of the pallet assembly/disassembly system of FIG. 49, having lifted a pair of pallet assemblies to elevation of uppermost deck of pallet assembly transport train in process of transferring such pallet assemblies to pallet assembly transport train from an adjoining system conveyor.

Figure 58E:
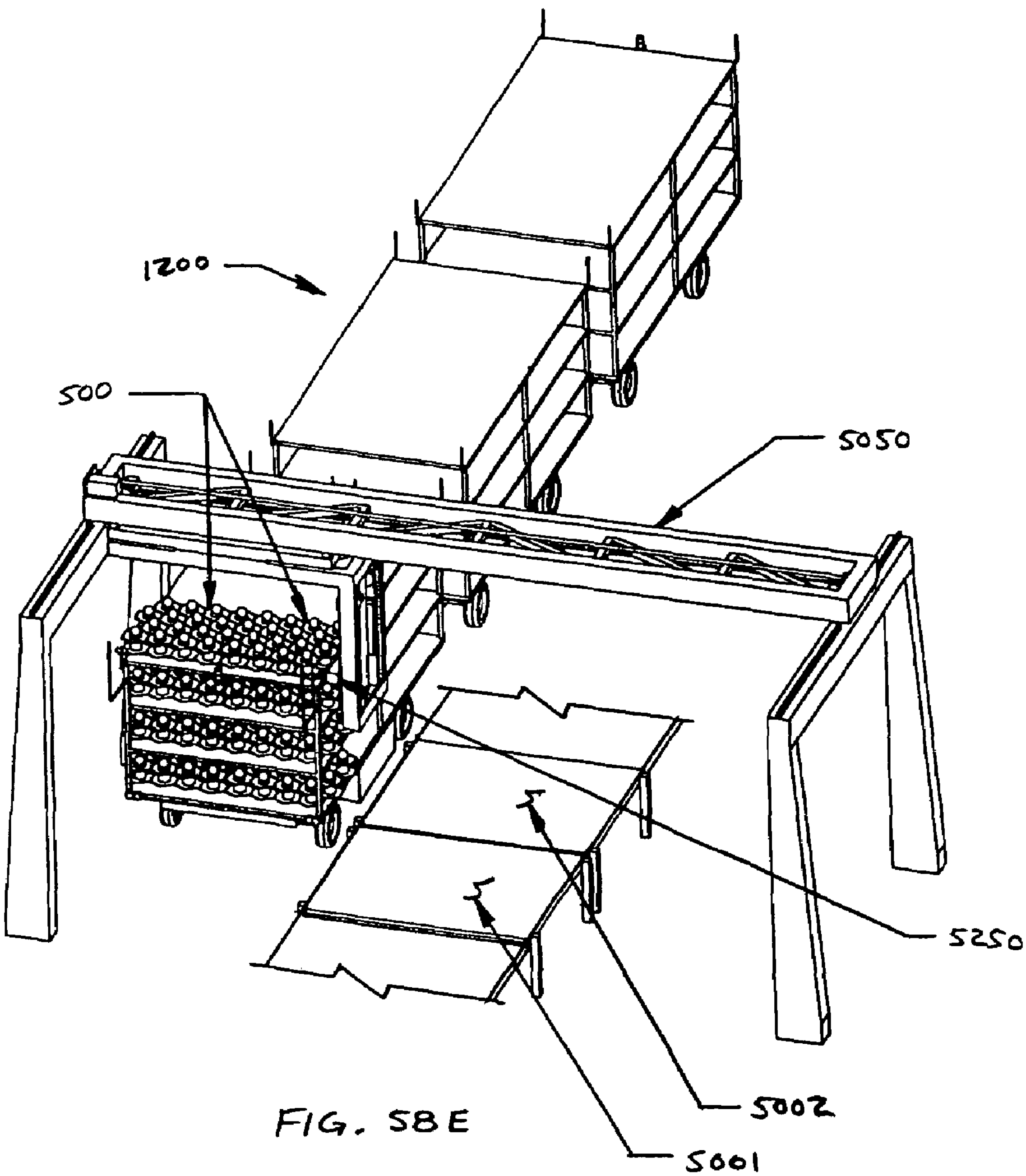

FIG. 58E is an overhead perspective view of a pallet assembly central transfer unit forming part of the pallet assembly/disassembly system of FIG. 49, placing a pair of pallet assemblies onto uppermost deck of pallet assembly transport train in process of transferring such pallet assemblies to pallet assembly transport train from an adjoining system conveyor.

Figure 58F:
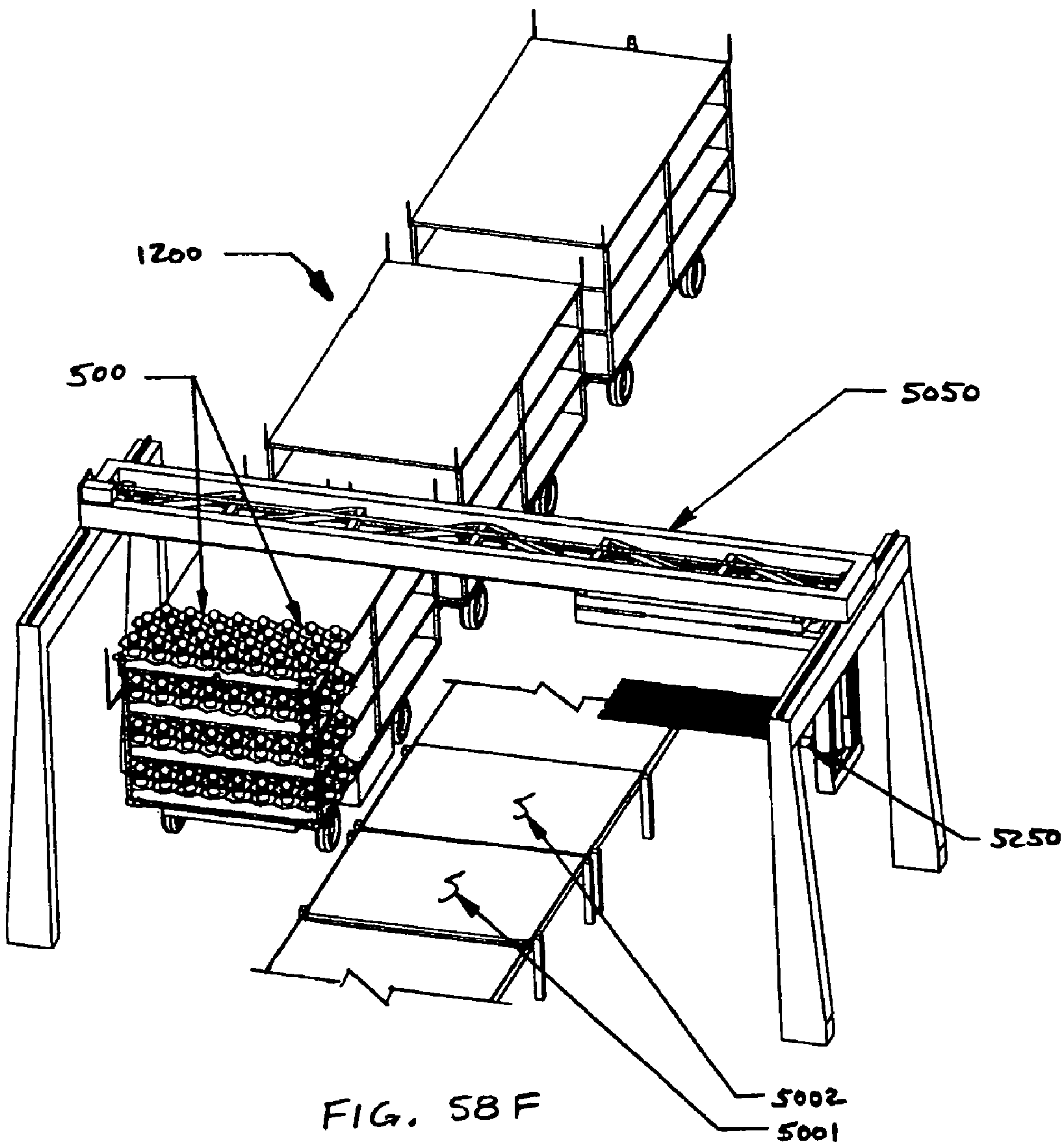

FIG. 58F is an overhead perspective view of a pallet assembly central transfer unit forming part of the pallet assembly/disassembly system of FIG. 49, having retracted from having placed a pair of pallet assemblies onto uppermost deck of pallet assembly transport train, preparing to return to the position represented in FIG. 57, in process of transferring such pallet assemblies to pallet assembly transport train from an adjoining system conveyor.

PAU

Figure 59:
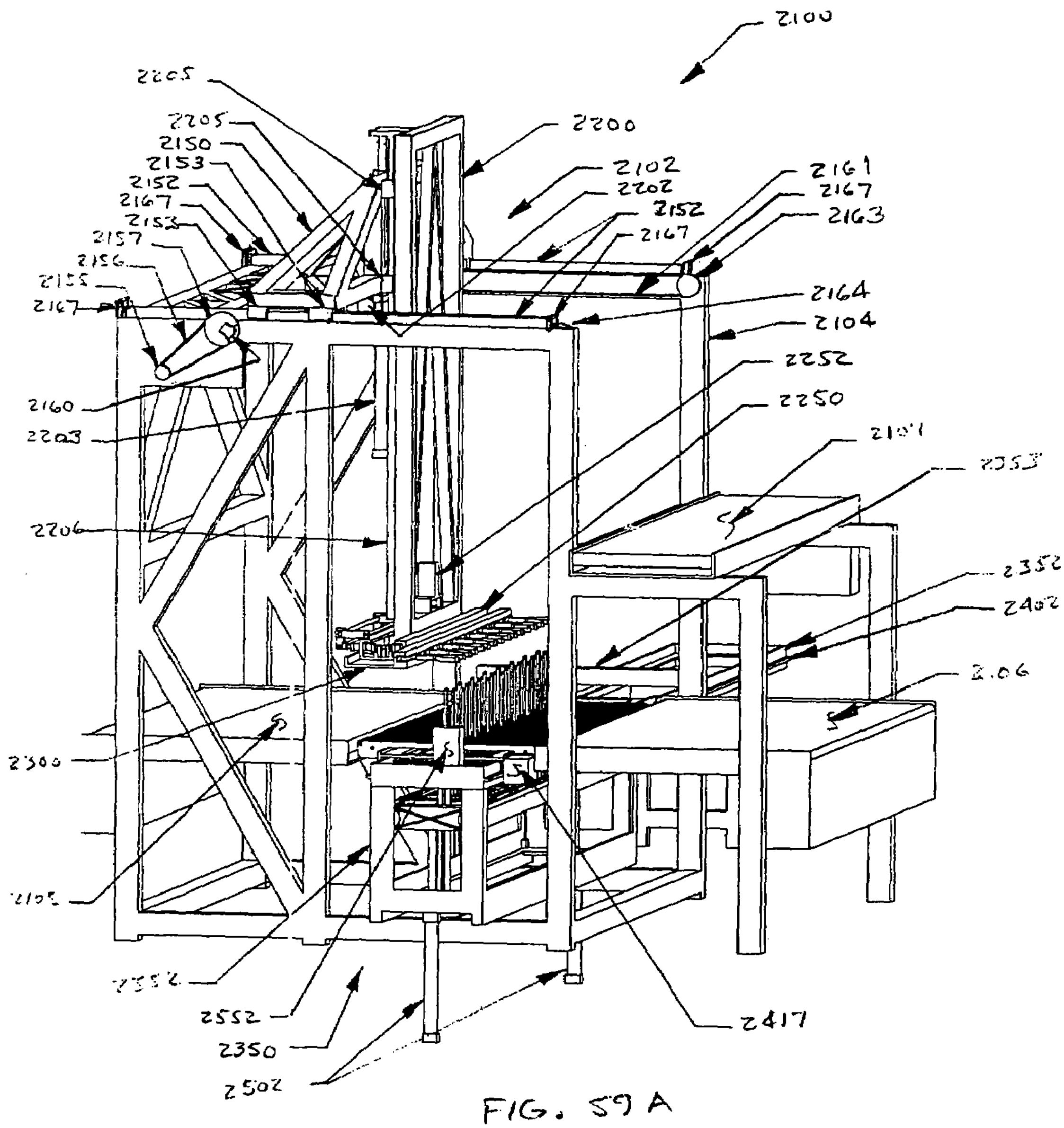

FIG. 59A is a first perspective side view of a pallet assembly/disassembly unit (PAU) and integral conveyors forming part of the pallet assembly/disassembly system of FIG. 49.

Figure 59B:
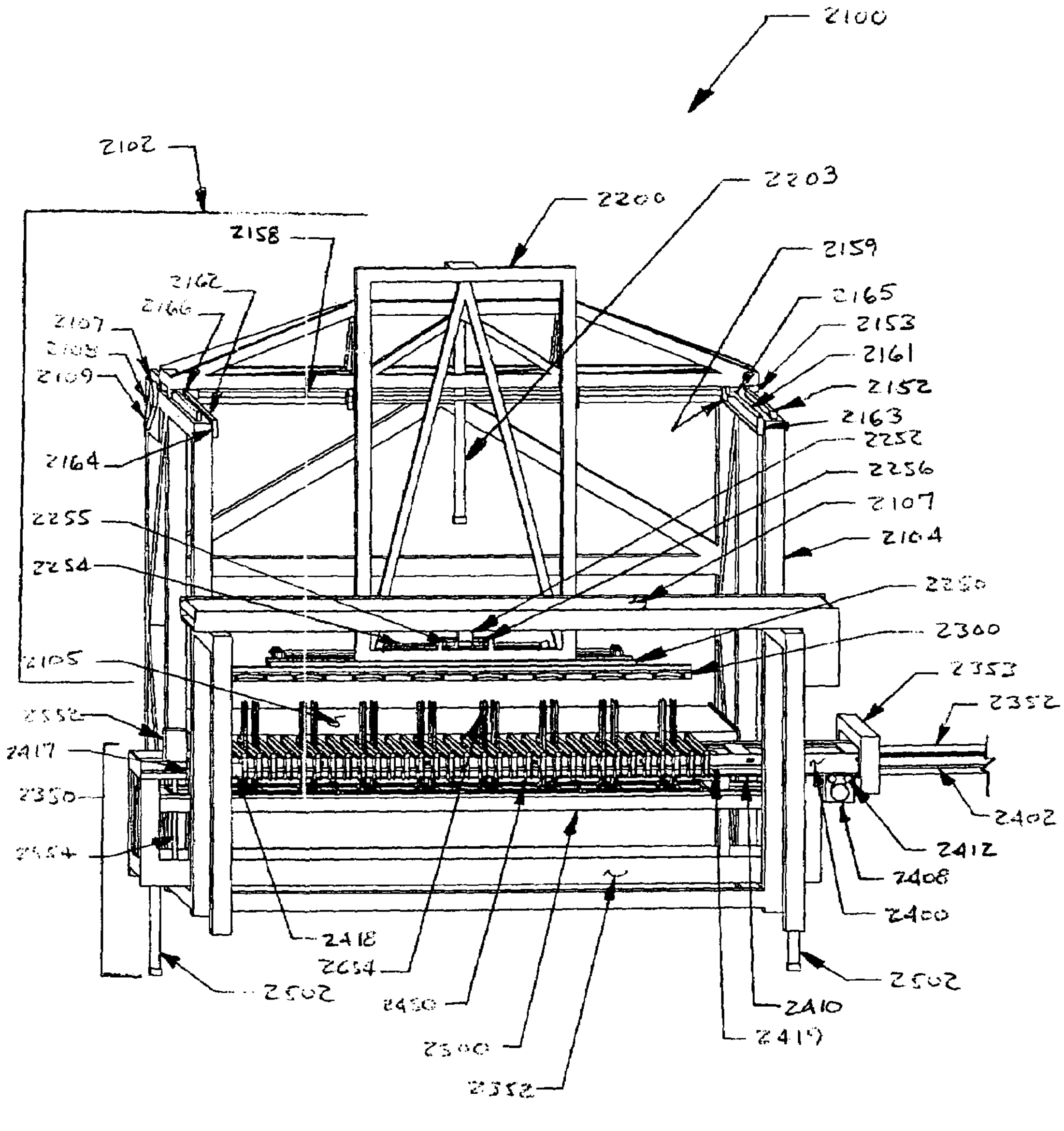

FIG. 59B is a perspective frontal view of the PAU of FIG. 59A, with the pallet assembly outfeed/pallet disassembly infeed conveyor removed, providing an improved view of the container lifting unit.

Figure 59C:
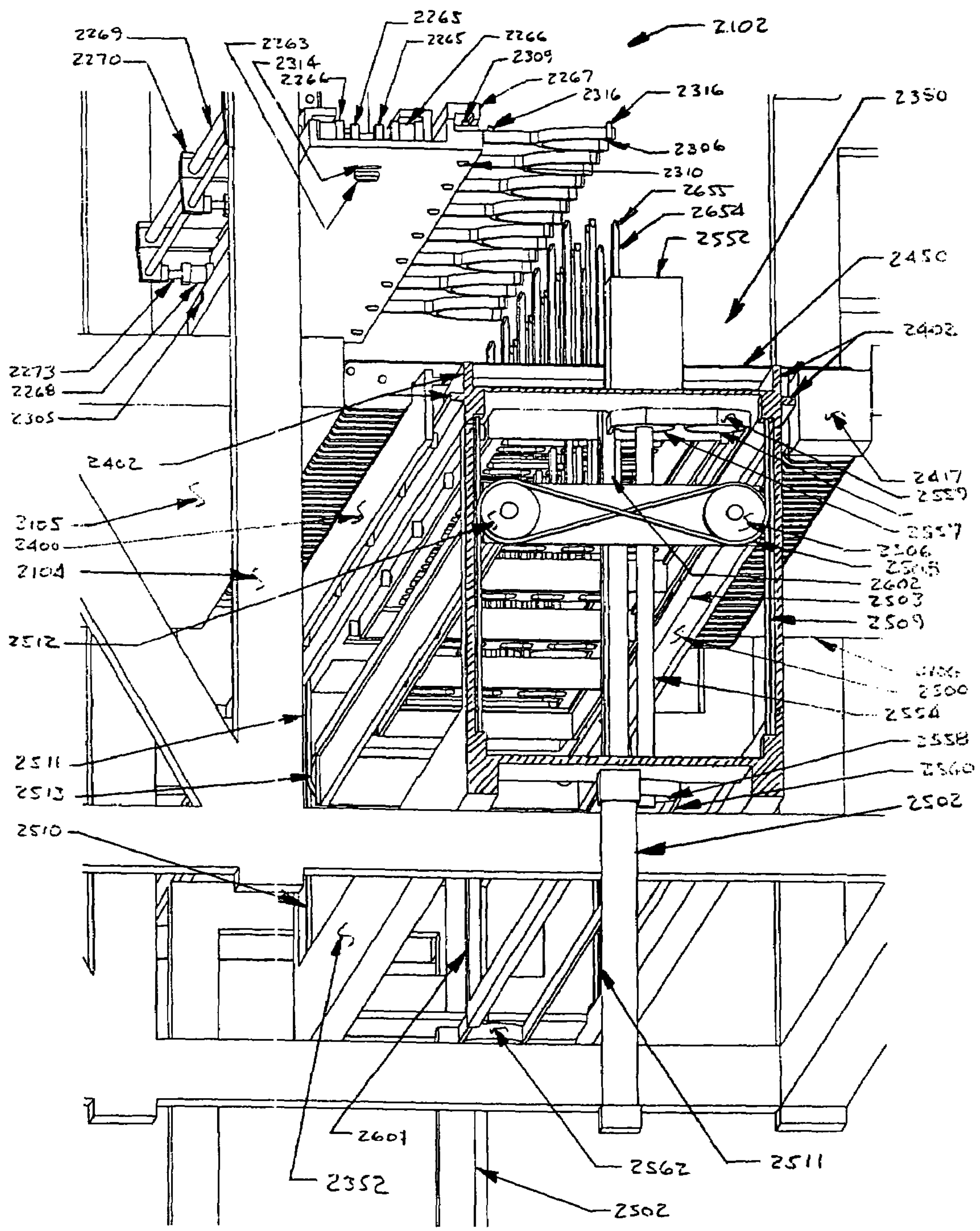
Figure 59:
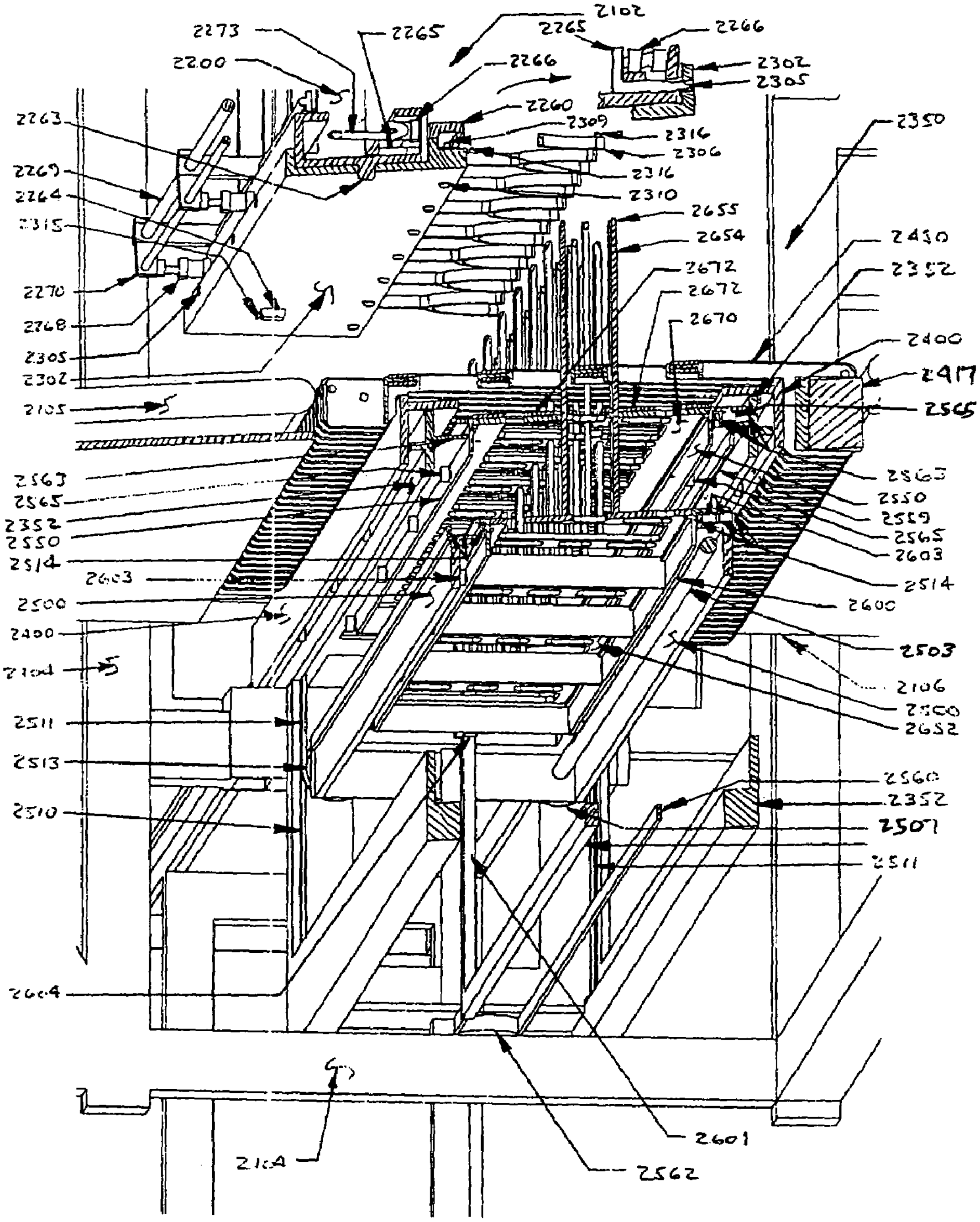
Figure 59:
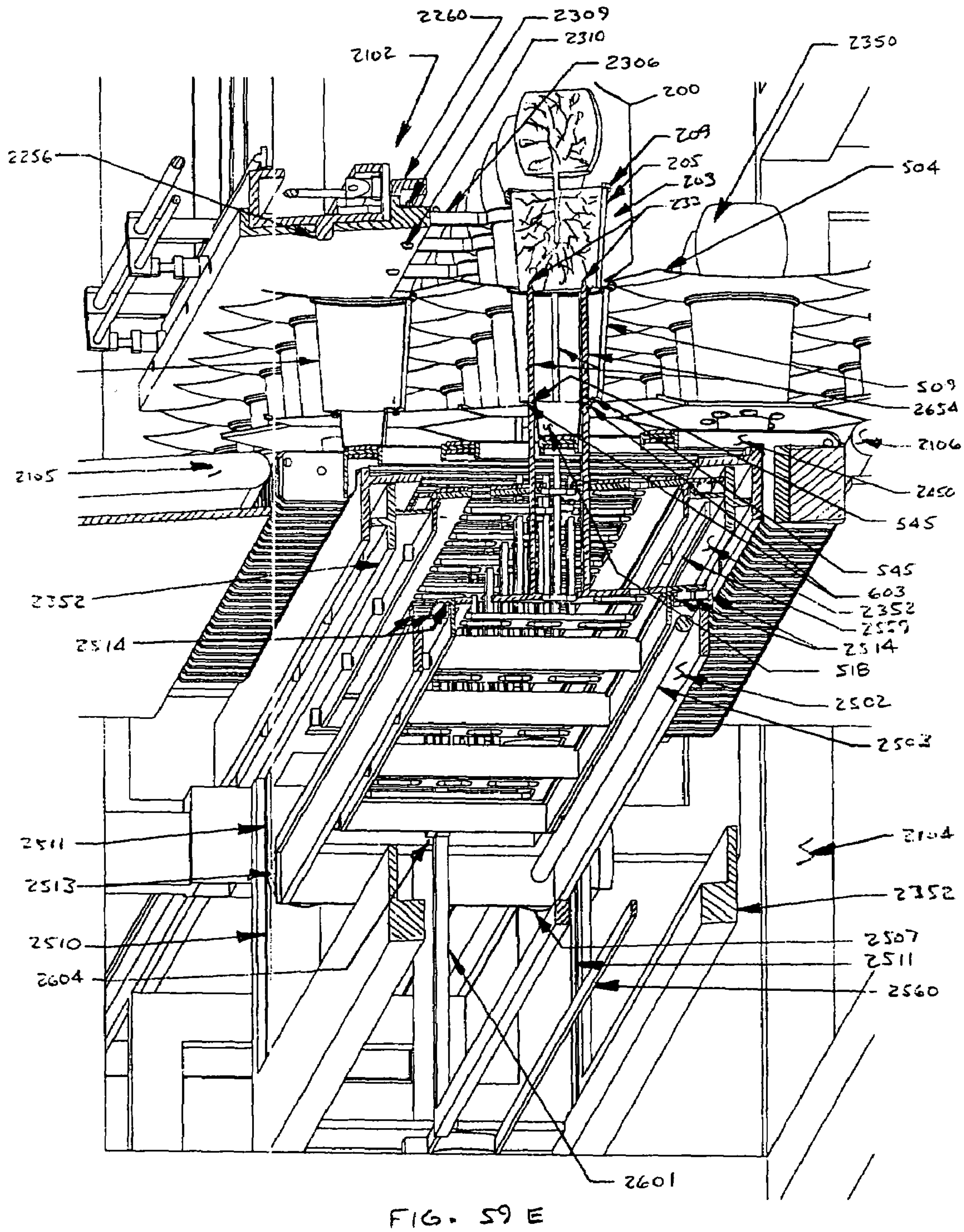
Figure 57F:
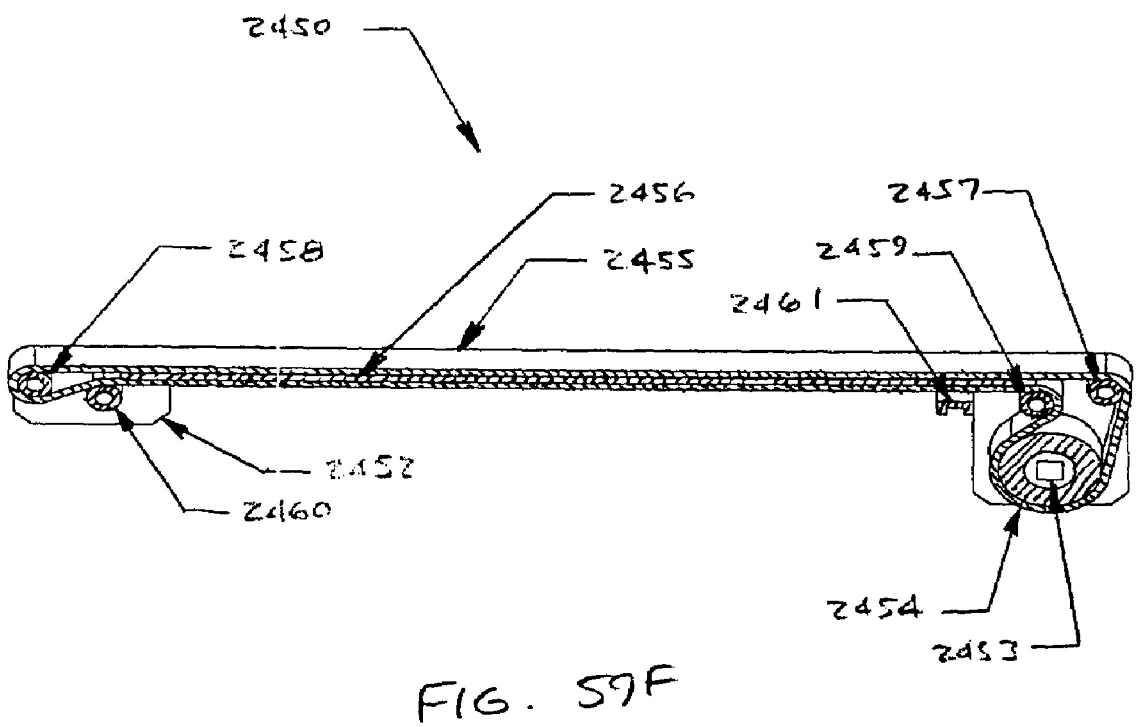

FIG. 59C is a second perspective side view of a vertical section of the PAU of FIG. 59A, looking upward, wherein section is taken immediately inboard of the end of the container lifting unit portion of the PAU.

FIG. 59D is a side upward-looking perspective view of a vertical section of the container lifting unit portion of the PAU of FIG. 59A, wherein section is 60 degrees from associated pallet conveyor flow directions.

FIG. 59E is the same as FIG. 59D, except also showing PAU interaction with a pallet and containerized plants.

FIG. 59F is a downward-looking perspective view of a vertical section of one of a plurality of conveyor segments forming container lifting unit conveyor portion of PAU of FIG. 59A, wherein section is tangent to pallet conveyor flow directions.

Figure 59G:
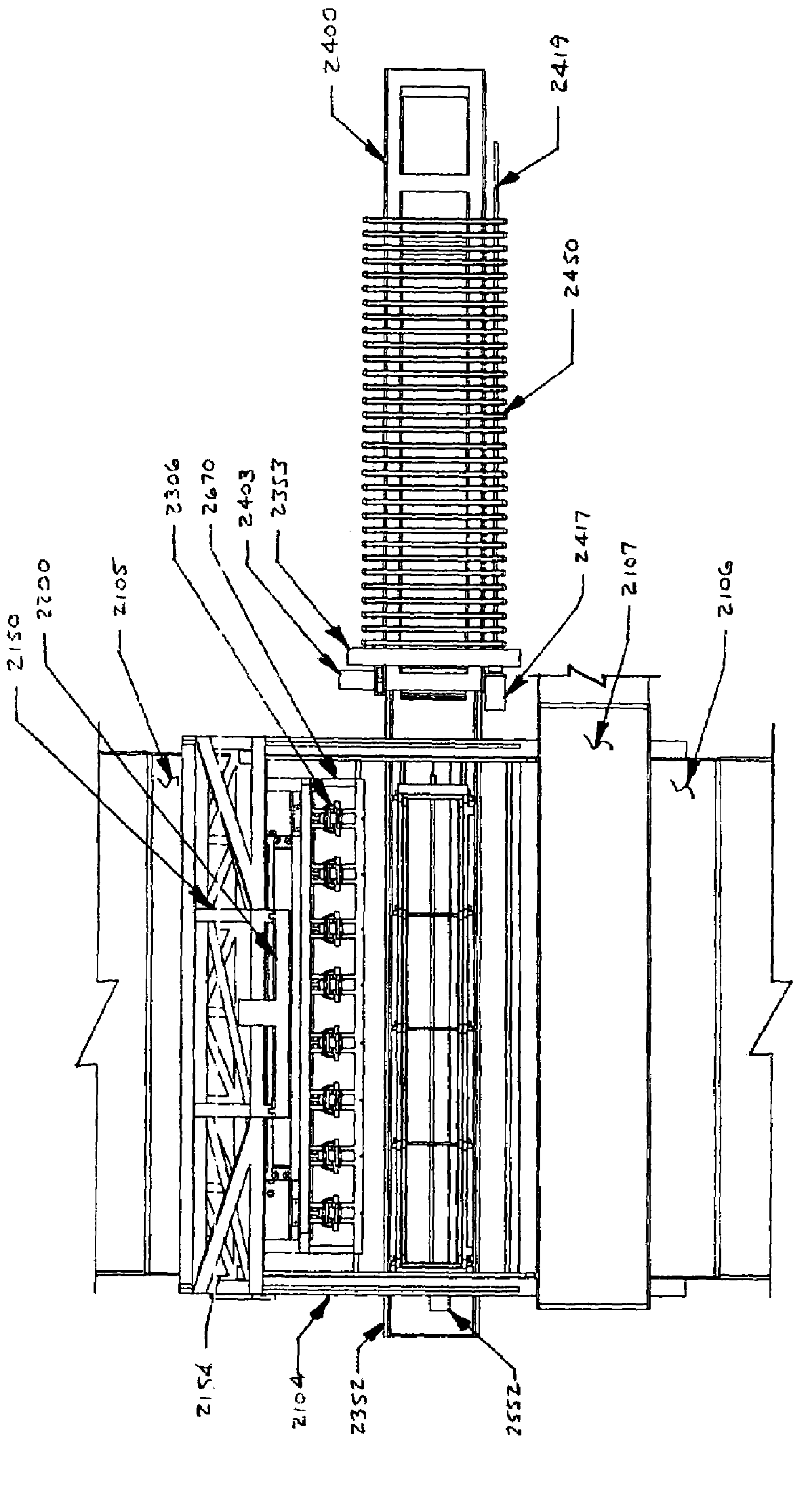

FIG. 59G is a plan view of PAU of FIG. 59A, with container lifting and gripping attachments removed from their operating mounts and seated in their storage fixture on adjoining conveyor.

Figure 59H:
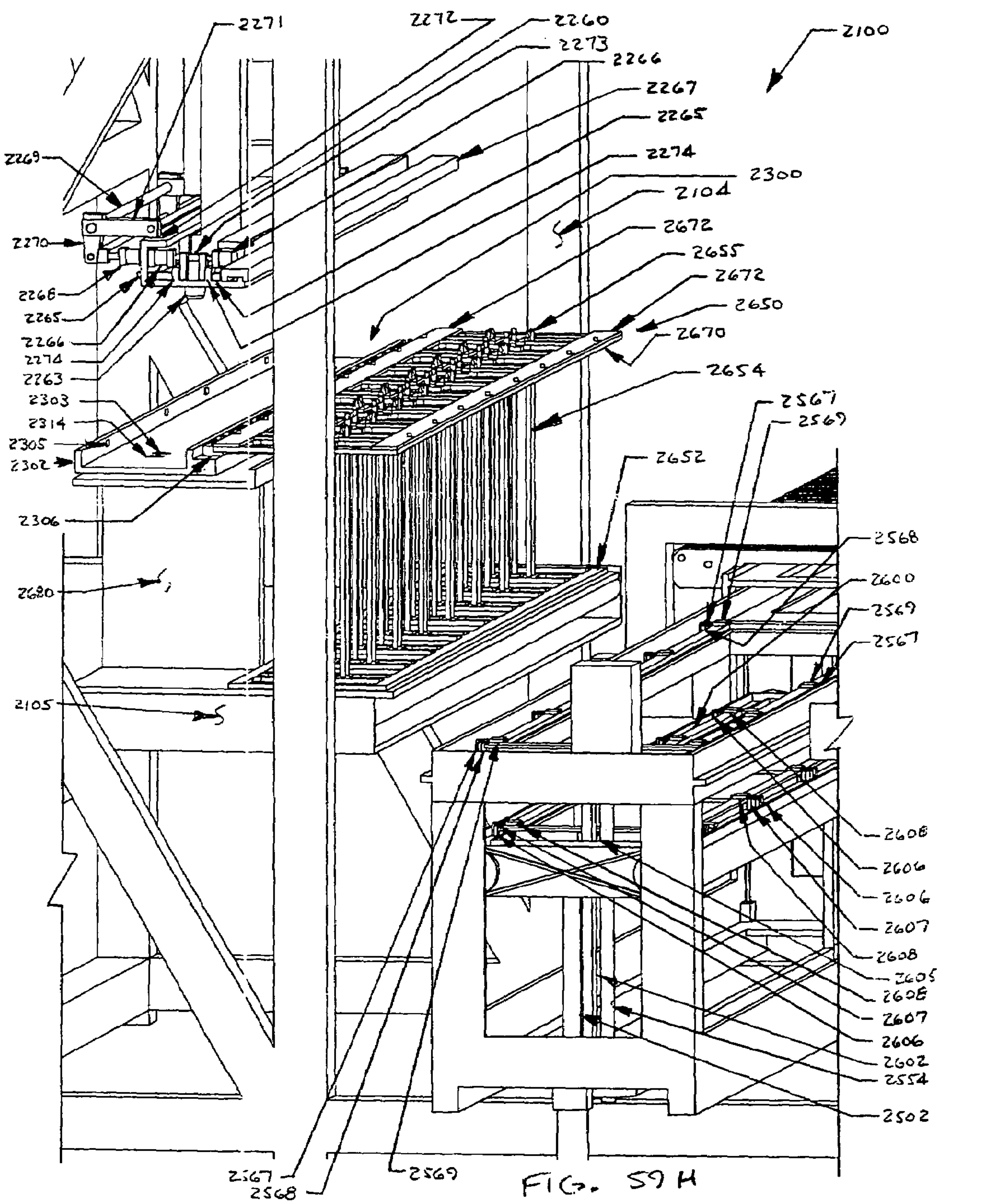

FIG. 59H is a side perspective view of PAU of FIG. 59A, arranged as described in FIG. 59G.

Figure 59I:
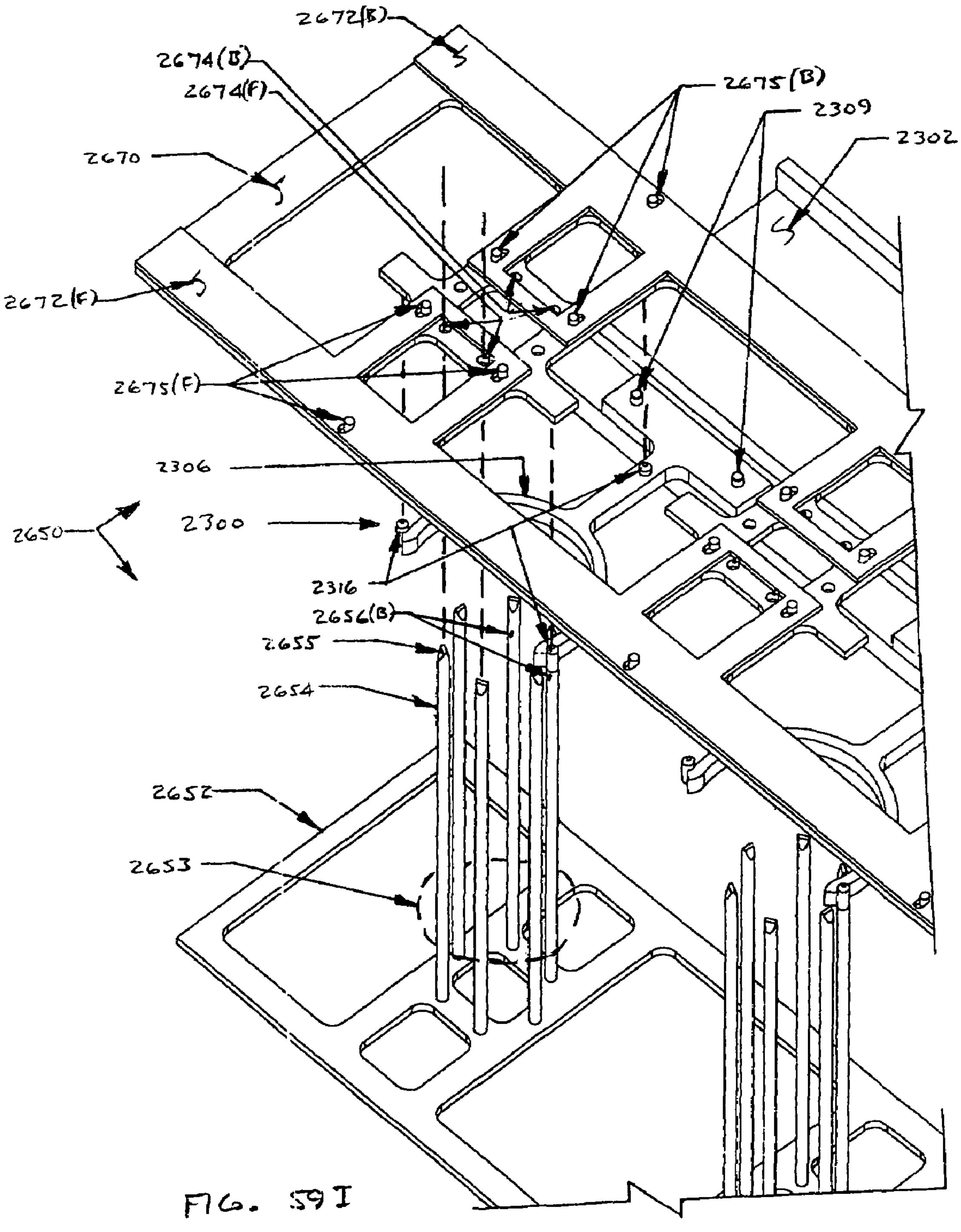
Figure 59:
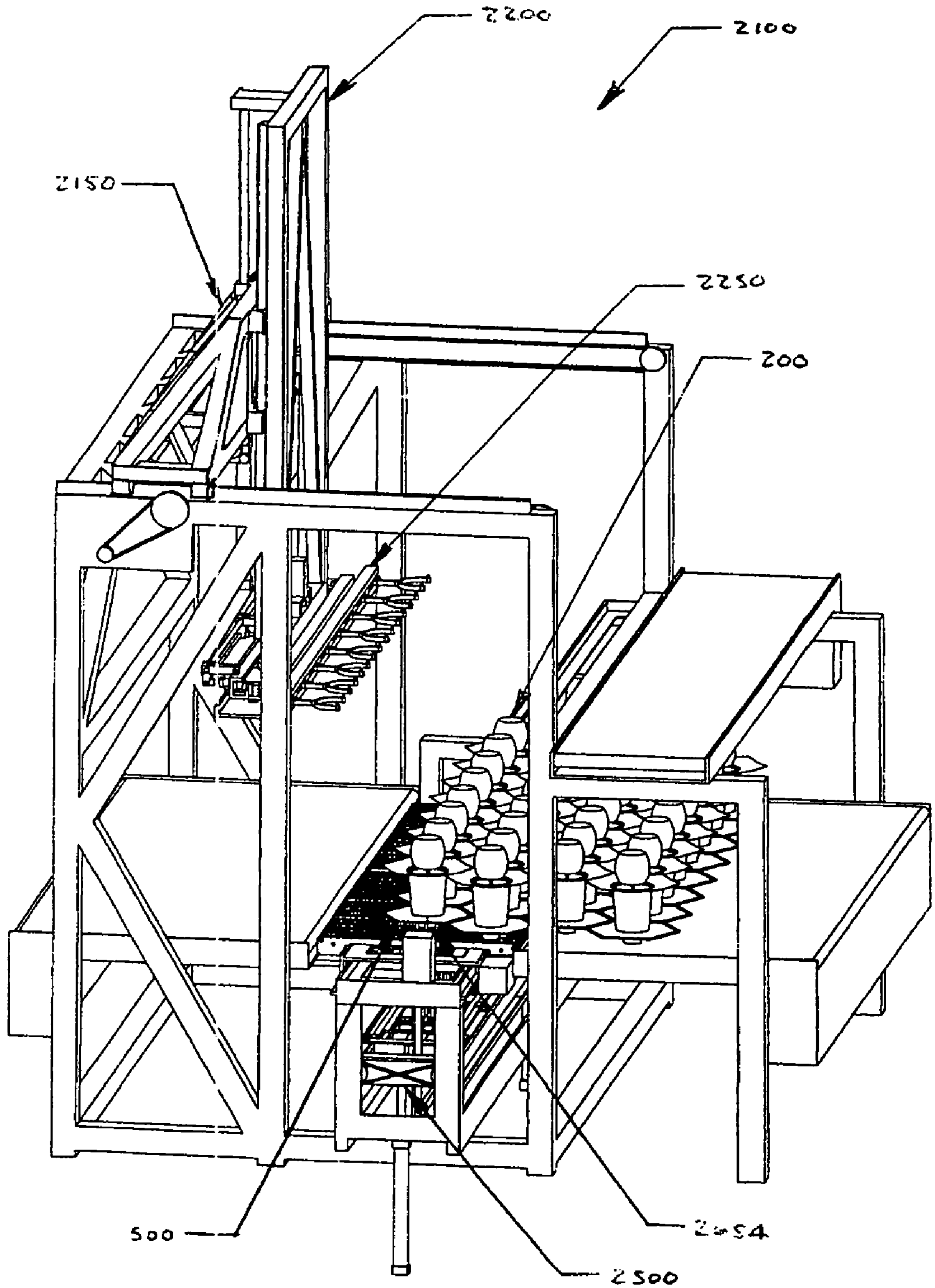

FIG. 59I is an overhead perspective view of container lifting and gripping attachments of PAU of FIG. 59A, exploded to show interaction for storage preparation.

FIG. 59J is an overhead perspective view of the PAU of FIG. 59A, showing initial interaction with the first row of pallet assembly container receptacles and containers, wherein container-lifting rods of container lifting unit have advanced upward into contact with associated containers.

Figure 59K:
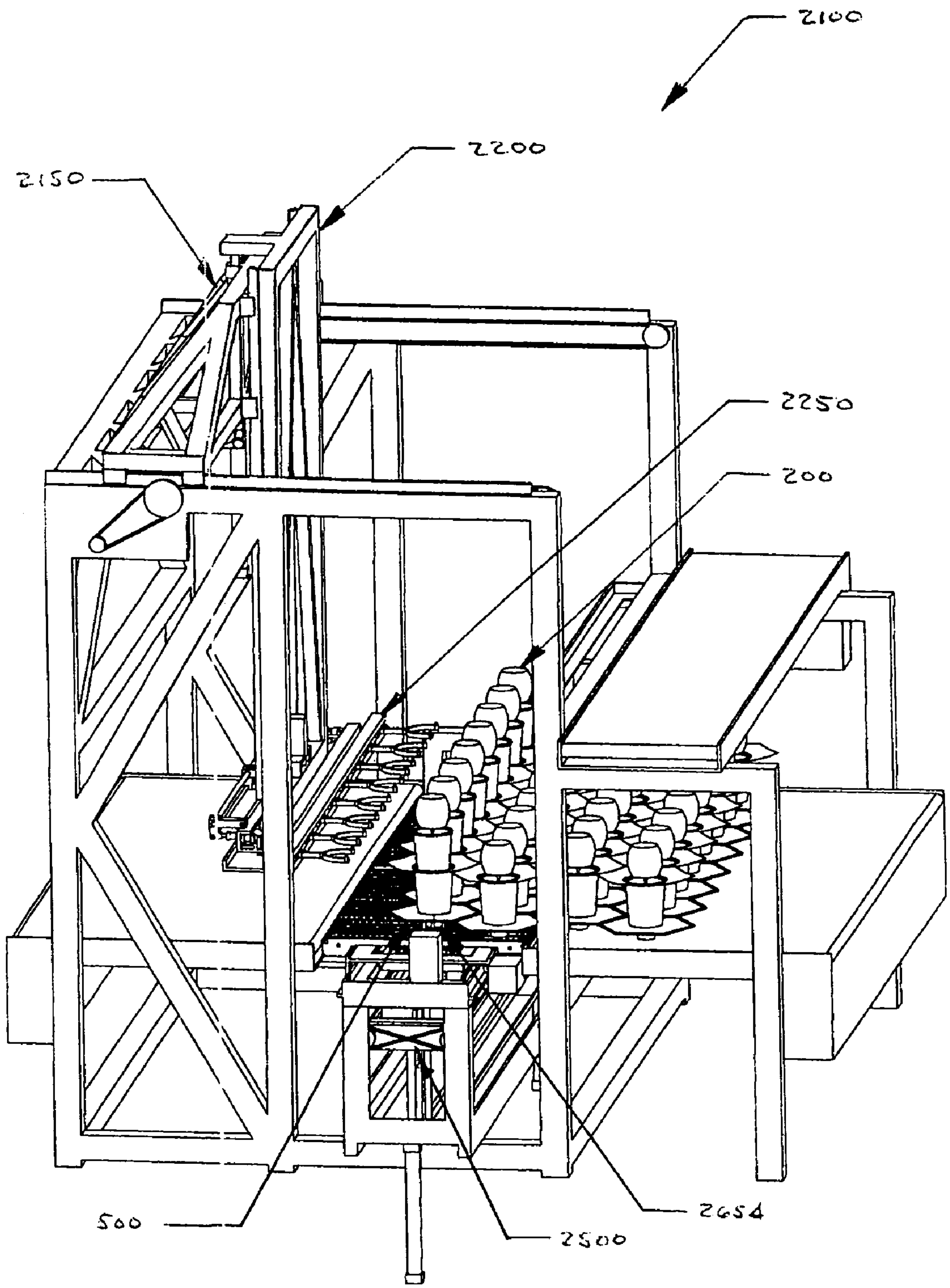

FIG. 59K is an overhead perspective view of the PAU of FIG. 59A, showing lowering and lateral shuttling of container grippers to suitable elevation for interaction with containers to be lifted, generally simultaneously with upward advancement of container lifting rods of container lifting unit for engagement with a first row of pallet assembly container receptacles and containers.

Figure 59L:
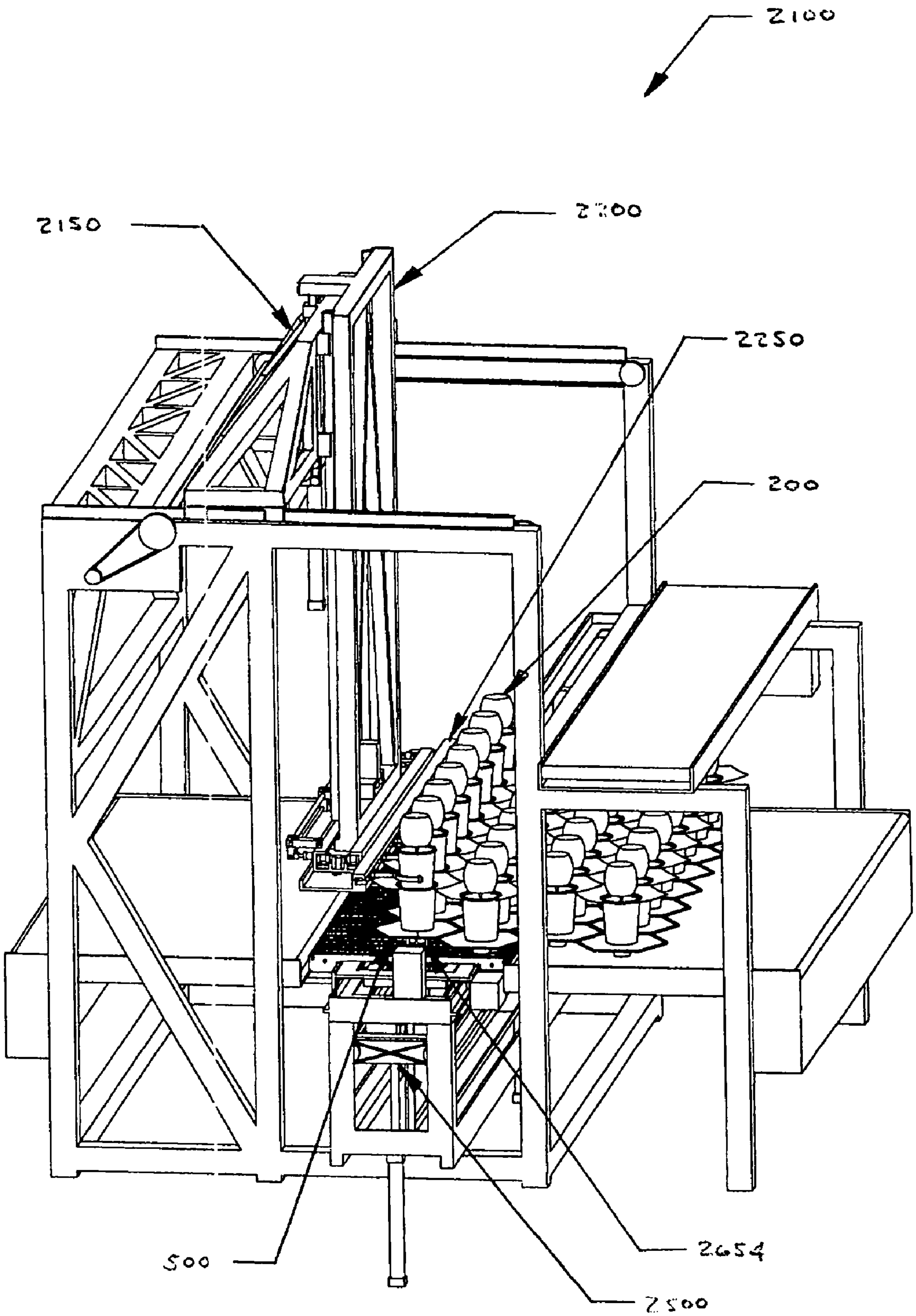

FIG. 59L is an overhead perspective view of the PAU of FIG. 59A, showing interaction with the first row of pallet assembly container receptacles and containers, wherein container grippers are positioned to engage containers lifted by upwardly advanced lifting rods of container lifting unit.

Figure 59M:
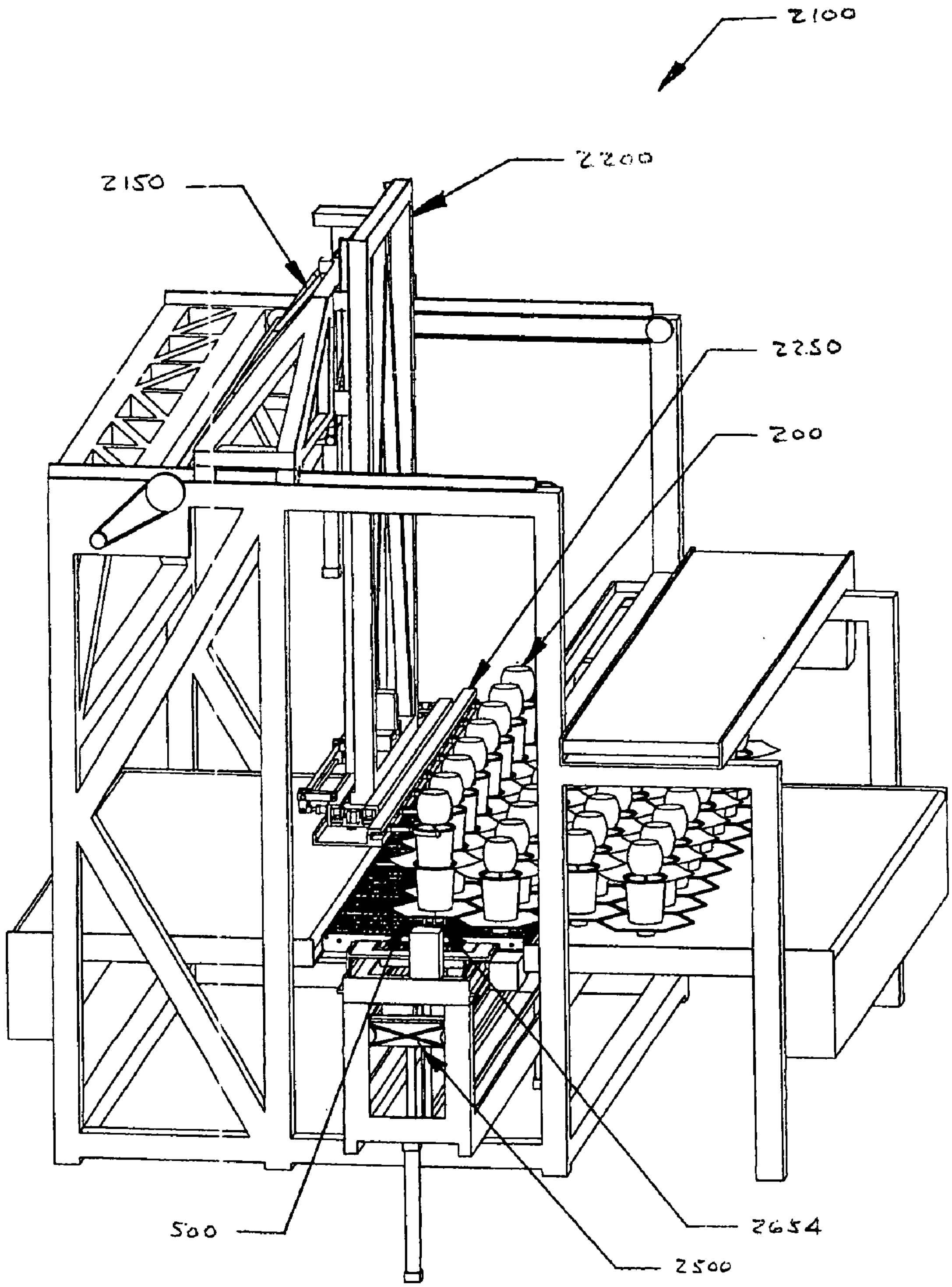

FIG. 59M is an overhead perspective view of the PAU of FIG. 59A, showing interaction with the first row of pallet assembly container receptacles and containers, wherein container grippers have captured containers lifted by upwardly advanced lifting rods of container lifting unit.

Figure 59N:
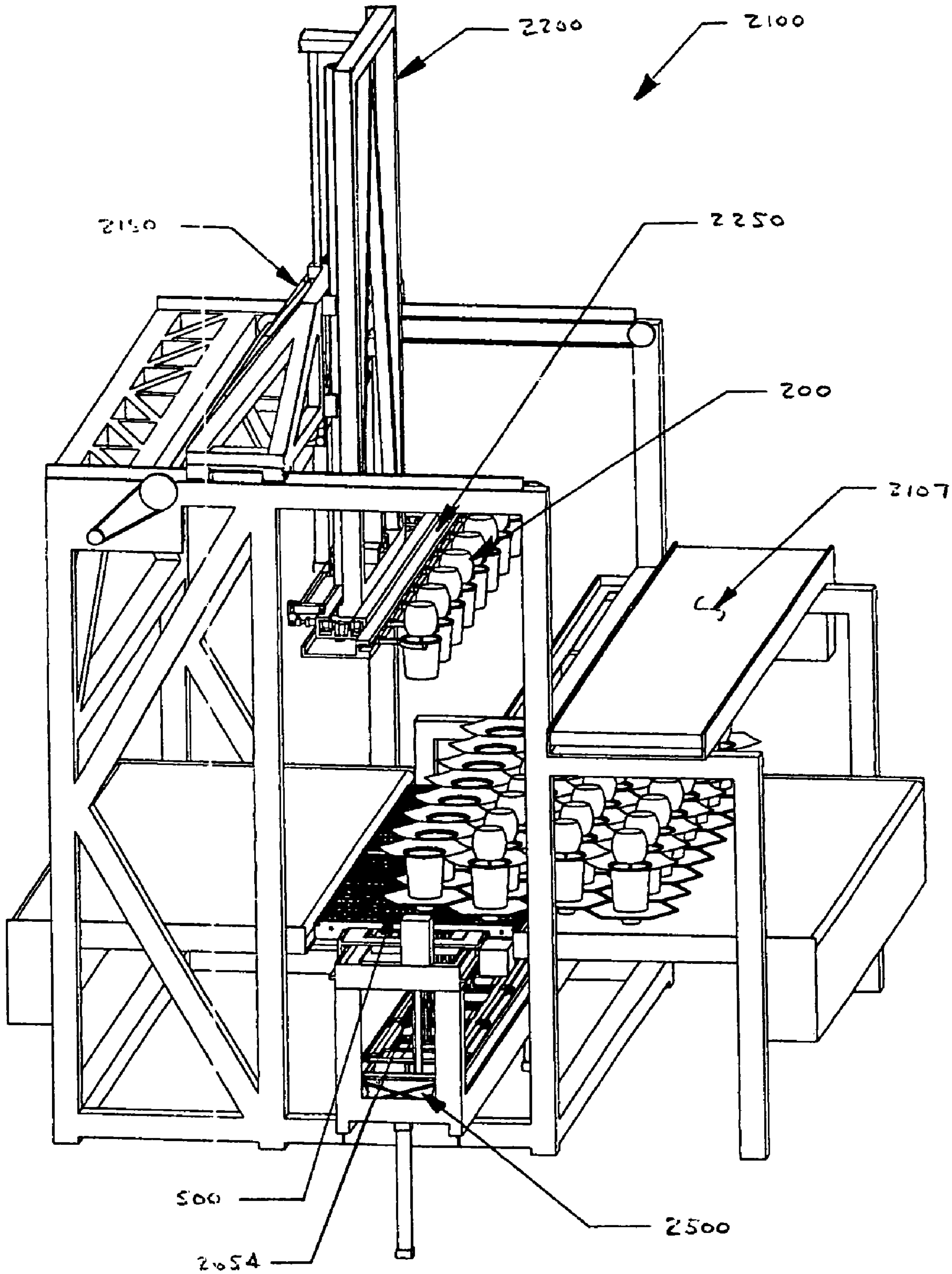
Figure 59:
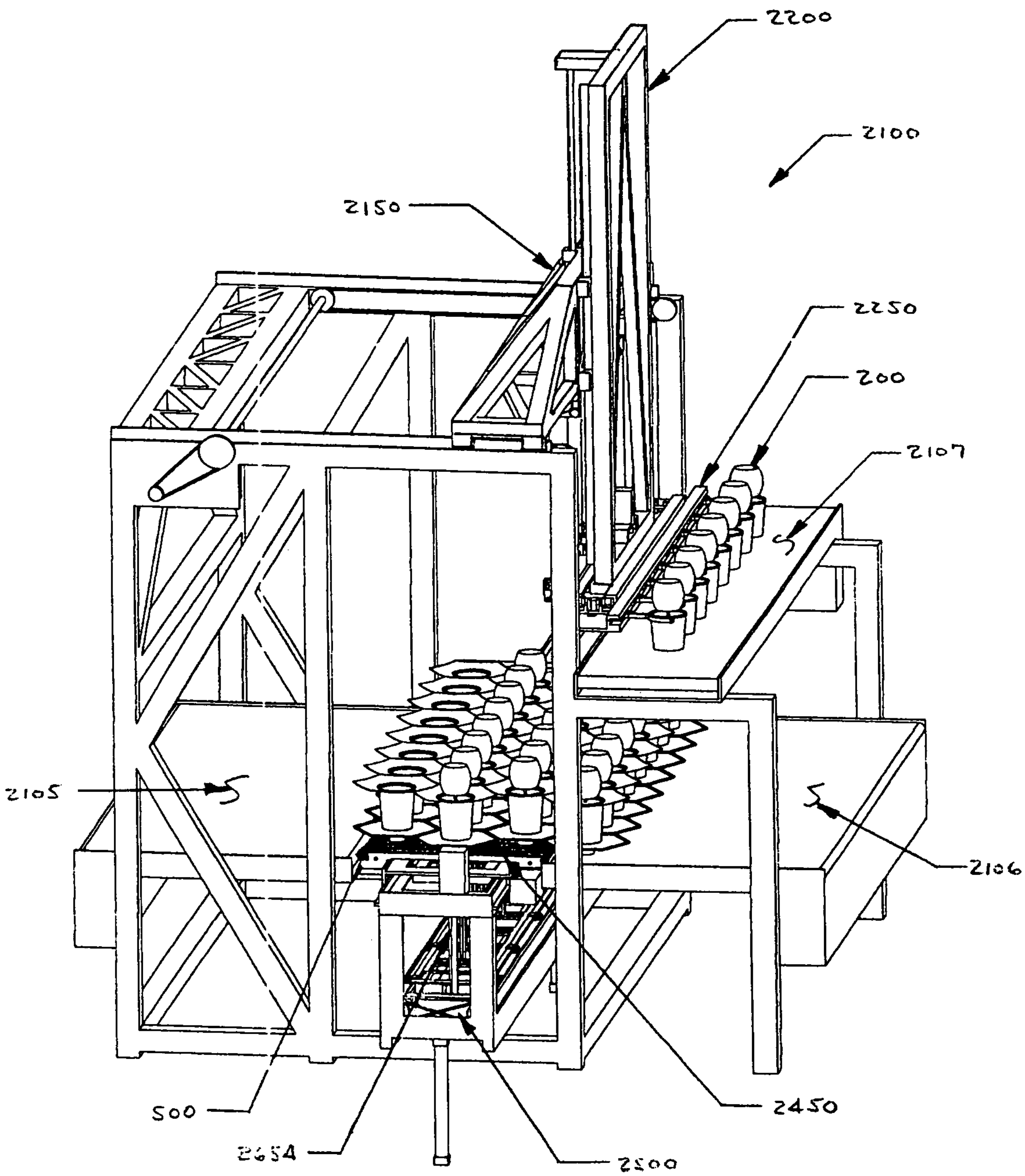

FIG. 59N is an overhead perspective view of the PAU of FIG. 59A, showing interaction with the first row of pallet assembly container receptacles and containers, wherein container grippers have raised captured containers to an elevation suitable for horizontal translation to container conveyor.

FIG. 59P is an overhead perspective view of the PAU of FIG. 59A, showing indexing by pallet conveyors of pallet assemblies in process, positioning second row of containers for lifting, while container grippers generally simultaneously place captured containers onto container conveyor.

Figure 59Q:
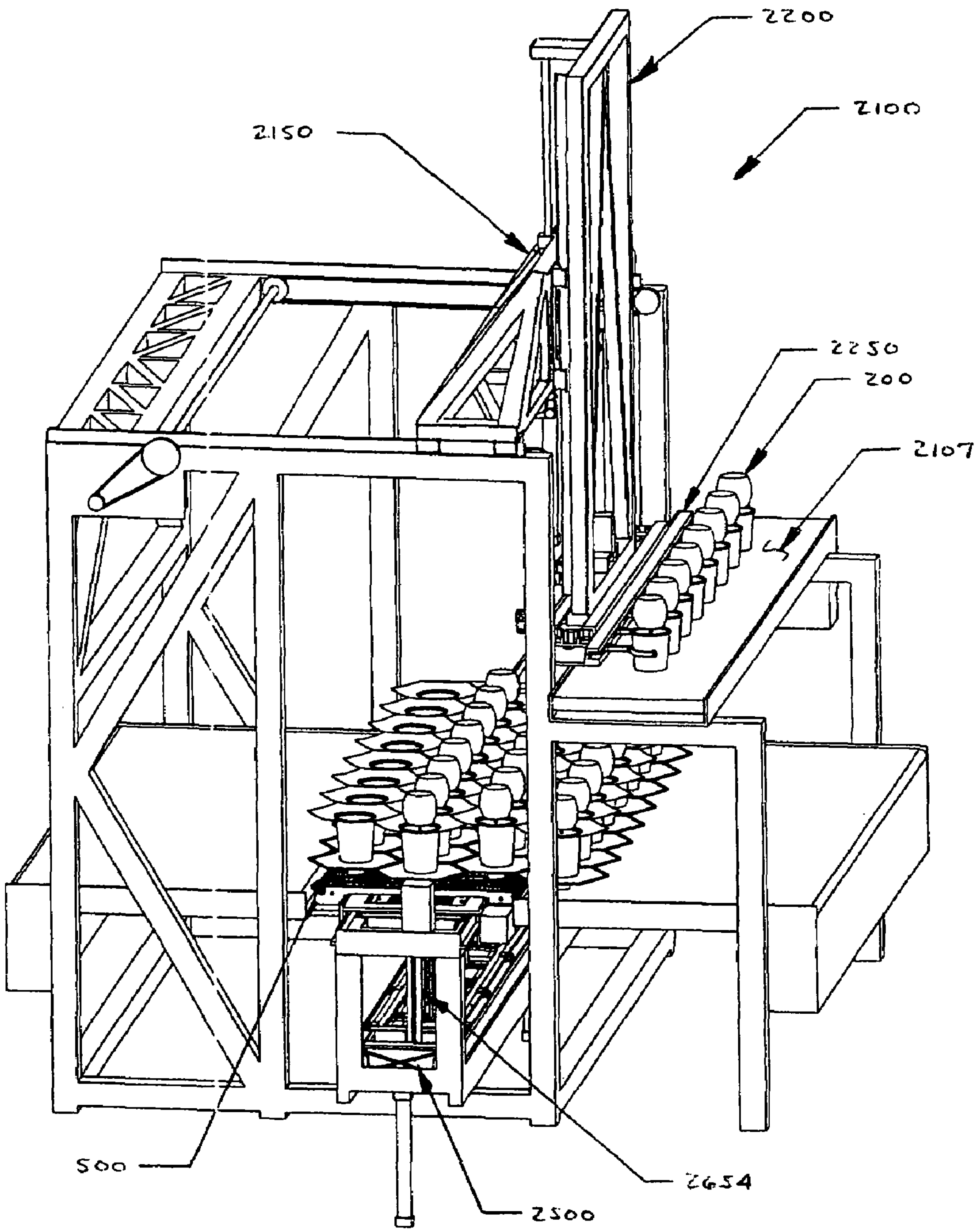

FIG. 59Q is an overhead perspective view of the PAU of FIG. 59A, showing lateral indexing of container lifting rods while container grippers generally simultaneously become disengaged with containers placed onto container conveyor.

Figure 59R:
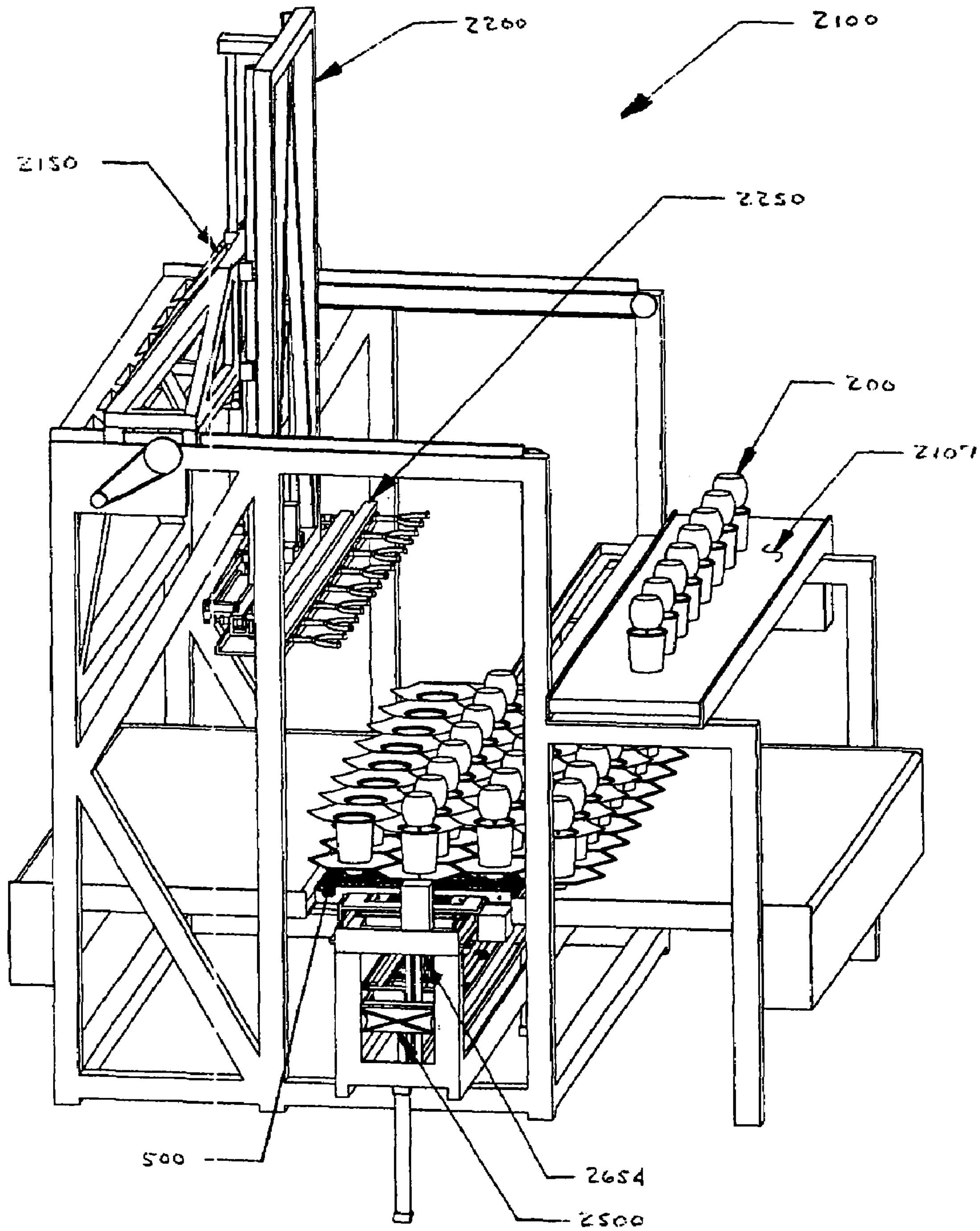

FIG. 59R is an overhead perspective view of the PAU of FIG. 59A, showing retraction of container grippers, allowing containers placed on container conveyor to be conveyed away.

PGWU

Figure 60A:
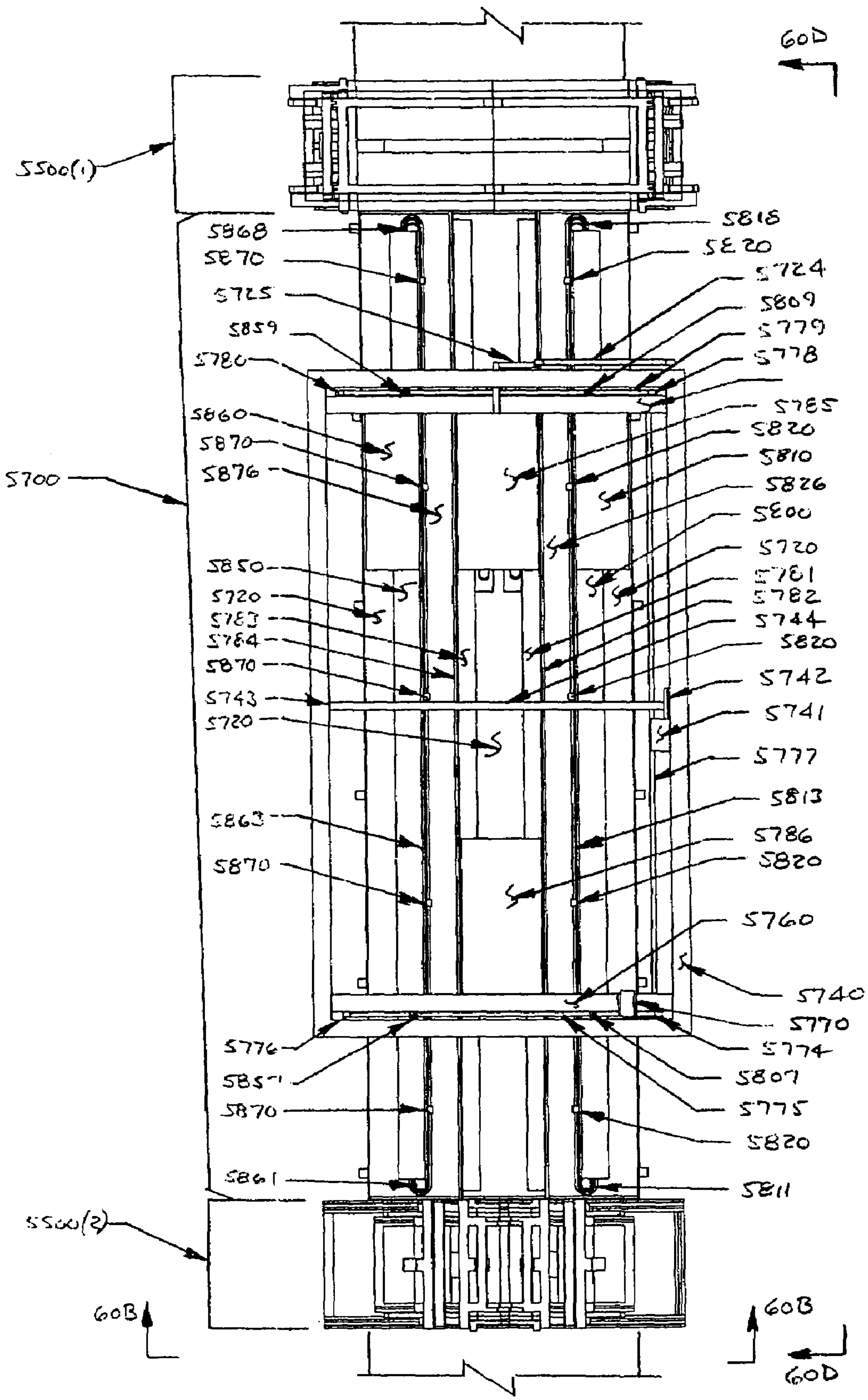

FIG. 60A is a plan view of a pallet- and grid-washing unit and a pallet and grid rotator unit at each end of pallet and grid washing unit, in accordance with a first embodiment of the invention.

Figure 60B:
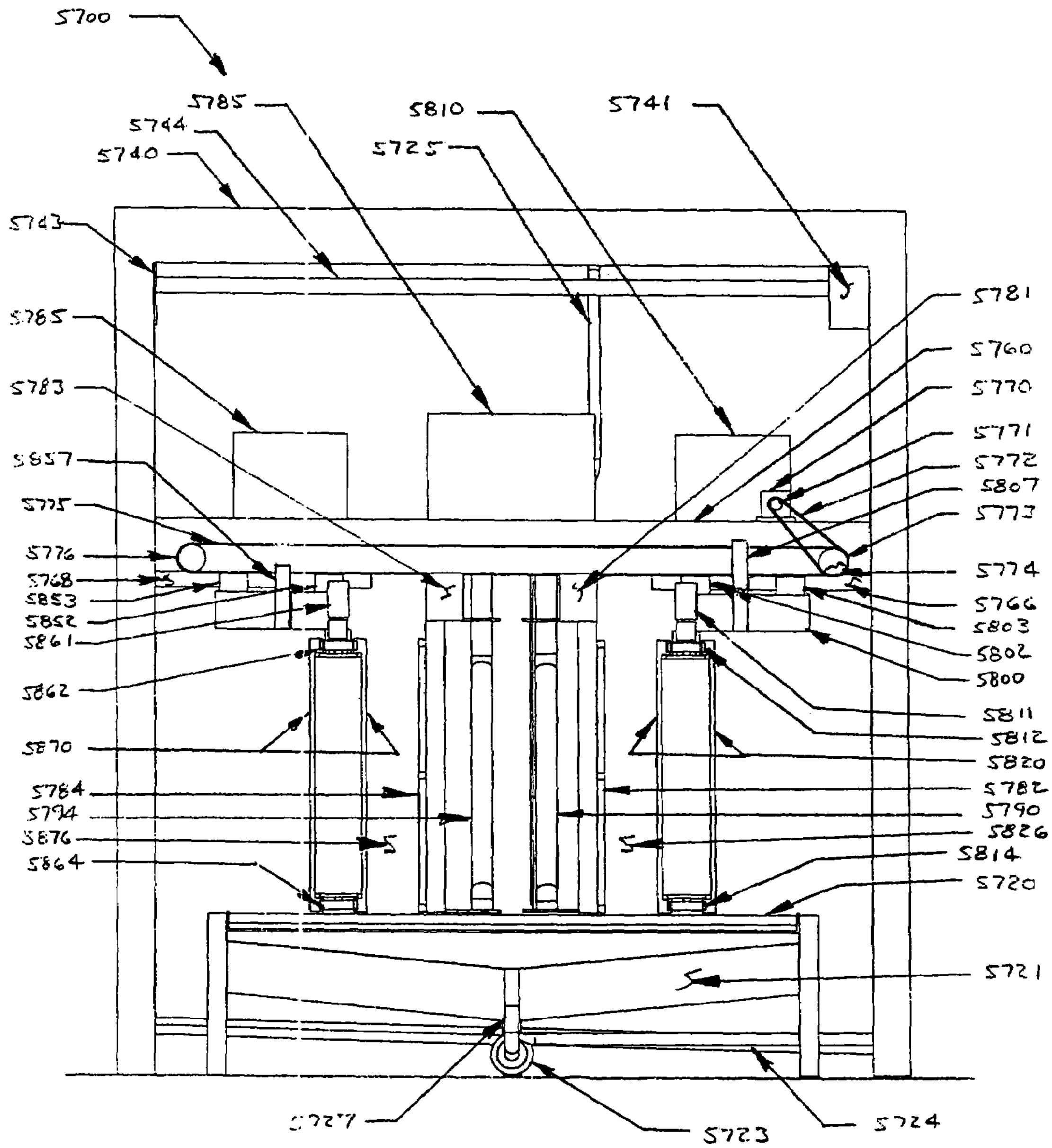

FIG. 60B is a first elevation view of pallet and grid washing unit of FIG. 60A, looking in direction 60B-60B of FIG. 60A, shown with pallet rotator units removed, and with pallet and grid washing system and rotator units in standard operating mode.

Figure 60C:
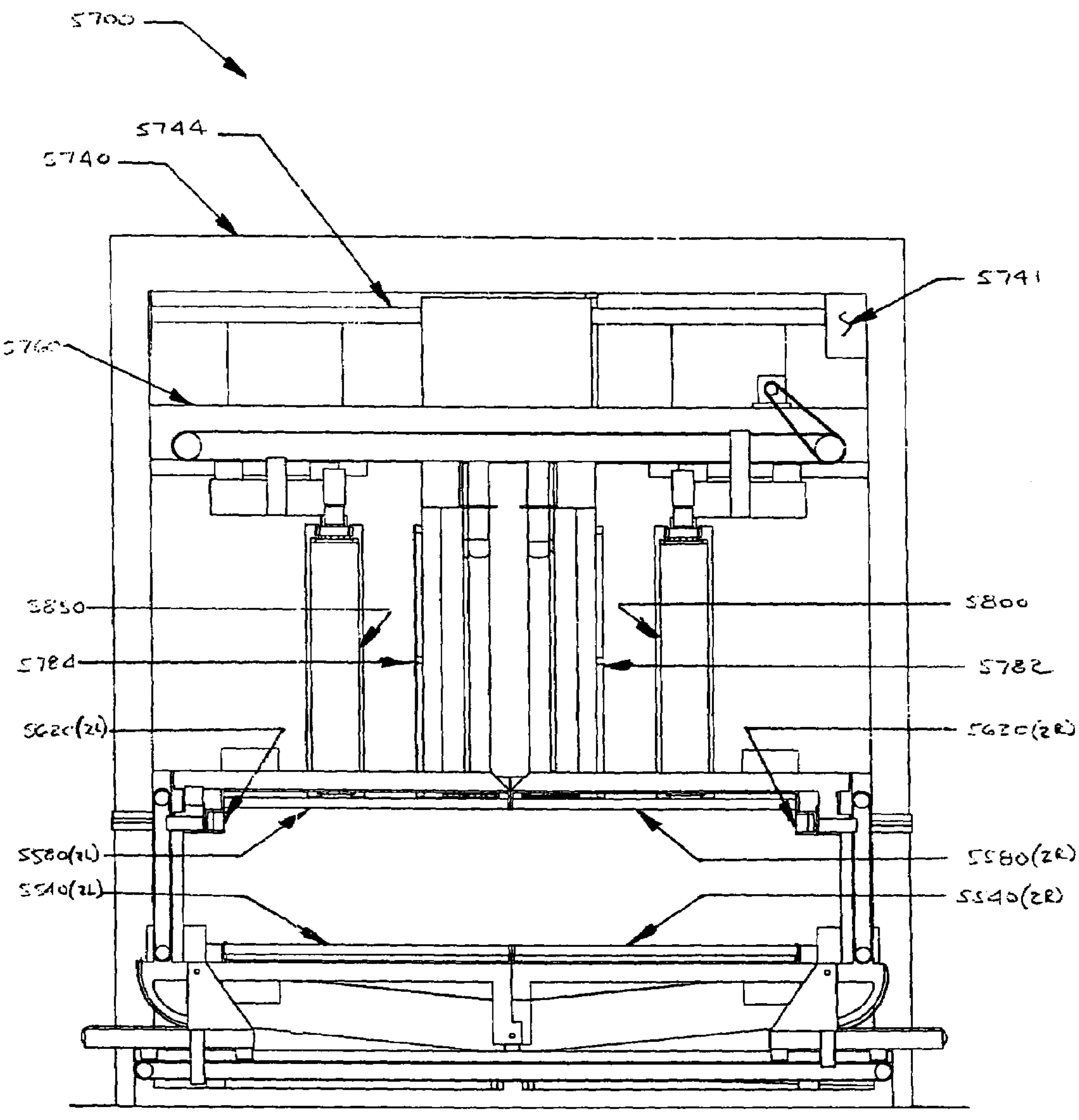

FIG. 60C is the same as FIG. 60B, except shown with pallet rotator units in place, and with pallet and grid washing system and rotator units in bypass mode.

Figure 60D:
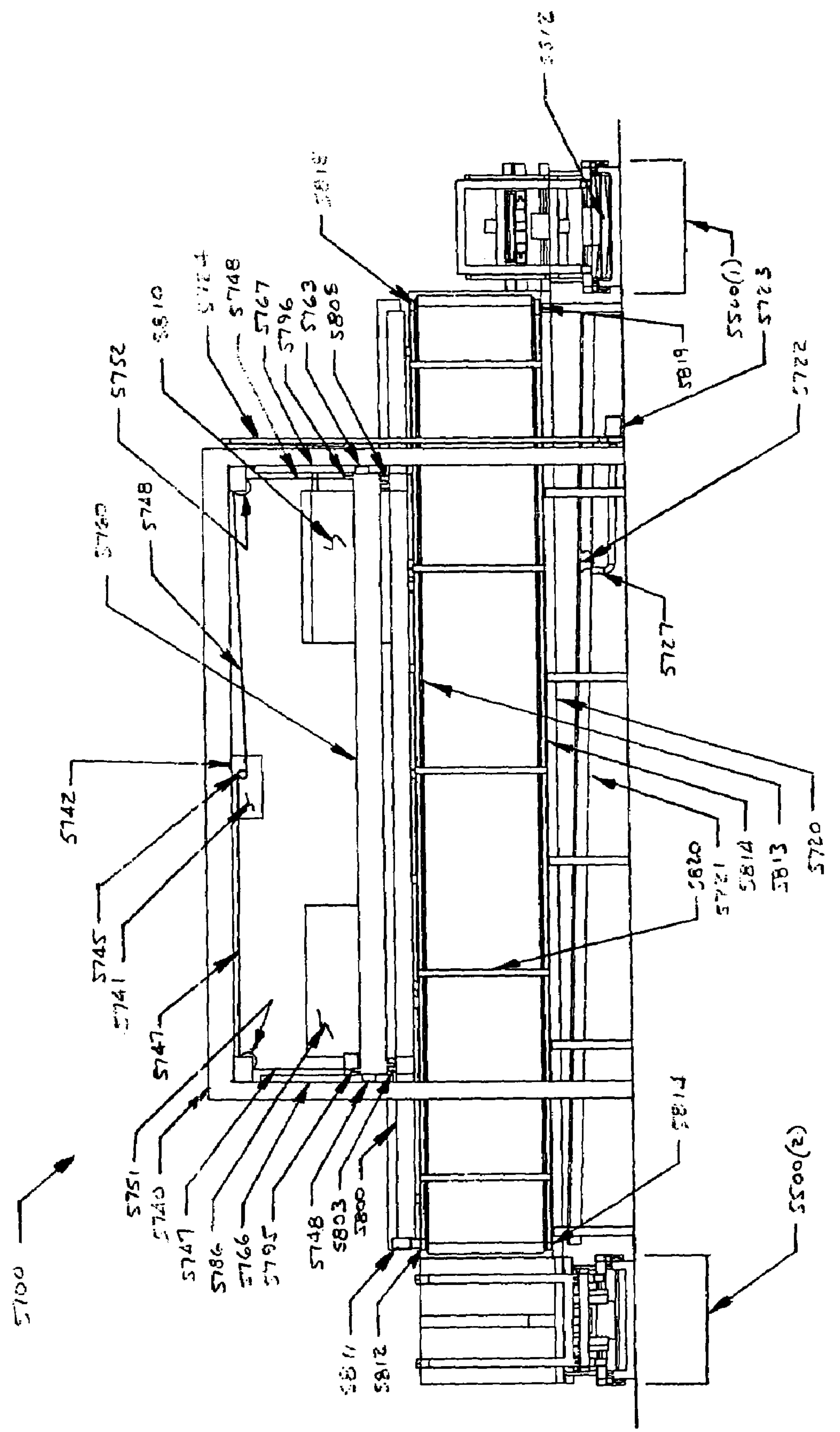
Figure 60:
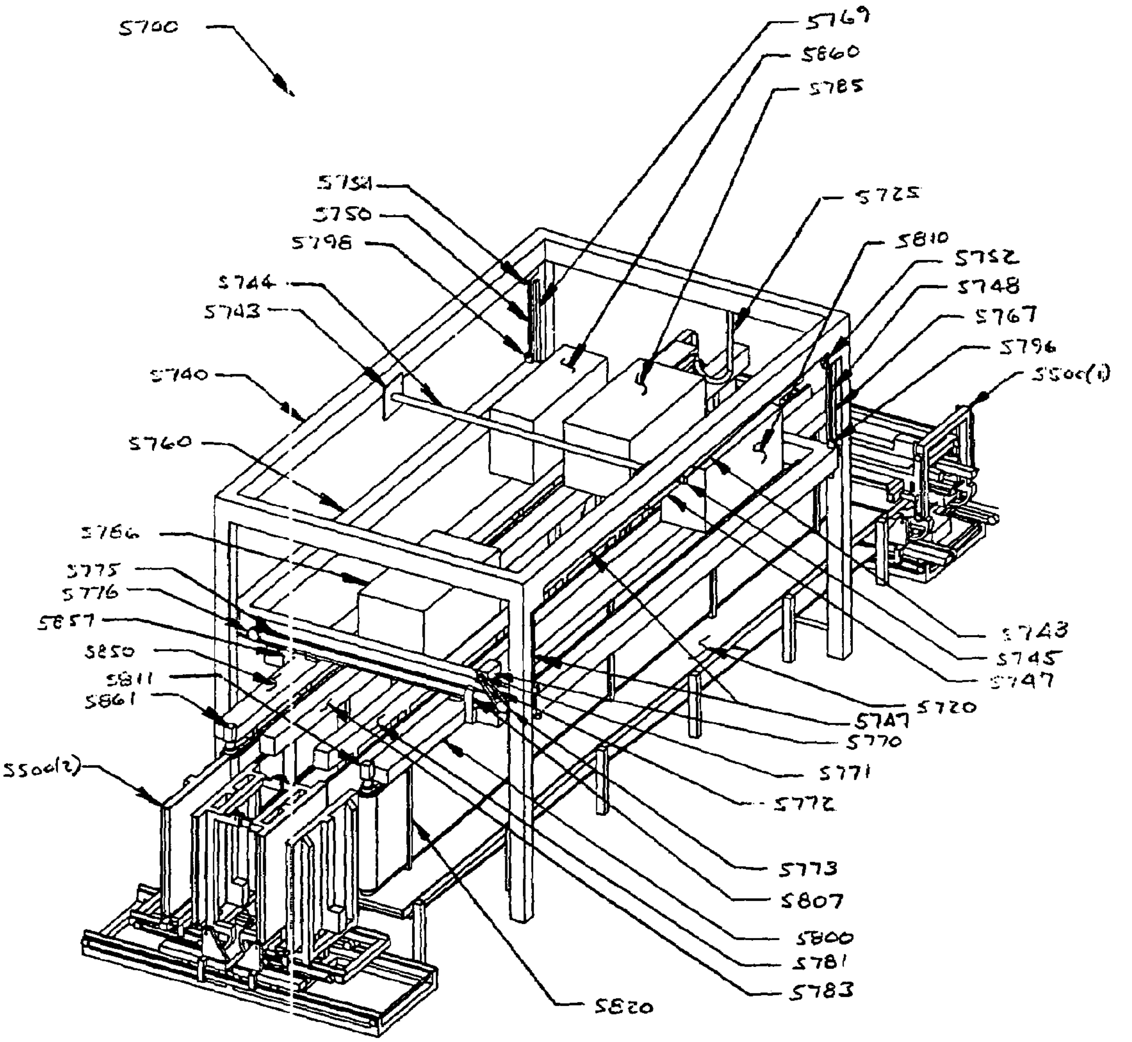

FIG. 60D is a second elevation view of pallet and grid washing unit of FIG. 60A, looking in direction 60D-60D of FIG. 60A, shown with pallet and grid washing system and rotator units in standard operating mode.

FIG. 60E is an overhead perspective view of pallet and grid washing unit of FIG. 60A, shown with pallet and grid washing system and rotator units in standard operating mode.

Figure 60F:
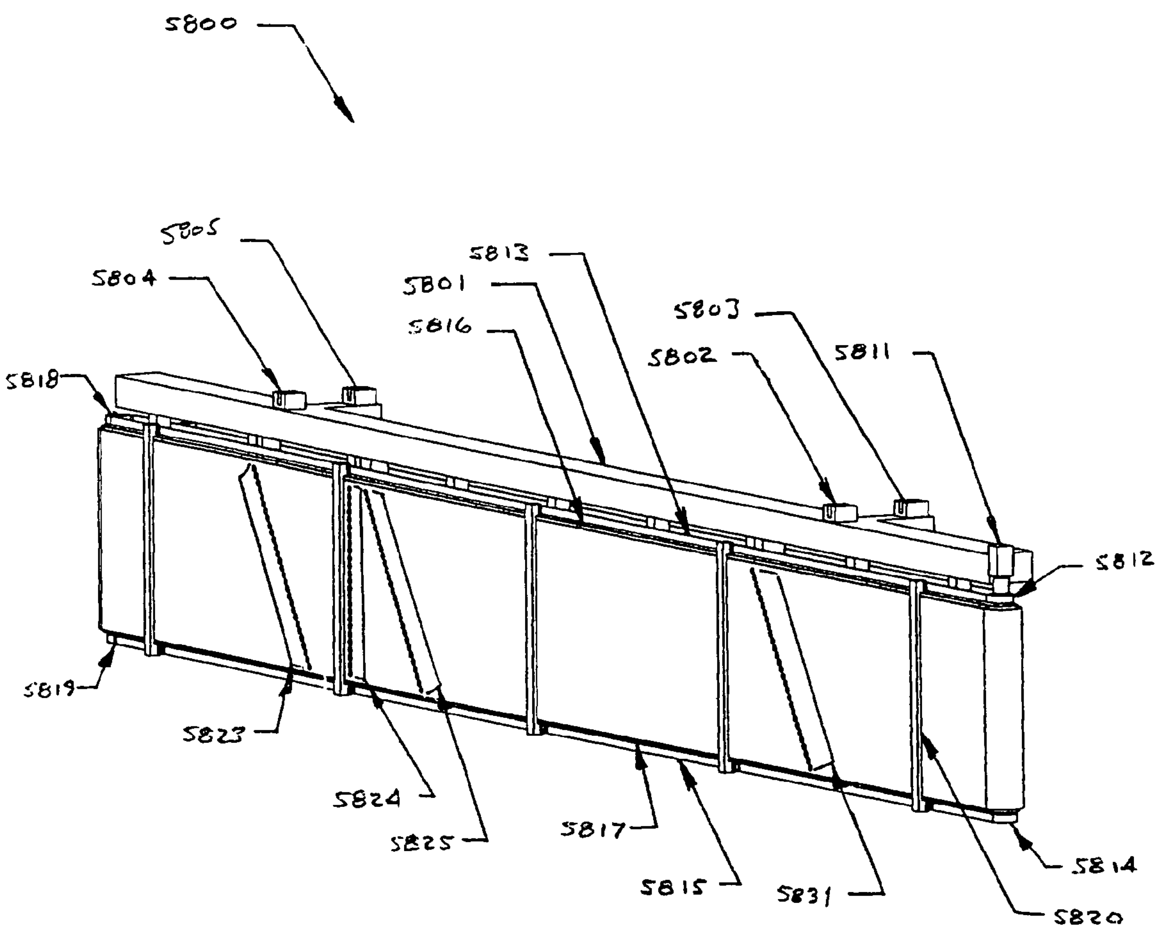

FIG. 60F is a side perspective view of left-hand (where pallet and grid flow direction is forward), vertical plane, horizontal flow pallet and grid conveyor of pallet and grid washing unit of FIG. 60A, showing rinse/wash water jet arrays and an air drying jet array.

PGRU

Figure 60G:
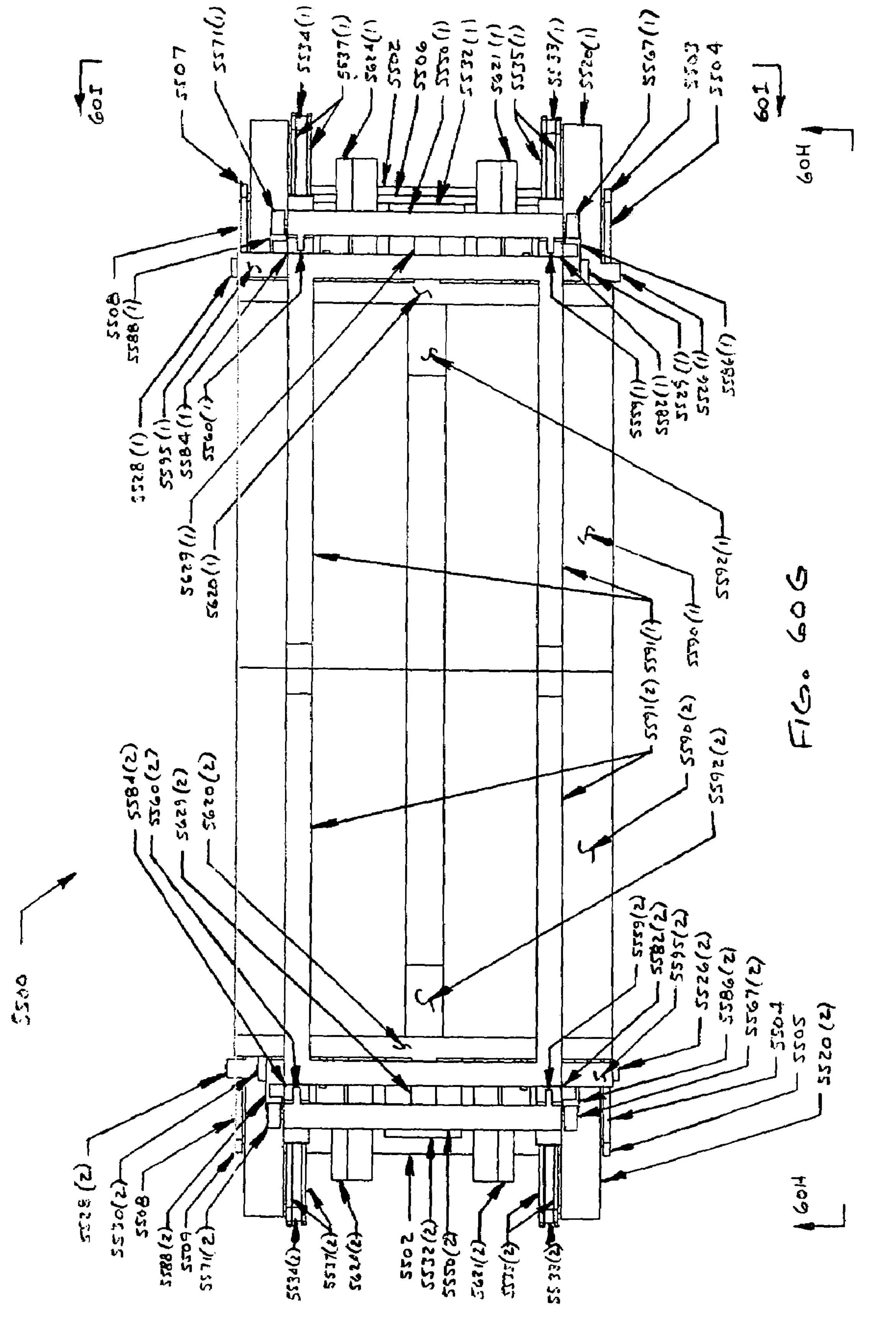

FIG. 60G is a plan view of a pallet and grid rotator unit in accordance with a first embodiment of the invention.

Figure 60H:
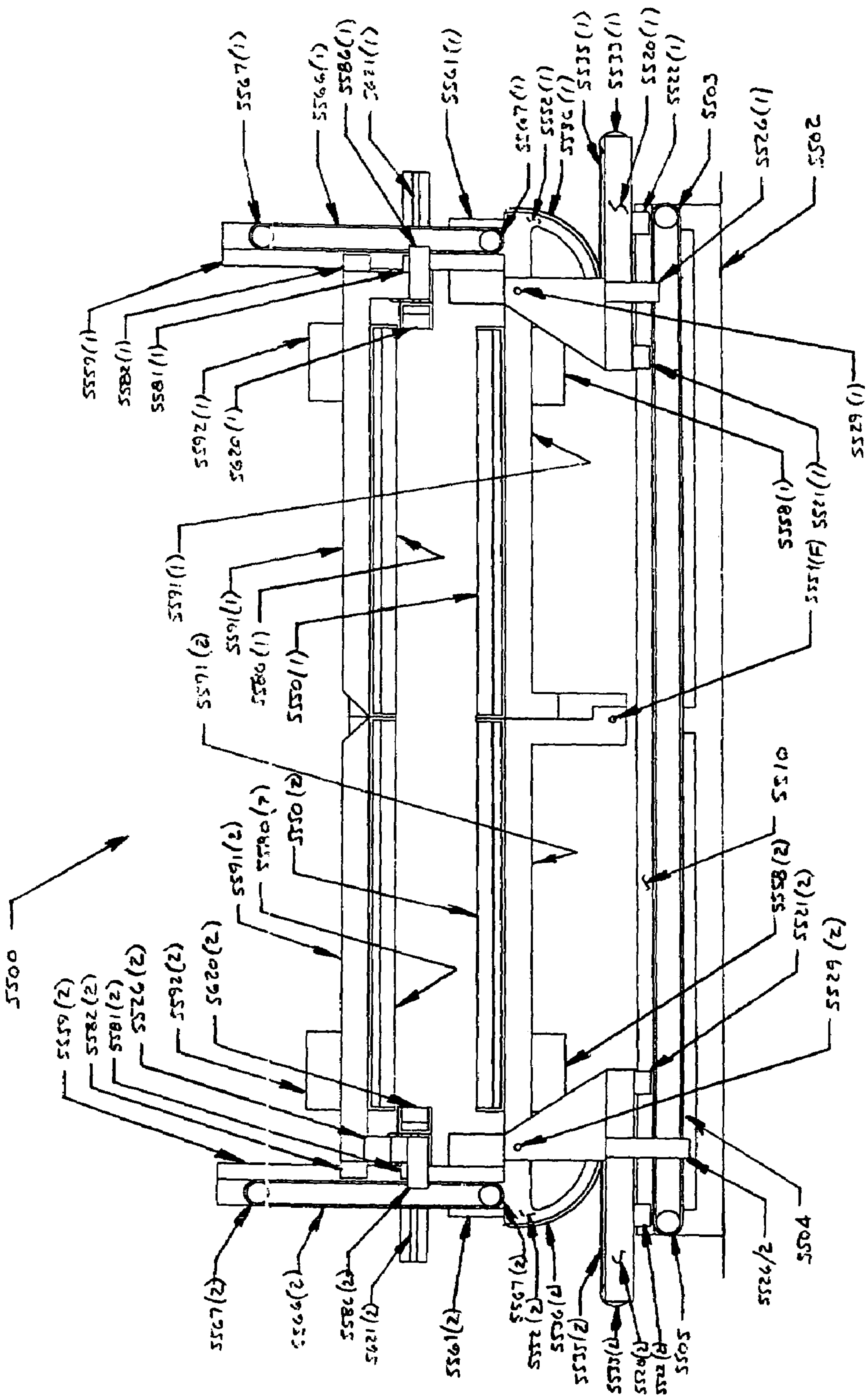
Figure 60:
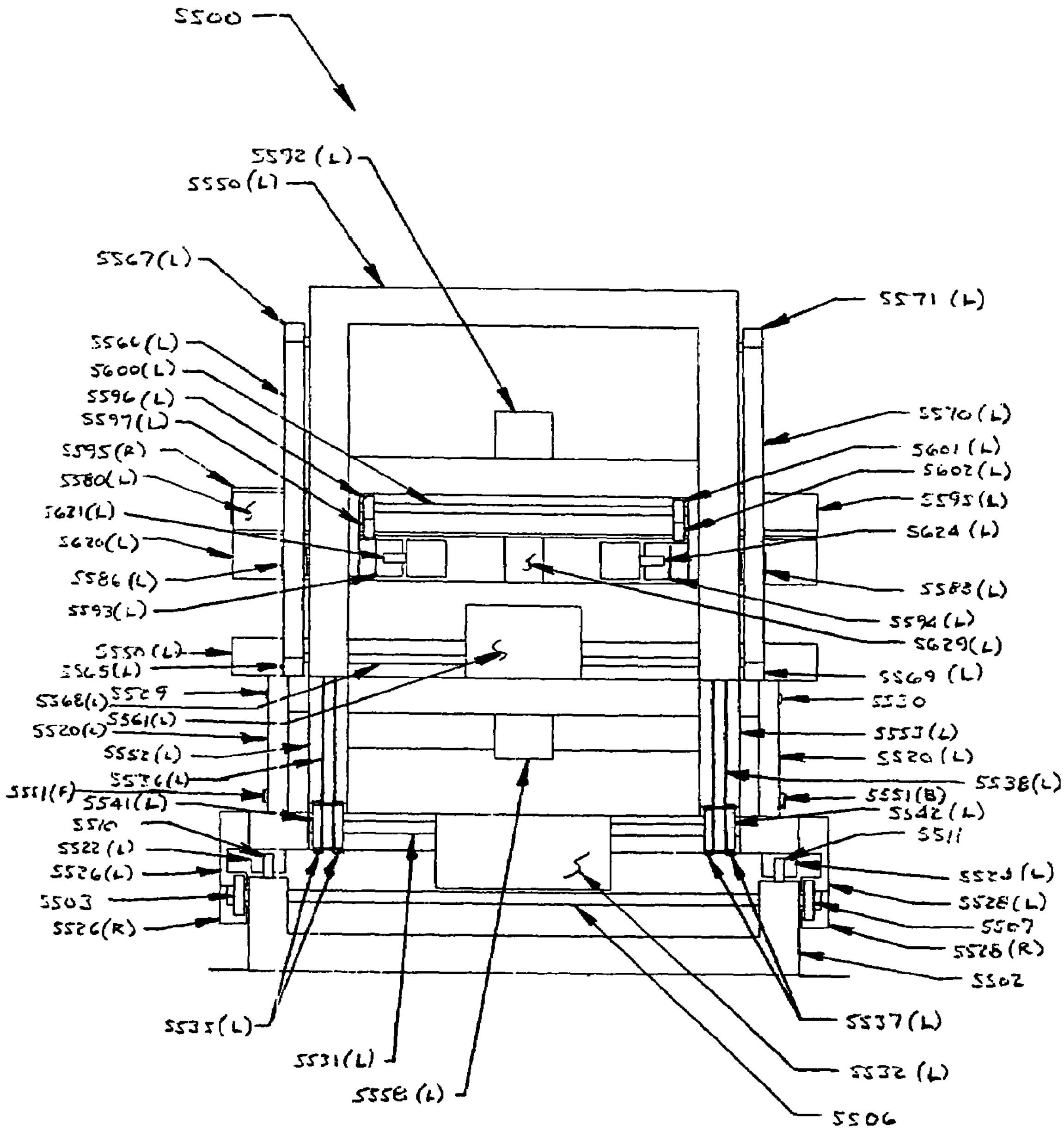

FIG. 60H is a side elevation view of a pallet and grid rotator unit of FIG. 60G, looking in direction 60H-60H of FIG. 60G.

FIG. 60I is a front elevation view of a pallet and grid rotator unit of FIG. 60G, looking in direction 60I-60I of FIG. 60G.

Figure 60J:
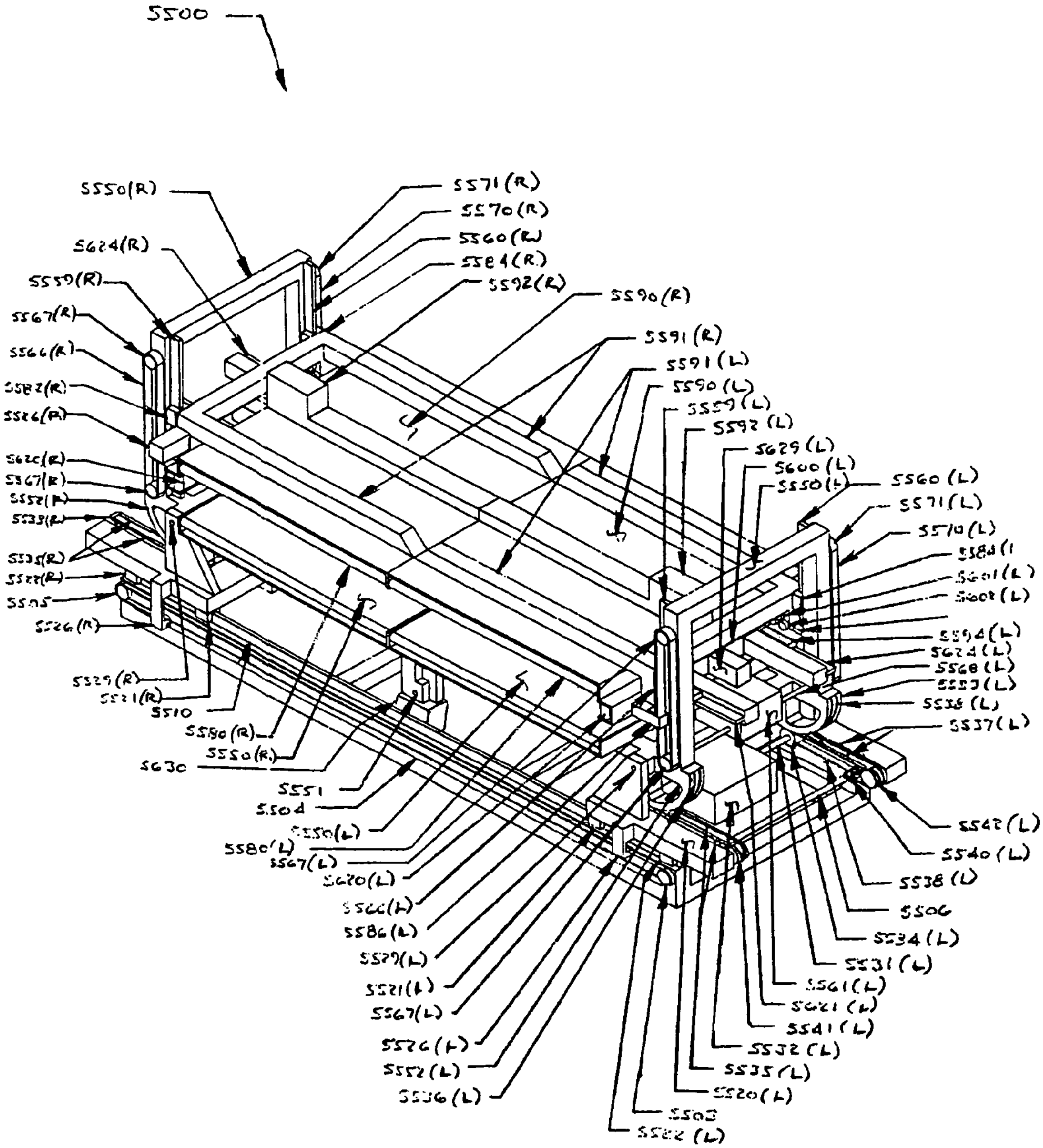

FIG. 60J is an overhead perspective view of a pallet and grid rotator unit of FIG. 60G.

Figure 60K:
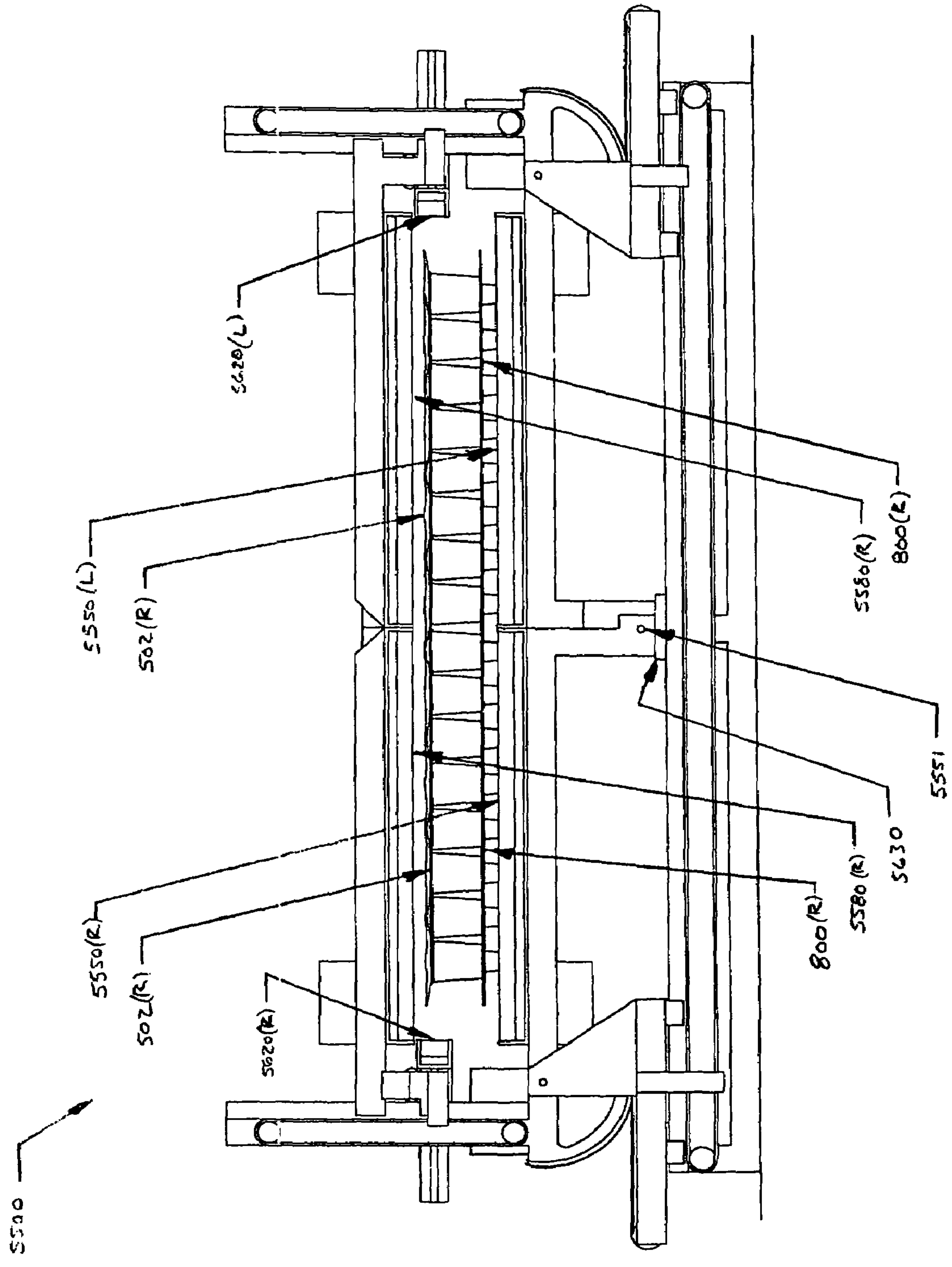

FIG. 60K is a front elevation view of the pallet and grid rotator unit of FIG. 60G, shown in the state for transitioning of two pallets nested in two grids to or from an adjoining pallet conveyor external to pallet and grid washing unit, and holding two pallets nested in two grids.

Figure 60L:
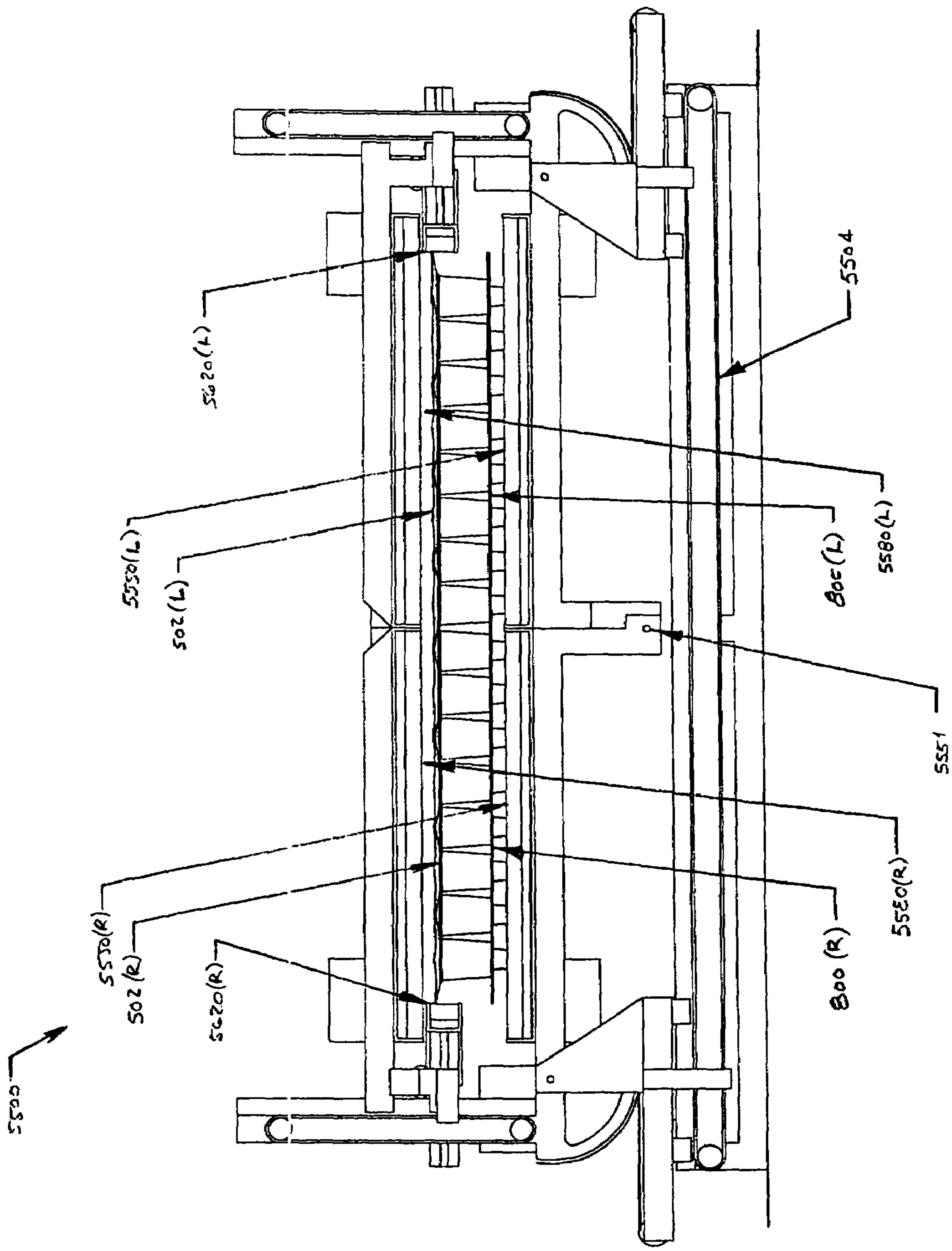

FIG. 60L is the same as FIG. 60K, except with edge conveyors advanced into contact with held pallet edges.

Figure 60M:
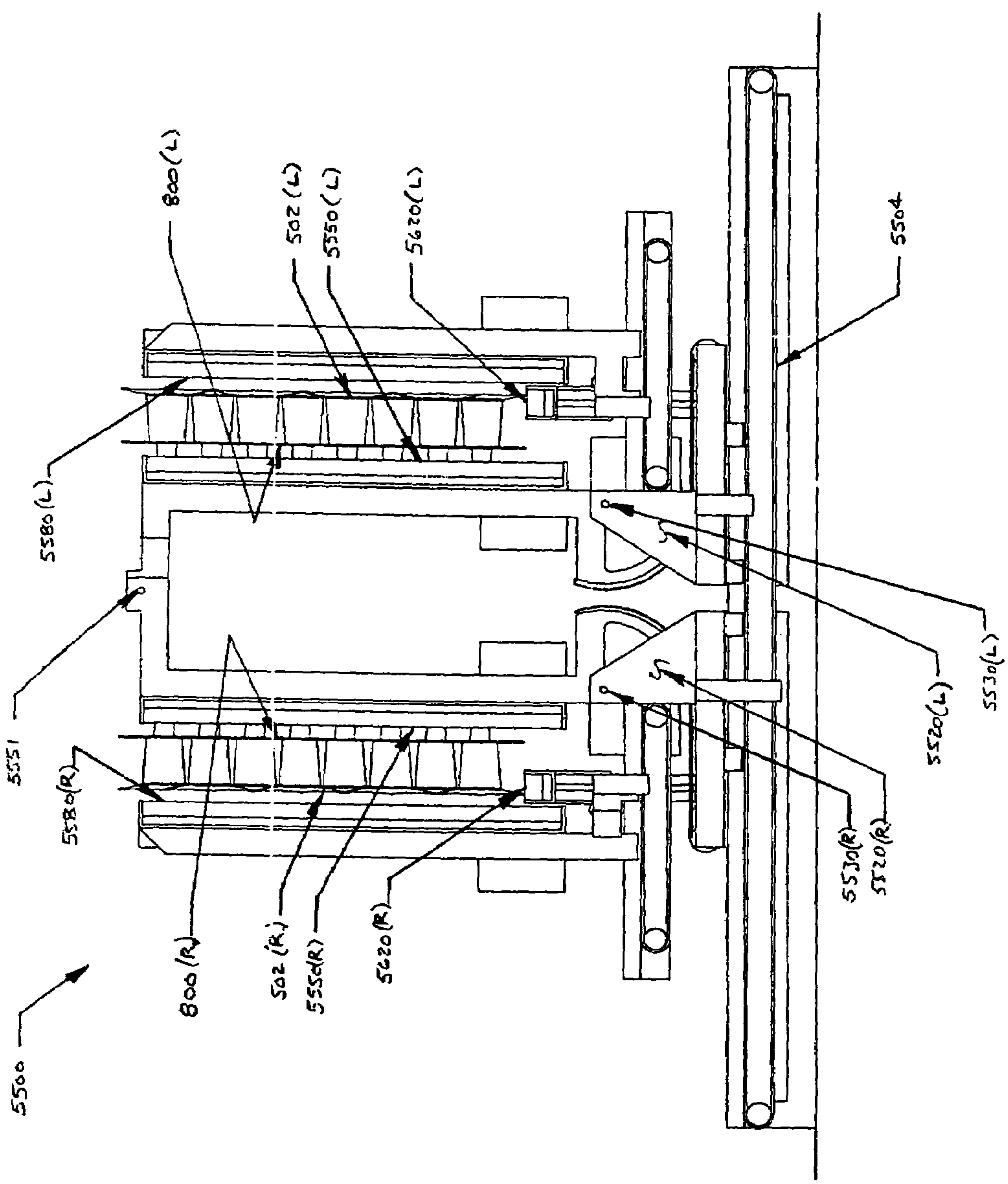

FIG. 60M is a front elevation view of the pallet and grid rotator unit of FIG. 60G, shown rotated up (to 'pallets on edge' state), and holding two pallets nested in two grids.

Figure 60N:
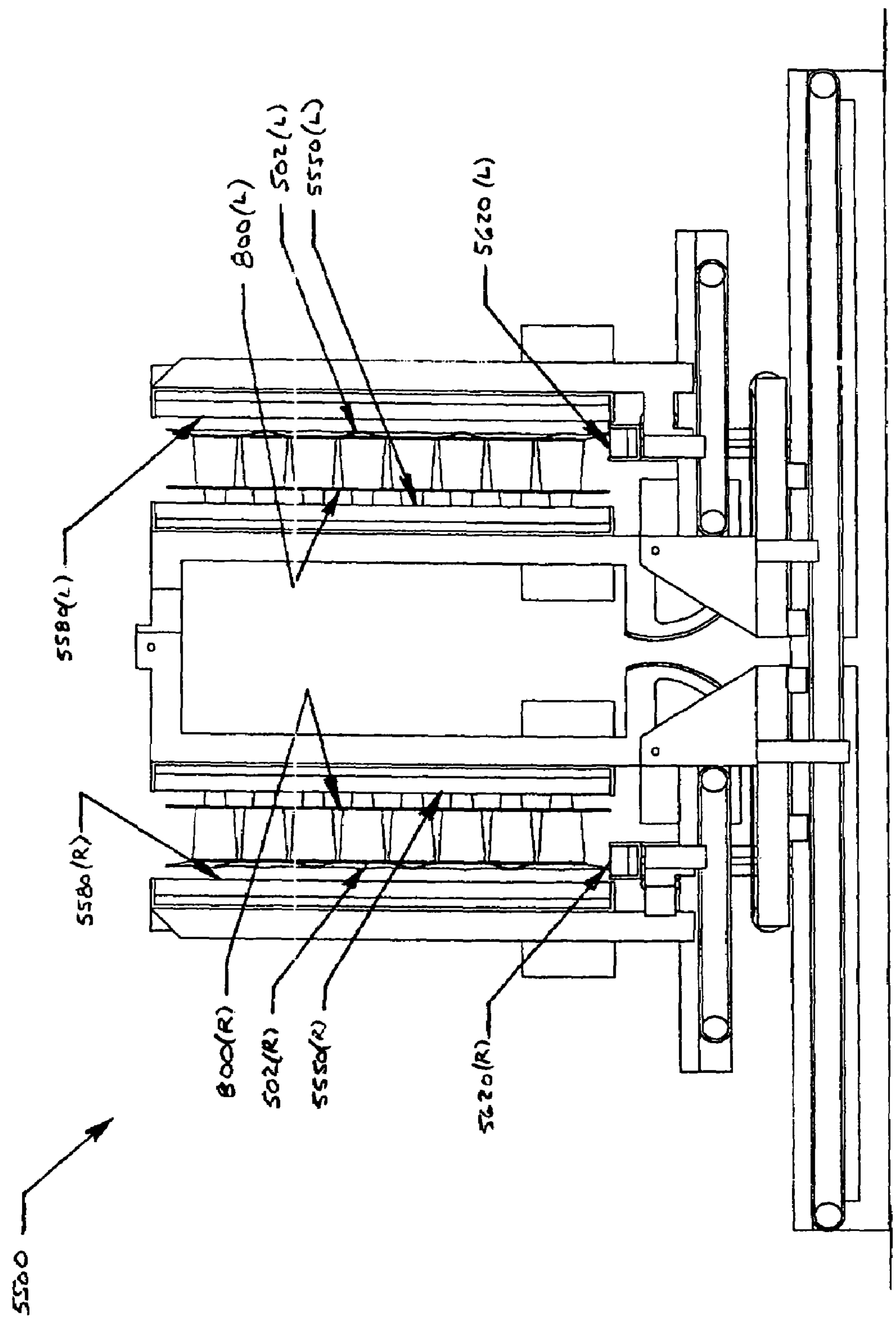

FIG. 60N is the same as FIG. 60M, except with edge conveyors retracted, placing supported edges of held pallets at elevation of pallet and grid washing unit main conveyor, suitable for transitioning.

PGSU

Figure 61A:
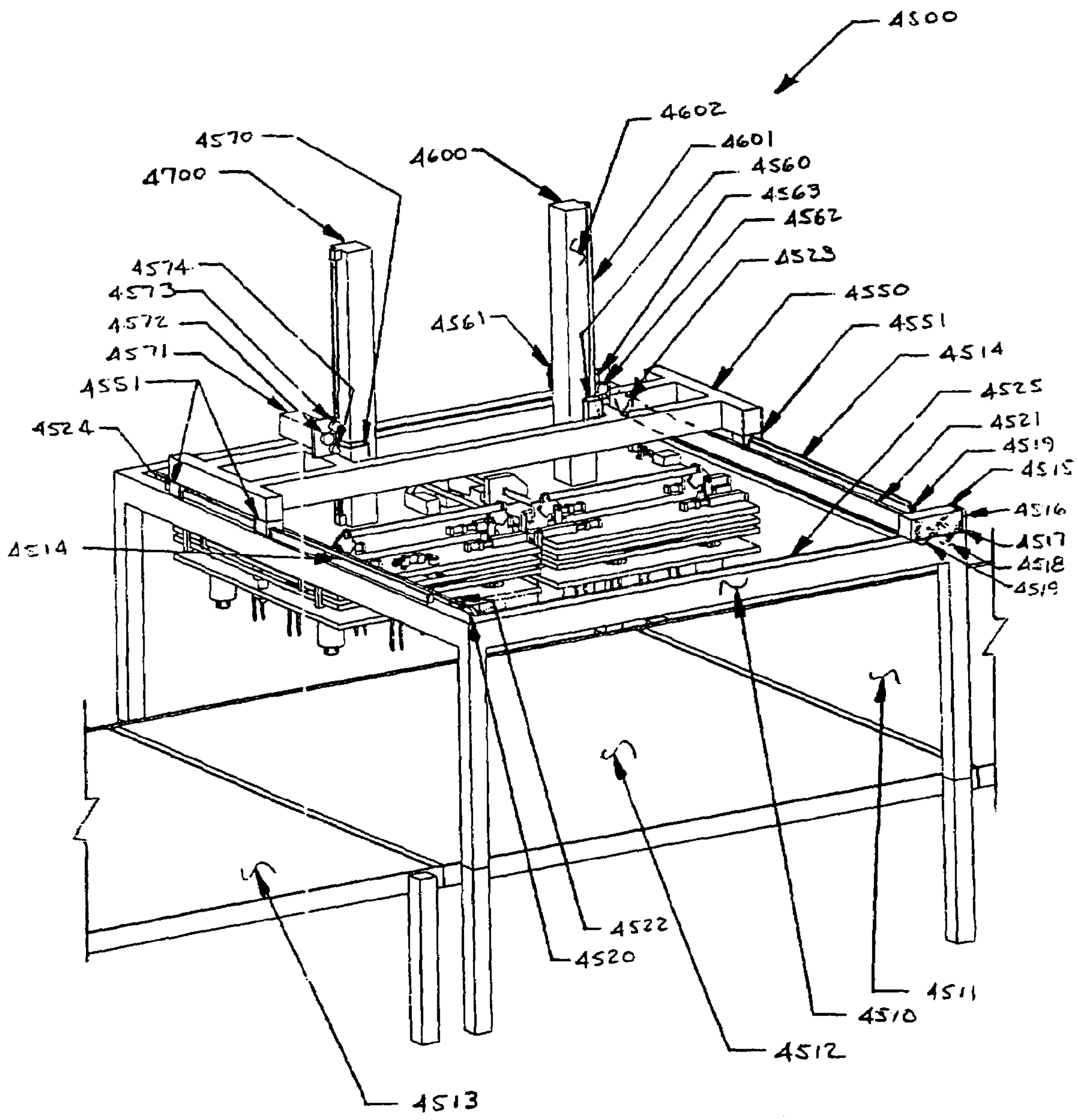

FIG. 61A is an overhead perspective view of a pallet/grid stacking/destacking unit and integral conveyors forming part of the pallet assembly/disassembly system of FIG. 49.

Figure 61B:
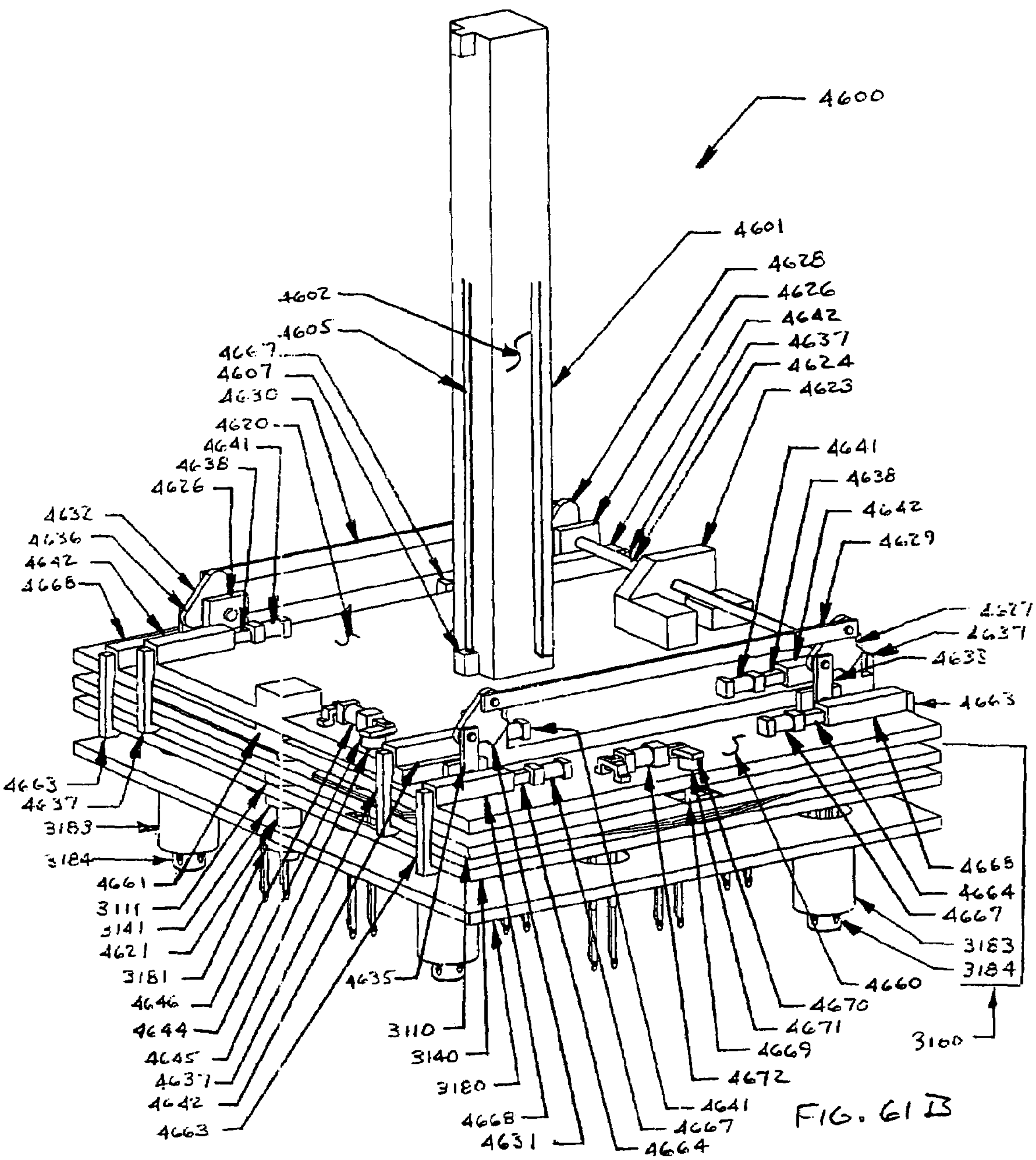

FIG. 61B is an overhead perspective view of one pallet gripper head assembly forming part of the pallet stacking/destacking unit of FIG. 61A.

Figure 61C:
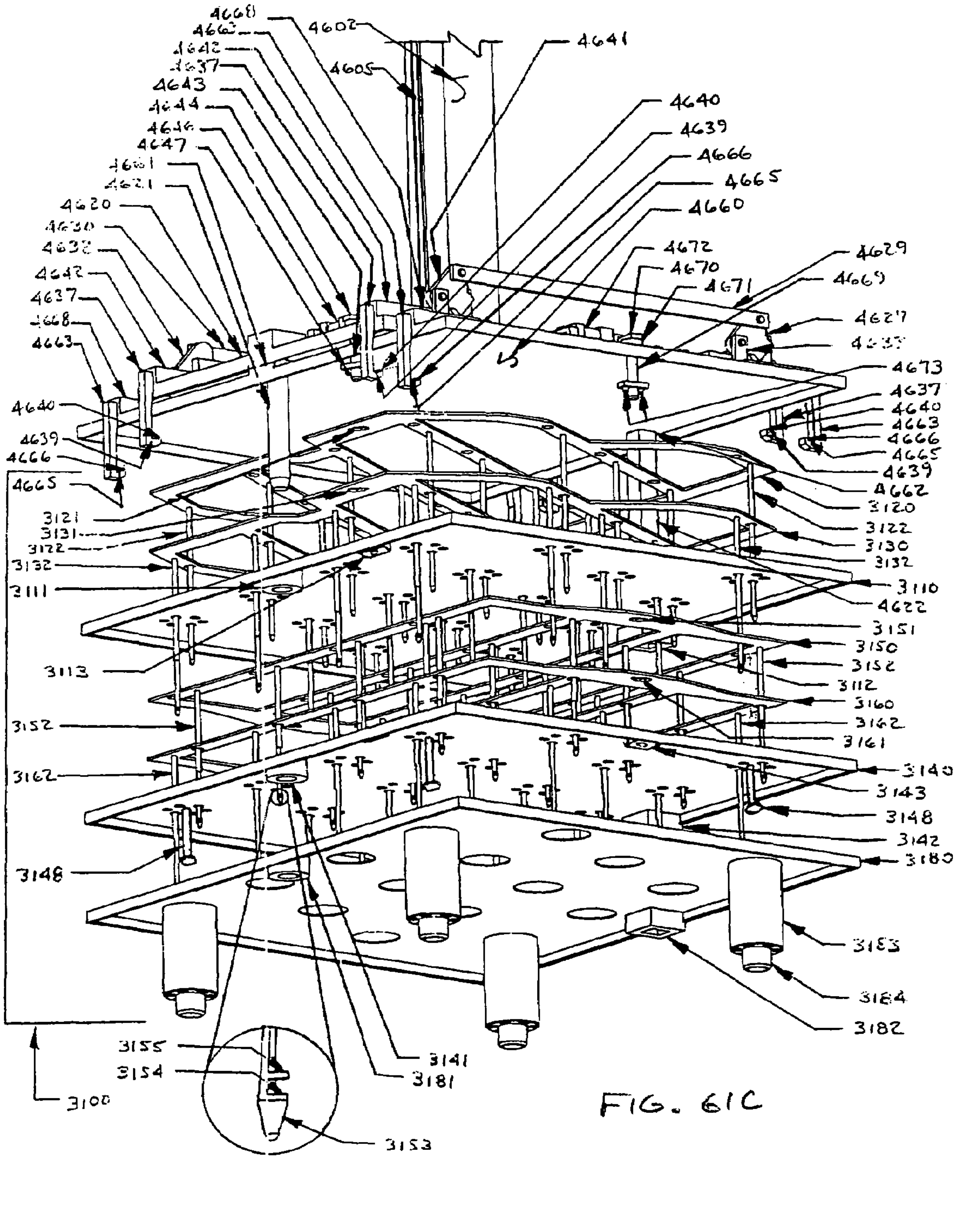

FIG. 61C is an underneath perspective, partially exploded, view of the pallet gripper head assembly of FIG. 61B.

Figure 61D:
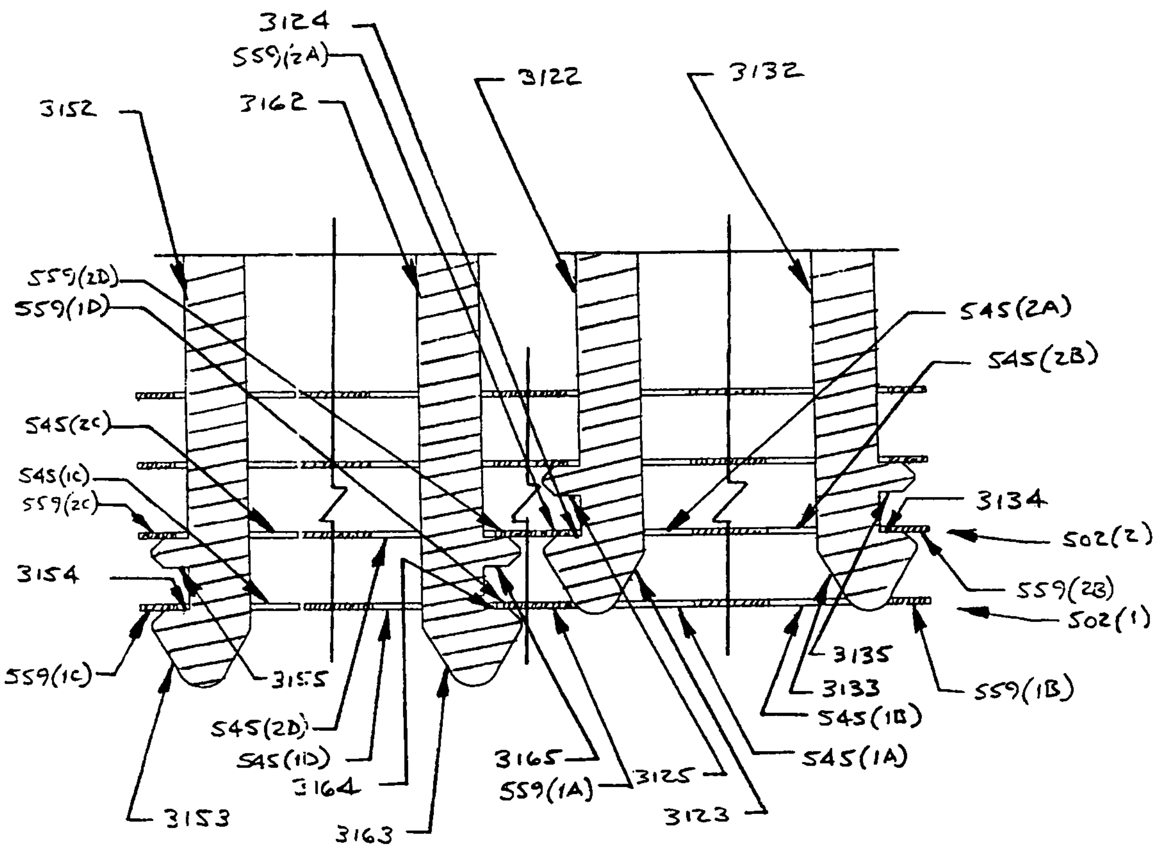

FIG. 61D depicts two side-by-side pairs of elevation section segments of a portion of pallet/grid stacking unit of FIG. 61A showing the spatial interaction between pallet hooks and pallets at start of a de-stacking cycle.

Figure 61E:
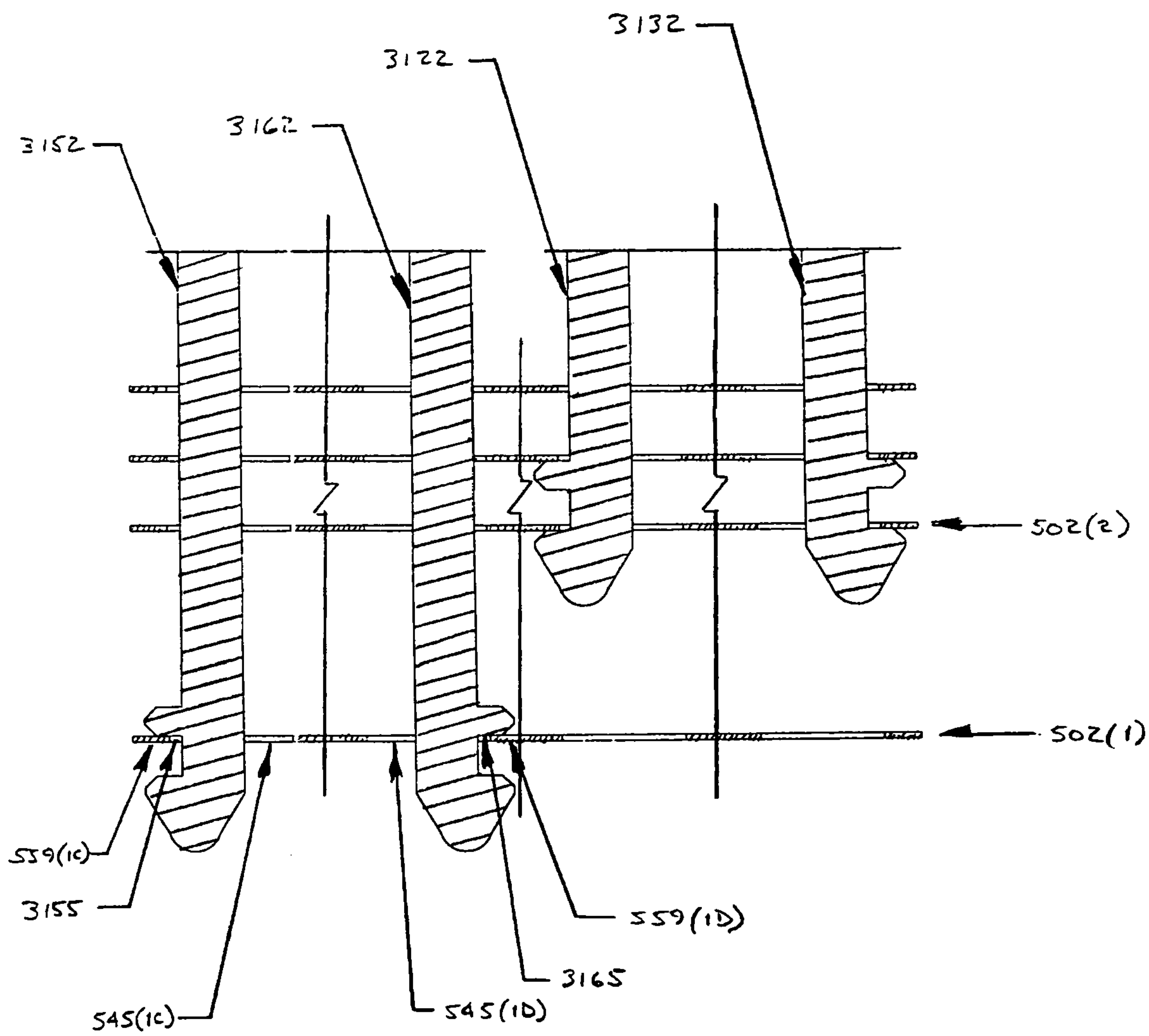

FIG. 61E depicts two side-by-side pairs of elevation section segments of a portion of pallet/grid stacking unit of FIG. 61A showing the spatial interaction between pallet hooks and pallets with singulation hook pair having spaced bottommost pallet downward from a hook-borne partial pallet stack to ensure reliable release in a de-stacking cycle.

Figure 61F:
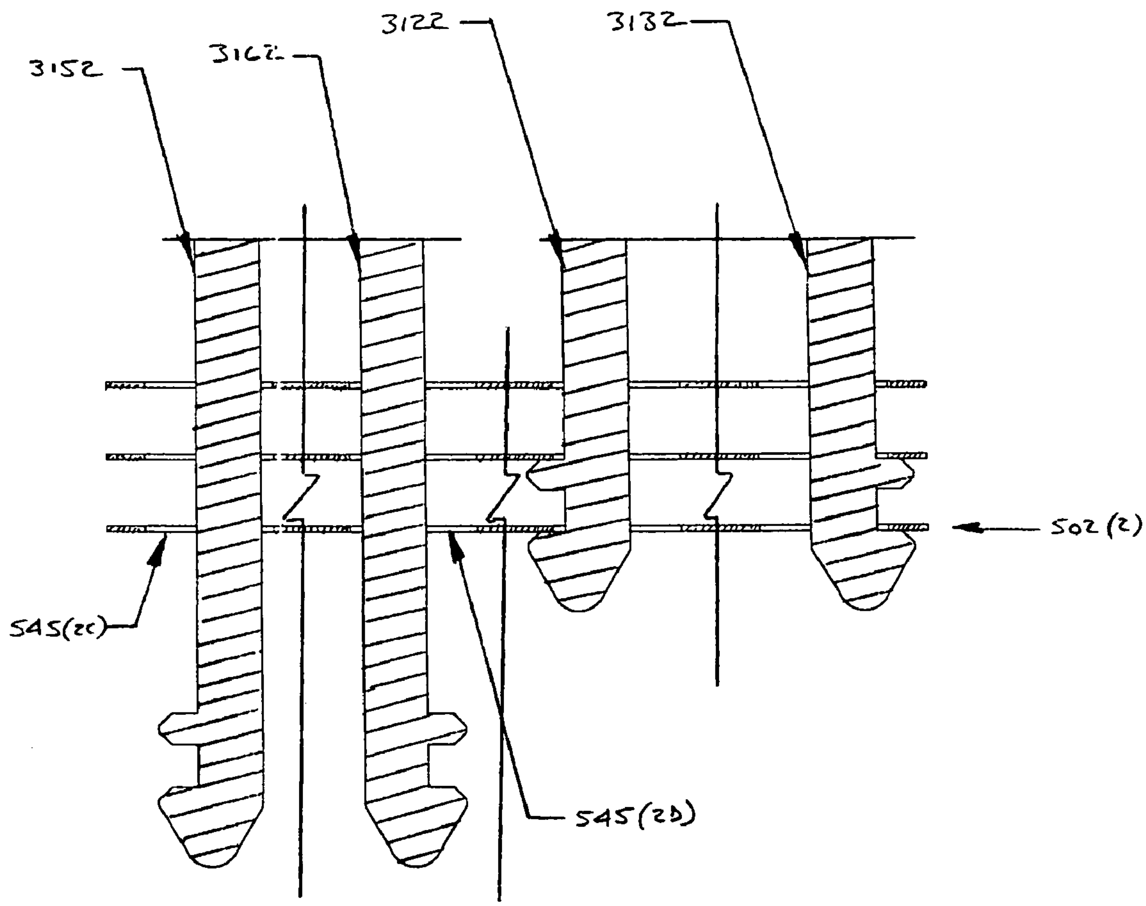

FIG. 61F depicts two side-by-side pairs of elevation section segments of a portion of pallet/grid stacking unit of FIG. 61A showing the spatial interaction between pallet hooks and pallets with a downwardly spaced pallet released and removed from a hook-borne partial pallet stack in a de-stacking cycle.

Figure 61G:
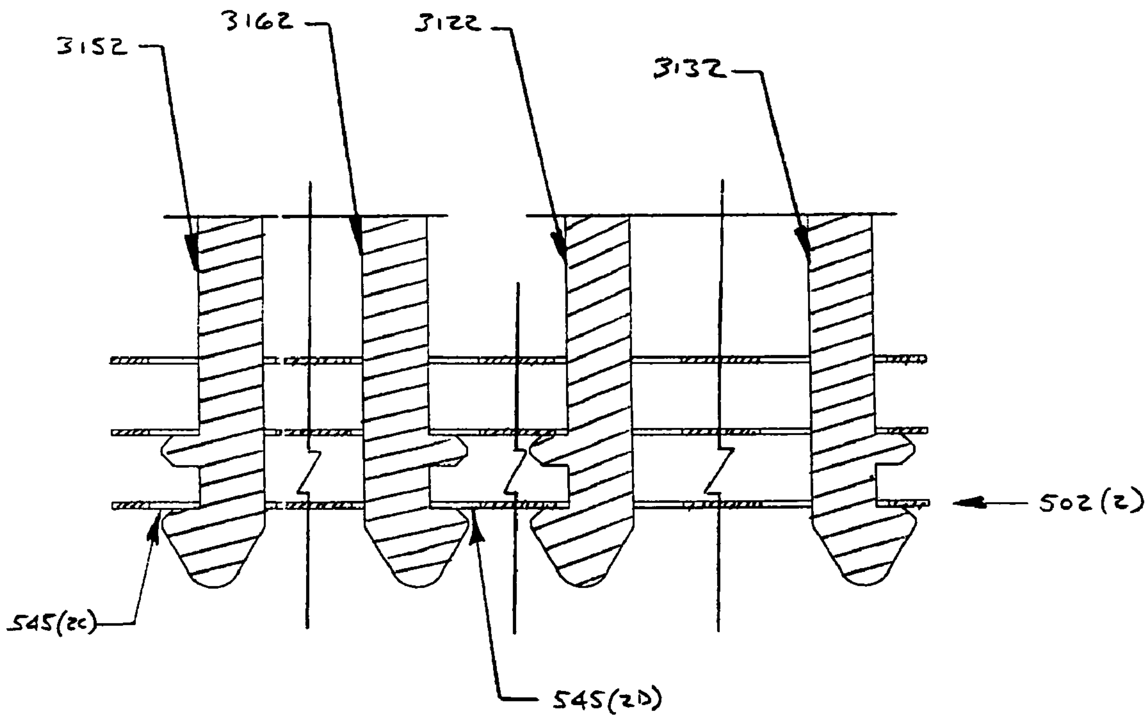

FIG. 61G depicts two side-by-side pairs of elevation section segments of a portion of pallet/grid stacking unit of FIG. 61A showing the spatial interaction between pallet hooks and pallets with pallet-singulating hook pair having moved upward ready to engage new bottommost pallet of hook-borne partial pallet stack in a de-stacking cycle.

Figure 61H:
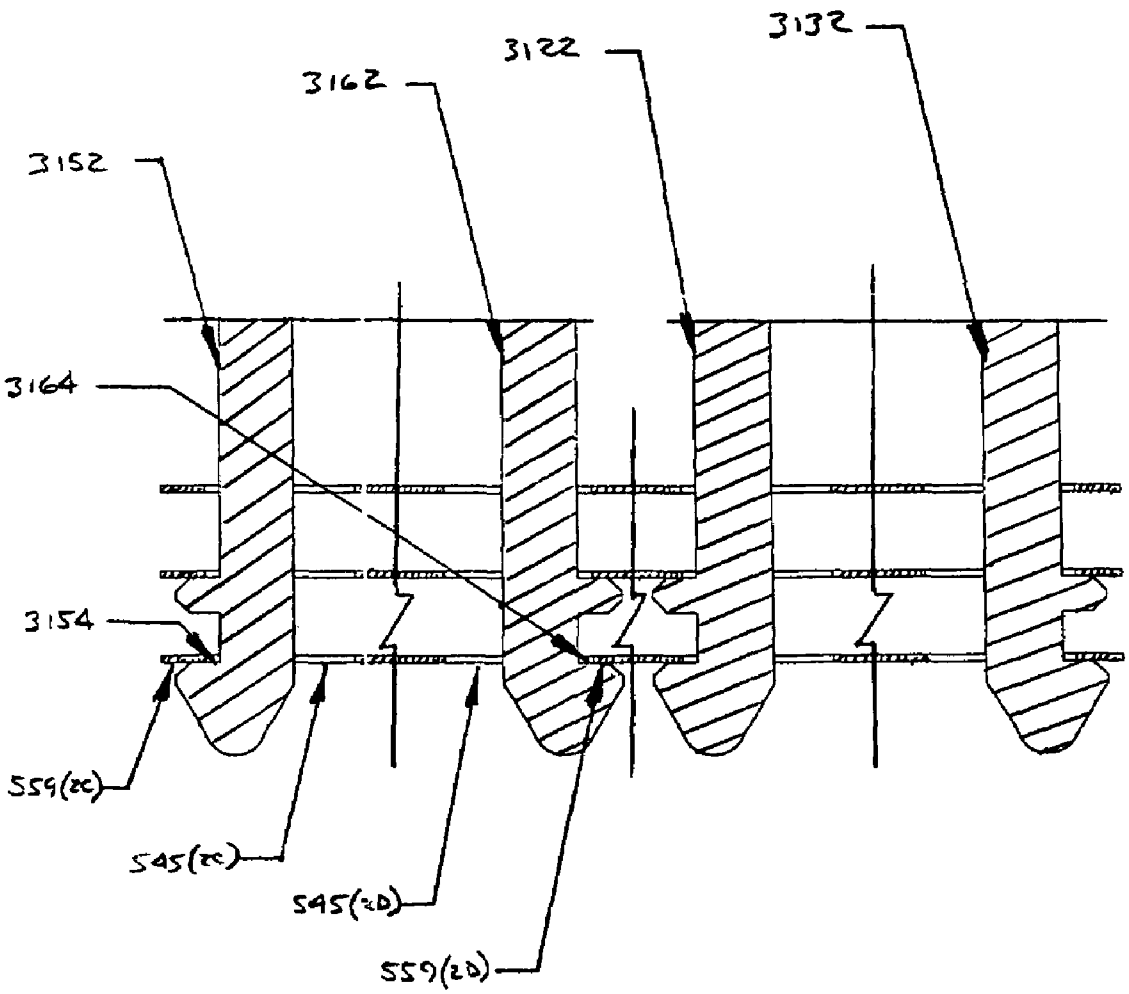
Figure 61:
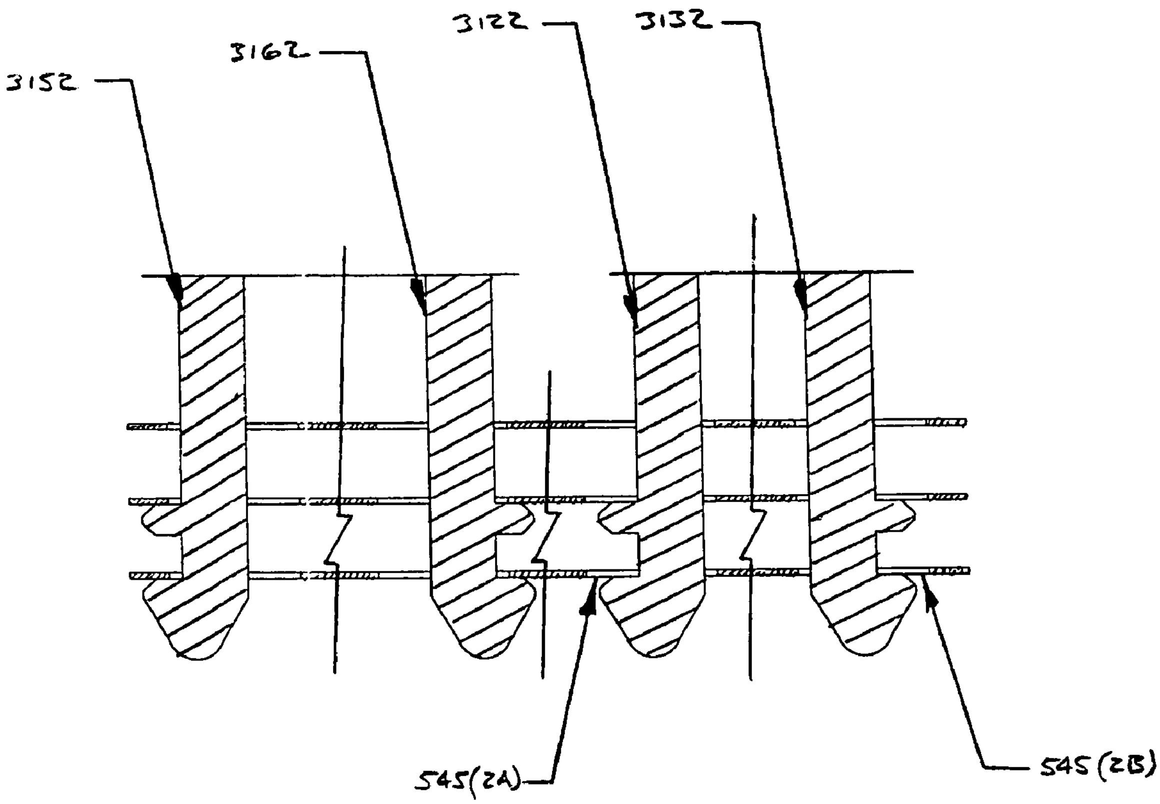

FIG. 61H depicts two side-by-side pairs of elevation section segments of a portion of pallet/grid stacking unit of FIG. 61A showing the spatial interaction between pallet hooks and pallets with pallet-singulating hook pair engaging new bottommost pallet of hook-borne partial pallet stack in a de-stacking cycle.

FIG. 61I depicts two side-by-side pairs of elevation section segments of a portion of pallet/grid stacking unit of FIG. 61A showing the spatial interaction between pallet hooks and pallets with pallet holding hook pair disengaged from new bottommost pallet of hook-borne partial pallet stack in a de-stacking cycle.

Figure 61J:
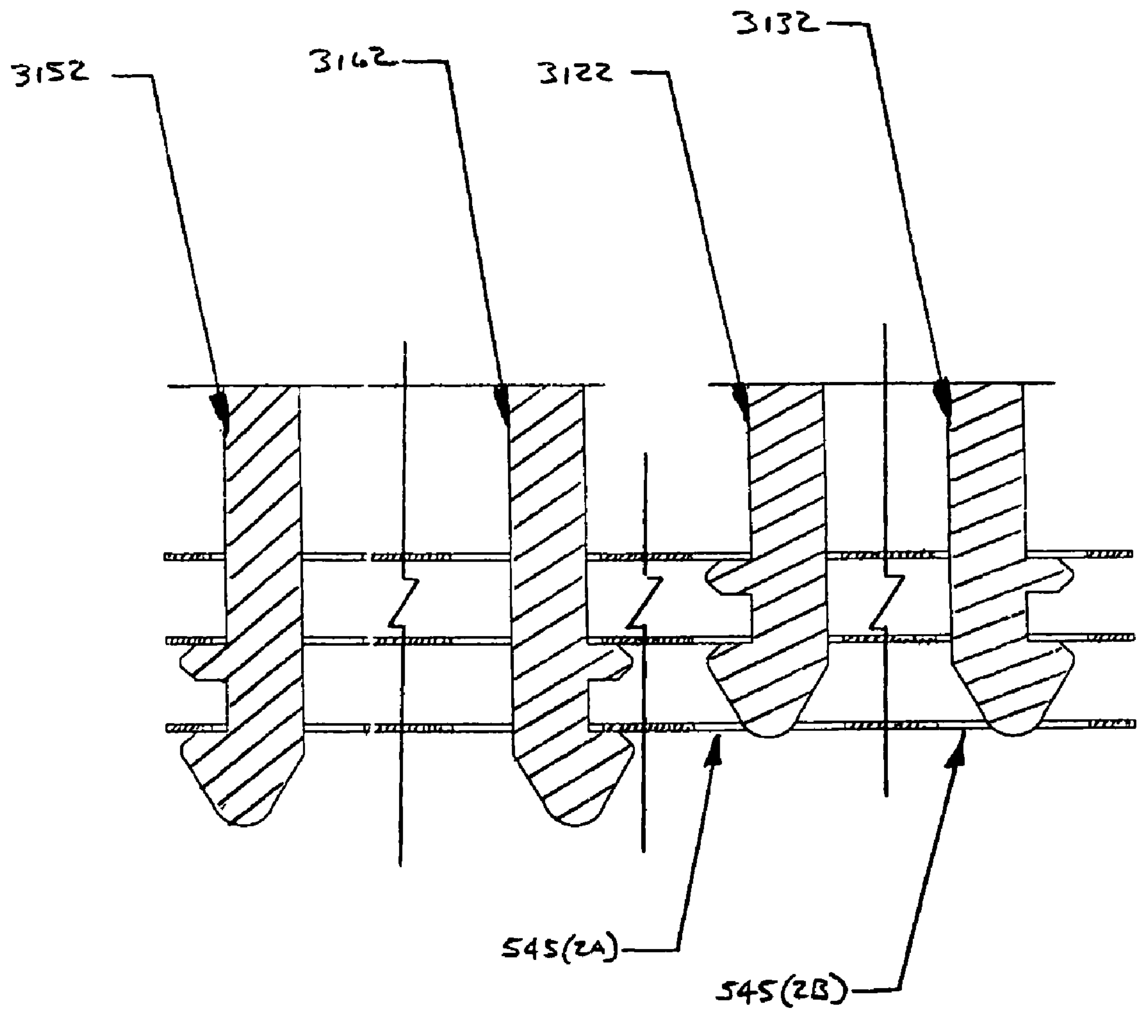

FIG. 61J depicts two side-by-side pairs of elevation section segments of a portion of pallet/grid stacking unit of FIG. 61A showing the spatial interaction between pallet hooks and pallets with pallet singulation hook pair having returned downward to its original position, having lowered remaining partial pallet stack with it in a de-stacking cycle.

Figure 61K:
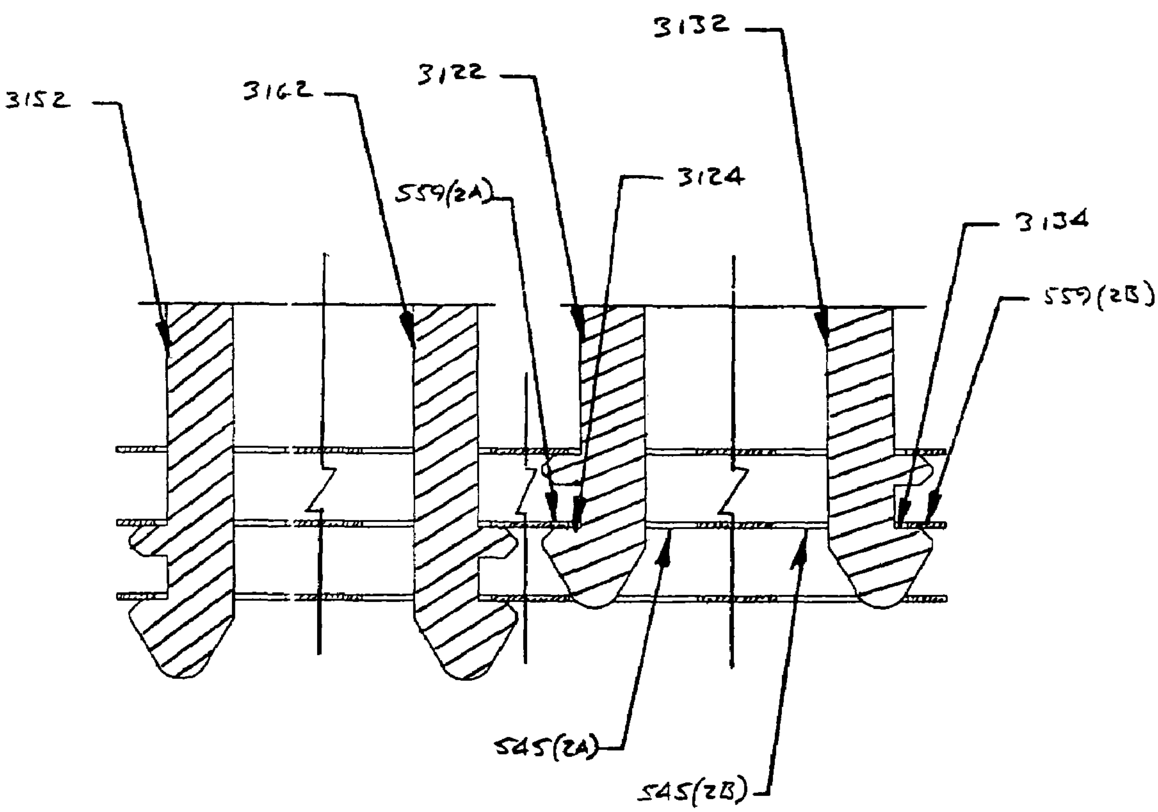

FIG. 61K depicts two side-by-side pairs of elevation section segments of a portion of pallet/grid stacking unit of FIG. 61A showing the spatial interaction between pallet hooks and pallets with pallet holding hook pair having engaged second bottommost pallet of remaining hook-borne partial pallet stack in a de-stacking cycle.

Figure 61L:
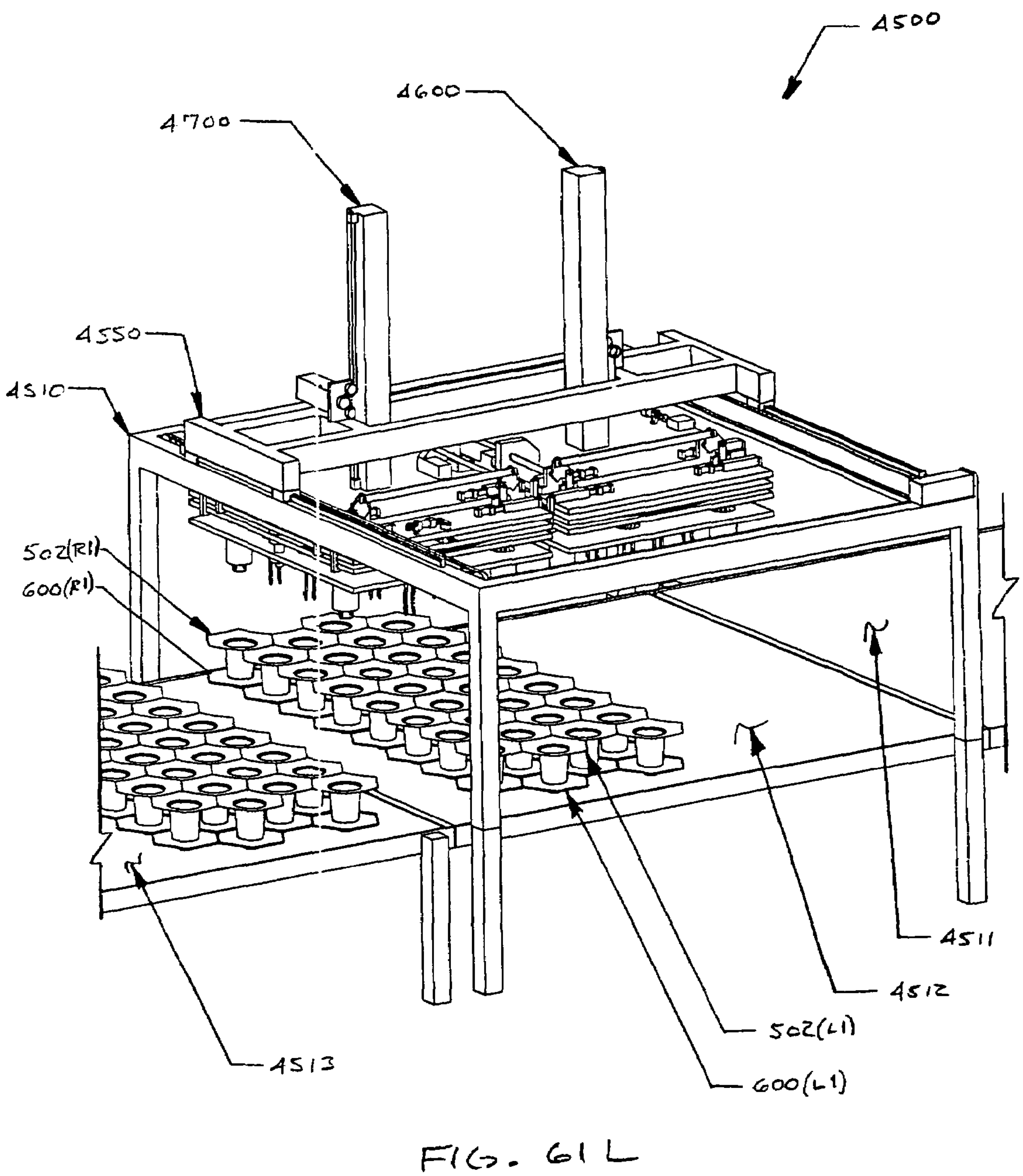

FIG. 61L is an overhead perspective view of the pallet/grid stacking/destacking unit of FIG. 61A, starting a stacking process.

Figure 61M:
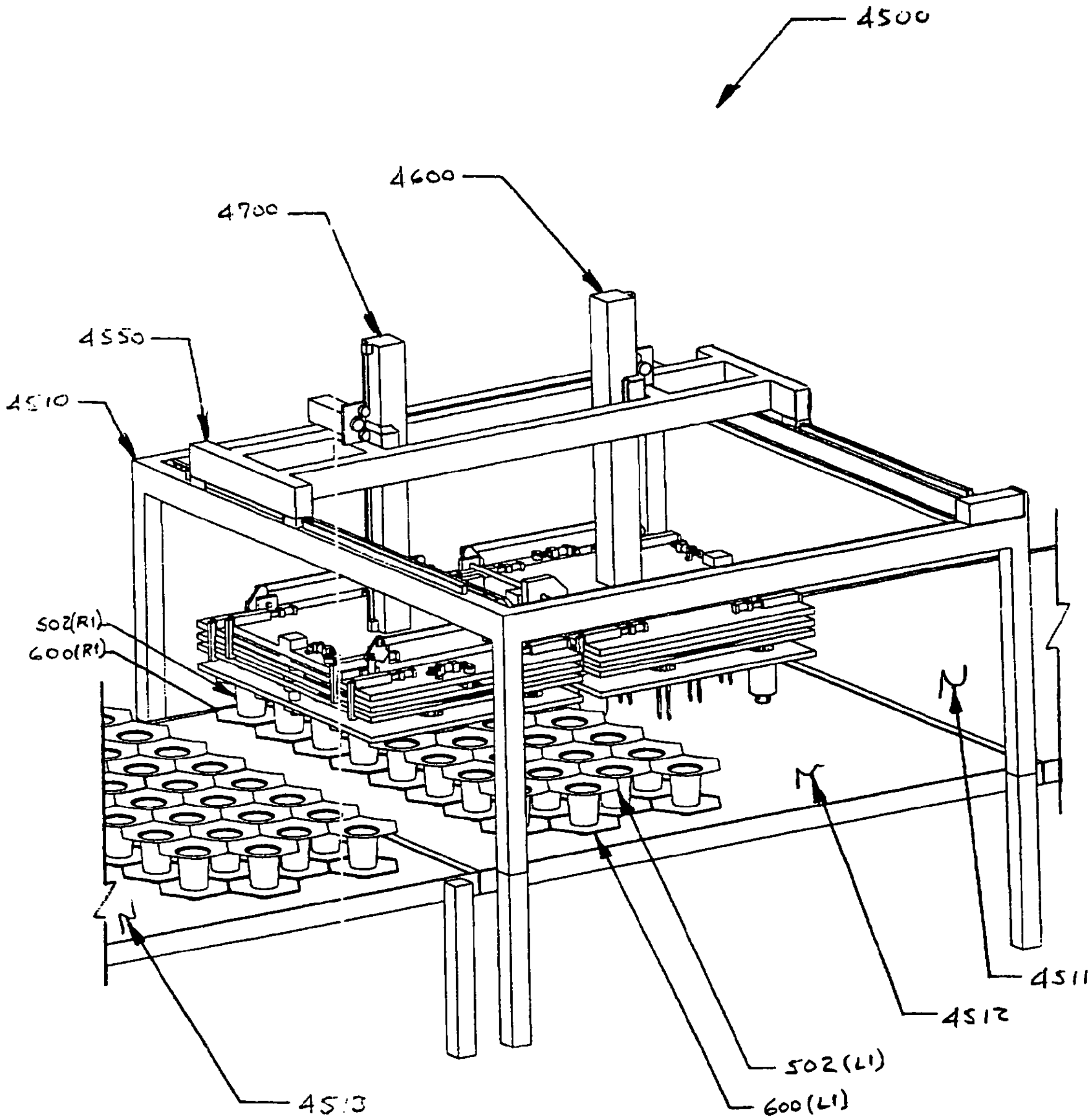
Figure 61:
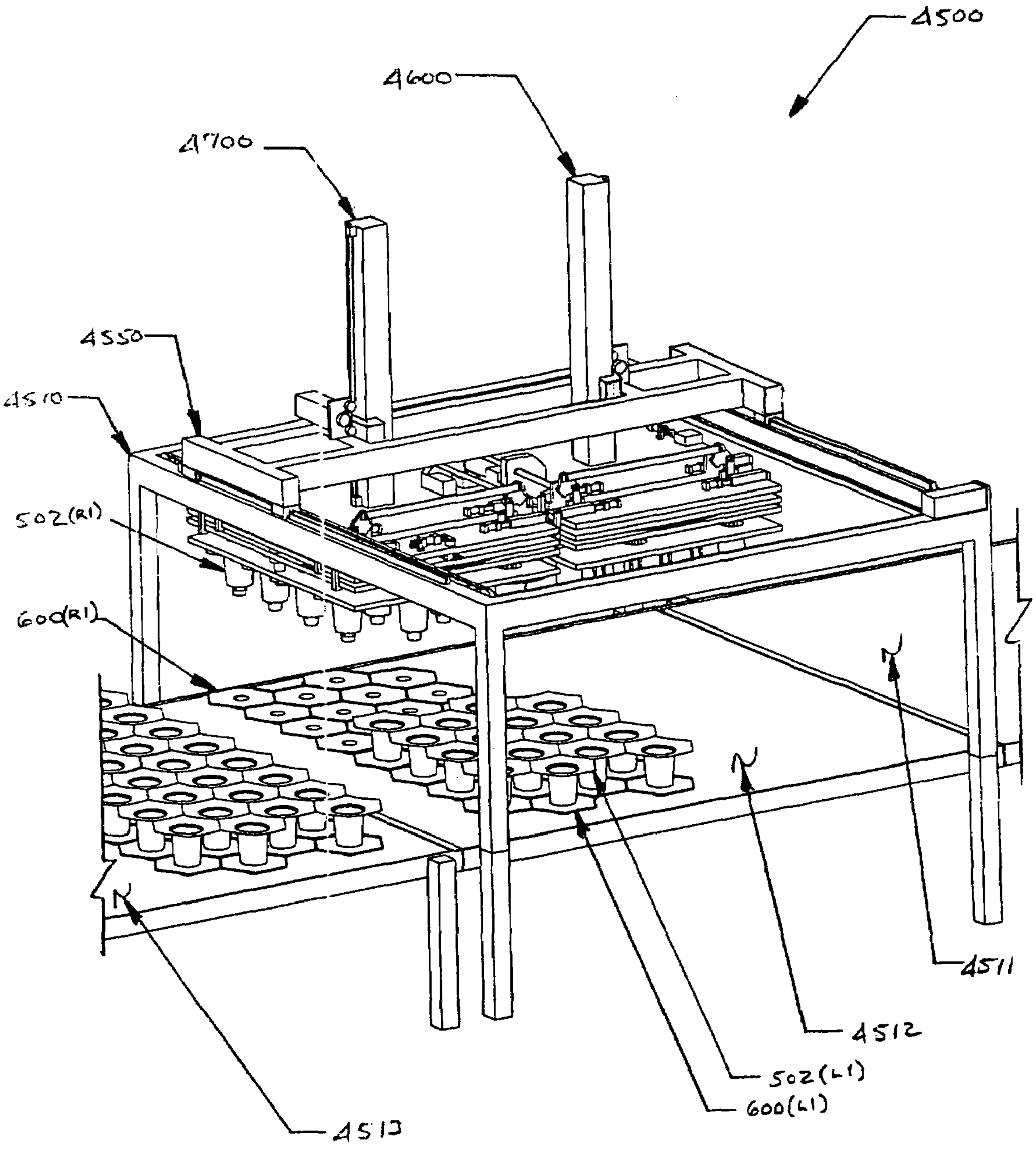

FIG. 61M is an overhead perspective view of the pallet/grid stacking/destacking unit of FIG. 61A, in a second step of a stacking process, engaging a first pallet on a first side of an associated pallet conveyor.

FIG. 61N is an overhead perspective view of the pallet/grid stacking/destacking unit of FIG. 61A, in a third step of a stacking process, having engaged and separated a first pallet from an associated first grid on a first side of an associated pallet conveyor.

Figure 61P:
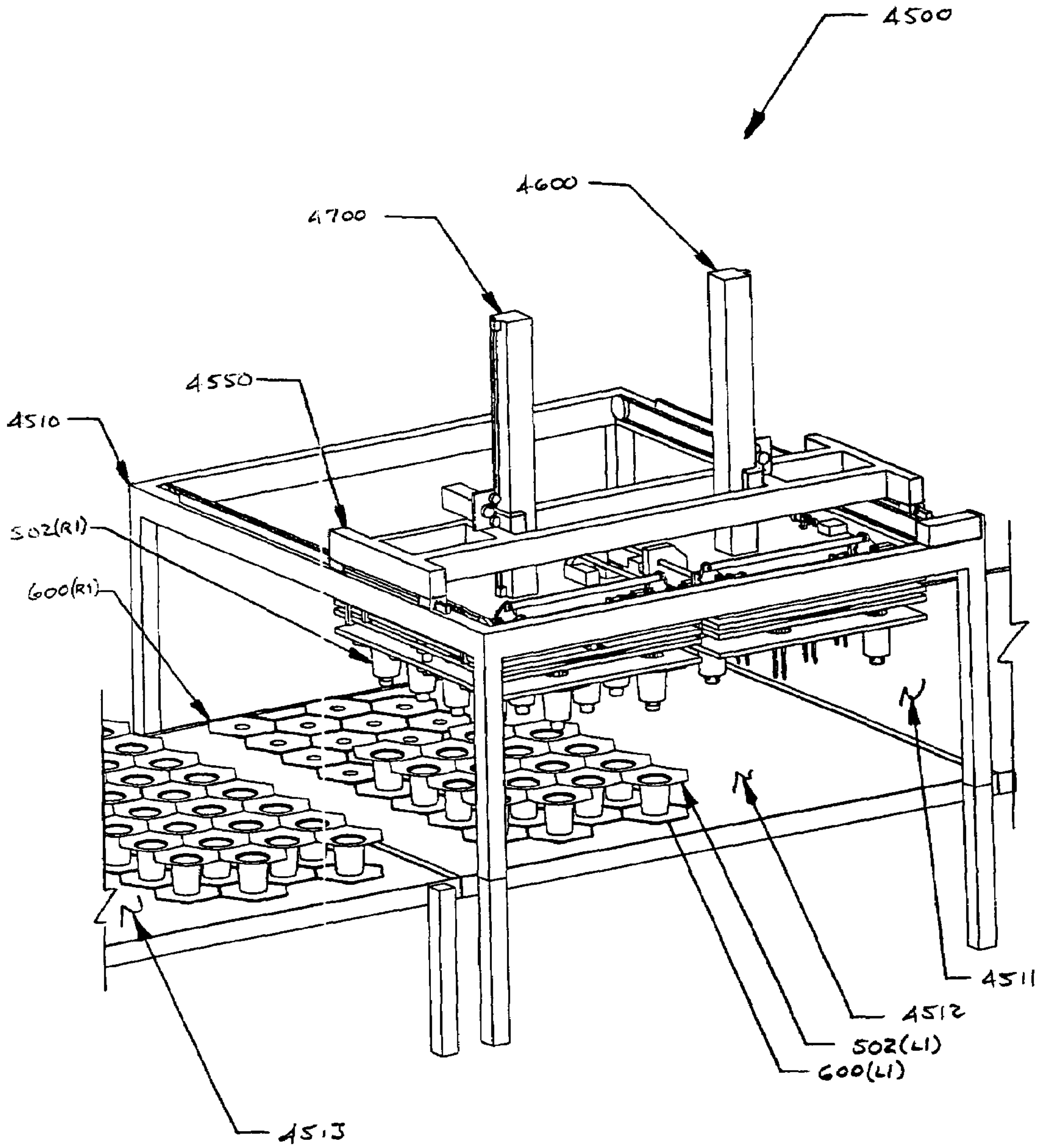

FIG. 61P is an overhead perspective view of the pallet/grid stacking/destacking unit of FIG. 61A, in a fourth step of a stacking process, wherein pallet/grid gripper heads have shuttled to above a second side an associated pallet conveyor.

Figure 61Q:
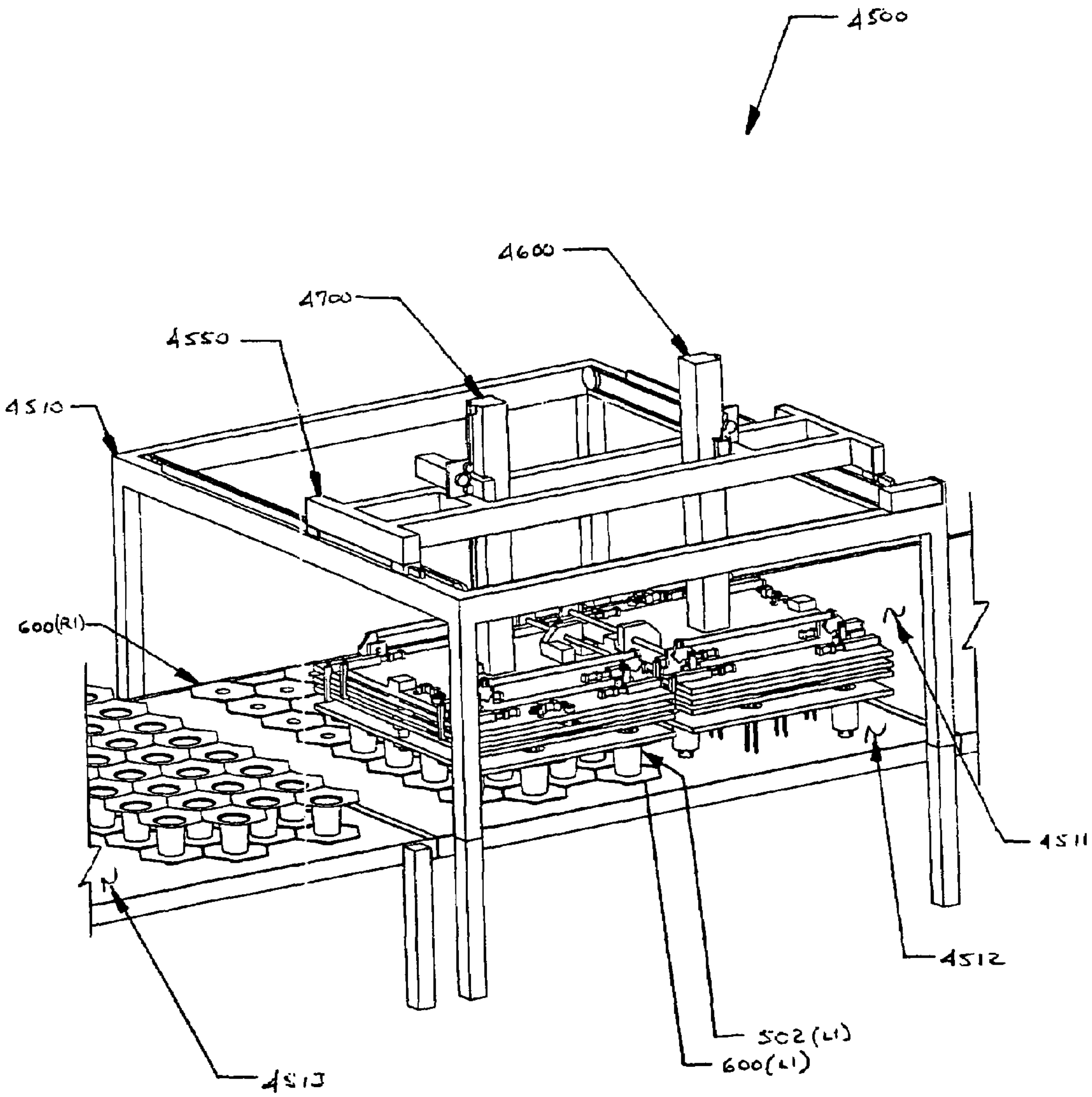

FIG. 61Q is an overhead perspective view of the pallet/grid stacking/destacking unit of FIG. 61A, in a fifth step of a stacking process, engaging a second pallet on a second side of an associated pallet conveyor.

Figure 61R:
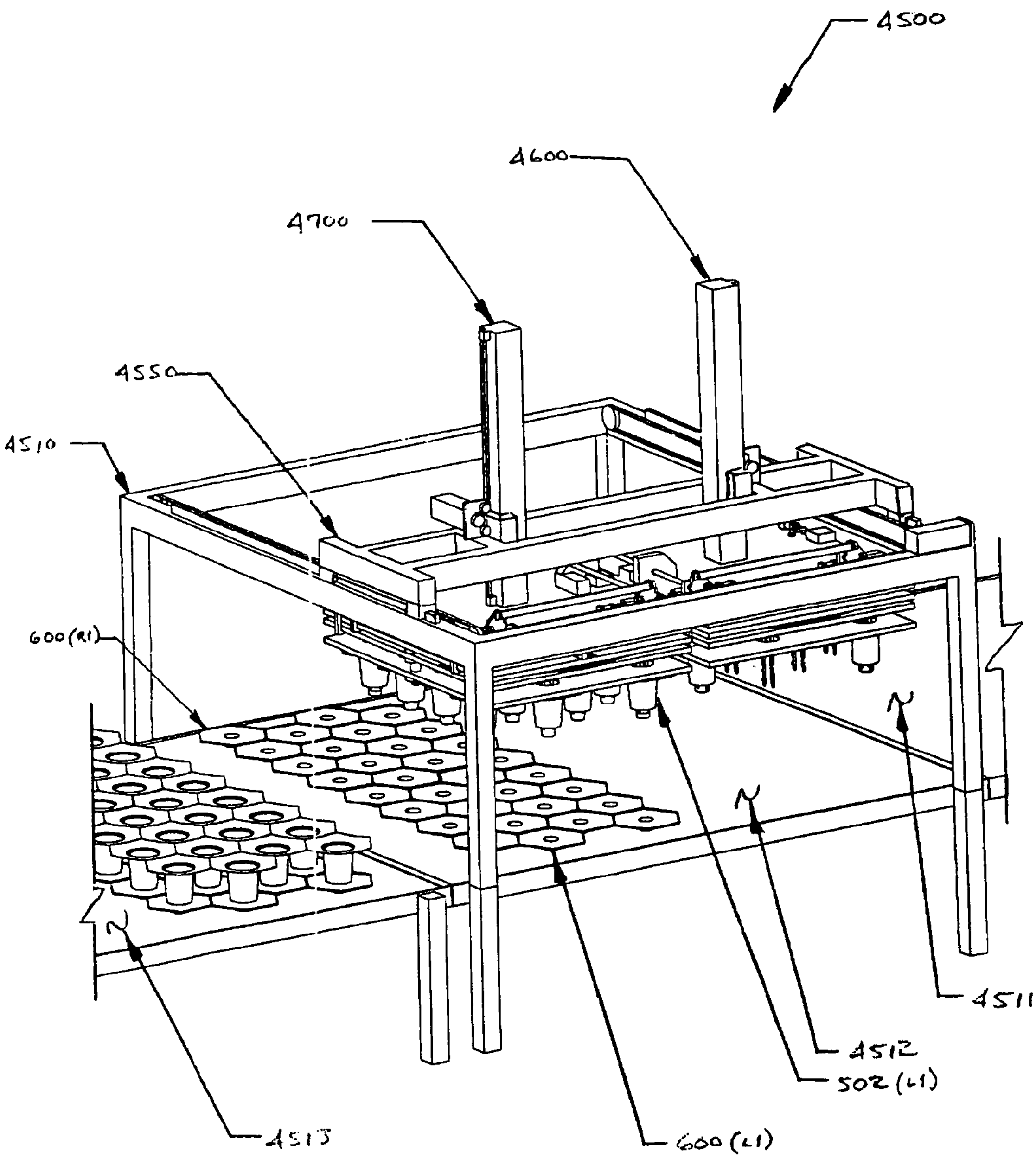

FIG. 61R is an overhead perspective view of the pallet/grid stacking/destacking unit of FIG. 61A, in a sixth step of a stacking process, having engaged and separated a second pallet from an associated second grid on a second side of an associated pallet conveyor.

Figure 61S:
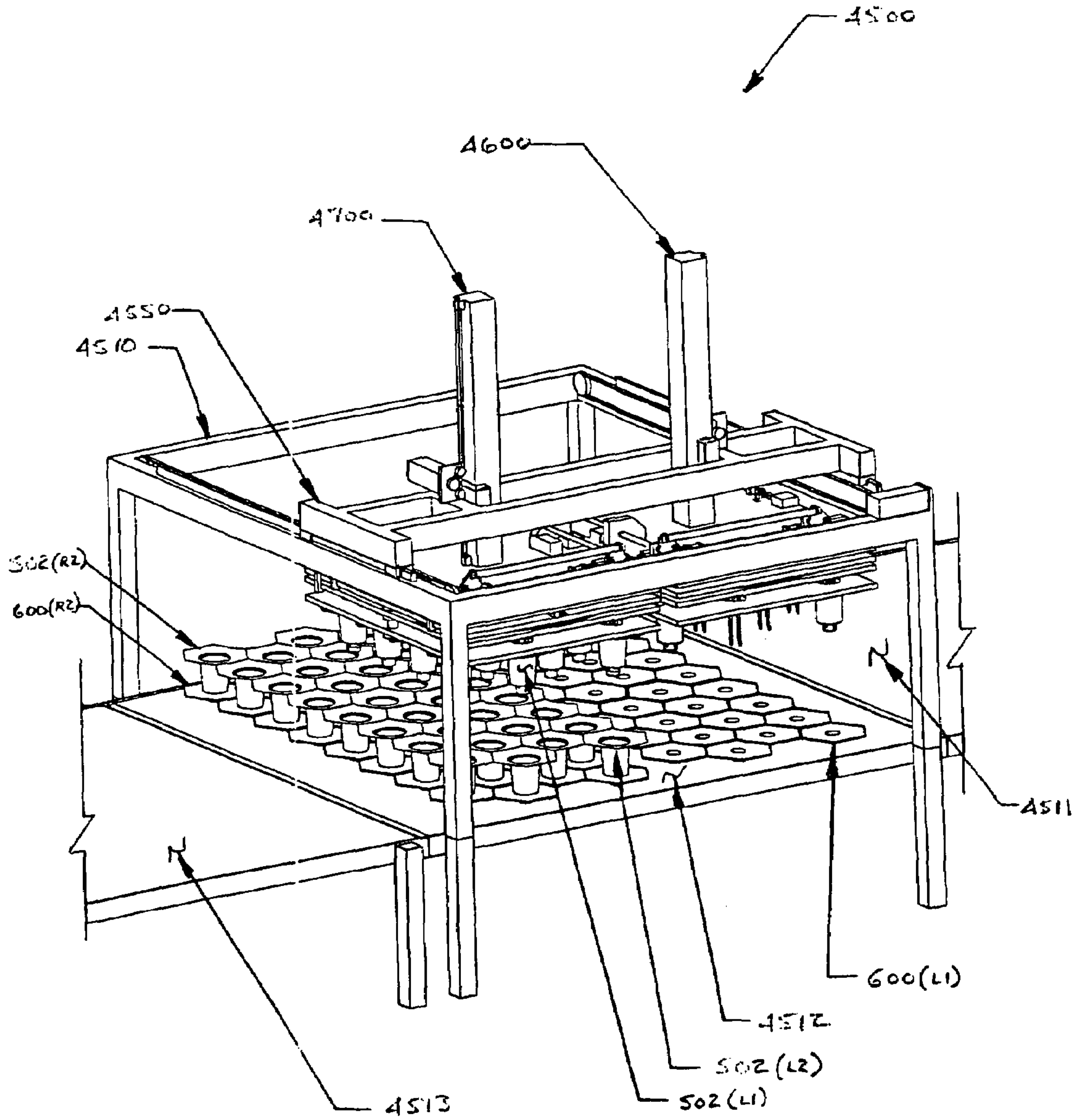

FIG. 61S is an overhead perspective view of the pallet/grid stacking/destacking unit of FIG. 61A, in a seventh step of a stacking process, wherein pallet conveyor has indexed associated pallets and grids for a subsequent, similar stacking sequence.

PAGTU

Figure 62A:
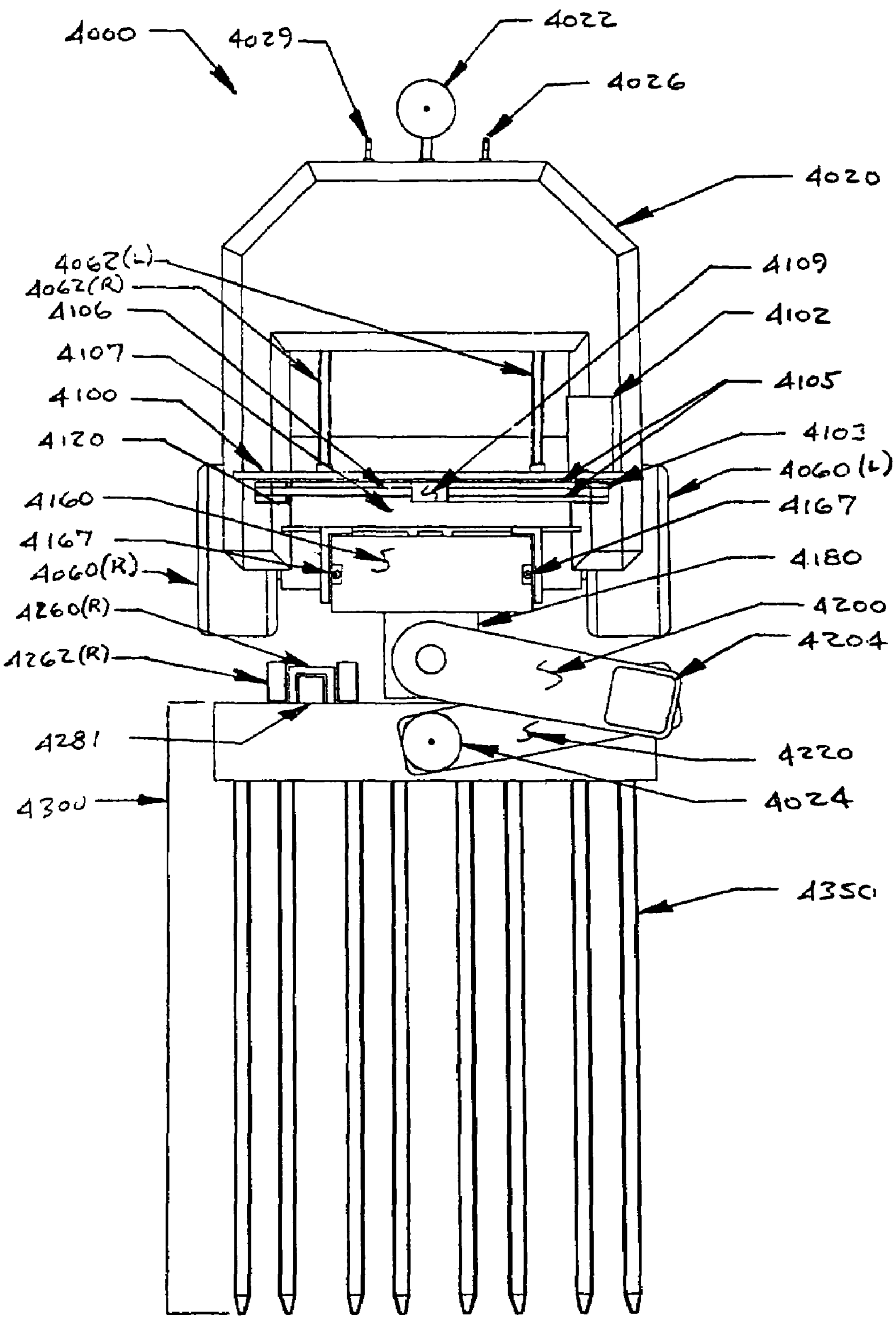

FIG. 62A is a plan view of a pallet assembly greenhouse transfer unit in accordance with a first embodiment of the invention.

Figure 62B:
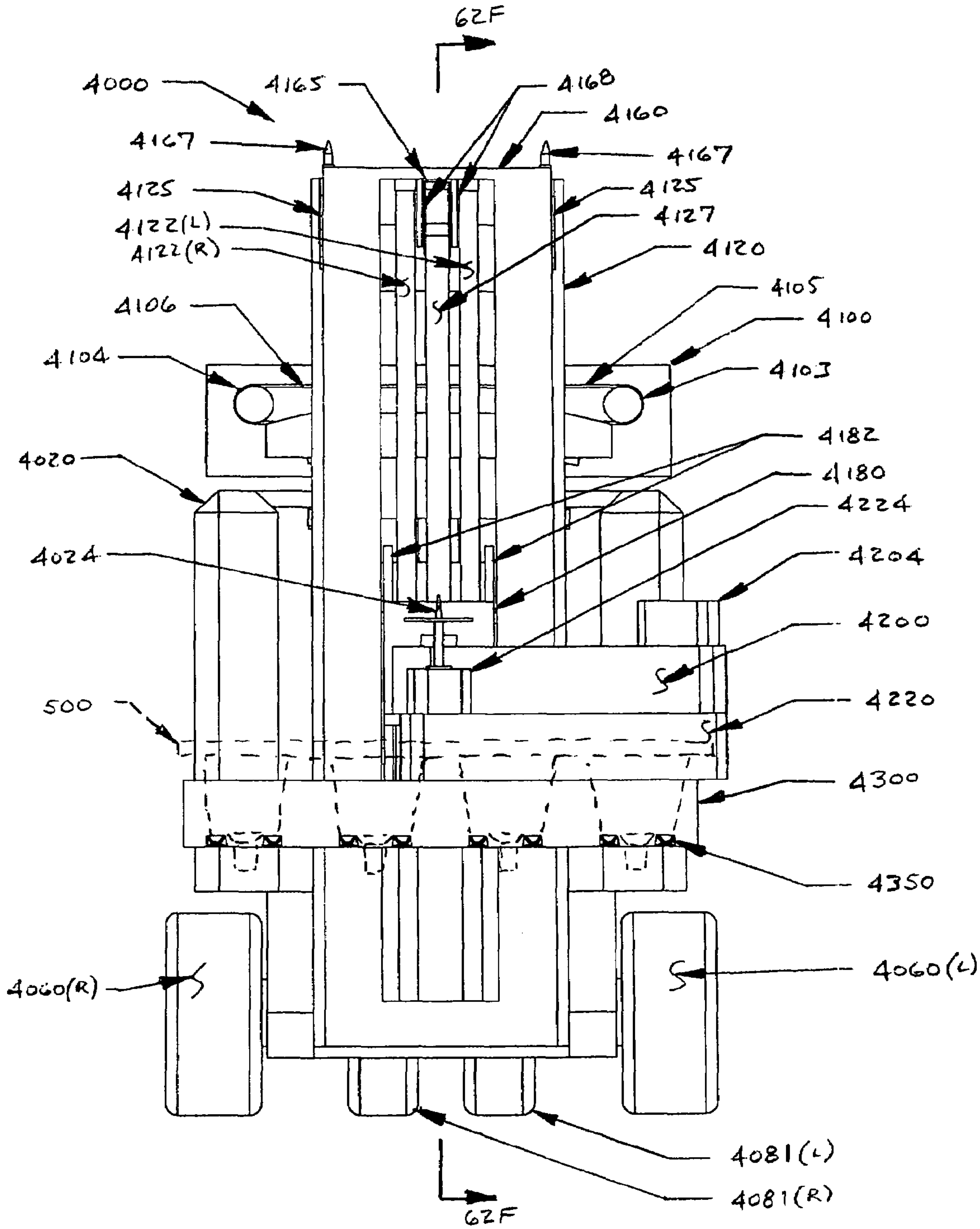

FIG. 62B is a front elevation view of a pallet assembly greenhouse transfer unit in accordance with a first embodiment of the invention.

Figure 62C:
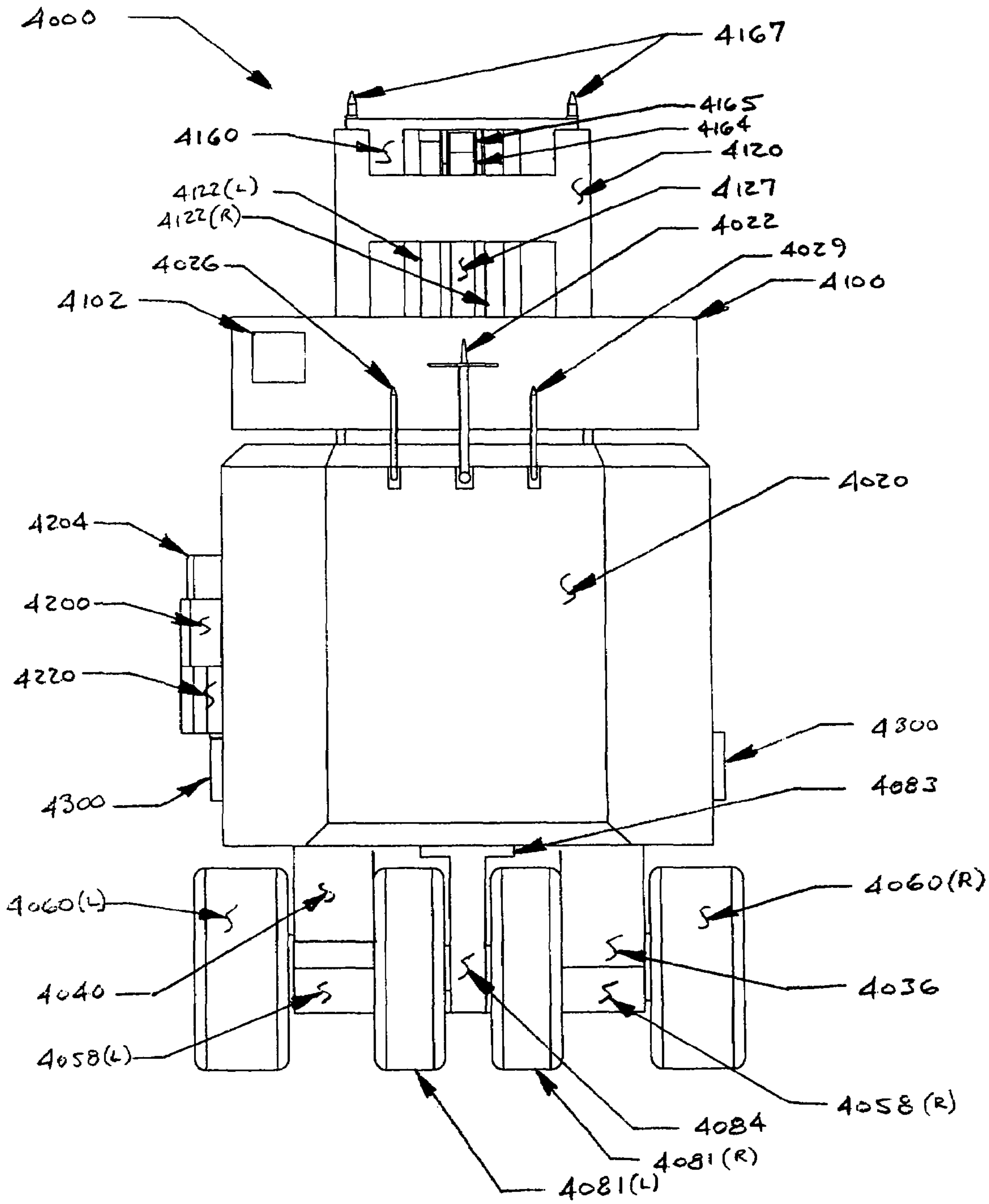

FIG. 62C is a rear elevation view of a pallet assembly greenhouse transfer unit in accordance with a first embodiment of the invention.

Figure 62D:
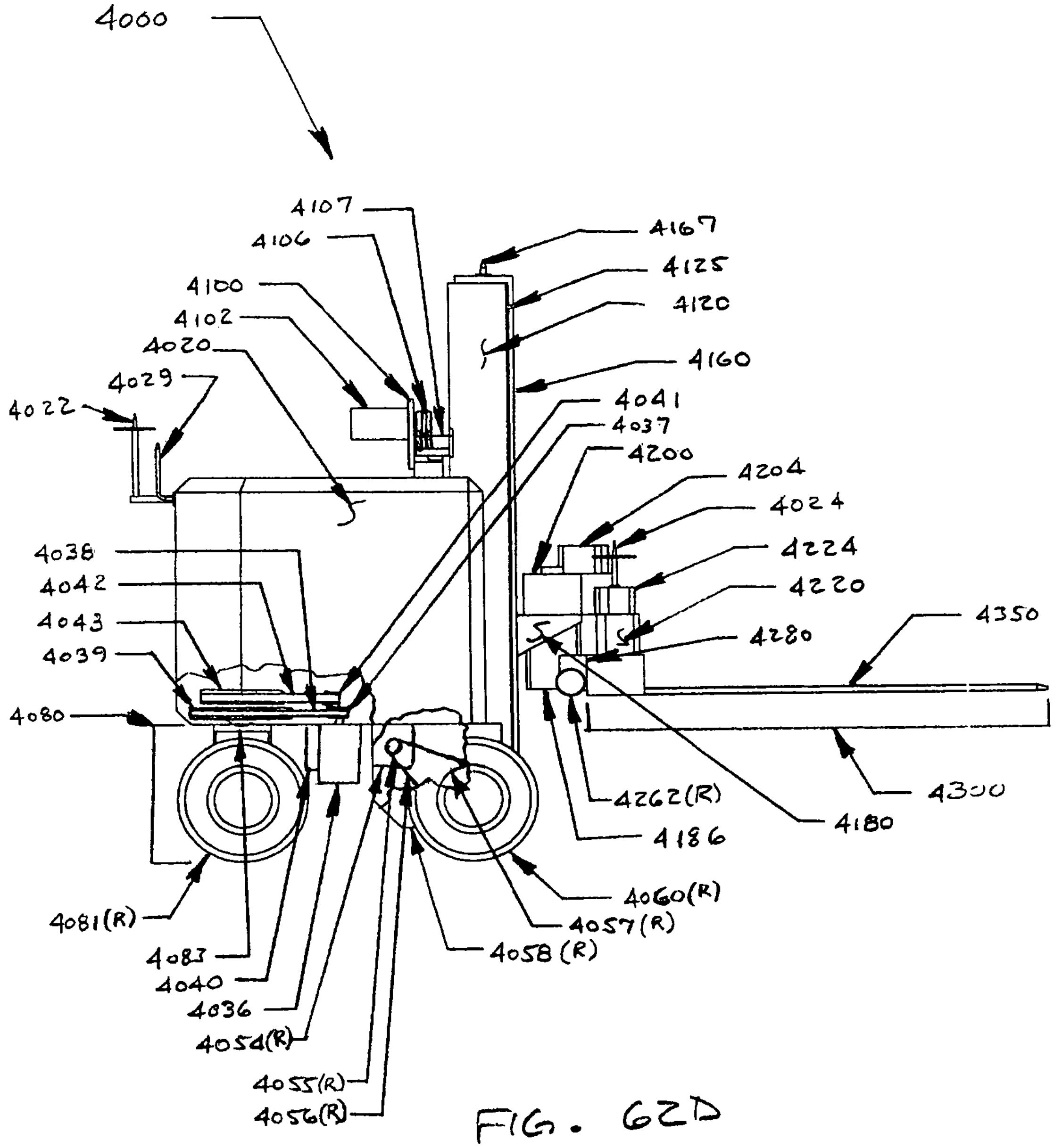

FIG. 62D is a side elevation view of a pallet assembly greenhouse transfer unit in accordance with a first embodiment of the invention.

Figure 62E:
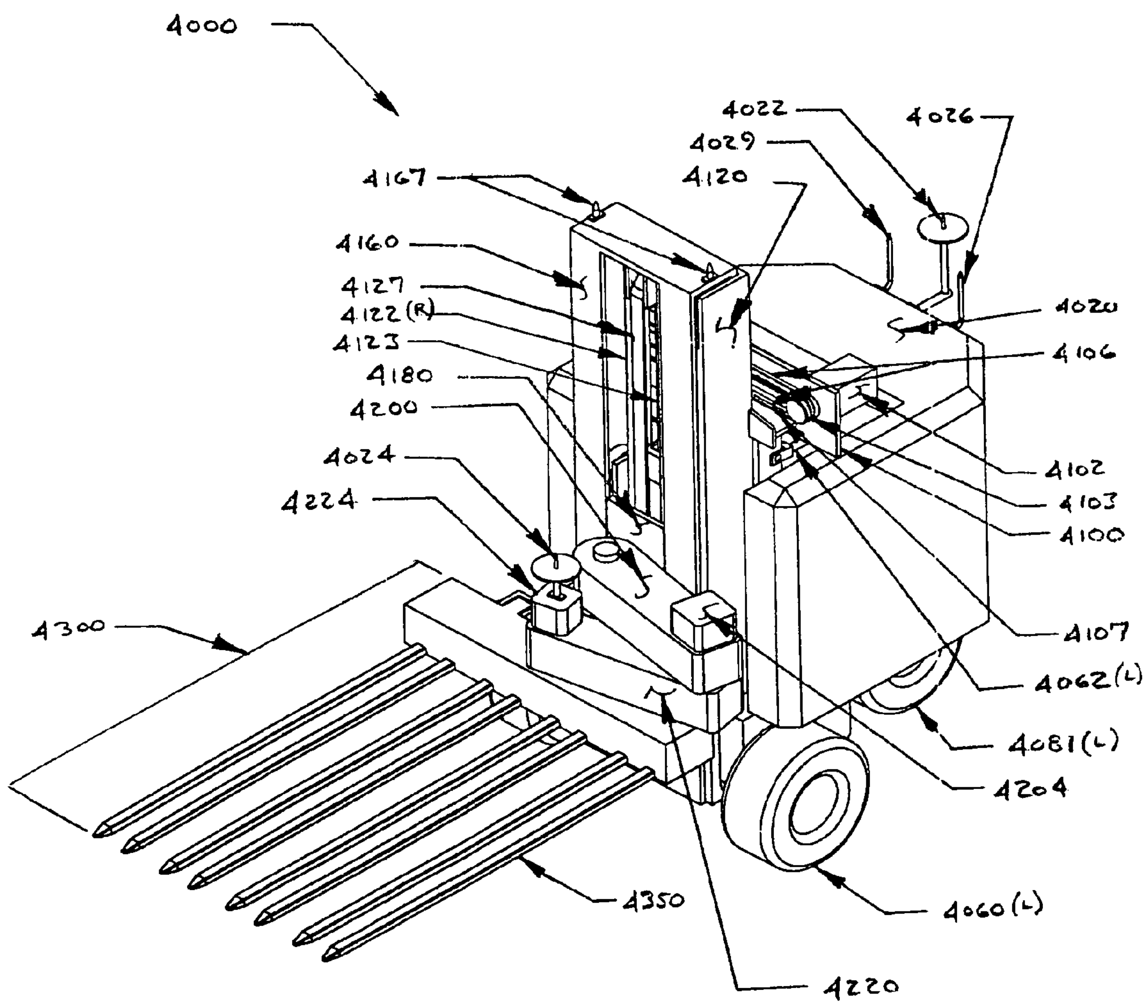

FIG. 62E is a perspective view of a pallet assembly greenhouse transfer unit in accordance with a first embodiment of the invention.

Figure 62F:
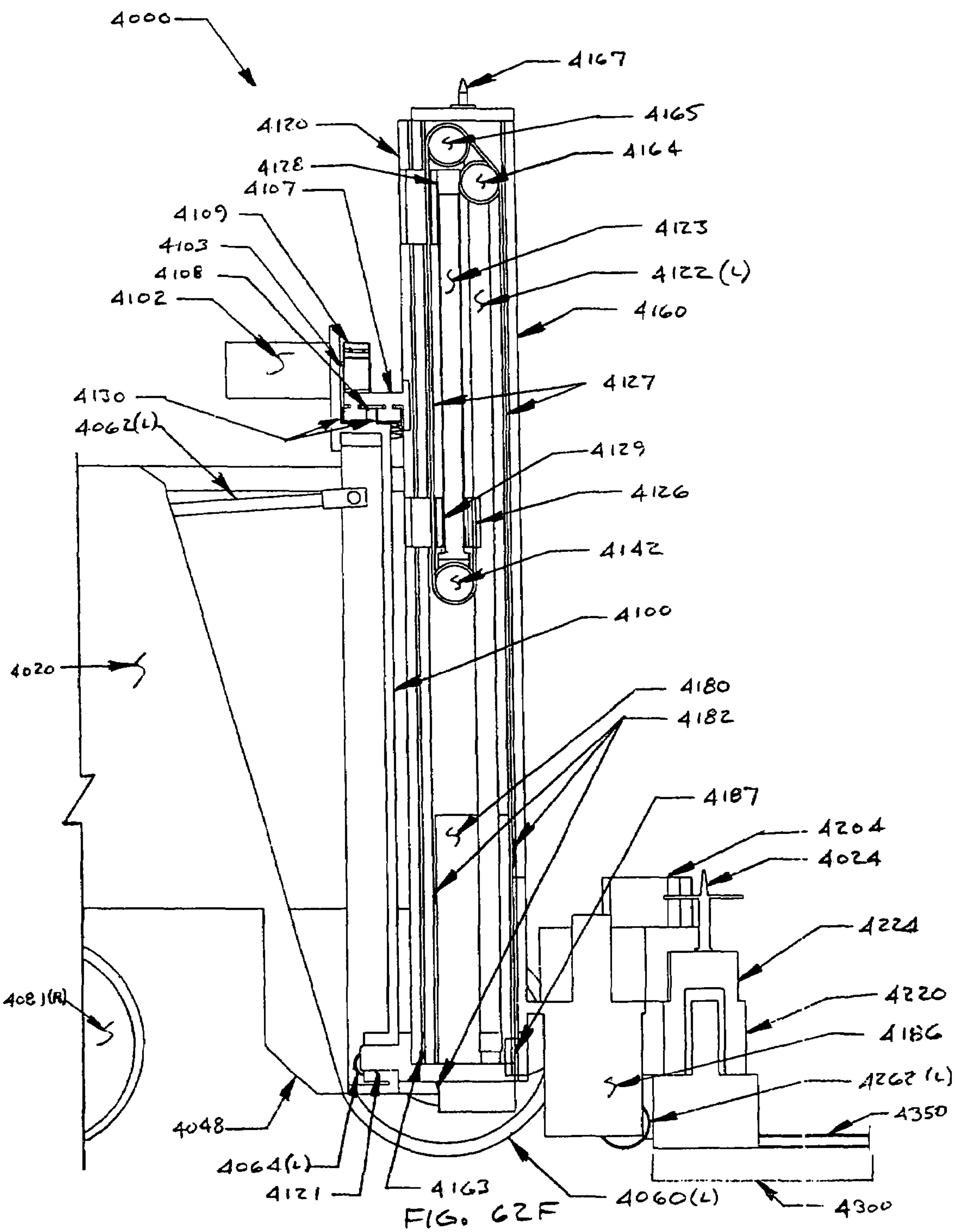

FIG. 62F is a section view of the fork vertical guide (mast)/drive portion of a pallet assembly greenhouse transfer unit in accordance with a first embodiment of the invention, looking in direction 62F-62F of FIG. 62B.

Figure 62G:
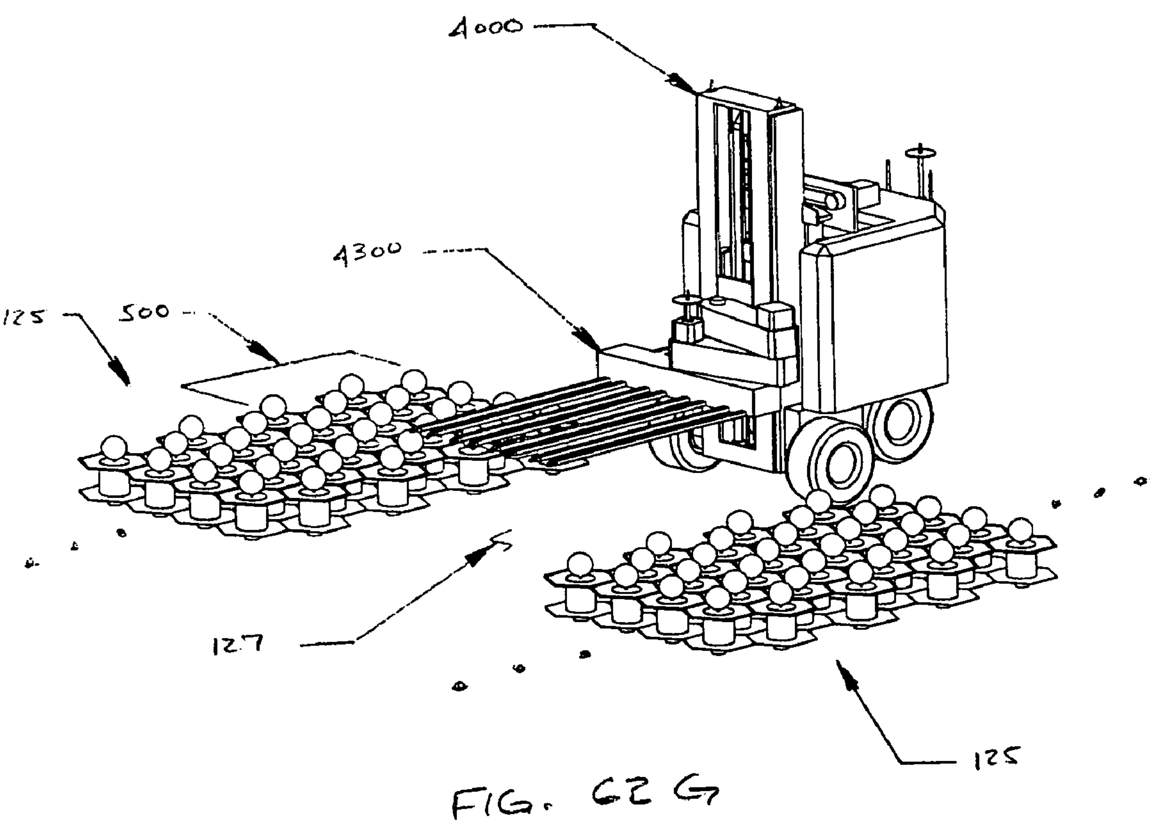

FIG. 62G is a perspective view of a pallet assembly greenhouse transfer unit in accordance with a first embodiment of the invention, with its fork elevated above the tops of canopies of palletized containerized plant material adjoining that to be retrieved.

Figure 62H:
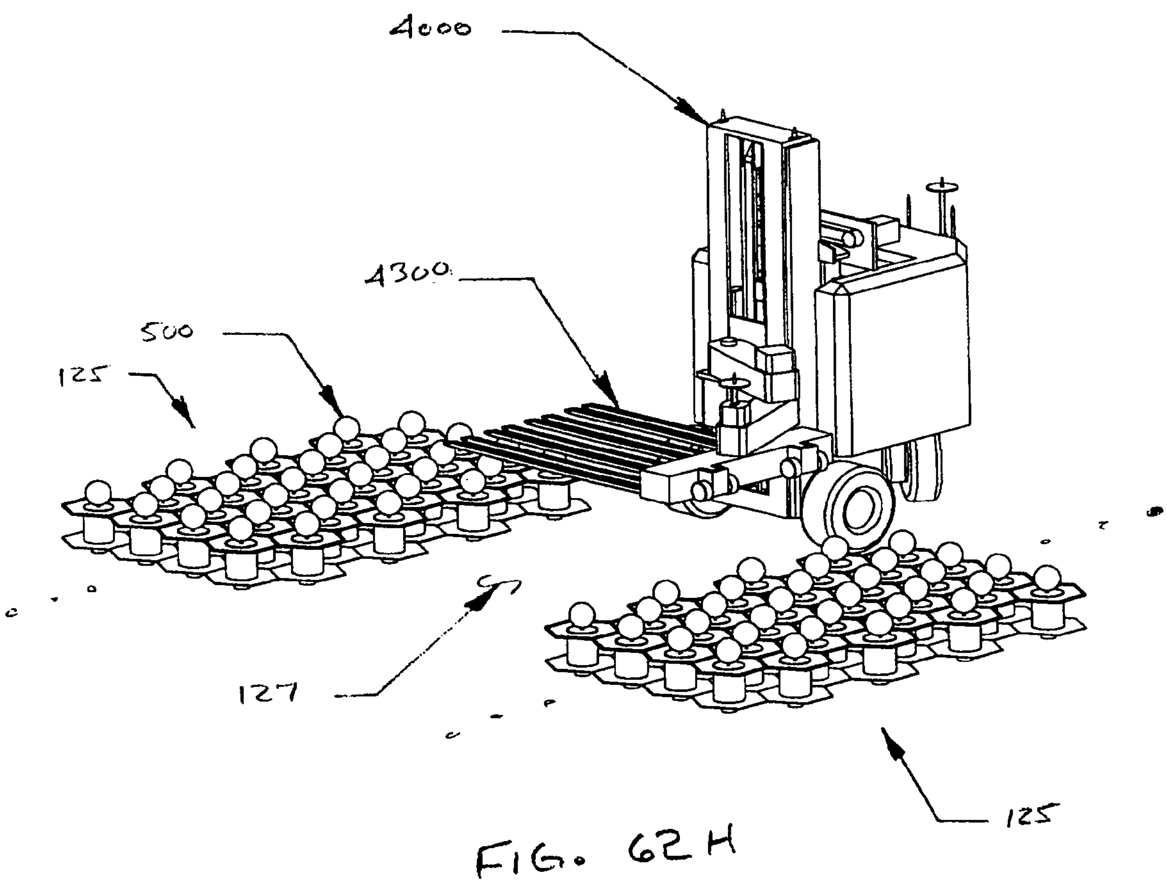
Figure 62:
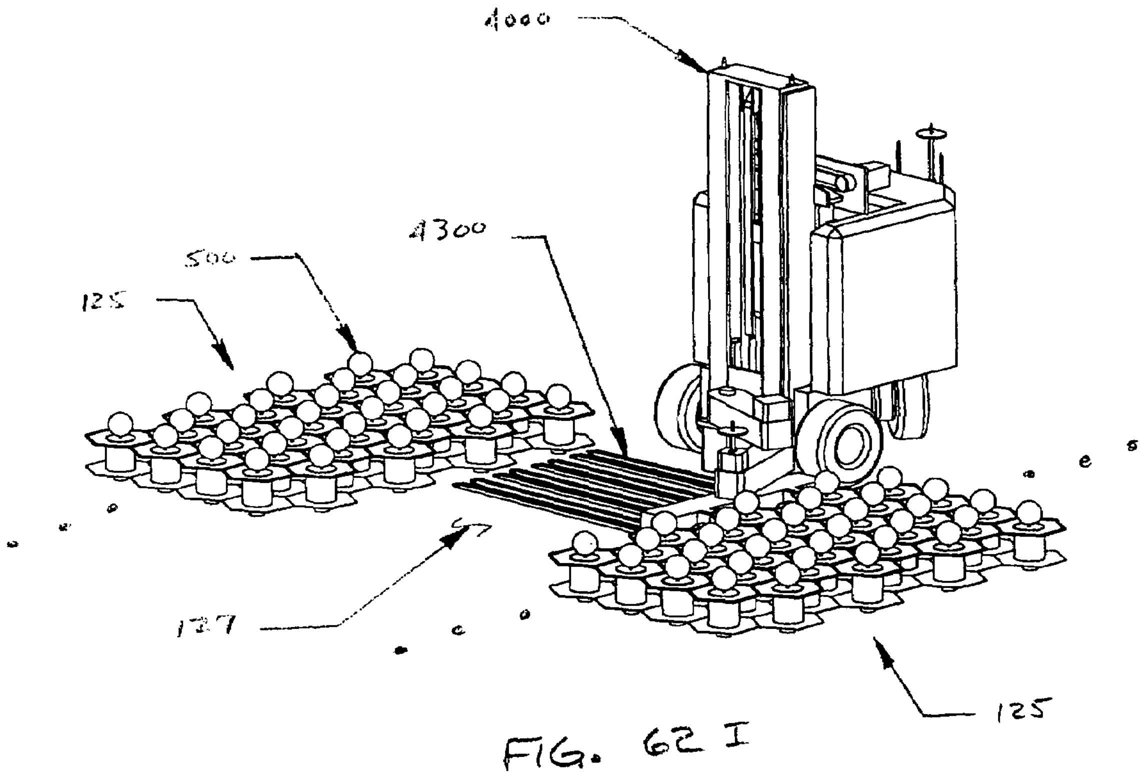

FIG. 62H is a perspective view of the pallet assembly greenhouse transfer unit of FIGS. 62A-62F following fork rotation above adjoining plant material canopies, preparing for lateral engagement with a proximal pallet assembly.

FIG. 62I is a perspective view of the pallet assembly greenhouse transfer unit of FIGS. 62A-62F with its fork aligned and at an elevation for lateral engagement with a proximal pallet assembly.

Figure 62J:
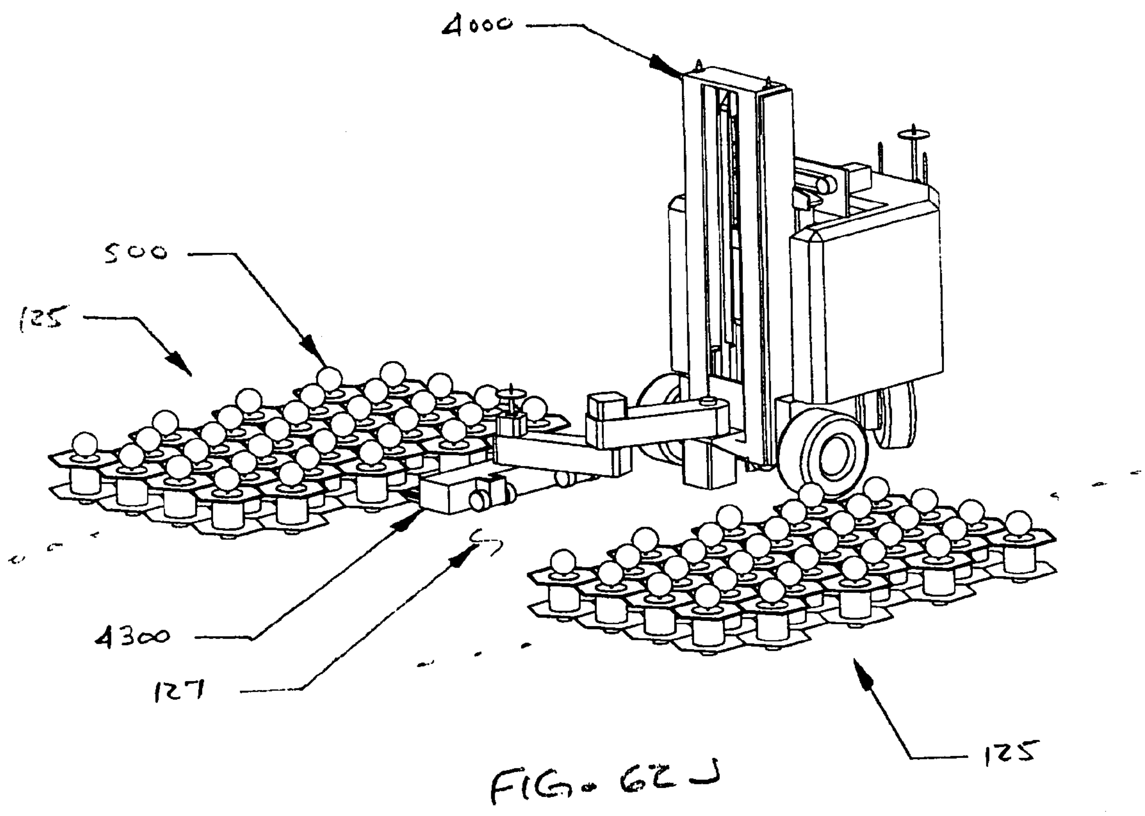

FIG. 62J is a perspective view of the pallet assembly greenhouse transfer unit of FIGS. 62A-62F having its fork engaged with a pallet assembly perpendicular to the line of travel of the pallet assembly greenhouse transfer unit primary drive wheels.

Figure 62K:
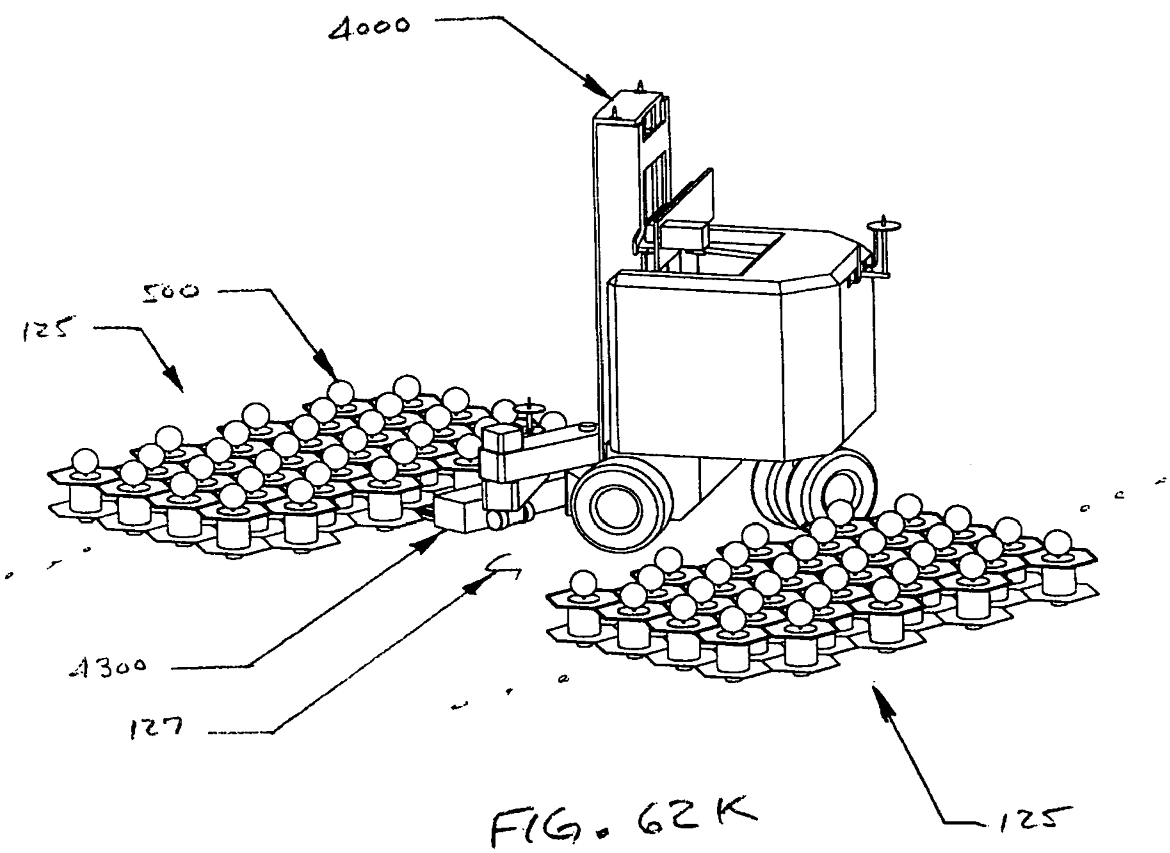

FIG. 62K is a perspective view of the pallet assembly greenhouse transfer unit of FIGS. 62A-62F turning toward fork-engaged pallet assembly, establishing a stable attitude for lifting fork-engaged engaged pallet assembly.

Figure 62L:
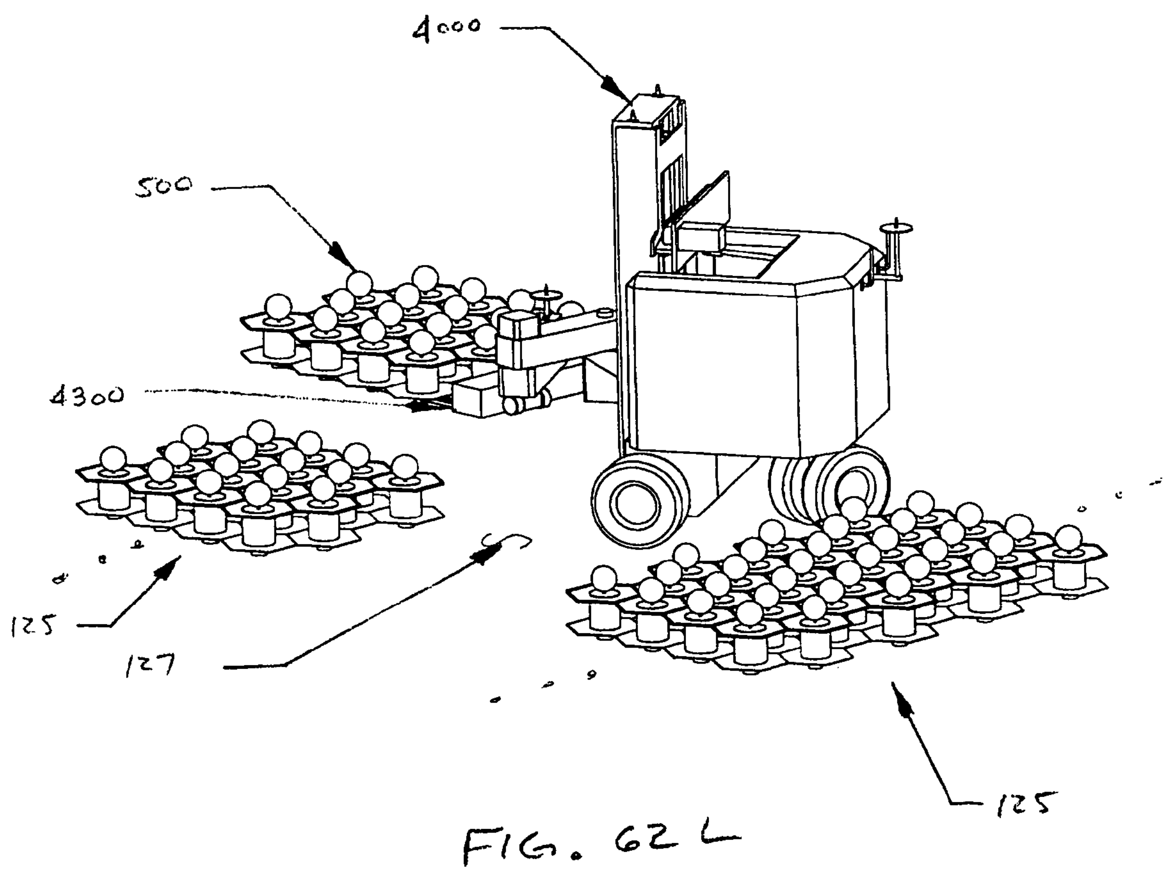

FIG. 62L is a perspective view of the pallet assembly greenhouse transfer unit of FIGS. 62A-62F lifting fork-engaged pallet assembly sufficient to clear adjoining plant material.

Figure 62M:
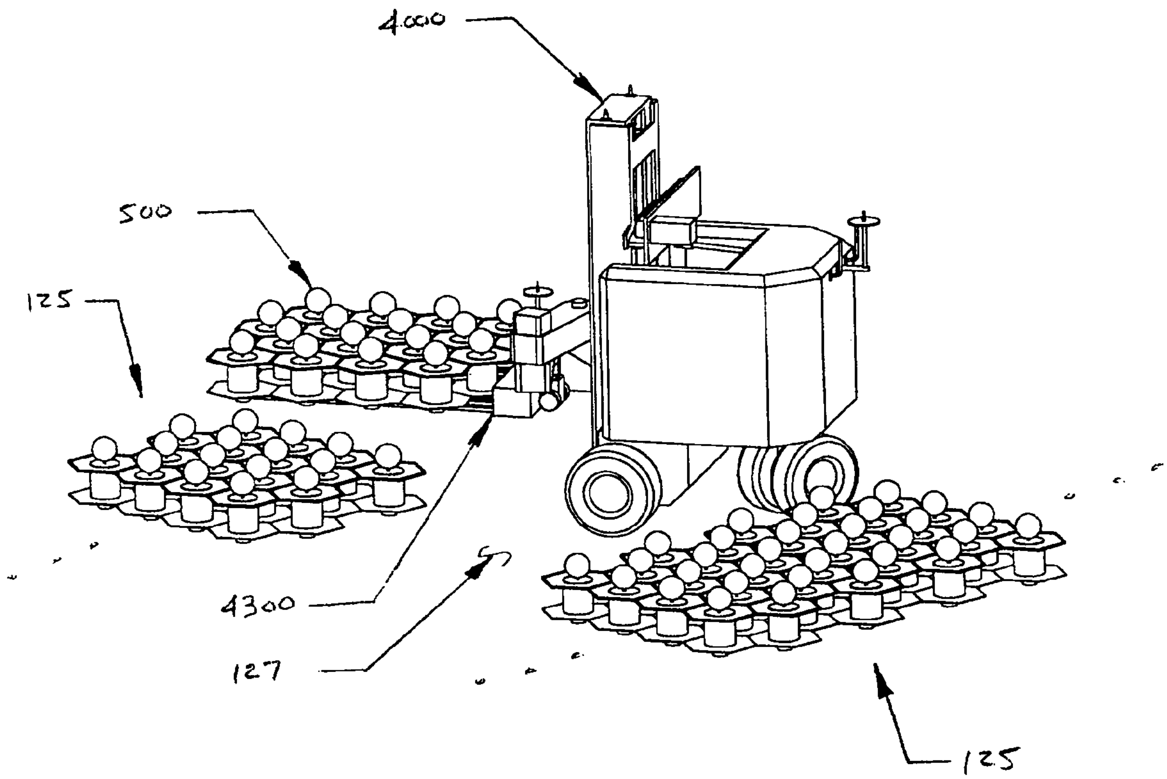

FIG. 62M is a perspective view of the pallet assembly greenhouse transfer unit of FIGS. 62A-62F retracting load to lift mast, maximizing stability for pallet assembly greenhouse transfer unit travel.

Figure 62N:
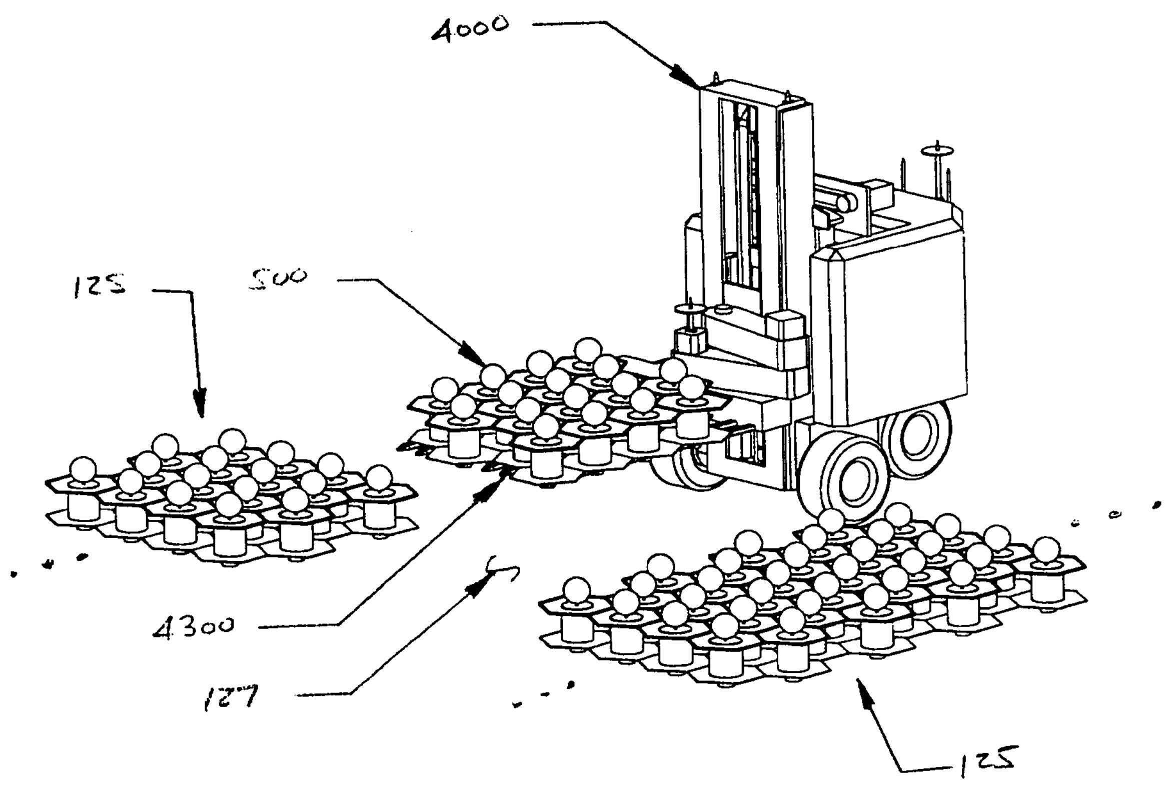

FIG. 62N is a perspective view of the pallet assembly greenhouse transfer unit of FIGS. 62A-62F beginning travel to delivery point.

Figure 62P:
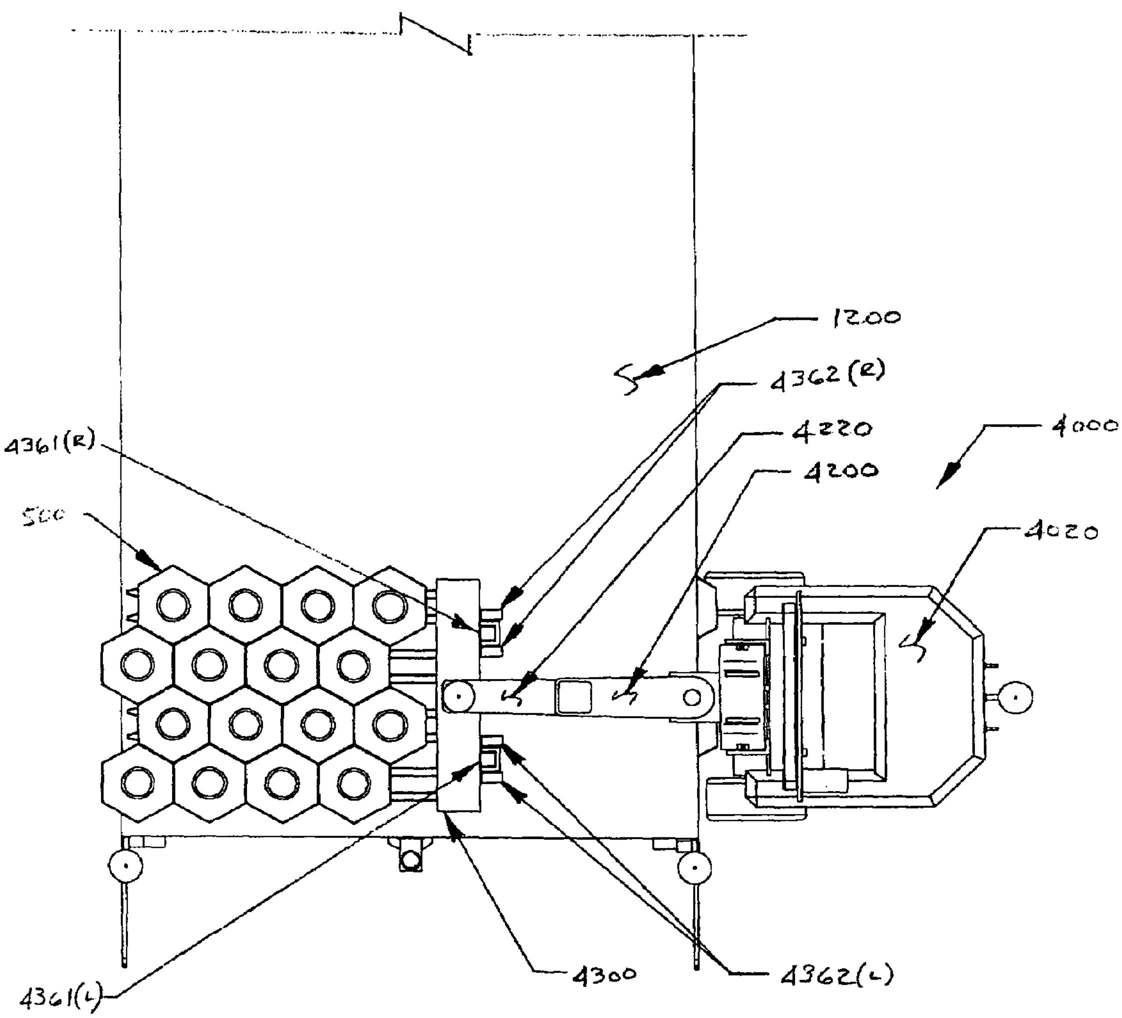

FIG. 62P is a plan view of the pallet assembly greenhouse transfer unit of FIGS. 62A-62F engaging a pallet assembly on the top deck of a pallet assembly transfer train.

Figure 62Q:
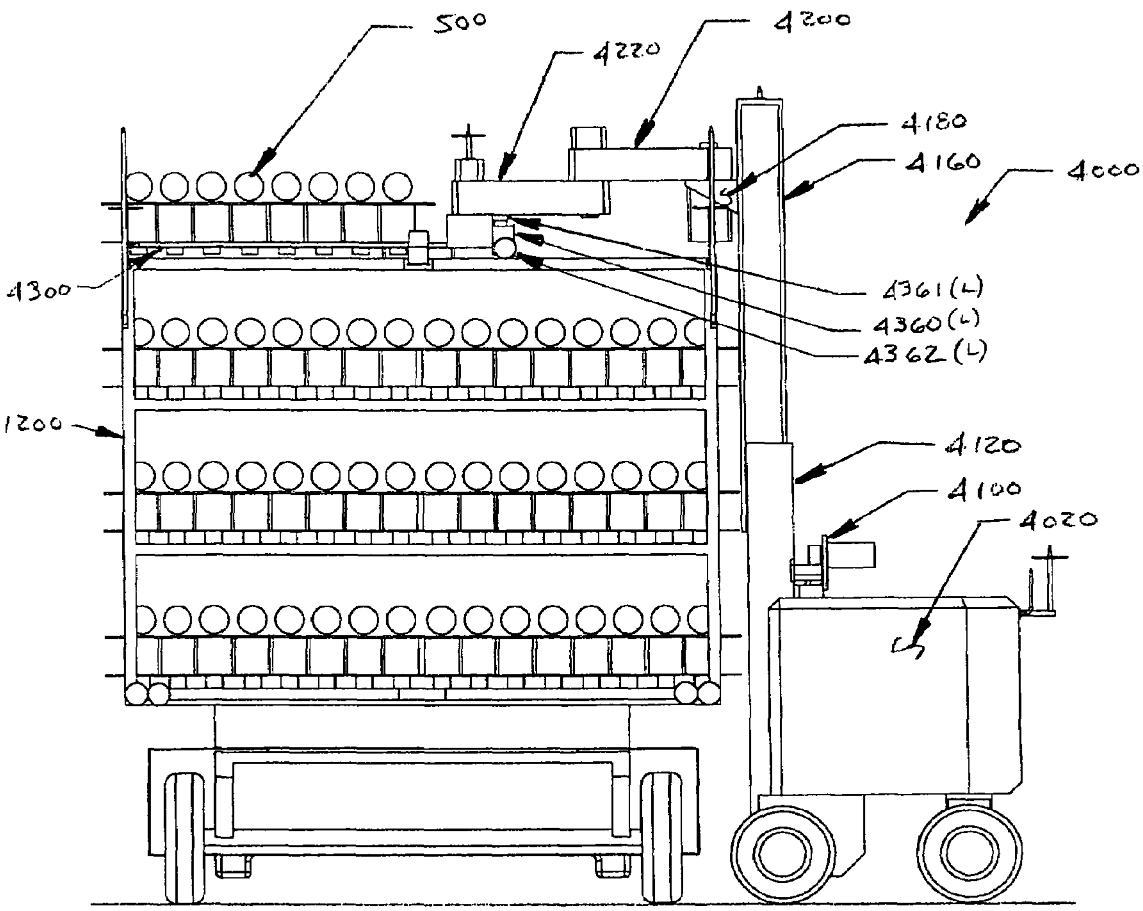

FIG. 62Q is a first elevation view of the pallet assembly greenhouse transfer unit of FIGS. 62A-62F engaging a pallet assembly on the top deck of a pallet assembly transfer train.

Figure 62R:
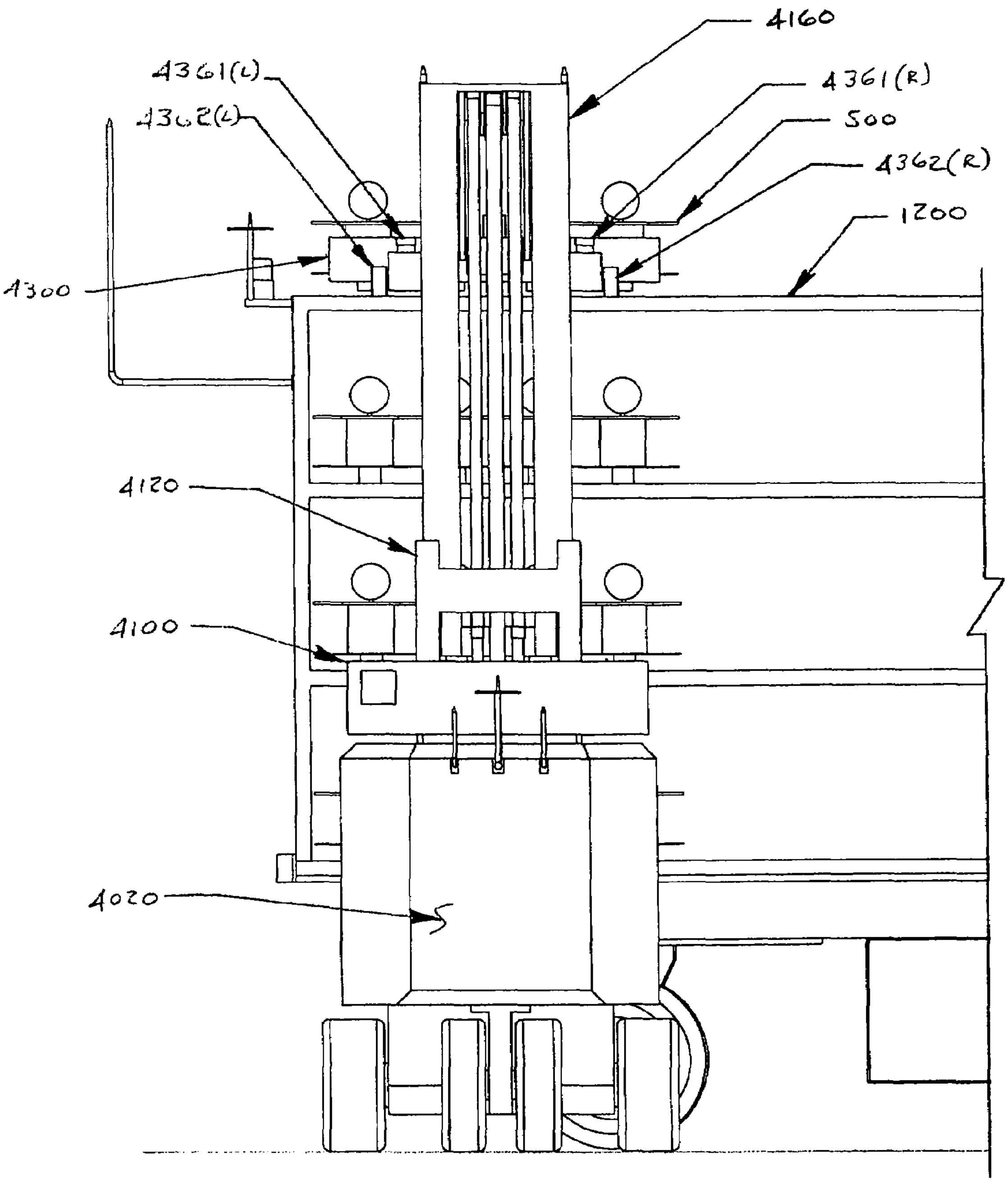

FIG. 62R is a second elevation view of the pallet assembly greenhouse transfer unit of FIGS. 62A-62F engaging a pallet assembly on the top deck of a pallet assembly transfer train.

Figure 62S:
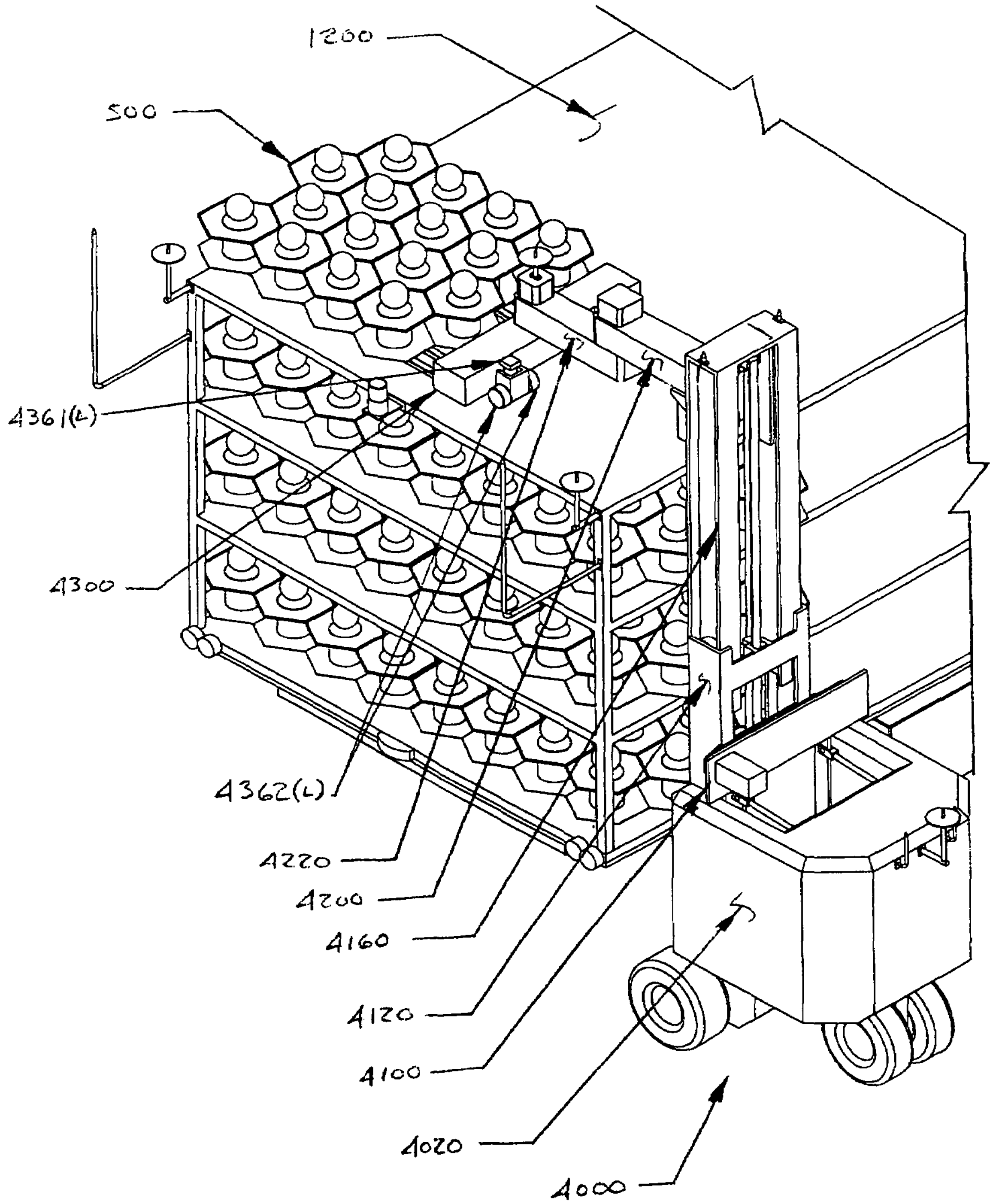

FIG. 62S is a perspective view of the pallet assembly greenhouse transfer unit of FIGS. 62A-62F engaging a pallet assembly on the top deck of a pallet assembly transfer train.

Figure 62T:
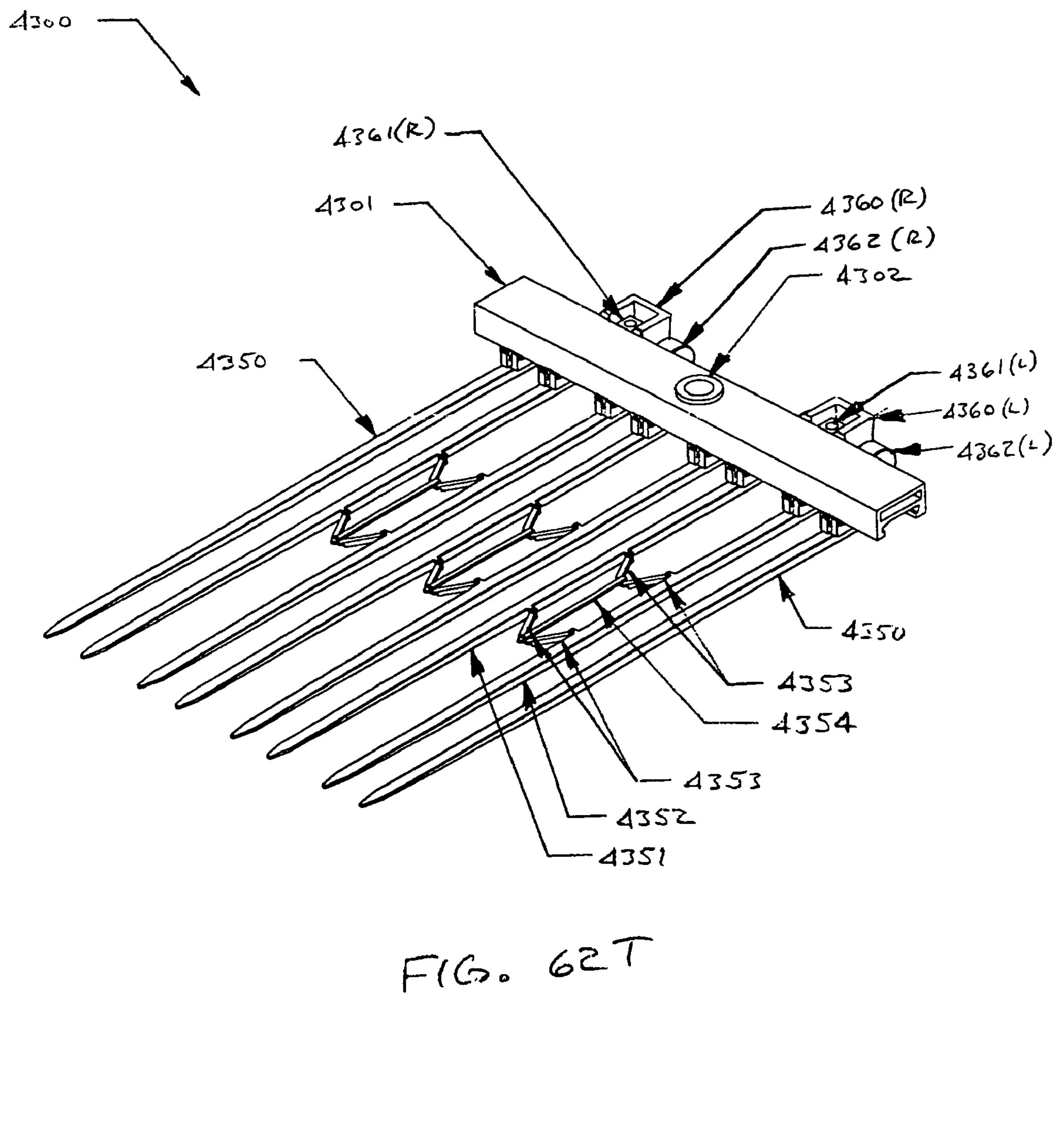

FIG. 62T is a perspective view of a fork assembly for a the pallet assembly greenhouse transfer unit of FIGS. 62A-62F, in accordance with a first embodiment of the invention.

Figure 62U:
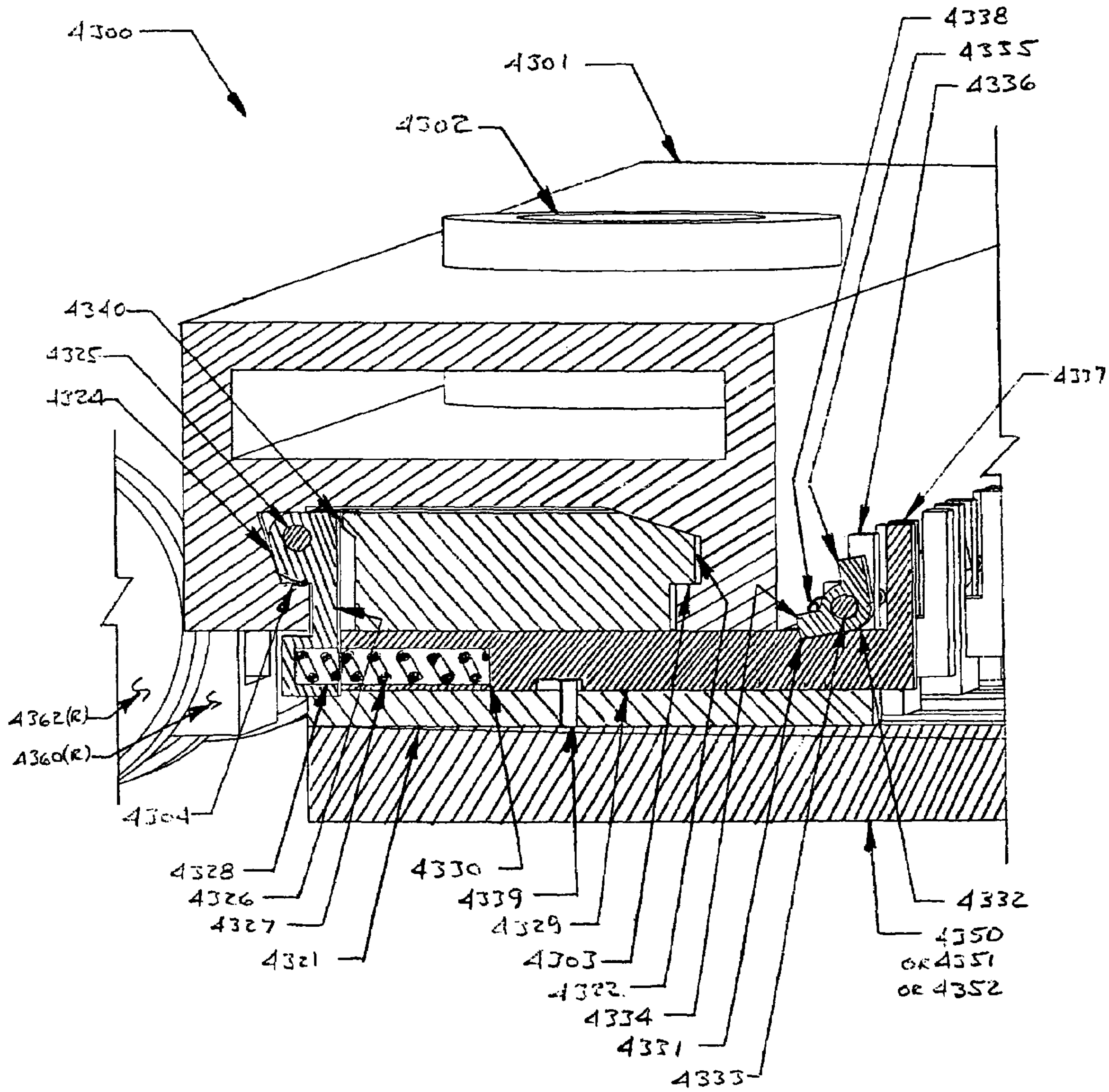

FIG. 62U is a perspective view of a section of the fork assembly of FIG. 62T, wherein section is taken at a vertical plane centered on a fork tine depicted in FIG. 62T.

PAFTU

Figure 63A:
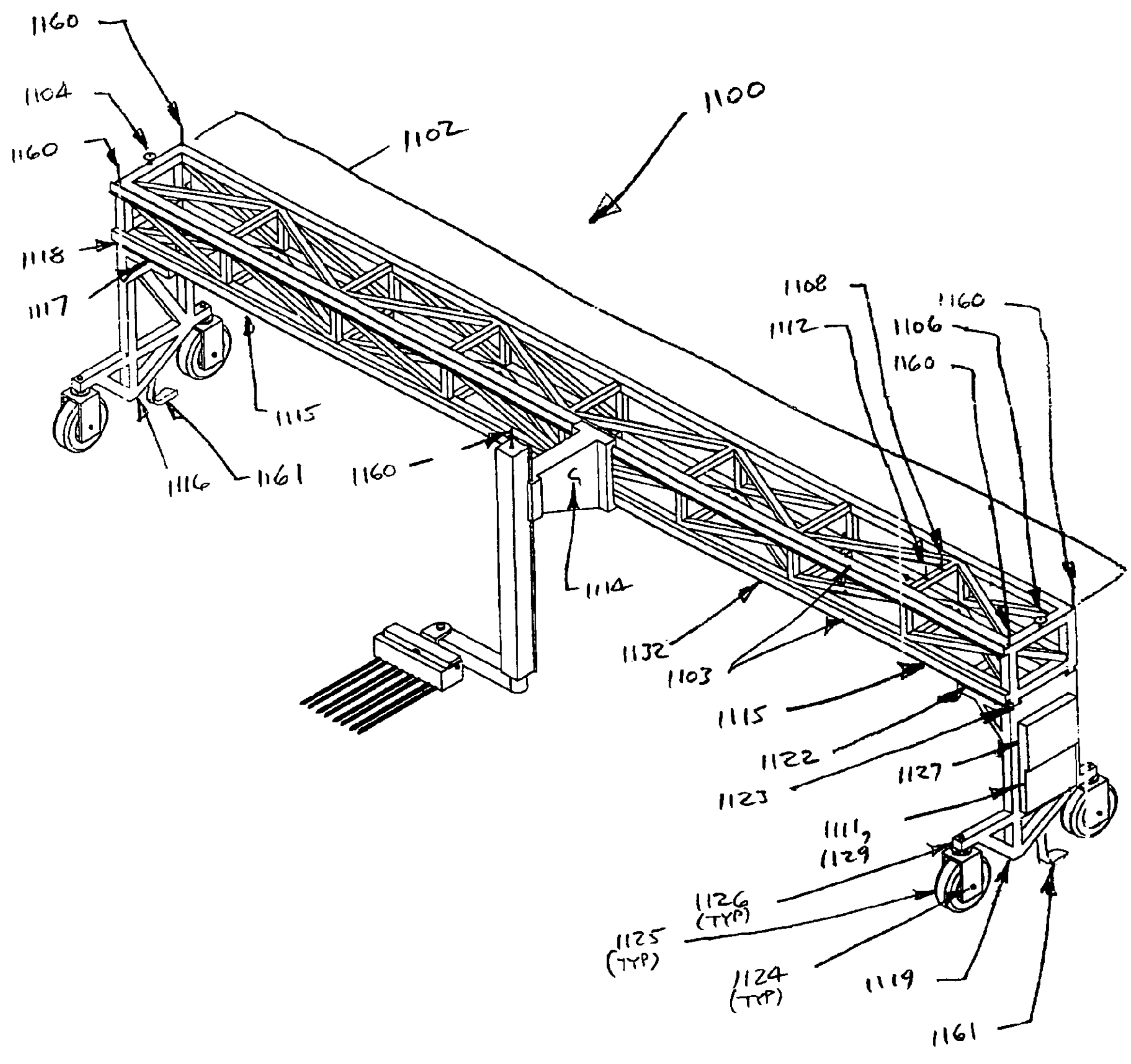

FIG. 63A is a perspective view of a pallet assembly field transfer unit of a first embodiment.

Figure 63B:
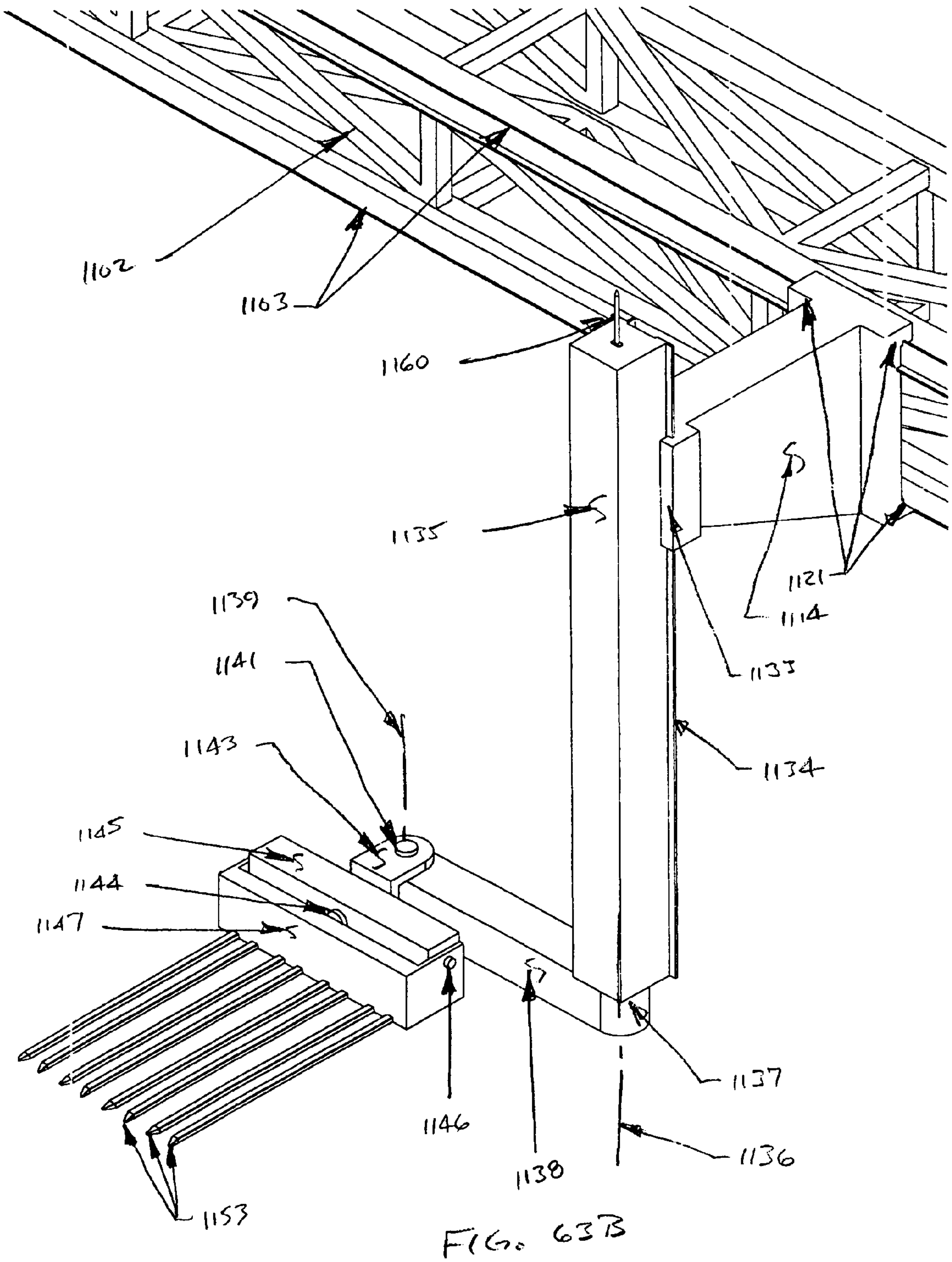

FIG. 63B is a perspective close-up view of the pallet assembly handling head of the pallet assembly field transfer unit of FIG. 63A.

Figure 63C:
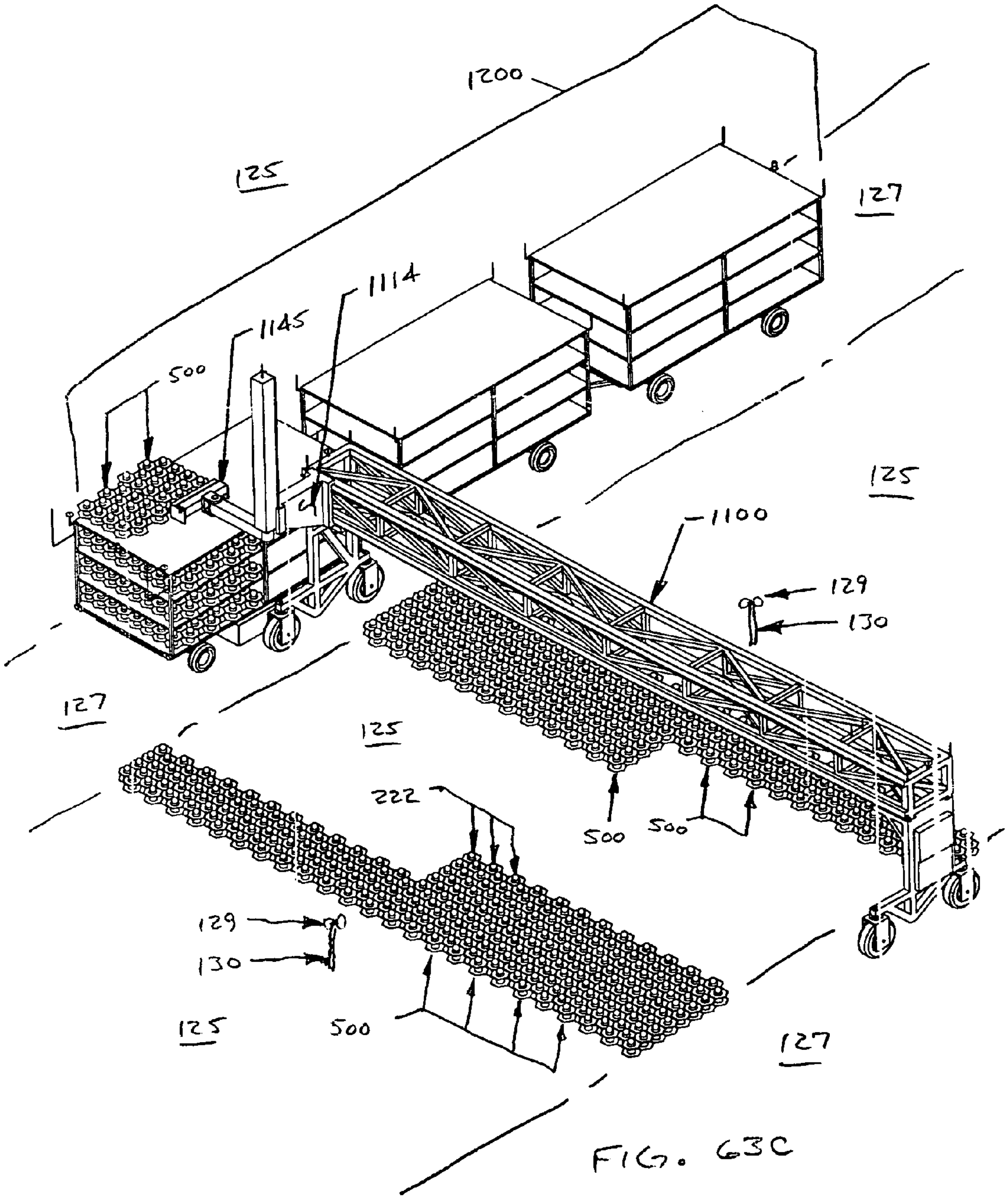

FIG. 63C is a perspective view of a first embodiment of the pallet assembly field transfer unit of FIG. 63A, engaging a pallet assembly transport train.

Figure 63D:
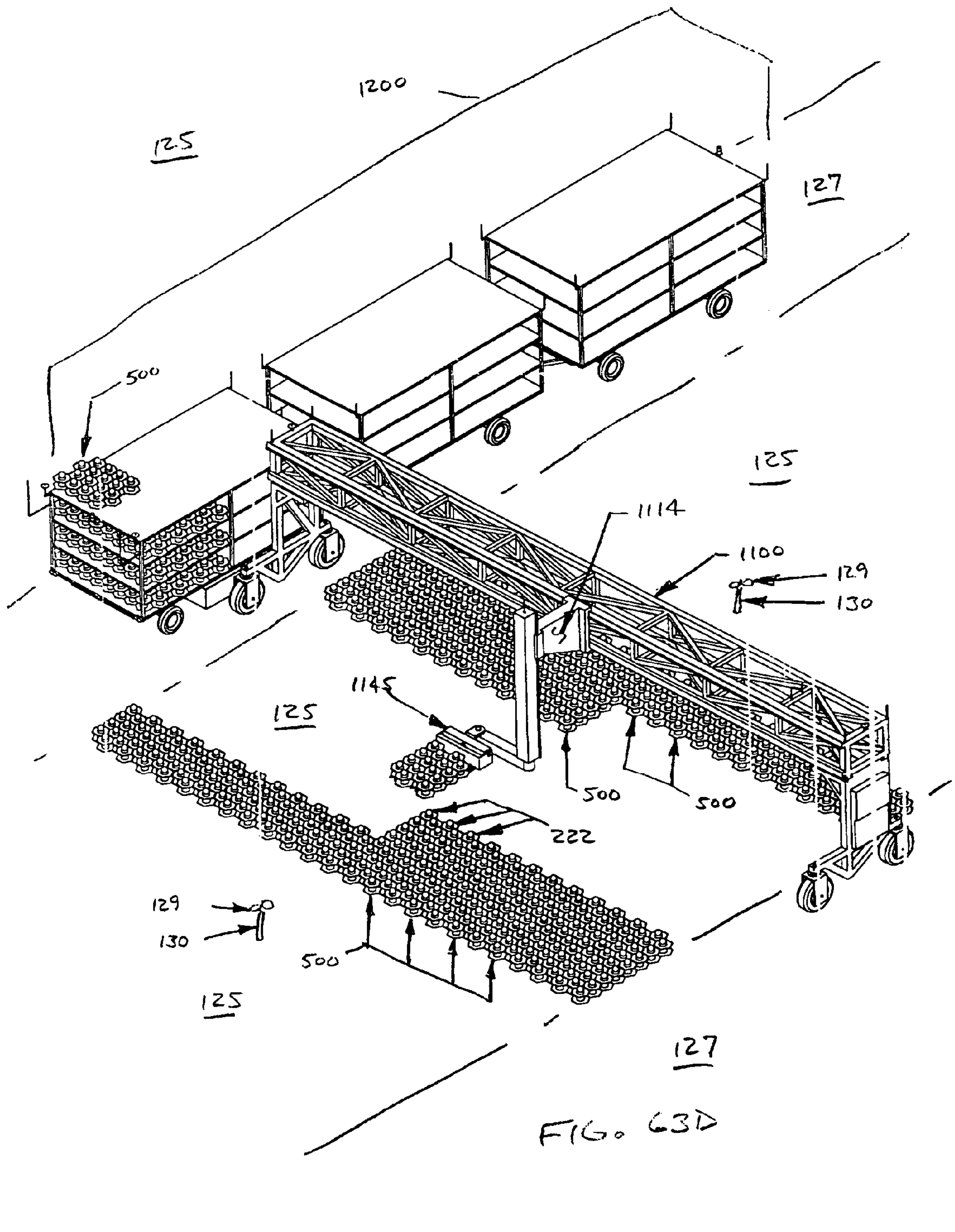

FIG. 63D is a perspective view of the pallet assembly field transfer unit of FIG. 63A, holding a pallet assembly just retrieved from or about to be placed in a nursery bed to side of said pallet assembly field transfer unit.

Figure 63E:
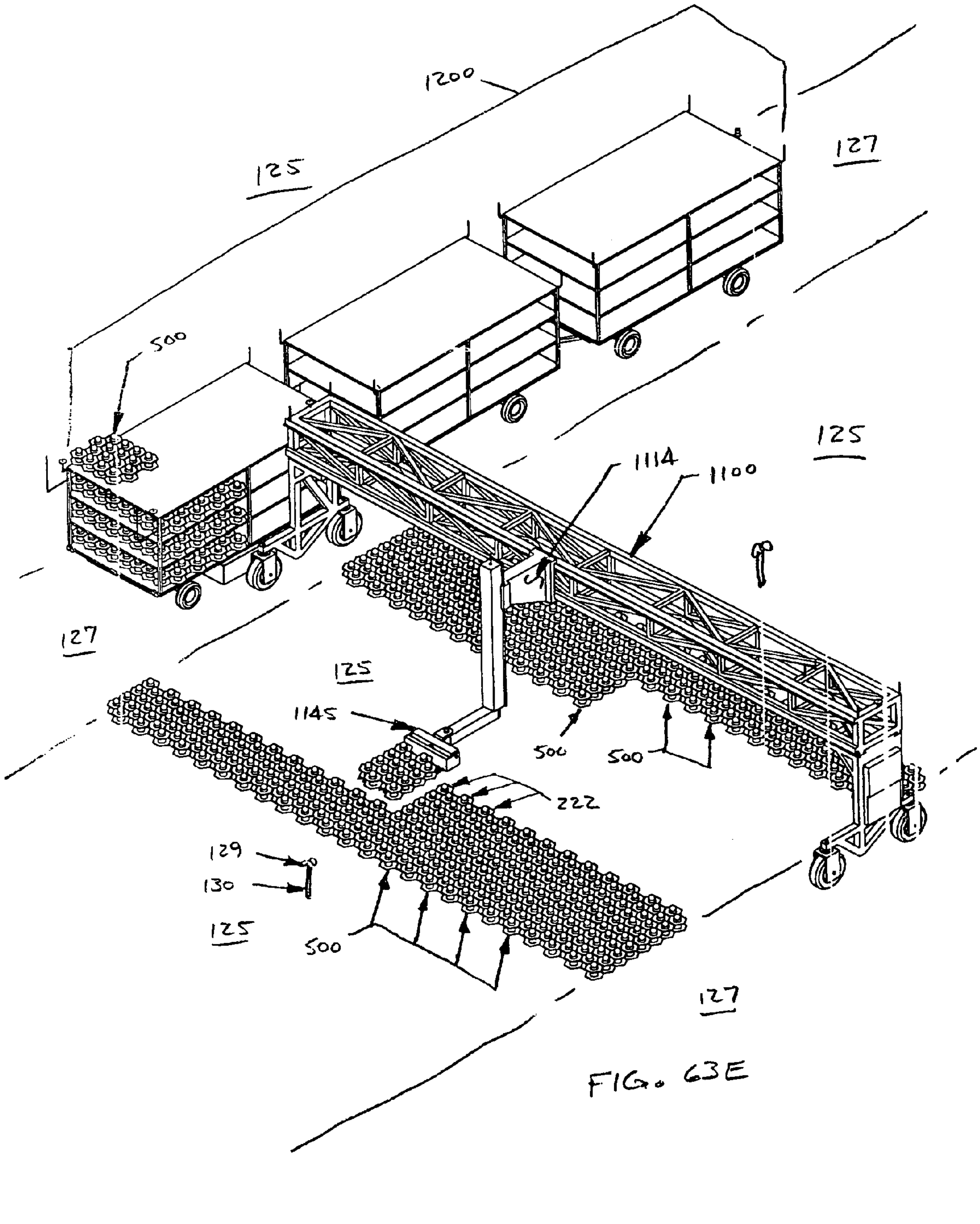

FIG. 63E is a perspective view of the pallet assembly field transfer unit of FIG. 63A, engaging a pallet assembly situated in a nursery bed to side of said pallet assembly field transfer unit.

Figure 63F:
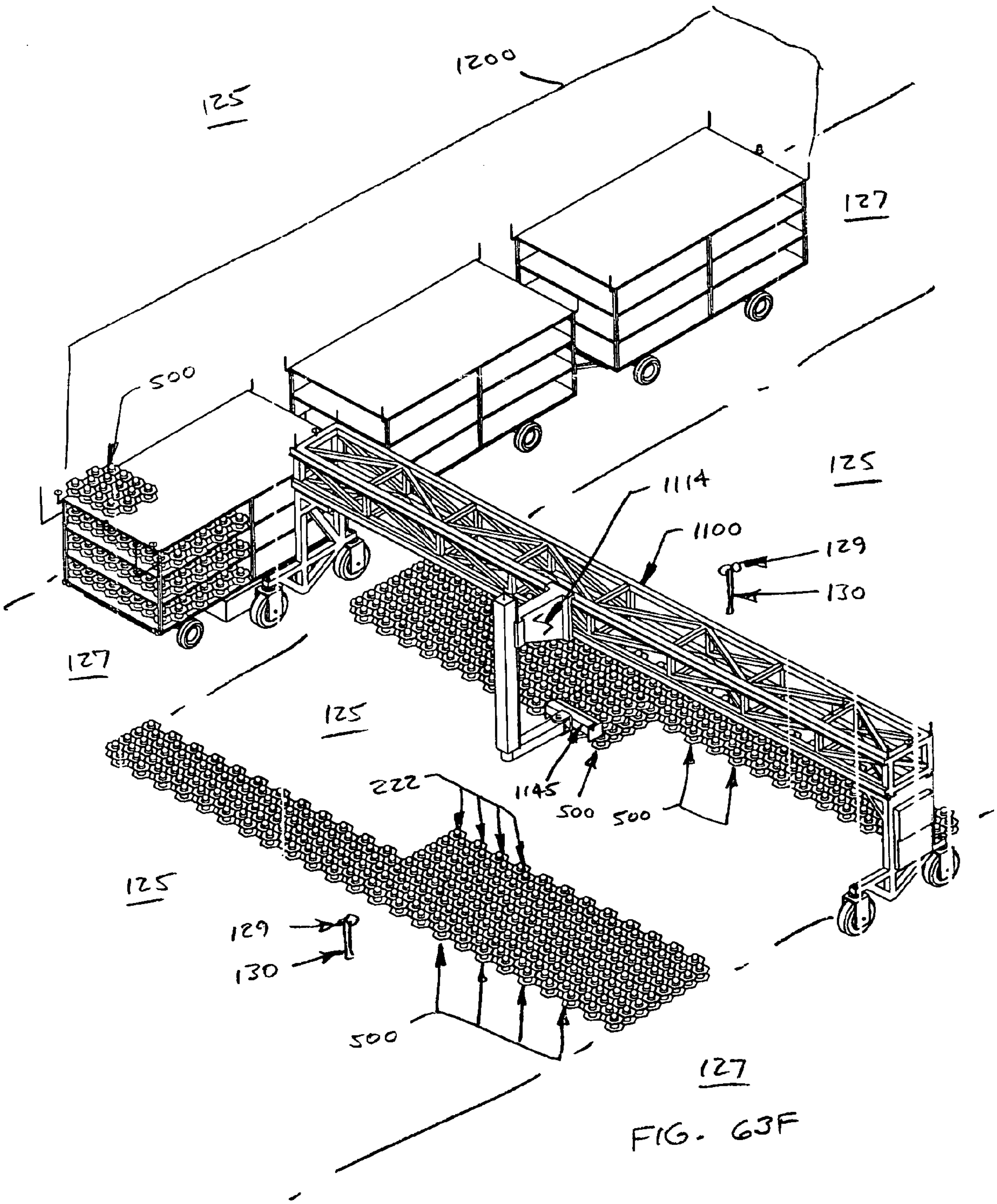

FIG. 63F is a perspective view of the pallet assembly field transfer unit of FIG. 63A, engaging a pallet assembly situated in a nursery bed beneath said pallet assembly field transfer unit.

Figure 63G:
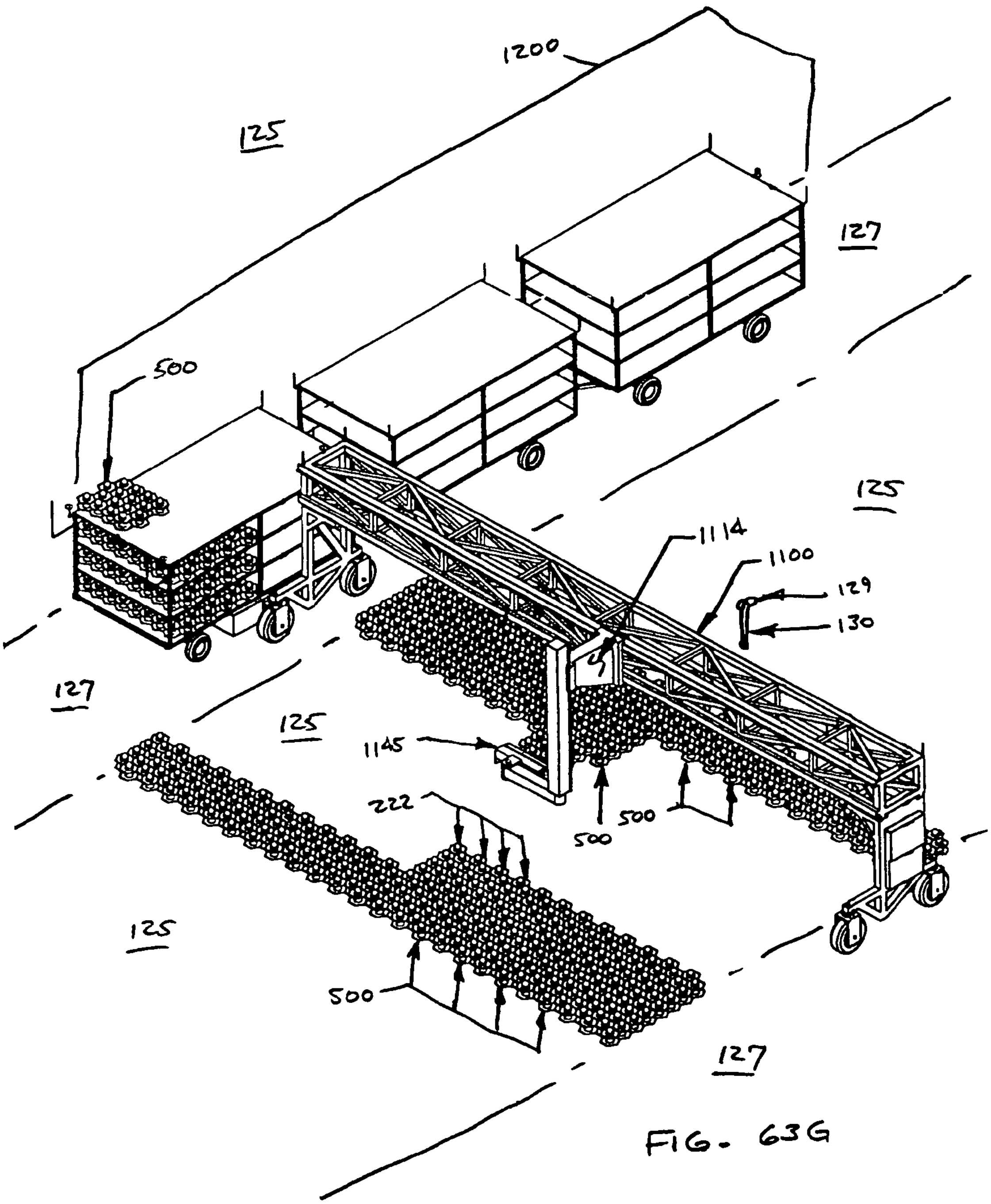

FIG. 63G is a perspective view of the pallet assembly field transfer unit of FIG. 63A, holding a pallet assembly just retrieved from or about to be placed in a nursery bed beneath said pallet assembly field transfer unit.

Figure 63H:
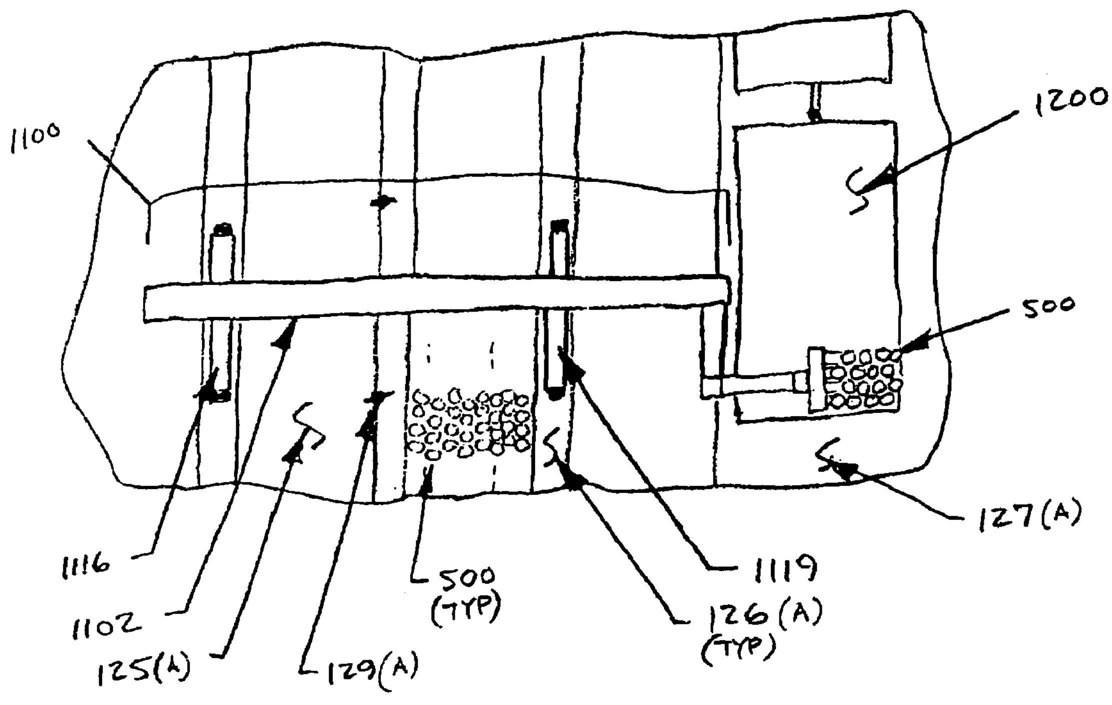
Figure 63:
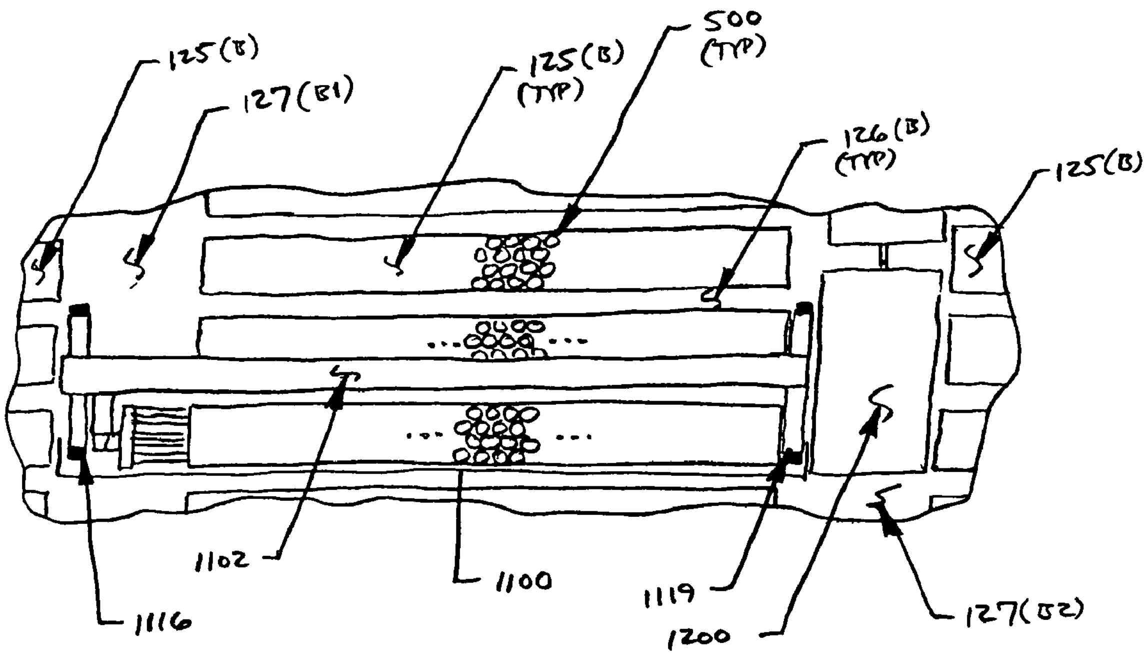

FIG. 63H is a plan view of the unit of FIG. 63A configured to operate in narrow aisles between beds, such aisles running parallel to driveway in which pallet assembly transport train operates.

FIG. 63I is a plan view of the unit of FIG. 63A configured to operate on narrow beds running perpendicular to driveway in which pallet assembly transport train operates.

FMUH

Figure 64A:
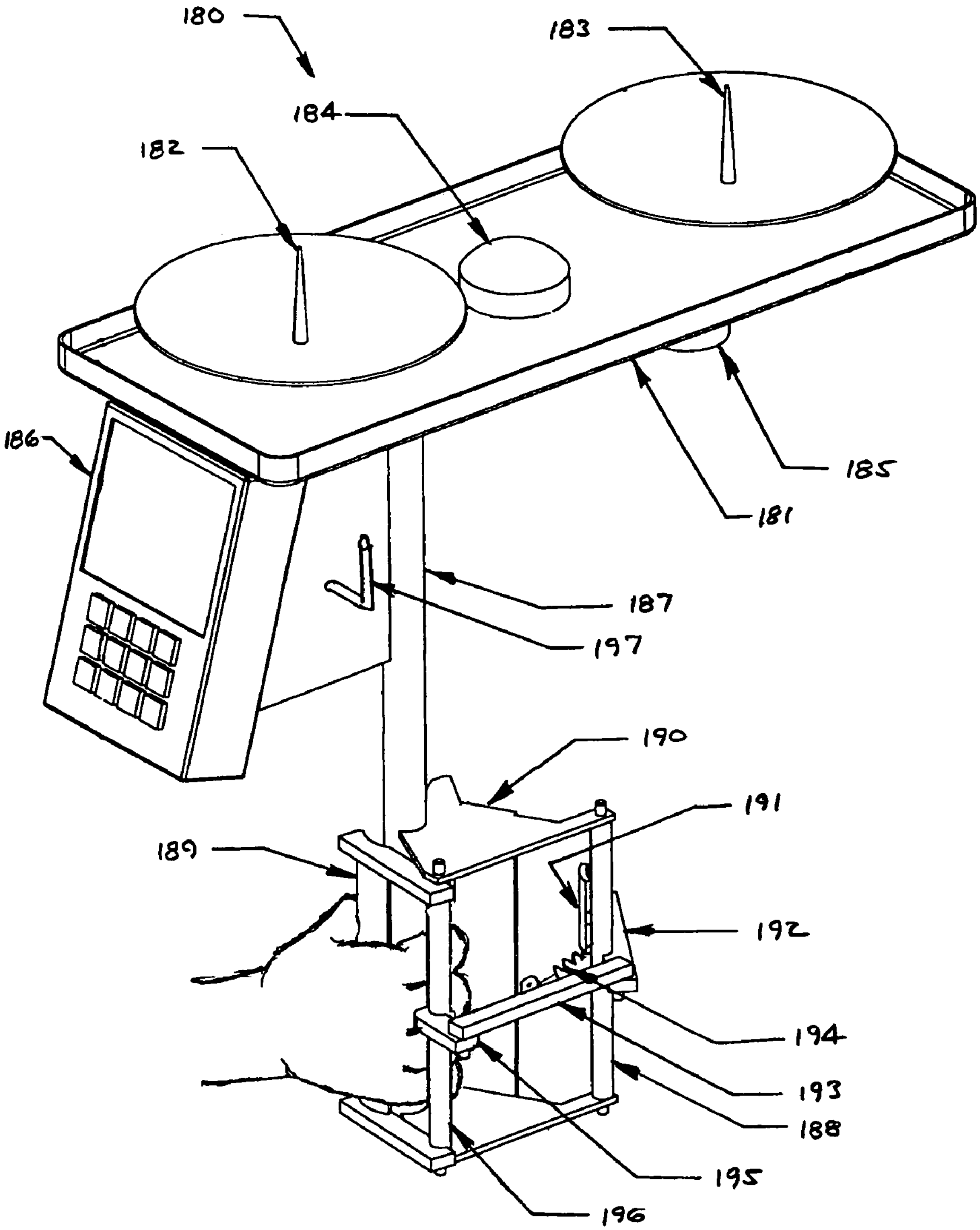

FIG. 64A is a perspective view of one configuration of a hand-held nursery feature-mapping device, in accordance with a first embodiment of the container gripping mechanisms of the invention.

Figure 64B:
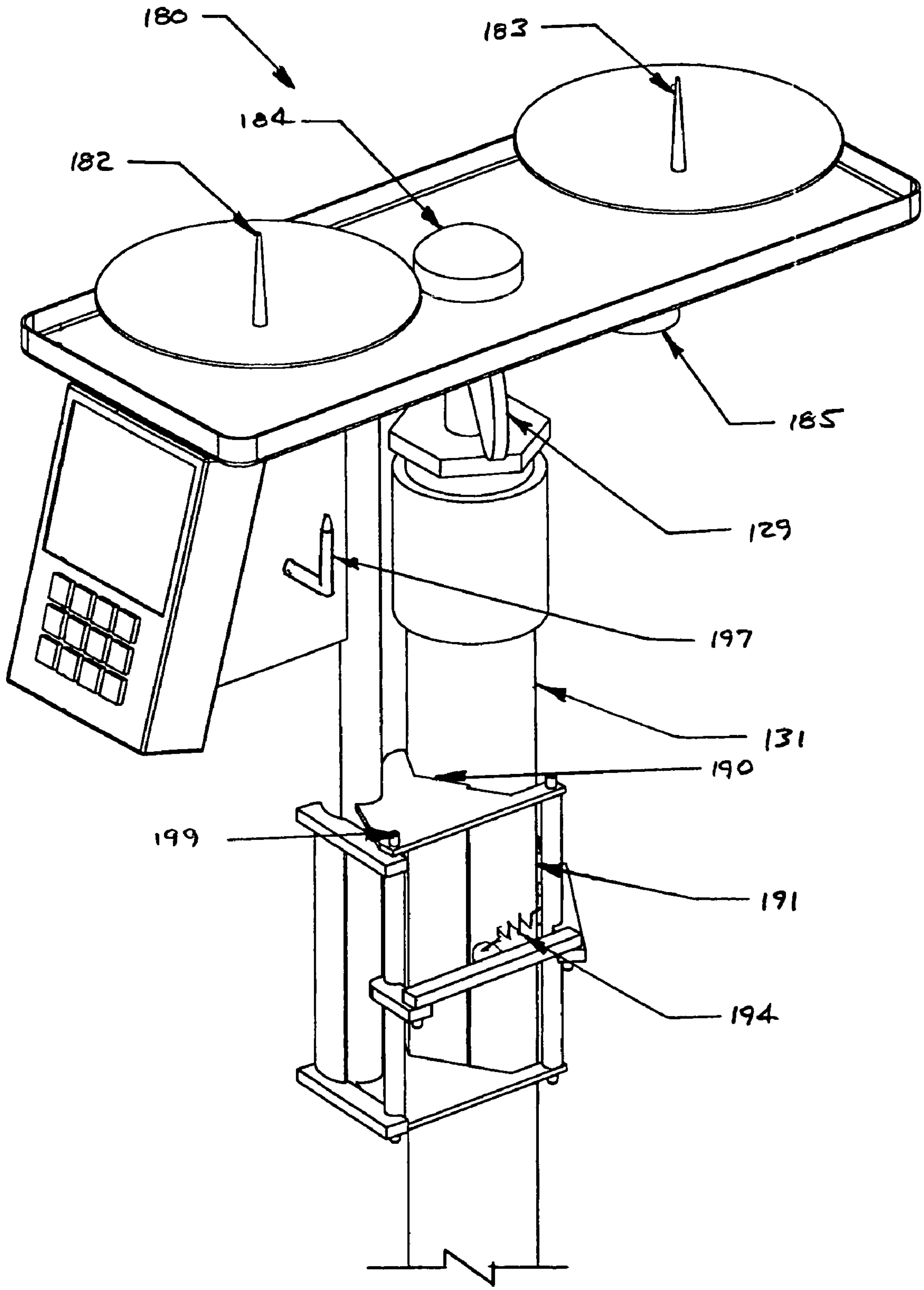

FIG. 64B is a perspective view of the hand-held nursery feature-mapping device of FIG. 64A, shown momentarily mounted on an irrigation sprinkler head.

Figure 64C:
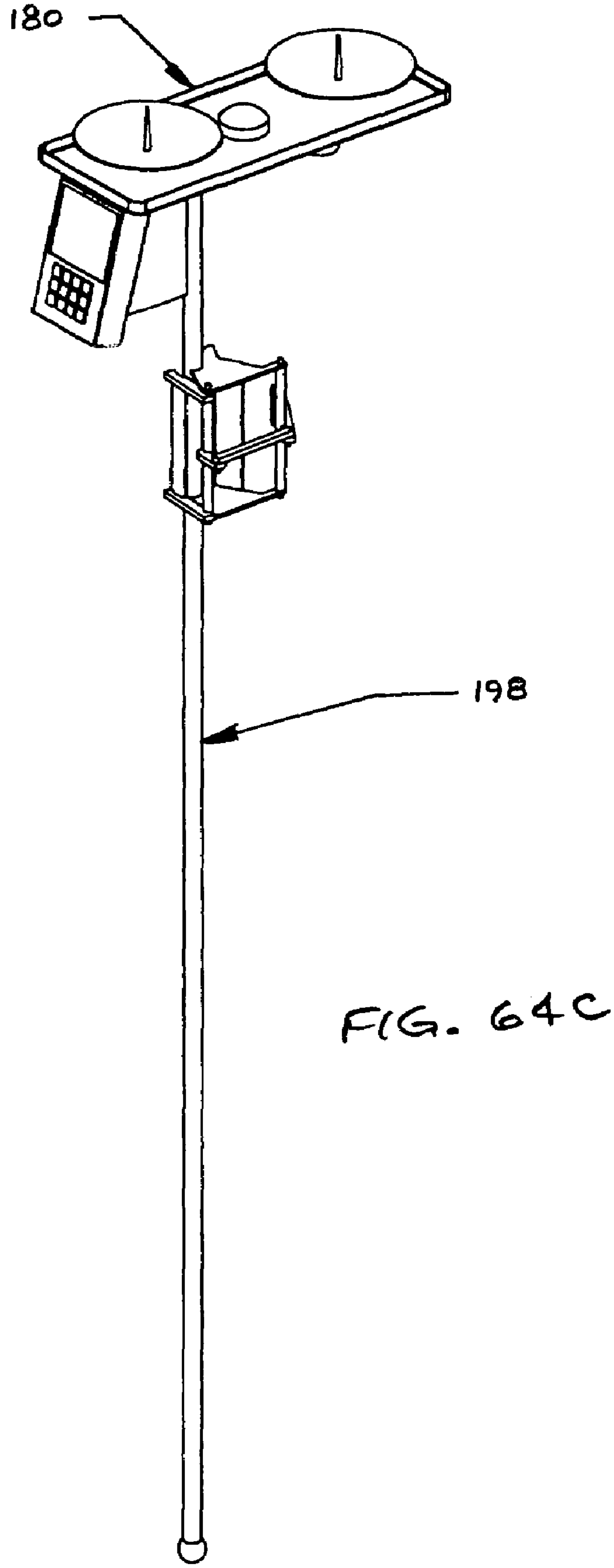

FIG. 64C is a perspective view of the hand-held nursery feature-mapping device, shown configured with an attachable probe attached.

Figure 64D:
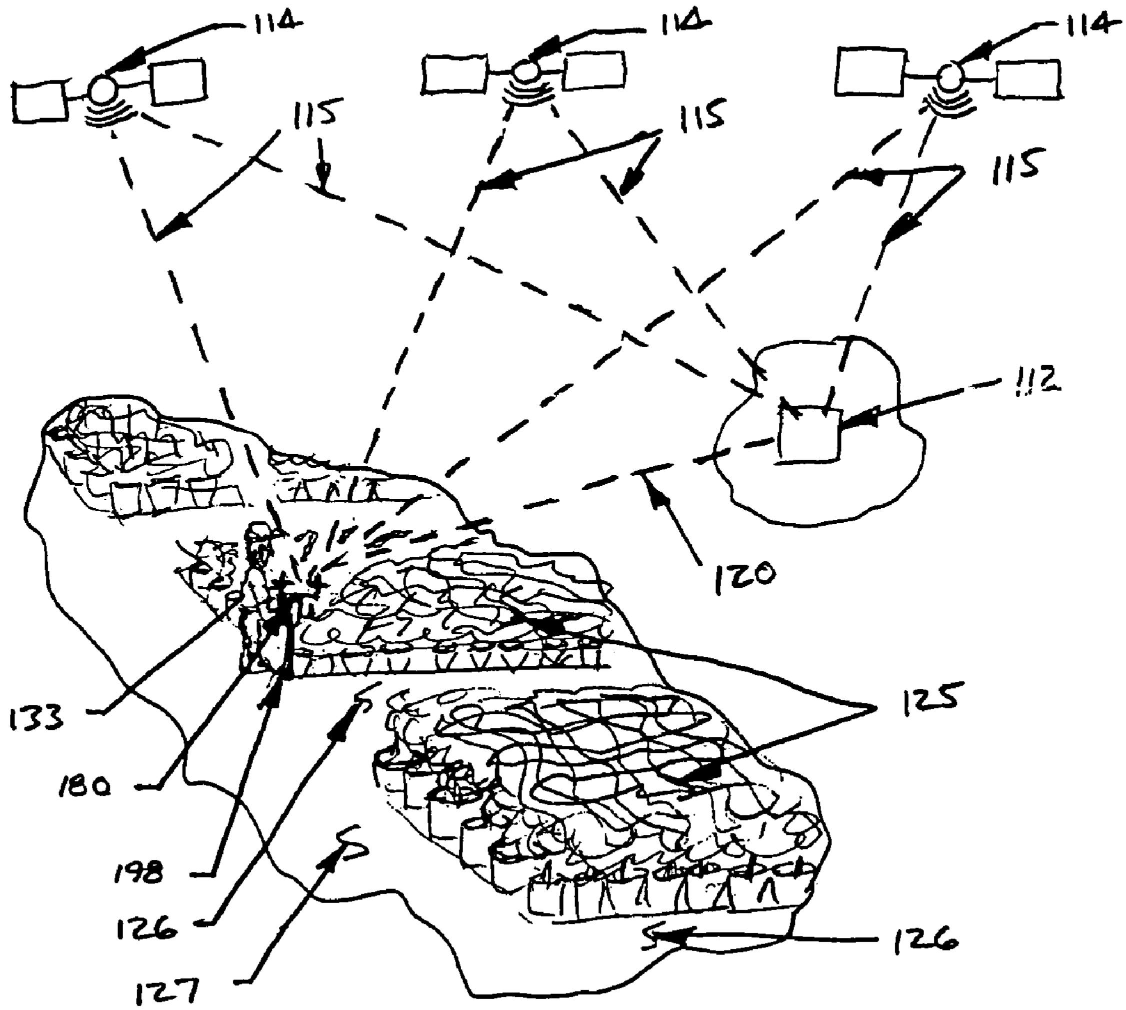

FIG. 64D is a perspective view of an operator utilizing the hand-held nursery feature-mapping device of FIG. 64C, in accordance with a first embodiment of the invention.

FMSRT

Figure 65A:
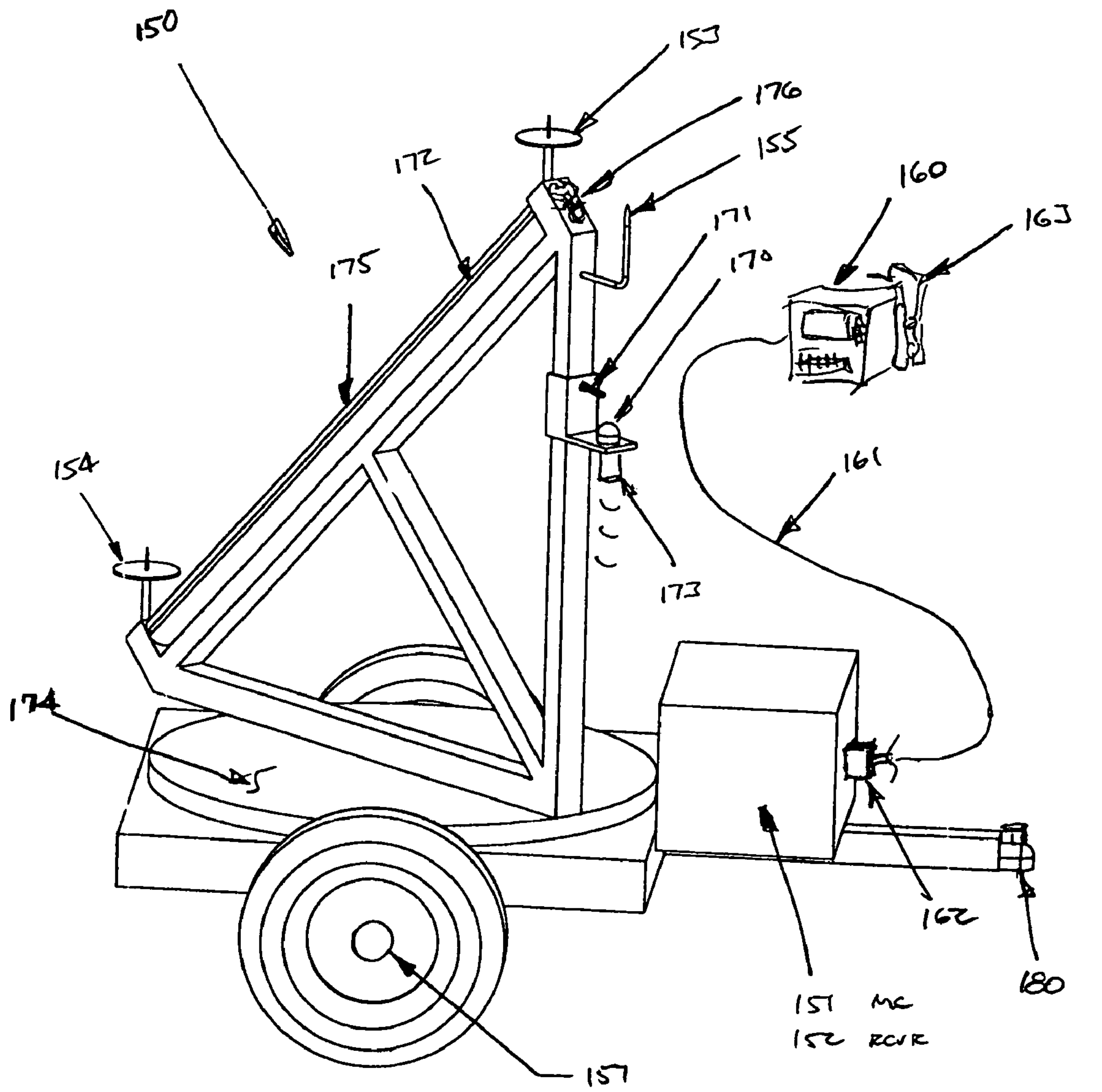
Figure 65B:
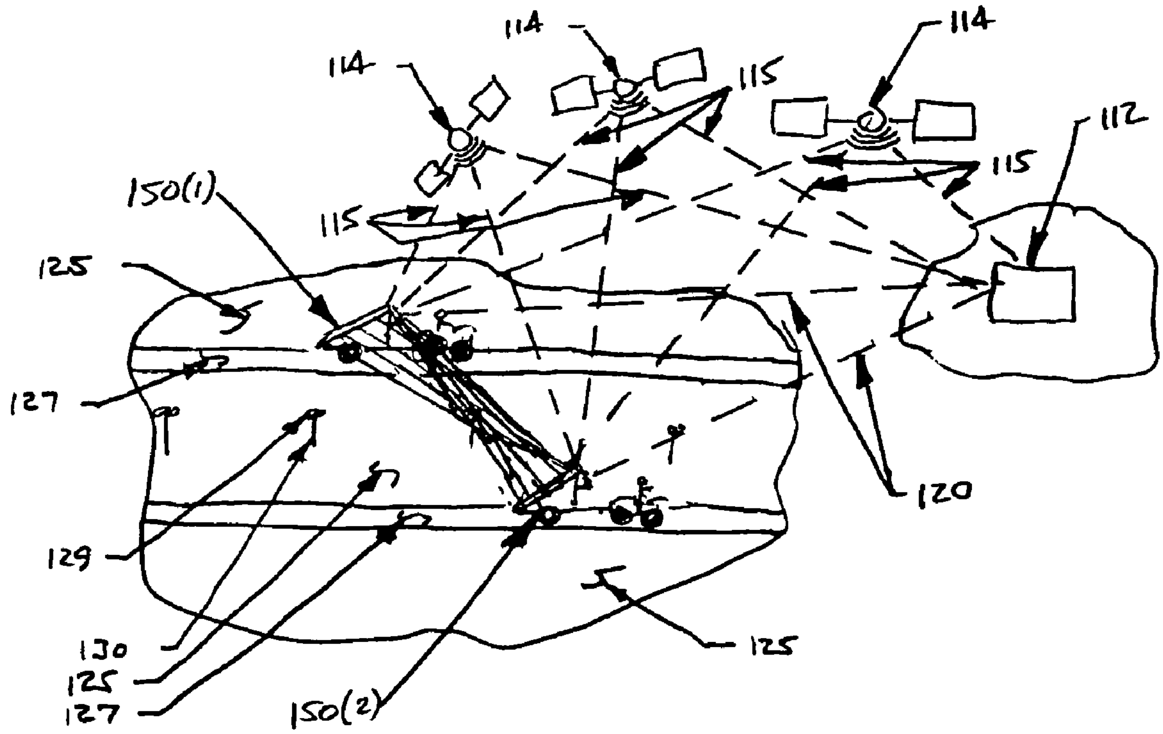

FIG. 65A is a perspective view of a nursery remote feature-mapping trailer in accordance with a first embodiment of the invention FIG. 65B is a perspective illustration of the spatial relationship and movements of two remote nursery feature-mapping trailers each being towed by a 4-wheeled vehicle in accordance with a first embodiment of the invention

PAS EMB2

Figure 66:
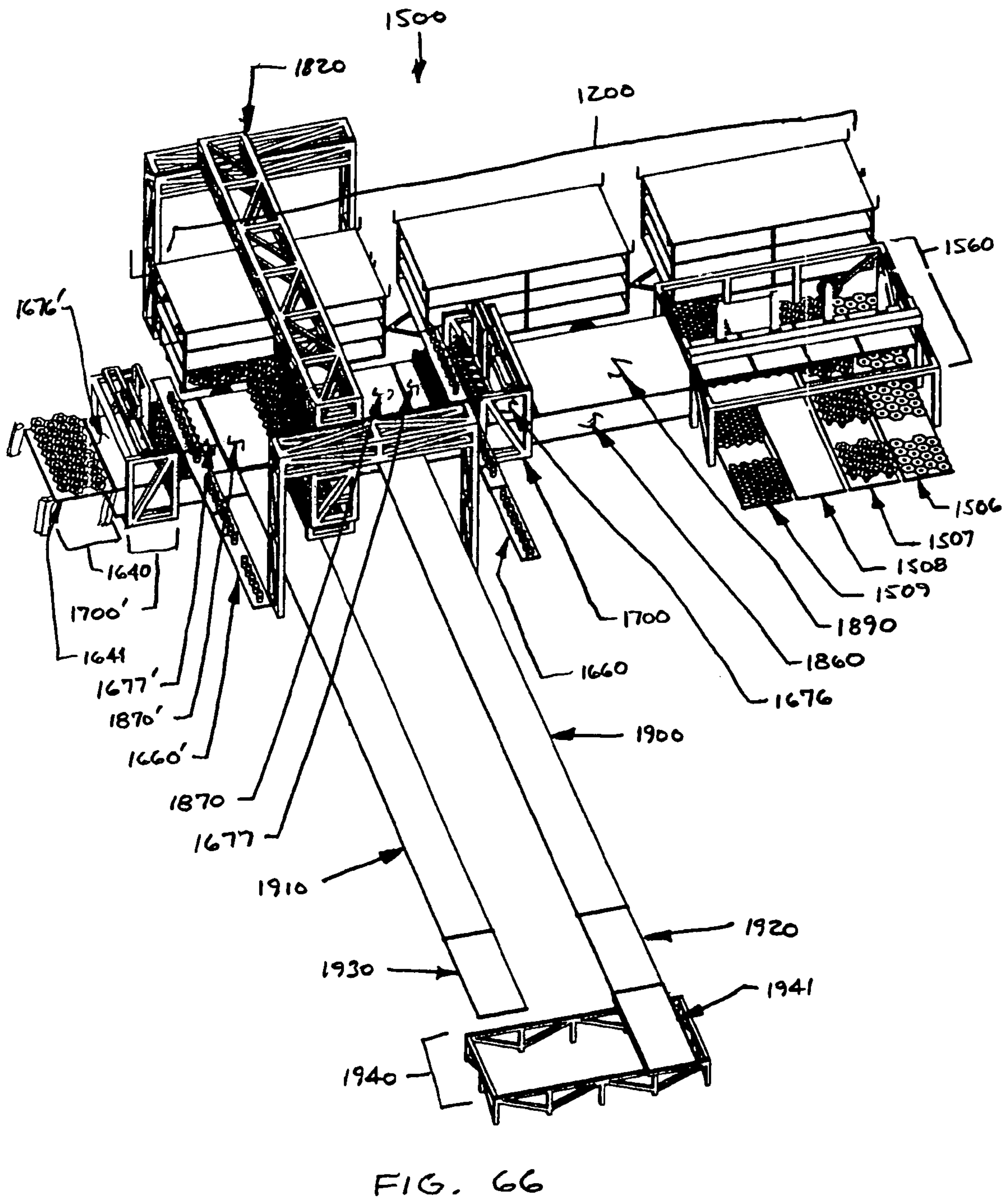

FIG. 66 is a perspective overhead view of a second embodiment of a pallet assembly/disassembly system with an autonomously guided a pallet assembly transport train, configured for assembly and disassembly of pallet assemblies.

Figure 67:
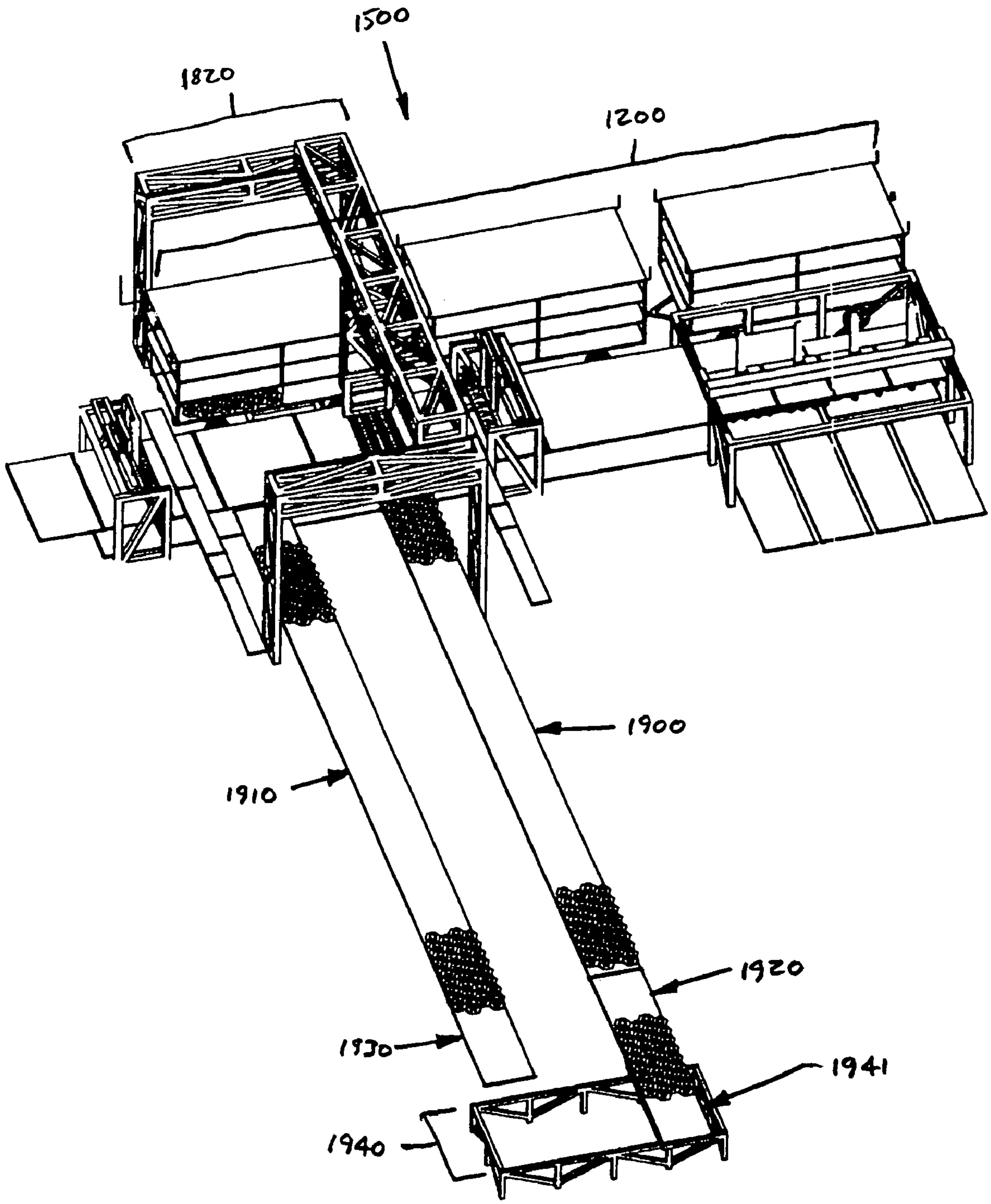

FIG. 67 is a perspective overhead view of a second embodiment of a pallet assembly/disassembly system with an autonomously guided a pallet assembly transport train, configured for unit processing of complete pallet assemblies.

PGSU EMB2

Figure 68:
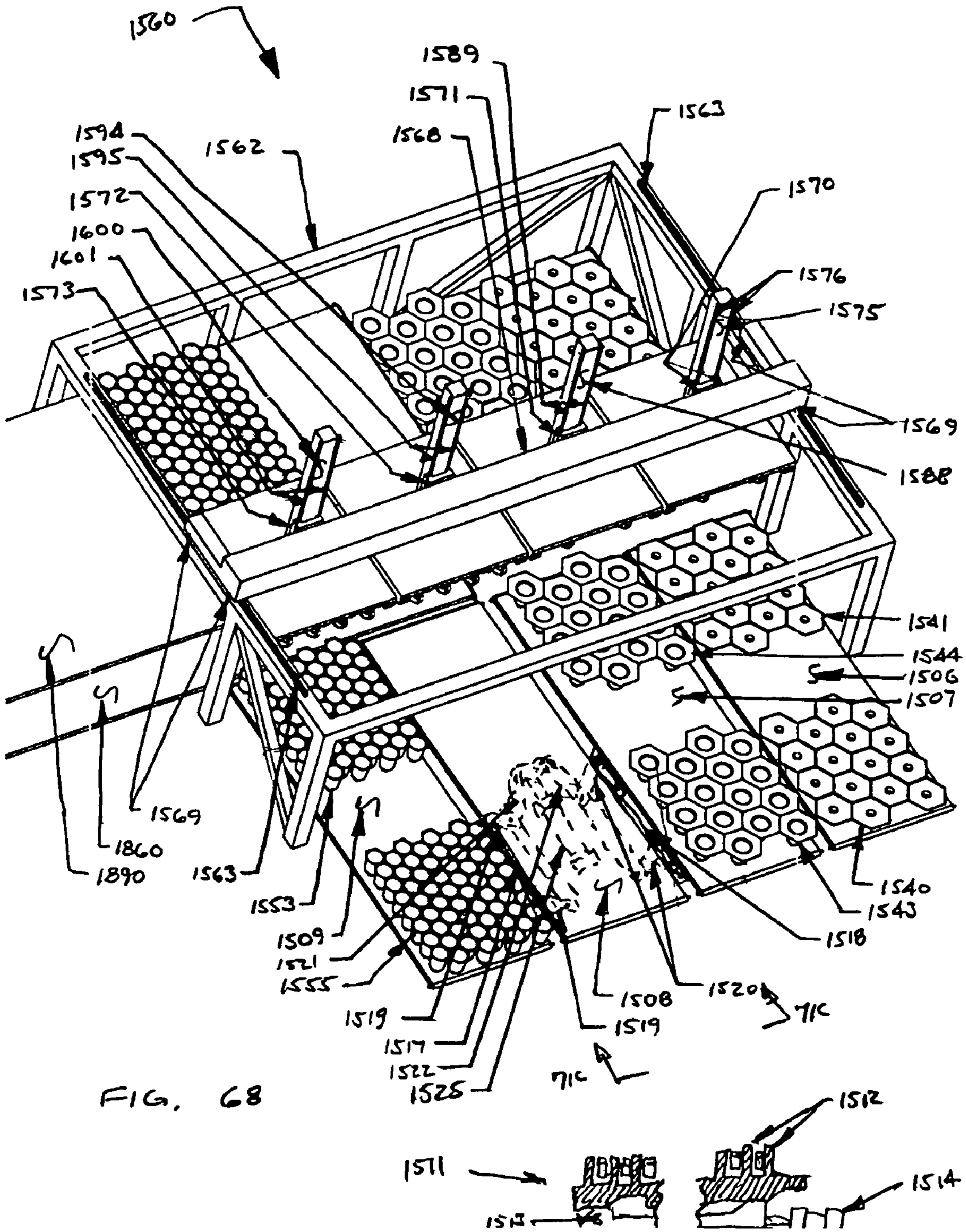

FIG. 68 is an overhead perspective view of a pallet/grid stacking/destacking unit and integral conveyors forming part of the pallet assembly/disassembly system of FIG. 66.

Figure 69:
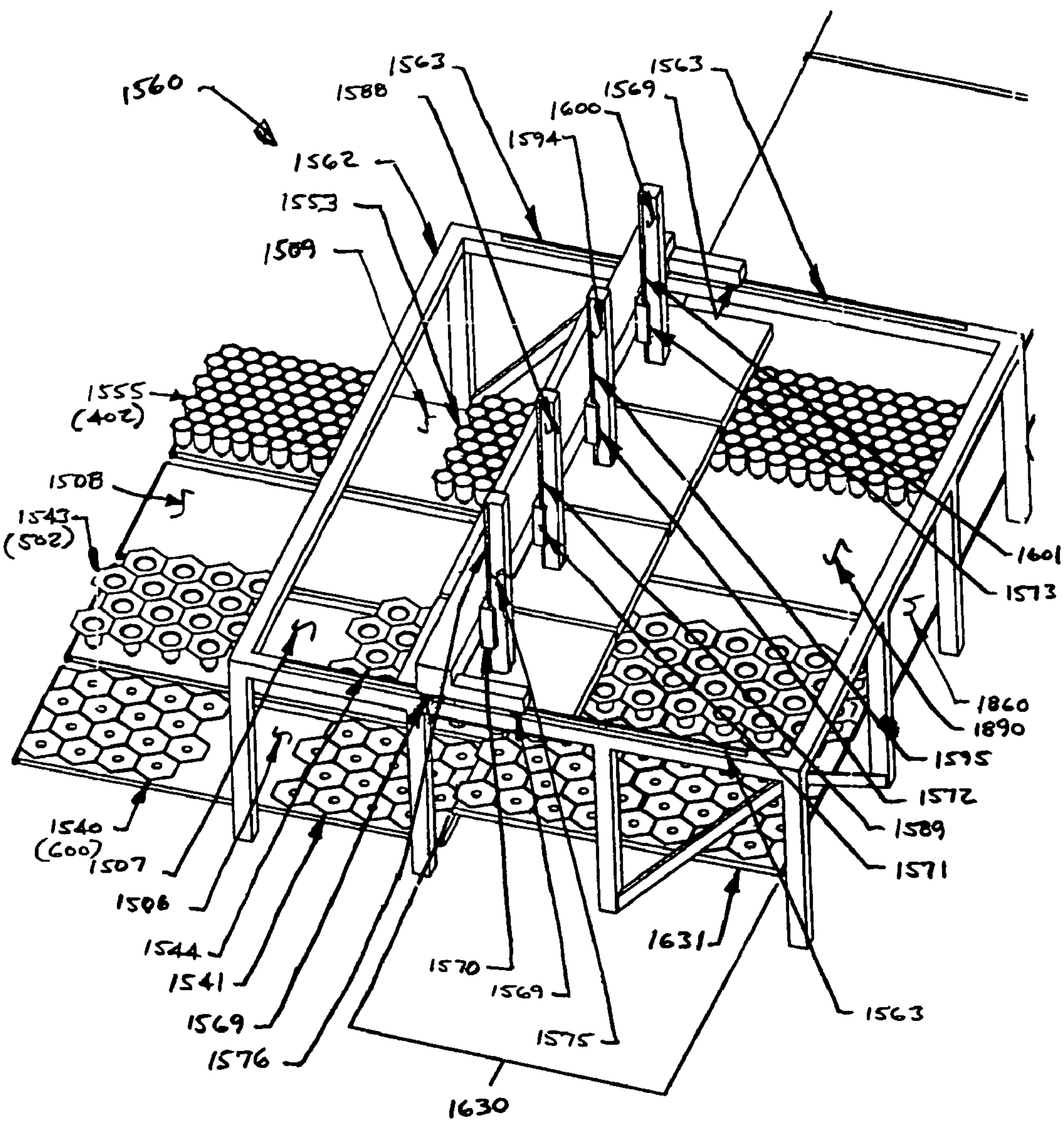

FIG. 69 is a second overhead perspective view of a pallet/grid stacking/destacking unit and integral conveyors forming part of the pallet assembly/disassembly system of FIG. 66.

PAU CGU EMB1

Figure 70:
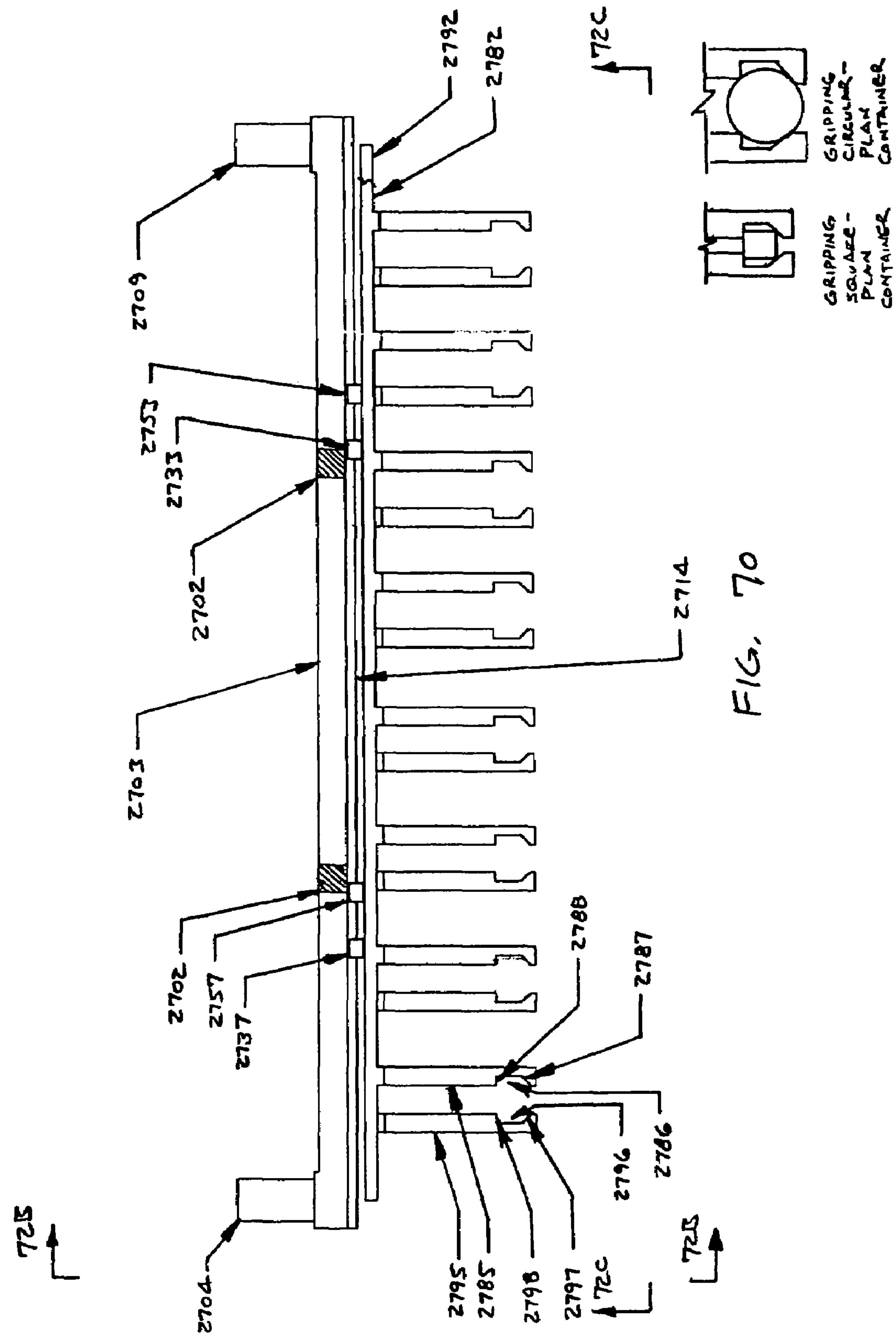

FIG. 70 is a plan view of a container active gripper assembly portion of a pallet assembly/disassembly system of FIG. 49, in accordance with a first embodiment of the invention.

Figure 71:
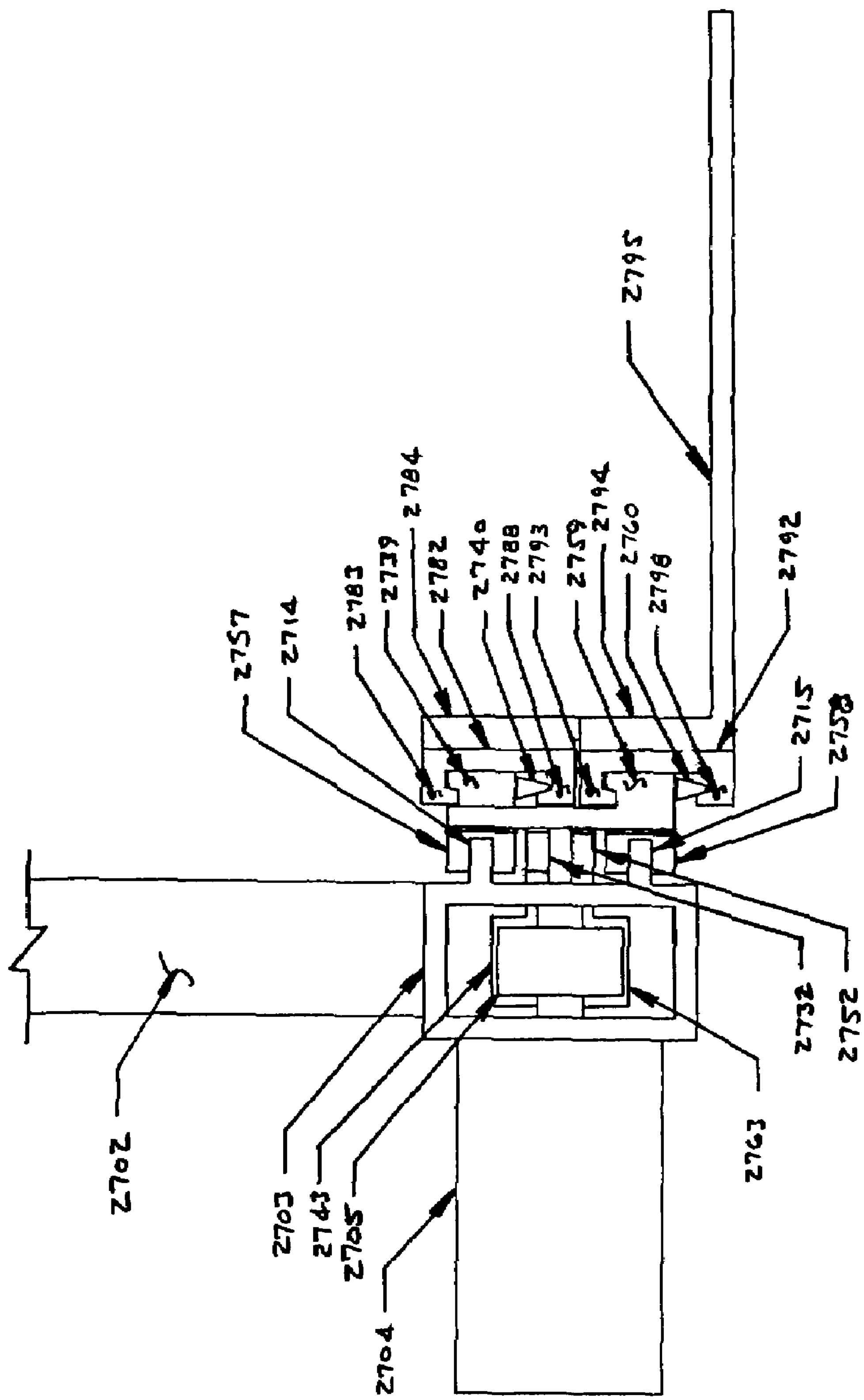

FIG. 71 is a side elevation view of the container active gripper assembly of FIG. 70, looking in direction 71-71 of FIG. 70.

Figure 72A:
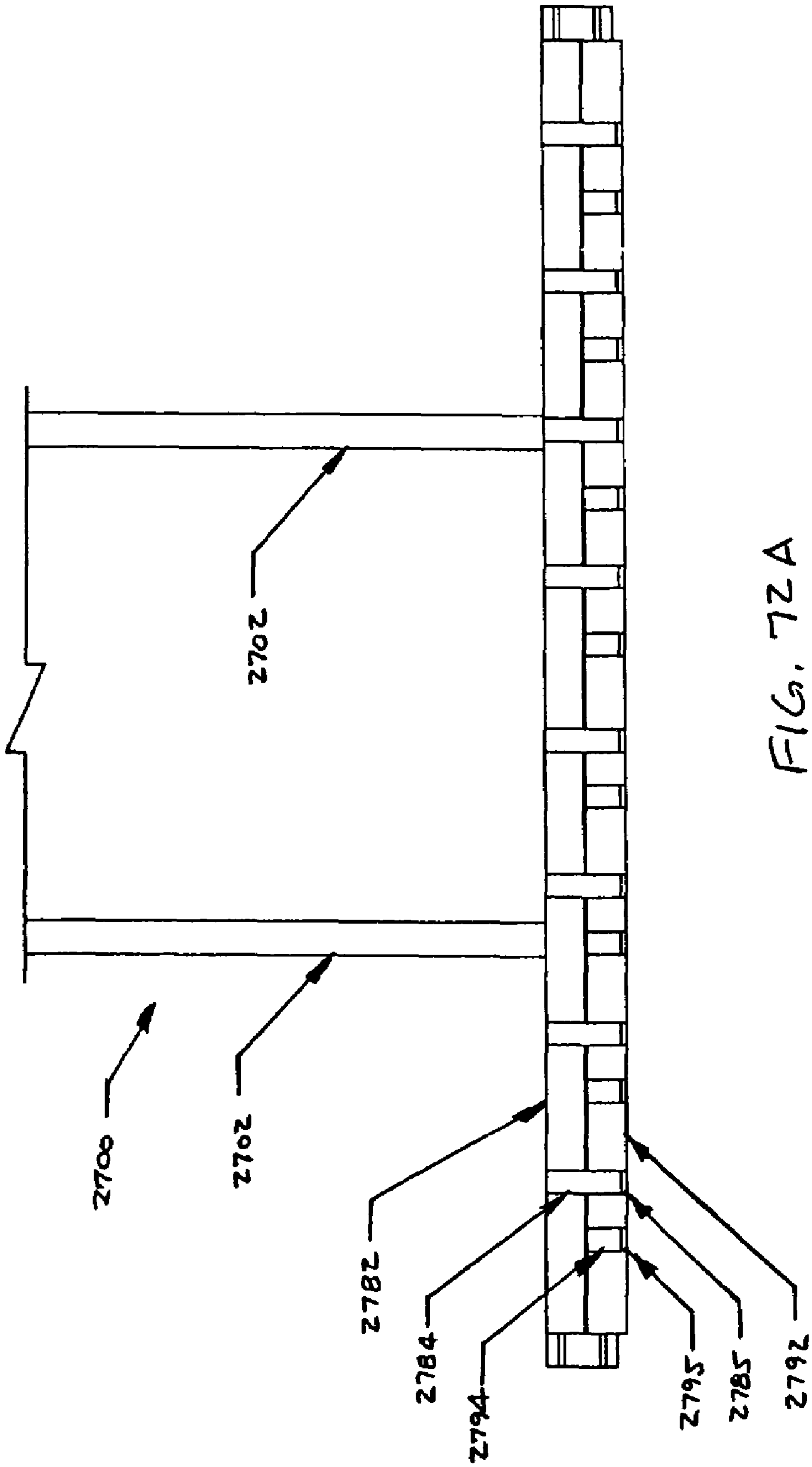

FIG. 72A is a frontal elevation view of the container active gripper assembly of FIG. 70, looking in direction 72A-72A of FIG. 70.

Figure 72B:
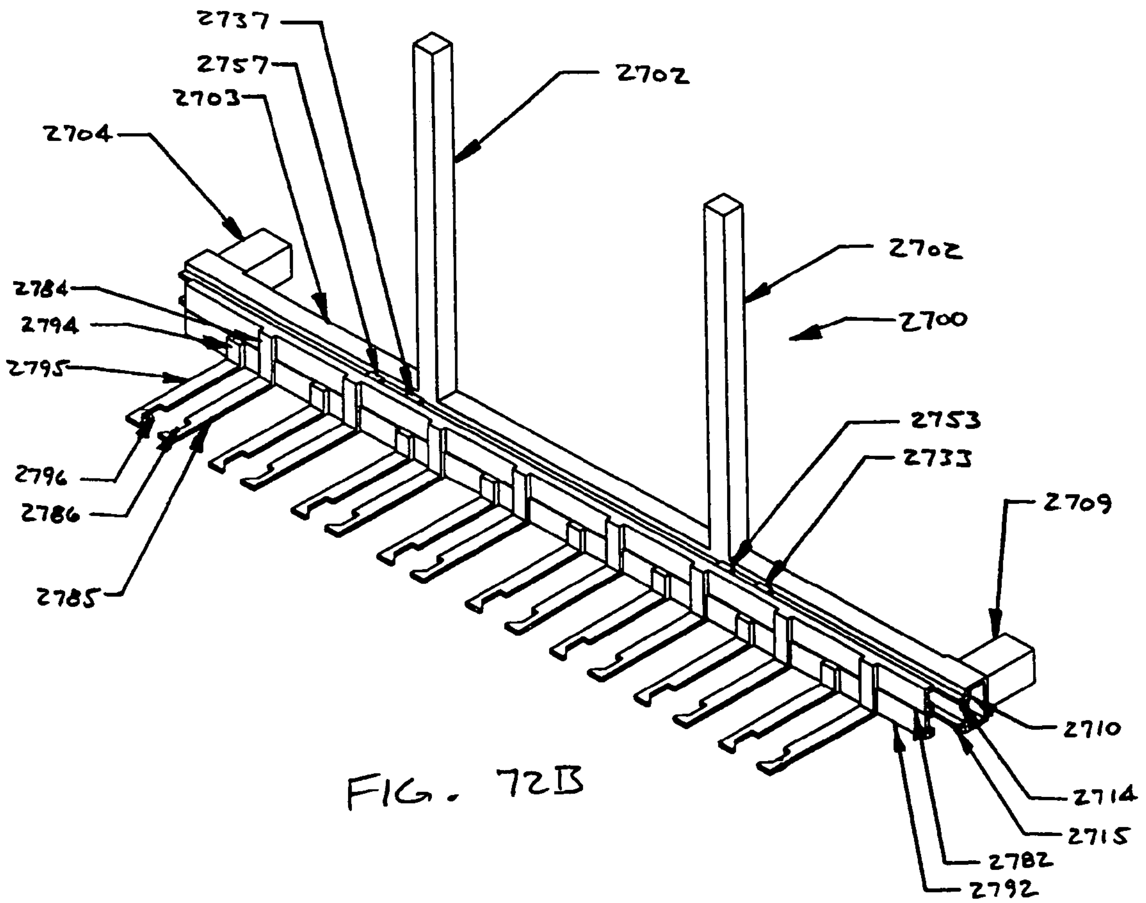

FIG. 72B is a first overhead perspective view of the container active gripper assembly of FIG. 70.

Figure 72C:
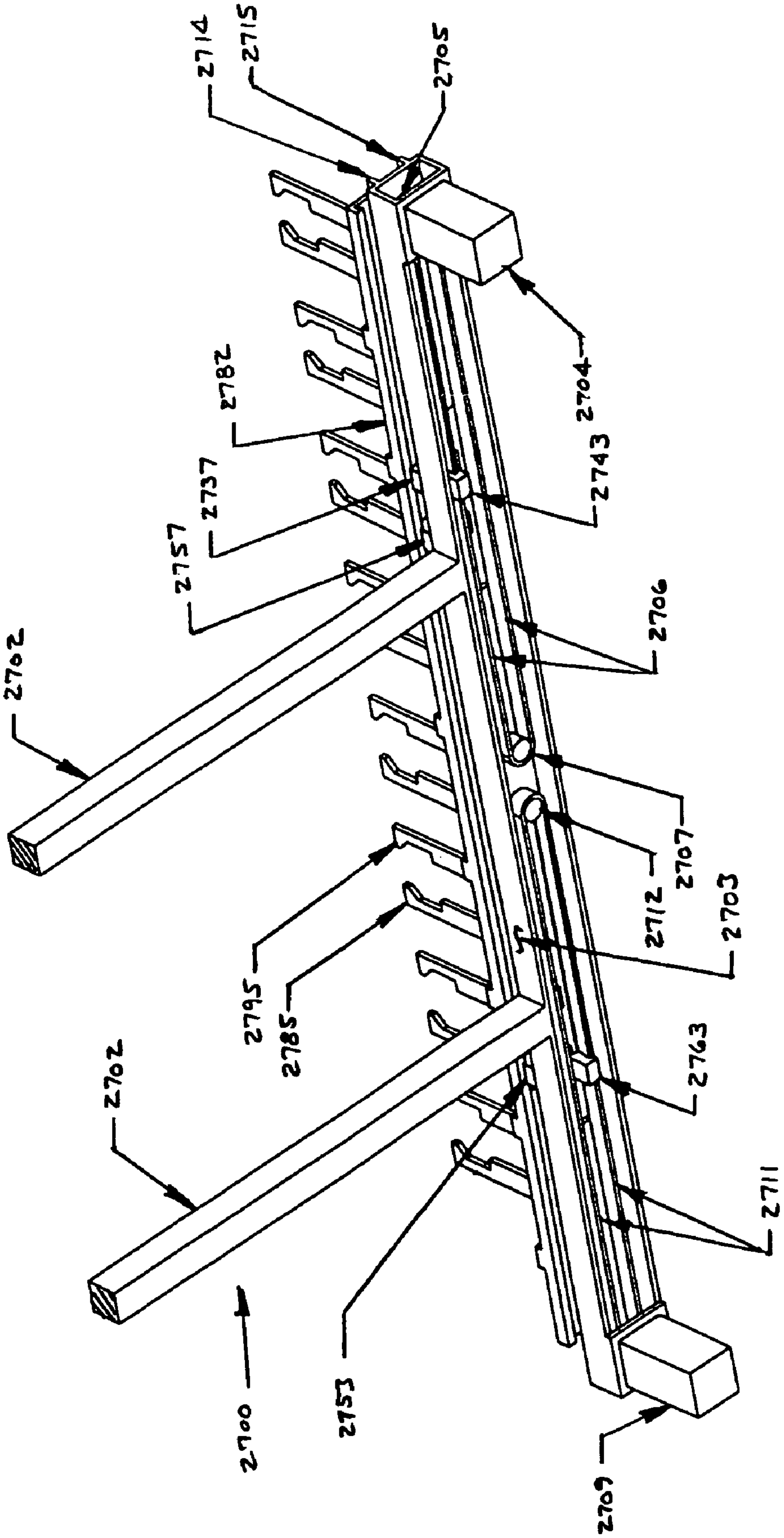

FIG. 72C is a second overhead perspective view of the container active gripper assembly of FIG. 70, viewed from side of vertical riser members opposite container gripper tines.

PAU CGU EMB2

Figure 73A:
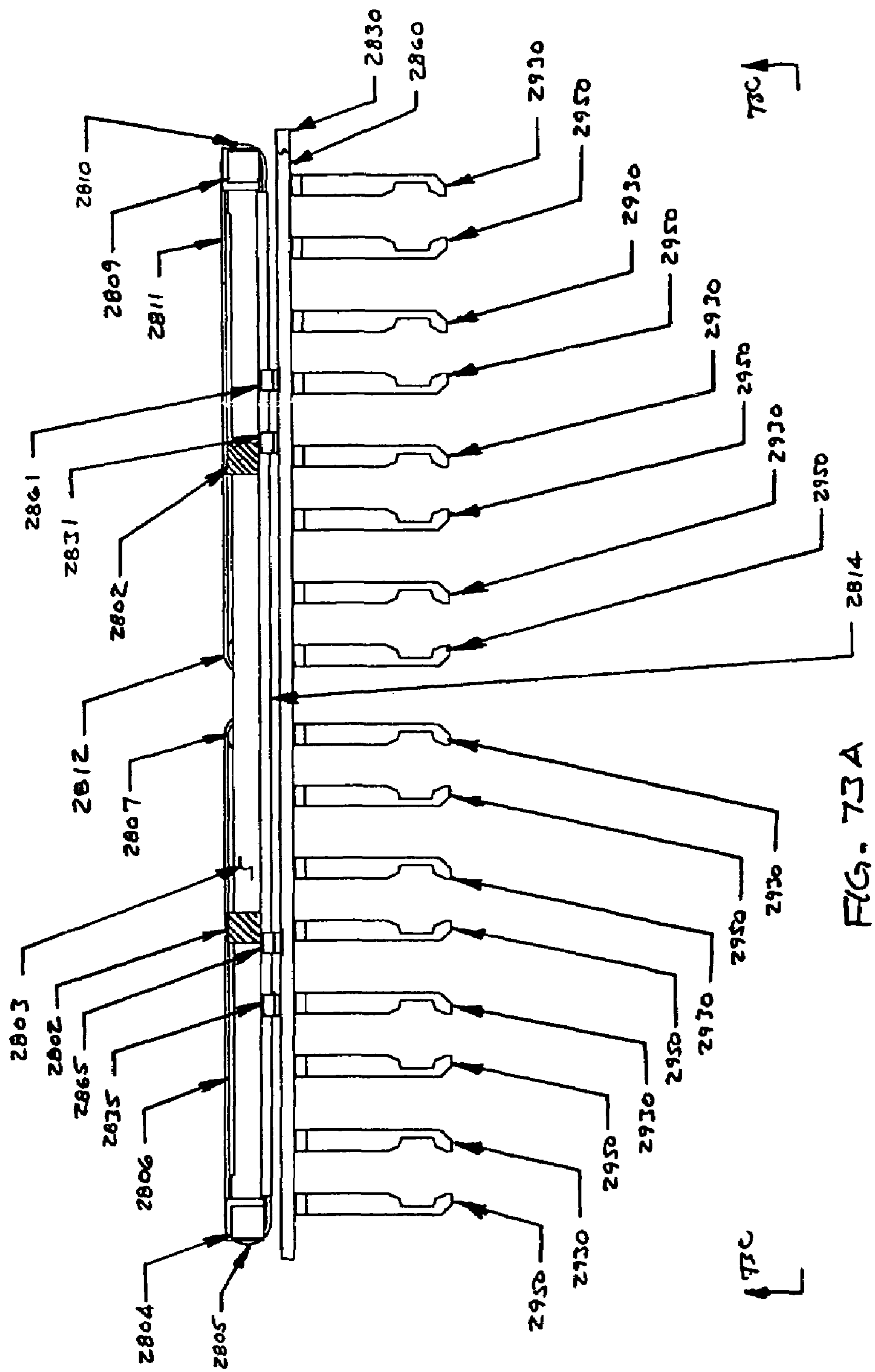

FIG. 73A is a plan view of a container active gripper assembly portion of a pallet assembly/disassembly system of FIG. 49, in accordance with a second embodiment of the container gripping mechanisms of the invention.

Figure 73B:
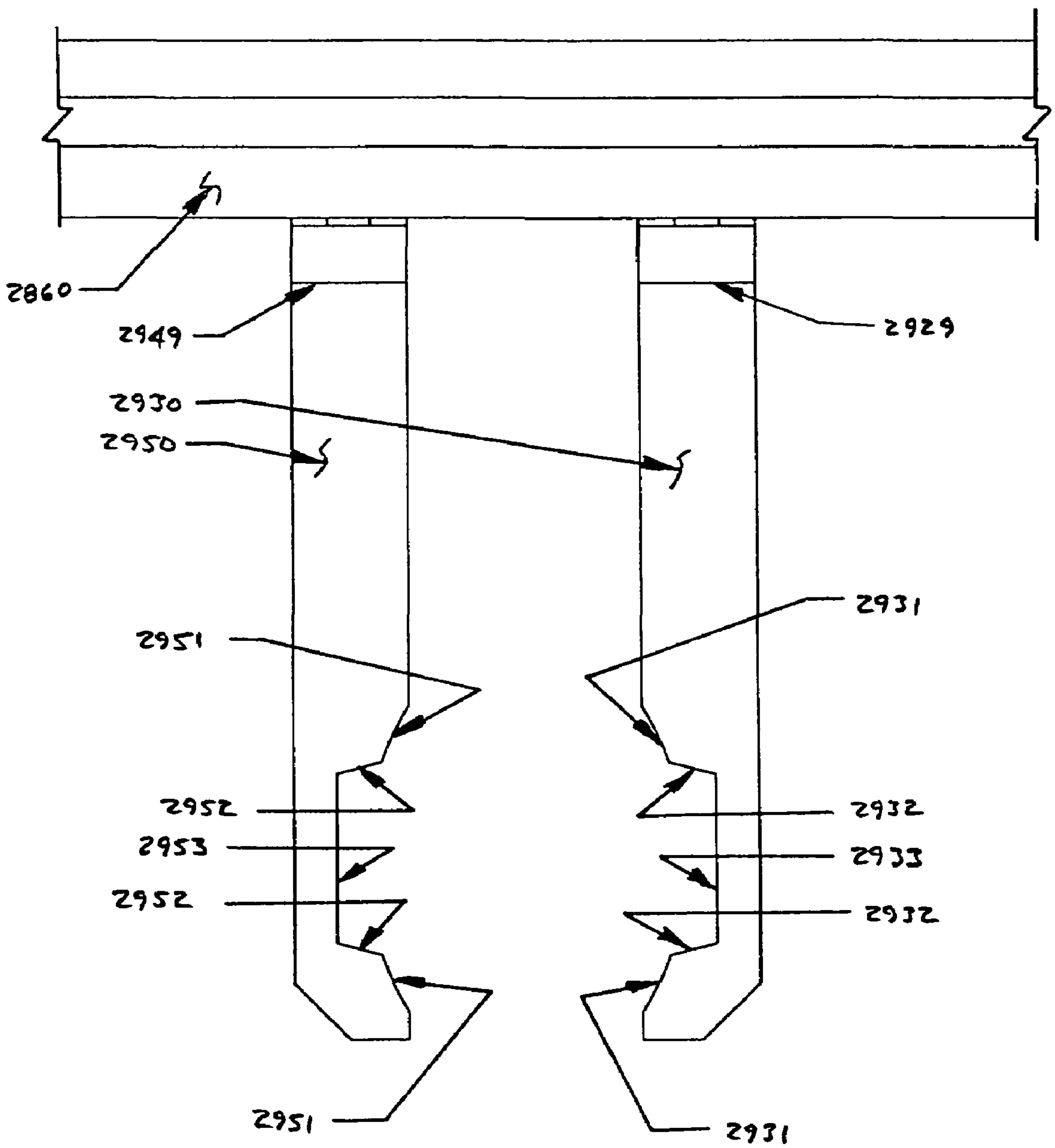

FIG. 73B is a close-up plan view of one pincer of FIG. 73A.

Figure 73C:
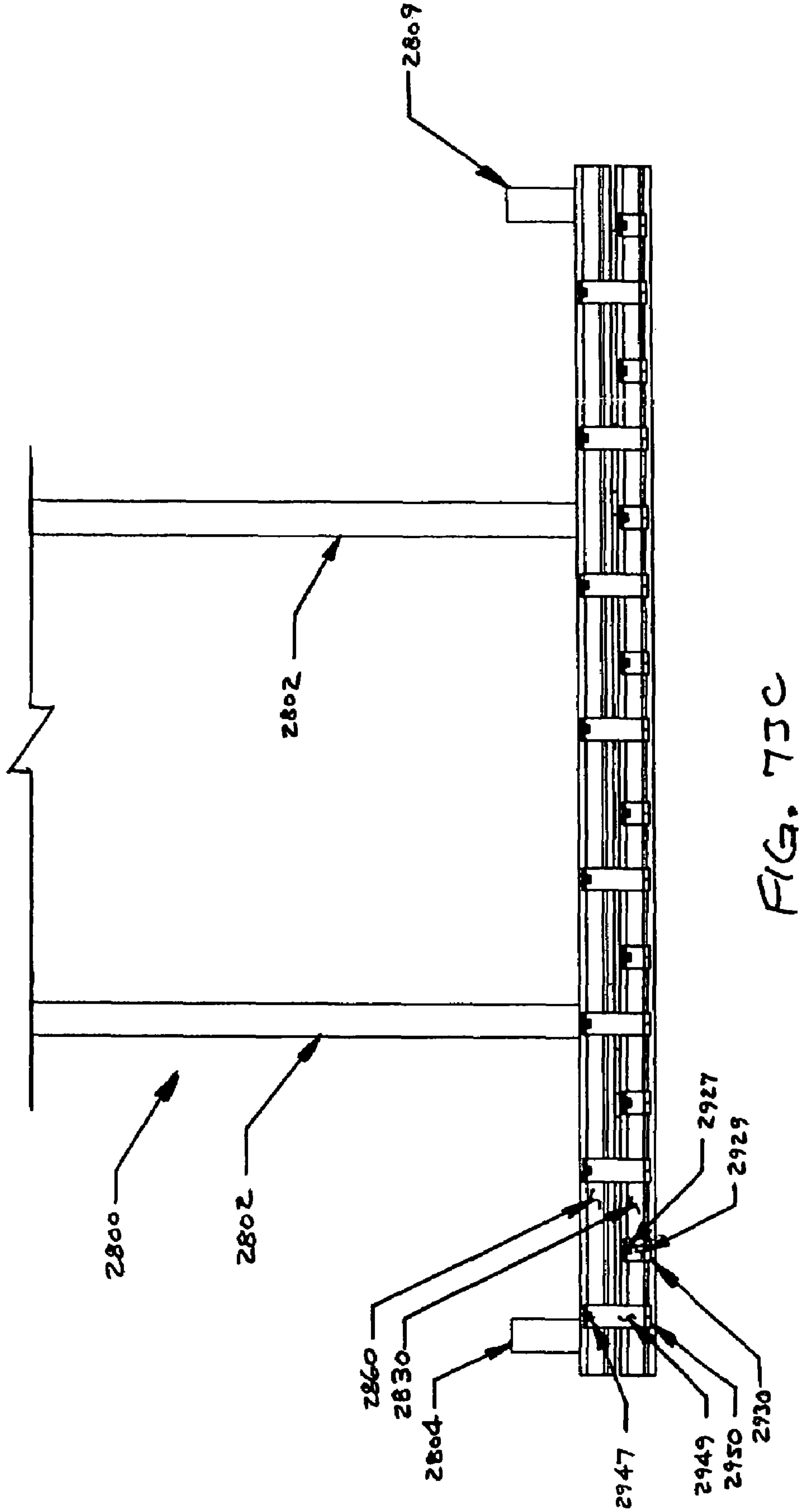

FIG. 73C is a frontal elevation view of the container active gripper assembly of FIG. 73A, looking in direction 73C-73C of FIG. 73A.

Figure 73D:
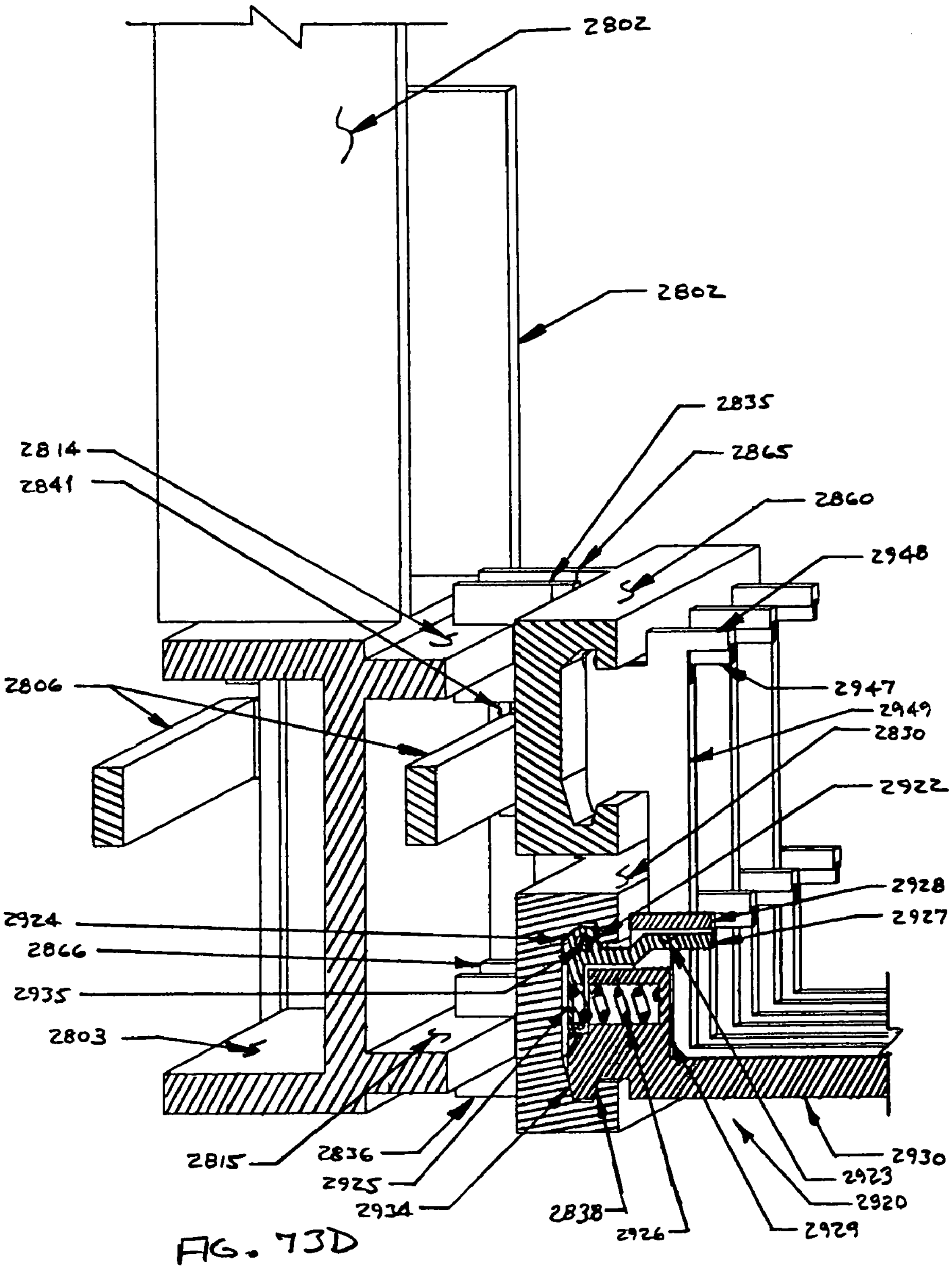

FIG. 73D is a side perspective view of a vertical section of the container active gripper assembly of FIG. 73A, wherein section bisects the base of a gripper tine.

PAGTU EMB2

Figure 74A:
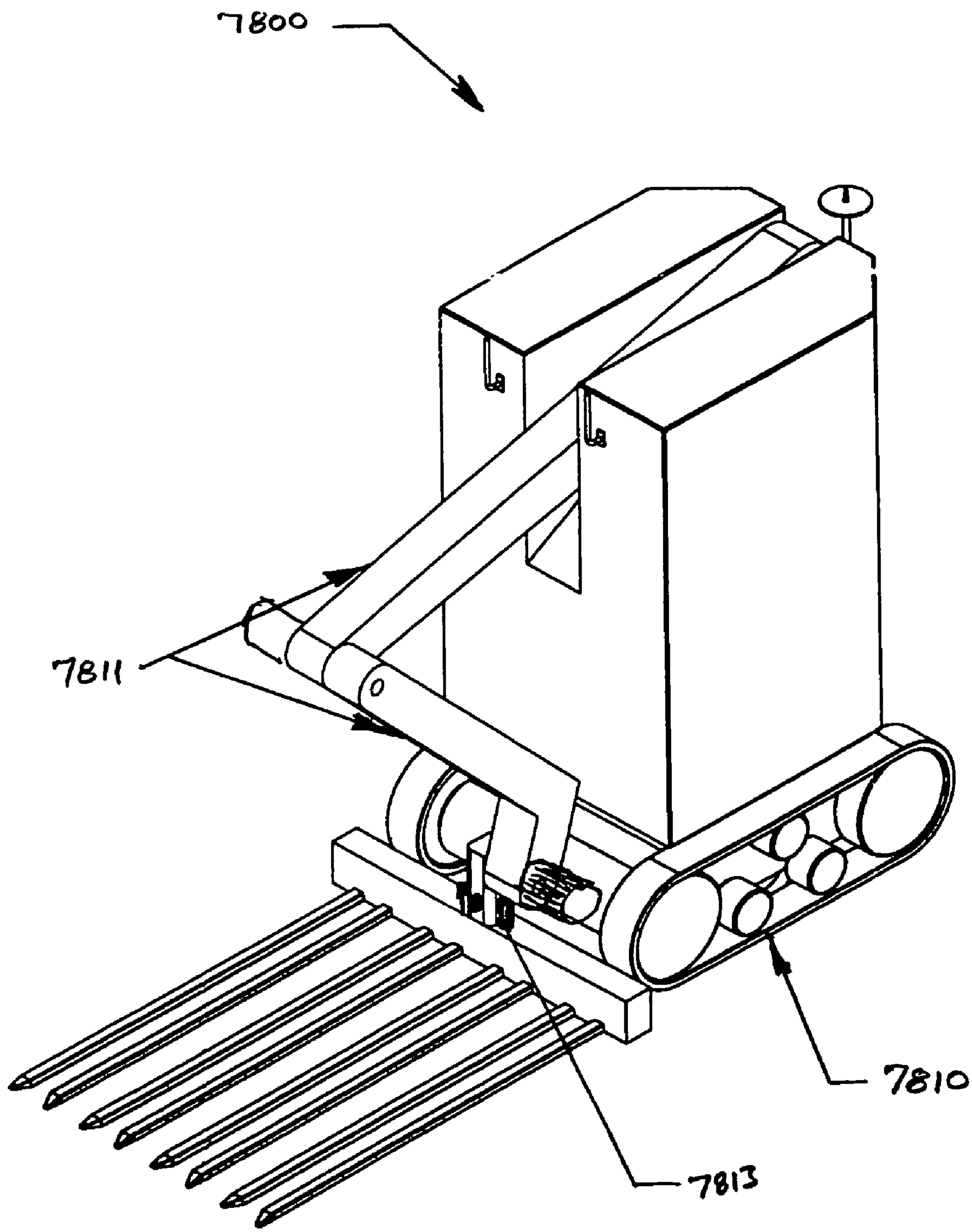

FIG. 74A is an overhead perspective view of a pallet assembly greenhouse transfer unit of a second embodiment, having a fork—shown down and retracted-, which is mounted on a knuckle boom, which is, in turn, mounted on a crawler track carriage having a turntable.

Figure 74B:
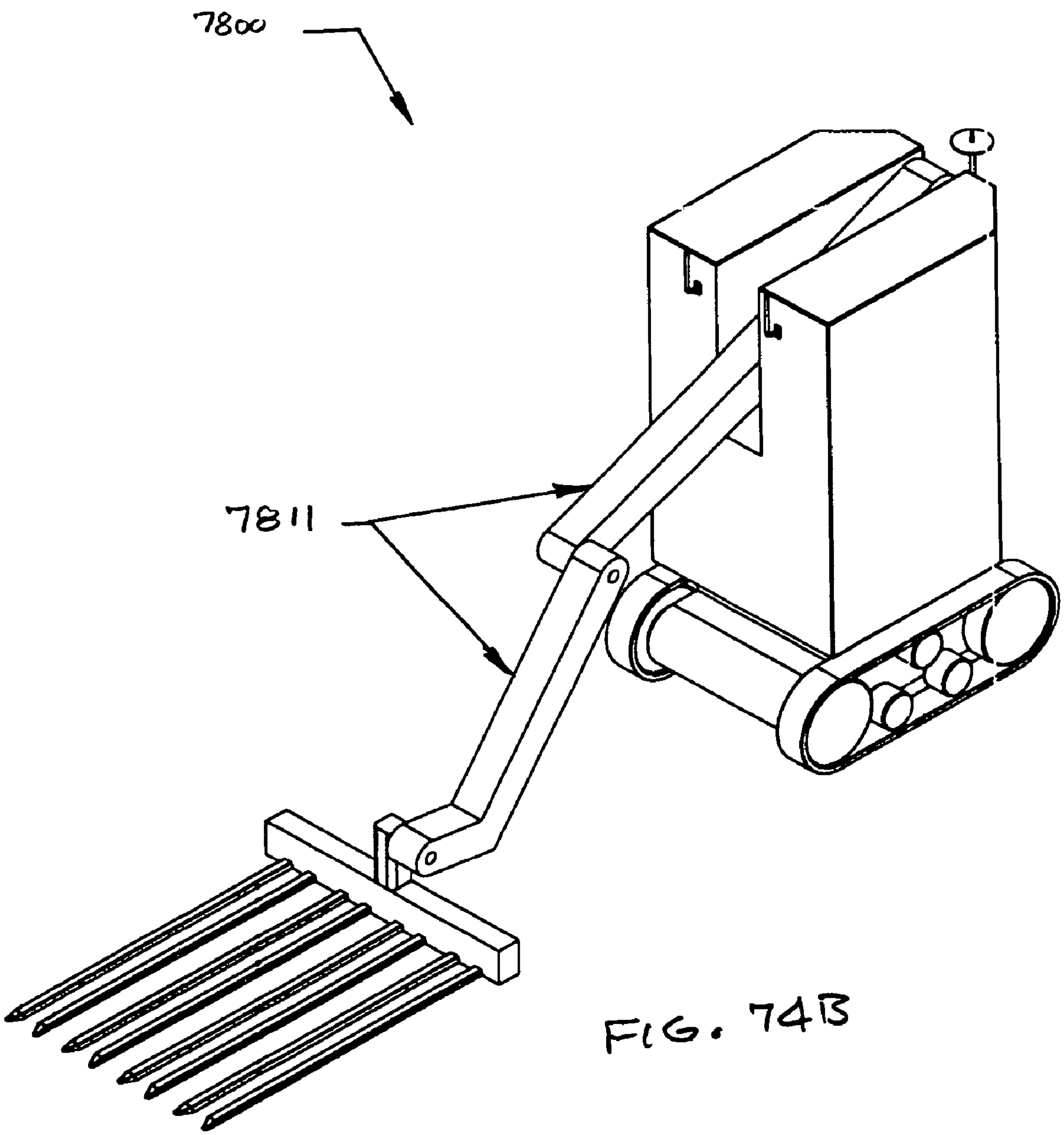

FIG. 74B is an overhead perspective view of the pallet assembly greenhouse transfer unit of FIG. 74A, with its fork down and extended.

Figure 74C:
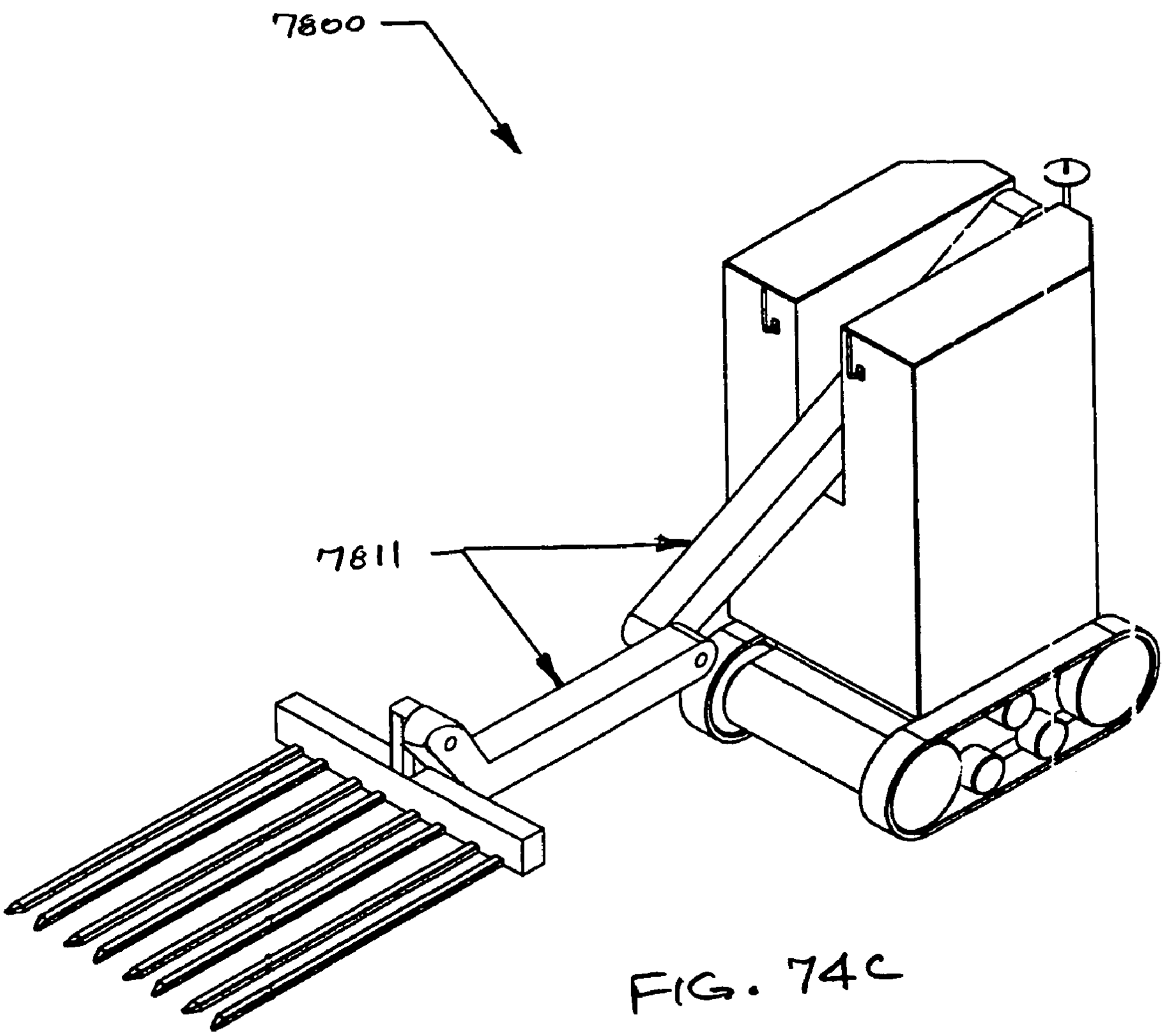

FIG. 74C is an overhead perspective view of the pallet assembly greenhouse transfer unit of FIG. 74A, with its fork partially elevated and extended.

Figure 74D:
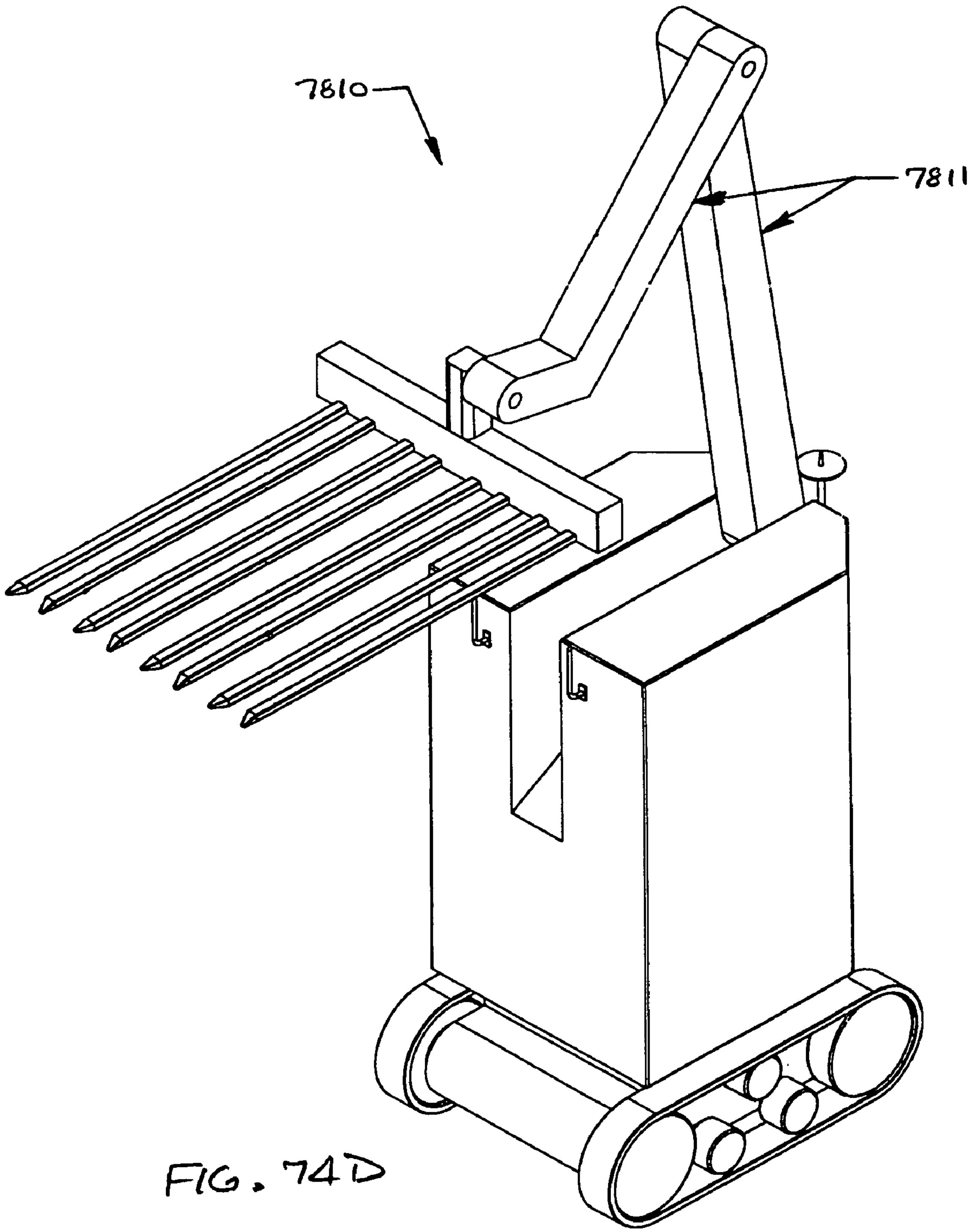

FIG. 74D is an overhead perspective view of the pallet assembly greenhouse transfer unit of FIG. 74A, with its fork elevated and retracted.

Figure 74E:
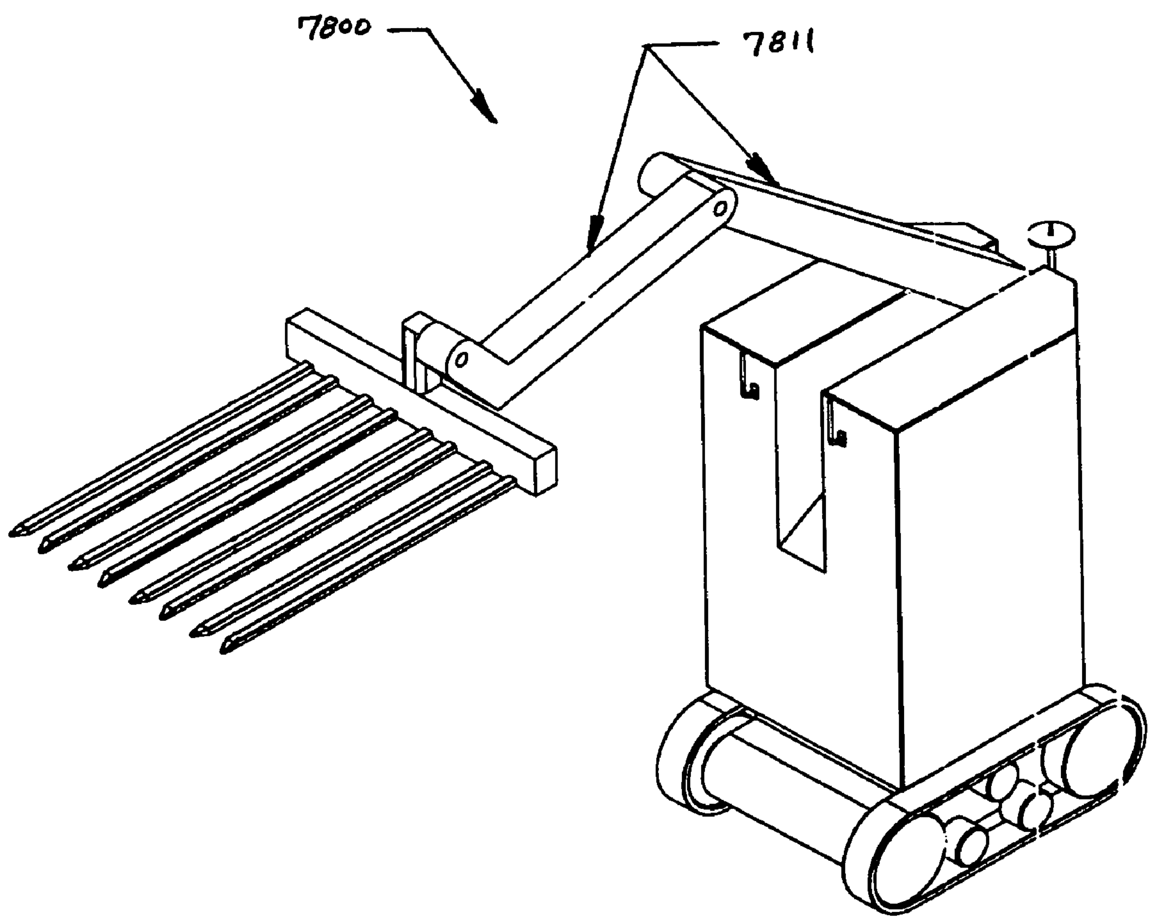

FIG. 74E is an overhead perspective view of the pallet assembly greenhouse transfer unit of FIG. 74A, with its fork elevated and extended.

Figure 74F:
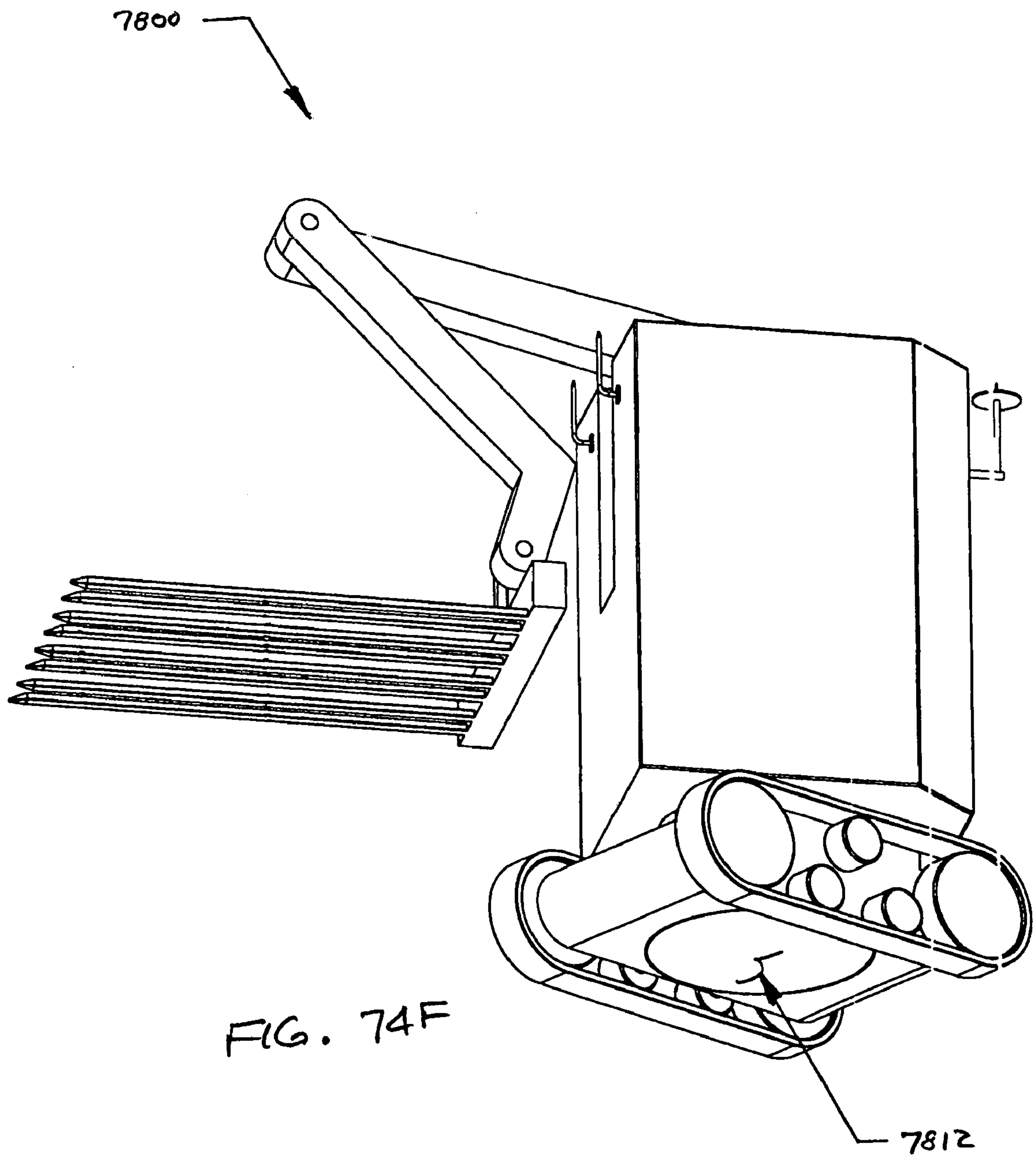

FIG. 74F is an underneath perspective view of the pallet assembly greenhouse transfer unit of FIG. 74A, with its fork partially elevated and retracted and the body swiveled about the unit track carriage.

PAGTU EMB3

Figure 75:
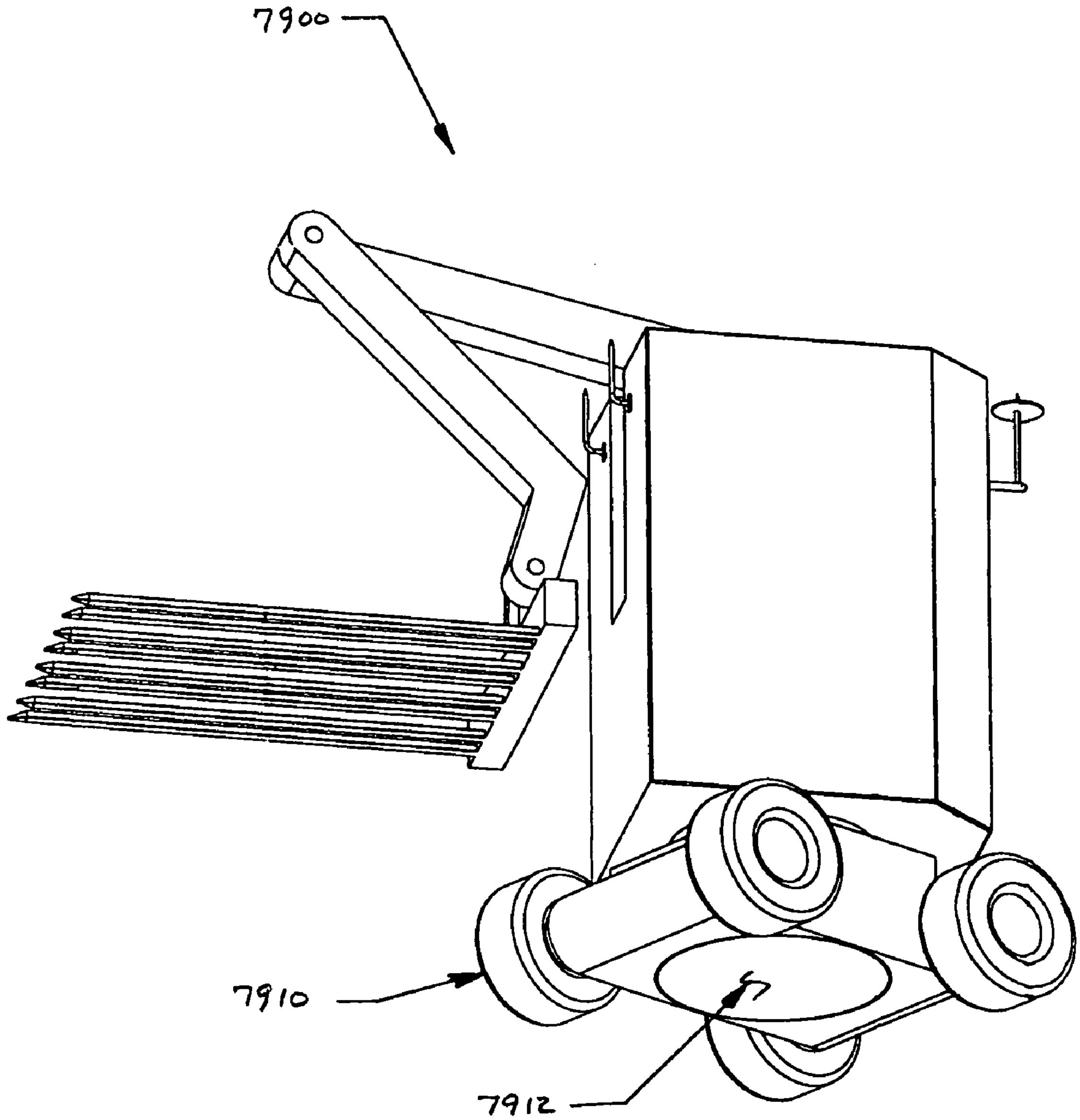

FIG. 75 is an underneath perspective view of a pallet assembly greenhouse transfer unit of a third embodiment, having a fork—shown partially elevated and retracted—, which is mounted on a knuckle boom, which is, in turn, mounted on a four-wheel, rubber-tire carriage having a turntable.

PAFTU EMB2

Figure 76:
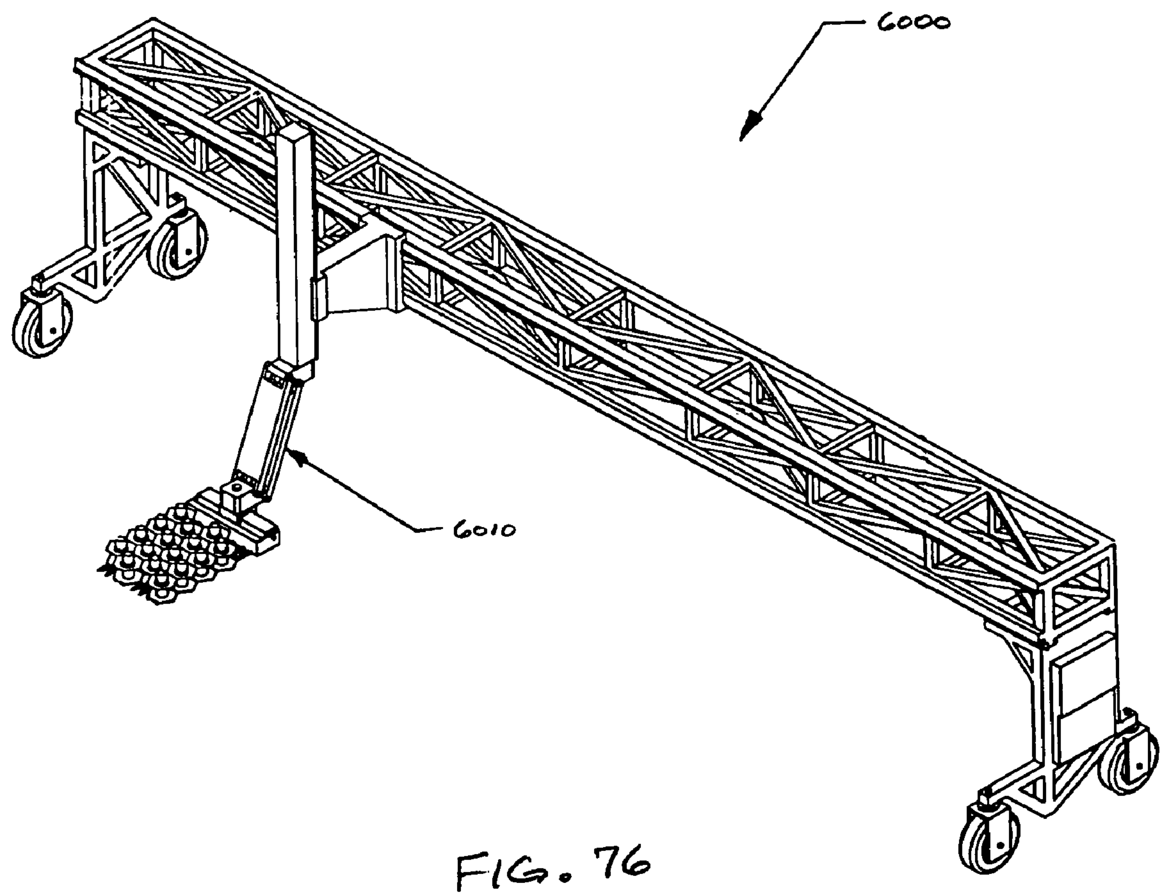

FIG. 76 is a perspective view of a pallet assembly field transfer unit of a second embodiment.

DESCRIPTION OF THE INVENTION

General Arrangement

Figure 1:
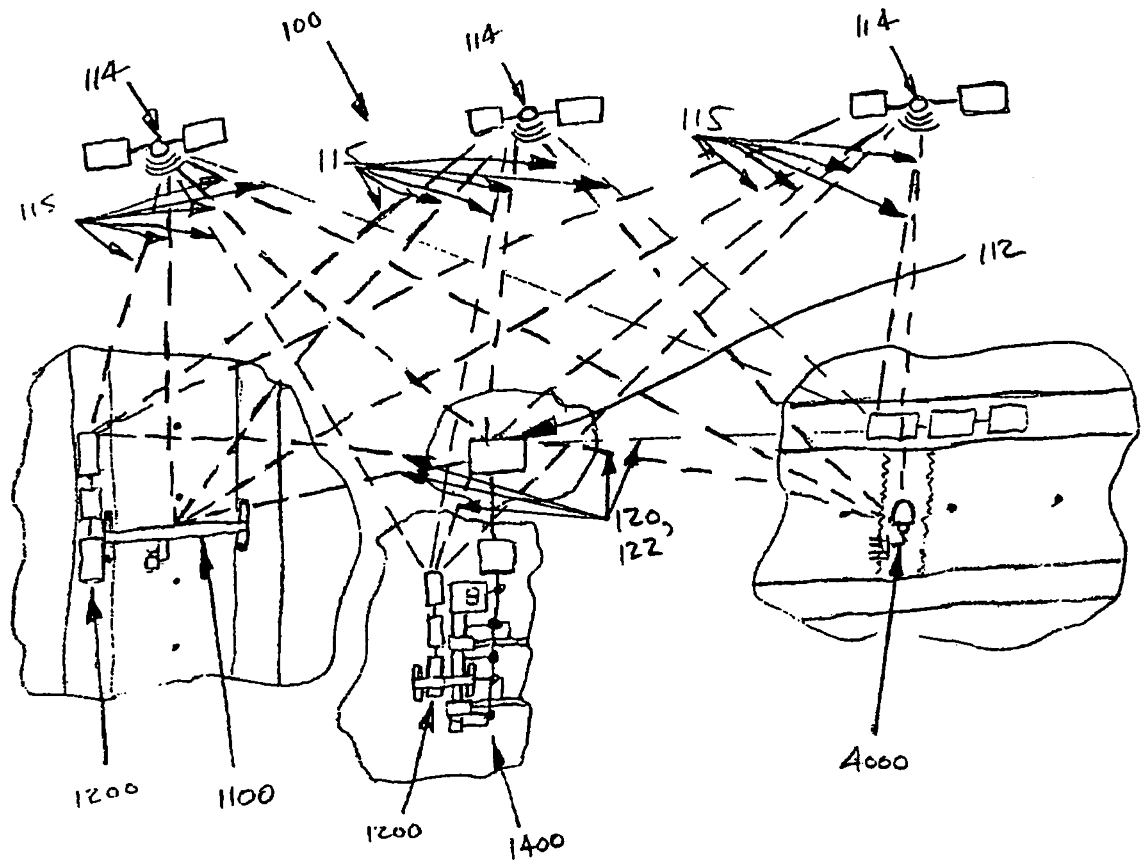
FIG. 1 is a basic illustration of a nursery automation system in accordance with a first embodiment of the invention.

Referring now to the illustration of FIG. 1, a general layout of a system in accordance with a first embodiment of the invention is shown. The first embodiment of the invention comprises an automated system 100 for handling and performing various processes on containerized nursery stock 110 in a large horticultural nursery, wherein a significant portion of the containerized nursery stock 110 spends a significant portion of growing time outdoors or in greenhouses. Key components of a first embodiment of the invention include: multiple configurations of containerized plant material pallet assemblies—contiguous tray array pallet assembly 300, contiguous containerized plant array pallet assembly 400 and spaced containerized plant array pallet assembly 500—, shown in FIGS. 2 through 48, including innovative features of components incorporated in pallet assemblies 300, 400 and 500; GPS satellites 114 and associated radio signals 115; a base station 112, establishing an RTK GPS reference position and associated radio signals 120, and providing system master control and associated fixed 118 and radio 122 links with stationary and autonomously guided mobile machinery; an autonomously guided pallet assembly field transfer unit 1100; an autonomously guided pallet assembly transport train 1200; an autonomously guided pallet assembly greenhouse transfer unit 1300; and a central pallet assembly/transfer system 1400. Machinery is shown in FIGS.

49-63 and 66-76. Invention also includes tools to facilitate nursery mapping/surveying, shown in FIGS. 64 and 65.

Pallet Assemblies

Figure 2A:
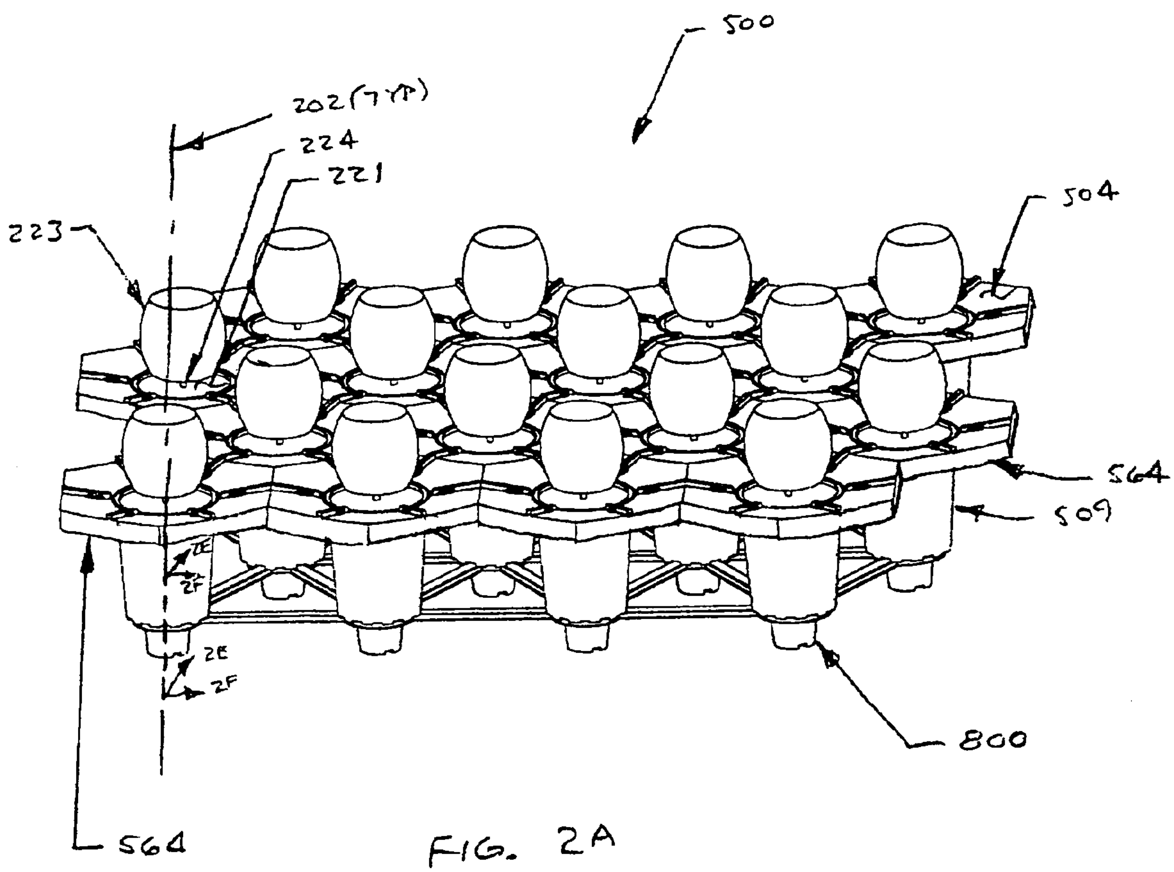
FIG. 2A is a perspective view of a first embodiment of a spaced-container (no. 1/trade gallon) pallet assembly in accordance with the invention.
Figure 2B:
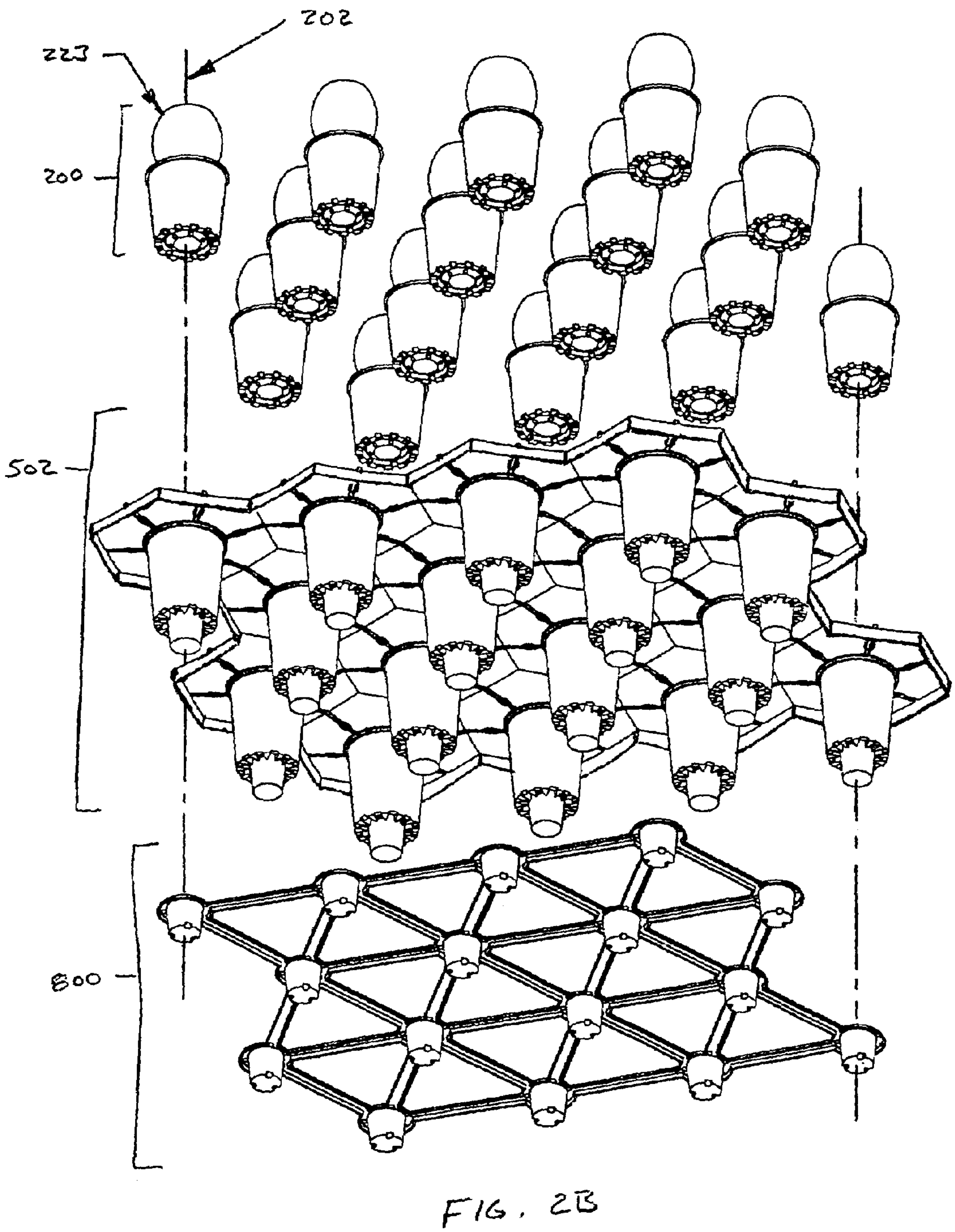
FIG. 2B is a perspective exploded view of the pallet assembly of FIG. 2A, viewed from below the assembly.

FIGS. 2A, 2B—Pallet Assembly: Pallet Spaced Hex W/Grid

Invention comprises in part a family of containerized plant pallet assemblies, a first embodiment of which comprises a spaced container pallet assembly 500 like that shown in FIGS. 2A through 2H. Complete pallet assemblies are shown in FIGS. 2A and 2B. Pallet assembly 500 incorporates a thin-wall pallet 502 that unitizes in a planar array multiple individual containerized plants 200. Pallet assembly 500 may further incorporate an optional pallet-stiffening grid 800 into which pallet 502 nests.

Pallet 502 comprises an array of mutually contiguous, coupled shallow funnel-shaped segments in which are centered openings from which extend hollow downward protrusions forming container receptacles 509 which complement shapes of containers to be received. Unitization of individual containerized plants into pallet assemblies 500 substantially reduces the ratio of the effective unit height/least plan area dimension compared with free-standing individual containerized plants 200 and, thus, provides for a corresponding substantial gain in stability of position and orientation of incorporated containerized plants 200 relative to freestanding individual containerized plants 200. Such stabilization increase substantially averts toppling of incorporated containerized plants 200 subjected to wind that would readily topple freestanding containerized plants 200. Stability increase also applies in transportation of incorporated containerized plants 200. Manipulation of individual containerized plants 200 is conducted solely by a central pallet assembly/disassembly system 1400, described below, in which close control over movement of such plant material to ensures highly reliable system operation.

Outer perimeter of pallet upper wall 504 incorporates a stiffening lip 564, which allows pallets to abut one another without overlapping of upper walls 504 of adjoining pallets. Such abutment promotes substantial sealing of air gaps otherwise existing between pallets, providing—with supplemental barriers—a significant barrier to passage of humid air from below pallet upper wall to above, promoting relatively dry foliage 223 and relatively moist soil, thereby reducing potential for moisture-related foliage diseases.

Figure 2C:
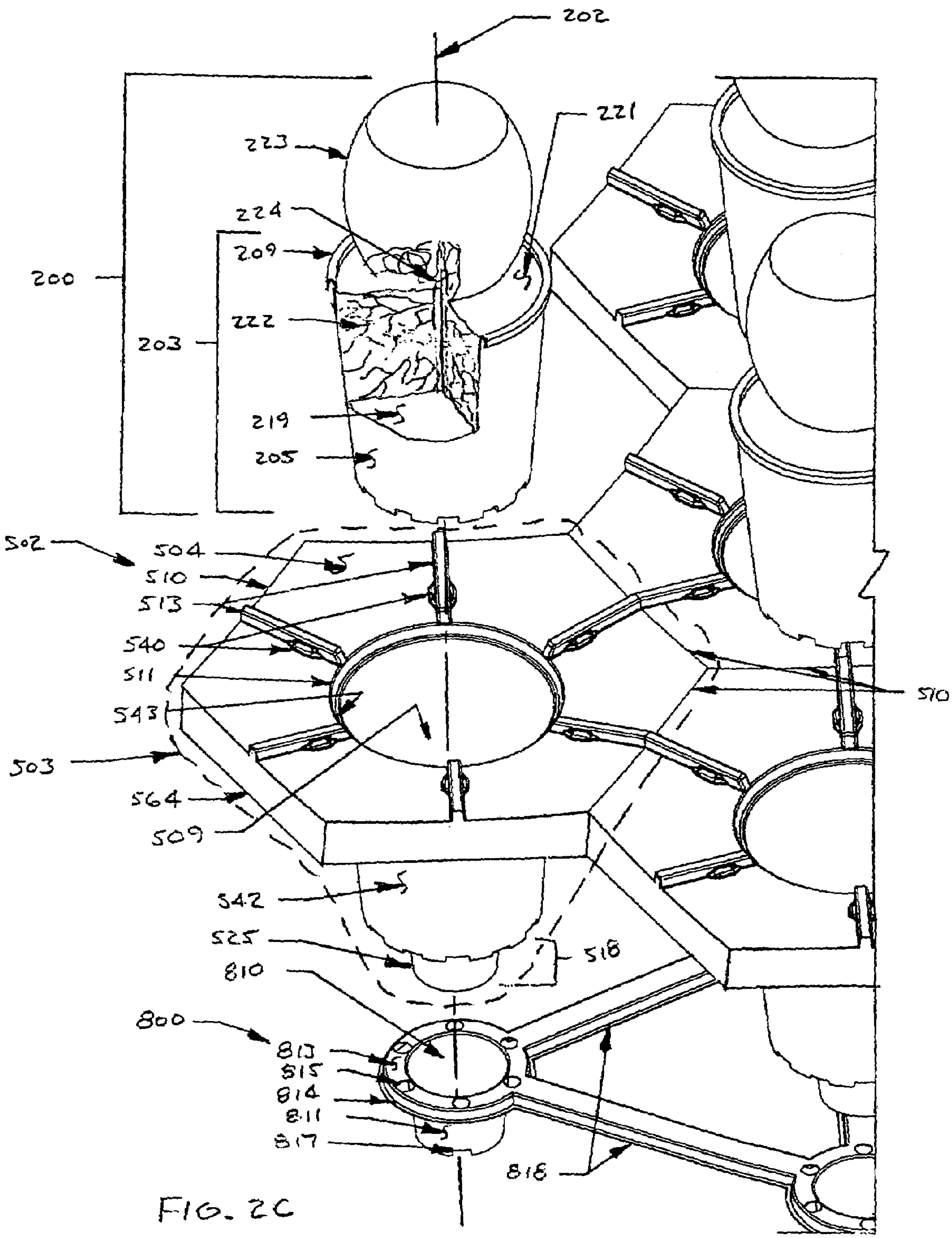
FIG. 2C is a perspective exploded close-up view of one segment of the pallet assembly of FIG. 2A, viewed from above the assembly.
Figure 2D:
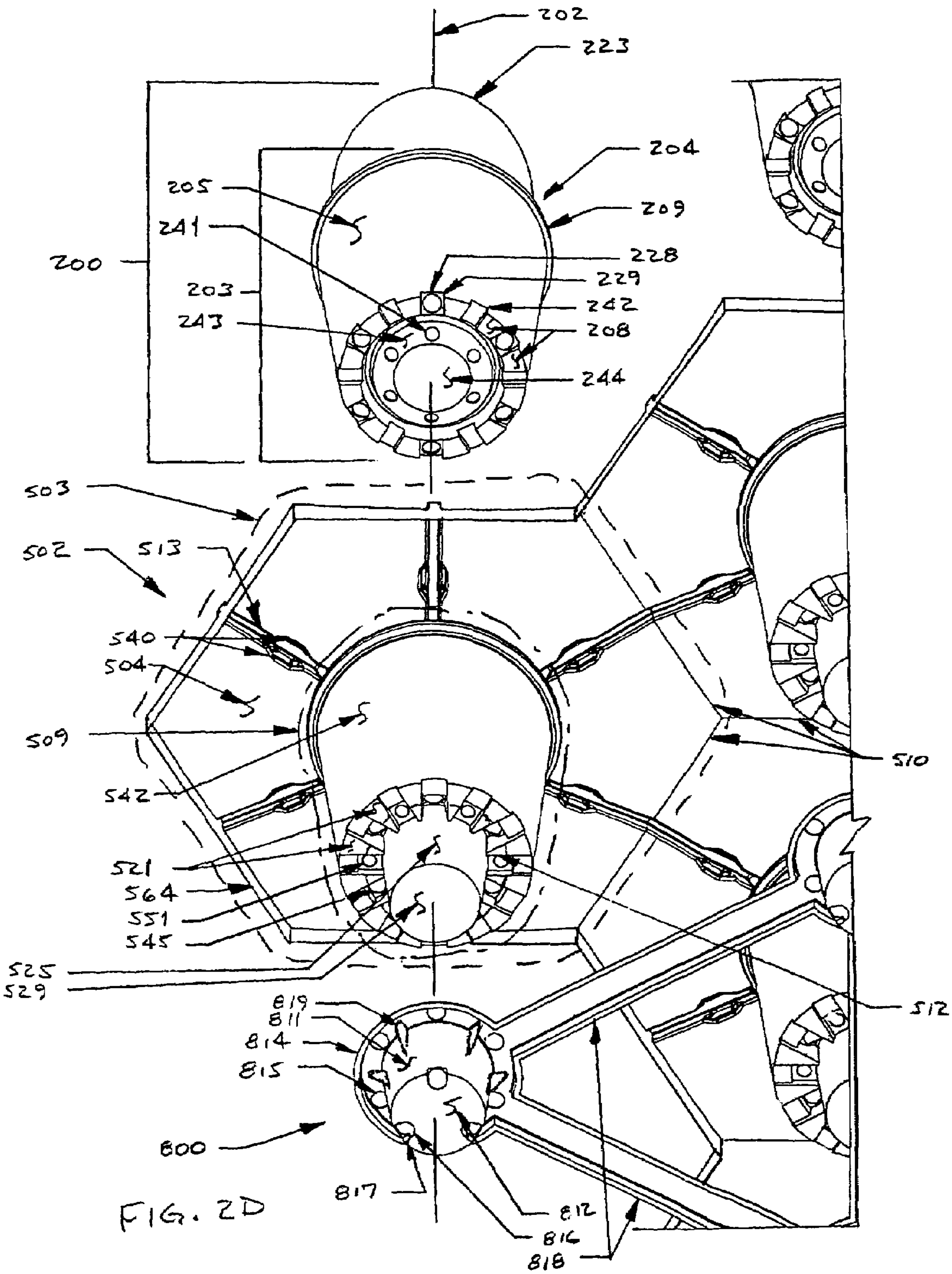
FIG. 2D is a perspective exploded close-up view of the segment of the pallet assembly of FIG. 2A, viewed from below the assembly.
Figure 2E:
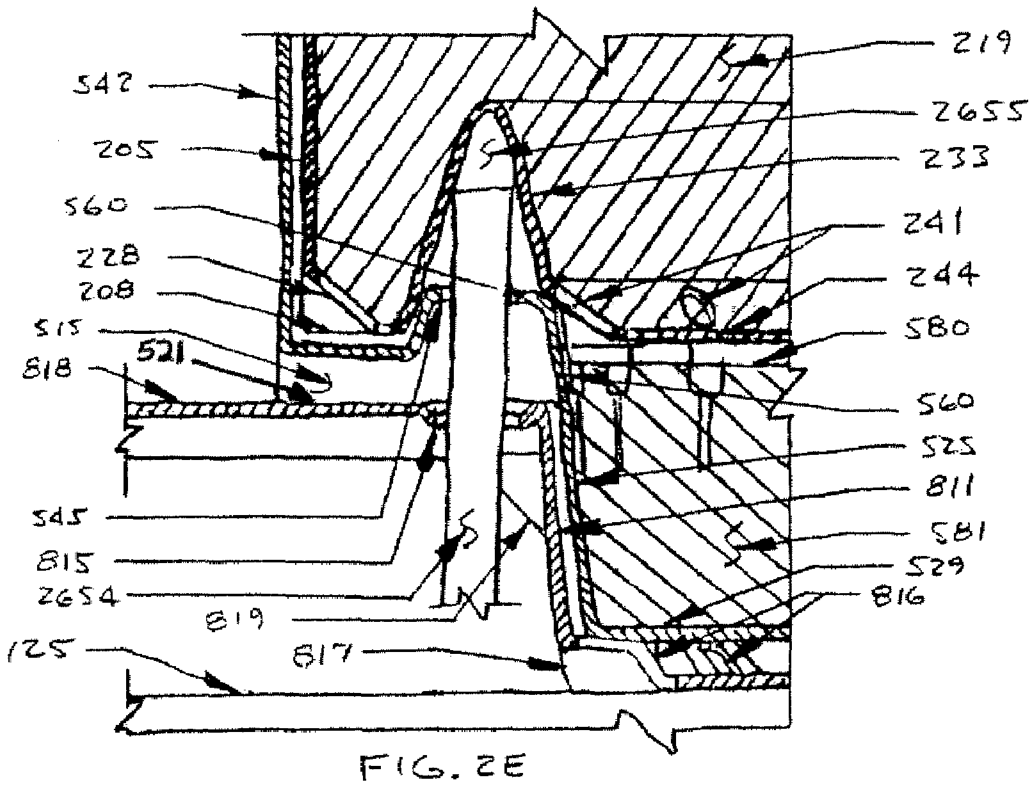
FIG. 2E is a partial elevation section view of the lower left-hand portion of a segment of the pallet assembly of FIG. 2A, looking in direction 2E-2E of FIG. 2A, showing a pallet configuration having a water reservoir, wherein the free surface of the reservoir water is below the bottom of the installed container.
Figure 2F:
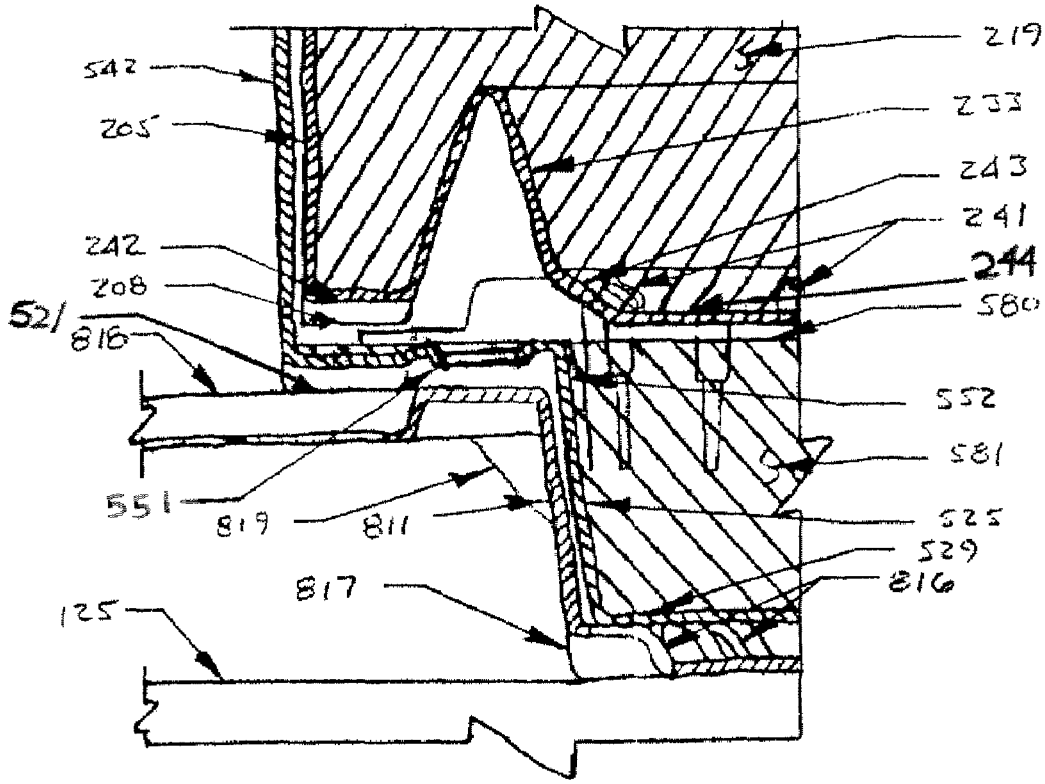
FIG. 2F is a partial elevation section view of the lower left-hand portion of a segment of the pallet assembly of FIG. 2A, looking in direction 2F-2F of FIG. 2A, showing a pallet configuration having a water reservoir, wherein the free surface of the reservoir water is below the bottom of the installed container.

FIGS. 2C, 2D—Pallet Assembly Segment

FIGS. 2C and 2D illustrate in detail a segment of an exploded pallet assembly 500 associated with one containerized plant 200. Containerized plant 200 nests along a vertical axis (e.g., axis 202) into container receptacle 509 and receptacle 509 support column 518 in turn nests in and is laterally restrained by receptacle 810 of pallet-stiffening grid 800. FIGS. 2C and 2D depict incorporation of frustal containers 203, though containers of other shapes are suitable with appropriate adjustments in features of corresponding pallets.

(FIGS. 2C-2H)—Pallet Segment—General

Pallet segments are mutually contiguously coupled at their outer perimeters 510, forming two-dimensional horizontal arrays of segments, producing a pallet 502. Pallet segment of a first embodiment incorporates a thin upper wall 504 with a hole in the center, forming the upper end of receptacle 509. Coupled indirectly to the perimeter of the hole is the upper edge of a thin receptacle side wall 542. The bottom edge of the receptacle side wall 542 is coupled to a plurality of equally-spaced segments of thin receptacle bottom wall 521 that extend radially inward. Coupled to the bottom wall 521 segments toward the container vertical centerline is a downwardly protruding hollow pallet support column 518 with a closed bottom wall 529.

Pallet Segment Funnel/Upper Wall

Upper wall 504 of each pallet segment is in the shape of a funnel that collects impinging rain, irrigation water and broadcast liquids and particulates and conveys them to the container receptacle 509 in center of funnel. Upper wall 504 also shades side wall(s) 205 of container from direct sunlight, substantially eliminating adverse heating of proximal tips of roots 222 of mounted containerized plant 200. Further, upper surface of upper wall 504 is light colored, increasing reflection of sunlight toward containerized plant canopy 223, potentially increasing photosynthesis and plant growth rate. Simultaneously, heating below upper wall 504 is further reduced. Reduced heating of container reduces rate of soil 219 dehydration, which otherwise is greatest along the container side walls 205, and consequently improves the soil 219 spatial and temporal moisture consistency.

Funnel outer perimeter 510 is hexagonal in a first embodiment, yielding staggered rows of pallet segments, though other shapes are within the realm of this invention. FIG. 2A through 2D reflect such a pallet 502 having an array of four rows of four segments each, though other combinations of numbers of rows and segments are certainly within the spirit of this invention. Continuity of upper wall 504 between pallet segments results in a structure sufficiently rigid to remaining stable with mounted containerized plants 200 under impinging wind and transit motion that would readily topple standalone like containerized plants 200. Downwardly extending pallet lip 564 enables pallets to push against one another in high winds, facilitating pallet position maintenance.

Pallet Segment Funnel Ribs/Overflow Drain Holes

Pallet segment upper wall 504 incorporates stiffening ribs 513, which are coupled to like ribs on adjoining pallet segments to increase overall pallet stiffness.

Excessive accumulation of water on top 221 of soil 219 of mounted containerized plant 200, due to excessive rainfall, combined with the existence of a water seal between pallet receptacle 509 and mounted container 203, is undesirable as such accumulation increases purging of nutrients resident in soil 219 of containerized plants 200. Consequently, overflow drain holes 540 are incorporated are incorporated through pallet segment upper wall 504. Overflow drain holes 540 are in a first embodiment arranged to strike a balance between manufacturing ease, i.e., achievable with a single vertical punching action, and minimal plan area projection open to impinging falling water and other applications. Overflow drain holes are further placed through sides of ribs to minimize hole area projected both toward mounted containerized plant and up slope of funnel wall 504, thereby minimizing potential for radially outward growing plant foliage and collecting water to enter overflow drain hole 540. Finally, bottom edge of overflow drain holes 540 is located slightly above funnel surface 504 in rib side wall to divert away from overflow drain hole 540 water running down funnel wall 504 slope. Thus, water passing through any of the overflow drain holes 540 is substantially that forming a part of the water accumulation to the level of the associated overflow drain holes 540. It is expected that irrigation flow/timing are controllable so as to avert passage, i.e. spillage, of irrigation water through overflow drain holes 540. The vast majority of irrigation water and other liquid and particulate applications impinging on funnel wall 504 is shed to upper surface 221 of soil 219 of containerized plant 200.

Pallet Segment Receptacle Container Lip Recess

Along the perimeter 511 of the upper end of receptacle 509 is an annular recess 543 of cross sectional area of sufficient size for receiving container lip 209 on installation of containerized plant 200, thereby minimizing accumulation of collected water outside of container lip 209. Recess 543 also incorporates an annular upward-protruding ridge proximal to radially inward perimeter of recess 543 for sealing against a corresponding container surface, described below.

Pallet Segment Receptacle Side Wall

Each container receptacle 509 of a first embodiment is essentially a thin-wall cup substantially matching the shape, though slightly larger in corresponding girth, of a container 203 to be received. Enlarged girth of container receptacle 509 relative to that of mounted container 203 ensures outer surface of container side wall 205 does not contact the inner surface of the container receptacle side wall 542 along its entire perimeter at any given elevation, thereby preventing wedging of container 203 in container receptacle 509 and promoting easy removal of containerized plants 200 from pallet 500. Continuous container receptacle side wall 542, combined with a small air gap between it and the container side wall 205 of an installed containerized plant 200 produces a thermal insulating layer particularly beneficial during the cold season. Humidification of air in gap arising from pallet integral water reservoir, described below, further aids soil temperature regulation, improving root growth environment. Also, continuous container receptacle side wall 542 protects outer surface of container side wall 205 of containerized plant 200 against soiling while in production, resulting in a high-quality nursery product presentation.

Pallet Segment Receptacle Bottom Wall, Ribs, Risers, Container Lifting Access Holes, Container Drain Holes (Upper), Container Center Seats, Water Reservoir As shown in FIGS. 2C through 2H, container receptacle bottom wall 521, which extends inward from bottom edge of container receptacle side wall 542, has a central hole from the edge of which downwardly protrudes a thin side wall 525 of a hollow column 518.

Spaced along interface between receptacle bottom wall 521 and column side wall 525 are generally equally-spaced gussets 512, which provide for stiffening of said interface and for centering of rows of pallet columns 518 in respective gaps between fork tines of pallet-handling machinery described below. Gussets 512 are arranged to nest with corresponding and similarly effective gussets 819 or 614 of grids 800 or grids 600, respectively, when such are incorporated.

Receptacle bottom wall 521 incorporates container lifting access holes 545 and drain holes 551, which in a first embodiment are through upwardly protruding ribs 515 and risers 552, respectively, creating a water reservoir beneath entire installed container, for retaining container drainage up to a level just below bottom of installed container 203 holding containerized plant 200. This feature provides for improved regulation of temperature of soil 219 in container 203 and for water pruning of roots 222 protruding from container drain holes 228 and 241. Container lifting access holes 545 are at the highest local elevation in order to ensure water does not drain through them and thereby substantially prevents growth of roots 222 of installed containerized plants 200 out of container drain holes 228 and 241 and through container lifting access holes 545. This leaves container lifting access holes 545 substantially clear for passage of container lifting tooling 2654, described below. Temperature regulation includes heat sinking during the hot season and heat sourcing during the cold season. Cold season heat sourcing, combined with an effective double-wall root containment system, provides an additional degree of root ball freeze protection. Upper surfaces of ends of container receptacle bottom wall ribs 515 adjoining central hole 522 rise in elevation to provide seats against which sloped center portion 243 of container bottom wall can rest, limiting sag of container bottom wall center portion 244.

Figure 2G:
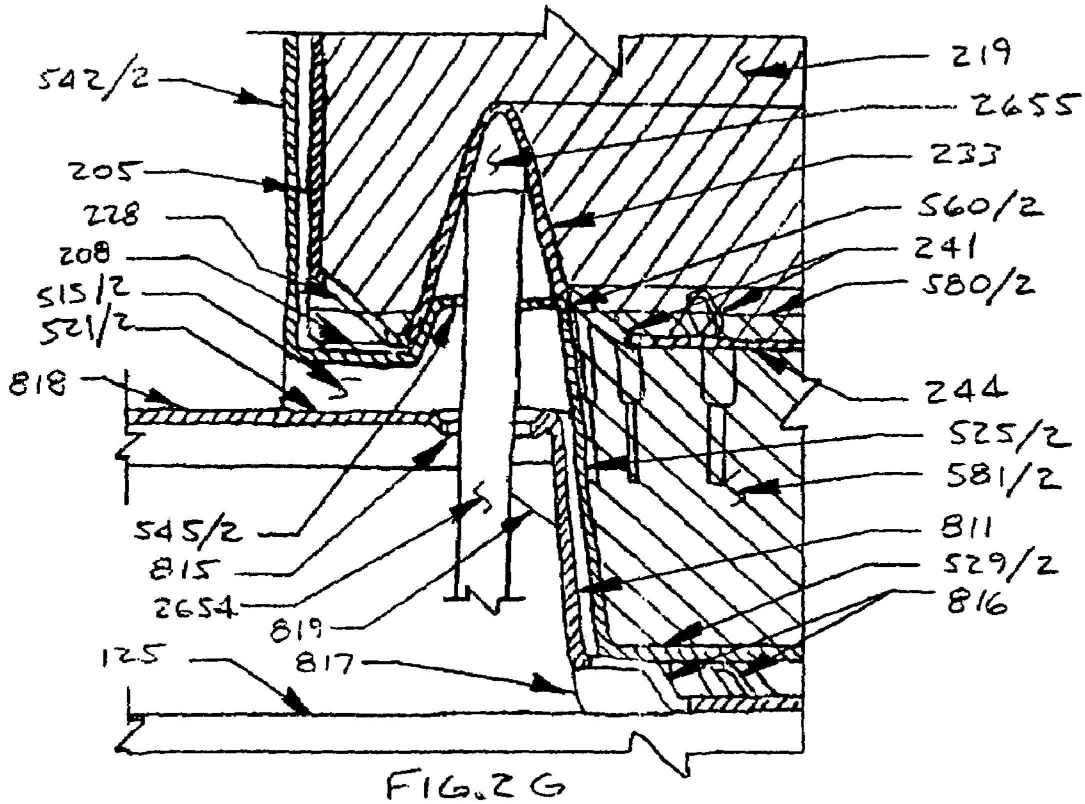
FIG. 2G is a partial elevation section view of the lower left-hand portion of a segment of the pallet assembly of FIG. 2A, looking in direction 2E-2E of FIG. 2A, showing a pallet configuration having a water reservoir, wherein the free surface of the reservoir water is above the bottom of the installed container, resulting in wicking of a portion of reservoir water into container soil.
Figure 2H:
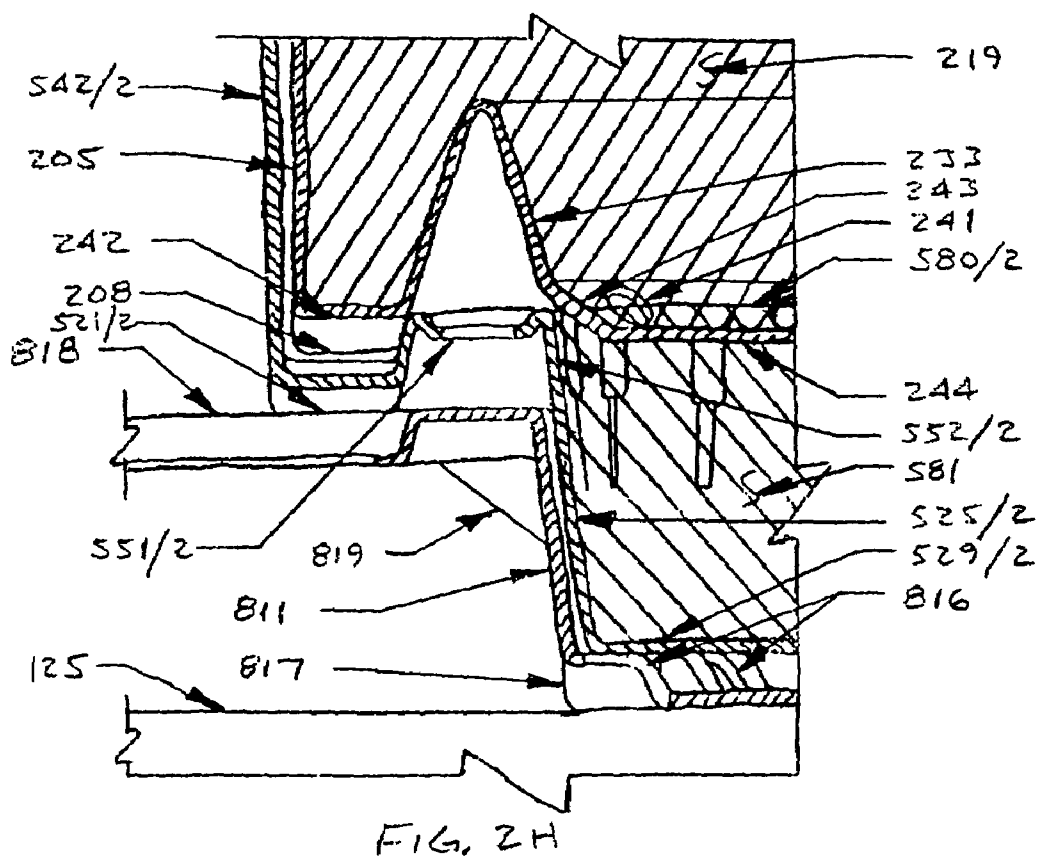
FIG. 2H is a partial elevation section view of the lower left-hand portion of a segment of the pallet assembly of FIG. 2A, looking in direction 2F-2F of FIG. 2A, showing a pallet configuration having a water reservoir, wherein the free surface of the reservoir water is above the bottom of the installed container, resulting in wicking of a portion of reservoir water into container soil.
Figure 3A:
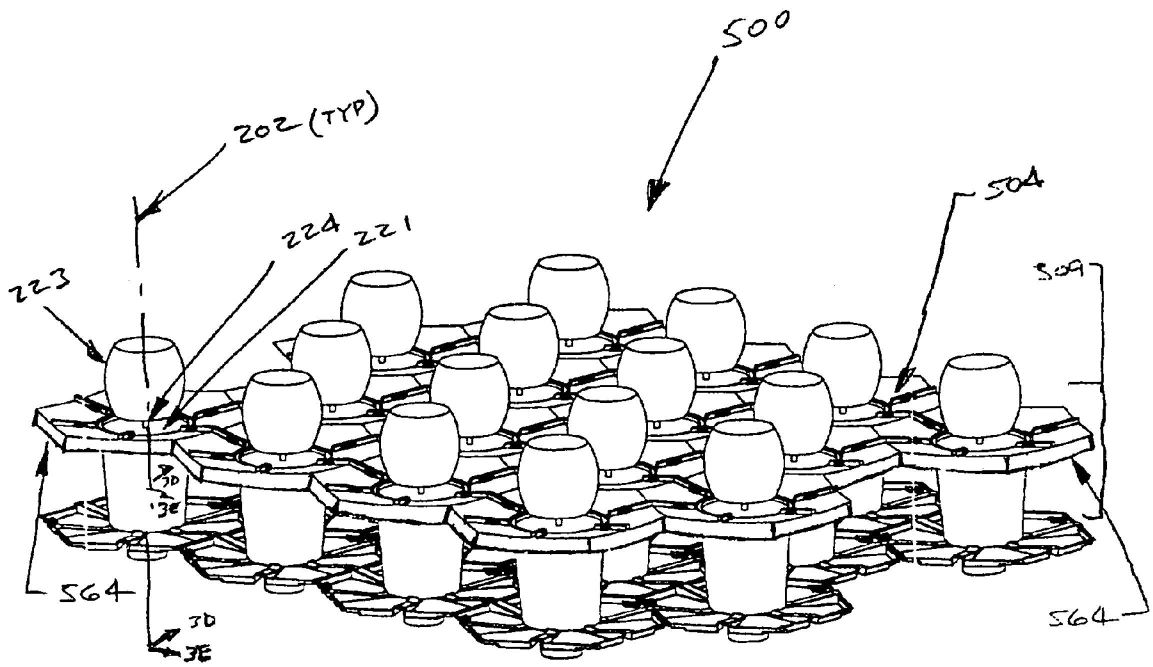
FIG. 3A is a perspective view of a second embodiment of a spaced-container (no. 1/trade gallon) pallet assembly in accordance with the invention.
Figure 3E:
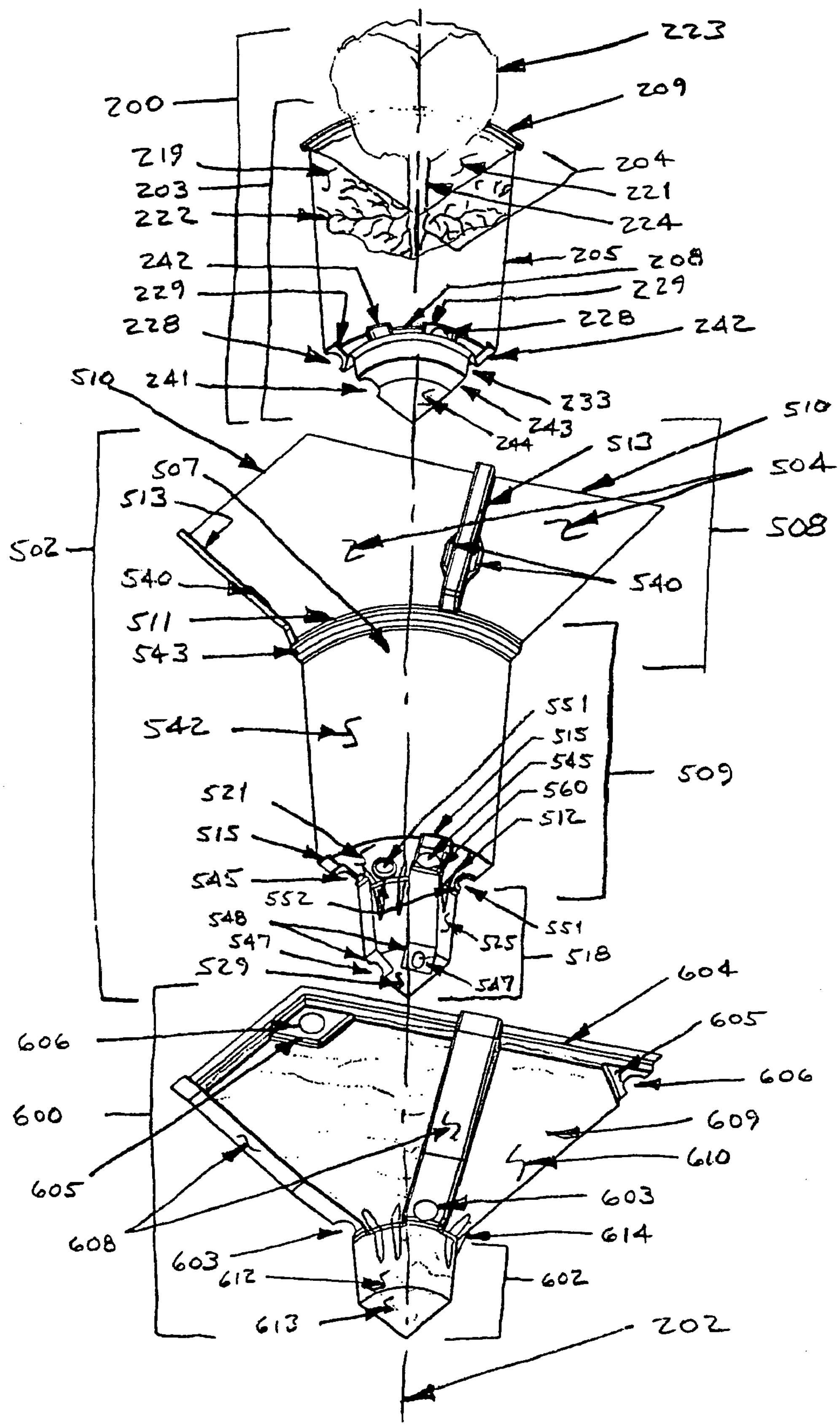
FIG. 3E is a partial elevation section view of the lower left-hand portion of a segment of the pallet assembly of FIG. 3A, looking in direction 3E-3E of FIG. 3A, showing a pallet configuration having two integral water reservoirs, wherein the free surface of the highest reservoir water is below the bottom of the installed container.
Figure 3C:
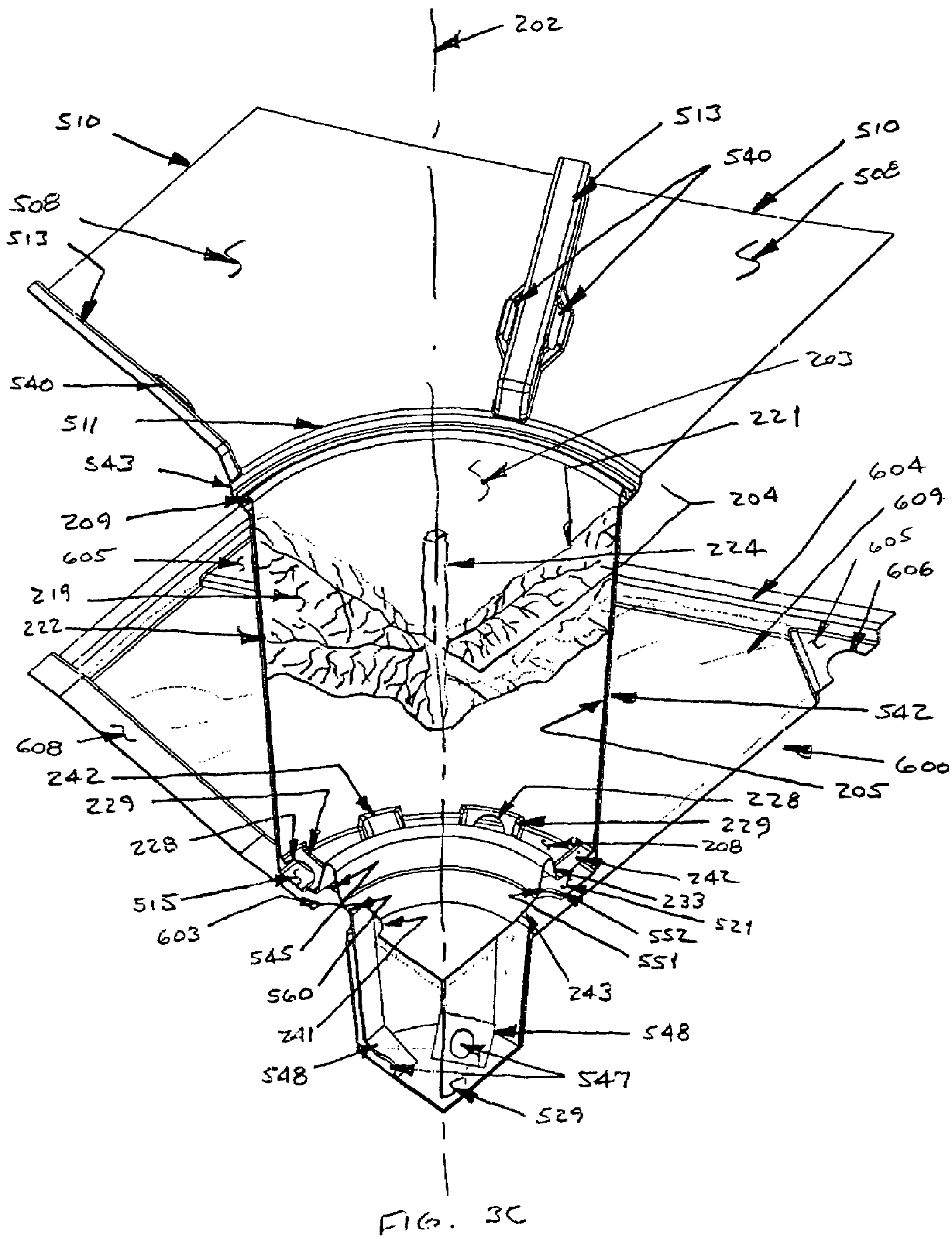
FIG. 3C is the same as FIG. 3, except with pallet assembly components not exploded.
Figure 3D:
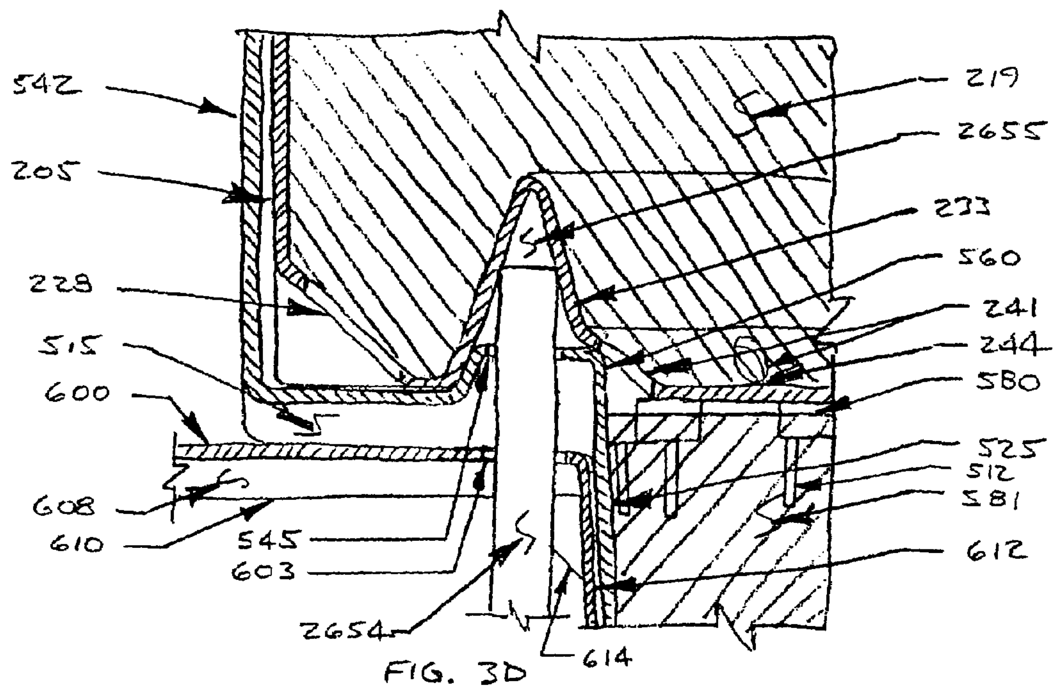
FIG. 3D is a partial elevation section view of the lower left-hand portion of a segment of the pallet assembly of FIG. 3A, looking in direction 3D-3D of FIG. 3A, showing a pallet configuration having two integral water reservoirs, wherein the free surface of the highest reservoir water is below the bottom of the installed container.
Figure 3E:
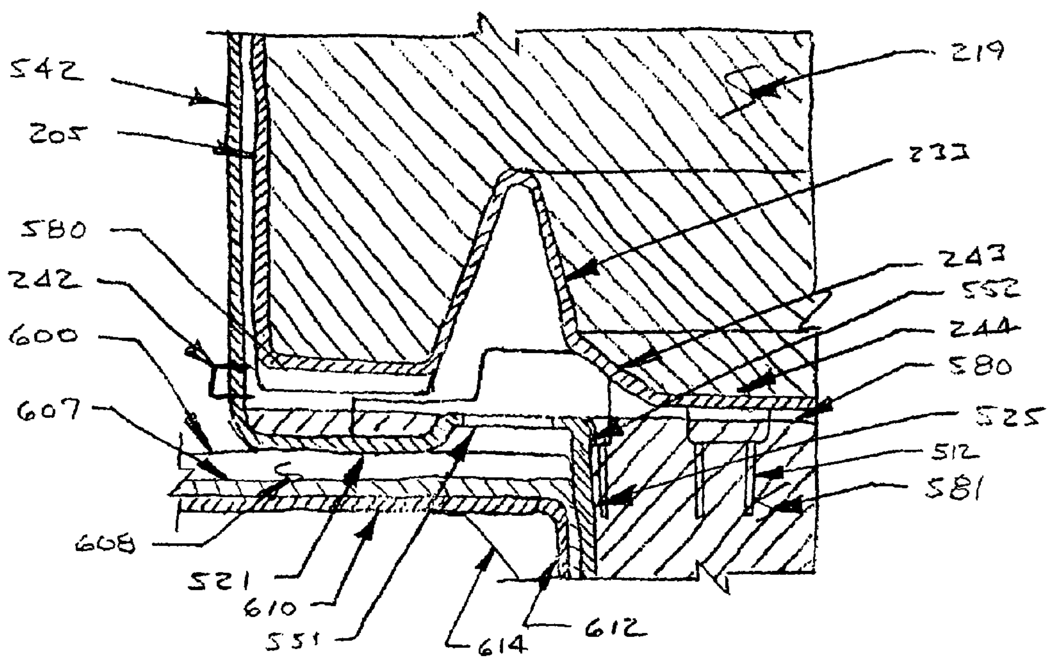
Figure 3F:
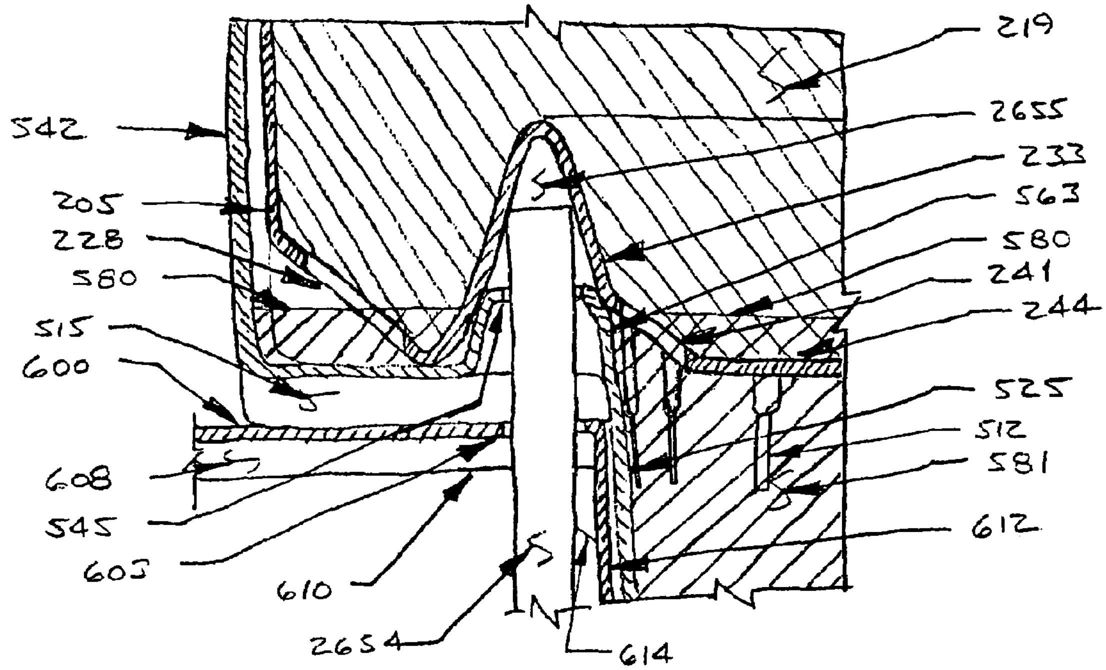
FIG. 3F is a partial elevation section view of the lower left-hand portion of a segment of the pallet assembly of FIG. 3A, looking in direction 3D-3D of FIG. 3A, showing a pallet configuration having two integral water reservoirs, wherein the free surface of the highest reservoir water is above the bottom of the installed container, resulting in wicking of a portion of reservoir water into container soil.
Figure 3G:
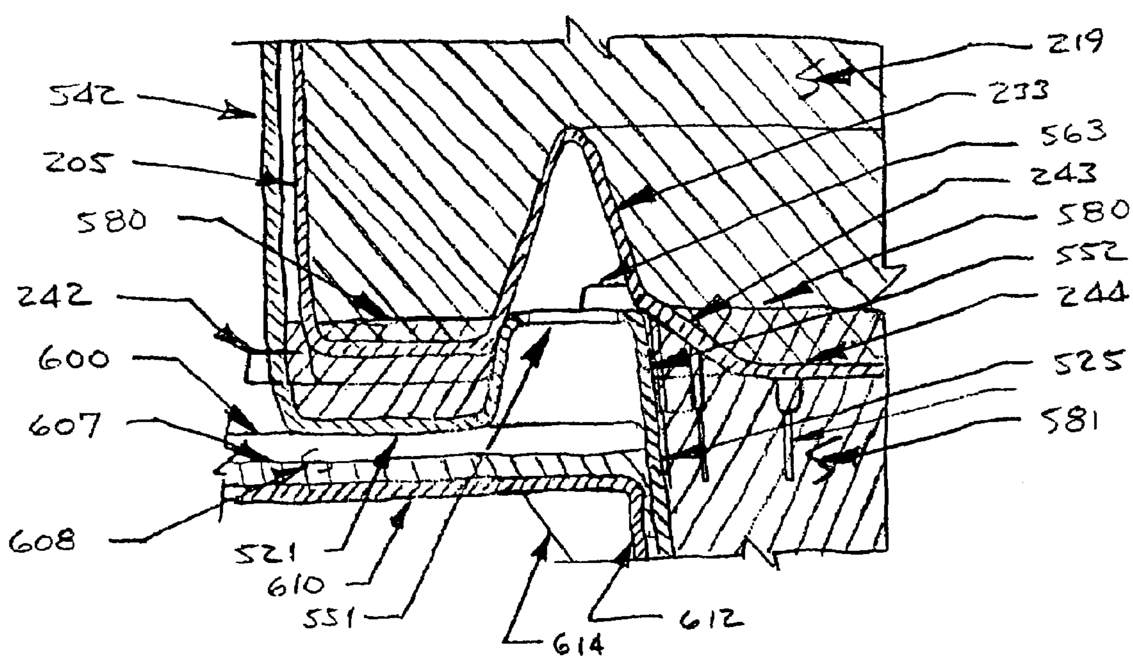
FIG. 3G is a partial elevation section view of the lower left-hand portion of a segment of the pallet assembly of FIG. 3A, looking in direction 3E-3E of FIG. 3A, showing a pallet configuration having two integral water reservoirs, wherein the free surface of the highest reservoir water is above the bottom of the installed container, resulting in wicking of a portion of reservoir water into container soil.

In a second embodiment of container receptacle drainage arrangement shown in FIGS. 2G and 2H, container drain hole 551/2 is through a riser 552/2 above elevation of receptacle bottom wall 521/2 sufficient to cause receptacle reservoir water free surface 580/2 to be higher than the bottom 208 of the installed container 203, thereby maintaining bottom layer of containerized plant soil 219 immersed in reservoir water 581. This yields a wicking action that increases the soil moisture spatially upwardly from water contact elevation, improving container soil moisture retention between irrigation events.

Pallet Segment Receptacle Support Column

Hollow column 518, coupled to and extending downwardly from bottom wall 521 of container receptacle 509, supports weight of pallet 502 segment and mounted containerized plant 203. A thin column wall 529 closes column bottom, except where exist optional column drain holes 547 through column bottom wall recesses 548. Column side wall ribs 562 provide stiffening of column side walls 525 as well as communication of column drainage between column drain holes 547 and free surface of optionally incorporated grid 600. Column side walls 525 are preferably downwardly converging tapered, facilitating pallet alignment for automatic assembly and disassembly, described below, and facilitating pallet 502 molding process.

Columns 518 support bottoms of containers 203 elevated a short distance above the pallet mounting surface, promoting consistent container drainage control and blockage of rooting of containerized plant into pallet mounting surface, i.e., ground, via roots growing out of container drain holes 228 and/or 241. It also provides access to beneath bottoms of containers 203 for lifting of pallet assembly 500 by manual or automatic means, minimizing stress on receptacle side walls 542 during such lifting. Columns 518 also present to storm water running along ground a smaller impact area than a container seated directly on ground, thereby reducing water impact forces on pallet 500 relative to those on a pallet not incorporating columns.

Columns may have substantially rectangular or oval plans that increase lifting tooling, e.g., fork, access area on pallet assembly sides that have reduced projected distances between adjoining rows of pallet support columns 518.

(FIGS. 2A-2H, 3A-3G)—Container

Container, General

As shown in FIGS. 2A through 2H and 3A through 3H, each plant container 203 comprises at least one sidewall 205 coupled along its lower edge to a bottom wall 208 and terminating in an open upper end 204, and is for holding soil 219 and a growing plant 200.

Container, Lip

Upper perimeter of container sidewall 205 incorporates an integral stiffening lip 209 having a section enlarged relative to that of container sidewall 205 and extending radially outward from container sidewall 205, reinforcing the open upper end 204 of container 203 and providing a container lifting handle.

Container Side Wall/Pallet Container Receptacle Fit

Side wall of a cylindrical or frustal container is preferably strictly circular in girth, though may incorporate vertical ribs, provided sufficient wall thickness or circular girdling is incorporated to prevent significant bulging of container girth. Bulging to the extent outer surface of container side wall 205 wedges against inner surface of container receptacle side wall 542 is unacceptable.

Container, Bottom Wall, Recesses, Drain Holes

Container 203 incorporates an annular upward recess 233 in container bottom wall. Recess 233 preferably has a generally isosceles triangular section wherein the angle at its upper vertex is acute. Recess 233 cross section shape serves a container lifting stabilization role described below. Recess 233 may also serve a soil moisture retention role, acting as a dam blocking gravity flow of water in soil below upper rim of recess/dam 233 from one side of recess/dam 233 to drain holes on opposing side of recess/dam 233. Water in soil on side of recess/dam 233 opposite container drain hole 228 or 241, exclusively, as applicable, must climb over recess/dam 233 under diffusion/wicking action, against gravity, in order to reach incorporated drain hole 228 or 241, exclusively, as applicable, and, thus, the rate of soil dehydration in the affected zone is reduced relative to a zone in gravity communication with an incorporated drain hole 228 or 241, exclusively, as applicable. Omission of strictly container drain holes 228 through container bottom, radially outward from recess/dam 233, gives rise to an annular slowed dehydration zone radially outward from recess/dam 233. Omission of container drain holes 241 strictly through container bottom, radially inward from recess/dam 233, gives rise to a frustal slowed dehydration zone radially inward from recess/dam 233. Incorporation of all container drain holes 228 and 241 results in no slowed dehydration zone.

Radial, upward recesses 242 in container bottom wall 208 allow drainage from container inner drain holes to flow freely out from beneath an associated containerized plant sitting on a planar horizontal surface. Upward, outward sloping of drain hole recesses 229 and 243 enables drain holes 228 and 241 to convey drainage from beneath container and to be punched in a single vertical trimming stroke. Such sloping of outer drain hole recesses 229 also creates barriers to growth of containerized plant roots 222 from container drain holes 228 into lifting rod access holes 545 of pallet container receptacle 509. Also, a plurality of container inner seats 560 adjoining lifting access holes 545 block direct access to container lifting access holes 545 of roots 222 growing from container inner drain holes 241.

Figure 4:
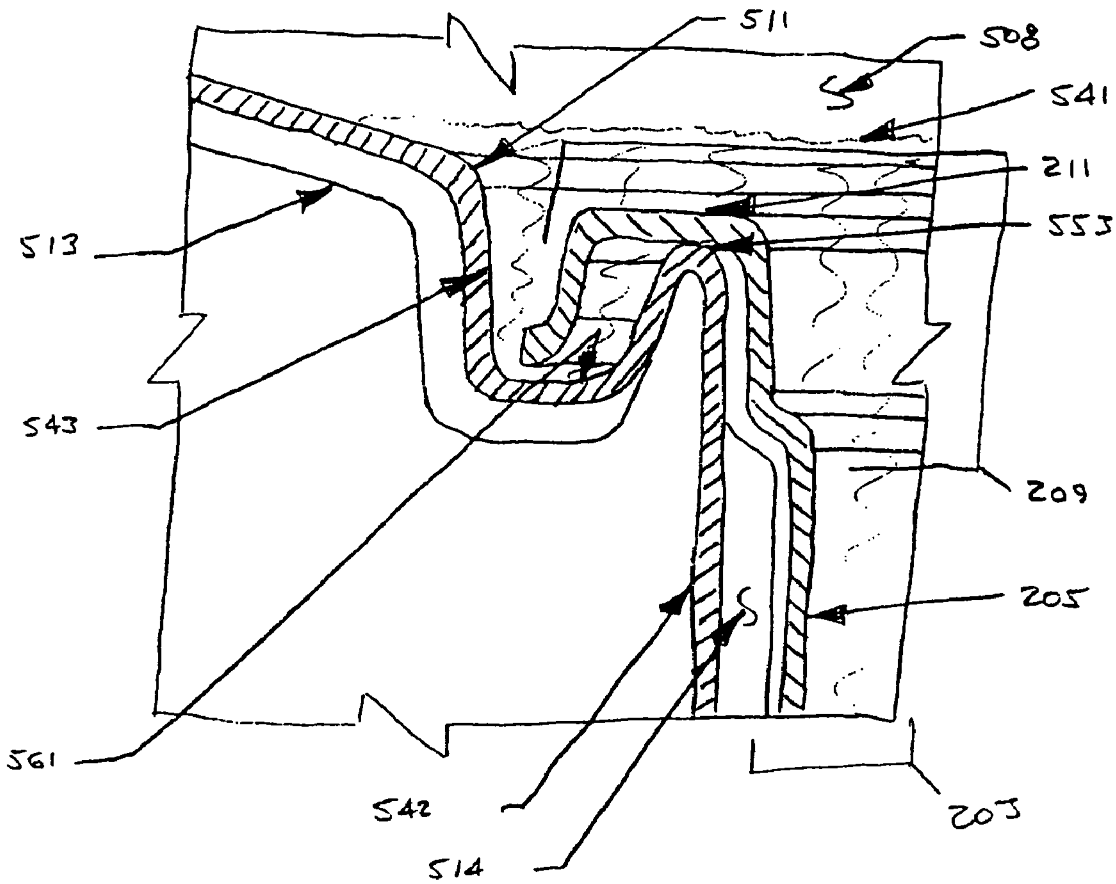
FIG. 4 is a detailed elevation section view of a first embodiment of the container lip engaging a corresponding pallet receptacle recess.

FIG. 4—Pallet Container Receptacle/Container Lip Sealing

As shown in FIG. 4, an annular seal 553 is formed between container lip 209 and a corresponding annular surface of pallet container receptacle recess 543. Water collected by funnel 504 associated with container receptacle, upon accumulating to upper surface 211 of container lip 209, begins flowing into container 203. Annular recess 543 minimizes water accumulation prior to spillage of collected water into container 203. Sealing area 553 supports most of weight of mounted containerized plant 200, thereby improving seal. Also, outer edge of lip is in close proximity to recess wall, thereby acting as a filter that keeps debris away from sealing area 553. Further, annular trough 561 adjoining outside of annular sealing area 553 also facilitates keeping seal-foiling debris away from sealing area 553. Still further, seal occurs at the top of an annular ridge that contacts bottom of uppermost wall 211 of container lip 209, resulting in minimal pressure drop across seal on accumulation of water to top of uppermost wall 211 of container lip 209, at which point water begins flowing over container lip 209 into container. Thus, contamination of low leakage pressure drop and debris filtering from sealing area 553 will result in negligible loss of collected water. Optionally, an elastomeric gasket or foam producing material could be applied to (at least in part) upward facing surface(s) of trough 561, providing a further improved sealing surface against which corresponding downward facing surface of container lip 209 wall would contact. Incidental debris caught in resulting sealing area would be pressed into relatively highly elastic material, thereby failing to keep sealing surfaces substantially separated, and enabling a satisfactory seal to be achieved.

FIGS. 2A-2H—Pallet-Stiffening Grid

An optional pallet-stiffening grid 800, shown in FIGS. 2A through 2H is provided as a means to further stiffen pallets against wind, tightly controlling horizontal spacing of pallet support columns 518, aiding pallet 500 upper wall 504 locally in remaining substantially parallel to pallet mounting surface, maintaining pallet lip 564 outwardly, downwardly sloped in face of high winds, resulting in consistently downward, restraining force on pallet 500 in reaction to resulting upward deflection of impinging wind.

An array of hollow, downwardly extending, slightly inwardly converging tapered pallet column receptacles 810 receive corresponding pallet segment columns 518. Each receptacle 810 has side wall 811 and bottom wall 812. Receptacle 810 is of slightly larger girth at corresponding elevations than that of pallet segment column 518, providing close registration of position of pallet 502 to grid 800 on engagement of pallet segment column 518 into receptacle 810, while avoiding wedging between side walls 525 and 811 of columns 518 and 800, respectively.

Container lifting access holes 815 through receptacle lip 813 of grid 800 aligns with corresponding container lifting access hole 545 through container receptacle. Receptacle flange 813, lip 814 and container lifting access holes 815 maintain ability of containerized plants 200 to be lifted from beneath containers 203 in the process of installing containerized plants 200 in pallet assemblies 500 and removing containerized plants 200 from pallet assemblies 500, with grids 800 incorporated as part of pallet assemblies 500.

Spaced along interface between receptacle lip 813 and column side wall 811 are generally equally-spaced gussets 819, which provide for centering of rows of grid receptacles and, thus, pallet columns 518 in respective gaps between fork tines of pallet-handling machinery described below. Gussets 819 are arranged to nest with corresponding and similarly effective gussets 512 of pallets.

Outer edges of receptacle bottom wall 812 incorporate equally-spaced upward recesses 817 having grid drain holes 816. Such an arrangement averts creation of a vacuum between pallet column 518 and grid receptacle 810, promoting ready separation of pallets 502 and grids 800 during disassembly of pallet assemblies incorporating grids 800.

FIGS. 3A-3G=Pallet Stiffening Grid/Water Reservoir

A second embodiment of a pallet-stiffening grid 600, which incorporates its own integral water reservoir, is shown in FIGS. 3A through 3G. Webbing 610 between ribs 608 provide for water retention between columns 518. Ridges 604 between adjoining grid segments, prevent communication of drain water between adjoining grid segments, reducing potential spread of diseases in collected container drainage. Grid drain holes 606, through risers 605 upwardly limit the level of water in grid 600. Elevation of risers 605 is below that of upper edge of ridges 604, causing excess accumulated drain water to drain ground without flowing over ridges 604.

Container lifting access hole 603 through grid aligns with corresponding container lifting access hole 545 through container receptacle and is through upwardly protruding grid rib 608, at higher elevation than grid drain hole risers 605, thereby averting grid water drainage through container lifting access holes 603. Such aversion to drainage through container lifting access holes 603 consequently averts drawing to them roots 222 growing from container drain holes 228 or 241, as applicable. Container lifting access holes 603 maintain ability of containerized plants 200 to be lifted from beneath containers 203 in the process of installing containerized plants 200 in pallet assemblies 500 and removing containerized plants 200 from pallet assemblies 500, with grids 600 incorporated as part of pallet assemblies 500.

Hollow, downwardly extending, slightly downwardly converging tapered hollow column 602 at center of grid/water reservoir 600 segment receives corresponding pallet segment column 518. Column 602 has side wall 612 and bottom wall 613. Grid segment column 602 is of slightly larger girth at corresponding elevations than that of pallet segment column 518, providing close registration of position of pallet 502 to grid 600 on mating of columns, while avoiding wedging between side walls 525 and 612 of columns 518 and 602, respectively.

Spaced along interface between grid webbing 610 and column side wall 612 are generally equally-spaced gussets 614, which provide for centering of rows of grid receptacles and, thus, pallet columns 518 in respective gaps between fork tines of pallet-handling machinery described below. Gussets 614 are arranged to nest with corresponding and similarly effective gussets 512 of pallets.

One configuration of stiffening grid/water reservoir 600 may incorporate segment perimeter ridges 604 and container lifting hole 603 risers at elevations that upwardly limit the reservoir water free surface 607 to below plant container 203 bottom while a second configuration may incorporate variants of such features that upwardly limit the reservoir water surface 607 to above plant container 203 bottom, providing for continual contact of container soil with reservoir, and associated wicking.

FIG. 5—8×8 Hex Contiguous PA

Figure 5:
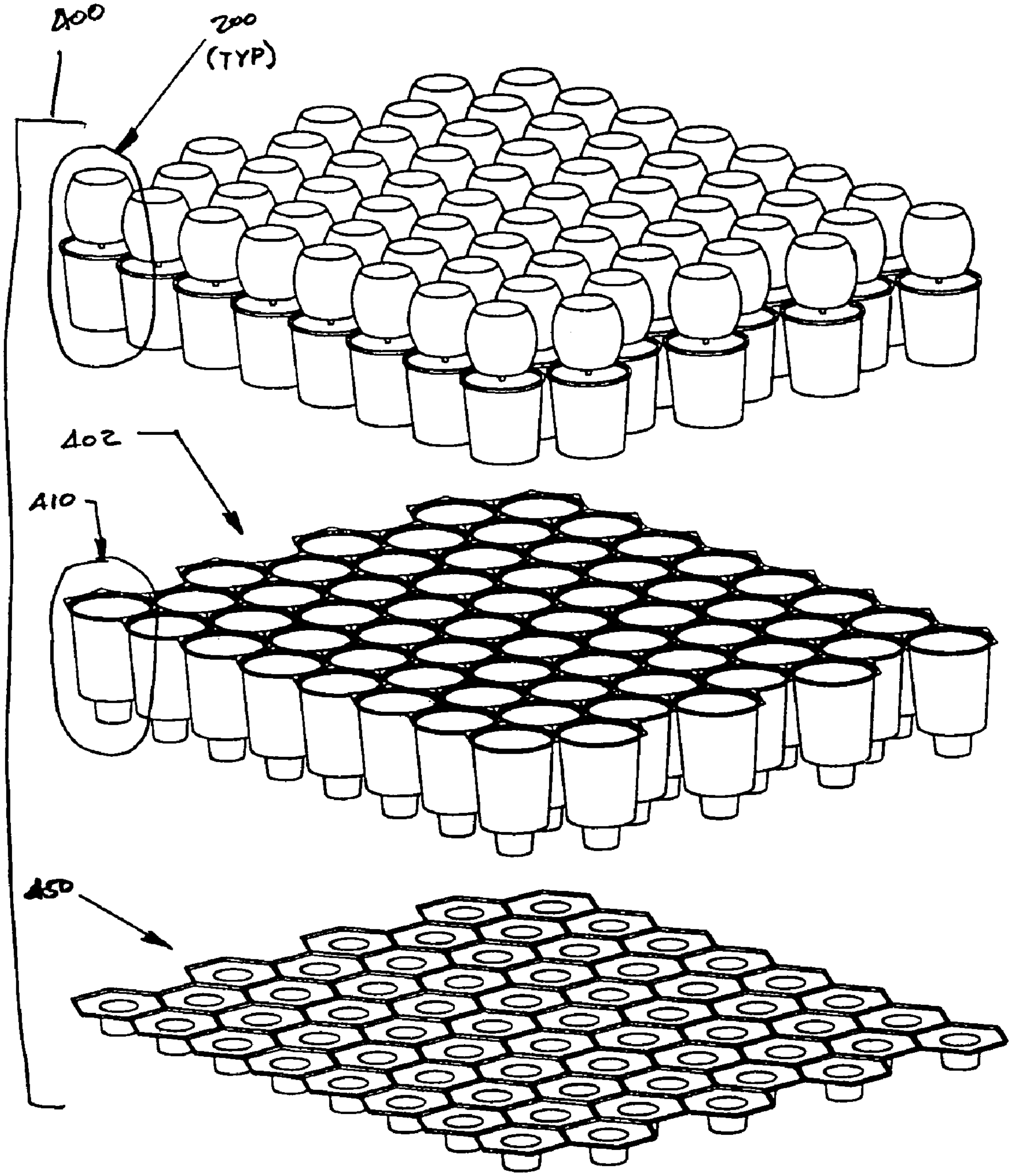
FIG. 5 is a perspective exploded view of a first embodiment of a contiguous container (no. 1/trade gallon) pallet assembly in accordance with the invention.

In the exploded view of FIG. 5 is a first embodiment of a contiguous container receptacle pallet assembly 400, comprising a pallet 402 having a contiguous container receptacle array, an optional corresponding pallet-stiffening grid 450, and the appropriate number (64) of containerized plants 200. Pallet 402 and grid 450 are constructed substantially similarly to spaced pallet 502 and grid 600 or 800, though with accordingly reduced segment centerline distances.

Figure 6:
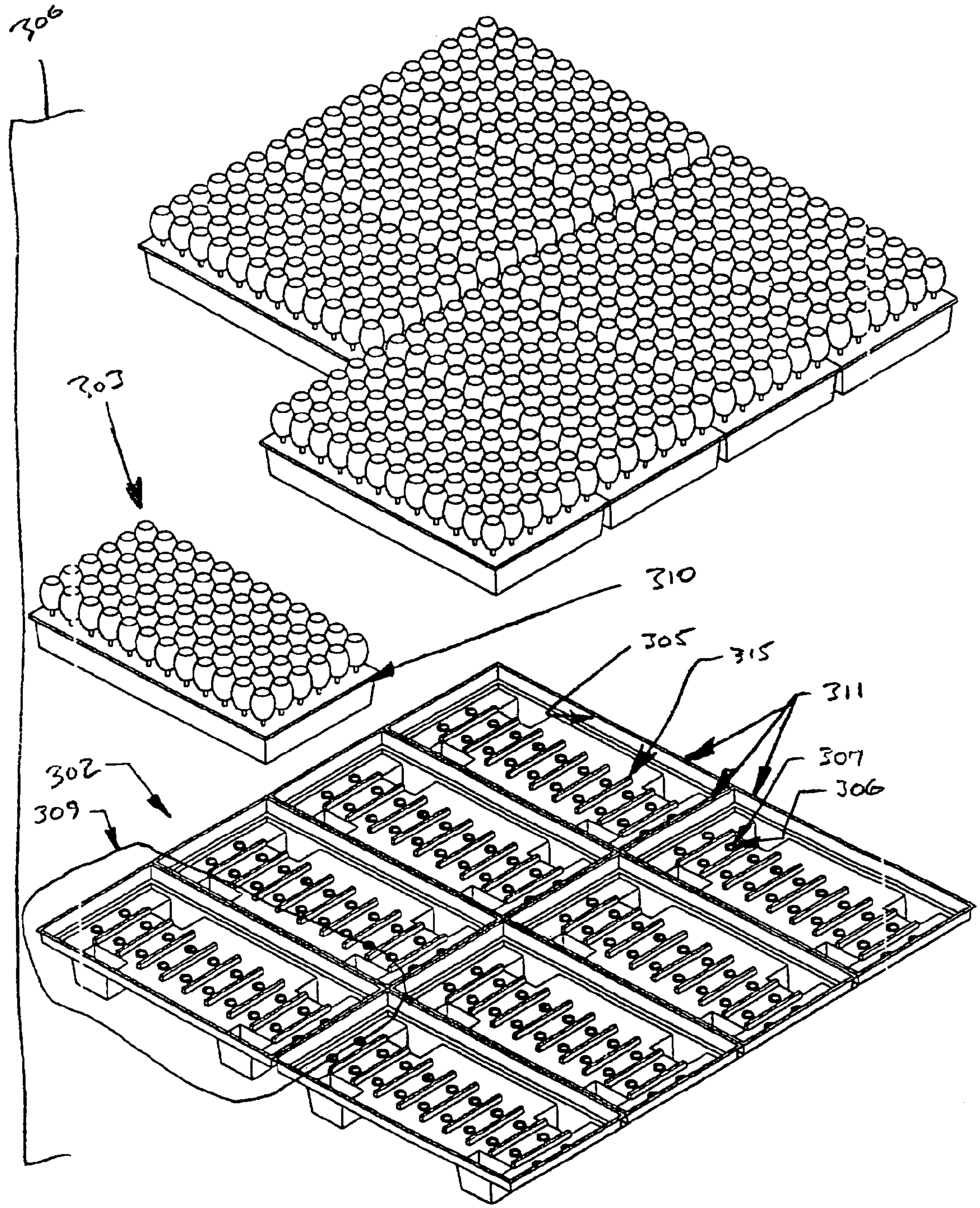
FIG. 6 is a perspective exploded view of a first embodiment of a contiguous tray (10"×20" nominal) pallet assembly in accordance with the invention.

FIG. 6—2×4 Tray Contiguous PA

In the exploded view of FIG. 6 is a first embodiment of a contiguous tray pallet assembly 300, comprising a pallet 302 having a contiguous two-dimensional (4×2) tray array and the appropriate number (8) of trays 303 of plants. Other combinations are certainly within the spirit of the invention. Pallet 302 comprises a generally planar horizontal body having substantially vertically upwardly protruding flat/tray retaining side walls 311 substantially vertically downwardly protruding pallet support columns 312 and drain holes 307. Pallet support columns 312 support pallet 302 and indirectly trays/flats 303 of plants elevated a relatively short distance above surface on which pallet assembly 300 is seated, providing for lifting fork 1142 or 1657 access and having other benefits described above. Pallet 302 further incorporates an integrally formed drip pan/water reservoir 313 for holding contents, typically excess irrigation or rainwater, with its free surface 308 below the bottom of each mounted flat/tray 303 or, alternately, slightly above the bottom of each mounted flat/tray 303. Level of free surface 308 of contents 314 of each segment of drip pan/water reservoir 313 is upwardly limited by drain holes 307 through riser portions 306 the tops of which are at the desired elevation of the free surface 308 of the drip pan/water reservoir contents 314. Pallet 302 provides sufficient water retention to avert need for separate drip pan/water reservoir. Trays 303 are supported relative to free surface of drip pan/water reservoir water by ribs 315 and receptacle perimeter ledges 316. Perimeter walls 305 mark perimeters of receptacles and pallet 302, controlling positioning of trays 303 within pallet 302. While readily incorporated, no specific tray lifting access holes through pallet 302 are shown as lips 310 of trays are exposed and suitable for mechanized or manual lifting of trays 303 from pallet 302.

Figure 7:
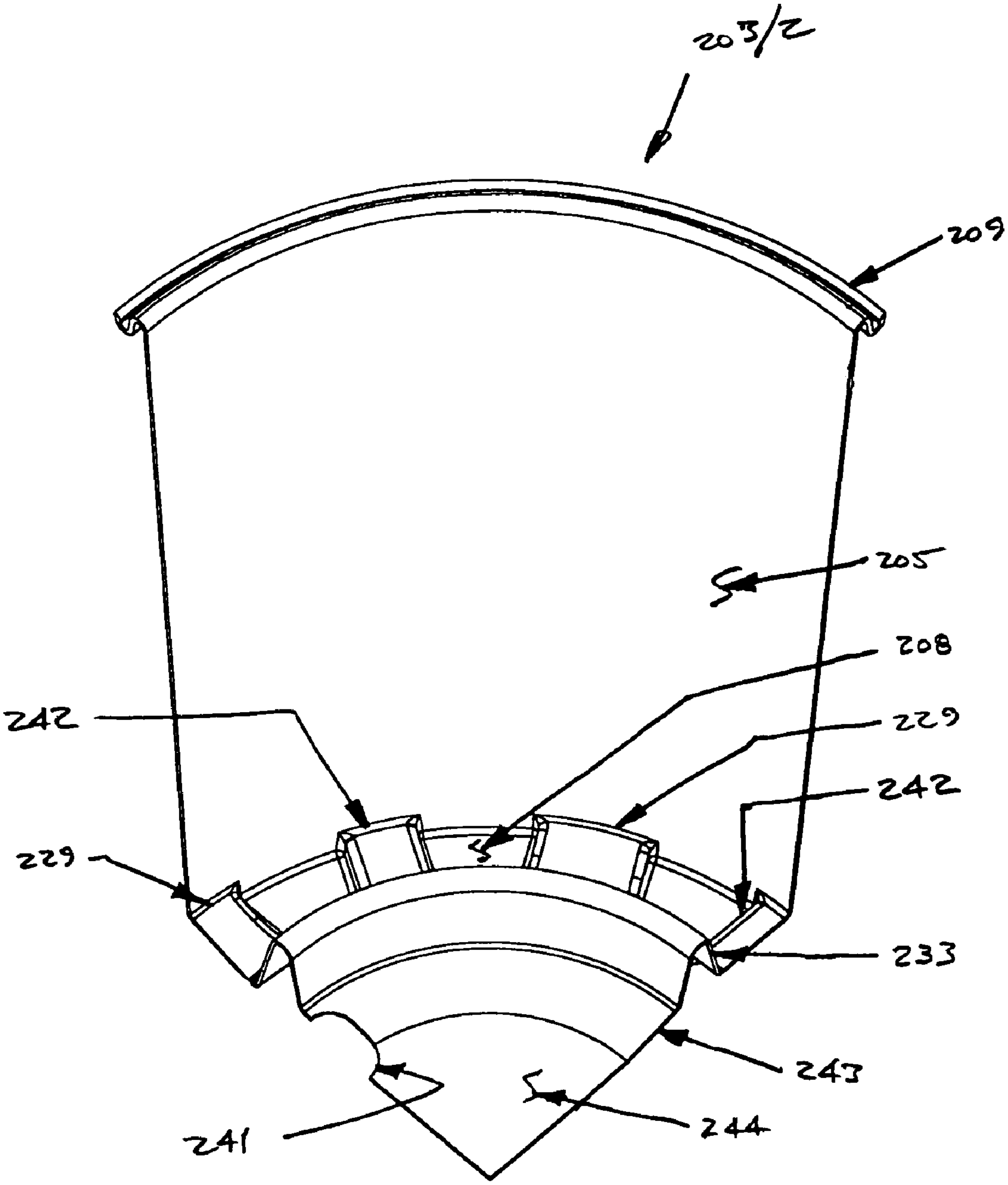
FIG. 7 is a perspective view of a split elevation section of one-quarter of a container with a first embodiment of a container lifting stabilization feature comprising an annular groove in container bottom wall and drain holes through container bottom wall, optionally strictly on container center side of said groove, said split section occurring at two perpendicular vertical planes intersecting one another along vertical centerline of container.

The container 203/2 shown in FIG. 7 has the first embodiment of a container lifting stabilization feature comprising an annular recess 233 in container bottom wall 208 and drain holes 241 through sloped portion 243 of container bottom wall 244, strictly on container center side of recess 233. Recess 233 doubles as a dam, which reduces the rate of dehydration of soil near container bottom 208, radially outward from recess/dam 233, relative to that of soil near container center bottom 244. This occurs as water in subject annular zone of soil reduced dehydration rate must diffuse upward against gravity in order to reach drain holes 241 on opposing side of recess/dam 233. Again, recesses 242 provide for passage of drainage from drain holes 241 out from beneath container 203. Also, presence of recesses 229, while not incorporating potential drain holes, suggests a common mold could produce containers with optional drain holes. Recesses 229 are not necessary in the absence of drain holes through container bottom along container outer perimeter.

Figure 8:
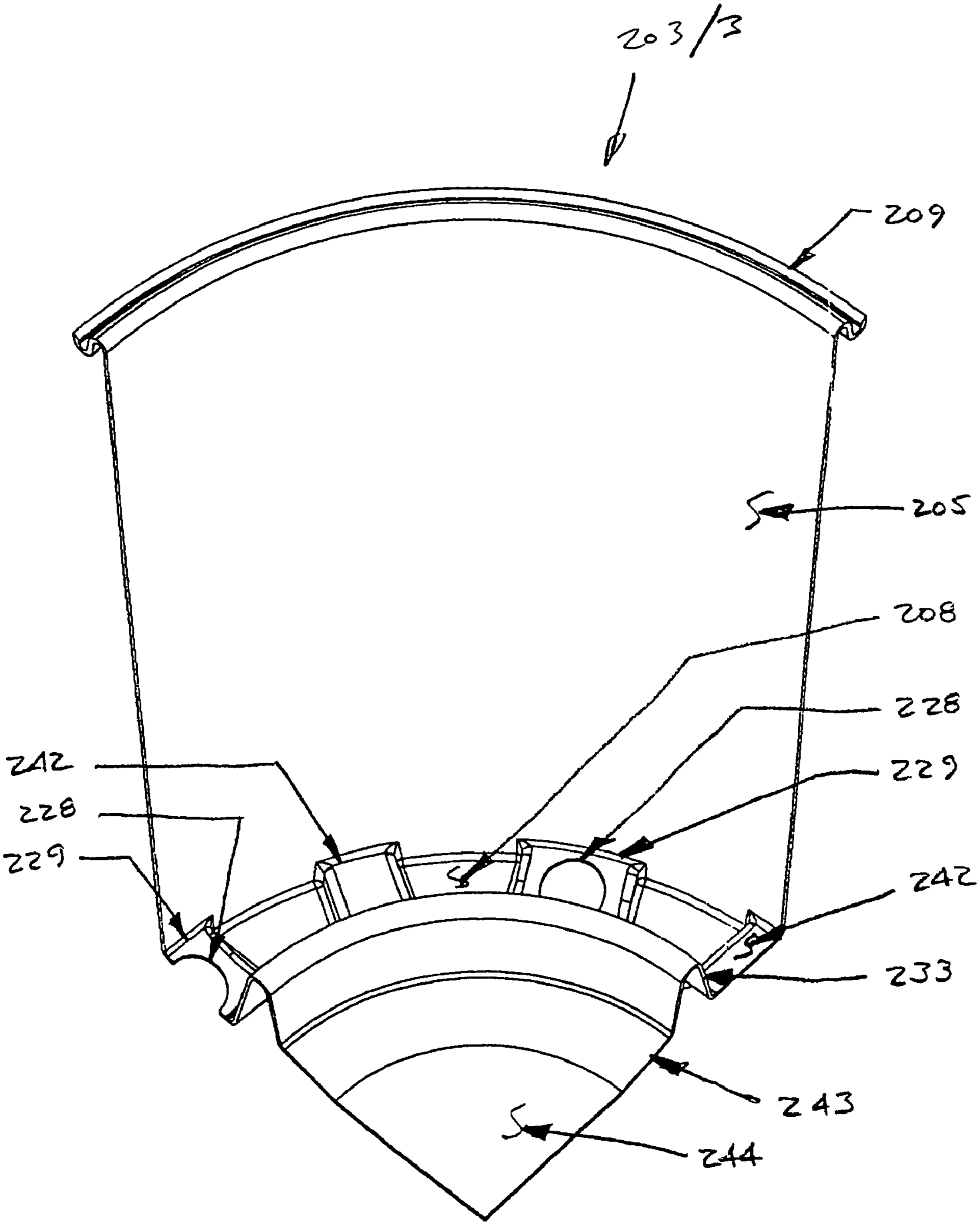
FIG. 8 is a perspective view of a split elevation section of one-quarter of a container with a first embodiment of a container lifting stabilization feature comprising an annular groove in container bottom wall and drain holes through container bottom wall, optionally strictly outside of said groove, said split section occurring at two perpendicular vertical planes intersecting one another along vertical centerline of container.

The container 203/3 shown in FIG. 8 has annular recess 233 of FIG. 7, but drain holes 228 through sloped portion 229 of container bottom wall 241, strictly radially outward of recess 233. Again, recess 233 doubles as a dam, which reduces the rate of dehydration of soil near container bottom 244, radially inward from recess/dam 233, relative to that of soil near container outer bottom 208. This occurs as water in subject frustal zone of soil reduced dehydration rate must diffuse upward against gravity in order to reach drain holes 228 on opposing side of recess/dam 233. Presence of channel recesses 242 in the absence of drain holes through container bottom radially inward of recess/dam 233, merely suggests a common mold could produce containers with optional drain holes. Channel recesses 242 are not necessary in the absence of drain holes through container bottom 243, radially inward of recess/dam 233.

Figure 9:
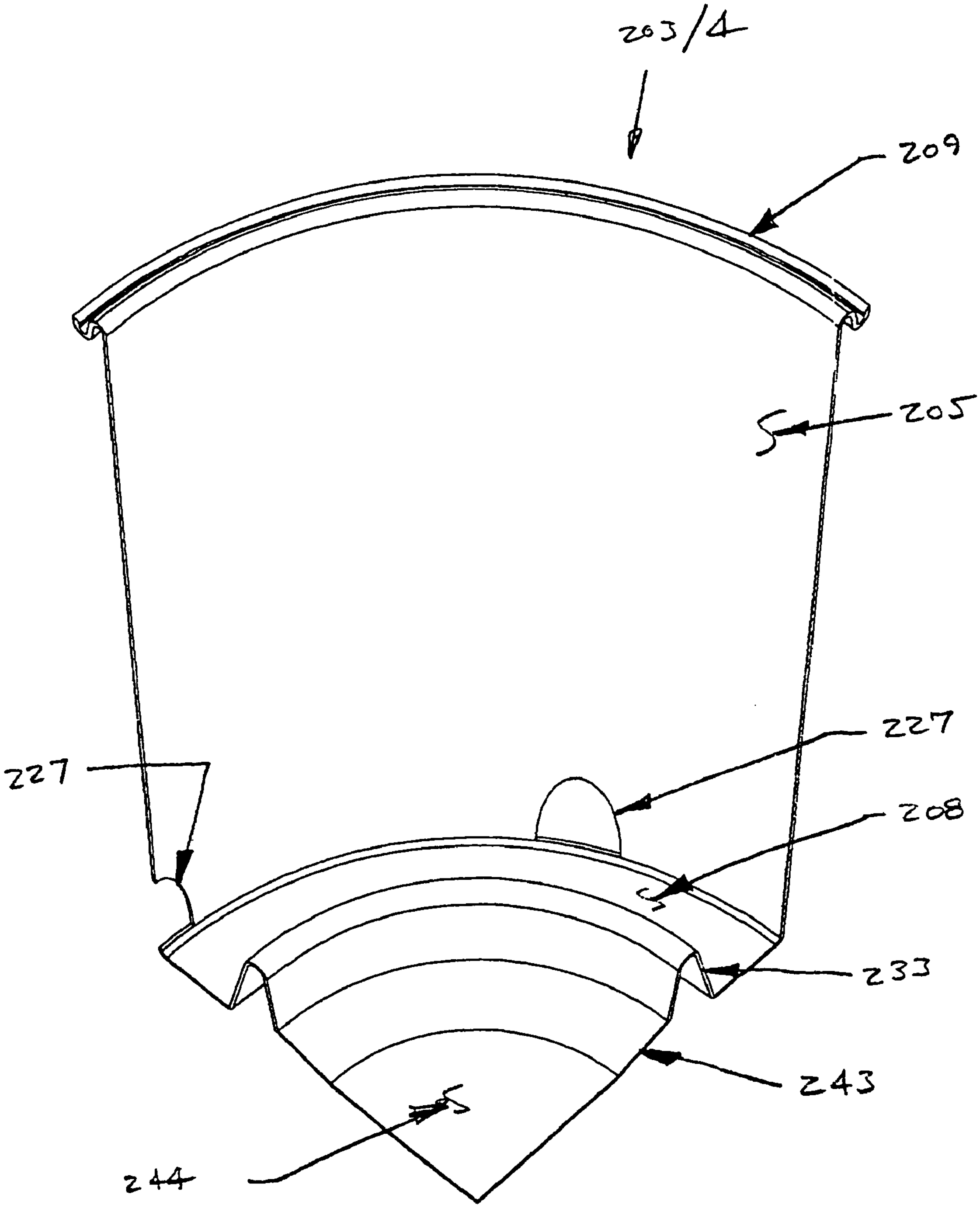
FIG. 9 is a perspective view of a split elevation section of one-quarter of a container with a first embodiment of a container lifting stabilization feature comprising an annular groove in container bottom wall and drain holes optionally strictly through container side wall, proximal to container bottom, said split section occurring at two perpendicular vertical planes intersecting one another at the vertical centerline of container.

The container 203/4 shown in FIG. 9 provides substantially the same function as container 203/3 of FIG. 8, except drain holes 227 are through container side wall 205 instead of container bottom wall 208.

Figure 10:
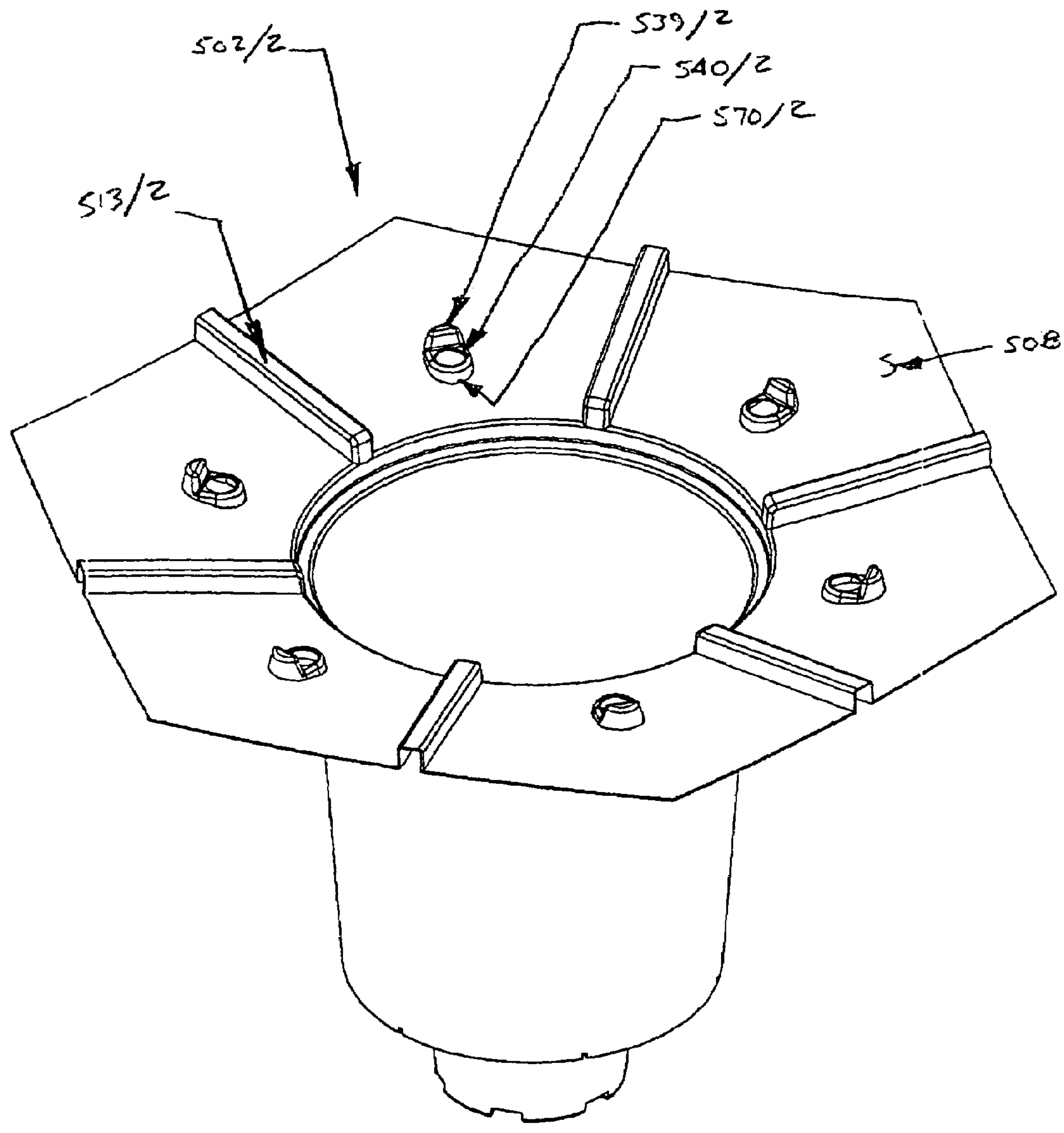
FIG. 10 is a perspective view of one container receptacle of a spaced container pallet, with a second embodiment of a collected water overflow drainage system, comprising a circular array of equally spaced, vertically punched holes through the upper wall of a foliage-deflecting upward protrusion from receptacle funnel wall, with proximal water diverter immediately up slope from each hole.

The pallet segment 502/2 shown in FIG. 10 has a second embodiment of a collected water overflow drainage system, comprising a circular array of equally spaced overflow drain holes 540/2 through the upper wall of a foliage-deflecting upward protrusion 570/2 extending from receptacle funnel wall 508, with proximal water diverter 539/2 immediately up slope from each hole 540/2. Overflow drain holes 540/2 may be vertically punched in a single stroke. In this embodiment, overflow drain holes 540/2 are not affiliated with stiffening ribs 513/2.

Figure 11:
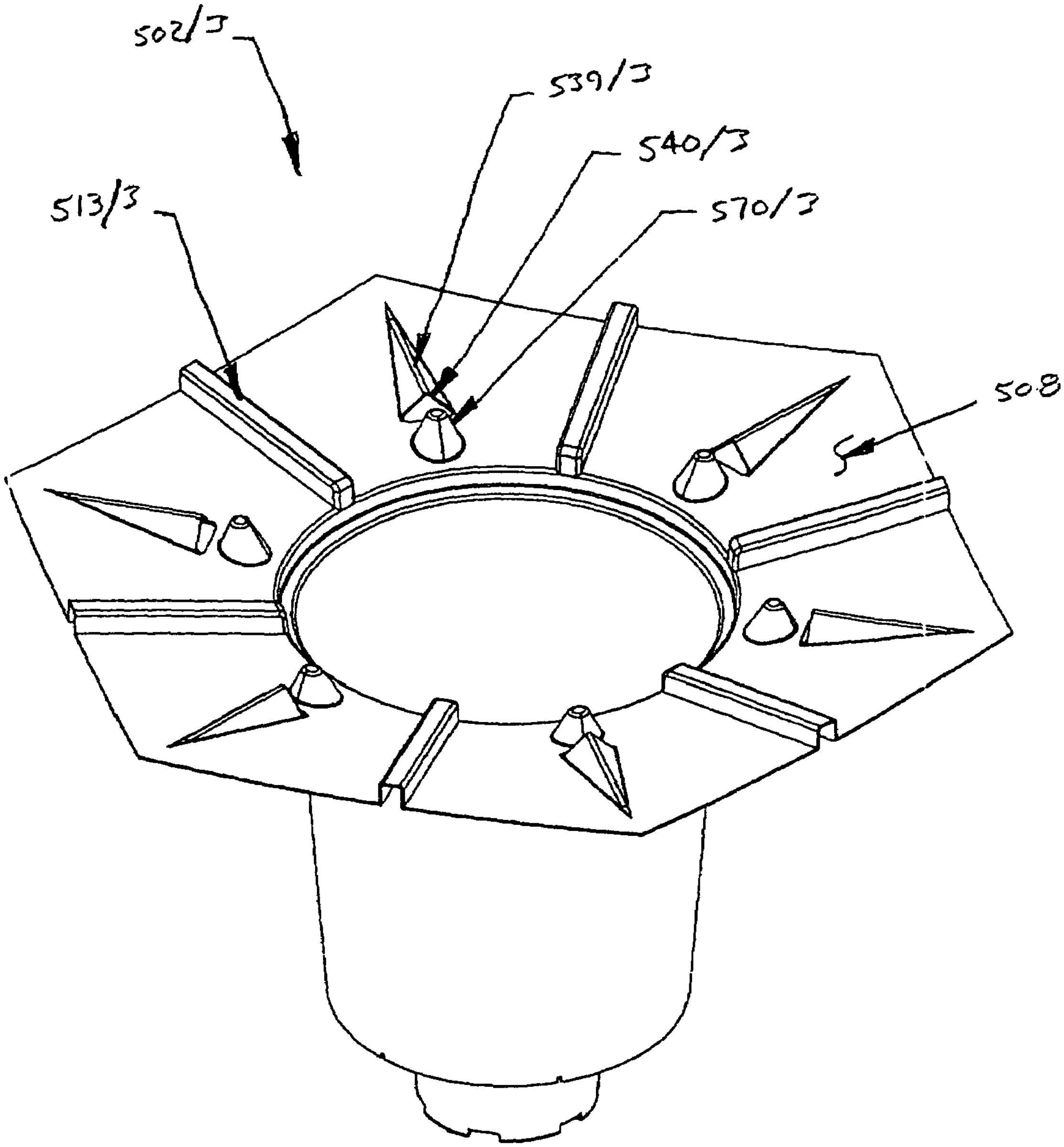
FIG. 11 is a perspective view of one container receptacle of a spaced container pallet, with a third embodiment of a collected water overflow drainage system, comprising a circular array of equally spaced, vertically punched holes each through the lower, sloped end wall of a water diverter, each said hole immediately up slope from a foliage diverting upward protrusion.

The pallet segment 502/3 shown in FIG. 11 has a third embodiment of a collected water overflow drainage system, comprising a circular array of equally spaced overflow drain holes 540/3 through the lower, sloped end wall of a water diverter 539/3, each said hole immediately up slope from a foliage diverting upward protrusion 570/3 extending from receptacle funnel wall 508. Overflow drain holes 540/3 may be vertically punched in a single stroke. In this embodiment, overflow drain holes 540/3 are not affiliated with stiffening ribs 513/3.

Figure 12:
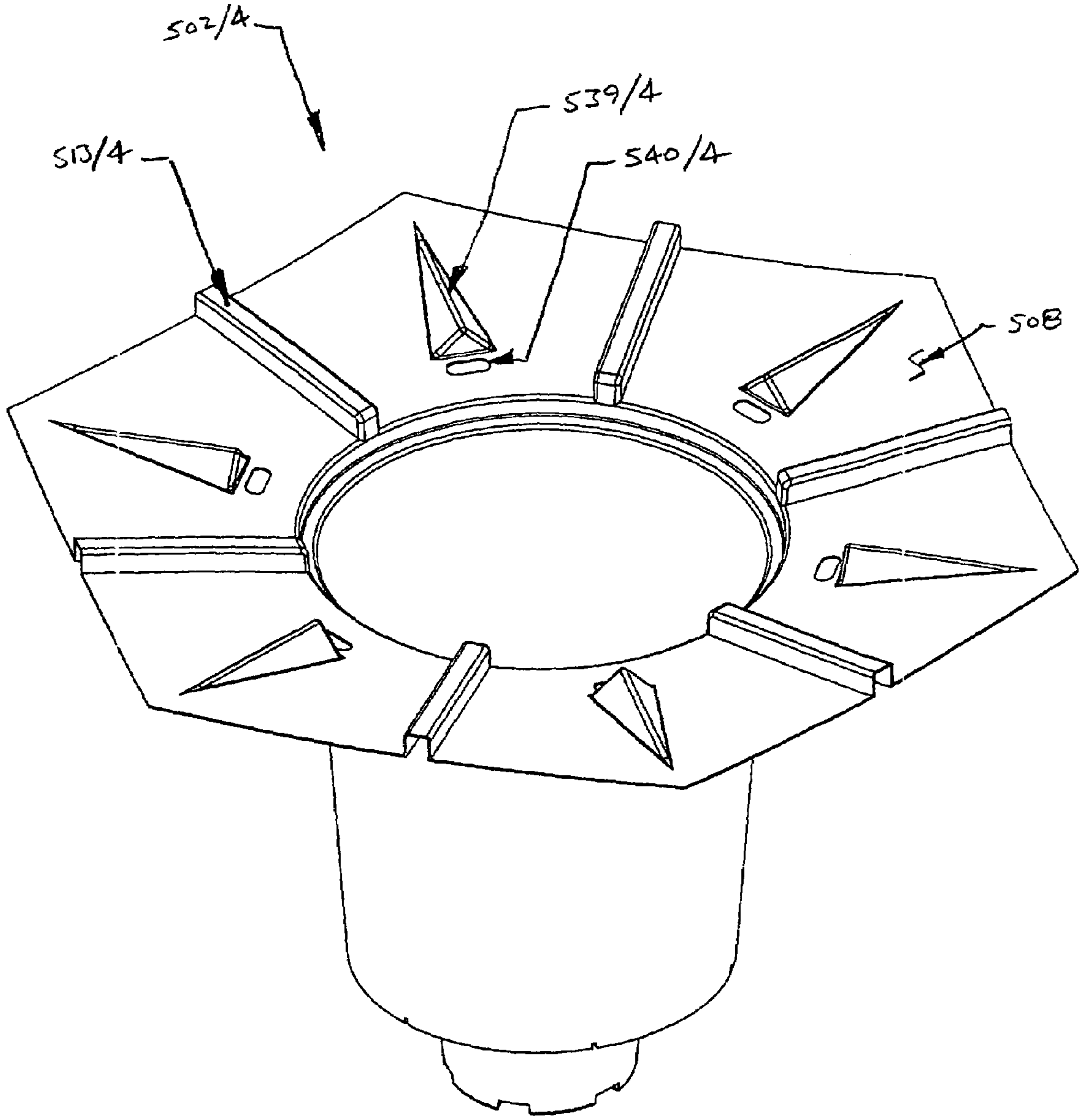
FIG. 12 is a perspective view of one container receptacle of a spaced container pallet, with a fourth embodiment of a collected water overflow drainage system, comprising a circular array of equally spaced, vertically punched holes through receptacle funnel wall, with proximal water diverter immediately up slope from each hole.

The pallet segment 502/4 shown in FIG. 12 has a fourth embodiment of a collected water overflow drainage system, comprising a circular array of equally spaced overflow drain holes 540/4 through receptacle funnel wall 508, with proximal water diverter 539/4 immediately up slope from each hole 540/4. Foliage deflection as in earlier embodiments is not necessary since hole 540/4 is not projected in radial growth direction of plant foliage. Overflow drain holes 540/4 may be vertically punched in a single stroke. In this embodiment, overflow drain holes 540/4 are not affiliated with stiffening ribs 513/4.

Figure 13:
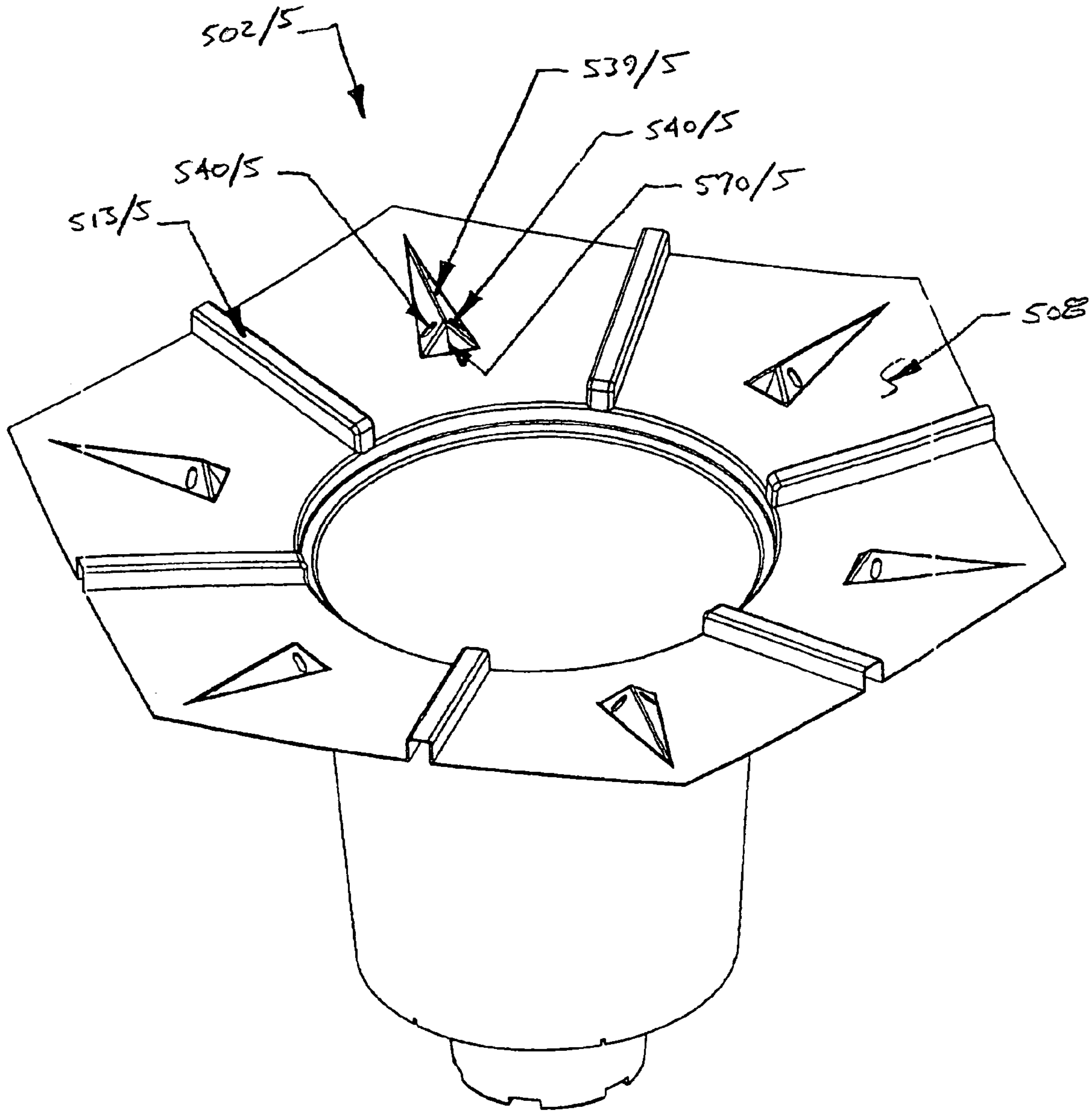
FIG. 13 is a perspective view of one container receptacle of a spaced container pallet, with a fifth embodiment of a collected water overflow drainage system, comprising a circular array of equally spaced, vertically punched holes, a pair of each through sloped side walls of a corresponding water diverter.

The pallet segment 502/5 shown in FIG. 13 has a fifth embodiment of a collected water overflow drainage system, comprising a circular array of equally spaced pairs of overflow drain holes 540/5 through opposing sloped side walls of a corresponding water diverter 539/5. Foliage deflection as in earlier embodiments is not necessary since holes 540/5 are not projected in radial growth direction of plant foliage. Overflow drain holes 540/5 may be vertically punched in a single stroke. In this embodiment, overflow drain holes 540/5 are not affiliated with stiffening ribs 513/5.

Figure 14:
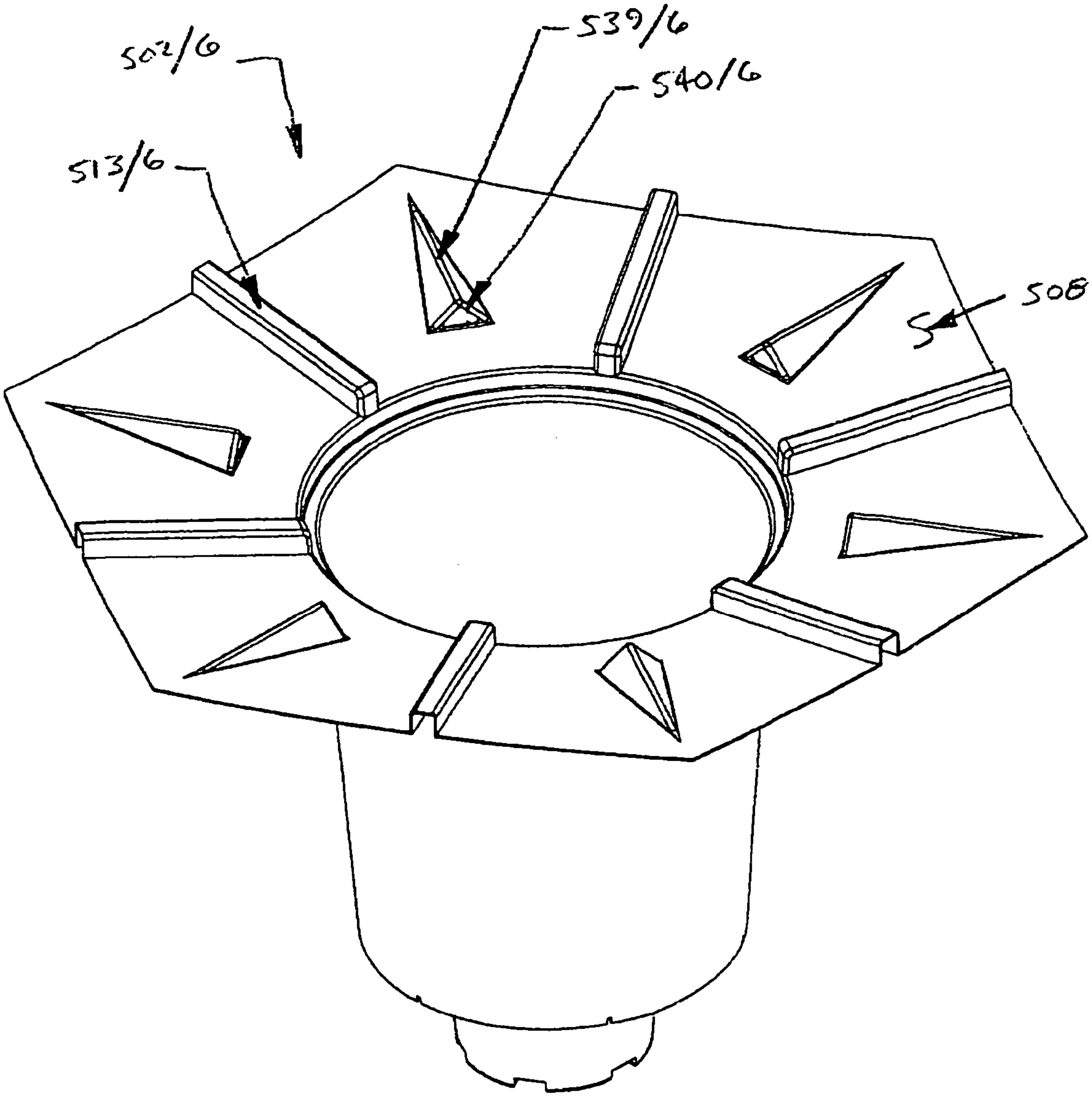
FIG. 14 is a perspective view of one container receptacle of a spaced container pallet, with a sixth embodiment of a collected water overflow drainage system, comprising a circular array of equally spaced, radially punched holes each through the lower, sloped end wall of a water diverter.

The pallet segment 502/6 shown in FIG. 14 has a sixth embodiment of a collected water overflow drainage system, comprising a circular array of equally spaced overflow drain holes 540/6 each through the down slope end of a corresponding water diverter 539/6. Foliage deflection may be incorporated with an upward protrusion down slope from each hole 540/6, but is not shown. Overflow drain holes 540/6 are radially punched so that holes 540/6 are not projected vertically, reducing unintentional spillage of particularly irrigation water and other broadcast liquids and particulates. In this embodiment, overflow drain holes 540/6 are not affiliated with stiffening ribs 513/6.

Figure 15:
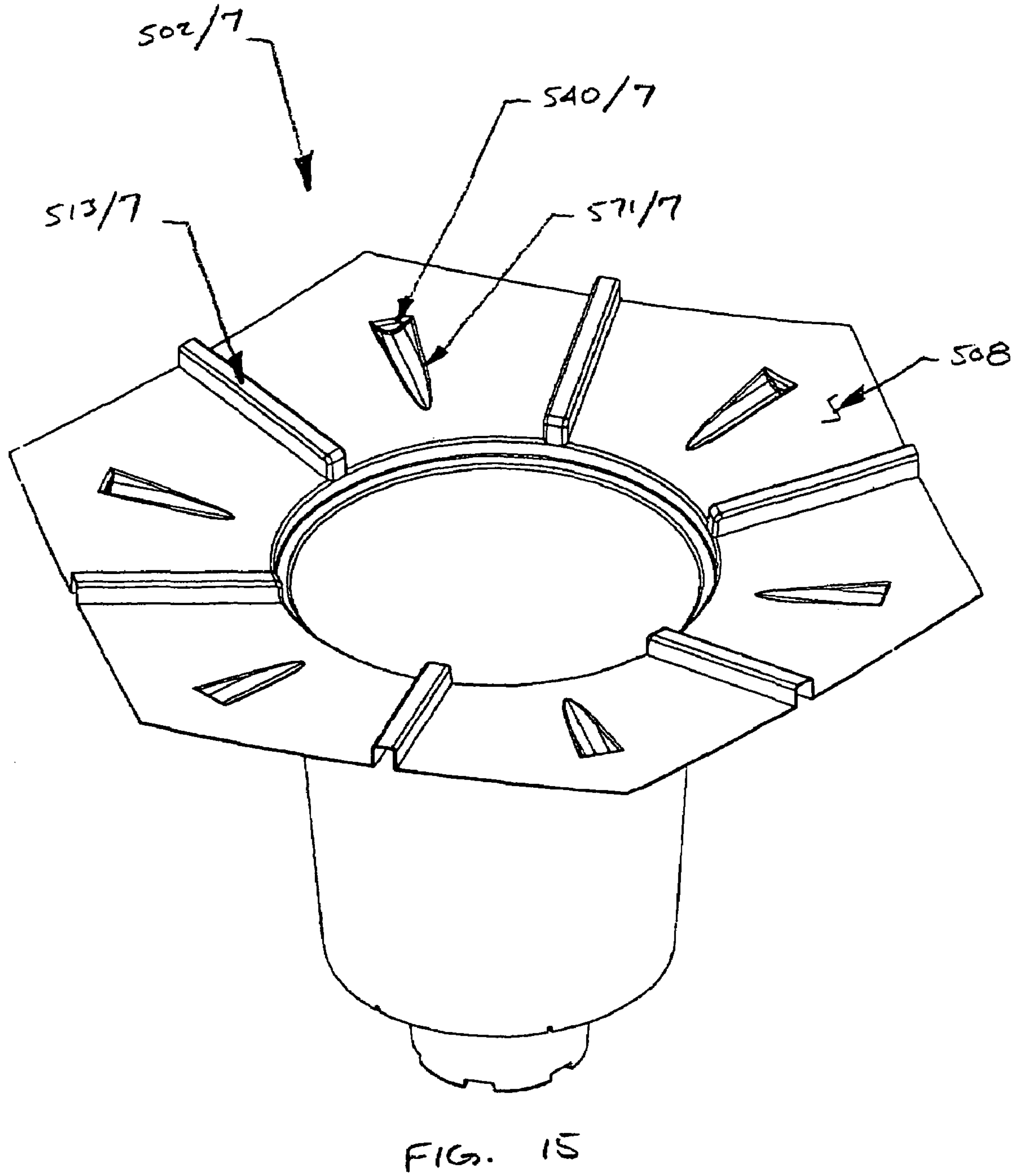
FIG. 15 is a perspective view of one container receptacle of a spaced container pallet, with a seventh embodiment of a collected water overflow drainage system, comprising a circular array of equally spaced, radially punched holes each through the upper, substantially vertical end wall of a water radial drain trough.

The pallet segment 502/7 shown in FIG. 15 has a seventh embodiment of a collected water overflow drainage system, comprising a circular array of equally spaced overflow drain holes 540/7 each through the upper, substantially vertical end wall of a water radial drain trough 571/7. Foliage deflection may be incorporated with an upward protrusion down slope from each hole 540/7, but is not shown. Overflow drain holes 540/7 are radially punched so that holes 540/7 are not projected vertically, reducing unintentional spillage of particularly irrigation water and other broadcast liquids and particulates. In this embodiment, overflow drain holes 540/7 are not affiliated with stiffening ribs 513/7.

Figure 16:
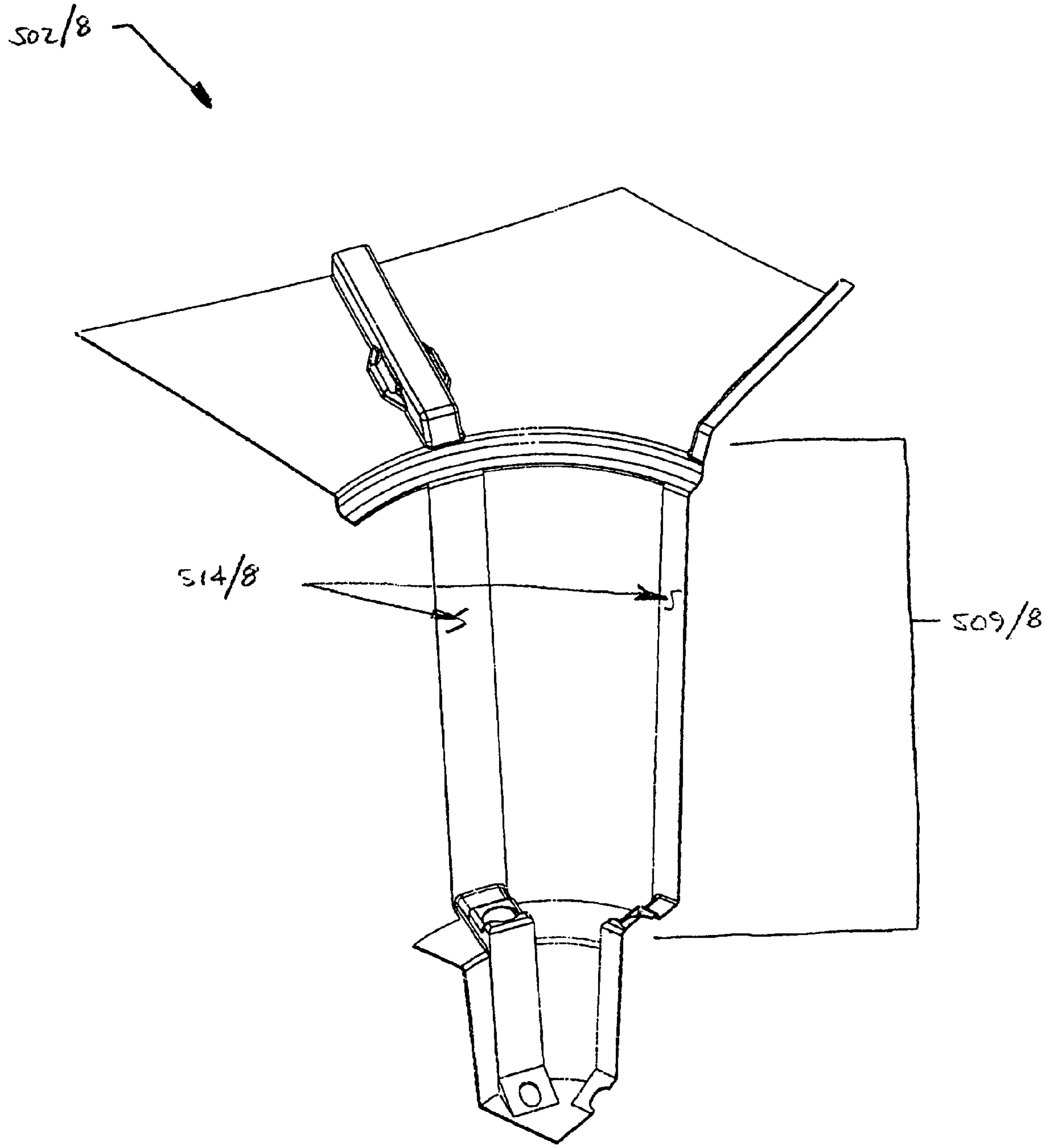
FIG. 16 is a perspective view of a split elevation section of one-quarter of a container receptacle/funnel of a spaced container pallet, with a second embodiment of a container receptacle comprising a container lip sealing area and ribbed, substantially open sides.

The pallet segment 502/8 shown in FIG. 16 has a second embodiment of a container receptacle 509/8 that is similar to container receptacle of first embodiment, except comprising ribs 514/8 and otherwise open sides, reducing the amount of material required for construction of pallet 502/8. Sealing of pallet container receptacle 509/8 with container is the same as in the first container receptacle embodiment. While not depicted in illustration, ribs 514/8 may have contoured cross sections for increased compressive load capacity. Such contouring is limited by pallet stack nesting pitch requirements.

Figure 17:
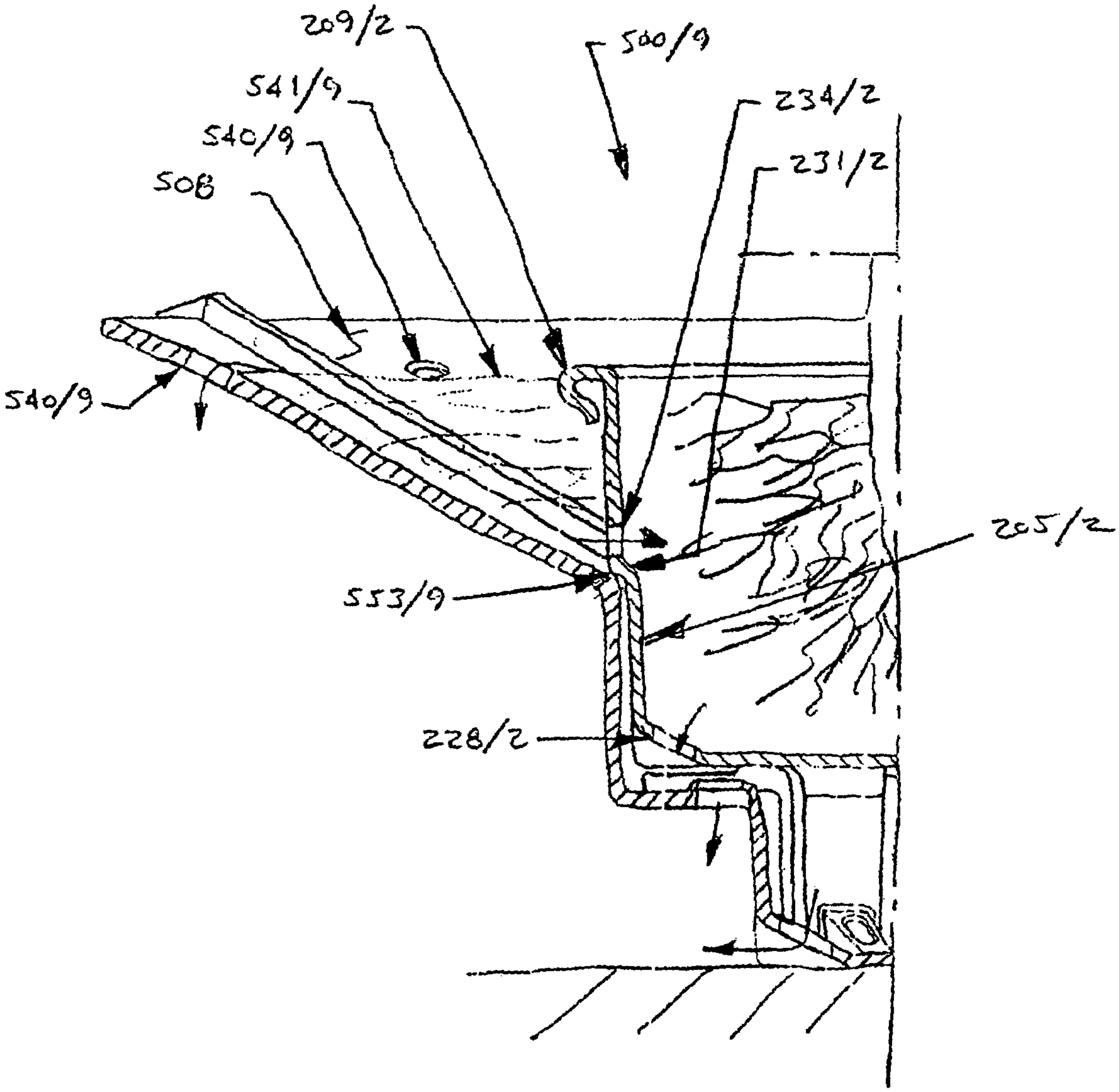
FIG. 17 is a normal view of an elevation section of one-quarter of a container receptacle/funnel of a spaced container pallet, with a third embodiment of a container receptacle/container seal arrangement comprising a relatively shallow receptacle with a stepped container side wall for sealing with receptacle, and container water inlet holes through container side wall, immediately above container side wall step.

The pallet assembly segment 500/9 shown in FIG. 17 has a third embodiment of a container receptacle 509/9 that is significantly more shallow relative to earlier embodiments and to the mounted container 203/2. Container 203/2 is a second embodiment, having a stepped side wall 205/2, wherein seal 553/9 between container receptacle 509/9 and container 203/2 is achieved at step 231/2, and collected water enters container 203/2 through water inlet holes 234/2 in container side wall 205/2, immediately above container side wall step 231/2. Thus, it is not necessary for collected water 541/9 to accumulate above container lip 209/9 in order for collected water 541/9 to enter container. Hence the lower elevation of overflow drain hole 540/9 relative to container lip 209/9. Accommodations for container drainage are similar to earlier embodiments. This pallet container receptacle embodiment and container embodiment render container lip 209/9 above local funnel wall 508, and, thus, accessible for direct lifting. Consequently, there is no need for a secondary container lifting system to extract containers 203/2 from pallet in process of disassembly of pallet assemblies 500/9.

Figure 18:
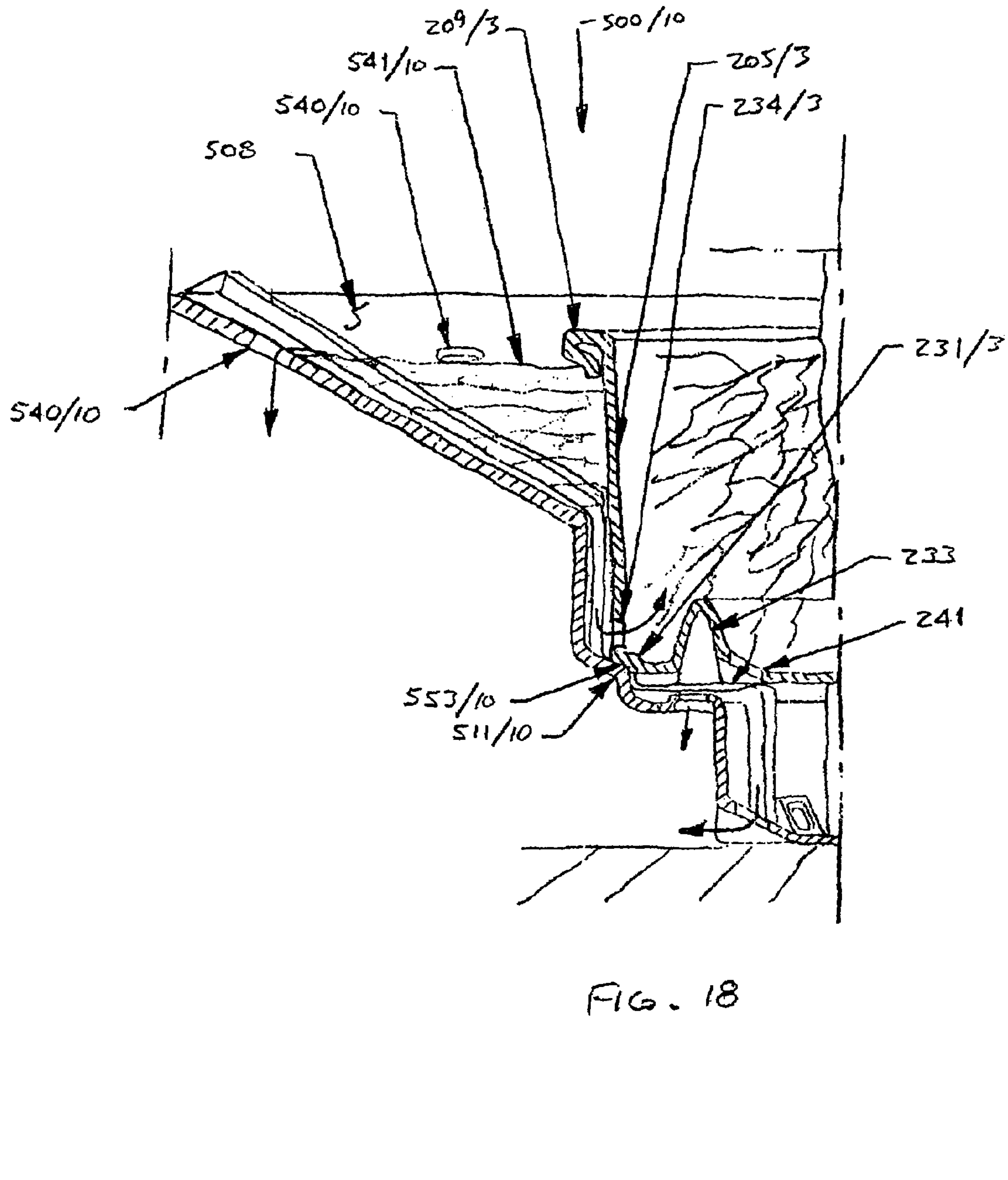
FIG. 18 is a normal view of an elevation section of one-quarter of a container receptacle/funnel of a spaced container pallet, with a fourth embodiment of a container receptacle/container seal arrangement comprising a relatively shallow receptacle with sealing occurring at bottom, outer perimeter of container and container water inlet holes through container side wall, immediately above container bottom wall.

The pallet assembly segment 500/10 shown in FIG. 18 has a fourth embodiment of a container receptacle 509/10 that is shallow relative to the mounted container 203/3. Container 203/3 is a third embodiment, having an annular sealing step 231/3 adjoining outer bottom corner of container 203/3 that seals against container receptacle step 511/10, producing seal 553/10. Collected water enters container 203/3 through water inlet holes 234/3 in container side wall 205/3, immediately above container side wall step 231/3. Thus, it is not necessary for collected water 541/10 to accumulate above container lip 209/3 in order for collected water 541/10 to enter container. Hence the lower elevation of overflow drain hole 540/10 relative to container lip 209/10. Annular upward recess 233 in container bottom wall blocks direct water flow path between water inlet holes 234/3 and container drain holes 241, preventing excessive soil erosion. This arrangement also results in a soil reduced dehydration rate zone between recess 233 and container side wall 205/3 with container 203/3 holding containerized plant installed in pallet container receptacle 509/10. Container drainage is through drain hole 241 on container center side of annular recess 233. This pallet container receptacle embodiment and container embodiment render container lip 209/9 above local funnel wall 508, accessible for direct lifting. Consequently, there is no need for a secondary container lifting system to extract containers 203/3 from pallet in process of disassembly of pallet assemblies 500/10.

Figure 19:
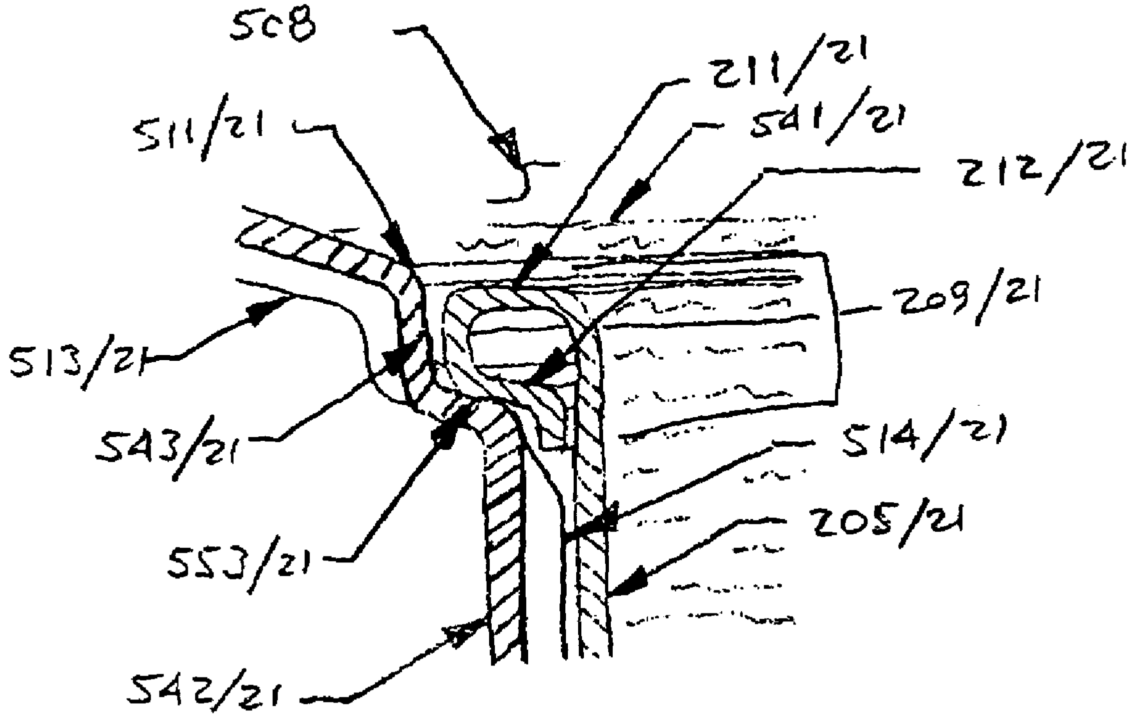
FIG. 19 is a normal view of an elevation section of a second embodiment of a sealing arrangement between a container and a receptacle/funnel of a spaced container pallet.

The elevation section view of FIG. 19 illustrates a fourth embodiment of a seal 553/21 between pallet container receptacle recess 543/21 and a container lip 209/21. Lip 209/21 is shown engaged with pallet container receptacle recess 543/21 at perimeter 511/21 of hole through pallet segment upper wall 508. Recess minimizes accumulation of water between seal area 553/21 and uppermost surface 211/21 of container lip 209/21. Accumulated water is limited to level 541/21 by overflow drain holes (not shown). Container lip 209/21 is rolled after thermoforming to create a section approximating a circle for increased stiffness. Such lip shape also presents a smooth wall 212/21 at sealing area 553/21, better suited for sealing than a cut edge. Pallet segment further incorporates ribs 513/21 and 514/21 for increased stiffness. Air gap between pallet container receptacle side wall 542/21 and container side wall 205/21 provide degree of thermal insulation. Rounded outer surfaces of lip 209/21 produce a container having greater comfort in handling.

Figure 20:
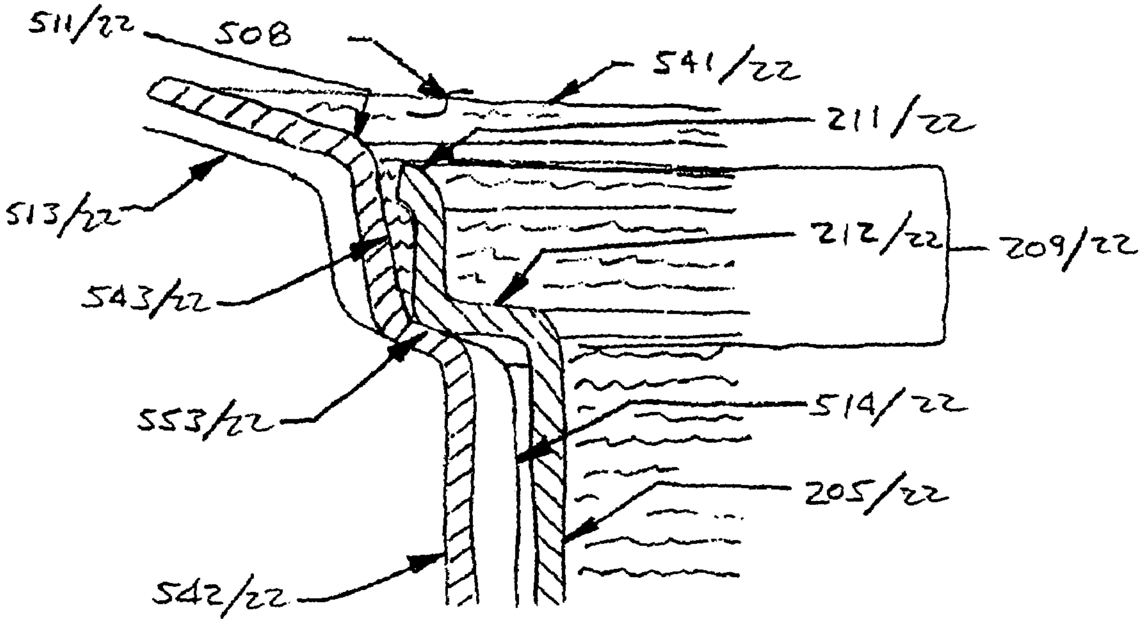
FIG. 20 is a normal view of an elevation section of a third embodiment of a sealing arrangement between a container and a receptacle/funnel of a spaced container pallet.

The elevation section view of FIG. 20 illustrates a fifth embodiment of a seal 553/22 between pallet container receptacle recess 543/22 and a container lip 209/22. Lip 209/22 is shown engaged with pallet container receptacle recess 543/22 at perimeter 511/22 of hole through pallet segment upper wall 508. Recess minimizes accumulation of water between seal area 553/22 and uppermost surface 211/22 of container lip 209/22. Accumulated water is limited to level 541/22 by overflow drain holes (not shown). Container lip 209/22 is open to facilitate capture of particulates and potentially for aesthetic value. Outer lower corner of outer lower bend in lip 209/22 presents a smooth wall 212/22 at sealing area 553/22, better suited for sealing than a cut edge. Pallet segment further incorporates ribs 513/22 and 514/22 for increased stiffness. Air gap between pallet container receptacle side wall 542/22 and container side wall 205/22 provide degree of thermal insulation. Rounded outer surfaces of lip 209/22 produce a container having greater comfort in handling.

Figure 21:
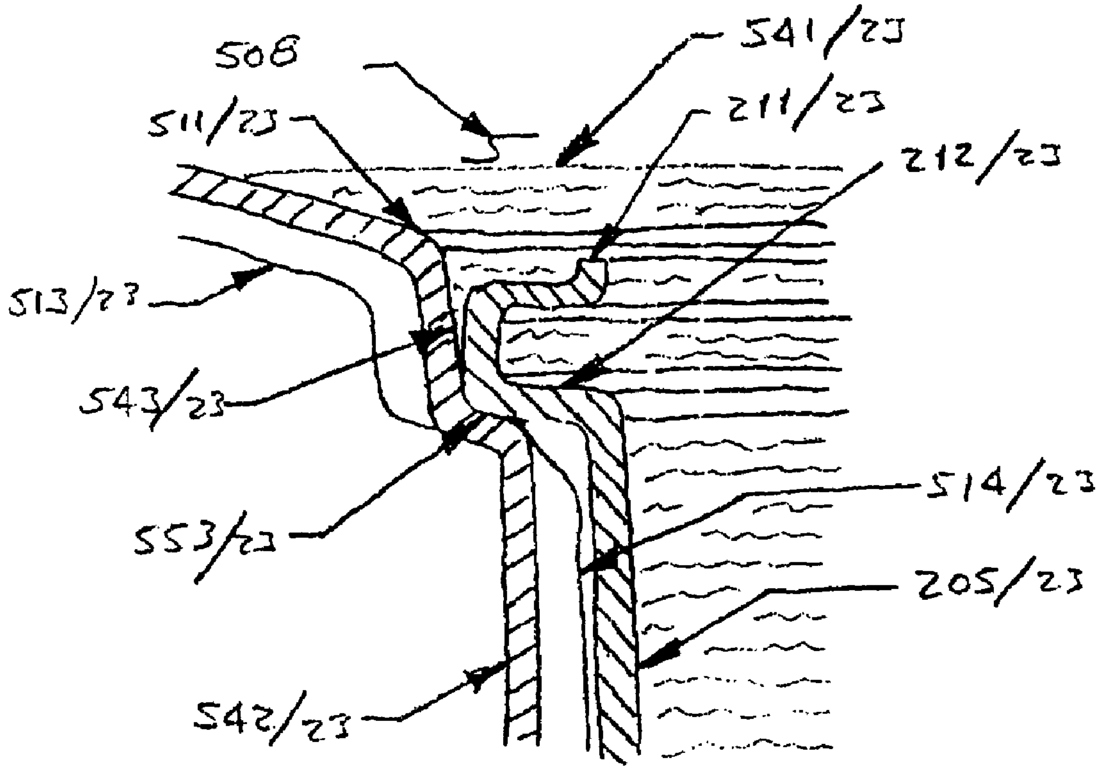
FIG. 21 is a normal view of an elevation section of a fourth embodiment of a sealing arrangement between a container and a receptacle/funnel of a spaced container pallet.

The elevation section view of FIG. 21 illustrates a sixth embodiment of a seal 553/23 between pallet container receptacle recess 543/23 and a container lip 209/23. Lip 209/23 is shown engaged with pallet container receptacle recess 543/23 at perimeter 511/23 of hole through pallet segment upper wall 508. Recess minimizes accumulation of water between seal area 553/23 and uppermost surface 211/23 of container lip 209/23. Accumulated water is limited to level 541/23 by overflow drain holes (not shown). Container lip 209/23 is folded as shown—typical of a blow molding process—to increase stiffness. Outer lower corner of outer lower bend in lip 209/23 presents a smooth wall 212/23 at sealing area 553/23, better suited for sealing than a cut edge. Pallet segment further incorporates ribs 513/23 and 514/23 for increased stiffness. Air gap between pallet container receptacle side wall 542/23 and container side wall 205/23 provide degree of thermal insulation. Rounded outer surfaces of lip 209/23 produce a container having greater comfort in handling.

Figure 22:
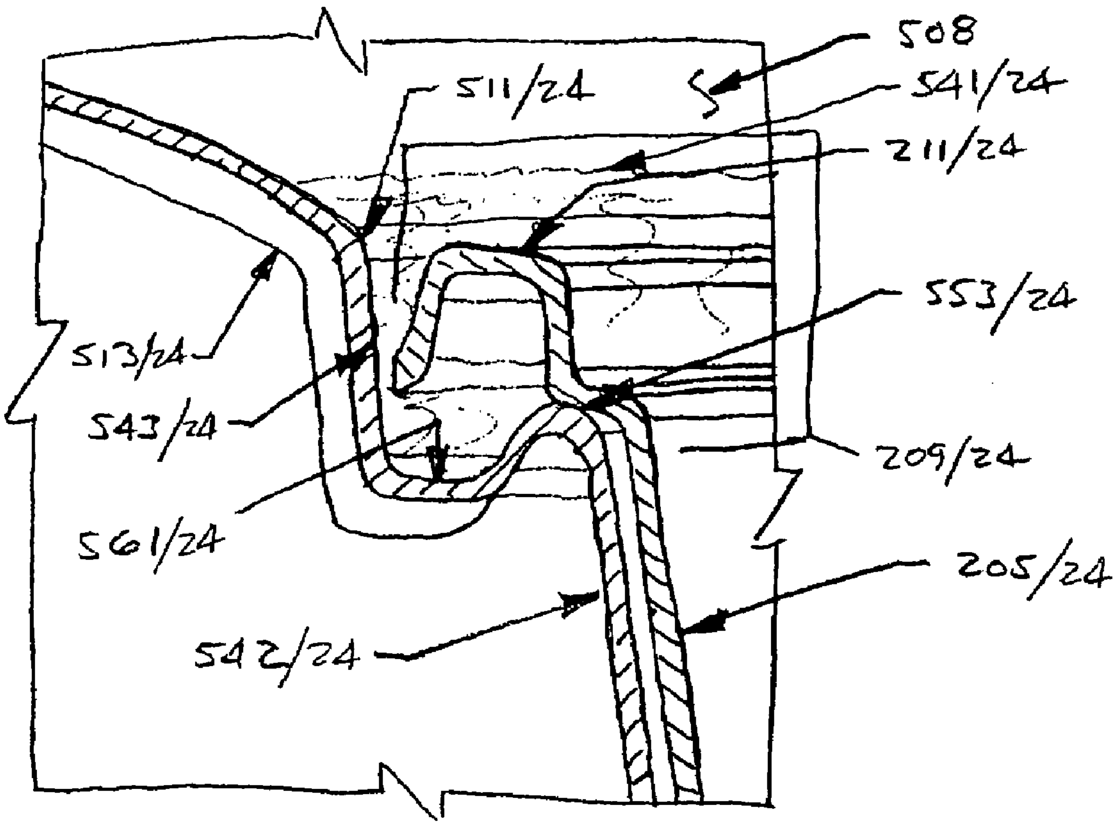
FIG. 22 is a normal view of an elevation section of a fifth embodiment of a sealing arrangement between a container and a receptacle/funnel of a spaced container pallet.

The elevation section view of FIG. 22 illustrates a seventh embodiment of a seal 553/24 formed between pallet container receptacle recess 543/24 and a container lip 209/24. Lip 209/24 is shown engaged with pallet container receptacle recess 543/24 at perimeter 511/24 of hole through pallet segment upper wall 508. Recess 543/24 minimizes accumulation of water between seal area 553/24 and uppermost surface 211/24 of container lip 209/24. Recess 561/24 incorporates an elevated annular inner rim the top of which provides sealing surface 553/24. Trough between elevated sealing surface and recess outer perimeter 511/24 provides a place for debris to settle under gravity, away from sealing surface 553/24. Accumulated water is limited to level 541/24 by overflow drain holes (not shown). Container lip 209/24 is folded as shown—typical of a blow molding process—to increase stiffness. Outer lower corner of outer leg of lip 209/24 is in close proximity to recess wall 543/24, filtering debris from entering recess 543/24. Pallet segment further incorporates ribs 513/24 for increased stiffness. Air gap between pallet container receptacle side wall 542/24 and container side wall 205/24 provide degree of thermal insulation.

Figure 23:
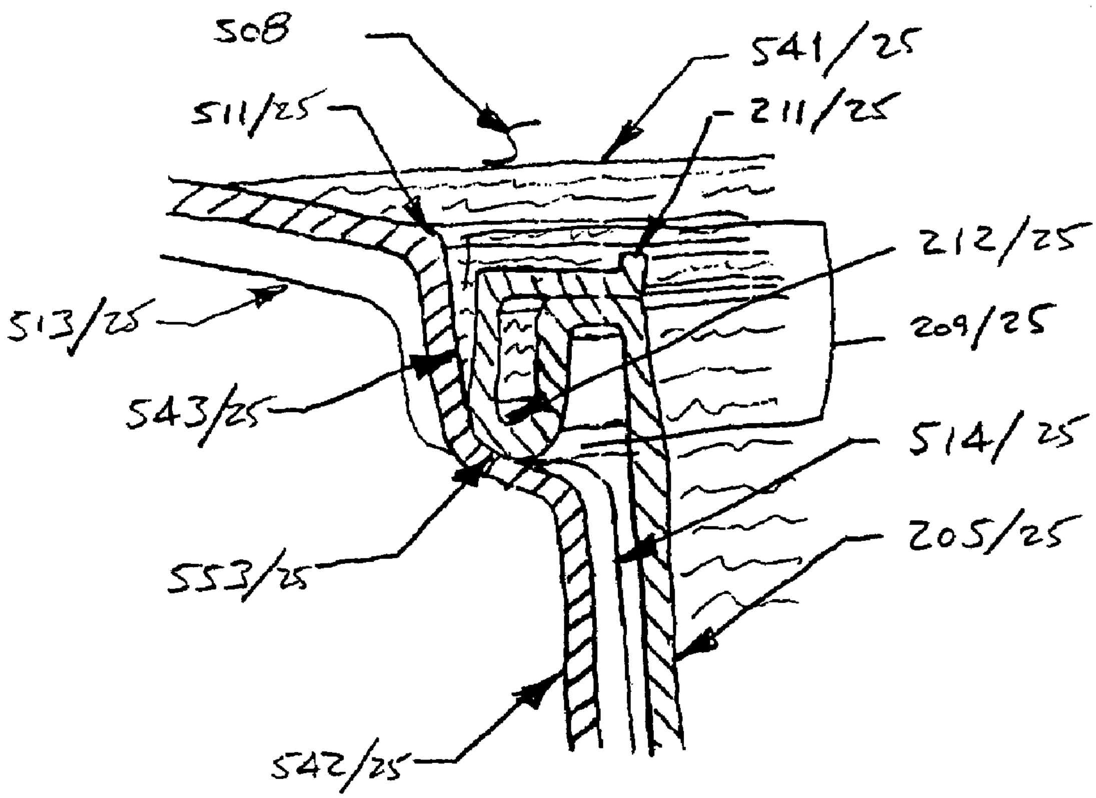
FIG. 23 is a normal view of an elevation section of a sixth embodiment of a sealing arrangement between a container and a receptacle/funnel of a spaced container pallet.

The elevation section view of FIG. 23 illustrates an eighth embodiment of a seal 553/25 between pallet container receptacle recess 543/25 and a different container lip 209/25. Sealing engagement is similar to that of FIG. 21.

Figure 24:
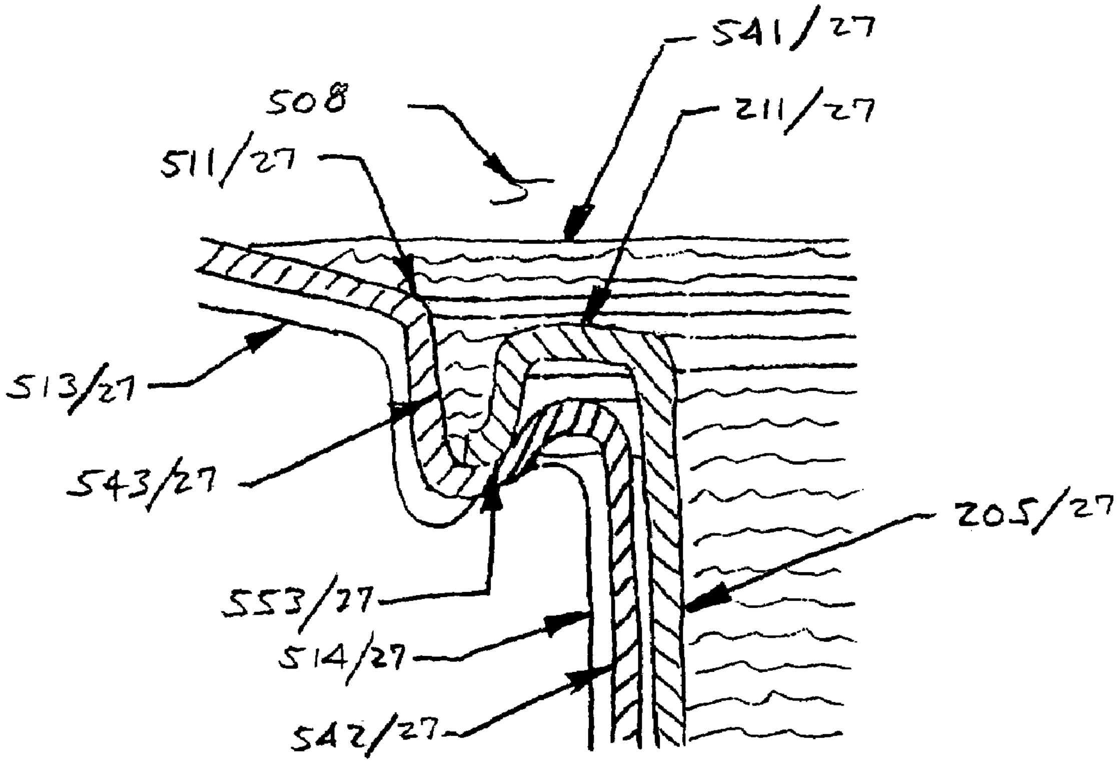
FIG. 24 is a normal view of an elevation section of a seventh embodiment of a sealing arrangement between a container and a receptacle/funnel of a spaced container pallet.
Figure 25:
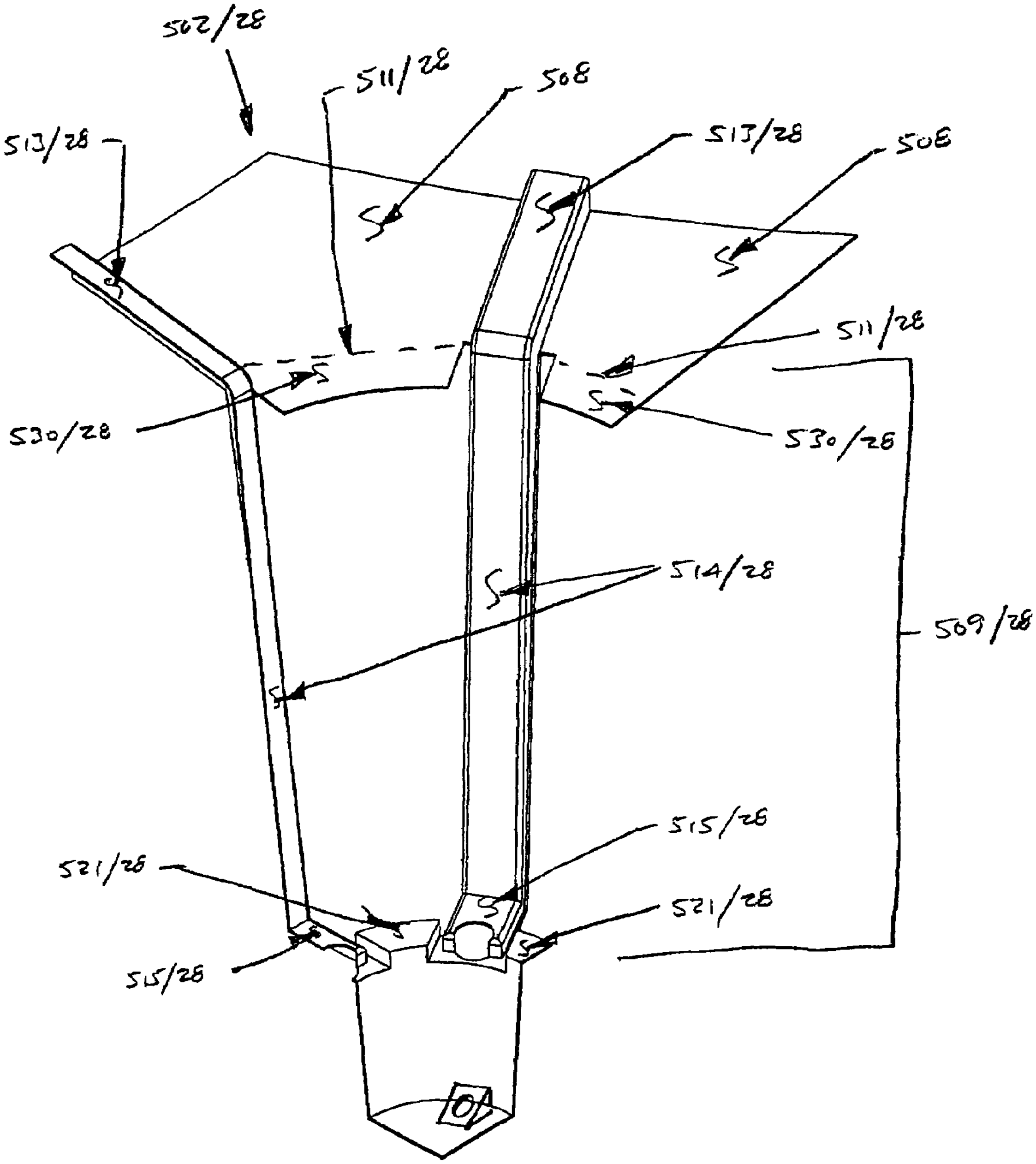
FIG. 25 is a perspective view of a split elevation section of one-quarter of one segment of a first embodiment of a chute arrangement for conveying collected applications from pallet into container upper end, in accordance with the invention, comprising an array of generic application conveying chutes, said split section occurring at two perpendicular vertical planes intersecting one another along vertical centerline of the pallet container receptacle.
Figure 26:
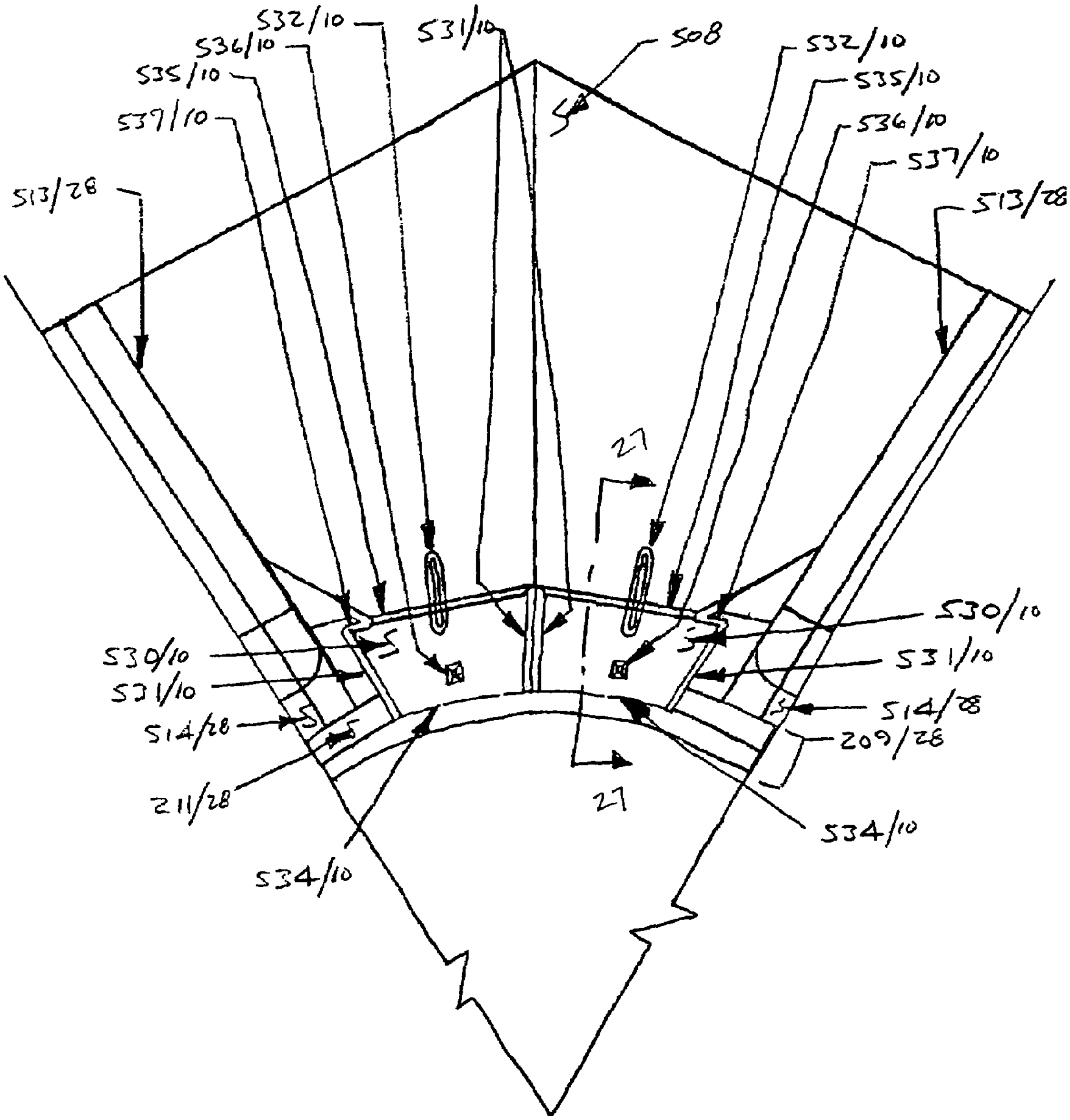
FIG. 26 is a close-up plan view of a portion of the chute arrangement of FIG. 27, less containerized plant canopy, showing in part the spatial relationship between a mounted container and two adjoining, integral flexible chutes of a plurality of such chutes spaced along the perimeter of the associated container receptacle hole through the upper wall portion of the pallet.
Figure 27:
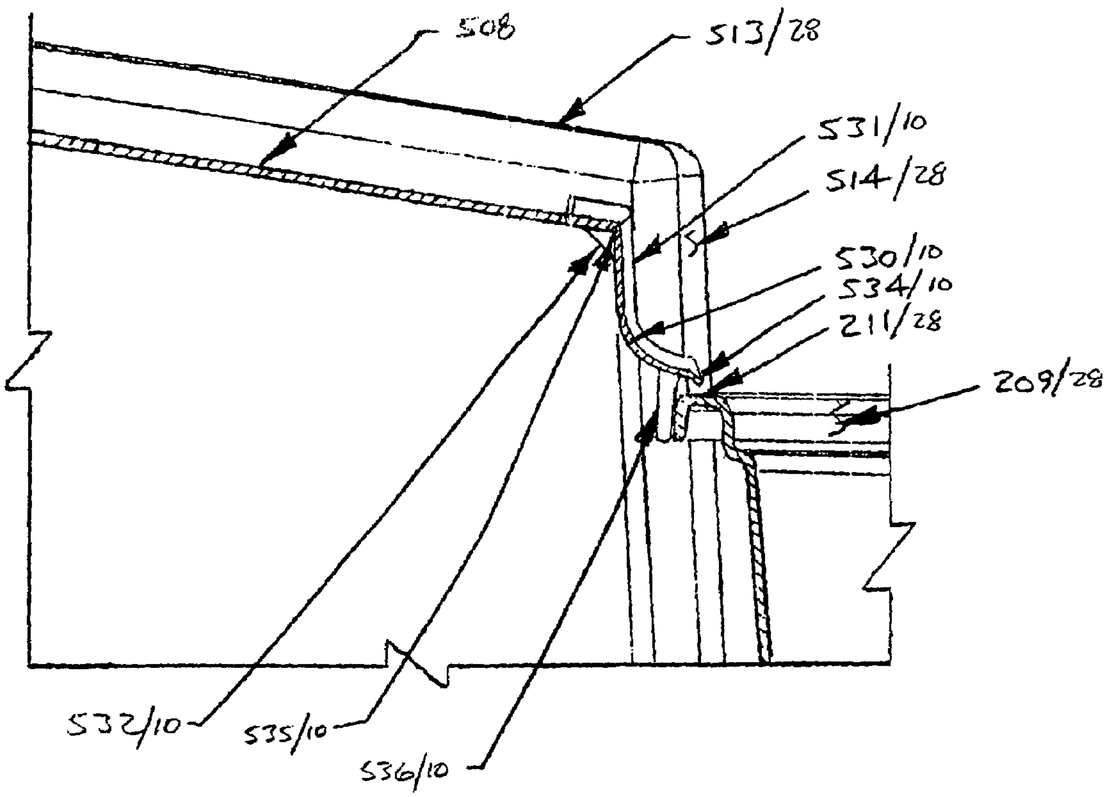
FIG. 27 is a section view of a portion of the pallet-container application conveying chute arrangement of FIG. 26, looking in direction 27-27 of FIG. 26, said view rotated clockwise 105 degrees from FIG. 26 section 27-27 projection, showing spatial relationship between chute and lip of a container installed in associated container receptacle.
Figure 28:
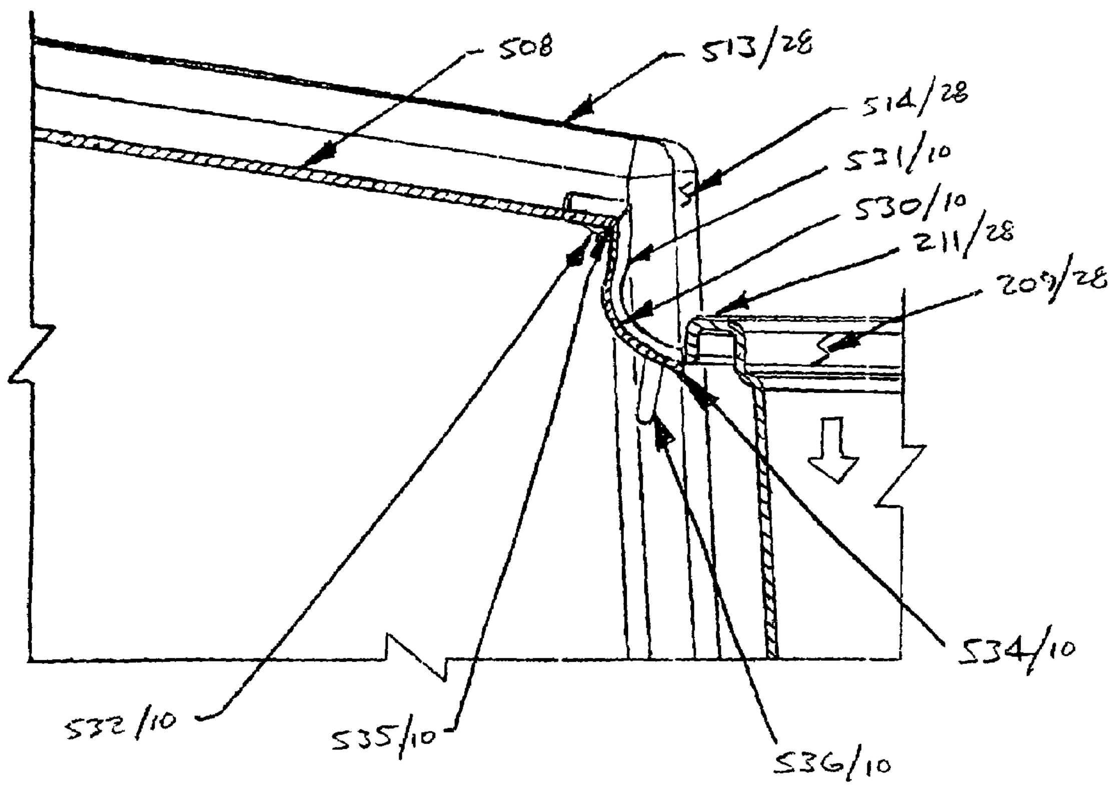
FIG. 28 is substantially the same as FIG. 27, showing chute deflecting downward under interaction with lip of container being installed into associated container receptacle of said pallet.
Figure 29:
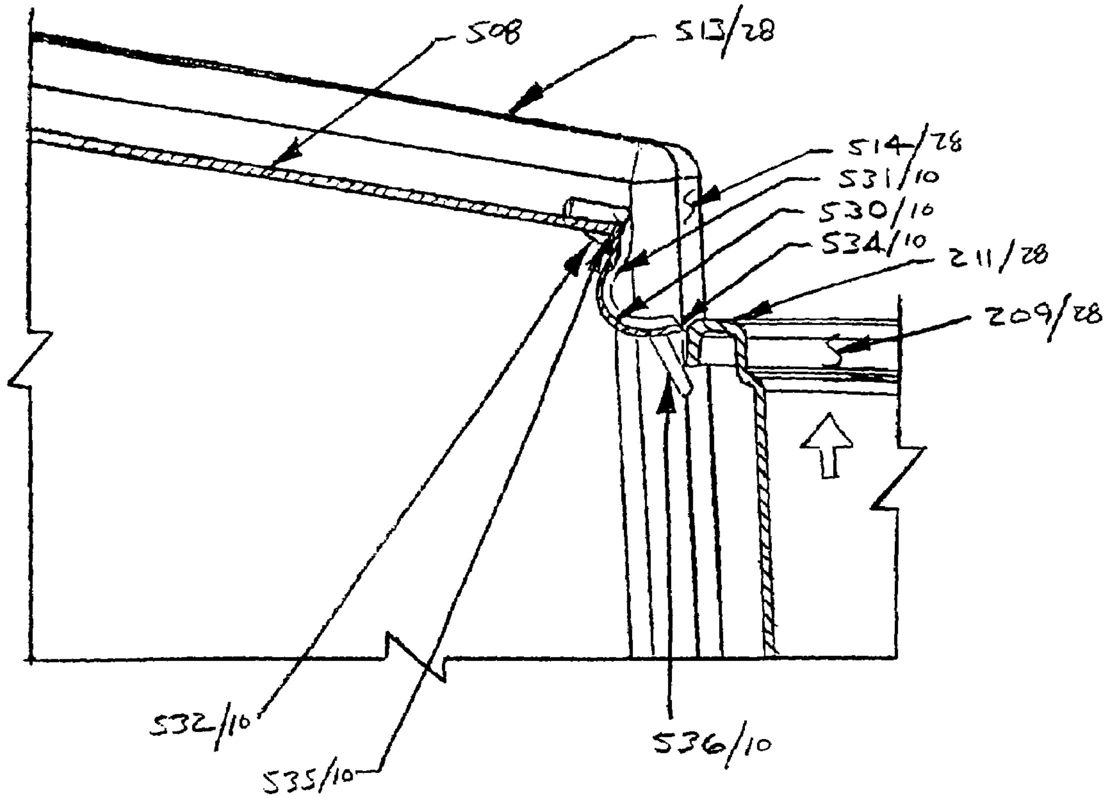
FIG. 29 is substantially the same as FIG. 27, showing chute deflecting outward and upward under interaction with lip of container being removed from associated container receptacle of said pallet.
Figure 30:
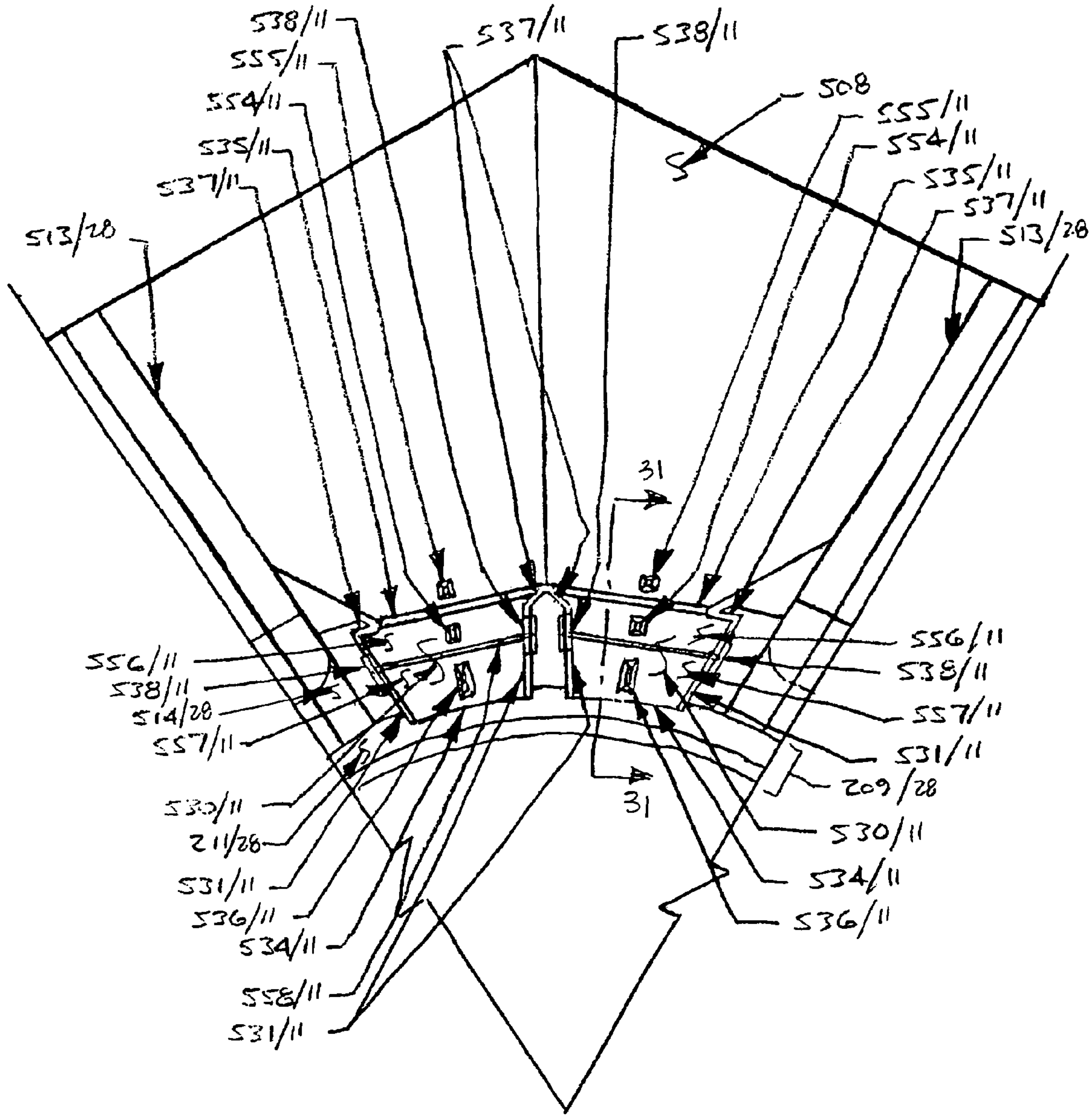
FIG. 30 is a close-up plan view of a portion of a second embodiment of a pallet-container application conveying means, less containerized plant canopy, showing in part the spatial relationship between a mounted container and two adjoining, integral spring hinged chutes of a plurality of such chutes spaced along the perimeter of the associated container receptacle hole through the upper wall portion of the pallet.
Figure 31:
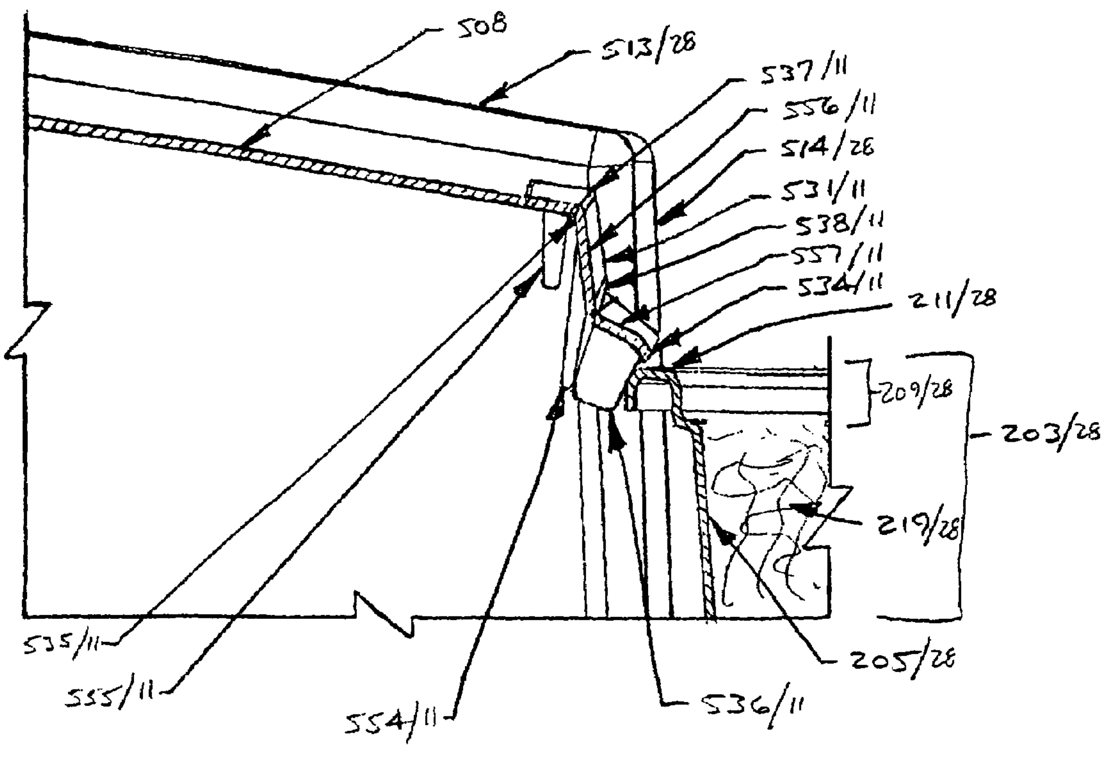
FIG. 31 is a section view of a portion of the pallet-container application conveying chute arrangement of FIG. 30, looking in direction 31-31 of FIG. 30, said view rotated clockwise 90 degrees from FIG. 30 section 31-31 projection, showing spatial relationship between chute and lip of a container installed in associated container receptacle.

The elevation section view of FIG. 24 illustrates a ninth embodiment of a seal 553/27 formed between pallet container receptacle recess 543/27 and a container lip 209/27. Lip 209/27 is shown engaged with pallet container receptacle recess 543/27 at perimeter 511/27 of hole through pallet segment upper wall 508. Recess 543/27 minimizes accumulation of water between seal area 553/27 and uppermost surface 211/27 of container lip 209/27. Recess 543/27 incorporates an elevated annular inner rim the top of which provides sealing surface 553/27. Trough 561/27 between elevated sealing surface and recess outer perimeter 511/27 provides a place for debris to settle under gravity, away from sealing surface 553/27. Accumulated water is limited to level 541/27 by overflow drain holes (not shown). Lower inner surface of outer leg of inverted "U" container lip 209/27—typical of a thermoforming process—provides sealing surface 553/27. Pallet segment further incorporates ribs 513/27 and 514/27 for increased stiffness. Air gap between pallet container receptacle side wall 542/27 and container side wall 205/27 provide degree of thermal insulation.

FIGS. 25 through 29 illustrate a first embodiment of a chute arrangement for conveying applications from funnel surface 504 of a pallet 502/28 into the open upper end of container 203 under gravity, wherein arrangement comprises flexible, downward, radially inwardly sloped chutes 530/10 attached to funnel wall along perimeter 535/10, the discharge ends 534/10 of which overhang lip 209/28 of an installed container 203/28. Upper surface 211/28 of container lip 209/28 slopes downwardly, radially inwardly relative to pallet container receptacle center, facilitating conveyance into container 203/28 of material discharged by chute 530/10 along free edges 534/10. Such sloping of upper surface 211/28 of container lip applies in all embodiments involving chutes for conveying materials from funnel surface 504 into containers 203/28, as described below.

Pallet container receptacle 509/28 sides comprise equally spaced ribs 514/28 with open spaces between. Ribs 514/28 are coupled at their upper ends to funnel wall ribs 513/28 and at their lower ends to receptacle bottom wall ribs 515/28. Such arrangement of ribs 514/28 and open spaces applies in all embodiments involving chutes for conveying materials from funnel surface 504 into containers 203/28, as described below.

Focus of FIGS. 26 through 29 are two adjoining, integral flexible chutes 530/10 coupled along perimeter 511/28 to funnel wall 508. While only two adjoining chutes 530/10 are depicted, incorporation of one or more, as can be reasonably fit between ribs 514/10, is considered intuitive, and such is the case for all embodiments, as described below, incorporating such chutes. Chute side walls 531/10 and 537/10 prevent water from spilling from chute sides. Chute side walls 531/10 between adjoining chutes are preferably flexible and joined to one another to achieve a bellows-type effect, further averting spillage. Downwardly formed gussets 532/10 stiffen joint 511/28 between chutes 530/10 and upper wall 508. Downward protrusions 536/10, on contact with radially outward surface of container lip 209/28 during container 203/28 removal from pallet assembly, ensure chutes 530/10 deflect outward, clearing lip 209/28.

FIGS. 30 through 34 illustrate a second embodiment of a pallet-container chute arrangement for conveying applications from funnel surface 504 of a pallet 502/28 into the open upper end of container under gravity, wherein arrangement comprises integral, two-segment, spring hinged, downward, radially inwardly sloped chutes attached to funnel wall 504 along perimeter 535/11, the discharge ends 534/11 of which overhang lip 209/28 of an installed container 203/28.

Each of two adjoining, integral chutes comprises an upper segment 556/11 coupled along perimeter 535/11 and a lower segment 557/11 coupled to upper segment 56/11 along perimeter 538/11. Each of perimeters walls 535/11 and 538/11 is thinned by a groove on underside, forming an integral spring hinge. Protrusion 555/11 extending downward from funnel wall 504 limits outward deflection of chute upper segment 556/11, while protrusions 554/11 and 536/11, extending downward from chute upper segment 556/11 and lower segment 557/11, respectively, limit downward deflection of chute lower segment 557/11 relative to chute upper segment 556/11. Described deflections are the result of chute interaction with container lip 209/28 on container installation to and removal from associated pallet container receptacle. Chute side walls 531/11 prevent water from spilling from chute sides. Folds 537/11 and 538/11 in chute side walls 531/11 facilitate spring joint flexibility while preventing water loss from chute sides. Downward protrusions 536/11, on contact with radially outward surface of container lip 209/28 during container 203/28 removal from pallet assembly, ensure chute segments 556/11 and 557/11 deflect outward, clearing lip 209/28.

Figure 32:
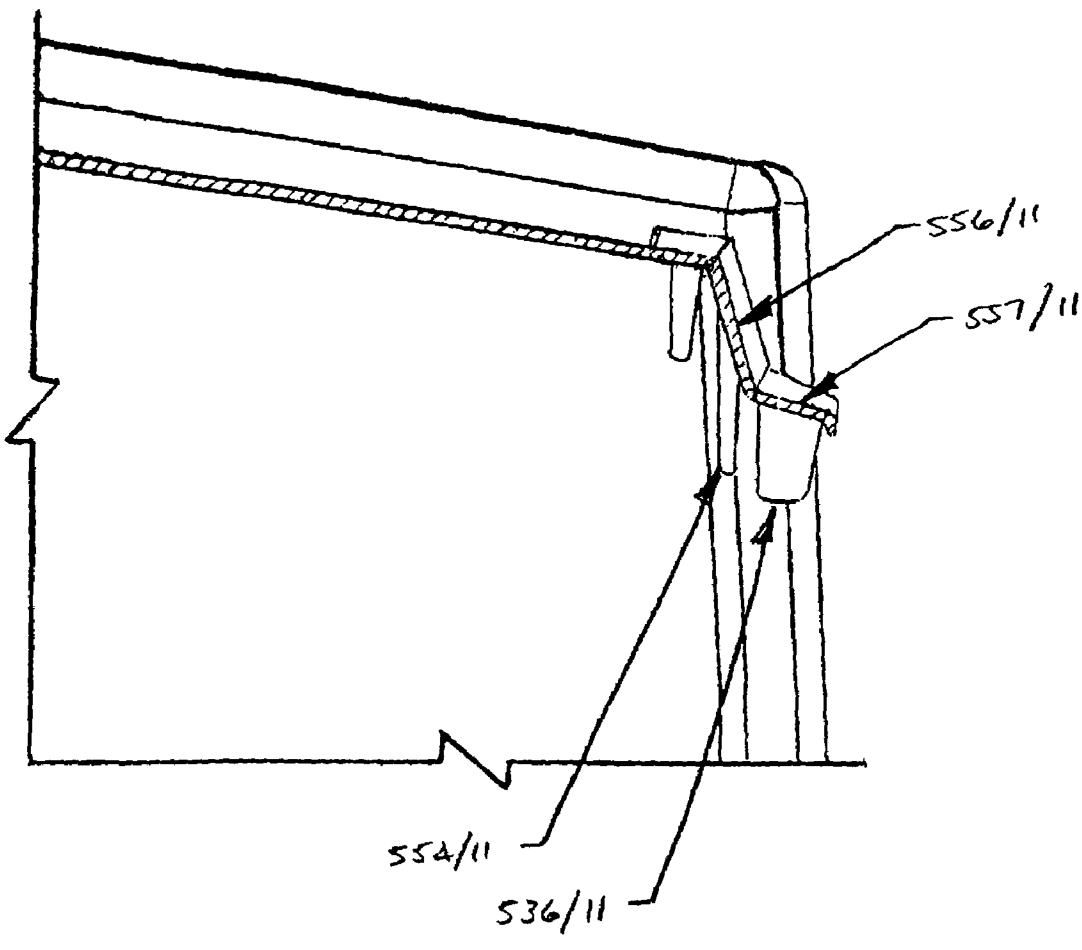
FIG. 32 is substantially the same as FIG. 31, except with container removed, showing free, molded and trimmed state of chute.
Figure 33:
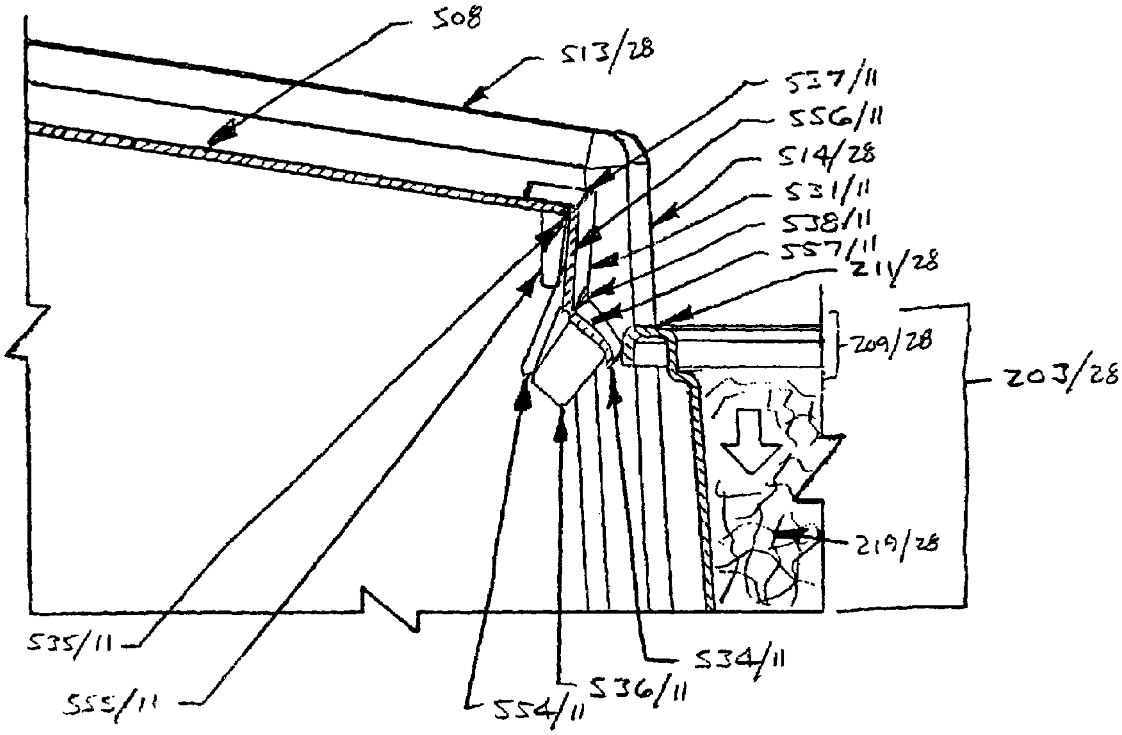
FIG. 33 is substantially the same as FIG. 31, except with container being installed, showing downward and outward deflection of chute resulting from contact between container lip and chute.
Figure 34:
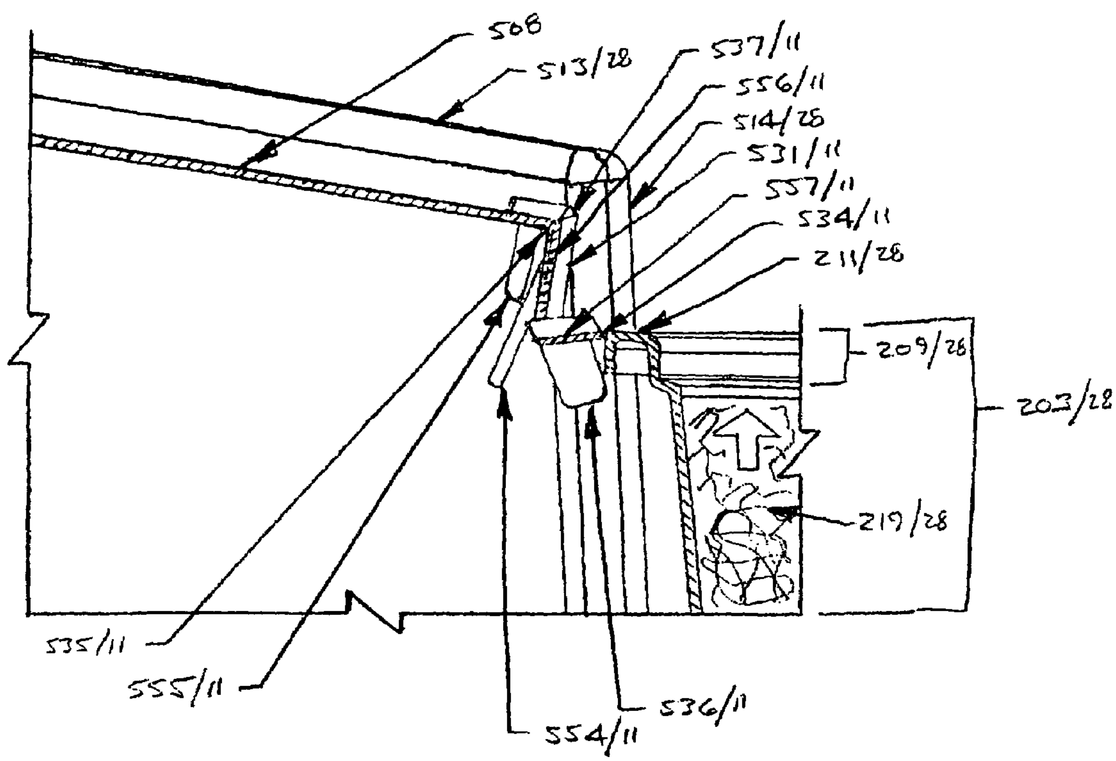
FIG. 34 is substantially the same as FIG. 31, except with container being removed, showing upward and outward deflection of chute resulting from contact between container lip and chute.
Figure 35:
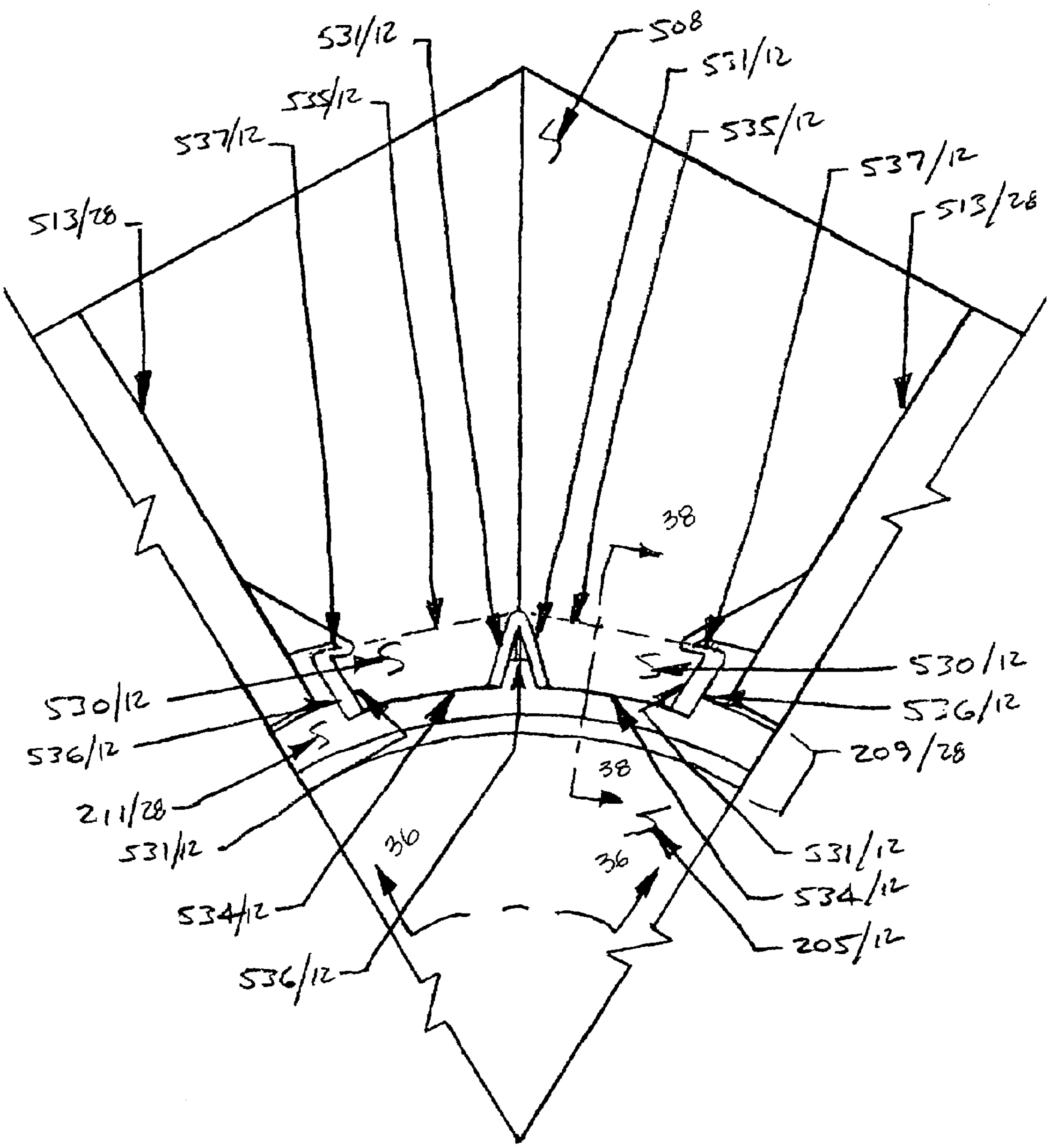
FIG. 35 is a close-up plan view of a portion of a third embodiment of a pallet-container application conveying chute arrangement, less containerized plant canopy, showing in part the spatial relationship between a mounted container and two adjoining, integral spring hinged chutes of a plurality of such chutes spaced along the perimeter of the associated container receptacle hole through the upper wall portion of the pallet.
Figure 36:
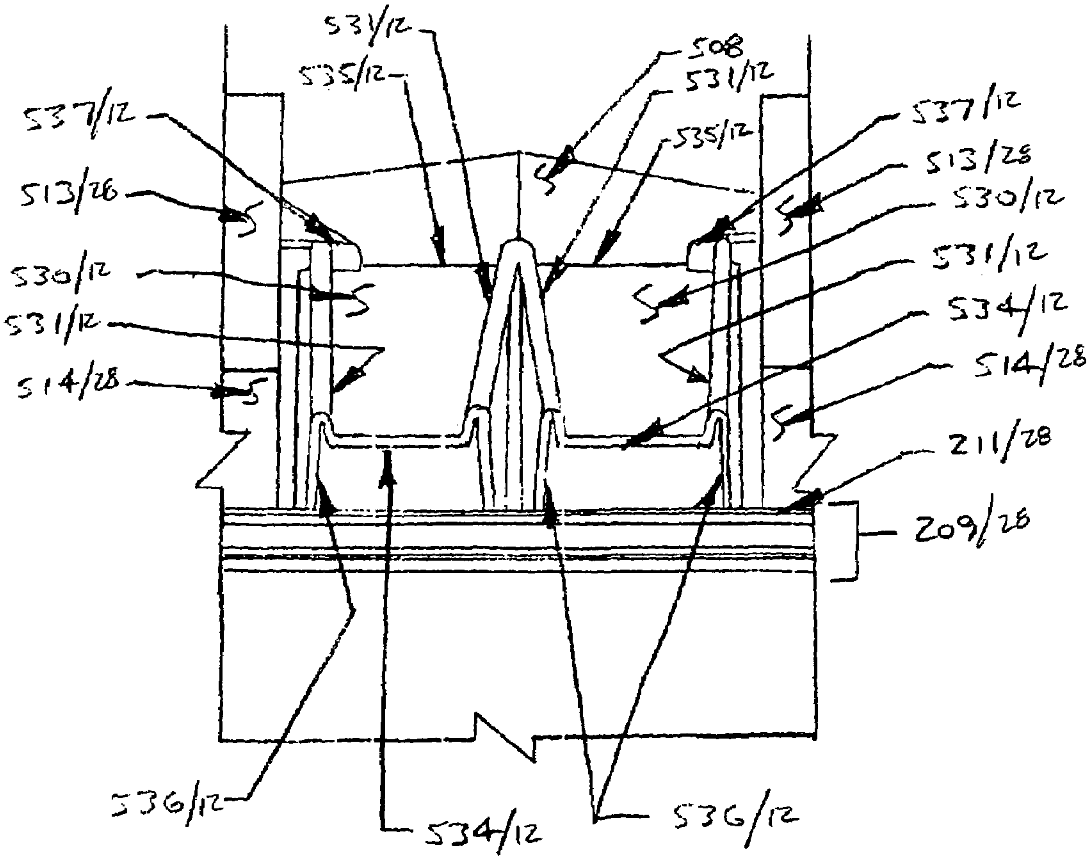
FIG. 36 is a partial panoramic elevation view of a portion of the pallet-container application conveying chute arrangement of FIG. 35, looking in direction 36-36 of FIG. 35, showing spatial relationship between chute and lip of installed container.
Figure 37:
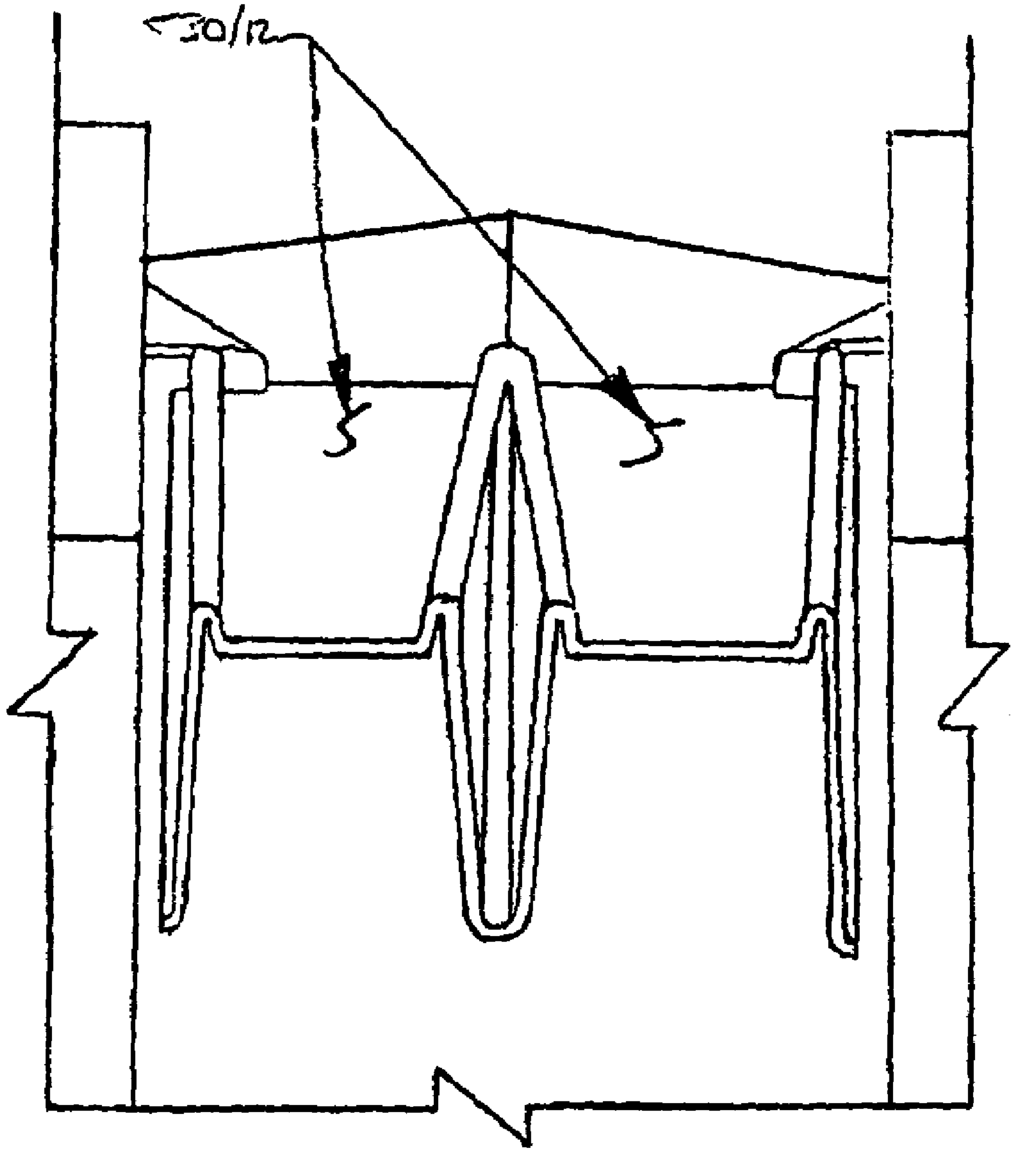
FIG. 37 is the same as FIG. 36, except with container removed, showing free, molded and trimmed state of chute.
Figure 38:
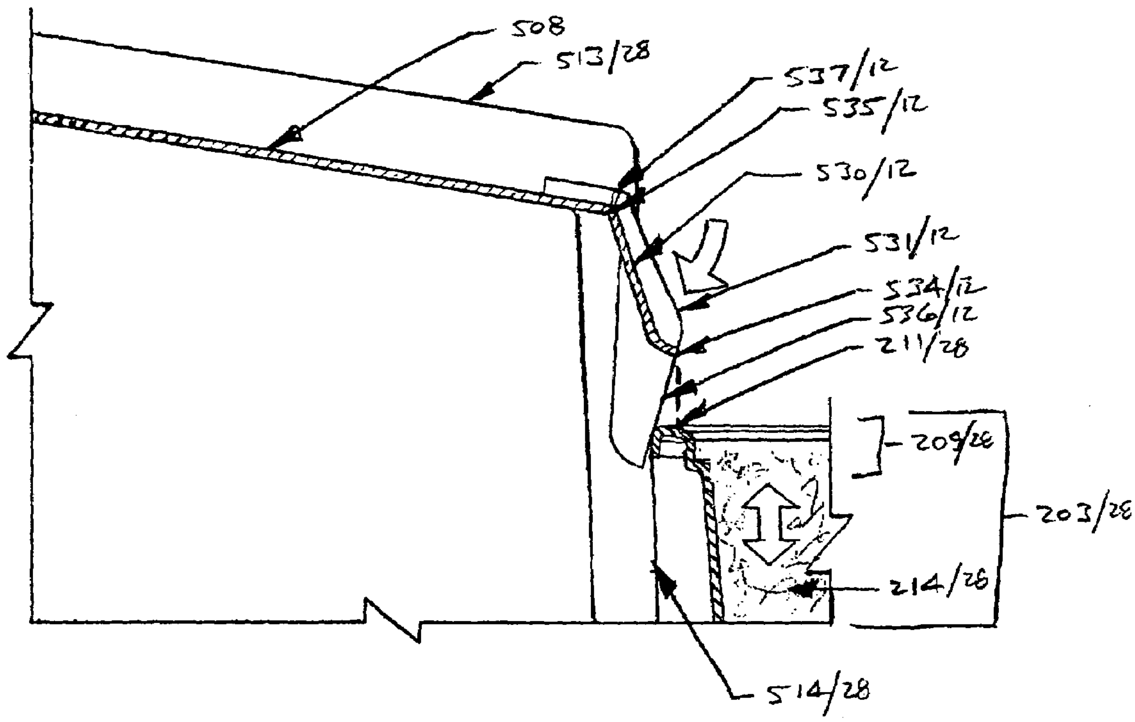
FIG. 38 is a section view of a portion of the pallet-container application conveying chute arrangement of FIG. 35, looking in direction 38-38 of FIG. 35, said view rotated clockwise 105 degrees from FIG. 35 section 38-38 projection, showing spatial relationship between chute and lip of a container installed in associated container receptacle.

Free molded and trimmed state of chute depicted in FIG. 32 demonstrates no hidden surfaces preventing vertical extraction from mold of molded pallet with chutes having segments 556/11 and 557/11.

FIGS. 35 through 39 illustrate a third embodiment of a pallet-container chute arrangement for conveying applications from funnel surface 504 of a pallet 502/28 into the open upper end of container under gravity, wherein arrangement comprises integral, single-segment, spring hinged, downward, radially inwardly sloped chutes 530/12 attached to funnel wall 504 along perimeter 535/12, the discharge ends 534/12 of which overhang lip 209/28 of an installed container 203/28.

Each of two adjoining, integral chutes 530/12 is substantially rigid and is coupled along its upper perimeter by a thinned wall 535/12, which is thinned by a groove on underside, forming an integral spring hinge. Lip 203/28 of container being installed into associated pallet container receptacle 509/12 contacts side walls 530/12 of chutes 530/12, driving chutes 530/12 to rotate downward about hinge 535/12, until uppermost surface 211/28 of container lip 203/28 passes to below discharge edges 534/12 of chutes 530/12, at which point container 203/28 becomes seated in receptacle 509/12. Spring action of hinges 535/12 causes chutes 530/12 to rotate back upward, placing discharge edges 534/12 of chutes 530/12 over container lip 209/28. A cam 536/12 is integral to and extends downward from each side wall 531/12 of chutes 530/12. Cams 536/12 are separated from water discharge perimeter 534/12 so that water discharge perimeter is locally the lowest point contacted by discharging water and such water will have no surface leading outside of the container to which to cling and thus be substantially spilled. Discharging water therefore, in a worst case, drips vertically from chute discharge perimeter 534/12 onto downwardly, radially inwardly sloped upper surface 211/28 of container lip 209/28 and splashes largely into container 203/28. On removal of container 203/28 from pallet container receptacle 509/12, container lip 203/28 contacts cam 536/12, causing chutes 530/12 to again rotate downward until clear of path of container lip 209/28.

Chute side walls 531/12 prevent water from spilling from chute sides. Folds 537/12 in chute side walls 531/12 facilitate spring joint flexibility while preventing water loss from chute sides.

Figure 39:
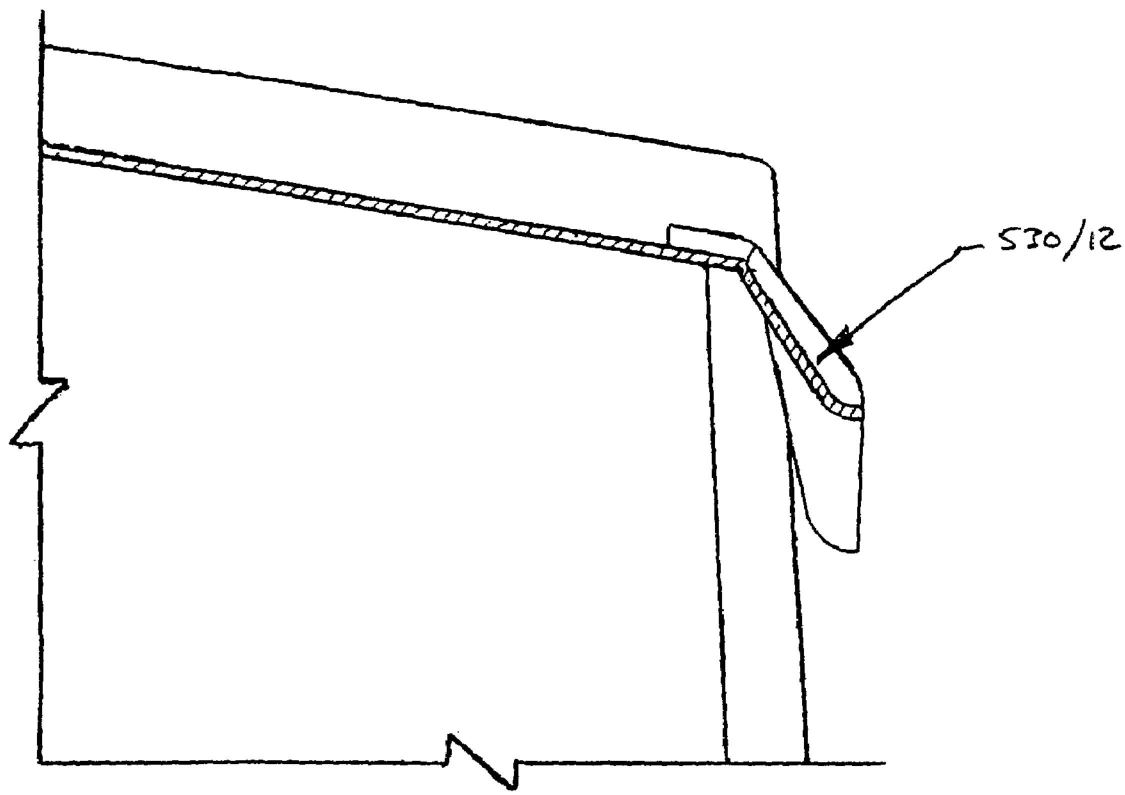
FIG. 39 is the same as FIG. 38, except with container removed, showing free, molded and trimmed state of chute.
Figure 40:
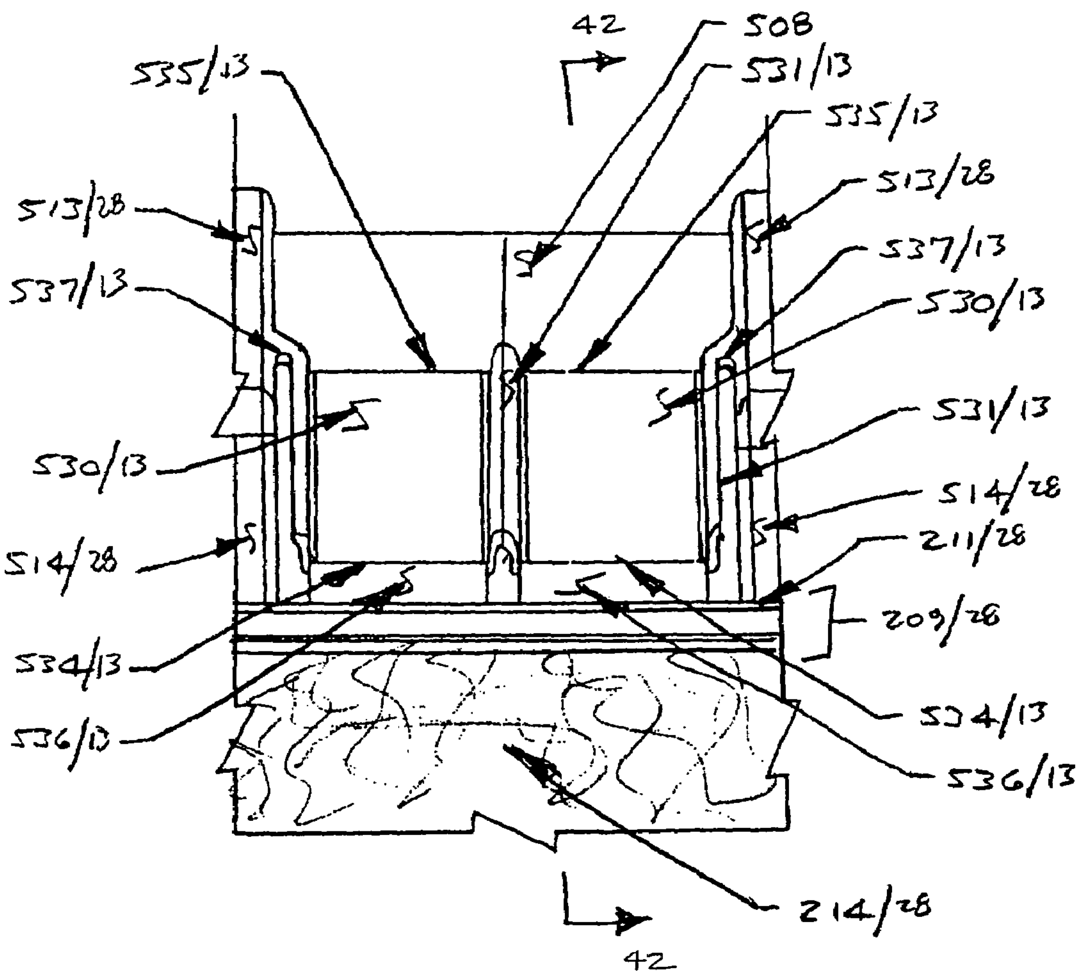
FIG. 40 is a partial panoramic elevation view of a portion of a fourth embodiment of a pallet-container application conveying chute arrangement, looking in direction comparable to 36-36 of FIG. 35, showing spatial relationship between chute and lip of installed container.
Figure 41:
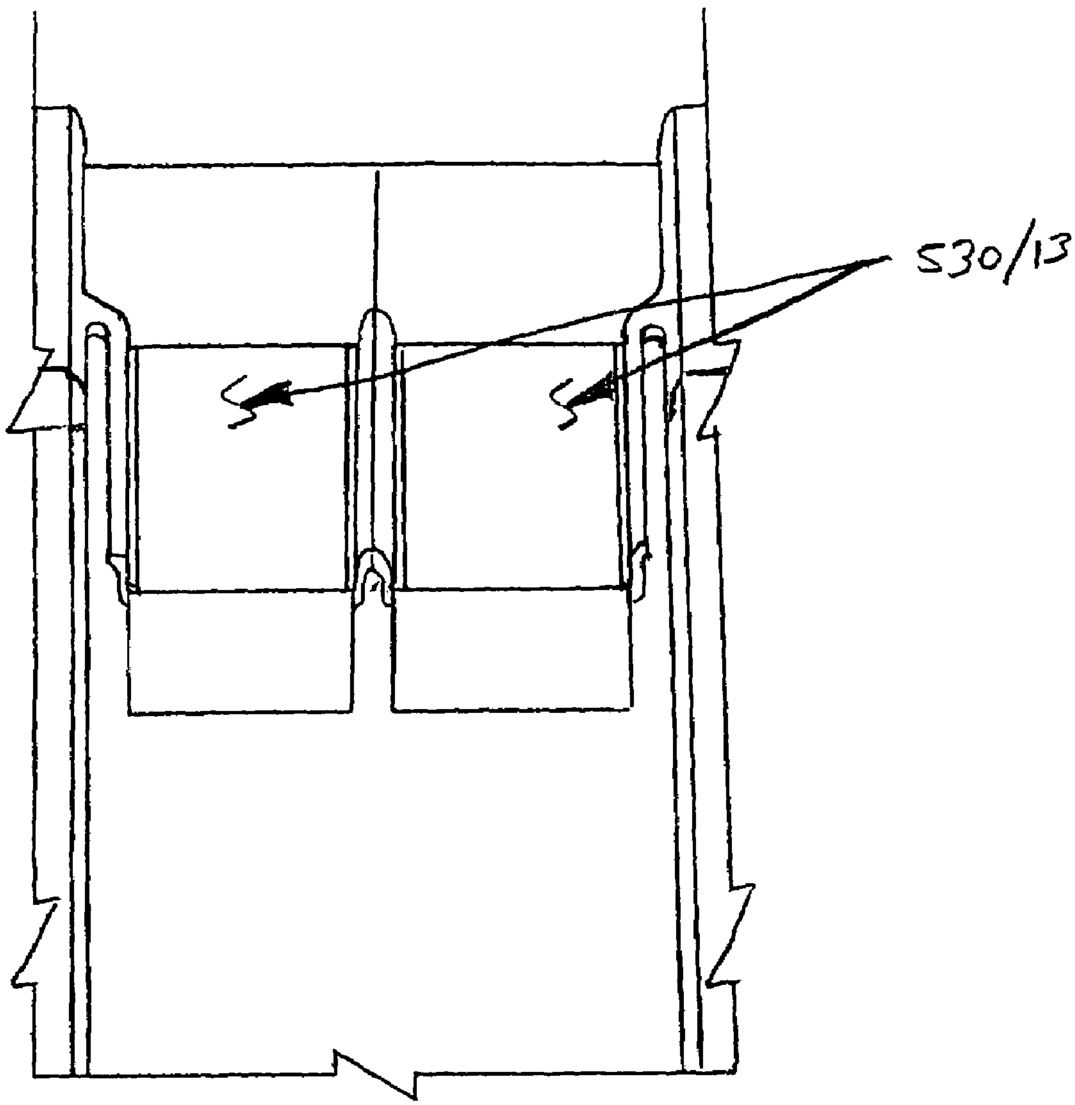
FIG. 41 is the same as FIG. 40, except with container removed, showing free, molded and trimmed state of chute

Free molded and trimmed state of chute depicted in FIG. 39 demonstrates no hidden surfaces preventing vertical extraction from mold of molded pallet with chutes 530/12.

FIGS. 40 through 43 illustrate a fourth embodiment of a pallet-container chute arrangement for conveying applications from funnel surface 504 of a pallet 502/28 into the open upper end of container under gravity, wherein arrangement comprises integral, single-segment, spring hinged, downward, radially inwardly sloped chutes 530/13 attached to funnel wall 504 along perimeter 535/13, the discharge ends 534/13 of which overhang lip 209/28 of an installed container 203/28.

Each of two adjoining, integral chutes 530/13 is substantially rigid and is coupled along its upper perimeter by a thinned wall 535/13, which is thinned by a groove on underside, forming an integral spring hinge. Lip 203/28 of container being installed into associated pallet container receptacle 509/13 contacts side walls 530/13 of chutes 530/13, driving chutes 530/13 to rotate downward about hinge 535/13, until uppermost surface 211/28 of container lip 203/28 passes to below discharge edges 534/13 of chutes 530/13, at which point container 203/28 becomes seated in receptacle 509/13. Spring action of hinges 535/13 causes chutes 530/13 to rotate back upward, placing discharge edges 534/13 of chutes 530/13 over container lip 209/28. A cam 536/13 is integral to and extends downward from discharge edges 531/13 of chutes 530/13. Cams 536/13, spring-loaded against and conforming in shape to outer edge of container lip 209/28, substantially seals against container lip 209/28, directing water clinging to cam 536/13 over container lip 209/28 into container 203/28. On removal of container 203/28 from pallet container receptacle 509/13, container lip 203/28 contacts cam 536/13, causing chutes 530/13 to again rotate downward until clear of path of container lip 209/28.

Chute side walls 531/13 prevent water from spilling from chute sides. Chute side walls 531/13 between adjoining chutes are preferably flexible and joined to one another to achieve a bellows-type effect, further averting spillage. Folds 537/13 in chute side walls 531/13 facilitate spring joint flexibility while preventing water loss from chute sides.

Figure 43:
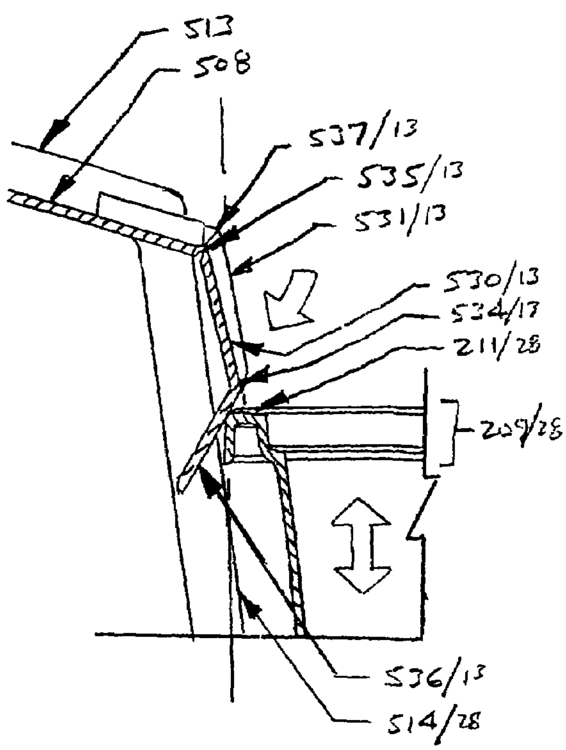
FIG. 43 is the same as FIG. 42, showing spatial relationship between chute and lip of a container installed in associated container receptacle.

Free molded and trimmed state of chute depicted in FIG. 43 demonstrates no hidden surfaces preventing vertical extraction from mold of molded pallet with chutes 530/13.

Figure 42:
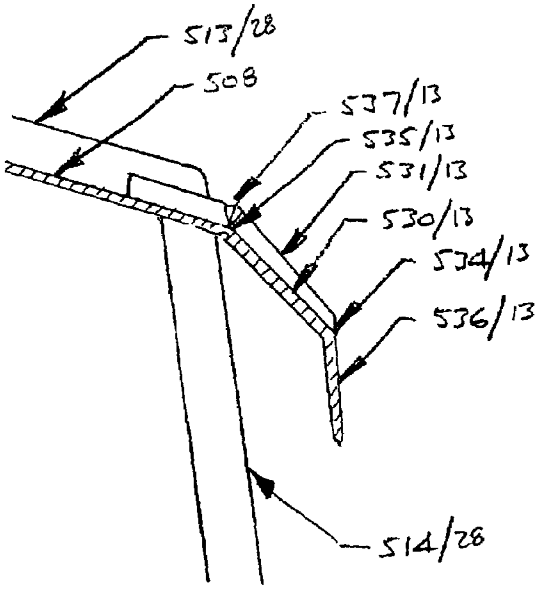
FIG. 42 is a section view of a portion of the pallet-container application conveying chute arrangement of FIG. 40, looking in direction 42-42 of FIG. 40, showing free, molded and trimmed state of chute.
Figure 44:
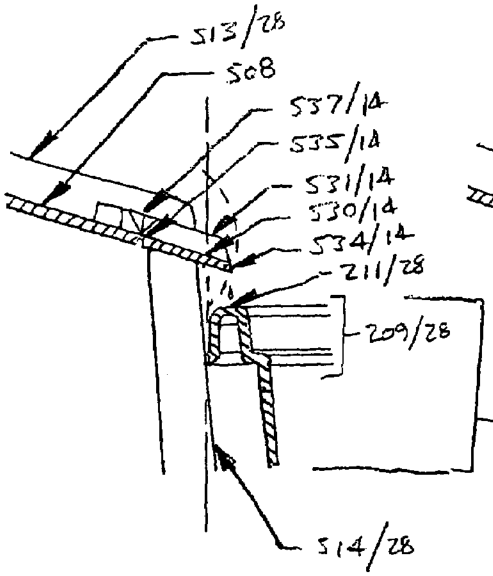
FIG. 44 is a section view of a portion of a fifth embodiment of a pallet-container application conveying chute arrangement, looking in direction comparable to 2-42 of FIG. 40, showing spatial relationship between chute and lip of a container installed in associated container receptacle.
Figure 45:
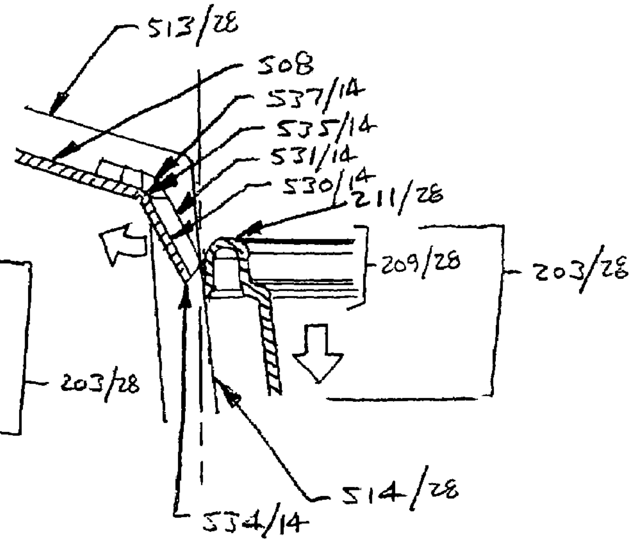
FIG. 45 is the same as FIG. 44, except with container being installed, showing chute downward and outward deflection on interaction with container lip.
Figure 46:
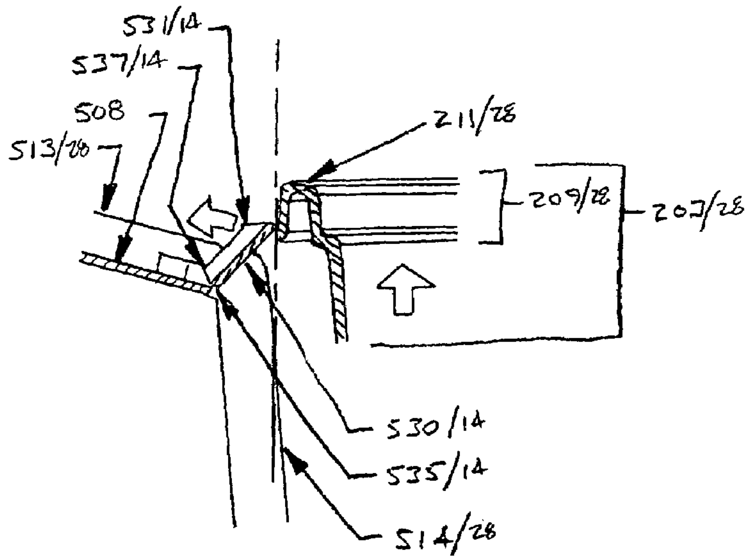
FIG. 46 is the same as FIG. 44, except with container being removed, showing chute upward and outward deflection on interaction with container lip.

FIGS. 44 through 46 are section views comparable to section 45-45 of FIG. 42 and illustrate a fifth embodiment of a pallet-container chute arrangement for conveying applications from funnel surface 504 of a pallet 502/28 into the open upper end of container under gravity, comprising an arrangement of integral, single-segment, spring hinged, downward, radially inwardly sloped chutes 530/14 attached to funnel wall 504 along perimeter 535/14, the discharge ends 534/14 of which overhang lip 209/28 of an installed container 203/28.

Each of two adjoining, integral chutes 530/14 is substantially rigid and is coupled along its upper perimeter by a thinned wall 535/14, which is thinned by a groove on underside, forming an integral spring hinge. Lip 203/28 of container being installed into associated pallet container receptacle 509/14 contacts side walls 530/14 of chutes 530/14, driving chutes 530/14 to rotate downward about hinge 535/14, until uppermost surface 211/28 of container lip 203/28 passes to below discharge edges 534/14 of chutes 530/14, at which point container 203/28 becomes seated in receptacle 509/14. Spring action of hinges 535/14 causes chutes 530/14 to rotate back upward, placing discharge edges 534/14 of chutes 530/14 over container lip 209/28. Discharging water, in a worst case, drips vertically from chute discharge perimeter 534/12 onto downwardly, radially inwardly sloped upper surface 211/28 of container lip 209/28 and splashes largely into container 203/28. On removal of container 203/28 from pallet container receptacle 509/12, container lip 203/28 contacts underside of chutes 530/14, causing chutes 530/14 to rotate upward until clear of path of container lip 209/28. On passage of container lip 209/28 clear of chutes 530/14, chutes 530/14 spring back to free, downwardly, radially inwardly sloped state.

Chute side walls 531/14 prevent water from spilling from chute sides. Chute side walls 531/14 between adjoining chutes are preferably flexible and joined to one another to achieve a bellows-type effect, further averting spillage. Folds 537/14 in chute side walls 531/14 facilitate spring joint flexibility while preventing water loss from chute sides.

Free molded and trimmed state of chute depicted in FIG. 44 demonstrates no hidden surfaces preventing vertical extraction from mold of molded pallet with chutes 530/14.

Figure 47:
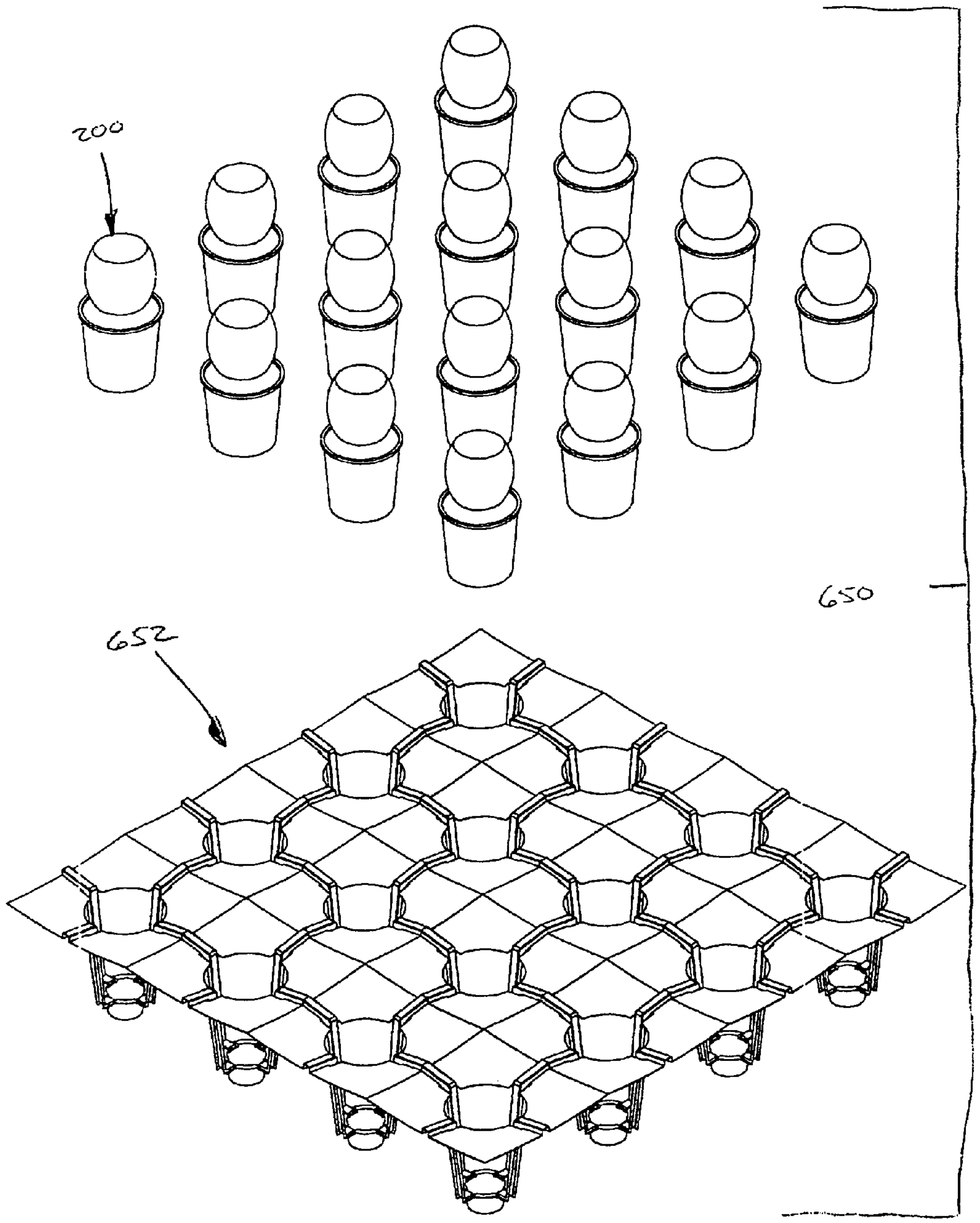
FIG. 47 is a perspective, exploded view of another embodiment of a spaced container (no. 1/trade gallon) pallet assembly, incorporating a pallet having funnels with square outer perimeters, which may incorporate have seal- or chute-based (shown) water conveyance from pallet upper wall into mounted containers.

FIG. 47 is a perspective, exploded view of a fifth embodiment of a spaced container pallet assembly 650, incorporating a pallet 652 having square funnels.

Figure 48:
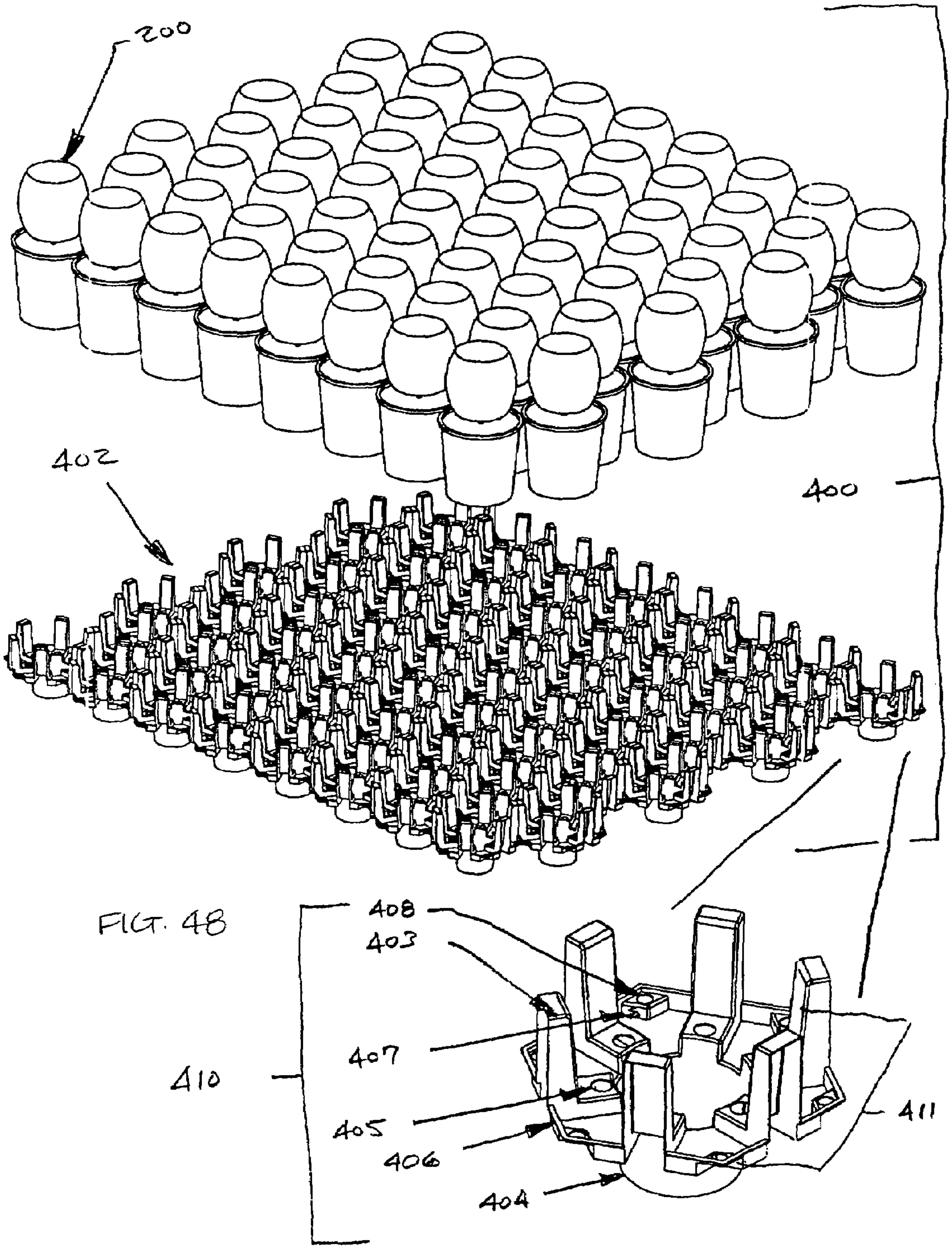
FIG. 48 is a perspective, exploded view of another embodiment of a contiguous container (no. 1/trade gallon) pallet assembly, incorporating a pallet of low height relative to container and having circular arrays of relatively slender upward protrusions forming sides of container receptacles.

In a contiguous-container pallet assembly 400/2 of a second embodiment shown in FIG. 48, containers 203 of containerized plants 200 are held substantially rigidly upright, in a horizontal two-dimensional array of container receptacles 410/2 integral to contiguous-container pallet 402/2, wherein lips 209 of adjoining containers 203 are mutually contiguous. FIG. 48 depicts such a pallet 402/2 having an array of eight rows of eight container receptacles 410/2 each, though other combinations of numbers of rows and container receptacles are certainly within the spirit of this invention. Pallet 402/2 comprises a generally planar horizontal body having substantially vertically upwardly protruding container stabilizing beams 403/2, substantially vertically downwardly protruding pallet/container support columns 404/2, container lifting access holes 405/2, and drain holes 408/2. Container stabilization beams 403/2 are arranged in symmetric patterns about vertical axes and form container receptacles 410/2. Pallet/container support columns 404/2 in the first embodiment are centered in container receptacles 410/2 and support pallet 402/2 and containers 203 of containerized plants 200 elevated a relatively short distance above surface on which pallet 402/2 is seated, providing for lifting fork 1142 or 1657 access. Such elevation further reduces potential of water standing beneath pallet assembly 400/2 to adversely impact supported containerized plants 200. Container stabilization beams 403/2 also act as pallet stiffening ribs extending between adjoining container receptacles 410/2. Contiguous-container pallet 402/2 further incorporates an integrally formed drip pan 411/2 for holding contents 412/2, typically excess irrigation or rainwater, with its free surface below the bottom of the mounted plant container 203. Drip pan 411/2 incorporates dike walls 406/2 that segregate drip pan contents 412/2 beneath each mounted containerized plant 200, preventing cross contamination of drainage between containerized plants 200. Level of free surface 409/2 of contents 412/2 in each drip pan 411/2 is upwardly limited by drain holes 408/2 through riser portions 407/2 the tops of which are at the desired elevation of free surface 409/2 of the drip pan contents 412/2. Lifting access holes 405/2 are disposed similarly to those incorporated in spaced-container pallet grid 600 described above, enabling containers 203 of containerized plants 200 to be lifted from beneath in the process of installing containerized plants 200 in pallet assemblies 400/2 and removing containerized plants 200 from pallet assemblies 400/2. Integral drip pan 411/2 also provides benefits substantially the same as those of spaced-container pallet grids 450 and 600 described above.

Pallets are preferably molded as single pieces of commodity plastic, e.g., high-density polyethylene (HDPE), polyethylene terephthalate (PET) or polyvinyl chloride (PVC). Post-consumer or post-industrial recycled waste can be utilized to reduce material costs to the extent associated material savings are not offset by increased costs of reduced manufacturing process reliability. Molded plastic pallets, grids and grid/water reservoirs may be thermoformed or injection molded. Thermoformed pallets may further be of coextruded sheet, enabling incorporation of a relatively thin, sunlight reflective, white or equivalent pallet wall upper layer combined with a relatively thick, carbon black-loaded pallet wall lower layer as an ultraviolet light protected, durable structural layer. Thermoforming may further be combined with upstream in-line sheet extrusion for reduced material and energy costs. Thermoforming lends itself best to thin-wall, generally planar products like subject pallets, grids, and grids/water reservoirs, though necessitates a subsequent trimming operation for separation of parts from plastic processing support skeletons and for blanking holes in parts as needed. Area-specific partial compression molding is preferably incorporated into thermoforming process to achieve close-tolerance and other reduced wall thickness where necessary, e.g., grooves producing spring hinges for pallet chutes and perimeters of walls to be trimmed to reduce wear rate of trimming tooling. Increased reflection of sunlight adds a substantial portion of reflected sunlight to proximal plant foliage while simultaneously substantially reducing heating of mounted container sides and surrounding areas. Sunlight addition to foliage potentially increases photosynthesis and corresponding plant growth rate. Reduced container heating corresponds to reduced heating of roots proximal to container sides and to reduced rate of container soil dehydration, thereby increasing container soil spatial and temporal moisture consistency and associated root health.

Injection molded pallets, grids, and grids/water reservoirs have the benefit of allowing use of lower-cost grades of a given generic material, combined with better wall thickness control. However, more material is typically used for a given part, compared with thermoforming, and pallet material would be largely homogeneous by the nature of the process. Consequently, a carbon black-loaded pallet would be molded and subsequently have a sunlight reflective white coating applied to its upper side.

Pallets, grids, and grids/water reservoirs may also be formed and blanked out of sheet metal. Corrosion resistance and sunlight reflectivity would either be inherent in the material or be achieved through the addition of suitable coatings.

Containers, much like pallets, are preferably molded as single pieces of commodity plastic. However, most common container materials accepted in the industry are high-density polyethylene (HDPE) and polypropylene (PP). Molded plastic containers may be thermoformed, blow molded or injection molded. Thermoformed containers may further be of coextruded sheet, enabling incorporation of a relatively thin, sunlight reflective, white or other color container wall outer layer, combined with a relatively thick, carbon black-loaded container wall inner layer as an ultraviolet light protected, durable structural layer. Other discussed thermoforming characteristics applying to pallets also apply to containers.

Blow molding of frustal, open-top containers usually involves extrusion/blow molding of a barrel, which is subsequently cut into two similar halves—each substantially a container—in a trimming process. Extrusion/blow molding process necessitates injection by a nozzle of high-pressure air into one end of a parison tube sandwiched between two female blow mold halves the insides of which together are in the shape of the subject barrel. Thus, a hole in the center of the bottom of one of every two containers produced by a conventional extrusion/blow molding process is a natural result. Therefore, feasibility of one variant of a container having soil reduced dehydration rate zone, as described earlier, is limited with an extrusion/blow molded container.

Injection molded containers have the benefits and limitations described for injection molded pallets and grids/water reservoirs.

Automation System

The substantial gain in stability of position and orientation of containerized plant material offered by incorporation of such plant material into pallet assemblies 300, 400 and 500, and the relatively recent development of real-time kinematic global positioning system (RTK GPS) technology gives rise to automation as illustrated in FIGS. 1 and 49 through 76 that is in accordance with the invention. RTK GPS is a satellite-plus land-based precision position measuring system accurate to within 10 millimeters horizontally and 20 millimeters vertically—suitable for automated positioning of one or more pallet assembly field transfer units (PAFTU's) 1100, pallet assembly transport trains (PATT's) 1200, and pallet assembly greenhouse transfer units (PAGTU's) 1300. Accuracy of positioning system, with assistance by strategically located machine sensors, is sufficient to enable system-required interaction between PAFTU's and/or PAGTU's, PATT's, and a stationary pallet assembly/disassembly system (PAS) 1500, as in a large horticultural nursery environment.

RTK GPS as a position determination means does not necessarily preclude incorporation of supplemental position measuring systems, e.g., inertial navigation, laser-based, wire-in-ground or magnet-in-ground systems, on which machine controls rely in few locations where line of sight between subject machine and GPS satellites as required for GPS operation is not achievable, e.g. when machine is operating below a roof. Also, strategically placed, supplemental proximity or equivalent sensors in heads of or elsewhere on machinery typically provide fine position sensing of pallet and/or interacting machine edges, surfaces, and/or the ground, to facilitate proper interaction. Autonomous machinery also incorporates safety systems such as infrared, vision, and/or motion detection sensors to ensure machinery work area is properly cleared of personnel and other safety concerns while machinery is actively working.

Pallet Assembly/Disassembly System (PAS)

A first embodiment of a pallet assembly/disassembly system (PAS) 2000 is shown in FIGS. 1, 49 and 50. PAS components are shown in FIGS. 55-61. This system comprises: a pallet assembly central transfer unit (PACTU) 5000; two pallet assembly/disassembly units (PAU's), 2100(1) and 2100(2), each with three integral PC's; two pallet & grid stacking/de-stacking units (PGSU's) 4500(1) and 4500(2); two containerized plant spacing conveyors (CSC's) 1660(1) and 1660(2); two pallet & grid rotating units 5500(1) and 5500(2), a pallet/grid washing unit (PGWU) 5700; a multi-level pallet/grid stack accumulator (PGSA) 3500 with integral pallet conveyors (PC's); a PC line conveying pallets, grids, pallet assemblies, pallet stacks and grid stacks among PAS 2000 components and through a semi-automatic weeding area 2010.

The preferred implementation of such an automated system of machinery and pallets involves integration of machine controls with the following computer-based systems: plant material growth process database; nursery inventory and sales order scheduling and control system; and nursery financial control system. Plant growth process includes bills of materials, ideal plant material start time (month), start configuration (plug, clipping, etc.), irrigation schedule, fertilizing schedule, container upsizing schedule, growth duration for designated canopy size/shape, pruning schedule, etc.

Conveyors, General, Physical Description

A preferred embodiment of construction of conveyors employed for handling pallet stacks, pallets, pallet assemblies, and containers is as described herein.

Conveyors may of the belt/slider bed, belt/roller bed, or synchronous belt-driven closely spaced, small-diameter roller variety for smooth operation.

Conveyor belt of each belt type conveyor is composite, comprising multiple, closely laterally spaced synchronous belts 1527 for positive composite belt surface positioning and belt lateral "walking" elimination. Synchronous belt teeth of belt-type conveyors may also face up and, thus, provide the conveyed item support surface as conveyor motion is controlled to eliminate slip between belt. Compared to downward-facing, bed-contacting, sliding belt teeth, wear rate of upward facing belt teeth is substantially lower. Further, belt can incorporate low-friction backing, still further reducing belt wear rate.

Roller-type conveyors incorporate relatively closely-spaced, relatively small-diameter bed rollers as necessary for relatively small-width pallet support columns to smoothly span gaps between bed rollers as pallets are conveyed by such a conveyor.

Each conveyor incorporates programmable, numerically controlled servo positioning, determined by a master control system sequence for the active PAS 1500 operating mode. Such controls also provide programmable velocity, acceleration, and jerk control, providing for even smoother operation, consequently virtually eliminating slip between composite belt and conveyed items, resulting in accurate positioning of such items by composite belt while allowing for high-speed operation. All conveyors operate reversibly and do so as required for PAS 1500 operating mode. Controls also provide for conveying surface on each side of a transition between adjoining, interacting conveyors to move at the same speed while conveyed items are in simultaneous contact with both surfaces, still further promoting slip-free contact between conveyor belts and conveyed items, thereby maintaining high positioning accuracy of conveyed items. Each conveyor incorporates relatively small head and tail sprockets, allowing close spacing of tandem adjoining conveyors, which provides for stable transitioning of relatively small conveyed items between same. Each conveyor also has a relatively large diameter, elongated sprocket driving the composite belt on the return belt layer generally between head and tail rollers, facilitating drive of relatively large conveyed items while promoting long belt life. Drive sprocket is flanked by idler rollers that provide requisite composite belt tensioning and drive sprocket wrap angle. Composite belt drive sprocket is typically coupled to a servomotor through a drive train, comprising a drive train sprocket directly coupled to the composite belt drive sprocket, which, in turn, is driven by a gear belt, which, in turn, is driven by a second drive train sprocket, which, in turn, is coupled to a servomotor or servo gear motor, as load dictates. Frame of servomotor/gear motor, as applicable, is fastened to framework against which servomotor/gear motor reacts on imparting torque necessary to move composite belt.

As is typical in heavy-duty, precision positioning conveyor construction, all substantially continuously operating rotating joints incorporate rolling element, e.g., ball, bearings for repeatability. Such bearings are preferably sealed for long life. Use of belt construction provides the benefit of minimal system backlash while offering long life without the need for lubrication. Thus, conveyor accuracy is maintained with minimal system maintenance. Sealing of bearings encloses lubrication within bearing, minimizing tendency of lubricant to attract bearing-life-reducing contamination. Absence of exposed lubricant further promotes a long-lasting clean machine appearance.

Programmable servo conveyor belt positioning controls also provide for capture of the position of an item on conveyor relative to the strategic position along conveyor of an ancillary sensor, e.g., a photoelectric sensor, a narrow beam of which crosses laterally above the belt and is broken by a passing conveyed item, indicating detection of such item. A digital representation of belt position is reflected through the drive train by the servomotor shaft angle measuring device—typically a resolver with digitizing circuitry, or an encoder. Actuation of conveyor belt causes to move an item initially having an unknown position, enabling a leading or trailing edge of such conveyed item passing such sensor to cause sensor to change state, signaling control system. Control system, knowing geometry of conveyed item based on an active record obtained from a maintained database, and knowing sensor position on conveyor, thereby establishes position of conveyed item on receipt of sensor signal. Once position of item is established on a first conveyor, comparable programmable servo positioning controls of subsequent conveyor belts and related item manipulators compute, and, thus, reliably track item position as item progresses through PAS 1500, with subsequent item presence detection sensors employed only for item position verification and minor compensation, if necessary.

Unless otherwise described, conveyors are situated in metal—formed/welded/painted/bolted steel or bolted extruded aluminum—framework that fixes conveyor to ground or an adjoining frame.

Most PC's of first embodiment of PAS 1500 are at least twice the width of the widest pallet, 302, 402, or 502, grid 800 or grid 600 the PAS 1500 is configured to process, in order to convey two of such items closely laterally spaced. CPC's 1660 and 1660' are of width sufficient to convey containerized plants in the largest diameter containers desired to be processed by PAS 1500.

Item (Pallet Assembly, Pallet/Grid/Containerized Plant/Tray/Flat) Manipulator Carriages, General Each manipulator carriage in the PAS 1500, unless otherwise specified, is constructed generally as described herein.

Each manipulator carriage incorporates programmable, numerically controlled servo positioning determined by a master control system sequence for the active PAS 1500 operating mode. Such controls also provide programmable velocity, acceleration, and jerk control, providing for even smoother operation, resulting in accurate positioning of such carriages while allowing for high-speed operation.

Each manipulator carriage in the first embodiment of the PAS 1500 moves linearly relative to other manipulator carriages or framework to which subject manipulator is attached. Relative motion between two manipulator carriages or between a carriage and a fixed frame is accommodated preferably by a cam follower bearing arrangement on the shorter of the two carriages, or of a carriage and frame, in the direction of motion, such cam follower bearing arrangement movably attached to a complementary track on the longer. Such motion is typically driven by a servomotor, the frame of which is typically mounted to the shorter of the two carriages—or of a carriage and frame, as applicable—in the direction of motion. The shaft of the subject servomotor (or servo gear motor, as the load dictates) typically mounts a sprocket, which, in turn, drives a gear belt, which, in turn, is fixed at its ends proximal to the opposing ends of the longer carriage. A pair of idler rollers provides for requisite wrap angle and tensioning of belt around sprocket and any long horizontal stretches of belt in contact with a support surface to substantially mute belt vibration.

Alternately, servomotor frame can be mounted to the carriage/frame containing the track for a movably connected carriage. A timing belt loop between two sprockets proximal to the ends of the subject track and movable carriage incorporates a clamp that is fastened to one of the timing belt legs. The shaft of the driving servomotor (or servo gearmotor) may be mounted to one of the loop end sprockets, or to a separate drive sprocket with flanking idler rollers on the unclamped leg of the loop. Also, two carriages mirroring one another may be driven simultaneously by this alternate arrangement simply by clamping one carriage to one leg and the other carriage to the other leg. These are a couple examples of the use of timing belts and sprockets.

Each substantially slender carriage that must move relatively perpendicularly to its long side and which is geometrically limited to minimal spacing of bearings in direction of travel necessitates coordination in movement between its ends with greater mechanical advantage than that offered by suggested bearing arrangement. In such case, a drive/synchronization shaft extending the length of the carriage may be incorporated into the drive train. A sprocket and belt arrangement like that described immediately above, is incorporated at each end of the drive shaft. In a convenient location along the drive shaft, preferably near the center for drive shaft torsional stiffness balance, is mounted a third sprocket, which is coupled to and driven by a third gear belt, which is, in turn, coupled to and driven by a fourth sprocket, which is mounted to and driven by the shaft of a servomotor or servo gear motor, as load dictates, the frame of which is fastened to the slender carriage. A rotary shaft coupling may be incorporated into the drive shaft near the third sprocket to facilitate change of the third timing belt. Bearings situated proximal to each sprocket and the rotary shaft coupling mount the drive shaft to the slender carriage. Such an arrangement is comparable to rack-and-pinion assemblies coupled to the ends or a long rotary shaft.

Flexible cable carriers, connected between carriages sharing a track/cam follower bearing arrangement, provide for delivery of electrical and fluid power and signals required by nested carriages. Any one of strategically located belt break sensors, on detecting a broken belt, signals control system, which automatically executes an appropriate emergency stop algorithm for the situation and presents audible and visual alarms that queue facility maintenance personnel to resolve issue.

As is typical in heavy-duty, precision positioning machinery, all substantially continuously operating rotating joints preferably incorporate rolling element, i.e., ball, bearings for repeatability. They also are preferably 'permanently' sealed for long life. Use of belt construction provides the benefit of minimal system backlash while offering long life without the need for lubrication. Thus, machine accuracy is maintained with minimal system maintenance. Bearing lubrication fittings can be provided at customer direction.

Programmable servo positioning controls provide for coordination of relative motion between two or more servo controlled carriages, enabling nested carriages to move in desirable paths relative to fixed space or one another, thus, achieving objectives not achievable without such coordination, and difficult with manual intervention. A digital representation of carriage position is reflected through the drive train by the servomotor shaft angle-measuring device—typically a resolver with digitizing circuitry, or an encoder. A 'home' limit switch/sensor, typically mounted proximal to one end of track on which carriage operates, is incorporated with servo positioning systems that utilize an incremental quadrature encoder or equivalent pulse train generator with internal pulse counter for carriage position determination. These features are all typically accommodated in today's motion control systems.

Linear timing belt-driven motion manipulator carriages that are driven at fixed inclined angles (including vertical) each typically incorporate a 'counterbalance' pneumatic cylinder. A 'counterbalance' pneumatic cylinder, as specified here and in several other vertical motion applications forming parts of this invention, is a pneumatic cylinder connected to a first machine element—a carriage or frame—and having a movable piston attached to a second machine element, where one machine element moves in part vertically relative to other machine element. Force applied by compressed air to side of cylinder piston that acts to lift inclined moving machine element provides for substantial cancellation of the effects of gravity on such machine element while other machine element is either stationary or moves in horizontal plane in a gravitational or other body force-producing field. Typically, piston side of cylinder that acts to lift inclined moving machine element is ported to a closed tank of compressed air, such tank having volume substantially greater than that of cylinder to avert unnecessary compressed air consumption while providing for minimal pressure variation as piston traverses cylinder, changing combined closed volume of compressed air. This allows for reduced motor/drive sizing and reduced mechanical energy waste, relative to a non-counterbalanced system, to accomplish a given task involving inclined motion.

True mass-based counterbalancing may be incorporated in relatively massive machine elements that to not move in consistent directions relative to a body force-producing field.

Linear motion manipulator carriages that are driven at inclined angles each also typically incorporate a failsafe brake device that is automatically applied with the removal of power to it, in an 'emergency stop' situation, or with detected breakage of a related carriage drive belt. Such a brake freezes the position of an inclined manipulator carriage relative to the carriage or frame to which the inclined carriage is directly movably attached, typically through a cam follower bearing/track arrangement.

Typical manipulator is constructed of metal—formed/welded/painted/bolted steel or bolted extruded aluminum—framework.

The aforementioned drive techniques are merely examples. Those skilled in the art readily appreciate the myriad of drive type possibilities suitable for given tasks, which may involve hydraulics, strict electric, pneumatic, mechanical (wedges/cams, levers, cranks, screws, etc.)

Pallet Assembly Transport Train (PATT)

A first embodiment of a pallet assembly transport train (PATT) 1200, shown in FIGS. 55-56, comprises an autonomously guided traction unit 1202 typically towing one or more trailers 1222/1, 1222/2 in tandem with one another. PATT 1200 traction unit 1202 incorporates: servo positioning traction drives 1203 driving traction wheels 1204; a servo positioning steering assembly drive 1207; a PATT 1200 microprocessor-based programmable control system 1210, with RTK GPS-capable receiver 1211, GPS base station error correction signal radio antenna 1216, GPS satellite antenna 1212 and, optionally, second GPS antenna 1214; prime mover 1209; several removable, adjustable-height plant material transport decks (4 shown, 1239, 1240, 1241, 1242); lightning rods 1230 and grounding electrodes 1231; a forward warning illuminated beacon 1232; headlights 1234; a personnel/obstruction detection safety sensor 1235; and, trailer coupling 1223. PATT 1200 trailer 1222 incorporates a front coupling/tow bar 1224 and thereby-driven steering assembly 1225 mounting two freely rotating front support wheels 1227; two fixed-direction freely rotating rear support wheels 1228; several removable, adjustable-height plant material transport decks (4 shown, 1243, 1244, 1245, 1246); rear coupling/tow bar 1223; and, lightning rods 1230 and grounding electrodes 1231. Last trailer (1222/2 shown) of PATT 1200, further incorporates rear, illuminated safety beacon 1233.

In first embodiment of PATT 1200, each traction drive 1203 comprises a servo gearmotor coupled to a corresponding traction wheel 1204 through a synchronous belt/sprocket set. Belt/sprocket set are shrouded for safety. PATT 1200 steering drive 1207 similarly comprises a servo gearmotor coupled to a steering assembly 1205 arcuate segment member that swivels about a vertical axis centered between two steering wheels 1208. Further, a steering belt break sensor, combined with two side-by-side steering belts, provides steering redundancy, enabling PATT to be safely stopped upon detection of steering belt breakage.

PATT 1200 RTK GPS-capable receiver 1211, receiving GPS satellite radio signals via two spaced GPS antennas 1212 and 1214 and an RTK GPS error correction signal from system base station 112 via radio antenna 1216, determines PATT 1200 position, and control system 1210, interacting with GPS receiver 1211, subsequently determines heading and attitude of PATT 1200.

PATT 1200 must also operate beneath a roof, where PAS 2000 resides, and where GPS satellite signals may not. Thus, PATT also incorporates a supplemental guidance system, based on buried wire or magnets, laser-reflector, inertial navigation, or dead reckoning techniques commonly used for autonomously guided vehicle guidance. PATT control system switches position sensing systems at predefined locations where two position sensing systems are both effective, ensuring PATT is constantly aware of its position throughout its operating domain.

PATT control system 1210 includes memory and permanent storage in which reside data and control algorithms pertaining to PATT 1200 operation. Data residing in PATT control system 1210 may include: geometry, configuration and operational status of PATT 1200; layout—including topography—of nursery in which PATT 1200 operates (particularly paths on which PATT 1200 operates); restrictions, e.g., area reduced speed limits; and, historical information, e.g. earlier detected PATT path topological aberrations, etc. Control algorithms include servo traction and steering drive position and speed loops, turn maneuvers, positioning maneuvers for loading and unloading, emergency stop sequences, communication link loss sequences, responses to human-machine interface (HMI) manual control inputs, etc.

Master control system 113, residing at base station 112 of FIG. 1 likewise includes memory and permanent storage in which reside data and control algorithms, though on a higher, supervisory control and data acquisition (SCADA) level than that of PATT 1200. Master control system 113 data pertaining to a given PATT 1200 may include: PATT 1200 task queue; PATT 1200 operational status, e.g., master control system 113—PATT 1200 communication link status, PATT 1200 current position, speed, command responses/deviations, energy/fuel remaining, PATT 1200 maintenance calendar, etc. Master control system 113 algorithms pertaining to PATT 1200 include: PATT 1200 destination coordinates generation, PATT 1200 operation scheduling/timing/traffic control, inventory control, PATT 1200 productivity determination, primary HMI, nursery administrative computer system interaction, PATT 1200 algorithm updates, and system monitoring and fault processing, etc.

PATT 1200 normally operates in automatic mode wherein it follows predefined, computer-generated paths for carrying palletized plant material between loading and unloading points comprising pallet assembly central transfer unit 5000 (PACTU, described below) load/unload point of PAS 2000, a field growing area, a load/unload point proximal to a relatively small, inaccessible greenhouse, potentially inside a larger greenhouse, or some combination of those. Periodically, PATT's 1200 must transport stacks of pallets and, potentially, grids, between field- and/or greenhouse-based storage areas and PACTU 5000 load/unload point of PAS 2000.

PATT 1200 may also be operated in manual mode wherein it responds to inputs from an operator via a cable- or radio-linked HMI. An attachable seat may be provided for operator to safely ride on PATT 1200 while manually piloting it.

PATT 1200 depicted is battery-powered and incorporates electric, programmable servo drives (servo amplifier/motor packages) for actuation. Actuation could alternately comprise servo valve-controlled hydrostatic transmissions and have a diesel or gasoline engine as a prime mover. An alternator coupled to subject engine of a primarily hydraulically driven machine supplies electric energy to electric functions.

Electric primary drives offer a means to readily return PATT 1200 kinetic energy to potential energy, i.e., recharging battery through servo traction motor generation action during deceleration of PATT 1200, with minimal losses to thermal energy, resulting in a relatively efficient system, i.e. one requiring relatively the least amount of energy, i.e., operating expense, to travel a given distance with a given load.

Incorporation of positioning servo drives as traction drives provides PATT 1200 with an ability to sense and thereby minimize traction wheel slip, increasing PATT 1200 traction drive efficiency and reducing potential for PATT 1200 path rut development, particularly during wet PATT 1200 path conditions.

GPS-based positioning and a central, artificially illuminated, PAS 2000 also enables system to operate without light, i.e., at night. Lightning rods 1230 and associated grounding wiring and electrodes 1231 reduce risk of damage to PATT 1200 by a stroke of lightning, facilitating operation of PATT 1200 in a thunderstorm, thereby still further increasing system productivity.

Pallet Assembly Central Transfer Unit (PACTU)

Note that while most linear track rails throughout invention are shown as simple bars, structure of rails and bearings following them incorporates elements, typically rolling, that prevent normal separation of bearings from track rails, regardless of direction of force applied to bearings.

A first embodiment of PACTU 5000, shown in FIGS. 49-54 and 57-58F, is effectively a gantry-based automated forklift, comprising moving nested carriages of which are situated generally above PC's 5001 and 5002 of FIGS. 57-58F. PACTU automatically transfers PA's 300, 400 or 500, as applicable, between a PC 5001 or 5002 and proximally positioned PATT 1200.

PACTU 5000 comprises two stationary frames comprising risers 5011, 5012, 5021 and 5022, and lateral beams 5013 and 5023, with three progressively nested, mutually orthogonal, linear motion carriages culminating in a pallet assembly fork 5400. Frame lateral beams 5013 and 5023 incorporate track rails 5014 and 5024 traversed by a relatively slender overhead bridge (first carriage, 5050), which is sufficiently high to provide for passage beneath of a loaded PATT 1200. Bridge 5050 is perpendicular to PC line it spans and is of sufficient length to span: a PATT 1200 positioned parallel to and in close proximity to PC line; PC 5001 or 5002; and a parking lane for PACTU successive carriages nested below, including PACTU fork 5400. Four frame riser supports 5011, 5012, 5021, and 5022, extending from ground are situated in four corners of frame.

PACTU bridge 5050 is movably attached to stationary track rails 5014 and 5024 on frame. Bridge 5050 further incorporates a horizontal second linear track 5070, along length of bridge 5050, to which a second carriage 5100 is movably attached.

PACTU second carriage 5100 is movably attached to bridge track 5070, providing for movement along bridge 5050 of second carriage 5100. Second carriage 5100 may further incorporate a swivel bearing 5108 and drive servo gearmotor 5104 providing for rotation of a third carriage (lift mast) 5150 about a vertical axis. Third carriage 5150 incorporates vertical linear track 5153, to which a fourth, carriage 5200 (lift stage 1) is movably attached.

PACTU fourth carriage 5200 (lift stage 1) is movably attached to PACTU third carriage 5150 and incorporates a bearing track arrangement 5205 movably attached to PACTU fifth carriage 5250 (lift stage 2), which mounts PACTU fork 5400. Hydraulic cylinder 5155, with its butt attached to third carriage 5150 and its rod attached to fourth carriage 5200, draws upward on fourth carriage 5200. One end 5156 of each of two belts 5157 is attached to bottom of third carriage 5150, while other end 5253 of each belt 5157 is attached to fifth carriage 5250. Belts 5157 wrap over tops of respective rollers 5204 such that drawing upward of fourth carriage 5200 by hydraulic cylinder 5155 causes fifth carriage 5250 to move upward at twice the rate and distance of fourth carriage 5200.

Fourth and fifth carriages 5200 and 5250, respectively, provide for PA fork 5400 vertical travel between elevation of bottoms of PA's 300, 400 or 500, as applicable, seated on PC 5001 or 5002, and elevation of bottoms of PA's 300, 400 or 500, as applicable, just above uppermost deck 1203 of PATT 1200, wherein PATT 1200 is situated beneath bridge 5050. Tine 5402 lateral adjustment provides for substantially clear passage of fork tines 5402 between pallet support columns during process of fork engagement with pallets, followed by self-centering of pallets on pallet lifting, due to sloped surfaces of gussets between pallet columns and bottom walls of pallet container receptacles or grids interacting with and adjoining edges of fork tines. Such flexibility provides for positioning of tines to accommodate variations in geometry of pallets 302, 402, 502, or other, as applicable.

Adjustable fork tines like those of FIGS. 62T and 62U are relatively slender and of length sufficient to engage two PA's 300, 400, 500, or other, as applicable, closely spaced in tandem along the tines' length. Forks 5400 may also be of sufficient width to provide for engagement of more than one 'column' of PA's 300, 400, 500, or other, as applicable, along PC 5001 or 5002 length. This enables transfer of more than one pair of PA's 300, 400, 500, or other as applicable, between PC's 5001 or 5002 and PATT 1200—over full width of PATT 1200—in one PACTU machine cycle and by accessing PATT 1200 solely from side of PATT 1200 nearest PC 5001 or 5002, as applicable.

PACTU Operation

A PAGTU 5000 transfer-to-PATT 1200 loading process is shown in FIGS. 58B-58F. FIG. 58B shows a pair of pallet assemblies 500 seated on conveyor 5002, ready to be transferred to PATT 1200. Fork carriage 5250 is in its parking place, adjoining conveyor 5002.

PACTU first carriage (bridge) 5050 provides for fine alignment between fork 5250 and PA placement locations longitudinally along PATT 1200 and PACTU-PAU PC's 5001 and 5002. Bridge 5050 may also accommodate multiple PA transition locations.

In assembly mode, pallet assembly transport train 1200 is advanced to coarsely position an empty pallet assembly space on train 1200 in substantial alignment with PACTU 5000. PACTU 5000 begins a train loading cycle by positioning its first carriage 5050 so as to place fork 5250 in fine alignment with PA 300, 400 or 500 (500 shown in FIG. 58B) pair on PC 5001 or 5002, on side of PC 5001 or 5002 opposite train 1200. PACTU second carriage 5100 then drives fork carriage 5250 into engagement with a pair of PA's 300, 400 or 500, as applicable, seated on PC 5001 or 5002 (500 shown in FIG. 58C). PACTU fourth carriage 5200 and fork carriage 5250 then lift engaged pair of PA's 300, 400 or 500, as applicable, to slightly above elevation of deck 1203 of available PA space on PATT 1200, while bridge 5050 simultaneously moves in direction parallel to direction of PATT travel as necessary to complete fine alignment of fork carriage 5250 with target PATT space to receive PA's 300, 400 or 500, as applicable (FIG. 58D). PACTU second carriage 5100 then drives fork carriage 5250, with load of PA's 300, 400 or 500, as applicable, laterally toward PATT 1200, inserting PA's into target space (FIG. 58E). PACTU fourth carriage 5200 and fork carriage 5250 then lower engaged PA's 300, 400 or 500, as applicable, onto PATT deck 1203 and PACTU second carriage 5100 retracts fork carriage 5250 horizontally (FIG. 58F), then vertically, as necessary, to its home position.

Unloading of PATT 1200 by PACTU 5000 is simply the reverse of the described loading mode.

Pallet Assembly/Disassembly Unit (PAU) Physical Description

First embodiment of the PAS 2000 incorporates two substantially identical pallet assembly/disassembly units PAU1 2100/1 and PAU2 2100/2, respectively. (Unless otherwise explicitly stated, description of PAU 2100 refers to features common to both units.) A first embodiment of PAU 2100, shown in FIGS. 59A-59R, comprises: an integral pallet assembly infeed/disassembly outfeed conveyor (PAIDOC) 2105; an integral pallet assembly outfeed/disassembly infeed conveyor (PAODIC) 2106; an integral composite container lifting unit comprising laterally spaced conveyor elements 2450; an integral containerized plant assembly infeed/disassembly outfeed conveyor (CAIDOC) 2107; a containerized plant lifting unit (CLU) 2350; and, a containerized plant gripping/transfer unit (CGU) 2102. Unless otherwise stated, all PAU 2100 active motion components, including conveyors, are of the servo positioning type.

Adjoining CAIDOC 2107 is a two-zone, servo positioning, containerized plant spacing conveyor (CSC) 1660 (FIGS. 49, 52, 53, 54), which applies proper spacing to to-be-loaded containerized plants immediately prior to arrival on CAIDOC 2107 in assembly mode.

Integral Conveyors

PAIDOC 2105, array of CLU conveyor elements 2450, and PAODIC 2106 form a line of PC's that index pallets/pallet assemblies from a first external PC adjoining one end of PAU 2100, through PAU 2100, to a second external PC adjoining opposing end of PAU 2100. CAIDOC 2107 is located above and has flow directions perpendicular to PAODIC 2106. Vertical distance between CAIDOC 2107—accounting for CAIDOC 2107 cross section height—and PAODIC 2106 provides for tallest of containerized plants 203 conveyed by PAODIC 2106 to pass below CAIDOC 2107. All conveyors are programmable servo positioning type, having recipe-based indexing sequences appropriate for pallet assembly type being processed by PAU 2100.

Container Gripping & Transferring Unit (CGU) Phys Desc

CGU 2102 further comprises: a fixed frame 2104; a first carriage 2150 linearly movably attached to frame 2104; a second carriage 2200 linearly movably attached to first carriage 2150; a third carriage 2250 linearly movably attached to second carriage 2200; and a gripper array adapter 2300 (FIGS. 59H, 59I).

CGU 2102 first carriage 2150 and those nested thereon reciprocally traverse, on bearings 2153, linear track 2152 horizontal, parallel to flow directions of PC's 2105 and 2106, under the action of servo gearmotor 2154 (FIG. 59G), and associated drive components. Drive components, comprising gearmotor-mounted sync belt sprocket 2155, sync belt 2156, and drive/sync shaft 2158-mounted sync belt sprocket 2157 drive drive/sync shaft 2158 (mounted to frame 2104 on bearings not shown). Drive/sync sprockets 2159 and 2160 near ends of drive/sync shaft 2158, in turn, drive drive/sync belts 2161 and 2162, the loops of which are supported at the opposing ends by idler/sync sprockets 2163 and 2164 (mounted to frame 2104 on bearings not shown), respectively. Drive belt clamps 2165 and 2166 couple first carriage 2150 to synchronous runs of drive belts 2161 and 2162, respectively. Drive belt couplings are substantially symmetric lateral to drive direction, minimizing twisting of frame 2104 and first carriage 2150 that results from acceleration of first carriage 2150 and thereon nested carriages in motion direction of first carriage 2150. Ends of track 2152 rails incorporate carriage shock-absorbing safety bumpers 2167, which prevent decoupling of CGU first carriage 2150 from track 2152 in the event of a drive/sync belt failure. Further, drive belt breakage sensors cause control system to execute a carriage smooth-deceleration-to-stop sequence upon detection of belt breakage.

Container gripper first carriage 2150 movement relative to PAU 2100 frame provides for horizontal translation of gripped containerized plants between container lifting unit (CLU) 2350 (described below) transition point and centerline of CAIDOC 2107. Container gripper first carriage 2150 further incorporates vertical linear bearings 2205, which are movably attached to vertical track 2206 of container gripper second carriage 2200.

CGU second carriage 2200 incorporates a vertical track 2206 for reciprocally movable attachment of CGU second carriage 2200 relative to CGU first carriage 2150. Positioning of CGU second carriage 2200 relative to CGU first carriage 2150 is achieved by a positioning servo gearmotor/gear belt sprocket/gear belt arrangement 2202, combined with a pneumatic counterbalance cylinder 2203 and spring-applied, pneumatic release failsafe brake. CGU second carriage 2200 movement relative to CGU first carriage 2150 provides for vertical translation of gripped containerized plants between elevation of CLU 2350 transition point and CAIDOC 2107.

CONTAINER GRIPPER ADAPTER ASSEMBLY (CGAA) EMBODIMENT 1

A first embodiment (not necessarily preferred) of CGU second carriage 2200 further incorporates linear bearings 2260 along its base, which are movably attached to horizontal track 2261 of CGU third carriage 2250.

A first embodiment of CGU third carriage 2250 reciprocally translates relative to CGU second carriage 2200, perpendicular to PAIDOC 2105 flow directions. Such movement of CGU third carriage 2250 enables container grippers to align with laterally staggered pallet container receptacles 509 occurring in alternating rows of such receptacles 509 in pallets 502 having hexagonal container receptacle segments.

A first embodiment of CGU third carriage 2250 mounts a container gripper array attachment (CGAA) 2300 having a linear array of individual, horseshoe-shaped container grippier yokes 2306. Each gripper yoke 2306 is arcuate and has an inner radius substantially matching that of the body of a corresponding frustal container 203 (FIG. 59E) immediately below the container's radially outwardly extending lip 209. Wrap of the yoke 2306 around container 203 is limited to an amount that enables yoke 2306 to be horizontally freely translated into and out of vertical coaxial alignment with associated container 203 on lowering of yoke 2306 relative to associated container 203 to a point a minor distance above the bottom of the associated container 203, resulting from decreasing associated frustal container outer diameter corresponding to decreasing elevation relative to the container 203. Array of container gripper yokes 2306 is attachable as an assembly to CGU third carriage 2250, providing for expedient production setup changes. Each container gripper yoke 2306 may pivot a minor amount about a vertically aligned pin 2310 proximal to container 203 to allow for minor eccentricity in placement of containerized plant 200 on containerized plant conveyor 2107. Container gripper yokes 2306 are further each pneumatically "centered" their respective pivot pin. Pneumatic centering actuators 2268 are retracted during initial engagement of each gripper yoke 2306 with associated container 203, providing for "free" pivoting movement of each gripper yoke 236, thus, reducing contact forces needed for achieving proper engagement between gripper yoke 2306 and container 203.

CGAA EMBODIMENT 2

A second embodiment of the bottom of CGU second carriage 2700, shown in FIGS. 70-72C, contemplates an active, servo positioned gripper linear array attachment arrangement. In this case, bottom of CGU second carriage 2700 incorporates a beam 2703 mounting a horizontal linear track 2782/2783 reciprocally traversed by a container gripper left-hand-side tine array mounting carriage 2730 and a container gripper right-hand-side tine array mounting carriage 2750. Left-hand-side tine array mounting carriage 2730 comprises: a linear bearing lateral spacer bar 2732; linear bearings 2733, 2734 (not shown), 2737, and 2738 (not shown); left-hand-side tine array adapter assembly left hook 2735 (not shown) and right hook 2739; and, left-hand-side tine array adapter assembly spring-applied/pneumatically-released left latch pin 2736 (not shown) and right latch pin 2740. Right-hand-side tine array mounting carriage 2750 comprises: a linear bearing lateral spacer bar 2752; linear bearings 2753, 2754 (not explicitly shown), 2757, and 2758; and, right-hand-side tine array adapter assembly left hook 2755 (not shown) and right hook 2759; and, right-hand-side tine array adapter assembly spring-applied/pneumatically-released left latch pin 2756 and right latch pin 2760.

Servo positioning gearmotor 2704, coupled to left-hand-side tine array adapter mounting carriage 2730 through sync belt drive sprocket 2705, sync belt 2706, sync belt idler sprocket 2707, and left-hand-side tine array carriage belt clamp 2743, actuates container gripper left-hand-side tine array mounting carriage 2730. Similarly, servo positioning gearmotor 2709, coupled to gripper right-hand-side tine array adapter mounting carriage 2750 through sync belt drive sprocket 2710, sync belt 2711, sync belt idler sprocket 2712, and right-hand-side tine array carriage belt clamp 2763, actuates container gripper right-hand-side tine array mounting carriage.

Attachable to left-hand-side tine array adapter mounting carriage 2730 is a container gripper left-hand-side tine array adapter, comprising a tine mounting bar 2782, to which are ultimately mounted an array of container gripper left-hand-side tines 2785. Attachable to right-hand-side tine array adapter mounting carriage 2750 is a container gripper right-hand-side tine array adapter, comprising a tine mounting bar 2792, to which are ultimately mounted an array of container gripper right-hand-side tines 2795. Tines of container gripper left-hand-side and right-hand-side tine arrays are interleaved, combining to form an array of container grippers. Right side of each left-hand-side tine 2785 incorporates a container position control recess 2786 while left side of each right-hand-side tine 2795 incorporates a container position control recess 2796, which mirrors recess 2786.

Servo positioning gearmotors 2704 and 2709 drive gripper tine arrays synchronously in opposite directions for gripping and releasing of array of containers holding containerized plant material. Servo positioning gearmotors 2704 and 2709 drive gripper tine arrays synchronously in the same direction to effect side shifting of the container gripper array. Container control recesses 2785 and 2786 together support each container by its downward-facing lip surface at four spaced locations along the lip, mirrored about a vertical plane centered between container gripper tines 2785 and 2795. Shapes of container gripper recesses enable grippers to handle square containers in relatively small, i.e., pint or quart, sizes, as well as frustoconical containers in a plurality of sizes. With gripper recess depicted, side of a small, e.g., pint or quart-sized, cubic (or pyramidal) container nearest gripper assembly base is held against recess surfaces 2788 and 2798 by recess surfaces 2787 and 2797 as gripper tines are driven toward one another. Recess surfaces 2787 and 2797, which are inclined relative to direction of gripping motion, also effectively act to center a cubic (or pyramidal) container between tines 2785 and 2795. Also, recess surfaces 2788 and 2798 check rotation of a cubic (or pyramidal) container about its vertical centerline, fixing container orientation. Programmability of CGU servo drives enables grippers to carefully approach a containerized plant and to achieve a pre-defined gap complementing container to be gripped, maximizing containerized plant handling reliability.

CGAA EMBODIMENT 3

A third embodiment of the bottom of CGU second carriage 2800, shown in FIGS. 73A-D, contemplates an active, servo positioned gripper linear array attachment arrangement. In this case, bottom of CGU second carriage 2800 incorporates a beam 2803 mounting a horizontal linear track 2814/2815 reciprocally traversed by a container gripper left-hand-side tine array mounting carriage 2820 and a container gripper right-hand-side tine array mounting carriage 2850. Mounted to right end of beam is servo positioning gearmotor 2804, on the shaft of which is mounted a sync belt drive sprocket 2805, which mounts one end of sync belt 2806 loop, the other end of which, in turn, is captured by sync belt idler sprocket 2807, proximal to the middle of beam 2803. Mounted to left end of beam is servo positioning gearmotor 2809, on the shaft of which is mounted a sync belt drive sprocket 2810, which mounts one end of sync belt 2811 loop, the other end of which, in turn, is captured by sync belt idler sprocket 2812, also proximal to the middle of beam 2803.

Container gripper left-hand-side tine array mounting carriage 2820 is movably attached to linear track 2814/2815 via linear bearings 2831, 2832 (not shown), 2835, and 2836 (not shown), which are mounted to a container gripper left-hand-side tine mounting bar/track 2830. "C"-shaped mounting bar/track 2830 is attached to, and thereby driven by, container gripper left-hand-side tine array mounting carriage drive belt 2806 via clamp 2841, which protrudes through and traverses slot 2816 through beam 2803. Container gripper right-hand-side tine array mounting carriage 2850 is movably attached to linear track 2814/2815 via linear bearings 2861, 2862 (not shown), 2865, and 2866 (not shown), which are mounted to a container gripper right-hand-side tine mounting bar/track 2860. "C"-shaped mounting bar/track 2860 is attached to, and thereby driven by, container gripper right-hand-side tine array mounting carriage drive belt 2811 via clamp 2871, which protrudes through and traverses slot 2817 through beam 2803.

Container gripper left-hand-side tine 2920 incorporates a mounting bar mating portion having hooks 2922 and 2934 which cause tine 2920 to be captured inside perimeter of "C" section of mounting bar/track 2830 (FIG. 73D). Latch 2923 incorporates a cam 2924, loaded against inside wall of "C"-section mounting bar/track 2830 by spring 2926 acting on latch torque arm 2925 to create tightly wedged coupling of gripper tine attachment 2920 with mounting bar/track 2830 Releasing of gripper tine attachment 2920 is accomplished by squeezing of cam release arm 2927 against cam release backup arm 2928 and sliding of left-hand-side tine 2920 from one end of mounting bar/track 2830. Hook adapter plate 2929 adapts left-hand-side tine mounting portion to left-hand-side tine 2930. Right-hand-side tine attachment 2940 mounts similarly, except to right-hand-side tine mounting bar/track 2860.

Third embodiment enables a plurality of pallet-container configurations to be handled (not simultaneously) by one container gripper assembly merely by repositioning of container gripper tine attachments on CGU and, if necessary, addition or removal, of container gripper tine attachments to or from CGU, respectively.

Servo positioning gearmotors 2804 and 2809 drive gripper tine mounting bar/tracks 2830 and 2860 synchronously in opposite directions for gripping and releasing of array of containers holding containerized plant material. Servo positioning gearmotors 2804 and 2809 drive gripper tine arrays synchronously in the same direction to effect side shifting of the container gripper array.

Container Lifting Unit (CLU) Physical Description

Water collecting design of pallet assemblies results incorporated plant containers that are not exposed for gripping or handling without a secondary means of lifting containers at least partially out of pallets. Consequently, a containerized plant lifting unit (CLU) 2350 forms a part of PAU 2100. CLU 2350 is situated in part in a relatively narrow gap between PAIDOC 2105 and PAODIC 2106 and operates generally within a substantially horizontal, relatively slender, frame 2352 mounted to frame 2104 of PAU 2100.

Substantially along the top of CLU 2350 frame 2352 is a linear horizontal track 2402 to which CLU first carriage 2400 is movably attached via linear bearings 2415. A relatively short, integral, composite third pallet conveyor (CLUPC) is formed of an array of laterally spaced conveyor elements 2450 clamped to CLU first carriage 2400. Track 2402 is lateral to PAIDOC 2105 flow directions, and provides for shuttling of CLU first carriage 2400 to substantially one side of PAU 2100. Lateral shifting of CLU first carriage 2400 is actuated by servo positioning gearmotor 2403 (FIG. 59G) coupled to CLU first carriage 2400 through sync belt drive, comprising sync belt drive sprocket 2408, sync belt 2410, and idler rollers 2412. Sync belt 2410 is open-ended and coupled to opposing ends CLU first carriage 2400. Individual conveyor elements 2450 can be forcibly slid along length of CLU first carriage 2400, providing for adjustment of spacing between elements to account for differing lifting tooling geometry and spacing.

Conveyor elements 2450 (FIG. 59F illustrating one in a longitudinal vertical section) each comprise a splined sleeve 2453, a sync belt drive sprocket 2454, a sync belt 2455, a sync belt support bed 2456, conveyor head 2457 and tail 2458 sync belt idler sprockets, an idler roller 2452, and a tensioning roller 2459.

Alternately, conveyor element 2450 belt is inverted and associated rollers and sprockets are swapped, and tensioning roller and drive sprocket positions swapped. This arrangement results in sync belt teeth providing the conveying surface. Such an arrangement reduces wear rate on belt teeth as theoretically no slip occurs between teeth and conveyed workpieces. Also, a low-friction belt backing may be applied to reduce belt-bed sliding friction. In earlier configuration, unless belt is modified, potentially at significant expense, e.g., to yield a "T" cross section and conveyor element side rails provide belt support, wherein belt teeth do not contact, and, thus, slide against, conveyor bed while supporting weight of conveyed workpieces, belt teeth bear workpiece load while sliding, yielding a relatively high wear rate of belt teeth.

Conveyor elements 2450 are actuated by a servo positioning gearmotor 2417 through a coupling 2418 and common splined shaft 2419. CLU first carriage 2400 and thereon mounted conveyor elements 2450 may be driven to side of PAU 200 to provide for vertical insertion and removal of container lifting tooling that mounts below CLU first carriage 2400 conveying surface. Positions of conveyor elements 2450 are adjusted automatically for each new production setup by CLU first carriage 2400 positioning of each conveyor element 2450 in an element gripping unit 2353, which momentarily grips and effectively fixes the position of a given conveyor element 2450 in free space while the CLU first carriage 2400, to which conveyor element is mounted, is driven in free space, relative to the conveyor element 2450. Control system maintains CLU first carriage 2400 and conveyor element gripping unit 2353 geometry, conveyor element 2450 current and subsequent positions, and associated motion algorithms as required for automatic position changes.

Nested in CLU 2350 frame 2352 is a CLU second carriage 2500 that periodically reciprocally traverses a linear, vertical track, driven by positioning servo controlled hydraulic actuators 2501 and 2502, which provide a portion of the linear guidance. Vertical motion synchronization of the four corners of CLU second carriage 2500 is accomplished with arrangement of sync belts 2508, 2509, 2510, and 2511, sync belt sprockets 2506 and 2507, idler rollers 2512 and 2513, sync shaft 2503, and sync shaft 2503 support bearings (not shown). CLU second carriage 2500 further incorporates a linear horizontal track 2514 along the length of CLU second carriage 2500 along which a CLU fourth carriage 2600, discussed below, periodically, reciprocally traverses.

Also nested in CLU 2350 frame 2352 is a CLU third carriage 2550 that periodically reciprocally traverses a linear horizontal track 2563 perpendicular to PAIDOC 2105 conveyor flow directions, driven by servo positioning gearmotor 2552 through a drive train comprising shaft coupling 2553, upper sync belt drive sprocket 2557, upper sync belt 2559, upper sync belt idler sprocket 2561, drive/sync shaft 2554, lower sync belt drive sprocket 2558, lower sync belt 2560, lower sync belt idler sprocket 2562, and drive/sync shaft 2554 support bearings (not explicitly shown). Downward extending guide rails 2601 and 2602 provide vertical surfaces against which guide bearings 2604 (FIGS. 59D, E) and 2605 (FIG. 59H) mounted to a CLU fourth carriage 2600, described below, run, synchronizing horizontal motion of CLU third carriage 2550 and CLU fourth carriage 2600. A CLU container lifting column guide plate 2670 portion of a CLU container lifting adapter assembly (CLAA) 2650 is fastened to CLU third carriage 2550 via an array of spring-applied, pneumatically released latches 2567 situated along the seat of guide plate 2670.

Nested in CLU second carriage 2500 and CLU third carriage 2550 is a CLU fourth carriage 2600. CLU fourth carriage 2600 bearings 2603 and 2604 slave CLU fourth carriage to elevation of CLU second carriage 2500 and lateral position of CLU third carriage 2550. A CLU container lifting column drive plate 2652 portion of CLU container lifting adapter assembly 2650 is fastened to CLU fourth carriage 2600 via an array of spring-applied, pneumatically released latches 2606 situated along the seat of drive plate 2652.

Arrangement of carriages yields relatively low mass of components that must shuttle horizontally each machine cycle to align lifting columns with staggered pallet container receptacles in alternating rows of hexagonal pallet container receptacle segments. This reduces on framework reaction forces and associated motor loads.

Container Lifting Adapter Assembly (CLAA)

Each container lifting adapter assembly 2650 comprises a container lifting column drive plate 2652 and a container lifting column guide plate 2670. Drive plate 2652 and guide plate 2670 are horizontally situated with drive plate 2652 spaced below and normal to guide plate 2670. Mounted on drive plate 2652 is a linear array of slender same-height columns 2654 or groupings 2653 of columns extending upward from drive plate 2652. Lifting columns pass through corresponding holes in complementary lifting column guide plate 2670.

During CLU 2350 operation, drive plate 2652 is latched to and consequently matches motion of CLU fourth carriage 2600 while guide plate 2670 is latched to and consequently matches motion of CLU third carriage 2550. Fourth carriage 2600 with drive plate 2652 provides vertical upward thrust and position control of lifted containers of plants while third carriage 2350 with guide plate 2670 ensure upper ends of lifting columns 2654 are accurately aligned with container lifting access holes 545 in pallets 502 (FIG. 59E), holes 815 in grids 800, and/or holes 603 in grids/grids 600 (FIG. 59E), on initial lifting column 2654 engagement. Container lifting columns 2654 are arranged to pass through gaps between adjoining CLUPC conveyor elements 2450, which are spaced to substantially align with and support centers of pallet container receptacle support columns 518. Conveyor elements 2450 may be 'doubled up' to support relatively large pallet container receptacles, and consequent heavy containerized plants. Further, conveyor elements 2450 not required for supporting a pallet of a particular configuration may be positioned in gaps between pallet container receptacle support columns 518 or to side of PAU PC operating area.

In the case of frustal or cylindrical containers, container lifting adapter assemblies 2650 incorporate for each container in a row of spaced pallet container receptacles a circular array 2653 of at least three preferably six equally spaced, equally long lifting columns 2654 that are attached to and extend upward from container lifting drive plate 2652, through corresponding holes in the container lifting column guide plate 2670. In a case in which a stabilization groove 233 is incorporated in the bottom of and concentric with each container 203, the diameter of the circular array 2653 of container lifting columns 2654 matches that of the groove 233 in the container bottom. Also, in spaced container receptacle pallets 502, the pattern of container lifting columns 2654 on the container lifting drive plate 2652 matches the corresponding pattern of lifting access holes 545 in a row of container receptacles 509 in a pair of pallets 502 spaced laterally closely on the CLU conveyor. There is consequently no restriction on rotational orientation of a mating container about its vertical centerline for proper mating of lifting columns 2654 with groove 233 of each such container.

Also, for spaced container receptacle pallets 502, the pattern in plan of container lifting columns 2654(1) on the container lifting drive plate 2652(1) matches that of lifting access holes 545 in a row of container receptacles 509 in a pair of pallets 502 spaced laterally closely together on the CLU conveyor. For contiguous container receptacle pallets 402, the pattern of container lifting columns 2654(2) on the container lifting drive plate 2652(2) matches the corresponding pattern of lifting access holes in a row of container receptacles in a pair of pallets spaced laterally closely together on the CLU conveyor except reflecting the absence of every other pallet container receptacle. Such is also the case for tray/flat pallets, which can be considered a variant of contiguous container receptacle pallets.

In such case the upper end of each container-lifting column 2654 is in the general shape of a spade 2655 that matches an arcuate segment of the container bottom groove 233 mating with the lifting column 2654. Large depth of groove 233 relative to its section width ensures upper and lower contact surfaces between groove 233 and engaged lifting column 2654 interfere with free tipping of lifted container 203, resulting in stable lifting in the event of container side loading, as may result from entanglement of adjoining plant canopies during containerized plant removal. Container lifting columns 2654 can be cylindrical, enabling incorporation of circular, normally blanked container lifting access holes through pallets and grids, resulting in relatively low production costs.

In a case in which no stabilization groove is incorporated in the bottom of each container, the diameter of the circular array of container lifting columns is preferably approximately that of the outer perimeter of the container bottom. In this case the upper ends of the container lifting columns are "L"-shaped, wherein the horizontal leg points toward the center of the container bottom and the vertical leg extends a minor distance upward along the side of the container on engagement of container lifting columns with containers. Such container lifting columns necessitate substantially larger container lifting access holes through pallets and grids and consequent difficult, oblique trimming of pallets in production of container receptacles, resulting in relatively greater production costs.

In a case in which container plans are noncircular, giving rise to finite relationships rotationally about common vertical centerlines between pallet container receptacles and associated mounted containers, an otherwise circular groove in the bottom of a container would be replaced by one or more tapered recesses. In this case, for smaller containers, a single tapered recess of noncircular plan, e.g., a pyramid, in and concentric with the container bottom engaged by a single container-lifting column yields requisite container lifting stability. Noncircular plan of single container lifting column per container ensures associated container remains rotationally fixed about its vertical centerline while gripper array is in the process of retrieving it.

PAU Operation

CGU/CGAA EMBODIMENT 1

In PAU having first embodiment of CGU/CGAA arrangement (FIGS. 55-56), CGAA 2300 corresponding to pallet 502 configuration to be processed is retrieved and installed, as described above.

CGU/CGAA EMBODIMENT 2

In PAU having second embodiment of CGU/CGAA arrangement (FIGS. 70-72C), CGAA 2780/2790 corresponding to pallet 502 configuration to be processed is retrieved and installed, similarly to process for first embodiment.

CGU/CGAA EMBODIMENT 3

In PAU having third embodiment of CGU/CGAA arrangement (FIGS. 73A-D), CGAA 2920/2940 gripper tines are positioned corresponding to pallet 502 configuration to be processed.

Common

Also, prior to start of production, CLU conveyor elements 2450 are positioned typically to align with predefined lateral positions of centers of pallet container receptacles 509 across PAIDOC 2105 prior to start of production run. For larger containers, CLU conveyor elements may be "doubled up" beneath each pallet receptacle to accommodate the relatively greater weight/mass involved, given the lower number of receptacles 509 involved and relatively greater spacing between container lifting columns lifting individual containerized plants.

In production processing of spaced container receptacle pallets 502 (FIGS. 2, 3, 55-56), a full pallet row of containerized plants is assembled or disassembled, depending on PAU operating mode, in one machine cycle. In processing of contiguous receptacle pallets 402 (FIG. 5), including tray/flat pallets 302 (FIG. 6), half of a pallet row of containerized plants, i.e., every other containerized plant in a row, is assembled or disassembled, depending on PAU operating mode, in one machine cycle, given space required for grippers to access and lift containerized plants 200 by the lips of their containers or trays/flats of plants 303 by their lips, as applicable.

In processing of hexagonal container receptacles, whether spaced or contiguous, wherein alternating rows of container receptacles are laterally staggered, appropriate CGU and CLU carriages shuttle reciprocally, laterally relative to PAIDOC 2105 flow direction each machine cycle for proper alignment between receptacles, container grippers and container lifting columns. Such reciprocal lateral shuttling also occurs in order to process alternating contiguous container receptacle pallets 402, as well as flat/tray pallets 302, i.e., regardless of whether pallet container receptacle rows are staggered, as stated above.

In processing pallet assemblies, e.g., 500, in which a secondary means is necessary to expose container lips 209 for lifting of containers 203, container lifting columns 2654 engage bottoms 216 of plant containers 203 situated in pallet container receptacles 509 where container bottoms 216 are exposed through container lifting access holes 545 in bottoms of pallet container receptacles 509, and through lifting access holes 603 in separate grids 600 (or lifting access holes 815 in grids 800), if incorporated. In processing container pallet assemblies that present exposed lips for container lifting, container lifting columns 2654 simply facilitate freeing containers 203 from respective pallet container receptacles.

In pallet assembly mode, as shown for spaced container receptacle pallets 502 in FIGS. 59R-J, (i.e., in reverse order), an array of properly spaced flats/trays 303 of plants or containers 203 holding individually containerized plants 200, proximal to end of CAIDOC 2107, is gripped (FIG. 59Q) by corresponding array of container grippers 2306 (in first embodiment (FIGS. 59A-E); 2785/2795 in second embodiment (FIGS. 70-72C); 2930/2960 in third embodiment (FIGS. 73A-D)). The array is then: lifted slightly (FIG. 59P); translated horizontally to side of CAIDOC 2107, to vertical alignment with corresponding array of empty pallet receptacles 309, 140 or 509, as applicable, momentarily situated in PAU 2100(2) (FIG. 59N); and, lowered to an elevation wherein flats/trays 303 of plants or containers 203 of individually containerized plants 200 are engaged with tops of elevated container lifting columns, just above empty pallet receptacles 309, 140 or 509, and which fourth carriage 2600 of container lifting unit 2350 has driven up to such a position (FIG. 59M).

Over substantially the same time period, PAIDOC 2105 receives empty pallets, potentially nested in grids, from an adjoining first PC, and drives, in an indexing fashion, such pallets toward containerized plant-pallet assembly area of PAU 2100, largely asynchronously with assembly action of containerized plant-pallet assembly area of PAU 2100, though substantially synchronously with lateral shuttling of CLU third 2550 and downwardly retracted fourth 2600 carriages and associated container lifting assembly adapter 2650 (FIGS. 59P, N). CLU conveyor elements 2450 index synchronously with adjoining PC's (PAIDOC 2105 or PAODIC 2106) while pallets are in simultaneous contact. PAODIC 2106 receives in an indexing fashion loaded portions of pallets from PAU 2100 assembly area (CGU/CLU combination), and ultimately conveys completed pallet assemblies 500 to PC adjoining PAODIC 2106.

Container lifting columns 2654 extend upward through container lifting access holes 545 and, if applicable 603 or 815, such that their upper ends are positioned against the bottom of the array of flats/trays 303 of plants or containers 203 of individually containerized plants 200 to engage pallet container receptacles 309, 140 or 509, as applicable (FIGS. 59A-E, M). Grippers 2306 (in first embodiment); 2785/2795 in second embodiment (FIGS. 70-72C); 2930/2960 in third embodiment (FIGS. 73A-D)) then release flats/trays 303 of plants or containers 203 of individually containerized plants 200, as applicable, and CLU fourth carriage 2600 retracts downward (FIG. 59J), completing transfer of array of flats/trays 303 of plants or containers 203 of individually containerized plants 200 to respective pallets 302, 402 or 502, as applicable, then to a point wherein tops of container lifting columns 2654 have receded through gaps between conveyor elements 2450 to below conveyor elements 2450 upper surface to allow for indexing of pallet assemblies 300, 400 or 500, as applicable, by PAIDOC PC 2105, CLU conveyor elements 2450, and PAODIC 2106 (similar to FIGS. 59P, N). While CLU fourth carriage 2600 is fully retracted and PAIDOC PC 2105 and PAODIC PC 2106 are subsequently indexing pallets 302, 402 or 502, as applicable, to load the next empty receptacles, container grippers 2306 (in first embodiment); 2785/2795 in second embodiment (FIGS. 70-72C); 2930/2960 in third embodiment (FIGS. 73A-D)) are moving up to retrieve another array of flats/trays 303 of plants or containers 203 of individually containerized plants 200, which CPC 1700 is simultaneously conveying into position for retrieval. At substantially the same time, CLU container lifting columns shuttle laterally to align with next set of empty pallet container receptacles.

Pallet disassembly mode, depicted by FIGS. 59J-R (in the order indicated), is simply the pallet assembly mode operating in reverse. Container gripper unit 2102 periodically reciprocally lowers container grippers 2306 to an elevation above top of pallets 302, 402 or 502, as applicable, where lips of flats/trays 303 of plants or containers 203 of containerized plants 200 being extracted become readily accessible through lifting of such flats/trays 303 of plants or containerized plants 200 by CLU container lifting columns 2654. On gripping of containers 203, CGU 2102 transfers associated containerized plants 200 to CAIDOC 2107 and CLU container lifting columns 2654 retract. Once CLU container lifting columns 2654 are clear of PA's 300, 400 or 500, as applicable, PAIDOC 2105, CLU conveyor elements 2450 and PAODIC 2106, index by one pallet container receptacle row toward PGWU 5700.

PAU control programming can, as part of assembly and/or disassembly machine cycles, cause PAU container gripper array to be positioned against upper surfaces of pallets adjoining row of container receptacles (a) about to receive containerized plant material and/or (b) from which plant material is being extracted.

In the case of pallet container receptacles about to receive containerized plant material, such momentary positioning of PAU container gripper array prevents lifting of pallets that may otherwise result from incidental contact between container lifting columns and edges of associated container lifting access holes through pallets, and, if applicable, grids, as container lifting columns pass upward through container lifting access holes in pallets (and, if applicable, grids). In the case of containerized plant material being extracted, such momentary positioning of PAU container gripper array further prevents lifting of pallets resulting from incidental friction between pallet and containerized plant material being upwardly extracted from pallet—friction that may otherwise cause pallet to be lifted along with containerized plant material being upwardly extracted from pallet.

Such incidental friction may result from accumulation of debris in container lip-supporting trough along upper perimeter of pallet container receptacle, outside of container lip. It may also result from minor deformation of container side wall(s) and/or pallet container receptacle side wall(s) (e.g., elliptical instead of round in plan), which cause incidental contact between such respective side walls. These are but a couple of examples of pallet-containerized plant material friction sources and are not intended to be all-inclusive.

Lastly, extraction of containerized plant material from pallets may be further facilitated by minor differences (e.g., approximately ¼ inch) between; (a) the height of an array of container lifting columns associated with a first containerized plant in a given row being extracted, and (b) the height of an array of container lifting columns associated with a second containerized plant adjoining said first containerized plant in the subject row being extracted; relative to container lifting adapter drive plate. Such variation in heights of container-associated container lifting column arrays reduces the number of containerized plants experiencing initial separation from the pallets at any given temporal instant. It also results in a corresponding concentration of pallet-containerized plant initial separation forces for overcoming pallet-containerized plant friction. The difference in height between the array of greatest elevation and the array of least elevation in a given container lifting adapter assembly is, however, sufficiently small to ensure containerized plant material can be reliably transferred to and from containerized gripper array, which is situated substantially in a horizontal plane (and, therefore, does not necessarily have corresponding gripper-to-gripper elevation variation).

Variation in gripper-to-gripper elevation relative to gripper adapter base may alternately complement variation in container lifting column array elevation relative to container lifting drive plate. If so, gripper-to-gripper elevation variation will be sufficiently small to ensure simultaneously gripped containerized plant material can be reliably transferred to and from a common horizontal planar (i.e., a stationary conveyor) surface.

Automatic CGAA & CLAA Change & CLU Conveyor Element Positioning

Programmable controls, electro-pneumatically actuated latches and servo-driven conveyors and carriages enable switching of CGAA 2300 and CLAA 2650 fitting one pallet configuration to those fitting another. FIGS. 59G and H depict a PAU 2100 with its CGAA 2300 and CLAA 2650 removed from their working mounts and placed in a storage fixture 2680, which maintains the set as a single unit for conveying to and storage in PGSA 3500. Automatic process of extracting CGAA 2300 and CLAA 2650 from their working mounts comprises: retrieving from PGSU 3500 storage fixture 2680 (1) for to-be-removed tooling and storage fixture 2680(2) (not shown) holding to-be-installed tooling, and conveying same to PAIDOC 2105 and PAODIC 2106, respectively; shuttling CLU first carriage 2400 and thereon mounted CLU conveyor elements 2450 to one side of PAU 2100, clear of space above CLAA 2650; fully downwardly retracting CLU second carriage 2500 and centering CLU third carriage 2550 (and slaved fourth carriage 2600) mounting CLAA 2650; disengaging container lifting column guide plate latches 2567 (FIG. 59I), which frees container lifting column guide plate 2670 from its CLU third carriage 2550 working mount, and which releases spring-loaded latch plates 2672(F) and 2672(B), resulting in engagement of respective latch pins 2674(F) and 2674(B) with respective latch holes 2656(F) (not shown) and 2656(B) in container lifting columns 2654, fixing vertical spatial relationship between container lifting column guide plate 2670 and container lifting column drive plate 2652; upwardly stroking CLU second carriage 2500, which elevates released container lifting column guide plate 2670 above PAIDOC 2105 conveying surface; stroking CGU first 2150, second 2200, and third 2250 carriages to align vertical centerlines of container gripper yokes 2306 with corresponding centerlines of CLU container lifting column arrays 2653 with yokes 2306 below and contacting container lifting column guide plate 2670; disengaging container lifting column drive plate latches 2606, which frees container lifting column drive plate 2652 from its CLU fourth carriage 2600 working mount; CGU first 2150 and second 2200 carriage maneuvering of CGU third carriage 2250 into engagement with lifting and maneuvering of CGAA 2300 and held CLAA 2650 onto associated holding fixture 2680 situated on PAIDOC 2105 (FIG. 59H); disengagement of latches 2265 fixing CGU third carriage 2250 to CGAA 2300(1), thereby releasing CGAA 2300(1) from CGU third carriage 2250. CGU first 2150 and second 2200 carriages then maneuver CGU third carriage 2250 into engagement with replacement CGAA 2300(2) (not shown) and install CGAA 2300(2) into CLU third 2550 and fourth 2600 carriage mounts by a process substantially the reverse of the disassembly process by which this point was reached.

On completion of CLAA replacement, CLU first carriage 2400 interacts with CLU conveyor element positioner 2353 to reposition each CLU conveyor element 2450 suitably for the upcoming production run. CLU first carriage 2400 moves each CLU conveyor element 2450 into CLU conveyor element positioner 2353, where clamp holding CLU conveyor element 2450 to CLU first carriage 2400 is released and CLU first carriage 2400 is relocated relative to CLU conveyor element 2450. Programmable control system maintains a database of positions of CLU conveyor elements 2450 for each processed pallet type, thereby ensuring execution of the repositioning process in the order necessary to avoid collisions between CLU conveyor elements 2450.

Containerized Plant Spacing Conveyor (CPSC)

Adjoining and transitioning to CAIDOC 2107 is a containerized plant spacing conveyor (CPSC) 1660 (FIGS. 49, 52, 53, 54), which automatically adjusts spacing of arriving to-be-assembled containerized plants and trays/flats of plants to match spacing of receptacles in corresponding pallets.

CPSC 1660 is divided into first and second servo-driven conveyor belt positioning zones. Individually controllable adjoining zones and of CPSC 1660 provides for substantially infinite adjustment of container-to-container spacing of containerized plants, as well as for additional substantially infinite adjustment of much larger spacing between arrays of spaced containerized plants. This results in a corresponding time period for PAU 2100 to retrieve such arrays of containerized plants from CAIDOC 2107 for assembly with pallets or to convey away such an array of containerized plants from CAIDOC 2107, providing space to receive a new array to be disassembled from pallets.

Conveyor speeds in adjoining zone are matched as containerized plants cross transition, substantially averting container-to-belt slip, thereby maintaining high accuracy of containerized plant positioning in handling by CPSC. Also, servo controls provide for programmable speed, acceleration and jerk, thereby further smoothing conveyor flow and averting container-to-belt slip.

Pallet & Grid Rotating Unit (PGRU)

Following use, which may last for several months, pallets and grids will be dirty and should be rinsed with water to maintain integrity of sealing and reflective surfaces and to prevent debris from adversely affecting pallet and grid stack nesting for storage. Features of pallets and grids, such as water reservoirs and lips necessitate pallets be stood on edge for substantially complete drainage of rinse water. Further, it is preferable that standing on edge of pallets occurs repetitively, at a relatively high frequency, i.e., on a production basis, without manual interaction. Upon completion of pallet and grid rinsing, pallets should ideally be likewise returned to a working position. Automated pallet and grid rotator unit (PGRU) 5500 for such pallet and grid manipulation.

Two PGRU's 5500(1) and 5500(2), which are capable of standing pallets and grids on edge as well as returning pallets and grids to their working orientations, are at infeed and outfeed ends of a pallet and grid washing unit (PGWU) 5700 of FIGS. 60A, C, D, and E, forming a line. Ends of PGRU's opposite PGWU interface with interconnecting PC's. PGRU 5500 is detailed in FIGS. 60G-N.

PGRU 5500(1) simultaneously rotates two pallets and grids as units from working orientation to "on edge" rinsing orientation. PGRU 5500(2) at opposite end of PGWU 5700 simultaneously rotates two pallets and grids as units from "on edge" rinsing orientation to working orientation.

PGRU 5500 comprises two substantially identical carriage assemblies, movably attached to a common frame, that rotate and translate symmetrically mirrored about a vertical plane centered on infeed PC and tangential to infeed PC flow direction.

PGRU 5500 comprises a frame 5502, plus, on each of two sides lateral to conveyor line, a horizontally, linearly translating first carriage 5520(L/R), a reciprocally rotating and conveying second carriage 5550(L/R), a conveying third carriage 5580(L/R), and a reciprocating and conveying fourth carriage 5620(L/R).

PGRU frame 5502 as illustrated, incorporates a linear track having rails 5510 and 5511 9not shown) and assembly first and second sync belt arrangements. First and second sync belt arrangements provide in part described mirrored symmetrical motion of first carriages 5520(L) and 5520(R), which traverse track 5510/5511. First synchronizing belt arrangement comprises sync belt sync sprocket 5503 and idler sprocket 5505 and thereon mounted belt 5504 to which first carriages 5520 (L) and 5520(R) are coupled through clamps 5526(L) and 5526(R), respectively. Second synchronizing belt arrangement, comprising sync belt sync sprocket 5507 and idler sprocket 5509 and thereon mounted belt 5508 to which first carriages 5520(L) and 5520(R) are coupled through clamps 5528(L) and 5528(R), respectively. Sync shaft 5506, which provides carriage 1 synchronization redundancy, is coupled to sprockets 5503 and 5507 and is supported near ends by bearings not shown. While two coupled sync belt arrangements are depicted, one arrangement, combined with carriage 1 travel bumpers at ends of track 5510/5511 maintains first carriages 5520(L) and 5520(R) on track in the event of a belt break. Without the need for sync shaft 5506, relatively lesser expensive flat or equivalent belts and pulleys can replace remaining sync belts and sprockets, respectively. Beneath PGWU frame 5502(1) as shown in FIG. 60D, is a drip pan 5512 for catching accumulated irrigation water spilled from pallet during rotation to an "on edge" orientation. Drip pan 5512 funnels collected water to a discharge port that preferably discharges into a culvert or underground piping which directs such water to a retention pond. Such water is typically unacceptably contaminated for reuse in pallet rinsing.

Each PGRU first carriage 5520 is movably attached via linear bearings 5521, 5522, 5523, and 5524 to PGRU frame 5502 track 5510/5511 and pivotally to respective second carriage 5550 via bearings 5529 and 5530. PGRU first carriage 5520 incorporates a PGRU second carriage rotation drive servo gearmotor 5532 coupled to drive/sync shaft 5531, which is coupled at each end to sync belt sprockets 5533 and 5534 and supported near each end by proximal bearings not shown. An open-ended sync belt 5536 fixed at a first end of a pulley segment 5552 of second carriage 5550 wraps around sprocket 5533 and terminates at belt clip 5539 (not shown, complements belt clip 5540 shown). Belt clip 5539 couples sync belt 5536 entering clip 5539 from one direction and two belts 5535 laterally symmetrically spaced apart by width of belt 5536, entering clip 5539 from direction opposite belt 5536. Laterally spaced belts 5535 wrap around an idler sprocket 5541, straddle pulley segment 5552-wrapped belt 5536, and wrap around pulley segment 5552 in opposite direction from belt 5536 and is fixed to end of pulley segment 5552 opposing belt 5536 attachment end. A second open-ended sync belt 5538 fixed at a first end of a pulley segment 5553 of second carriage 5550 wraps around sprocket 5534 and terminates at belt clip 5540. Belt clip 5540 couples sync belt 5538 entering clip 5540 from one direction and two belts 5537 laterally symmetrically spaced apart by width of belt 5538, entering clip 5540 from direction opposite belt 5538. Laterally spaced belts 5537 wrap around an idler sprocket 5542, straddle pulley segment 5553-wrapped belt 5538, and wrap around pulley segment 5553 in opposite direction from belt 5538 and is fixed to end of pulley segment 5553 opposing belt 5538 attachment end. Servo gearmotor 5532 and described drive cause second carriage 5550 to rotate about bearings 5529 and 5530, relative to first carriage 5520. Pivotal connection between PGRU second carriages 5530(L) and 5530(R) necessitates that distance between PGRU first and second carriage pivotal joints 5529 and 5530 vary. First carriage bearings 5529 and 5530, running on PGRU track 5510/5511 provide for such variation.

PGRU second carriage 5550 incorporates: a first set of pins 5529 for pivotal attachment to PGRU first carriage 5520; pulley segments 5552 and 5553 coupled to PGRU first carriage 5520 forming part of rotation drive described above; an aligned pin and hole pair 5551 for pivotal connection to a facing second carriage 5550; a servo gearmotor 5558-driven positioning conveyor 5555; a track 5559/5560 for movable attachment of PGRU third carriage 5580; and a drive for positioning PGRU third carriage 5580 relative to PGUR second carriage 5550. PGRU third carriage 5580 positioning drive comprises gearmotor 5561 coupled to drive/sync shaft 5568, sync belt sprockets 5565 and 5569 attached to ends of drive/sync shaft 5568, sync belt 5566 mounted to drive sprocket 5565 and looping around idler sprocket 5567 mounted to front side of PGRU second carriage 5550; and, sync belt 5570 mounted to drive sprocket 5569 and looping around idler sprocket 5571 mounted to rear side of PGRU second carriage 5550. Track 5559/5560 is oriented to provide for motion of PGRU third carriage 5580 perpendicular to conveying surface of PGRU second carriage conveyor 5555.

PGRU third carriage 5580 incorporates: linear bearings 5581, 5582, 5583, and 5584, movably attaching PGRU third carriage 5580 to track 5559/5560 of PGRU second carriage 5550; belt clamps 5586 and 5588 coupling PGRU third carriage 5580 to associated drive belts 5566 and 5570; a servo gearmotor 5592-driven positioning conveyor 5589; linear bearings 5593 and 5594 movably attaching PGRU third carriage 5580 to track 5621/5624 of PGRU fourth carriage 5620; a servo gearmotor drive for positioning PGRU fourth carriage 5620 relative to PGRU third carriage 5580. PGRU fourth carriage 5620 positioning drive comprises servo gearmotor 5595 coupled to sync shaft 5600, near the front end of which is mounted sync belt sprocket 5596 and idler rollers 5597 and 5598 which collectively drive open-ended sync belt 5599, and near the rear end of which is mounted sync belt sprocket 5601 and idler rollers 5598 and 5602 which collectively driv open-ended sync belt 5604. Sync belt 5599 is fastened at its ends to ends of PGRU fourth carriage 5620 track front rail 5621. Sync belt 5604 is fastened at its ends to ends of PGRU fourth carriage 5620 track rear rail 5624. Linear bearings 5593 and 5594 and associated track 5621/5624 are oriented to provide for motion of PGRU fourth carriage 5620 perpendicular to PC flow direction and tangential and proximal to conveying surface of PGRU third carriage conveyor 5589.

PGRU fourth carriage 5620 incorporates: track 5621/5624, movably attached to linear bearings 5593 and 5594 of PGRU third carriage 5580; belt clamps 5622, 5623, 5625, and 5626, coupling PGRU fourth carriage 5620 to associated drive belts 5601 and 5604; and, a servo gearmotor 5629-driven positioning conveyor 5627.

Sequence of PGRU actions in rotation of pallets 502 (and, if applicable, nested grids 800) from "working" orientations to "on edge" orientations is shown in FIGS. 60K-N in the same order. Prior to production run, PGRU third carriages 5580 are automatically spaced a predefined distance from PGRU second carriages 5550, resulting in minor clearance between tops of pallets 502 (and, if applicable, nested grids 800) and conveyor surfaces of PGRU third carriage 5580. Such adjustment does not change over the course of a production run. As depicted in FIG. 60K, a pair of pallets 502 (and, if applicable, nested grids 800) first index onto respective conveyors of PGRU second carriages 5550. As depicted in FIG. 60L, PGRU fourth carriages 5620 then advance toward pallets 502 a predefined distance, placing conveying surfaces of PGRU fourth carriages 5620 in close proximity to outer edges of subject pallets 502 to avert uncontrolled movement of pallets 502 during upcoming rotation maneuver. As depicted in FIG. 60M, PGRU second carriages 5550 then together rotate through 90 degrees about their common pivotal axis 5551 and PGRU first/second such that their common pivotal axis 5551 rises vertically and PGRU first carriages 5520(1) and 5520(2) and associated PGRU first/second carriage pivot joints 5530(1) and 5530(2) approach one another. As depicted in FIG. 60N, PGRU fourth carriages 5620 then retracts downward to same elevation as adjoining outfeed conveyor, which has guides to support "on edge" orientation of pallets 502 (and, if applicable, nested grids 800) now being conveyed. Finally, PGRU 5500 returns to its original orientation to receive another pair of pallets 502 (and, if applicable, nested grids 800).

Sequence of PGRU actions in rotation of pallets 502 (and, if applicable, nested grids 800) from "on edge" orientations to "working" orientations is the reverse of that described above.

Pallet & Grid Washing Unit (PGWU)

Pallet and grid washing unit (PGWU) 5700 provides for rinsing of pallets and grids having been exposed for several months to splashed containerized plant soil, fertilizer and dust. As stated above and as depicted in FIGS. 60A, C, D and E, PGWU 5700 is between and functionally aligned with two PGRU's 5500(1) and 5500(2) as PGWU processes pallets (and, if applicable, thereon nested grids) which are standing "on edge".

PGWU main conveyor 5720 aligns with PGRU second carriage conveyors 5555 and upwardly supports pallets processed by or bypassing PGWU 5500. In order to accommodate a PGWU bypass mode, PGWU main conveyor 5720 is of sufficient width to convey a pair of pallets spaced closely laterally on conveyor. PGWU main conveyor 5720 runs continuously, generally at a constant speed, which is adjustable depending on PGWU 5500 operating mode. Beneath PGWU main conveyor 5720 is a drip pan 5721 having two rinse water collection sections. First rinse water collection section is upstream—relative to PGWU main conveyor 5720—from second rinse water collection section, and is separated from second rinse water collection section by drip pan separation wall 5722. First rinse water collection section receives spilled rinse water from a pallet and grid low-pressure initial rinse area and a pallet and grid high-pressure rinse area. Resulting rinse water, considered unacceptably contaminated for reuse, is discharged into a culvert or underground piping that directs such water to a retention pond. Second rinse water collection section receives spilled rinse water from a pallet and grid low-pressure final rinse area. Resulting rinse water, considered to be suitably clean for reuse, is discharged to the inlet 5727 piping of recirculation pump 5723, which, in turn, pumps such rinse water through piping 5724 and flexible 5725 to pallet and grid low-pressure initial rinse water distribution system 5785 to be combined with clean PGWU 5700 supply water.

PGWU stationary frame 5740 incorporates PGWU first carriage vertical guide rails 5766, 5767, 5768, and 5769 and an automatic, cable-based, carriage elevating suspension system, which supports PGWU first carriage 5800 substantially above PGWU main conveyor 5720. Automatic suspension system comprises: automatic motorized elevator drive 5741 with failsafe brake, cable winding drums 5745 and 5746 (not shown), sync shaft 5744; sync shaft bearings 5742 and 5743, support cables 5747, 5748, 5749, and 5750; pulley blocks 5751, 5752, 5753 (not shown), and 5754; and, height limit switches. Suspension system is immobile during a given production run. Suspension system raises PGWU first carriage 5760 and all thereon mounted components to produce substantial clearance between bottoms of components mounted to PGWU first carriage 5760 and conveying surface of PGWU main conveyor 5720, thereby achieving a PGWU bypass mode in which relatively tall stacks of pallets may pass freely through PGWU on PGWU main conveyor 5720. Alternately, motorized, sync belt-synchronized acme screws could replace cables, being situated reasonably proximal to (former) cable vertical runs.

PGWU first carriage 5760 incorporates: linear bearings 5762, 5763, 5764, and 5765, movably attaching PGWU first carriage 5760 to PGWU stationary frame 5740; a low- and high-pressure water pump unit 5785, water spray nozzle arrays and associated distribution manifolds, (mirrors of such nozzle arrays and manifolds described below); an air drying blower unit 5786, drying air nozzle array and associated distribution manifold (mirrors of such nozzle array and manifold described below); mirrored "on edge" pallet fences 5782 and 5784 which make up parts of mirrored pallet tracks 5826 and 5876, respectively, running the length of PGWU 5700; mirrored lateral rails 5766, 5767, 5768, and 5769 to which PGWU second carriages 5800 and 5850 are movably attached; and, an automatic gearmotor/sync belt-actuated PGWU second carriage lateral translation drive. Electric motor-driven low-pressure water pumps are of the centrifugal variety due to their ability to tolerate contamination in the pumped water. Electric motor-driven high-pressure water pumps are of the positive displacement variety to achieve relatively high pumping efficiency. Due to close pumping element tolerances, single-pass inlet filtration is employed. Supply water pressure, produced by well or reservoir pumps or elevated tanks, is suitable for low-pressure rinses described, and for charging inlets of high-pressure pumps. PGWU second carriage lateral drive comprises a gearmotor 5770, attached sync belt sprocket 5771, sync belt 5772, sync belt sprocket 5773, front left drive/sync sprocket 5774, front drive/sync belt 5775, front idler sprocket 5776, front-back sync shaft 5777 attached to drive/sync sprockets 5774 and 5778, rear left drive/sync sprocket 5778, rear drive/sync belt 5779, rear idler sprocket 5780. PGWU second carriage lateral drive provides for drive and synchronization of front and rear ends of PGWU second carriages 5800 and 5850. Alternately, motorized, sync belt-synchronized screws would also work well for synchronization of PGWU second carriages 5800 and 5850.

PGWU left-hand-side second carriage 5800 incorporates: beam 5801 supporting most components; linear bearings 5802, 5803, 5804, and 5805, movably attaching PGWU left-hand-side second carriage 5800 to lateral rails 5766 and 5767 of PGWU first carriage 5760; clamps 5807 and 5809, coupling PGWU left-hand-side second carriage 5800 to associated drive belts 5775 and 5779; left-hand-side, servo-driven, "on-edge" pallet conveyor; initial low-pressure rinse water spray nozzle array 5823 and distribution manifold; high-pressure water pump unit 5810 and associated water spray nozzle array 5824 and distribution manifold; final low-pressure rinse water spray nozzle array 5825 and distribution manifold; and, drying air nozzle array 5831 and distribution manifold. Conveyor comprises: servo positioning conveyor drive gearmotor 5811; upper sync belt drive sprocket 5812; upper sync belt 5813, upper sync belt idler sprocket 5818; upper-lower conveyor drive sprocket sync shaft 5832; lower sync belt drive sprocket 5814; lower sync belt 5815; lower sync belt idler sprocket 5819; flight upper track 5816; flight lower track 5817; and, flight 5820. Conveyor flights 5820 provide positive, constant drive of pallets (and, if incorporated, nested grids) past spray nozzle arrays that can readily disturb conveying workpieces.

PGWU right-hand-side second carriage 5850 incorporates: beam 5851 supporting most components; linear bearings 5852, 5853, 5854, and 5855, movably attaching PGWU right-hand-side second carriage 5850 to lateral rails 5768 and 57697 of PGWU first carriage 5760; clamps 5857 and 5859, coupling PGWU right-hand-side second carriage 5850 to associated drive belts 5775 and 5779; right-hand-side, servo-driven, "on-edge" pallet conveyor; initial low-pressure rinse water spray nozzle array 5873 and distribution manifold; high-pressure water pump unit 5860 and associated water spray nozzle array 5874 and distribution manifold; final low-pressure rinse water spray nozzle array 5875 and distribution manifold; and, drying air nozzle array 5881 and distribution manifold. Conveyor comprises: servo positioning conveyor drive gearmotor 5861; upper sync belt drive sprocket 5862; upper sync belt 5863, upper sync belt idler sprocket 5868; upper-lower conveyor drive sprocket sync shaft 5882; lower sync belt drive sprocket 5864; lower sync belt 5865; lower sync belt idler sprocket 5869; flight upper track 5866; flight lower track 5867; and, flight 5870.

FIG. 60F illustrates the PGWU left-hand-side "on edge" pallet conveyor, with arrays 5823, 5824, 5825, and 5831 of spray nozzles and air drier nozzles, which are mirrored on associated left-hand-side track fence 5782. PGWU main conveyor 5720, PGWU left-hand-side second carriage 5800 "on edge" conveyor, and left-hand-side track fence 5782 collectively form a PGWU left-hand-side "on edge" pallet track 5826 (FIGS. 60A, B) which pallets (and, if incorporated, nested grids) follow through PGWU 5700. This combination of components is mirrored about a vertical plane centered on PGWU main conveyor 5720 and tangential to PGWU main conveyor 5720 flow directions. Normal distance between each "on edge" conveyor and the corresponding fence is automatically adjusted ahead of a production run via positioning gearmotor 5770, setting it based its position as measured by a PGWU second carriage drive train shaft encoder or carriage-connected linear encoder or distance transducer, and on control system database storing (among other dimensions) pallet height, pallet-grid nesting height (if grids are incorporated), plus a minor clearance figure, which are summed together to define the appropriate gap for reliably conveying the subject pallets (and, if incorporated, nested grids).

Initial low-pressure rinse nozzle linear arrays, typical of nozzle array 5823 shown in FIG. 60F, are downwardly sloped in PGWU conveyor working flow direction to cause accumulation of rinse water on portions of pallets struck by lower-elevation initial low-pressure rinse nozzle jets as pallets are conveyed past, aiding loose debris removal by initial low-pressure rinsing action. High-pressure rinse nozzle linear arrays, typical of nozzle array 5824 shown in FIG. 60F, are vertical to present pallet walls having minimal accumulation of rinse water on portions of pallets struck by all high-pressure rinse nozzle jets as pallets are conveyed past, best ensuring high-pressure rinse nozzle jets substantially directly impact pallet (and, if applicable, nested grid) walls with insignificant attenuation by pallet-laden residual rinse water, thereby maximizing effectiveness of pallet high-pressure rinsing operation. Vertical arrays of high-pressure rinse water nozzles also generally correspond with vertical leading and trailing edges of pallets (and, if incorporated, nested grids) being conveyed, promoting the use of rinse water-saving valves and associated limit switches or pallet position measuring devices or control system-generated timing that provides for stopping of rinsing action, particularly energy intensive high-pressure rinsing, in the absence of pallets (and, if incorporated, nested grids) being rinsed.

PALLET & GRID STACKING/DESTACKING UNIT (PGSU) EMBODIMENT 1

As shown in FIGS. 61A-S, PGSU 4500 in a first embodiment of the invention, operates in concert with associated PC's to stack and destack pallets 302, 402, or 502 and, as required, grids 600 or 800 (402, 502, and 600 shown) as dictated by PAS operating mode.

PGSU 4500 comprises framework 4510 supporting a PGSU first carriage 4550 and nested second 4600 and third 4700 carriages above PGSU positioning PC 4512. Frame 4510 incorporates a linear, horizontal first track 4514—perpendicular to PGSU PC 4512 flow directions—for movable attachment of PGSU first carriage 4550. Also mounted on frame 4510 is: a servo gearmotor 4515; with mounted sync belt sprocket 4516; thereon mounted sync belt 4517; sync/drive shaft drive sprocket 4518; drive/sync shaft 4525 with drive/sync sprockets 4519 and 4520 proximal to its ends and mounted to frame 4510 on bearings not shown; PGSU first drive/sync belt 4521 mounted to drive/sync sprocket 4519 and frame 4510-mounted idler sprocket 4523; PGSU second drive/sync belt 4522 mounted to drive/sync sprocket 4520 and frame 4510-mounted idler sprocket 4524. Described arrangement, drives first carriage 4550 reciprocally along first track 4514. First carriage 4550 provides for accurate positioning in shuttling of second 4600 and third 4700 carriages laterally across PGSU PC 4512 so that pallets and, if applicable, grids may be picked up from or deposited to both sides of PGSU PC 4514.

Mounted to first carriage 4550 is a first set of linear (or cam follower) bearings 4560, which provide for movable attachment of first carriage 4550 to first track 4551 of frame 4510. Also mounted to first carriage 4550 are two vertical linear bearing arrangements 4560 and 4570, each for movable attachment of second 4600 and third 4700 carriages via linear tracks 4601 and 4701 mounted to second 4600 and third 4700 carriages, respectively. Mounted to first carriage 4550 is a servo gearmotor 4561 with thereon mounted sync belt sprocket 4562, flanked by two idler rollers 4563 that provide for requisite belt-sprocket contact angle between sprocket 4562 and open-ended, vertical drive sync belt driving 4605 PGSU second carriage 4600. Also mounted to first carriage 4550 is a servo gearmotor 4571 with thereon mounted sync belt sprocket 4572, flanked by two idler rollers 4573 that provide for requisite belt-sprocket contact angle between sprocket 4572 and open-ended, vertical drive sync belt 4705 driving PGSU second carriage 4700. Also mounted between first carriage 4550 and each of second 4600 and third 4700 carriages is a failsafe brake for emergency and idle fixing of respective carriage relative to first carriage 4550, and a "counterbalance" pneumatic cylinder as described above.

Vertical drive arrangement for each of second 4600 and third 4700 carriages alternately could comprise a closed sync belt mounted to a drive sprocket and idler sprocket at opposing ends of respective carriage riser member, having a point on one belt run clamped to first carriage, wherein driving servo gearmotor is mounted to subject second or third carriage and is coupled to subject drive sprocket, thereby eliminating reverse flexing of drive belt, improving its longevity. Vertical drives could alternately also by hydraulic or pneumatic servo-based, or an electric servo with cable/drum-based motion transmission.

As detailed in FIGS. 61B and C, each of second 4600 and third 4700 carriages are substantially identical, with the potential exception of pallet adapter attachments. Each of second 4600 and third 4700 carriages comprises a slender vertical member 4602 along which respective track 4601 is attached. At bottom of vertical member 4602 is attached a generally horizontal, planar pallet gripper head upper base plate 4620 having vertically downwardly extending pilot pins 4621 and 4622, the free edges of which are tapered to facilitate engagement with corresponding holes 4661 and 4662 through a pallet gripper head lower base plate 4660 and two pallet gripper adapter plates 3110 and 3140. A positioning servo gearmotor 4623, which is rigidly attached to pallet gripper head upper base plate 4620 upper surface along one edge drives a sync shaft 4624, the two ends of which are coupled to two mirrored bell cranks 4627 and 4628. Bell cranks 4627 and 4628 are, in turn, pivotally pinned in an axis parallel to and spaced generally horizontally from sync shaft 4624 to the upper ends of vertical links 4633 and 4634 (not shown). Bell cranks 4627 and 4628 are further pinned in an axis parallel to sync shaft 4624 and spaced generally vertically from sync shaft 4624 axis and to first ends of horizontal links 4629 and 4630. Second ends of horizontal links 4629 and 4630 are pinned at identical locations on two additional identical mirrored bell cranks 4631 and 4632, respectively, that rotate about fixed axis pinned joints that are spaced horizontally from sync shaft 4624 substantially orthogonally across upper base plate 4620. Identically to arrangement of first set of bell cranks 4627 and 4628, bell cranks 4631 and 4632 are also pinned to the upper ends of two additional generally vertical links 4635 and 4636, respectively. Lower ends of vertical links 4633, 4634, 4635, and 4636 are pinned to corresponding pivot points on lower base plate 4660. Spacing between vertical link lower pivotal joints matches spacing between vertical link upper pivotal joints, resulting in parallelism between vertical links and between upper 4620 and lower 4660 base plates. This arrangement provides for minor vertical normal reciprocal programmable stroking of pallet gripper head lower base plate 4660 relative to upper base plate 4620, while maintaining parallelism between upper 4620 and lower 4660 base plates at four support joints.

Hanging over the edge proximal to each of four corners of upper surface of upper base plate 4620 is a spring-applied, pneumatically released hook 4637. Hook 4637 incorporates a horizontal slide portion 4638, a riser portion extending downwardly from slide portion, a flange portion 4639 extending inward at the lower end of riser portion, and a lip 4640 protruding upwardly and outwardly from upper, inner edge of flange portion 4639. Hanging over the edge proximal to each of four corners of upper surface of lower base plate 4660 is a spring-applied, pneumatically released hook 4663. Hook 4663 incorporates a horizontal slide portion 4664, a riser portion extending downwardly from slide portion, a flange portion 4665 extending inward at the lower end of riser portion, and a lip 4666 protruding upwardly and outwardly from upper, inner edge of flange portion 4665.

Pallet gripper upper adapter plate 3110 rests on flanges 4639 of respective hooks 4637 mounted to upper base plate 4620, with respective spring-retracted hook drive pneumatic cylinders 4641 disengaged. Hook flange lips 4640 and complementary adapter plate 3110 support surfaces are shaped to prevent inadvertent actuation, i.e., release, of hooks 4637 and adapter plate 3110 while weight of adapter plate 3110 is still borne by hooks 4637. Similarly, pallet gripper lower adapter plate 3140 rests on flanges 4665 of respective hooks 4663 mounted to lower base plate 4660, with respective spring-retracted hook drive pneumatic cylinders 4667 disengaged. Hook flange lips 4666 and complementary adapter plate 3140 support surfaces are shaped to prevent inadvertent actuation, i.e., release, of hooks 4663 and adapter plate 3140 while weight of adapter plate 3140 is still borne by hooks 4663.

Pallet gripper upper 4620 and lower 4660 base plates further each incorporates a mechanism for actuating pallet hooking finger 3122 and 3132 array mounting/drive plates 3120 and 3130, respectively. Mounted to upper base plate is a vertical pivotal shaft 4643 that extends downward from an input crank 4644 above the upper base plate 4620 through a bearing 4645, to a lower end having a pair of opposing cams 4647 straddling shaft 4643. Pneumatic cylinder 4646, pinned at one end to a bracket fastened to upper base plate 4620 reciprocally drives crank 4644, thereby reciprocally rotating shaft 4643. Opposing cams 4647 on the lower end of shaft 4643 engage drive slots 3121 and 3131 of two pallet hooking finger mounting/drive plates 3120 and 3130, respectively. Pallet hooking finger mounting/drive plates 3121 and 3131 are supported by pallet gripper upper adapter plate 3110 and guided to slide horizontally parallel to each other. Minor rotation of shaft 4643 causes cams 4647 to push on walls of slots 3121 and 3131 of pallet hooking finger mounting/drive plates 3120 and 3130, respectively, in opposing directions. Mounted to and extending downward from pallet hooking finger mounting/drive plates 3120 and 3130 are pallet hooking fingers 3122 and 3132, respectively, which, assembled together, form a two-dimensional array of pallet hooking finger pairs that in plan match the arrangement of pallet container receptacles of an associated pallet configuration.

Lower ends of pallet hooking fingers 3122 and 3132 incorporate flanges 3154 and 3155 that face away from like flanges on opposing pallet-hooking fingers. Opposing fingers 3122 and 3132, on being lowered so as to protrude down through container lifting access/pallet lifting holes 545/603/815, move apart to engage pallet/grid walls adjoining container lifting access/pallet lifting holes 545/603/815 on deactivation of pneumatic cylinder 4646—a failsafe condition. Opposing fingers 3122 and 3132, move toward one another to disengage pallet/grid walls adjoining container lifting access/pallet lifting holes 545/603/815 on activation of pneumatic cylinder 4646.

Pallet hooking finger drive/mounting plates 3150 and 3160 and thereto mounted pallet hooking fingers 3152 and 3162, respectively, which are associated with pallet gripper lower base 4660 and adapter 3140 plates, operate similarly to their counterparts associated with pallet gripper upper base 4260 and adapter 3110 plates. However, directions of movement and locations of pallet hooking finger mounting plates 3150 and 3160 and corresponding fingers 3152 and 3162, respectively, align with different pairs of container lifting access holes 545/603/815 through pallets and grids.

Vertically movably attached to and normally hanging below pallet gripper lower adapter plate 3140 is a pallet/grid guide plate 3180 having downwardly tapering features that complement those of the pallet or grid to be gripped. Pallet/grid guide plate 3180 facilitates alignment between pallet gripper head and pallet or grid, as applicable. Pallet/grid guide plate 3180 further incorporates a sensors that, together with carriage vertical position measurement derivable from the second 4600 or third 4700 carriage vertical drive servo system, signal the PGSU 4500 controls that the pallet/grid guide plate 3180 is being supported by a stack and no longer by the pallet gripper lower adapter plate 3140, indicating the top of a stack (or, if at a predefined elevation, an absent stack) has been located.

Arrangement of two groupings of pallet gripper fingers, the vertical separation between which servo positioning drive 4623 automatically adjusts, provides for forced separation of one pallet (or grid, as applicable) from the top of a stack of same, such stack sitting on PC 4512 below PGSU 4500, or from the bottom of a stack accumulated on the pallet gripper adapter assembly 4600 or 4700, as applicable.

Pallet gripper adapter assembly 3100 of a given configuration has geometry that complements the geometry of key features of a pallet or grid to be gripped and, thus adapt PGSU 4500 for handling a given configuration of pallet and/or grid. Shown in FIGS. 61B and C is a pallet gripper assembly 4600 or 4700 with a pallet gripper adapter assembly 3100 for gripping a pallet having four rows (staggered) of four spaced hexagonal segments.

Operation of pallet gripper fingers in de-stacking process is depicted in sections FIGS. 61D-K, showing relationships between fingers 3122, 3132, 3152 and 3162 and respective pallet container lifting access/pallet lifting holes 545A, 545B, 545C, and 545D. Figures further depict a partial pallet stack held by pallet fingers. During de-stacking, pallet holding fingers 3122 and 3132 remain fixed vertically relative to pallet drive fingers 3152 and 3162, the vertical motion of which is servo actuated by pallet gripper assembly moving base plate 4660 (FIGS. 61B, C). In a "home" position, shown in FIG. 61D, flanges 3154 and 3164 of respective pallet drive fingers 3152 and 3162 engage walls 559(1C) and 559(1D) of bottommost pallet 502(1), and flanges 3124 and 3134 of respective pallet holding fingers 3122 and 3132 engaged walls 559 (1A) and 559(1B) of second bottommost pallet 502(2). As shown in FIG. 61E, pallet drive fingers 3152 and 3162 then stroke downward while engaging bottommost pallet 502(1), forcing bottommost pallet 502(1), if necessary, apart from second bottommost pallet 502(2) (and, thus, remainder of partial stack) still held in original position by engaged pallet holding fingers 3122 and 3132. As shown in FIG. 61F, pallet drive fingers 3152 and 3162 then horizontally retract into respective container lifting access/pallet lifting holes 545(C) and 545(D), disengaging walls 559(C) and 559(D), releasing bottommost pallet 502(1). As shown in FIG. 61G, pallet drive fingers 3152 and 3162 then stroke upward until elevation of their respective flanges 3154 and 3164 substantially matches (or is slightly lower than) elevation of flanges 3124 and 3134 of respective pallet holding fingers 3122 and 3132, thereby rendering them properly situated for engagement of pallet drive hooks 3152 and 3162 with walls 559(C) and 559(D) of pallet 502(2). As shown in FIG. 61H, pallet drive fingers 3152 and 3162 then horizontally advance, engaging walls 559(2C) and 559(2D), gripping new bottommost pallet 502(2). As shown in FIG. 61I, pallet holding fingers 3122 and 3132 then horizontally retract into respective container lifting access/pallet lifting holes 545(A) and 545(B), disengaging walls 559(A) and 559(B), enabling pallet drive fingers 3152 and 3162 to control vertical positioning of new bottommost pallet 502(2). As shown in FIG. 61J, pallet drive fingers 3152 and 3162 then stroke downward to "home" position while engaging new bottommost pallet 502(2), lowering remainder of partial stack formerly held in original position by engaged pallet holding fingers 3122 and 3132. As shown in FIG. 61K, pallet holding fingers 3122 and 3132 then horizontally advance, engaging walls 559(3A) and 559(3B), gripping new second bottommost pallet 502(3). This completes one pallet singulation cycle, forming a portion of a complete pallet (and, if applicable, grid) de-stacking cycle. This portion of a pallet (and, if applicable, grid) de-stacking process is also reversible, yielding a complementary portion of a pallet stacking process.

As can be seen in FIGS. 61L-S, during stacking, partial stacks of pallets and, if applicable, grids, accumulate on respective pallet/grid gripper assemblies 4600/4700. This is accomplished by repeated sequence of: infeed 4513 and PGSU 4512 PC indexing of a pair of laterally closely spaced pallets and, if applicable, grids nested thereon to below respective pallet/grid gripper assemblies 4600/4700 (FIG. 61L); pallet gripper assembly 4700 picking up of a pallet and, if applicable, pallet gripper assembly 4600 picking up of a grid, from a first side of conveyor 4512 (FIGS. 61M, N); shuttling of pallet/grid gripper assemblies 4600/4700 to above second side of conveyor 4512 (FIG. 61P); pallet gripper assembly 4700 picking up of a pallet and, if applicable, pallet gripper assembly 4600 picking up of a grid, from second side of conveyor 4512 (FIGS. 61Q, R); infeed 4513 and PGSU 4512 PC indexing of another pair of laterally closely spaced pallets 502 and, if applicable, grids 600 to below respective pallet/grid gripper assemblies 4600/4700 (FIG. 61S); pallet gripper assembly 4700 picking up of a pallet and, if applicable, pallet gripper assembly 4600 picking up of a grid, from a second side of conveyor 4512; shuttling of pallet/grid gripper assemblies 4600/4700 to above first side of conveyor 4512; and, pallet gripper assembly 4700 picking up of a pallet and, if applicable, pallet gripper assembly 4600 picking up of a grid, from first side of conveyor 4512 (similar to FIGS. 61M, N). This portion of the pallet (and, if applicable, grid) stacking process is also reversible, yielding a complementary portion of a pallet de-stacking process.

Integration of controls of PGWU 4500 and associated PC's 4511, 4512 and 4513 provide for iterative pallet 502, and, if applicable, grid 600, stacking and de-stacking. In stacking mode, on control system anticipation of pallet/grid gripper assemblies 4600/4700 reaching capacity of held partial stacks of pallets 502 and, if applicable, grids 600, infeed PC 4513 temporarily discontinues feeding pallets 502 and, if applicable, grids 600, in order for pallet/grid gripper assemblies 4600/4700 to remove remaining pallets 502 and, if applicable, grids 600 from PGSU PC 4512. Once PGSU PC 4512 is deplete, PC 4511, which adjoins PGSU PC 4512, and which participates in stacking and de-stacking of pallets 502 and, if applicable, grids 600, along with PGSU PC 4512, indexes its partial stacks (if present) to beneath pallet/grid gripper assemblies 4600/4700, which, in turn, deposit PGSU-held partial stacks onto PC 4511-supplied partial stacks (if present) below. PC's 4511 and 4512 then index accumulated stacks back onto PC 4511 if not complete, or beyond PC 4511 to storage, if complete, and stacking sequence resumes with pallet/grid input from PC 4513.

This portion of pallet (and, if applicable, grid) stacking is also reversible, yielding a complementary portion of a pallet de-stacking process.

Pallet & Grid Stack Accumulator (PGSA)

PGSA 3500 in a first embodiment comprises a pallet & grid storage conveyor array 3550 comprising several (four shown) equal-length horizontal servo-driven positioning PC's 3552, 3553, 3554, and 3555 spaced normally, vertically relative to one another and supported by a common frame. At each end of the PGSA storage conveyor array 3550 is a pallet & grid stack elevator (PGSE) 3510(1) and 3510(2) with an integral servo-driven positioning PC 3540(1) and 3540(2), respectively. PGSA 3500 temporarily stores stacks of pallets and grids of a first configuration produced on a substantially ongoing basis by a disassembly process. PGSA 3500 also dispenses stored stacks of pallets and grids of a different configuration required for a substantially ongoing assembly process. Having two PGSE's 3510(1) and 3510(2), PGSA 3500 can substantially simultaneously store and dispense pallets and grids to accommodate one PAU1 2100(1) in disassembly mode and a second PAU2 2100(2) in assembly mode.

PGSA 3500 stores pallet & grid adapters tools not in production at a given time. Further, PGSA 3500 receives, stages and dispenses such items as dictated by production schedule and tool handling algorithms maintained by control system, thereby facilitating automatic system configuration changes. Incorporation of at least two levels in PC array 3550 and two PGSE's 3510(1) and/or 3510(2) yields a carousel arrangement that provides stored item manipulation resulting in unrestrained access to any adapter tool.

Control system maintains geometry of pallets, grids, tools, PGSA 3500, as well as real-time operating status and can, therefore anticipate PGSA 3500 depletion and filling to capacity. On anticipated PGSA 3500 depletion of a pallet/grid stack supply, control system calls for transferal of a PATT 1200 'load' of pallet and grid stacks drawn from a 'permanent' designated field storage area to the PGSA 3500. PACTU 5000, transfers stacks of pallets and grids from PATT 1200 to PAS 2000 PC's for conveying to PGSA 3500 via PGSE's 3510(1) and/or 3510(2).

On anticipated PGSA 3500 filling to capacity of a pallet/grid stack supply, control system calls for transferal of a PATT 1200 'load' of pallet and grid stacks drawn from the PGSA 3500 to a 'permanent' designated field storage area. PAS 2000 PC's convey pallet and grid stacks from PGSA 3500 via PGSE's 3510(1) and/or 3510(2) to PACTU 5000, which transfers pallet and grid stacks from PAS 2000 PC's to PATT 1200 for transport to field-designated storage area.

PGSE's 3510(1) and 3510(2) service PGSA 3500 by transferring pallet and grid stacks between various PGSA PC 3552, 3553, 3554, and 3555 elevations and elevation of PC's with which PGSA 3500 interfaces.

Pallet Crossover Conveyor (PXC)

The first embodiment of PAS 2000 incorporates primarily two parallel lines of PC's, designated (A) and (B) where necessary in FIGS. 49-54, having interspersed equipment and having three interconnecting pallet crossover conveyors (PXC's). A first PXC, extends between the stack-handling side of first PGSU 4500(1) and PGSA 3500 comprises two lateral switch conveyors 2004(A1) and 2004(B1) and one lateral flow conveyor 2005(1) between switch conveyors 2004(A1) and 2004(B1). A second PXC, extends from between PAU 2100(1) and first PGRU 5500(1) to between PAU 2100(2) and second end of PGSA 3500, and comprises two lateral switch conveyors 2004(A2) and 2004(B2) and one lateral flow conveyor 2005(2) between switch conveyors 2004(A2) and 2004(B2). A third PXC, extends from PACTU 5000 PAU 2100(2), and comprises two lateral switch conveyors 2004(A3) and 2004(B3) and three lateral flow conveyors 2005(A3), 2005(C3) and 2005(B3) (in stated order) between switch conveyors 2004(A2) and 2004(B2).

Each switch conveyor, comprises an electric motor-driven cam, pneumatically, or comparably actuated lift table on which is mounted a roller conveyor having conveyor rollers interleaved with sync belt loops of a laterally flowing composite sync belt conveyor that is mounted to the frame forming the base of lift table.

In its lowered position, lift table supports rollers of the switch conveyor with the uppermost surface of each roller slightly below upper surface of the upper run of each sync belt forming switch conveyor. In its raised position, lift table supports rollers of the switch conveyor with the uppermost surface of each roller slightly above upper surface of the upper run of each sync belt forming the switch conveyor.

Conveyor loops, formed through incorporation of PXC's, enable PAS to retrieve PA's from a PATT, perform multiple functions on the plant material in those PA's, and return subject plant material, potentially in differently configured PA's, to potentially the same PATT from which it was retrieved, in a continuous manner.

First PXC 2004(A1)-2005(1)-2004(B1) provides a PC link as stated, though, through programmable controls of system, provides for lateral shifting of items on line (A) or (B). Either switch PC 2004(A1) or 2004(B 1) can also be used for PAS loading and unloading of a PAS adapter tool having been serviced or about to be services, respectively.

Second PXC 2004(A2)-2005(2)-2004(B2) primarily provides for feeding of PGWU 5700 from both PAU's 2100(1,2) operating in disassembly mode, as in the case of plant material shipping. Second PXC 2004(A2)-2005(2)-2004(B2) can also provide for feeding from PGSA of both PAU's 2100(1,2) operating in assembly mode, as in the case of plant material receiving or potting, particularly while PGWU 5700 is being serviced. Also, second PXC 2004(A2)-2005(2)-2004(B2) forms part of a PC loop for the processing of PA's as whole units (i.e., involving no disassembly). In this case, PACTU 5000 retrieves PA's from PATT 1200 and places them on PC 5001, from which PA's flow through first PAU 2100(1) untouched, then across second PXC 2004(A2)-2005(2)-2004(B2) then through second PAU 2100(2) untouched, then along PC 2003(B3), then across third PXC 2004(B3)-2005(B3)-2005(C3)-2005(A3)-2004(A3) (or an alternate parallel path), then along PC 2003(A3) to PC 5002, from which PACTU 5000 retrieves it and returns it to PATT 1200.

Third PXC 2004(B3)-2005(B3)-2005(C3)-2005(A3)-2004(A3), together with additional, like-constructed parallel PXC's 2004(B4)-2005(B4)-2005(C4)-2005(A4)-2004(A4), etc., with respective connecting PC's 2003(B4), 2003(A4), etc., form a semi-automatic weeding area. PC's 2005(C3), 2005(C4), etc., are each slow-, constant-speed PC's along the two sides of which are stationed weeding workers who hand weed plant material in PXC-borne PA's. Lateral conveyor portions of switch PC's 2004(B3), 2004(B4), etc, as well as lateral PC's 2005(B3), 2005(B4), etc. are servo positioning. With more than one weeding area PXC operating, PC 2003(B3) accumulates the number of PA's matching the number of weeding area PXC's operating, up to the maximum number of weeding area PXC's incorporated into PAS (4 shown). Number of PXC's operating in weeding area is extrapolated from the average amount of time necessary for one weeding worker to weed one containerized plant palletized and flowing along a given PXC as described, and the required production throughput established by nursery management, up to the PAS operational limit.

Once switch PC's 2004(B3), 2004(B4), etc. are clear of prior-conveyed PA's, PC's 2003(B3)-2004(B3)-2003(B4)-2004(B4), etc., quickly distribute to the active switch PC's 2004(B3), 2004(B4), etc. pairs of PC 2003(B3)-accumulated PA's. Once trailing edges of preceding PA pairs have crossed respective transitions between lateral PC's 2005(B3) and 2005(C3), 2005(B4) and 2005(C4), etc., switch PC's 2004(B3), 2004(B4), etc., simultaneously switch directions and PA's on respective switch PC's 2004(B3), 2004(B4), etc., are quickly conveyed along respective PXC's to close gaps between their respective leading edges and the preceding PA's trailing edges. Upon closure of subject gaps, speed of lateral PC portion of each switch PC 2004(B3), 2004(B4), etc. and of respective lateral PC 2005(B3), 2005(B4), etc. matches that of lateral PC 2005(C3), 2005(C4), etc. Thus, a continuous slow-speed flow of palletized plant material is conveyed past weeding workers.

Once trailing edges of preceding PA pairs have crossed respective transitions between lateral PC's 2005(C3) and 2005(A3), 2005(C4) and 2005(A4), etc., preceding PA pairs are quickly conveyed along respective PXC's, onto switch PC's 2004(A3), 2004(A4), etc., opening gaps between their respective trailing edges and the succeeding PA's leading edges. This provides time for switch PC's 2004(A3), 2004(A4), etc. to simultaneously switch directions and quickly convey switch PC-borne PA pairs to PC's 2003(A3) and 5002, where they accumulate in staging for transfer to PATT 1200 by PACTU 5000.

Below weeding area PXC's are conventional belt conveyors 2012 and 2014 for collecting pulled weeds from PXC weeding stations and conveying them to a weed collection container 2011 or equivalent.

Weeding area 2010 PXC's may incorporate side walls extending a short distance above sides of PC's to prevent inadvertent movement of PA's by weeding workers. Weeding workers reach stations by overhead walkways (not shown) and may be provided with stools for comfort. PAS semi-automatic weeding area 2010 presents a comfortable weeding environment, presenting a tremendous improvement over conventional field hand weeding—an operation performed by workers who typically must bend over to reach and pull weeds. Conventional hand weeding has contributed to worker back injuries and has actually been banned in the State of California. PAS 2000, including weeding area 2010, is under roof, enabling production during inclement weather and shading workers from direct sunlight, furthering comfort factor and associated worker productivity. Finally, artificial lighting of PAS weeding area 2010 provides for production at night as well as day.

PAS EMBODIMENT 1 OPERATION

PAS 2000 can operate in following modes: open loop, container closed-loop, and pallet assembly (PA) closed-loop. These modes are achieved through recipe-driven, microprocessor-based control, substantial integration of controls and process and the ability of most PAS 2000 components to operate reversibly.

Open-loop mode is characterized by generally single-direction movement of containerized plants through PAS 2000, and can have following variations: 'serial-in', 'serial-out', 'serial-in/out', 'parallel-in', and 'parallel-out'.

'Serial-in' mode comprises: conveying of individual containerized plants or trays/flats of plants from a location outside the nursery internal growing areas—typically the nursery's shipping/receiving area—to one PAU 2100(2), along with conveying of pallets, and, if applicable, grids, from PGSU 4500(2) which singulated pallets from stacks drawn from PGSA 3500, through PGSE 4510(2); installation by PAU 2100(2) of associated containerized plants or trays/flats of plants into pallets; conveying of completed PA's from PAU 2100(2), along PC path 2003(B3)-2004(B3)-2005(B3).-2005 (C3)-2005(A3)-2004(A3)-2003(A3), to PC's 5002 and 5001 interfacing with PACTU 5000; and transfer by PACTU 5000 of PA's from PACTU interface PC's 5002 and 5001 to a PATT 1200 for transport to a nursery internal growing area.

'Serial-out' mode is effectively the reverse of 'serial-in', though incorporates rinsing of pallets, and, if applicable, grids, by PGWU 5700. This mode comprises: transfer by PACTU 5000 of PA's from a PATT 1200—received from a nursery internal growing area—to PACTU interface PC's 5001 and 5002; conveying of PA's from PACTU interface PC's 5001 and 5002 to a second PAU 2100(1); removal by associated PAU 2100(1) of containerized plants or trays/flats of plants from pallets and placement of containerized plants or trays/flats of plants on CAIDOC 2107(1); conveying of pallets and, if applicable, nested grids, to and rinsing by PGWU 5700, conveying to and subsequent stacking by second PGSU 4500(1), and conveying of resulting stacks to PGSA 3500-through PGSE 4510(1)—for temporary storage; and, conveying of containerized plants from associated PAU 2100(1) to a location outside the nursery internal growing areas—typically the nursery's shipping area.

'Serial-in/out', 'parallel-in' and 'parallel-out' modes are possible due to incorporation of two properly arranged PAU's 2100(1) and 2100(2) and associated PC's and CPC's in the PAS 2000. 'Serial-in/out' is characterized by PAS 2000 split operation wherein a first part of the PAS 2000 operates in the 'serial-in' mode, like that described above while a second part operates in 'serial-out' mode, also like that described above. Different plant material types and pallet configurations would typically be processed by each part as the PAS 2000 operates in 'serial-in/out'mode. 'Parallel-in' and 'parallel-out' modes are characterized by both parts of the PAS 2000 operating in 'serial-in' and 'serial-out' modes, respectively. 'Parallel' PAS 2000 operation provides for substantially increased system throughput relative to single, 'serial' operation, accommodating seasonal peaks, e.g., order filling/shipping.

Container closed-loop mode is characterized by: transfer by PACTU 5000 of PA's of containerized plants or PA's of trays/flats of plants from a PATT 1200—received from a nursery internal growing area—to PACTU interface PC 5001; conveying of PA's from PACTU interface PC 5001 to PAU 2100(1); removal of containerized plants or trays/flats of plants, as applicable, from the associated PA's by PAU 2100 (1); conveying of associated containerized plants or trays/flats of plants, as applicable, from PAU 2100(1) to a central processing area (e.g., potting, individual plant weeding, pruning, inspection/grading/sorting, etc.); conveying of emptied pallets and, if applicable, grids from PAU 2100(1) to PGWU 5700; washing of emptied pallets and, if applicable, grids by PGWU 5700; conveying of washed pallets and, if applicable, grids to PGSU 4500(1) and resulting stacks to PGSA 3500 for temporary storage; conveying of stacks of pallets and, if applicable, grids,—potentially different from those stored immediately prior—from PGSA 3500 to PAU 2100(2); conveying of containerized plants from central processing area to PAU 2100(2); installation of (potentially newly potted) containerized plants into PA's by PAU1 2100(2); conveying of reassembled PA's from PAU 2100(2) to PACTU interface PC 5002; and transfer of reassembled PA's from PACTU interface PC 5002 to PATT 1200—potentially the same as that on which PA's were received—by PACTU 5000, for return to a nursery internal growing area. PAS 1500 may also simply remove containerized plants from contiguous container PA's 400, convey them through an idle or unmanned processing area, and install them into spaced container PA's 500. Further, if operation is limited to a pallet change from contiguous to spaced or vise versa, i.e., such that associated containers are not altered and no manipulation or alteration of the plant itself is involved, PAU 2100(1) can simply reach across CAIDOC 2107(1) and retrieve individual containerized plants exiting PAU 2100(2) on container conveyor 1700, with proper indexing control of container conveyor 1700.

PA closed-loop mode is characterized by: transfer by PACTU 5000 of PA's of containerized plants or PA's of trays/flats of plants, as applicable, from a PATT 1200—received from a nursery internal growing area—to a PACTU interface PC 5001; conveying of PA's as units from PACTU interface PC 5001 to a central plant material processing area 2010 (e.g., weeding, pruning, inspection/grading/sorting, etc.)(FIGS. 49, 50, 51, and 54); conveying of PA's from central plant material processing area 2010 to PACTU interface PC 5002; and transfer by PACTU 5000 of PA's from PACTU interface PC 5002 to PATT 1200—potentially the same as that on which PA's were received—, for return to nursery internal growing area—potentially substantially the same as that from which plant material originated.

PALLET ASSEMBLY GREENHOUSE TRANSFER UNIT (PAGTU) EMBODIMENT 1

An autonomously guided pallet assembly greenhouse transfer unit (PAGTU) 4000, in accordance with a first embodiment of the invention, is illustrated in FIGS. 62A-T. PAGTU 4000 provides for autonomous transfer of PA's between PATT 1200 and potentially confined bed space 125, as well as autonomous transfer of pallet and grid stacks between PATT 1200 and potentially confined storage space—typically unused bed space. PAGTU 4000 requires a relatively narrow operating path and low vertical clearance in order to perform these functions, and utilizes primarily RTK GPS for resolution of its position and attitude, rendering PAGTU 4000 ideal for operating inside a greenhouse, as well as out in a field.

First embodiment of PAGTU 4000 comprises a specialized forklift-type unit having a tricycle traction wheel arrangement, where all wheels are servo position-driven. PAGTU main carriage 4020 comprises framework for mounting two fixed-direction pneumatic tired traction wheels 4060(L) and 4060(R), respectively mounting sync belt sprockets 4057(L) (not shown) and 4057(R), coupled sync belts 4056(L) (not shown) and 4056(R), coupled drive motor sync belt sprockets 4055(L) and 4055(R), and servo positioning gearmotors 4054 (L) and 4054(R), in protective shrouds 4058(L) (not shown) and 4058(R). Main carriage 4020 also mounts via a rotary joint 4083 having a vertical centerline a second carriage 4080, which, in turn, mounts two closely laterally spaced additional traction wheels 4081(L) and 4081(R) driven by a common servo positioning gearmotor 4040 through differential 4084. This arrangement provides for minimal skidding of tires in tight turns. Main carriage 4020 also houses a battery or, alternately, a prime mover, e.g., a gasoline or diesel engine, and a fuel tank. Each alternative satisfies the need for counterweight enabling PAGTU 4000 to maintain its stability during lifting of heaviest PA's anticipated in operation. Finally, main carriage 4020 houses PAGTU control system, including RTK GPS-related components.

Second carriage 4080, best seen in FIGS. 62C and D, mounts to main carriage 4020 through a rotary joint 4083 that swivels about a vertical axis, driven by a servo positioning gearmotor 4036, through sync belt sprocket 4037, sync belt 4038, and sync belt sprocket 4039. This arrangement in part provides for active steering of PAGTU 4000. Mounted to PAGTU second carriage 4080 is a differential 4084, which, in turn, mounts on its two output shafts tired traction wheels 4081(L) and 4081(R). Differential input shaft centerline is common to vertical centerline of PATU second carriage 4080 rotary joint. Differential is driven by servo positioning gearmotor 4040, through sync belt sprocket 4041, sync belt 4042, and sync belt sprocket 4043—mounted to differential input shaft. This arrangement provides traction drive of PAGTU 4000 swivel wheel. Programmable nature of control system enables positioning steering and traction drive outputs to be mixed during PAGTU turning, averting slippage between traction wheels and the ground, thereby preserving high machine drive efficiency and minimal bed impact.

Third carriage 4100, best seen in FIGS. 62E and F, mounts to main carriage 4020 through rotary joints 4064(L) and 4064(R) (not shown) that provide for pitching of third carriage 4100- and those mounted thereon—about a horizontal axis parallel to centerline common to main traction wheels 4060(L) and 4060(R), relative to main carriage 4020. Pitch of PAGTU third carriage 4100 is driven by a servo positioning hydraulic or equivalent actuator pair 4062(L) and 4062(R), each actuator of which is pinned to PAGTU main carriage 4020 at one end and to PAGTU third carriage 4100 at the other end, allowing for inherent angular changes between PAGTU main carriage 4020, actuators 4062(L) and 4062(R), and PAGTU third carriage 4100.

PAGTU third carriage 4100 also incorporates a pivoting joint 4121 and an arcuate track 4108 providing for pivotal mounting of fourth carriage 4120—a lift mast—about an axis falling in a vertical plane centered between traction wheels 4060(L) and 4060(R) and perpendicular to track of lift mast 4120, i.e., roll. A servo gearmotor 4102, mounted to PAGTU third carriage 4100, in turn, mounts a sync belt sprocket 4103. A first end of a pair of laterally spaced open-ended sync belts 4105, attaches to a first end of an arcuate pulley 4107 that is part of PAGTU lift mast 4120. Sync belt 4105 pair engages and is returned by gearmotor-driven sync belt sprocket 4103 and terminates at its second end at clip 4109. Clip 4109 couples second end of sync belt 4105 pair to first end of an opposing open-ended sync belt 4106, which engages and is returned by idler sprocket 4106, passes between spaced sync belts 4105, and ultimately terminates at second end of arcuate pulley 4107.

Combination of PAGTU third 4100 and fourth 4120 carriages provide for active programmable pitching and rolling, respectively of PAGTU fork 4300, as necessary for PAGTU 4000 engagement of PA's in undulating bed space that contains PA's that PAGTU 4000 must retrieve or that is to receive PA's that PAGTU 4000 must place. It also enables a PAGTU 4000 situated on a first ground surface plane to drive the plane of its fork tines to be parallel with that of any deck of a PATT 1200 situated on a second ground surface plane, which is not parallel to first ground surface plane.

Fork lift mast 4120 incorporates linear bearings 4125, which, together with linear bearings 4163 at the base of fork lift first stage 4160 guide fork lift first stage 4160 along length of fork lift mast 4120. Fork lift mast 4120 also mounts a pair of laterally spaced hydraulic cylinders 4122(L) and 4122(R) or equivalent for driving fork lift first stage 4160 longitudinally along fork lift mast 4120. Upper end of fork lift first stage 4160 incorporates pulleys 4164 and 4165. Fork lift mast 4120 also mounts another hydraulic cylinder 4123 or equivalent, which drives downward, parallel to fork lift first stage motion, and has a pulley block 4142 incorporated into its lower, downwardly extending end. An open-ended belt 4127 is fastened at a first end 4126 to fork lift mast 4120, then extends downward, parallel to fork lift first stage 4160 motion, to and wraps half way around cylinder 4123-actuated pulley 4142. Belt 4127 then extends upward, parallel to fork lift first stage 4160 motion, to fork lift first stage pulleys 4164. Belt 4127 wraps over collective tops of fork lift first stage pulleys 4164 and 4165, and finally extends downward, parallel to fork lift first stage 4160 motion, to a clamp 4187 on fork lift second stage 4180, where belt 4127 terminates.

Fork lift first stage 4160 further incorporates a longitudinal track traversed by fork lift second stage, running on bearings 4182. Lightning rods 4167 and associated conductors and grounding electrodes are also provided to protect PAGTU 4000 operating in a inclement weather Extension of cylinder 4123 and related motion of pulley block 4142, while maintaining cylinders 4122(L) and 4122(R) retracted, drives fork lift second stage 4180 longitudinally along fork lift first stage 4160 as fork lift first stage 4160 remains retracted, fully nested in fork lift mast 4120. Incorporation of pulley 4142 further causes distance traveled by fork lift second stage 4180 to be double the stroke of cylinder 4123. Operation of cylinder 4123 keeps fork lift height to a minimum to allow PAGTU 4000 to work inside a greenhouse, where ceiling height is often limited, as depicted in FIGS. 62G-N. It also promotes PAGTU 4000 stability by keeping PAGTU 4000 center of gravity low relative to that resulting from a strict telescoping mast. Depicted arrangement, where cylinder 4123 is mounted in upper half of fork lift mast 4120 may be altered to further reduce PAGTU 4000 center of gravity by relocating cylinder 4123' in lower half of fork lift mast 4120 and adding one more pulley immediately below it, such that belt 4127' extends from pulley 4165, downward to below pulley below relocated cylinder 4123', and up, over top of cylinder 4123-mounted pulley block 4142', and back down to terminating clip, yielding the same effect on PAGTU fork lift second stage 4180 as depicted arrangement.

Extension of cylinders 4122(L) and 4122(R) and related motion of fork lift first stage 4160, while maintaining cylinder 4123 retracted, drives fork lift second stage 4180 longitudinally along fork lift first stage 4160 as fork lift first stage 4160 upwardly extends relative to fork lift mast 4120. Incorporation of pulleys 4164 and 4165 further causes distance traveled by fork lift second stage 4180 to be double the stroke of cylinders 4122(L) and 4122(R). Operation of cylinders 4122(L) and 4122(R) causes telescoping of fork lift mast 4120, first stage 4160 and second stage 4180, enabling PAGTU fork 4300 to engage uppermost decks of PATT 1200 for transferring PA's between PAGTU 4000 and PATT 1200, as shown in FIGS. 62P-S.

Mounted to fork lift second stage 4180 is an articulated fork 4300, joined to fork lift second stage 4180 by slender, pivoting, tandem-connected members 4200 and 4220. Members 4200 and 4220 and fork 4300 swivel in a plane parallel to the one containing fork 4300 tines. Members 4200 and 4220 and fork 4300 also present a sufficiently vertically compact assembly to operate between two adjoining decks of a PATT 1200. Fork articulation first drive servo gearmotor 4186 is mounted to fork lift second stage 4180. First end of fork first articulating member 4200 is mounted to and reciprocally driven by output shaft of servo gearmotor 4186. Second end of fork first articulating member 4200 mounts fork articulation second drive servo gearmotor 4204. First end of fork second articulating member 4220 is mounted to and reciprocally driven by output shaft of servo gearmotor 4204. Second end of fork second articulating member 4220 mounts fork articulation third drive servo gearmotor 4224. Base of fork 4300 is mounted to and reciprocally driven by output shaft of servo gearmotor 4224.

Two spaced GPS antennas 4022 and 4024 (along with other requisite PAGTU-borne GPS equipment) enable PAGTU position and attitude to be determined. Incorporation of position-measuring control system devices typically associated with servo positioning system provide for accuracy of PAGTU RTK GPS-based attitude calculations to be increased with articulated fork 4300 extended.

Coordination between fork articulation members to achieve straight-line motion in substantially an infinite number of directions within operating plane of articulating members is readily achievable with PAGTU 4000 programmable motion controls and stated servo devices. FIGS. 62G-N illustrate a process whereby PAGTU fork 4300 engages and retrieves a PA laterally adjoining a narrow lane earlier cleared of PA's by PAGTU 4000. FIG. 62G shows PAGTU 4000 entering area, with its fork 4300 horizontally retracted and at an elevation in which tines readily pass over the tops of canopies of plant material adjoining lane cleared earlier by PAGTU 4000. Strictly fork lift second stage 4180 is elevated while fork lift first stage 4160 remains retracted, keeping fork lift height to a minimum. FIG. 62H shows PAGTU 4000 having realigned its fork 4300 to match direction of planned engagement with target PA, while maintaining previous elevation, thereby clearing the tops of canopies of adjoining plant material as stated. At this stage, swivel traction wheel is turned in anticipation of turning PAGTU to follow up fork 4300 to ensure a stable state for lifting PA. FIG. 62I shows PAGTU 4000 having lowered its fork 4300 to match the elevation of the target PA, completing pre-engagement alignment with PA. Articulated fork members can finely position fork 4300 upon coarse positioning of more massive PAGTU main carriage. FIG. 62J shows PAGTU 4000 having linearly and laterally advanced its fork 4300 into engagement with target PA. FIG. 62K shows PAGTU 4000 in the process of turning to align its track with fork 4300 for stability as needed for handling a PA of relatively greater weight. FIG. 62L shows PAGTU 4000 having lifted target PA above tops of canopies of adjoining plant material as necessary for further PAGTU maneuvering. FIG. 62M shows PAGTU 4000 with fork 4300 holding lifted target PA drawn horizontally into alignment with PAGTU 4000 track, minimizing lateral protrusions and maximizing stability for PAGTU 4000 travel to PA drop-off point.

FIGS. 62P-S illustrate a PAGTU 4000 placing or retrieving a PA on an uppermost deck of a PATT 1200, on the side distal to the subject PAGTU 4000. Telescoped configuration of subject PAGTU 4000 as necessary to reach PATT 1200 uppermost deck, is shown. Mast 4120 is pitched and rolled as necessary for fork 4300 to achieve parallelism with PATT 1200 decks. Fork articulation members 4200 and 4220 enable fork 4300 to reach far side of PATT, as well as provide for fine lateral adjustment of fork 4300 relative to target position on PATT 1200.

As can be seen in FIGS. 62P-S, auxiliary fork support wheels 4362(L) and 4362(R), mounted to base of fork 4300, are automatically lowered by respective pneumatic cylinders 4361(L) and 4361(R) to provide supplemental stabilization of fork 4300 as PAGTU 4000 reaches across the deck of a PATT 1200 to place or retrieve a PA.

Details of a fork 4300 having tines 4350, the lateral spacing of which can be adjusted, are shown in FIGS. 62T and U. As shown in FIG. 62T, an optional pantograph arrangement, comprising links 4353 and 4354, force linked tines 4351 and 4352 to be parallel to one another, thereby stiffening central tines against lateral bowing. Such bowing tendency is induced by pallet-centering gussets (discussed earlier), which tend to drive apart tines adjoining pallet support columns, where gussets are incorporated. Because alignment between of one row of pallet segments results in alignment of all rows of pallet segments, incorporation of a stiffening arrangement on outermost tines 4350 yields no substantial benefit. Distances between tines are set to equal the diameters or equivalent at which the gussets meet the bottoms of the pallet container receptacles or the projected bottoms of the grids, as applicable.

Details of quick-adjusting/release fork tines 4350/4351/4352 are shown in the section view of FIG. 62U. Fork base 4301, with swivel motor shaft attachment 4302, incorporates a downward opening channel section, having flanges with lips producing laterally tapered grooves 4303 and 4304 opening toward one another on opposing sides of section, near bottom. A suitable number of fork tine mounts 4321 having fingers 4322 and 4323, which engage respective grooves, are slid into engagement with fork base 4301 from one end or the other of fork bas 4301. Each tine 4350/4351/4352 is locked in place by squeezing of tine cam lock drive rod arm 4337 against backup arm 4336. Cam lock drive rod 4329, in turn, pushes against spring 4327, which, in turn, pushes against cam lock actuation arm 4326, which rotates fork tine locking cam 4324 about pivot pin 4325 and against fork base groove 4304 wall. Pushing tine cam lock drive rod arm 4337 sufficiently causes pawl 4334 of spring-loaded latch 4332 to engage groove 4331 of cam lock drive rod 4329, holding cam lock drive rod 4329 in place. A wedging action results in a tight friction fit between tine mount 4321 and fork base 4301. Releasing fork tines 4350/4351/4352 is achieved by squeezing of tine cam lock drive rod arm 4337 against tine cam lock drive rod release arm 4335, then releasing. Squeezing action causes latch pawl 4334 to disengage groove 4331, thereby releasing tine cam lock drive rod 4329, etc. Pin 4339 maintains engagement between tine cam lock drive rod 4329 and tine mount 4321. Recesses 4328 and 4330 provide space for spring 4327 of proper force and rate to achieve desired grip.

As is familiar to those skilled in the art, PAGTU 4000, regardless of embodiment, incorporates safety sensors comprising radar, infrared, or equivalent, to safeguard personnel and equipment against potential harm by PAGTU 4000.

PAGTU 4000 preferably operates in automatic mode, wherein it maintains an operational map, and automatically picks from a field or greenhouse and places on a PATT 1200, vise versa, or some combination thereof in an order dictated by queues it maintains with updates radioed it by master control system. PAGTU 4000 also operates in a semi-automatic mode, wherein, an operator utilizes an RTK GPS-based probe (e.g. 180, FIG. 64A) to pinpoint PA's and radio such information directly or indirectly (i.e., through master control system) to PAGTU for retrieval. PAGTU also operates in manual mode, wherein PAGTU takes "direct" instruction from an operator with a radio HMI. Manual mode may still entail PAGTU control system-based coordination of fork articulation members to enable fork to respond to stroking of a joystick with linear motion.

PALLET ASSEMBLY FIELD TRANSFER UNIT (PAFTU) EMBODIMENT 1

A first embodiment of a PAFTU 1100, shown in FIGS. 1, and 63A-I, comprises an autonomously guided mobile bridge 1102 with a longitudinal track 1103, which a servo-driven pallet assembly handling first carriage 1114 traverses. Bridge 1102 operates above and provides for servicing of one or more nursery beds 125. Bridge 1102 is at sufficient height to pass over irrigation sprinkler heads 129, which are normally elevated via vertical risers 130 above anticipated tops of plant material canopies 223. Position of bridge 1102 is detected at two GPS antennas 1104 and 1105—one located at each end of bridge 1102—, providing for derivation of attitude (including heading) and velocity of bridge 1102. GPS antennas 1104 and 1106 feed a GPS receiver 1111 operating in RTK GPS mode. GPS receiver 1111 also receives GPS error correction radio signal 120 from GPS base station 112, needed for RTK GPS mode. PAFTU control system 1129 also via a radio link 122 communicates with master control system at base station 112 to obtain operating instructions and provide feedback. Water-resistant design and lightning rods 1160, located at machine high points, facilitate machine operation in inclement weather. Heavy copper electrical conductors carry lightning borne electrical current to grounding electrodes 1161 on extreme ends of machine, along paths reasonably distal to sensitive machine control system electronics.

As shown in FIG. 63A, Bridge 1102 is supported by two bridge supports 1116 and 1119 which are each, in turn, supported by two servo-steered, servo-driven traction wheel assemblies 1124. Traction wheel assemblies 1124 are each attached to each bridge support 1116 and 1119 through a joint that provides for swiveling of each traction wheel 1125, about a vertical axis centered on the traction wheel 1124. Steering of traction wheels 1124 is accomplished via servo drive of each swivel joint 1126. Steering of each traction wheel 1124 provides for preferred working movement of pallet assembly field transfer machine 1100 lateral to bridge 1102 longitudinal axis, as well as travel movement of machine 1100 parallel to bridge 1102 longitudinal axis, thus enabling machine 1100 travel on typical nursery vehicular driveways 127. Further, PAFTU 1100 may turn about any radius of curvature, including zero, i.e., about the center of machine 1100, for maneuvering in tight areas.

PAFTU bridge supports 1116 and 1119 engage bridge 1102 via a second track 1115 on bridge 1102, providing for adjustment of longitudinal positions of bridge supports 1116 and 1119 on bridge 1102. Adjustability of positions of bridge supports 1116 and 1119 provides for operation of traction wheels 1125 in aisles 126 between relatively narrow beds 125 while simultaneously having one end of bridge 1102 positioned proximal to one side of a driveway 127, on either end of bridge 1102, where a PATT 1200 operates, thereby facilitating pallet assembly transfer between PAFTU 1100 and PATT 1200. Adjustability of positions bridge supports 1116 and 1119 also enables bridge supports 1116 and 1119 to operate on paths that are clear of irrigation sprinkler heads 129 and related exposed plumbing 130. Failsafe brakes 1117 and 1122, which provide for fixing positions of both bridge supports 1116 and 1119 along bridge 1102, are interlocked to fix at least one bridge support 1116 or 1119 at all times for safety.

Adjustment of positions of bridge supports 1116 and 1119 along bridge 1102 may be accomplished one at a time automatically by a programmed sequence comprising: release of strictly brake 1117 or 1122 which frees the position on bridge 1102 of one bridge support 1116 or 1119; swiveling of both traction wheels 1125 on one bridge support 1116 or 1119 to drive parallel to one another and generally along longitudinal axis of bridge 1102; activating associated traction wheels 1125 to drive swiveled bridge support 1116 or 1119 to achieve the desired position of the "free" bridge support 1116 or 1119 on bridge 1102; then reapplying the released brake 1117 or 1122. Such an adjustment can be accomplished 'on the fly'—either traveling or working—through a similar sequence. Encoders or equivalent position measuring devices, or even an RTK GPS antenna mounted on each bridge support 1116 and 1119 can provide suitable bridge support position information. Physical travel stops 1118 and 1123 limit movement of bridge supports 1116 and 1119 along bridge 1102 to ensure stability of bridge 1102.

PAFTU prime mover 1127, comprising an internal combustion engine driving an electrical alternator with a DC rectifier package, is preferably situated with its fuel tank 1128 at a relatively low elevation on one of the bridge supports 1116 or 1119, to aid in lowering the machine's center of gravity, thus, promoting machine stability. The internal combustion engine further has an in-line cylinder arrangement to minimize prime mover 1127 width, in keeping with the desirability of locating bridge supports 1116 and 1119 in space above relatively narrow aisles 126 between nursery beds 125.

Pallet handler first carriage 1114 houses the machine's master control system 1129 and operates semi-autonomously on bridge 1102. Pallet handler first carriage 1114 obtains electrical power through electrical brush-type contacts that run against a bus bar 1132 extending the length of bridge 1102. Similar arrangements provide for electrical power transmission between bridge supports 1116 and 1119 and bridge 1102. Low-level control signal communication between bridge 1102, bridge supports 1116 and 1119 and pallet handler first carriage 1114 are preferably accomplished via radio or infrared links between those components. Near real-time control/status communication among all communicating machine components and between PAFTU 1100 and master control system at base station 112 assures overall system integrity required for safe autonomous operation.

As shown in FIG. 63B, pallet handler first carriage 1114 incorporates a first linear bearing assembly 1121 movably attached to bridge track 1103, as well as a second linear bearing assembly 1133 movably attached to vertical linear track 1134 of a slender second, elevator, carriage 1135 of pallet handler. Pallet handler first carriage 1114 further provides servo drive for movement of attached pallet handler elevator carriage 1135 along track 1134. Lower end of pallet handler elevator carriage 1135 connects to one end of a linear, slender pallet handler third carriage 1138 through a rotary joint 1137 having a servo-driven angular positioner which swivels pallet handler third carriage 1138 in yaw substantially about longitudinal vertical centerline axis 1136 of pallet handler elevator carriage 1135. Opposite end of pallet handler third carriage 1138 also has a swivel joint 1141 with a servo-driven angular positioner for swiveling, also in yaw, a fourth carriage 1143, which acts as a wrist for the remaining carriages making up a fork assembly. Fourth carriage 1143 connects through horizontal swivel joint 1144 to a fifth carriage 1145. Swivel joint 1144 provides for minor rolling motion of assembly of succeeding carriages, accommodating machine operation on ground that undulates in direction lateral to fork tines. Fifth carriage 1145 is elongated perpendicular to swivel joint 1144, generally horizontally. Protruding from the longitudinal ends of fifth carriage 1145, and aligned with one another are swivel joints 1146, which provide for minor pitching motion of assembly of succeeding carriages, accommodating machine operation on ground that undulates in direction parallel to fork. Succeeding carriages are effectively a fork assembly, having a base 1147.

Fork 1147 is movably attached to fork pitch rotation joint 1146 and is shown having size suitable for handling of one PA 300, 400 or 500, though could be potentially sized to handle more than one PA's 300, 400 or 500 simultaneously. Fork tines 1153 are shaped and spaced to provide for lifting of PA's 300, 400 or 500 from beneath bottoms of mounted containerized plants 200 as discussed above. Preferably, spacing and number of fork tines 1153 are adjustable to correspond to the number of container receptacle rows in handled PA's 300, 400 or 500.

As shown in FIGS. 63C-G, PAFTU 1100 provides for automatic lifting and transferring PA's 300, 400 or 500, either from a nursery bed 125 to an available space on a proximal autonomously guided pallet assembly transport train 1200, or vise versa, while maintaining traction wheels outside of nursery bed 125 space. For high positioning accuracy, RTK GPS antennas 1104 and 1106 are mounted at the longitudinal ends of bridge 1102 and high-resolution position encoders or equivalent, along with strategically situated discrete proximity or equivalent sensors/switches and numerous programmed position, velocity, and acceleration calculations in the PAFTU control software, locate PAFTU elements relative to RTK GPS antennas 1104 and 1106. One or more GPS antennas, while not shown, may as well be incorporated into fork for position sensing. Coordinated movement of pallet handler first carriage 1114 along bridge 1102 and rotation of pallet handler third carriage (link) 1138 about yaw swivel axes 1136 and 1139 at two ends of pallet handler third carriage (link) 1138 accomplishable through circular numerical controls (CNC), enables fork 1147 to move linearly, generally perpendicular to bridge 1102 to engage PA's 300, 400 or 500 without movement of bridge 1102, itself. Dual yaw swivel joints of pallet handler third carriage 1138 and coordinated movement by same elements also allows for compensation in placement of PA's 300, 400 or 500 on or retrieval of PA's 300, 400 or 500 from coarsely positioned PATT 1200, wherein linear movement of fork 1147 in a direction typically generally parallel to bridge 1102 longitudinal axis is necessary.

FIGS. 63H and I depict two different nursery bed configurations, 125(A) and 125(B), respectively, which can be serviced by PAFTU 1100 and an associated PATT 1200, and configurations of PAFTU 1100 necessary for such servicing. FIG. 63H depicts beds 125(A) having narrow aisles 126(A) in which PAFTU 1100 traction wheels operate upon proper alignment of bridge supports 1116 and 1119 with such aisles 126(A). These aisles 126(A) are automatically selected over similar aisles having irrigation sprinkler heads 129(A). Parallel to narrow aisles 126(A) are driveways 127(A) interspersed at key locations for operation of PATT 1200, suitable for interacting with PAFTU 1100.

FIG. 63I depicts beds having narrow aisles 126(B) that run perpendicular to and between driveways 127(B) on which PAFTU 1100 traction wheels operate with proper alignment of bridge supports 1116 and 1119. In this case, bridge support 1116 is placed across a first driveway 127(B 1) from PAFTU 1100-engaged bed 125(B) to enable PAFTU 1100 to engage PA's in a direction parallel to bridge 1102. Bridge support 1119 is placed in a second driveway 127(B2), adjoining PAFTU 1100-engaged bed 125(B). Next to bridge support 1119 in driveway 127(B2) is PATT 1100, situated to interact with PAFTU 1100.

Nursery Automation System Mapping Tools

Automation in accordance with invention necessitates digitally mapping the nursery automation system operating area 111 (FIG. 1) utilizing RTK GPS-based mapping tools. Given that RTK GPS requires establishment of a base station for receiving GPS satellite signals and providing a fixed GPS satellite signal receiving point to which base station GPS receiver refers in the generation of an error correction signal, such base station 112 and associated reference point must be established prior to utilization of RTK GPS-based mapping tools. Upon establishment of such fixed reference point and GPS base station 112, physical features of autonomous machinery operating area 111 of nursery are then mapped by personnel 133 roving the area with one or more hand-held mapping units (FMUH's) 180 (FIGS. 64A-D) and, preferably with a trailer-based remote mapping system (FMSRT), which comprises a pair of specially-configured trailers 150 (FIGS. 64A, B) for towing preferably behind utility vehicles.

Feature Mapping Unit-Hand-Held (FMUH)

FMUH 180 incorporates: a computer/human machine interface (HMI) terminal 186; two GPS satellite signal antennas 182 and 183; an RTK GPS error correction signal antenna 197; an inclinometer 184 providing computer 186 with accurate unit inclination information; a non-contact distance transducer 185 providing computer 186 with height of transducer 185 (and, thus, unit) above ground; a component mounting plate 181 and riser/grip bar 187; riser clamp angle transducer 199 for measuring riser diameter; a sprinkler riser mounting seat 190, associated spring 194-loaded clamp 191, pivot pins 188 and 196, linkage 193, and release handle 189. Dual satellite antennas enable FMUH 180 to determine its heading as well as position without having to be moved. (Such can alternatively be accomplished with a flux valve/electronic compass.)

FMUH 180 arrangement provides for mounting to and mapping of irrigation sprinkler heads, including their heights, attitudes (tilt angle and direction) and riser diameters. Also, an attachable probe 198 (FIG. 64C), the bottom of which is for contacting the ground, can be incorporated to map other nursery features. These include, but are not limited to, machine storage areas, staging areas, serviced nursery beds 125, aisles 126 between serviced nursery beds 125, and service roads/machine travel paths 127. Data logger portion of FMUH 180 incorporates pre-programmed data entry types selectable by mapping personnel 133 for facilitating mapping expediency. Some sample data types include: nursery bed corner, sprinkler head position, sprinkler riser base position, driveway corner, greenhouse outer corner, greenhouse doorway outer corner, machine storage building/shed doorway outer edge, etc. FMUH 180 incorporates sensors and programming that automatically detect and compensate for position offset of attached probe 198. FMUH 180 further provides a real-time graphical display, depicting portion of nursery being mapped, giving feedback to mapping personnel, promoting proper data entry. Resulting topographical representation of nursery service areas ensures accurate placement and retrieval of pallet assemblies 300, 400 and 500, as well as physical orientation stability of operating autonomous machinery.

FMUH 180 can also be used in production situations for reestablishing positions and plan orientations (headings) of PA's that may have been displaced by floodwaters, extremely high winds, or inadvertent manual contact. Simple probing of two predefined corners of pallet forming subject PA, together with FMUH control system knowledge of associated PA geometry, establishes requisite subject PA. Further, FMUH control system, with knowledge of pallet geometry and production status (i.e., pallet type that should be present) FMUH can audibly and visually alert operator to probing errors, ensuring proper determination of position and plan orientation of subject PA. Once position and plan orientation of subject PA has been reestablished, FMUH 180 can transmit via radio such information to master control system, which, in turn, provides such information to pertinent autonomous material handling machinery for successful retrieval/handling of subject errant PA.

Feature Mapping System-Remote, Trailer-Mounted (FMSRT)

Many nurseries incorporate irrigation sprinkler heads that are positioned centered in relatively wide beds, making direct access to those heads for mapping a time-consuming effort. A remote, trailer-mounted, feature mapping system (FMSRT) in accordance with the invention, substantially expedites mapping of such difficult-to-access component with sufficient accuracy to avert collisions between autonomous pallet-handling machinery while promoting placement of PA's relatively closely to such features, thereby maximizing use of bed space.

FMSRT, illustrated in FIG. 65A, comprises two substantially identical trailer-based units that complement one another, working together to visually map relatively distant, difficult-to-access nursery features, e.g., sprinkler heads, while each trailer operates on a nearby driveway.

Each trailer comprises a metal frame on two wheels, having a tow bar/hitch for towing behind a small utility vehicle. One of the two wheels incorporates a rotary incremental encoder 157 or equivalent rotary position-measuring device for interpolating associated trailer position between GPS position updates, as needed. Also mounted to frame is a first carriage 174 that swivels about a vertical axis and is clamped a fixed position for a given mapping operation. Also mounted to frame is an electrical enclosure in which control system is found.

First carriage 174, with the exception of the swivel joint, comprises a framework that is of triangular shape falling in a vertical plane, which is centered between two trailer wheels with swivel centered. One upper edge of triangular frame of first carriage 174 is sloped preferably 45 degrees to typically horizontal trailer deck. First carriage 174, in turn, mounts a light source 170, a light source vertical position transducer 173, two GPS satellite antennas 153 and 154 spaced apart to enable trailer attitude/heading to be measured; an RTK GPS error correction signal antenna 155, and second carriage 175 that provides for reversal of the aperture of a thereon-mounted linear photoelectric receiver array.

Second carriage 175 comprises primarily a photoelectric sensor array 172—a linear array of photoelectric sensors spaced a short distance (e.g., ½-inch or less) apart in a slender housing pinned at its ends, allowing for swiveling of sensor array 172 about its longitudinal axis. Sensors have separate electrical output circuits that enable sensor array 172 to iteratively roughly measure lengths of objects that pass between a point light source and sensor array 172. Height of sensor array 172 is sufficient to ensure all target features can be reliably measured. Second carriage 175 is arranged for periodic rotation about its slender body, effectively "flipping" over to view source light from the opposing side. Orientation of sensor array 172 is maintained by spring-applied latch 176. Light source and photoelectric receivers are preferably modulated to negate error-producing effects of ambient light on the photoelectric receivers. Photoelectric sensor array 172 is sloped to enable light from source to be received on both sides of a slender target feature, e.g., a sprinkler riser, providing for redundancy in measurement of such feature.

Frame-mounted electrical enclosure holds a microprocessor-based programmable control system 151, including GPS receiver 152. A human-machine interface (HMI) terminal 160, separate from FMSRT control 151 enclosure, mounts on handle bar or dashboard of utility vehicle and is connected through a cable 161 to control system enclosure at connector 162. FMSRT preferably draws electrical power from utility vehicle electrical supply (e.g., alternator or battery), though alternately could have its own battery. Control system incorporates electrical circuitry and real-time programming suitable for relatively high rate data logging. Discrete inputs comprise primarily photoelectric receiver signals (light/dark) and operator HMI terminal 160 inputs. Digital inputs comprise GPS satellite and base station signals, encoder 157 signal, light source height transducer 173, HMI terminal 160 signals, and current time. System output comprises time-stamped position and photoelectric sensor array status data sent to permanent storage and operator audiovisual travel speed command information via the HMI terminal 160.

Prior to a mapping operation, each of two FMSRT trailers 150(1) and 150(2) are arranged in an initial configuration. In initial configuration, each trailer has its first carriage 174 set counterclockwise 45 degrees in plan from vertical plane centered between trailer wheels. The second carriage 175 of first trailer 150(1) is set to receive light input from its right-hand side, while the second carriage 175 of second trailer 150(2) is set to receive light input from its left-hand side. Light source 170 on each trailer is set to an elevation a minor distance above the tops of the canopies of the plant material in the bed container the target sprinkler head(s).

As shown in FIG. 65B, first utility vehicle with trailer 150(1) is staged on a driveway adjoining a bed containing features (e.g., sprinkler heads) to be mapped, wherein subject bed is to right of trailer 150(1). Second utility vehicle with trailer 150(2) is staged on a driveway adjoining a bed containing same features (e.g., sprinkler heads) to be mapped by utility vehicle/trailer 150(1), wherein subject bed is to left of trailer 150(2). Utility vehicle/trailer 150(1) leads utility vehicle/trailer 150(2) so as to cause light source 170 on one trailer to be normal to the photoelectric receiver array 172 on the complementary trailer. I.e., utility vehicle/trailer 150(1) leads utility vehicle/trailer 150(2) by the width of the bed between them.

First 150(1) and second 150(2) utility vehicle/trailers are established as master and slave, respectively, in a master/slave data collection arrangement. Master (first) utility vehicle/trailer 150(1) travels independently to a pre-defined speed limit, while slave (second) utility vehicle/trailer 150(2) speed—generally the same as that of the master—is set and adjusted as necessary to maintain a fixed lead distance from master (first) utility vehicle/trailer 150(1) so that photoelectric array 172 on a given trailer is maintained normal to the light source 170 on the complementary trailer. Real-time GPS position of FMSRT master (first) trailer 150(1) is radio communicated to slave (second) FMSRT trailer 150(2) control system, which compares the received position information to proper offset information it maintains, generating an error value, which drives an audible indication (i.e., tone) produced by HMI, prompting slave (second) utility vehicle operator to increase or decrease his speed to reduce the error value—effectively yielding a position servo loop. Speed control tones, based on a pre-defined working speed, can also be incorporated into master utility vehicle/trailer controls. Incorporation of pair of headphones, connectable to HMI, facilitates operator concentration on speed control tones.

Alternately, an auto-throttle system could be incorporated into each utility vehicle, wherein master would travel at a constant speed and slave would maintain the discussed offset distance. Safety would dictate incorporation of a 'dead man' switch on each vehicle to disengage the auto-throttle system in the event of a problem.

Data acquisition initiates and vehicles/trailers travel length of bed at a rate limited by the lesser of the data acquisition update rate or safety limits. While traveling, target features (e.g., sprinkler heads) are passed, which break the light beams emitted by the trailer light sources 170(1) and 170(2) and received by parts of the corresponding photoelectric receiver arrays 172(2) and 172(1), giving rise to height measurements and a first of two attitude measurements of features observed.

Upon completing initial pass(es), first carriage 174 of each trailer 150 is swiveled to 45 degrees clockwise in plan from vertical plane centered between trailer wheels. The first vehicle/trailer 150(1) now leads the second vehicle/trailer 150(2) by the distance it trailed the second vehicle/trailer 150(2) in the earlier configuration as data collection is resumed. This results in triangulated views of the remote features being mapped. Data consolidation and reduction, subsequent to collection, yields positions of targeted remote features laterally across beds, in addition to longitudinal positions, heights, attitudes, and diameters (of risers). Manual counting of targeted features (e.g., sprinkler heads) can be employed confirm system operation. Reduced data is in a format suitable as a digital map interpretable by nursery automation system in directing autonomous machinery.

PAS EMBODIMENT 2 PHYSICAL DESCRIPTION

Unless otherwise stated, components incorporated into PAS second embodiment are substantially the same as those incorporated into PAS first embodiment.

A second embodiment of PAS 1500 is shown in FIGS. 66 and 67. This second embodiment comprises: a second embodiment of a PGSU 1560, with four pallet/grid stack conveyors (PGSC's) 1506, 1507, 1508, and 1509, and a pallet elevator (PE2) 1640 with integral PC 1641; two PAU's, 1700(1) and 1700(2), a PACTU 1820; and PC's 1860, 1870, 1870' and 1890 for interconnection of above components; thereby forming a first PC line. PAS 1500 further comprises PC's 1900, 1910, 1920 and 1930, and a PA shuttle 1940 with integral PC 1941, forming a second PC line, for semiautomatic PA unit processing, described below.

First PC line in PAS second embodiment is an over-and-under configuration, reducing system footprint relative to first embodiment though necessitating greater height to enable items conveyed on lower PC run to pass beneath PAU's 1700. Further, access to PATT 1200 by PACTU 1820 consequently necessitates bottommost deck of PATT 1200 be higher than that of first embodiment, thus necessitating a ramp on which PATT 1200 sits for loading and unloading, or the placement of lower PC's of PAS second embodiment in a trough.

PAS second embodiment calls for stacks of pallets and grids to be removed from PAS by forklift for storage elsewhere. Thus, no PGSA is incorporated in PAS second embodiment.

Also, PC's 1860 and 1890 may be elongated to provide space for an optional PGWU with PGRU's comparable to those of PAS first embodiment. PC 1860 operates beneath such components.

Pallet/Grid Stack Conveyor (PGSC) Physical Description

As can be seen in FIGS. 68 and 69, four closely laterally spaced, parallel, substantially identical, pallet/grid stack conveyors (PGSC's) 1506, 1507, 1508, and 1509 are located proximal and lateral to one end of a first, linear, PC line forming a PAS second embodiment 1500. Flow of each PGSC is bi-directional, horizontal and perpendicular first PC line and is servo-driven with positioning capabilities. Each PGSC is at least as wide as the widest pallet PAS is configured to process, and at least twice as long as the longest pallet PAS is configured to process. Belts of PGSC's are at lowest elevation of all PAS conveyor belts, matched only by those of PE1-PE2 and (during part of PE2 cycle) PE2 PC's.

Proximal to first end 1529 of each PGSC, which is distal to longitudinal centerline of PE1-PE2 PC described below, is an arrangement for centering and squaring pallet and grid stacks 1540 and 1543, respectively, placed on associated conveyor at associated end 1529 by a manually operated forklift 1502. Arrangement consists of a lift table 1511 and a pair of mirrored centering arms 1517 and 1518 situated on sides of PGSC opposite one another at associated conveyor end 1529. Lift table 1511, the main structure of which is below conveyor belt support structure proximal to conveyor end 1529, incorporates ribs 1512 that extend up between individual conveyor belts to provide a composite planar horizontal surface for lifting and subsequent lateral sliding of pallet and grid stacks 1540 and 1543, respectively, without disturbing conveyor belts. Cam plate 1513, pushed horizontally by actuator 1514, and situated between lift table 1511 and stationary base plate 1516, drives lift table 1511 vertically upward along guides 1515, substantially synchronously raising upper surfaces of ribs 1512 above upper surfaces of adjoining conveyor belts, taking weight of pallet/grid stack from associated conveyor.

Push arms 1517 and 1518 operate as pantographs driven by cranks 1519 and 1520, which are driven by links 1521 and 1522, respectively, which are driven and guided by actuator 1525. A sensor at the end 1529 of each PGSC, plus control system logic detect and establish the new presence of a pallet/grid at the end 1529 of the associated PGSC. Lift table 1511 is elevated and then push arms 1517 and 1518 advance toward one another. One arm, 1517 or 1518, as applicable, contacts and pushes an eccentric, skewed pallet/grid on a corner pallet/grid support column, causing pallet to rotate until arm contacts other pallet/grid support columns along same side of pallet. At this point, pallet is rotationally aligned with PGSC. Arm, 1517 or 1518, as applicable, continues pushing pallet, translating it toward PGSC center, at which point opposing arm, 1518 or 1517, as applicable, contacts opposing side of pallet. At this point, pallet is rotationally aligned with and laterally centered above PGSC. If no other associated conveyor indexing action is occurring at the time, associated lift table 1511 is then lowered, placing pallet/grid on associated conveyor composite belt, properly oriented for conveying to PGSU for subsequent de-stacking. Pallet detection sensors and algorithms handle remaining pallet indexing/positioning requirements of PGSU on pallet. Pallet alignment function works as well with custom pallets for holding PGSU pallet adapters, providing for automatic PGSU tooling changes.

PGSU EMBODIMENT 2 PHYSICAL DESCRIPTION

As shown in FIGS. 68 and 69, PGSU 1560 in a second embodiment of the invention, as applicable to a particular operating mode, transfers pallets 302, 402, or 502, and grids 600 (402, 502, and 600 shown) between PC's 1890, 1631 and PGSC's 1506, 1507, 1508, and 1509. PGSU 1560 comprises framework 1562 and mutually interconnected first through fifth manipulator carriages, 1568, 1575, 1588, 1594, and 1600, respectively.

Frame 1562 is arranged to enable PGSU 1560 manipulator carriages to engage pallets and grids situated on proximal ends of four PGSC's 1506, 1507, 1508, and 1509, PGSU-PAU1 PC 1890, and PE1 PC 1631. Frame 1562 incorporates a linear, horizontal first track 1563—perpendicular to PE1-PE2 PC flow directions—for movable attachment of a first carriage 1568. Also mounted between frame 1562 and first carriage 1568 is a servomotor/sprocket/gear belt arrangement for reciprocally driving a first carriage 1568 along first track 1563.

Mounted to first carriage 1568 is a first set of linear (or cam follower) bearings 1569, which provide for movable attachment of first carriage 1568 to first track 1563 of frame 1562. Also mounted to first carriage 1568 are four vertical linear bearing arrangements 1570, 1571, 1572, and 1573, each for movable attachment of second through fifth carriages 1575, 1588, 1594, and 1600 via linear tracks 1576, 1589, 1595, and 1601, respectively, mounted thereon. Mounted between first carriage 1568 and each of the second through fifth carriages is a servo actuator as described above for reciprocally driving same along respective tracks 1576, 1589, 1595 and 1601. Also mounted between first carriage 1686 and each of second through fifth carriages 1575, 1588, 1594, and 1600 is a fail-safe brake for emergency and idle fixing of same relative to associated bearing arrangement, and a "counterbalance" pneumatic cylinder as described above.

Each of second through fifth carriages, 1575, 1588, 1594, and 1600, respectively, are substantially the same as the second and third carriages of PGSU first embodiment.

PAS EMBODIMENT 2 OPERATION

PAS second embodiment operates similarly to PAS first embodiment. Also, pallet and grid stacks are added to and subtracted from PAS via forklift interfacing with a PGSC's of PGSU second embodiment.

PAS EMBODIMENT 2 SERIAL/PALLET TYPE CHANGE OPERATION

Pallet/Grid Addition to PAS

In each PAS 1500 operating mode involving assembly of PA's combined with change of type or addition of pallets 302, 402, or 502, such process starts with placement of a stack 1543 of pallets 302, 402, or 502 and, if applicable, a stack 1540 of grids 600 onto forklift interface ends 1529 of stationary PGSC's, 1507 and 1506, respectively, by a manned or autonomous forklift 1502. PGSC's provide for addition of pallet and grid stacks to PAS 1500 without interruption of continuous operation of PGSU 1560 and, thus, PAS 1500.

Upon clearing of gripper interface end 1530 of PGSC 1507, PGSC 1507 indexes a pallet stack 1543 from forklift interface end 1529 to gripper interface end 1530 of PGSC 1507, clearing forklift interface end 1529 to receive an additional pallet stack 1543. PGSC 1506 operates similarly, typically handling grids in lieu of pallet stacks. PAS 1500 then signals for additional pallet stacks (e.g., through illumination of a light and sounding of a horn for manual forklift operation, or, through electrically wired signaling to control system for autonomous forklift operation) and continues to operate without interruption. All PGSC's are individually controllable by conveyor-dedicated clutch/brake units 1531 positioned in the conveyor drive train between conveyor drive rollers and one common conveyor drive motor 1532, or by separate conveyor-dedicated drive motors, to enable independent indexing of PGSC's 1506, 1507, 1508, and 1509. Thus, it is permissible for pallet stacks 1544 and grid stacks 1541 to have different quantities of pieces, without interrupting PAS 1500 operation. Photoelectric sensors or mechanical limit switches 1535 detect passing leading or trailing edges of pallet stacks 1544, establishing positions of pallet stacks 1544 on PGSC 1507. A similar sensor arrangement is incorporated on PGSC 1506. These discrete signals are fed to the programmable servo system controls along with conveyor position measurement information from position measuring components—typically rotary encoders—associated with servo system driving PGSC's, 1506, 1507, 1508, and 1509, respectively. This arrangement provides for flexible positioning on respective conveyors of pallet stacks 1544 and grid stacks 1541, the geometry of each of which may change with production changes, due to different types of pallets 300, 400 or 500 and grids 600 which system 1500 desirably handles.

Pallet stacks 1544 and grid stacks 1541 conveyed to gripper interface ends, 1530 of PGSC's 1507 and 1506, respectively, are roughly positioned for de-nesting due to variation in pallet stack 1543 and grid stack 1540 placement positions and orientations on first ends 1529 of PGSC's 1507 and 1506, respectively, by forklift 1502. PGSU 1560 compensates, as described below, for such variation in positions and orientations of pallet stacks 1544 and grid stacks 1541.

PAS EMBODIMENT 2 PALLET/GRID REMOVAL FROM PAS

Pallet/Grid Removal from PAS

In each process involving removal of pallets and, if applicable, grids, from PAS 1500 and subsequent storage of such items starts with the presence of first and second pallets, 1894 and 1895, respectively, (similar to 302, 402, or 502) proximal to PGSU 1560 end 1893 of and spaced laterally on PC 1890. It may, depending on production configuration, also start with the presence of a first pair of grids 1896 and 1897 (similar to 600) beneath respective pallets 1894 and 1895 and a second pair of grids 1896' and 1897' between respective pallets 1894 and 1895 and PGSU 1560 end 1893 of PC 1890. Such process comprises sequentially: engaging and gripping a first pallet 1894 and, if applicable, a first grid 1896', as applicable, on side of grid longitudinal center vertical plane distal to PGSC's 1508 and 1509, transferring first pallet 1894 and grid 1896' to and nesting them on tops of second pallet 1895 and grid 1897', respectively, on side of PC longitudinal center vertical plane proximal to PGSC's 1508 and 1509; releasing first pallet 1894 and grid 1896'; gripping second pallet 1895 and grid 1897', thus capturing first pallet 1894 and grid 1896', transferring first and second pallets 1894 and 1895, respectively, and first and second girds 1896' and 1897', respectively, to and nesting them on tops of pallet stack 1553 and grid stack 1550 at PGSU 1560 ends 1530 of PGSC's 1509 and 1508, respectively. Pallet and grid stacks 1553 and 1550, respectively, on reaching designated size, are automatically conveyed from gripper interface end 1530 to forklift 1502 interface end 1529 for forklift 1502 retrieval and transport to storage area.

Forklift 1502 places a stack 1507 of pallets 302, 402, or 502 and, if applicable, a stack 1542 of grids 600 onto stationary pallet stack conveyor belt 1509 and grid stack conveyor belt 1543, respectively, proximal to the first (free) end 1527 of a pallet stack conveyor 1517 and grid stack conveyor 1540, respectively, These conveyors are of lengths of at least twice the horizontal dimension of the associated stack 1507 or 1542 in the stack conveyor flow direction 1526 and provide for addition of pallet and grid stacks to system without interruption of continuous operation of PGSU. Conveyor surfaces preferably comprise multiple, laterally spaced gear belts 1525 for positive belt surface positioning and belt side-to-side "walking" elimination. Slide beds preferably support conveyor belts for smooth operation and preferably have high-friction backing to promote substantially slip-free contact between belts and carried items.

In de-nesting mode, if grids 600 are to be incorporated into PA's 500 (for example), PGSU 1560 picks up two grids 600 simultaneously from two grid stacks 1542 at second end 1547 of grid stack 1540, translates grids 600 and places them on first end 1644 of PC 1640. PGSU 1560 then picks up two pallets 502 simultaneously from two pallet stacks 1507 at second end 1528 of pallet stack conveyor 1517, translates pallets 502 and places them on first end 1644 of PC 1640, inserting them into grids 600 if grids are to be incorporated into PA's 500. In nesting mode, PGSU 1560 simultaneously picks up pallets 502 from first end 1644 of PC 1640, out of grids 600 if girds 600 were incorporated in PA's 500, and translates pallets 502 and places them on pallet stacks 1507 at second end 1528 of pallet stack conveyor 1517. If grids 600 were incorporated in PA's 500, PGSU 1560 then simultaneously picks up grids 600 from first end 1644 of PC 1640, and translates grids 600 and places them on grid stacks 1542 at second end 1547 of grid stack conveyor 1540.

PAGTU EMBODIMENT 2

FIGS. 74A-F are perspective views of a second embodiment of PAGTU 7800 in various PA lifting states. PAGTU second embodiment 7800 differs from PAGTU first embodiment 4000 by its PA lifting technique, which is a three-member (including fork) arm 7811 that articulates in a vertical plane, providing fork lift as well as fork extension. PAGTU second embodiment 7800 travels on a pair of recirculating tracks 7810 and turns via a turntable 7812 to avert bed-damaging track skid steering typical of tracked vehicles. PAGTU second embodiment 7800 incorporates swivel joints with associated servo drives at its fork's heel and between the track and main carriages, both providing rotation about vertical axes. Another servomotor-driven swivel joint 7813, with its axis of rotation parallel to and centered proximally above fork tines, provides fork roll. Collectively these joints provide for "universal" movement of fork, accommodating undulating beds and driveways on which PAGTU second embodiment 7800 and PATT 1200 must operate and interact. Hydraulic, electric, or equivalent servo devices suffice for driving PAGTU second embodiment 7800, as in PAGTU first embodiment 4000.

PAGTU EMBODIMENT 3

FIG. 75 is perspective underside view of a third embodiment of PAGTU 7900 in a mid-elevation PA lifting state. PAGTU third embodiment 7900 differs from PAGTU second embodiment 7800 simply by its fixed rubber-tired drive in place of the tracks of PAGTU second embodiment 7800. This allows for a larger turntable 7912, rendering PAGTU third embodiment 7900 more stable on utilizing such device for turning.

PAFTU EMBODIMENT 2

FIG. 76 is perspective overhead view of a second embodiment of PAFTU 6000. PAFTU second embodiment 6000 differs from PAFTU first embodiment 1100 simply by its vertical plane-residing servo-driven pantograph fork extension mechanism 6010. This arrangement enables PAFTU second embodiment 6000 to require less bed space for maneuvering into and out of engagement with a PA, relative to PAFTU first embodiment 1100. Hydraulic, electric, or equivalent servo devices suffice for driving PAFTU second embodiment 6000, as in PAFTU first embodiment 1100.

That which is claimed:

1. A containerized plant array stand-alone support structure comprising:

a substantially horizontal upper wall portion, wherein the upper wall portion is contoured into a horizontal planar array of mutually contiguous, downwardly converging funnel segments;

wherein each funnel segment of the horizontal planar array is associated with a container receptacle extending downward from the upper wall portion and concentric with a corresponding funnel segment, and wherein the segment incorporates at least one liquid overflow drainage passage proximal to the container receptacle; and wherein each of the container receptacles includes:

at least one substantially upward-facing sealing surface for providing a seal between the container receptacle and a container, at least one side wall, wherein the at least one vertical side wall is tapered, a substantially horizontal bottom wall comprising at least one upward recess, wherein a bottom perimeter of the at least one container receptacle side wall is coupled along a perimeter of the bottom wall, an open upper end, at least one receptacle liquid drainage passage, and at least one containerized plant lifting tool access hole extending through an uppermost wall of the at least one upward recess, wherein the containerized plant lifting tool access hole is elevated higher from the bottom wall relative to the at least one receptacle liquid drainage passage, and wherein the at least one containerized plant lifting tool access hole is oriented substantially beneath a section of at least one upward recess in a bottom wall of a container when installed in the container receptacle.

2. The structure of claim 1, wherein the upper wall portion further incorporates a light reflective upper surface capable of reducing thermal energy absorption by the containers installed in the container array support structure.

3. The structure of claim 1, wherein each funnel segment further incorporates a downward recess in the upper wall portion along an upper perimeter of the container receptacle.

4. The structure of claim 1, wherein the upper wall portion incorporates a plurality of stiffening contours.

5. The structure of claim 4, wherein the at least one liquid overflow drainage passage passes through a portion of at least one of the plurality of stiffening contours such that the at least one liquid overflow drainage passage is elevated above an upper surface of the upper wall portion.

6. The structure of claim 1, wherein the at least one receptacle liquid drainage passage is elevated above the bottom wall of the container receptacle, thereby forming a water reservoir in the bottom of the container receptacle.

7. The structure of claim 1, wherein the at least one receptacle liquid drainage passage comprises at least one hole through the side wall of the container receptacle.

8. The structure of claim 1, wherein the at least one receptacle liquid drainage passage extends through a wall of the at least one upward recess, wherein the at least one receptacle liquid drainage passage is oriented substantially above a bottom wall of a container when installed in the container receptacle.

9. The structure of claim 1, wherein the bottom wall of the container receptacle incorporates a downwardly extending recess forming a column, wherein the column includes at least one column side wall coupled at a top end to the container receptacle bottom wall and a column bottom wall coupled along an outer perimeter to the column side wall.

10. The structure of claim 1,further comprising a secondary support structure, wherein the secondary support structure includes a substantially horizontal upper wall portion that incorporates an array of downwardly recessed wall pockets, wherein each wall pocket includes at least one side wall coupled along an upper perimeter of the pocket to the secondary support structure upper wall, and wherein the at least one side wall is tapered.

11. The structure of claim 10, wherein each wall pocket is adapted to receive at least a portion of a respective container receptacle.

12. The structure of claim 10, wherein the bottom wall of each container receptacle incorporates a downwardly extending recess forming a column, and wherein each wall pocket is adapted to receive the column of a respective container receptacle.

13. The structure of claim 1, wherein the at least one upward recess comprises at least a first upward recess and a second upward recess, the first upward recess elevated higher relative to the second upward recess, and wherein the at least one containerized plant lifting tool access hole extends through the first upward recess and the at least one receptacle liquid drainage passage extends through the second upward recess.

14. The structure of claim 13, and wherein the at least one receptacle liquid drainage passage is oriented at an elevation higher than the bottom wall of the container receptacle.

15. The structure of claim 13, and wherein the at least one receptacle liquid drainage passage is oriented at an elevation higher than the bottom wall of a container when installed in the container receptacle.

16. The structure of claim 13, and wherein the at least one containerized plant lifting tool access hole is oriented at an elevation higher than the bottom wall of the container receptacle.

17. The structure of claim 13, and wherein the at least one containerized plant lifting tool access hole is oriented at an elevation higher than the bottom wall of a container when installed in the container receptacle.

18. The structure of claim 1, wherein the at least one upward recess of each container receptacle is adapted to provide a seat supporting at least a portion of a container when installed in the container receptacle.

19. The structure of claim 18, wherein the seat supporting at least a portion of a container when installed in the container receptacle substantially blocks root access from the container to the at least one containerized plant lifting tool access hole.

* * * * *

UNITED STATES PATENT AND TRADEMARK OFFICE

CERTIFICATE OF CORRECTION

PATENT NO. : 7,681,357 B2
APPLICATION NO. : 11/339732
DATED : March 23, 2010
INVENTOR(S) : Drew C. Dyas It is certified that error appears in the above-identified patent and that said Letters Patent is hereby corrected as shown below:

Column 88, Line 38 – Change "at least one side wall" to -- at least one vertical side wall --

Column 88, Line 42 – Change "of the at least one container receptacle side wall" to -- of the at least one container receptacle vertical side wall --

Signed and Sealed this

Twenty-seventh Day of April, 2010

David J. Kappos

David J. Kappos
*Director of the United States Patent and Trademark Office*